US008275133B2

(12) United States Patent
Tamura et al.

(10) Patent No.: US 8,275,133 B2
(45) Date of Patent: Sep. 25, 2012

(54) METHOD AND SYSTEM FOR MOBILE COMMUNICATIONS

(75) Inventors: Motoshi Tamura, Yokosuka (JP); Mutsumaru Miki, Yokosuka (JP); Akiko Okamoto, Kitakyushu (JP); Kenya Kusunose, Yokosuka (JP); Akihiro Uchikoshi, Yokosuka (JP); Daisuke Igarashi, Yokosuka (JP); Katsuhiko Yamagata, Yokohama (JP); Takaaki Sato, Yokosuka (JP); Junichiro Hagiwara, Yokohama (JP); Yasuyuki Watanabe, Yokosuka (JP); Takuya Hamajima, Yokosuka (JP); Masafumi Hata, Yokosuka (JP); Nobutaka Ishikawa, Yokohama (JP); Yoshiyuki Yasuda, Yokohama (JP); Kazufumi Yunoki, Yokosuka (JP); Nobuhide Uchiyama, Hiroshima (JP)

(73) Assignee: NTT Docomo, Inc., Tokyo (JP)

( * ) Notice: Subject to any disclaimer, the term of this patent is extended or adjusted under 35 U.S.C. 154(b) by 644 days.

(21) Appl. No.: 11/396,103

(22) Filed: Mar. 30, 2006

(65) Prior Publication Data

US 2006/0194583 A1 Aug. 31, 2006

Related U.S. Application Data

(62) Division of application No. 09/403,431, filed as application No. PCT/JP98/01906 on Apr. 24, 1998, now Pat. No. 7,236,787.

(30) Foreign Application Priority Data

Apr. 24, 1997 (JP) ...................................... 9-123782

(51) Int. Cl.
*G06F 21/00* (2006.01)

(52) U.S. Cl. ....................................... 380/272; 380/255

(58) Field of Classification Search ........................ None
See application file for complete search history.

(56) References Cited

U.S. PATENT DOCUMENTS 4,592,745 A 6/1986 Rex et al.

(Continued)

FOREIGN PATENT DOCUMENTS

CA 2111703 A1 10/1993

(Continued)

OTHER PUBLICATIONS

Office Action issued in Chinese counterpart application No. 98804482.X (4 pages) and English translation thereof (4 pages), dated Feb. 6, 2007.

(Continued)

*Primary Examiner* — Benjamin Lanier
(74) *Attorney, Agent, or Firm* — Brinks Hofer Gilson & Lione

(57) ABSTRACT

When a network pages the temporary user mobile identifier of a mobile station, the mobile station sends a response to the network. Next, the network checks the authenticity of the user using a ciphering key, corresponding to the temporary user mobile identifier and a random number. If the temporary user mobile identifier is authenticated, a normal incoming call acceptance procedure is executed. If the mobile station is authenticated although the temporary user mobile identifier is wrong, the network reassigns a new temporary user mobile identifier to the mobile station and stops the current communication. In communication, the network and the mobile station mutually notify encipherment-onset time and negotiate about encipherment manner with each other. In addition, diversity handover is commenced upon a call attempt. Furthermore, if a branch replacement is necessary, the current branch is replaced by new branches capable of executing the diversity handover. Additionally, when a new call occurs to or from the mobile station capable of treating a plurality of calls simultaneously, the mobile station uses the same branch structure and the same communication frequency band for all of calls. Additionally, when a new call occurs to or from the mobile station capable of treating a plurality of calls simultaneously, a branch structure and a communication frequency band, which can continue all of the calls, are selected and used. Therefore, the mobile communications system is suitable for transmission of various sorts of data in accordance with the development of multimedia.

10 Claims, 515 Drawing Sheets

U.S. PATENT DOCUMENTS

| | | | | | |
|---|---|---|---|---|---|
| 4,865,591 | A | | 9/1989 | Sams | |
| 4,883,472 | A | | 11/1989 | Michel | |
| 4,893,339 | A | | 1/1990 | Bright et al. | |
| 4,946,446 | A | | 8/1990 | Vadher | |
| 4,973,318 | A | | 11/1990 | Holm et al. | |
| 4,975,952 | A | * | 12/1990 | Mabey et al. | 713/160 |
| 5,017,190 | A | | 5/1991 | Simon et al. | |
| 5,081,641 | A | | 1/1992 | Kotzin et al. | |
| 5,084,060 | A | | 1/1992 | Freund et al. | |
| 5,095,531 | A | | 3/1992 | Ito | |
| 5,101,501 | A | | 3/1992 | Gilhousen et al. | |
| 5,109,390 | A | | 4/1992 | Gilhousen et al. | |
| 5,114,406 | A | | 5/1992 | Gabriel et al. | |
| 5,146,498 | A | | 9/1992 | Smith | |
| 5,181,200 | A | | 1/1993 | Harrison | |
| 5,189,734 | A | | 2/1993 | Bailey et al. | |
| 5,267,261 | A | | 11/1993 | Blakeney et al. | |
| 5,273,544 | A | | 12/1993 | van der Wal | |
| 5,279,579 | A | | 1/1994 | D'Amico | |
| 5,279,585 | A | | 1/1994 | Balkwill | |
| 5,292,314 | A | | 3/1994 | D'Alession et al. | |
| 5,295,976 | A | | 3/1994 | Harris | |
| 5,299,199 | A | | 3/1994 | Wilson et al. | |
| 5,309,501 | A | | 5/1994 | Kozik et al. | |
| 5,319,712 | A | * | 6/1994 | Finkelstein et al. | 380/44 |
| 5,320,609 | A | | 6/1994 | Haber et al. | |
| 5,329,573 | A | | 7/1994 | Chang et al. | |
| 5,336,183 | A | | 8/1994 | Greelis et al. | |
| 5,338,311 | A | | 8/1994 | Mahukar | |
| 5,370,629 | A | | 12/1994 | Michel et al. | |
| 5,416,778 | A | | 5/1995 | Chan et al. | |
| 5,423,065 | A | | 6/1995 | Pinard | |
| 5,452,471 | A | | 9/1995 | Leopold et al. | |
| 5,472,430 | A | | 12/1995 | Vaillancourt et al. | |
| 5,487,065 | A | | 1/1996 | Acampora et al. | 370/60.1 |
| 5,487,174 | A | * | 1/1996 | Persson | 455/444 |
| 5,491,837 | A | | 2/1996 | Haartsen | |
| 5,496,293 | A | | 3/1996 | Huggenberger | |
| 5,499,397 | A | | 3/1996 | Wadin et al. | 455/277.1 |
| 5,504,935 | A | | 4/1996 | Vercauteren | 455/438 |
| 5,513,245 | A | | 4/1996 | Mizikovsky et al. | |
| 5,514,097 | A | | 5/1996 | Knauer | |
| 5,527,294 | A | | 6/1996 | Weatherford et al. | |
| 5,548,820 | A | | 8/1996 | Victorin | |
| 5,549,558 | A | | 8/1996 | Martin | |
| 5,549,575 | A | | 8/1996 | Giambattista et al. | |
| 5,566,356 | A | | 10/1996 | Taketsugu | |
| 5,573,510 | A | | 11/1996 | Isaacson | |
| 5,574,974 | A | | 11/1996 | Almgren et al. | |
| 5,582,598 | A | | 12/1996 | Chanoch | |
| 5,590,133 | A | * | 12/1996 | Billstrom et al. | 370/349 |
| 5,591,136 | A | | 1/1997 | Gabriel | |
| 5,591,138 | A | | 1/1997 | Villaincourt | |
| 5,593,390 | A | | 1/1997 | Castellano et al. | |
| 5,609,577 | A | | 3/1997 | Haber et al. | |
| 5,625,627 | A | | 4/1997 | Ishi | |
| 5,625,876 | A | | 4/1997 | Gilhousen et al. | |
| 5,634,206 | A | | 5/1997 | Reed et al. | |
| 5,640,414 | A | | 6/1997 | Blakeney, II et al. | |
| 5,643,214 | A | | 7/1997 | Marshall et al. | |
| 5,657,375 | A | | 8/1997 | Connolly et al. | |
| 5,658,259 | A | | 8/1997 | Pearson et al. | |
| 5,663,990 | A | | 9/1997 | Bolgiano et al. | |
| 5,670,964 | A | | 9/1997 | Dent | |
| 5,673,259 | A | | 9/1997 | Quick, Jr. | |
| 5,674,204 | A | | 10/1997 | Chanoch | |
| 5,675,628 | A | | 10/1997 | Hokkanen | |
| 5,679,111 | A | | 10/1997 | Hjertman et al. | |
| 5,710,986 | A | | 1/1998 | Obayashi et al. | |
| 5,711,008 | A | | 1/1998 | Gallant et al. | |
| 5,717,762 | A | | 2/1998 | Aihara et al. | |
| 5,725,508 | A | | 3/1998 | Chanoch et al. | |
| 5,728,074 | A | | 3/1998 | Castellano et al. | |
| 5,743,889 | A | | 4/1998 | Sams | |
| 5,749,053 | A | | 5/1998 | Kusaki et al. | |
| 5,751,761 | A | | 5/1998 | Gilhousen | |
| 5,754,959 | A | | 5/1998 | Ueno et al. | |
| 5,768,276 | A | * | 6/1998 | Diachina et al. | 370/432 |
| 5,790,953 | A | | 8/1998 | Wang et al. | |
| 5,805,995 | A | | 9/1998 | Jiang et al. | |
| 5,807,346 | A | | 9/1998 | Frezza | |
| 5,832,368 | A | | 11/1998 | Nakano et al. | |
| 5,878,036 | A | * | 3/1999 | Spartz et al. | 370/335 |
| 5,886,988 | A | | 3/1999 | Yun et al. | |
| 5,887,021 | A | | 3/1999 | Keskitalo et al. | |
| 5,898,928 | A | | 4/1999 | Karlsson et al. | |
| 5,912,886 | A | | 6/1999 | Takahashi et al. | |
| 5,918,181 | A | | 6/1999 | Foster et al. | 455/456 |
| 5,920,814 | A | | 7/1999 | Sawyer et al. | |
| 5,924,030 | A | | 7/1999 | Rautiola et al. | |
| 5,924,042 | A | | 7/1999 | Sakamoto et al. | |
| 5,940,381 | A | | 8/1999 | Freeburg et al. | |
| 5,963,865 | A | | 10/1999 | Desgagne et al. | |
| 5,970,406 | A | | 10/1999 | Komara | |
| 5,978,678 | A | | 11/1999 | Houde et al. | |
| 5,983,117 | A | | 11/1999 | Sandler et al. | |
| 6,009,328 | A | | 12/1999 | Muszynski | |
| 6,032,050 | A | | 2/2000 | Hasegawa | |
| 6,039,624 | A | | 3/2000 | Holmes | |
| 6,070,084 | A | | 5/2000 | Hamabe | |
| 6,075,990 | A | | 6/2000 | Shin | |
| 6,081,600 | A | * | 6/2000 | Blanchard et al. | 380/255 |
| 6,094,575 | A | * | 7/2000 | Anderson et al. | 455/422.1 |
| 6,108,548 | A | | 8/2000 | Furukawa et al. | |
| 6,144,861 | A | | 11/2000 | Sundelin et al. | |
| 6,157,723 | A | | 12/2000 | Schultz | |
| 6,167,279 | A | | 12/2000 | Chang et al. | |
| 6,178,337 | B1 | | 1/2001 | Spartz et al. | |
| 6,246,878 | B1 | | 6/2001 | Wallentin | |
| 6,249,681 | B1 | | 6/2001 | Virtanen | |
| 6,301,478 | B1 | | 10/2001 | Wallstedt et al. | |
| 6,366,568 | B1 | | 4/2002 | Bolgiano et al. | |
| 6,546,252 | B1 | | 4/2003 | Jetzek et al. | |
| 6,600,903 | B1 | | 7/2003 | Lilja et al. | |
| RE39,381 | E | | 11/2006 | Hakkinen et al. | |
| 7,212,820 | B2 | | 5/2007 | Persson et al. | |
| 7,236,787 | B1 | | 6/2007 | Tamura et al. | |

FOREIGN PATENT DOCUMENTS

| | | | |
|---|---|---|---|
| CA | 2193506 | A1 | 11/1996 |
| CA | 2 206 063 | | 12/1997 |
| CN | 1135150 | A | 11/1996 |
| DE | 3638984 | A1 | 5/1988 |
| DE | 3900926 | A1 | 8/1989 |
| DE | 4223958 | A1 | 1/1993 |
| DE | 3645245 | C2 | 1/1994 |
| EP | 37696 | B1 | 5/1984 |
| EP | 268191 | A2 | 5/1988 |
| EP | 245312 | B1 | 5/1990 |
| EP | 373321 | A1 | 6/1990 |
| EP | 298067 | B1 | 10/1991 |
| EP | 327910 | B1 | 4/1992 |
| EP | 496141 | B1 | 7/1992 |
| EP | 516473 | B1 | 12/1992 |
| EP | 0 544 460 | | 6/1993 |
| EP | 554995 | B1 | 8/1993 |
| EP | 594349 | B1 | 4/1994 |
| EP | 627229 | A1 | 12/1994 |
| EP | 498737 | B1 | 7/1995 |
| EP | 0 768 804 | A2 | 4/1997 |
| EP | 0 779 755 | | 6/1997 |
| FR | 2701211 | A1 | 8/1994 |
| JP | 02-192231 | | 7/1990 |
| JP | 5504248 | A | 7/1993 |
| JP | 6-045991 | | 2/1994 |
| JP | 6-078359 | | 3/1994 |
| JP | 6069880 | A | 3/1994 |
| JP | H06-078359 | | 3/1994 |
| JP | 07-007469 | | 1/1995 |
| JP | 7-074694 | | 3/1995 |
| JP | 7-087567 | | 3/1995 |
| JP | 7-184251 | | 7/1995 |
| JP | 7-245784 | | 9/1995 |
| JP | 7-250371 | | 9/1995 |
| JP | 7-303090 | A | 11/1995 |
| JP | 8-205232 | A | 8/1996 |
| JP | 9-051075 | | 2/1997 |

| | | | |
|---|---|---|---|
| JP | 9-51575 | A | 2/1997 |
| JP | 9-065425 | | 3/1997 |
| JP | 9-121388 | | 5/1997 |
| JP | 9224276 | A | 8/1997 |
| JP | 9-508773 | A | 9/1997 |
| JP | 9-327072 | | 12/1997 |
| WO | WO 8702895 | A1 | 5/1987 |
| WO | WO 9110460 | A1 | 7/1991 |
| WO | WO 9218179 | A1 | 10/1992 |
| WO | WO 9305835 | A1 | 4/1993 |
| WO | WO 9316740 | A2 | 9/1993 |
| WO | WO 9409841 | A1 | 5/1994 |
| WO | WO 9415210 | A1 | 7/1994 |
| WO | WO 9430024 | A1 | 12/1994 |
| WO | WO 9501812 | A1 | 1/1995 |
| WO | WO 9504563 | A1 | 2/1995 |
| WO | WO 95/08897 | | 3/1995 |
| WO | WO 95/32594 | A1 | 11/1995 |
| WO | WO 9607443 | A1 | 3/1996 |
| WO | WO 96/29837 | A1 | 9/1996 |
| WO | WO 97/08910 | A1 | 3/1997 |
| WO | WO 9729596 | | 8/1997 |

OTHER PUBLICATIONS

Official Action issued in Canadian patent application 2,412,005, 3 pages, dated Aug. 23, 2007.
Official Action issued in Canadian patent application 2,411,993, 3 pages, dated Oct. 31, 2007.
Office Action issued in counterpart Chinese patent application No. 03141036.7 (6 pages) and English translation thereof (9 pages).
Office Action issued in connection with U.S. Appl. No. 11/712,539, dated Apr. 23, 2008, 12 pages.
Office Action issued in connection with U.S. Appl. No. 11/397,975, dated Feb. 26, 2008, 6 pages.
Examination Report in Canadian patent application No. 2,412,005, dated Jul. 26, 2006, 3 pages.
Examination Report in Canadian patent application No. 2,411,999, dated Jul. 26, 2006, 3 pages.
Office Action in U.S. Appl. No. 09/403,431, dated Nov. 29, 2005.
US Office Action issued Nov. 19, 2008 in U.S. Appl. No. 11/399,674, 9 pages.
US Final Office Action issued Nov. 19, 2008 in U.S. Appl. No. 11/397,975, 7 pages.
Japanese Office Action issued Jul. 29, 2008 in Japanese patent application No. 2005-208522 (with translation) 6 pages.
Japanese Office Action issued Jul. 29, 2008 in Japanese patent application No. 2005-208446 (with translation) 4 pages.
Japanese Office Action issued Jul. 29, 2008 in Japanese patent application No. 2005-332100 (with translation) 4 pages.
US Office Action issued Apr. 23, 2008 in U.S. Appl. No. 11/712,539 12 pages.
Office Action for Japanese Patent Application No. 2005-208446, dated Mar. 10, 2009 with English translation, 4 pages.
Office Action for Japanese Patent Application No. 2008-251763, dated Mar. 10, 2009 with English translation, 4 pages.
US Office Action issued Apr. 13, 2009 in U.S. Appl. No. 11/397,382, 8 pages.
Office Action from co-pending U.S. Appl. No. 12/421,197, dated Aug. 31, 2009, 6 pages.
Office Action from Chinese Application No. 200610166780.2, dated May 22, 2009, 8 pages.
Office Action from co-pending U.S. Appl. No. 11/397,382, dated Nov. 2, 2009, 9 pages.
Office Action from co-pending U.S. Appl. No. 12/366,384, dated Nov. 3, 2009, 8 pages.
Office Action from co-pending U.S. Appl. No. 11/397,382, dated Jan. 14, 2010, 8 pages.
Office Action from co-pending U.S. Appl. No. 12/421,197, dated Jan. 28, 2010, 6 pages.
Office Action from counterpart Canadian Application No. 2,412,005, dated Jun. 9, 2010, 2 pages.
Office Action from counterpart U.S. Appl. No. 11/397,382, dated Jun. 23, 2010, 8 pages.
Office Action from counterpart U.S. Appl. No. 12/367,026, dated Jun. 8, 2010, 8 pages.
Office Action from counterpart U.S. Appl. No. 12/421,197, dated Jun. 21, 2010, 6 pages.
Office Action from counterpart Chinese Application No. 200810146375.3, dated Mar. 9, 2010, 10 pages (with translation).
Office Action from co-pending U.S. Appl. No. 12/366,384, dated Apr. 15, 2010, 7 pages.
Office Action from co-pending U.S. Appl. No. 12/363,393, dated Jan. 21, 2011, 9 pages.
Office Action from co-pending U.S. Appl. No. 12/364,766, dated Jun. 27, 2011, 10 pages.
Office Action from co-pending U.S. Appl. No. 12/366,384, dated Oct. 19, 2011, 8 pages.
Office Action from co-pending U.S. Appl. No. 12/421,197, dated Apr. 4, 2011, 7 pages.
Office Action from co-pending U.S. Appl. No. 12/361,346, dated Sep. 24, 2010, 26 pages.
Office Action from co-pending U.S. Appl. No. 11/397,382, dated Nov. 19, 2010, 9 pages.
Office Action from co-pending U.S. Appl. No. 12/421,197, dated Nov. 22, 2010, 7 pages.
Office Action from co-pending U.S. Appl. No. 12/363,393, dated Sep. 16, 2011, 11 pages.
Office Action from co-pending U.S. Appl. No. 12/421,197, dated Sep. 19, 2011, 7 pages.
Hanly, Stephen V., "An Algorithm for Combined Cell-Site Selection and Power Control to Maximize Cellular Spread Spectrum Capacity," IEEE Journal on Selected Areas in Communications, Sep. 1995, No. 7, pp. 1332-1340.
Extended European Search Report for European Application No. 08022255.7, dated Mar. 12, 2012, 8 pages.
Office Action from co-pending U.S. Appl. No. 12/363,393, dated Dec. 14, 2011, 11 pages.
Office Action from co-pending U.S. Appl. No. 12/364,766, dated Dec. 16, 2011, 11 pages.
Office Action from co-pending U.S. Appl. No. 12/365,647, dated Jan. 18, 2012, 11 pages.
Notice of Allowance from co-pending U.S. Appl. No. 12/421,197, dated Jan. 20, 2012, 8 pages.
Office Action from co-pending U.S. Appl. No. 12/366,384, dated Mar. 1, 2012, 7 pages.
Notice of Allowance from co-pending U.S. Appl. No. 12/365,647, dated May 29, 2012, 17 pages.
Office Action from co-pending U.S. Appl. No. 12/363,393, dated May 30, 2012, 12 pages.

* cited by examiner

Note: Radio resources are selected under BCFr controlled by the same TACF that received call setup request.
According to the radio resource selection scenario, multiple FEs are involved.

Note: Radio resources are selected under BCFr controlled by the same TACF that received call setup request.
According to the radio resource selection scenario, multiple FEs are involved.

CONTINUED FROM FIG. 7
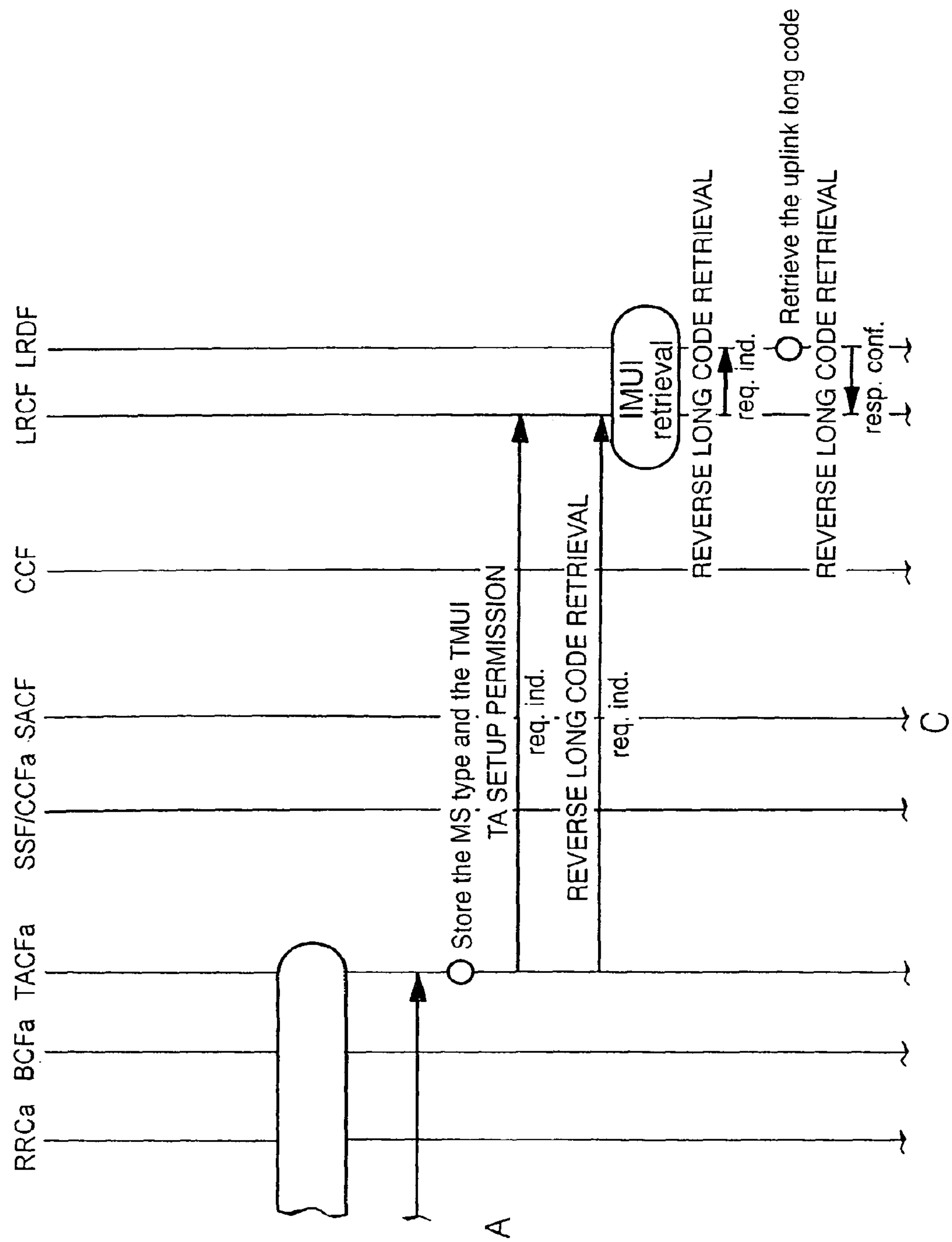

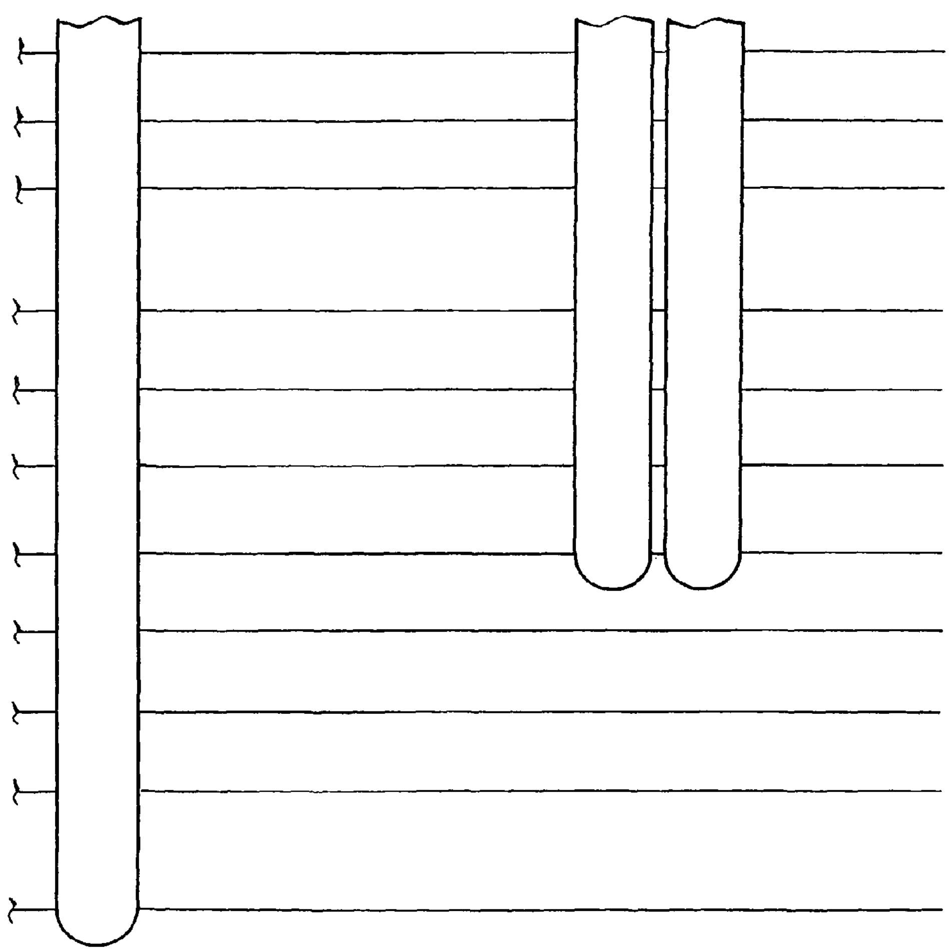
CONTINUED FROM FIG. 7
B
D

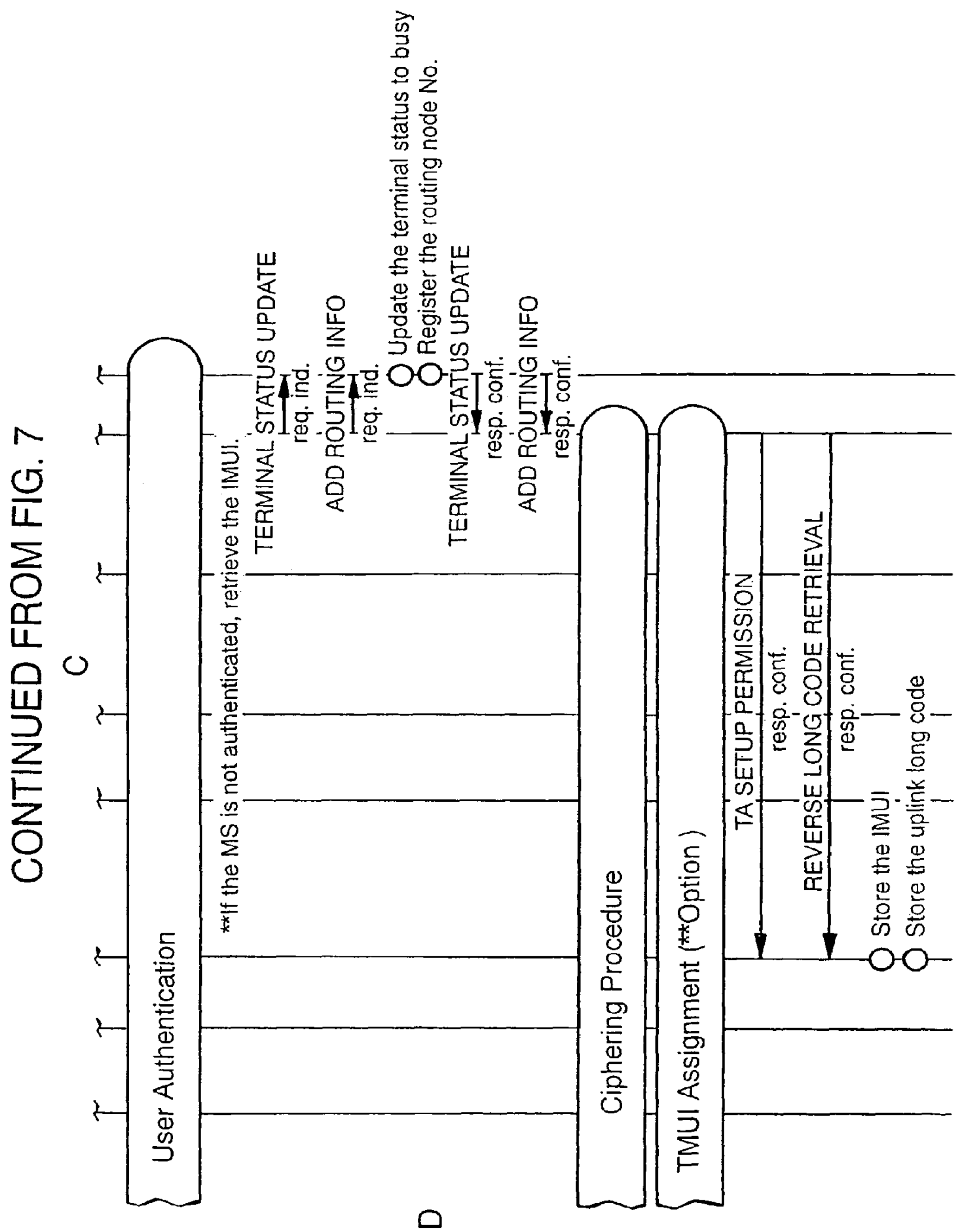
CONTINUED FROM FIG. 7
C
User Authentication
**If the MS is not authenticated, retrieve the IMUI.
TERMINAL STATUS UPDATE
req. ind.
ADD ROUTING INFO
req. ind.
Update the terminal status to busy
Register the routing node No.
TERMINAL STATUS UPDATE
resp. conf.
ADD ROUTING INFO
resp. conf.
Ciphering Procedure
TMUI Assignment (**Option)
TA SETUP PERMISSION
resp. conf.
REVERSE LONG CODE RETRIEVAL
resp. conf.
Store the IMUI
Store the uplink long code
D CONTINUED FROM FIG. 8
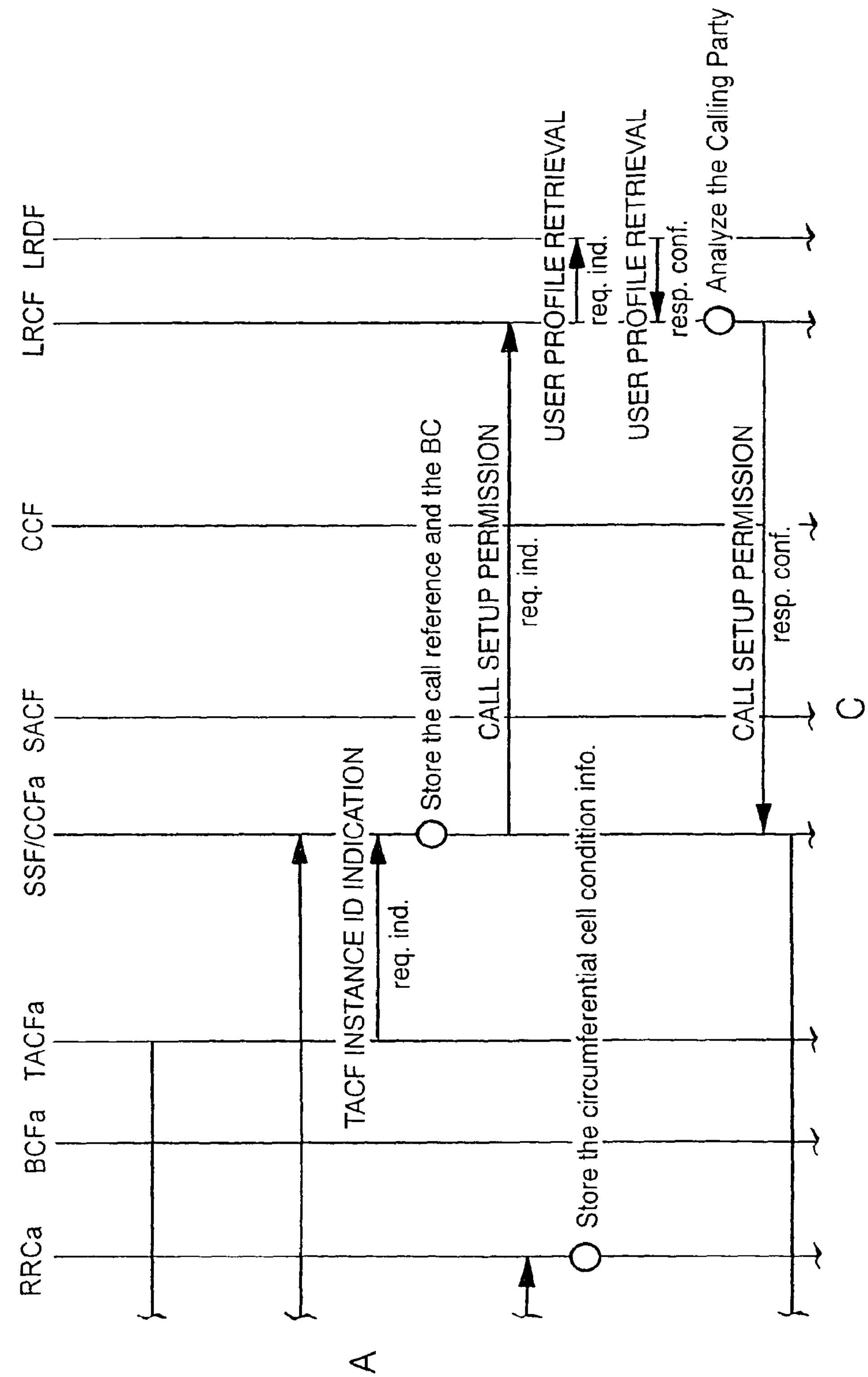

CONTINUED FROM FIG. 8
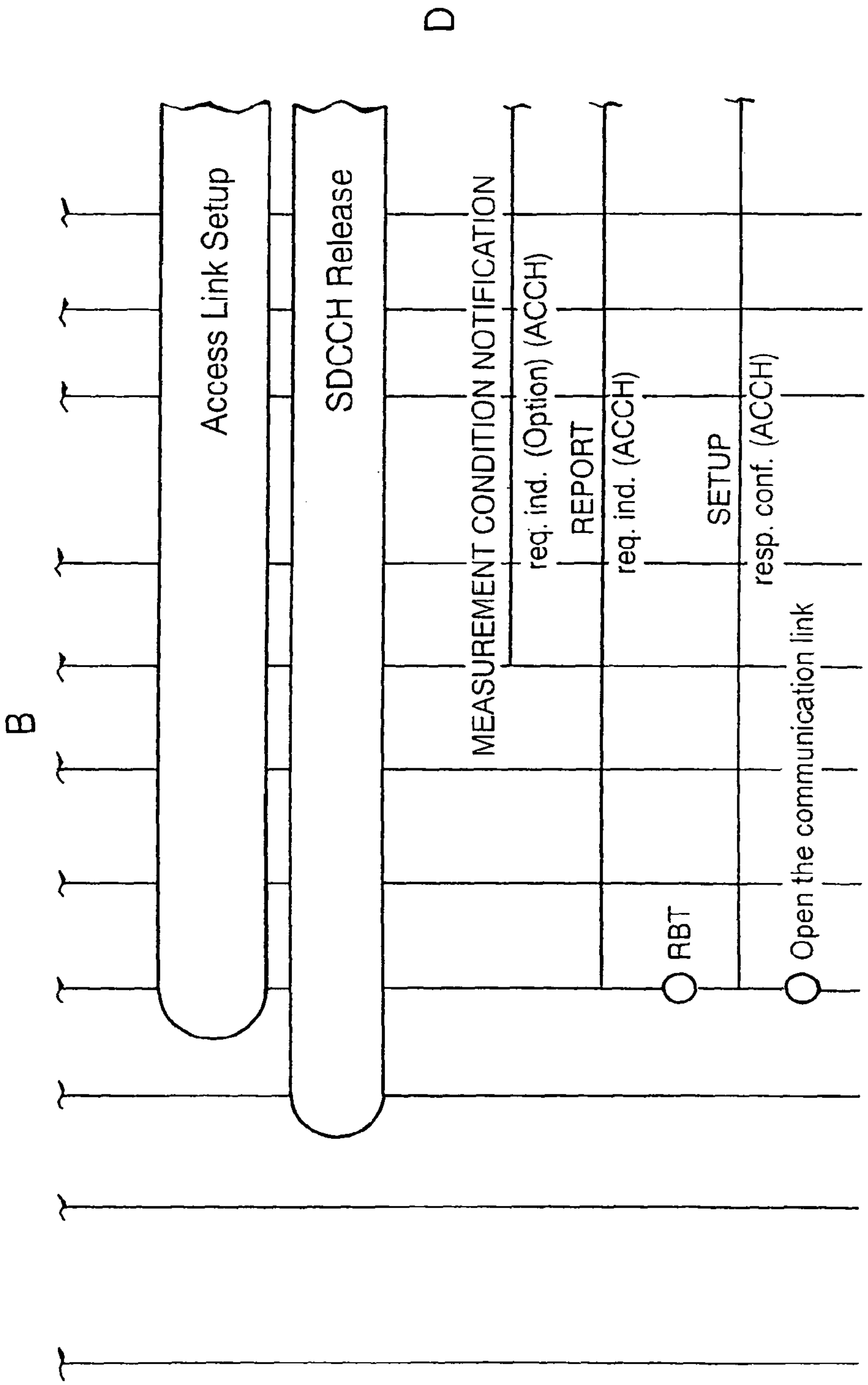

CONTINUED FROM FIG. 8
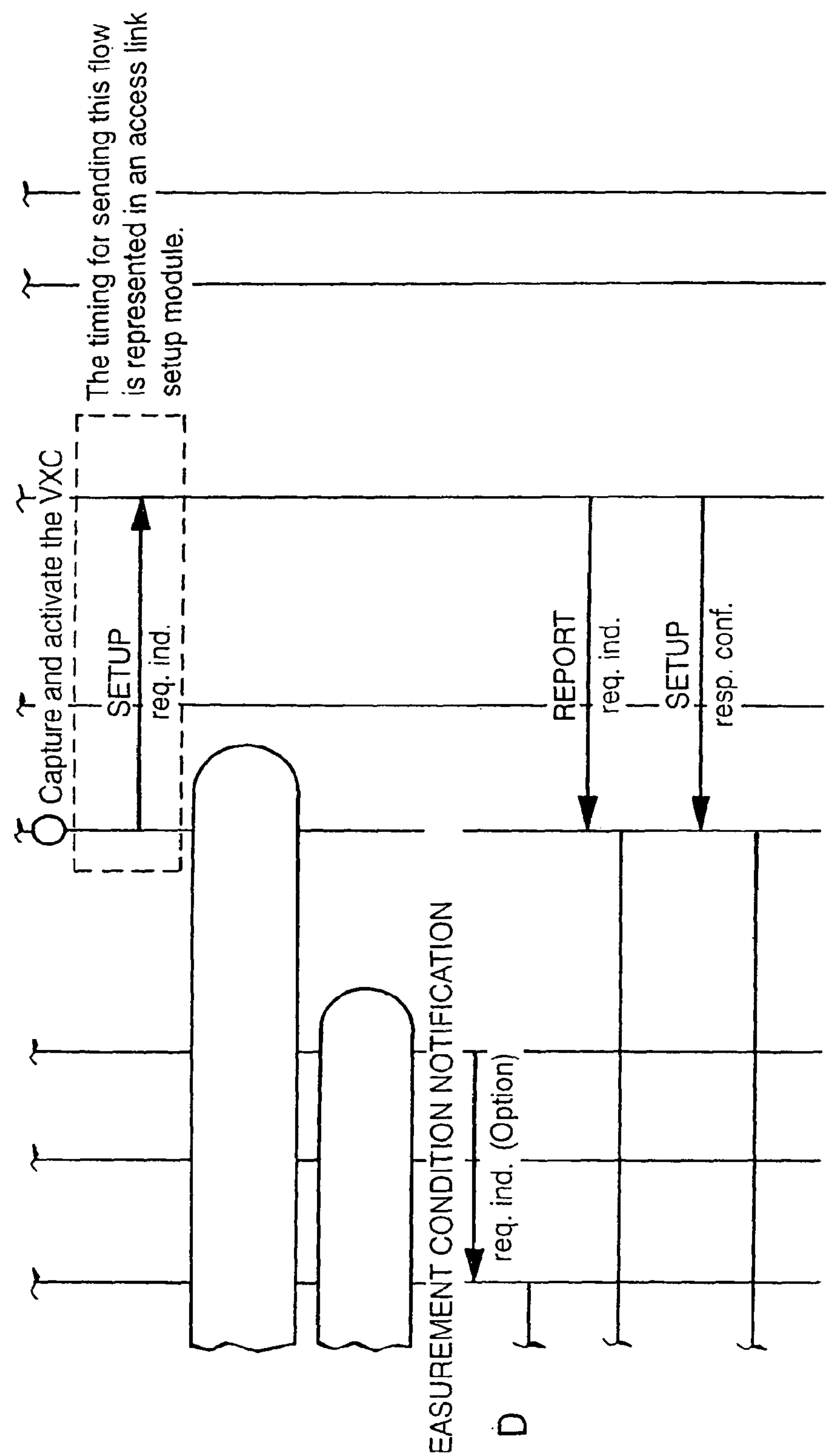

CONTINUED FROM FIG. 9
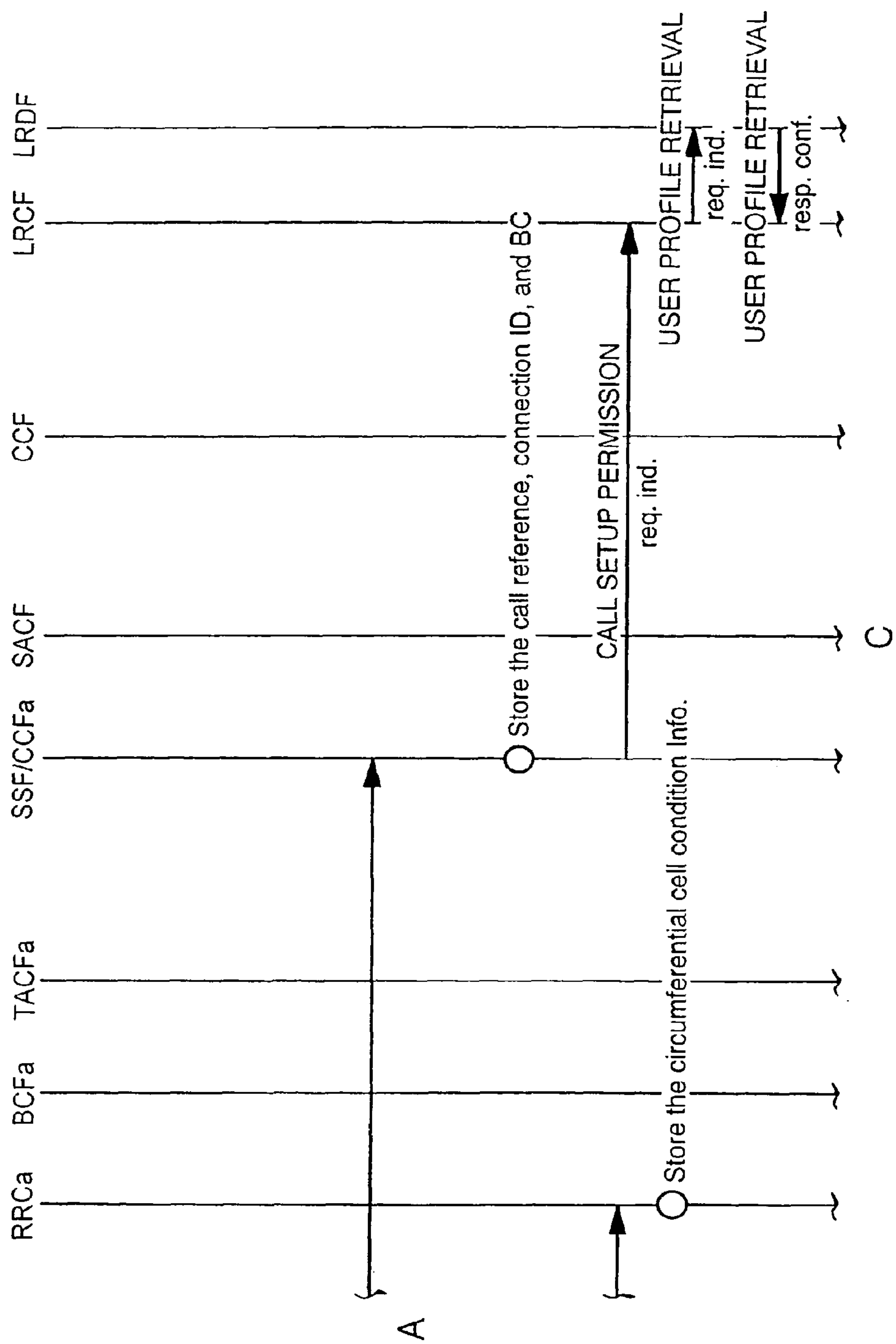

CONTINUED FROM FIG. 9
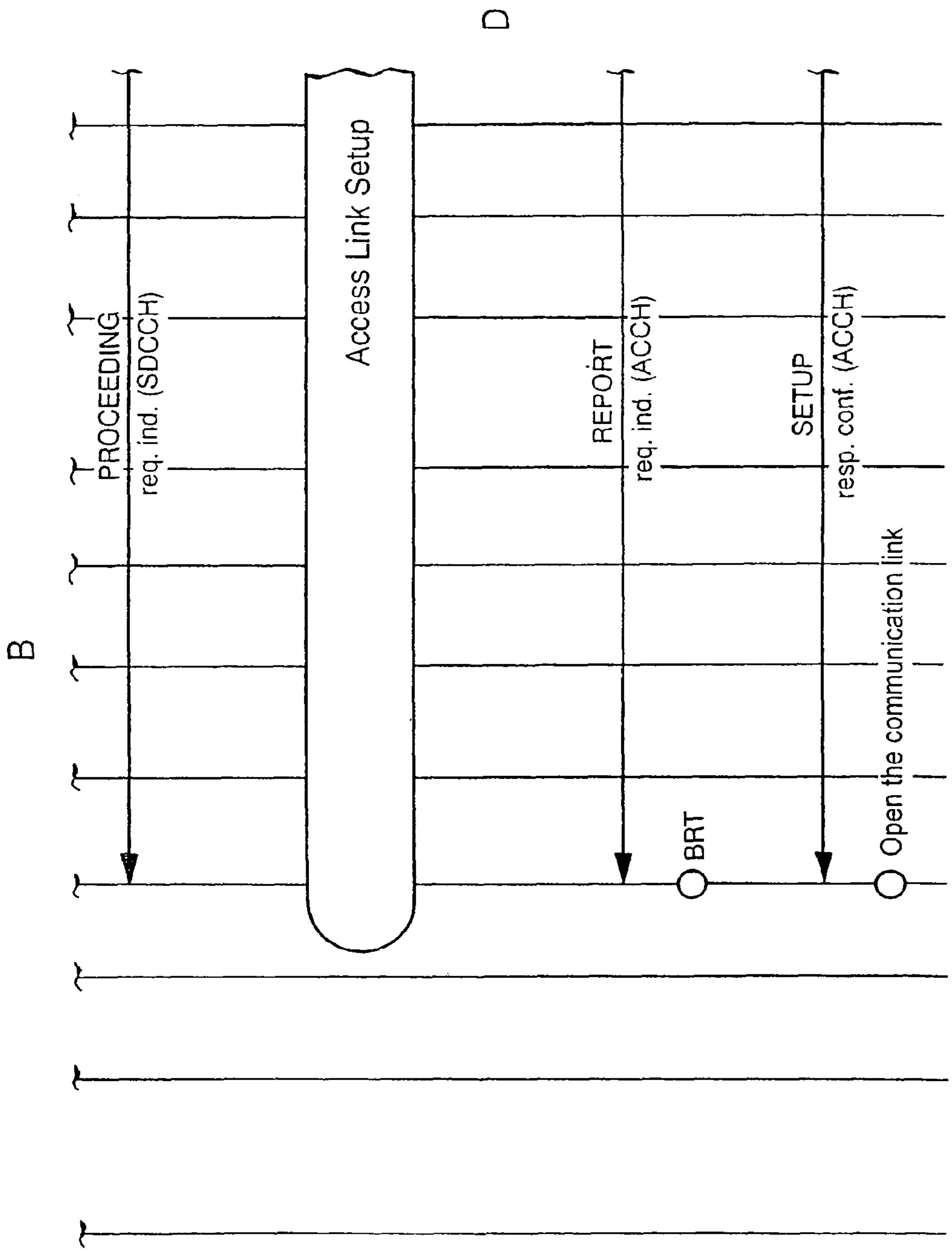

CONTINUED FROM FIG. 9
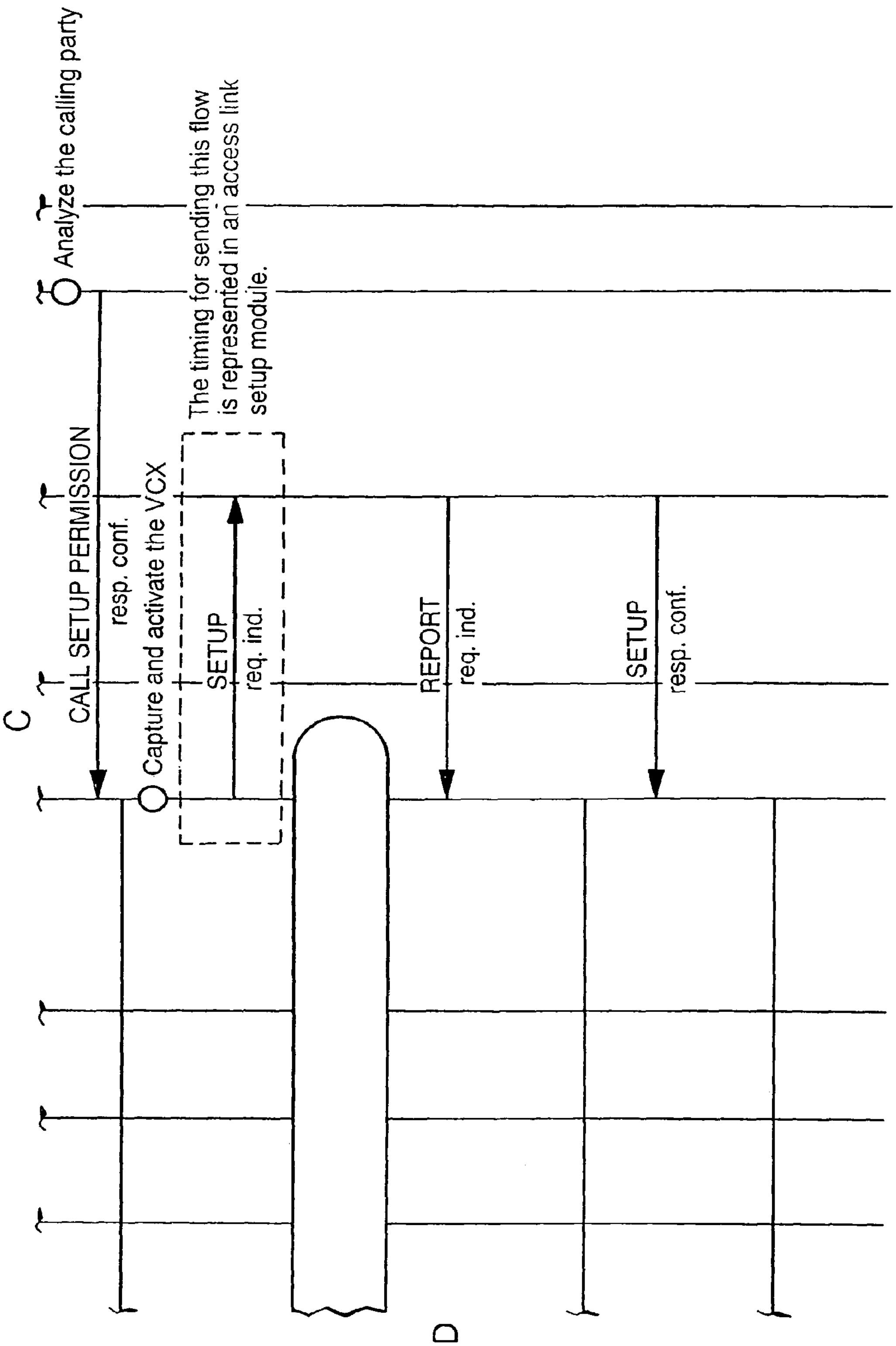

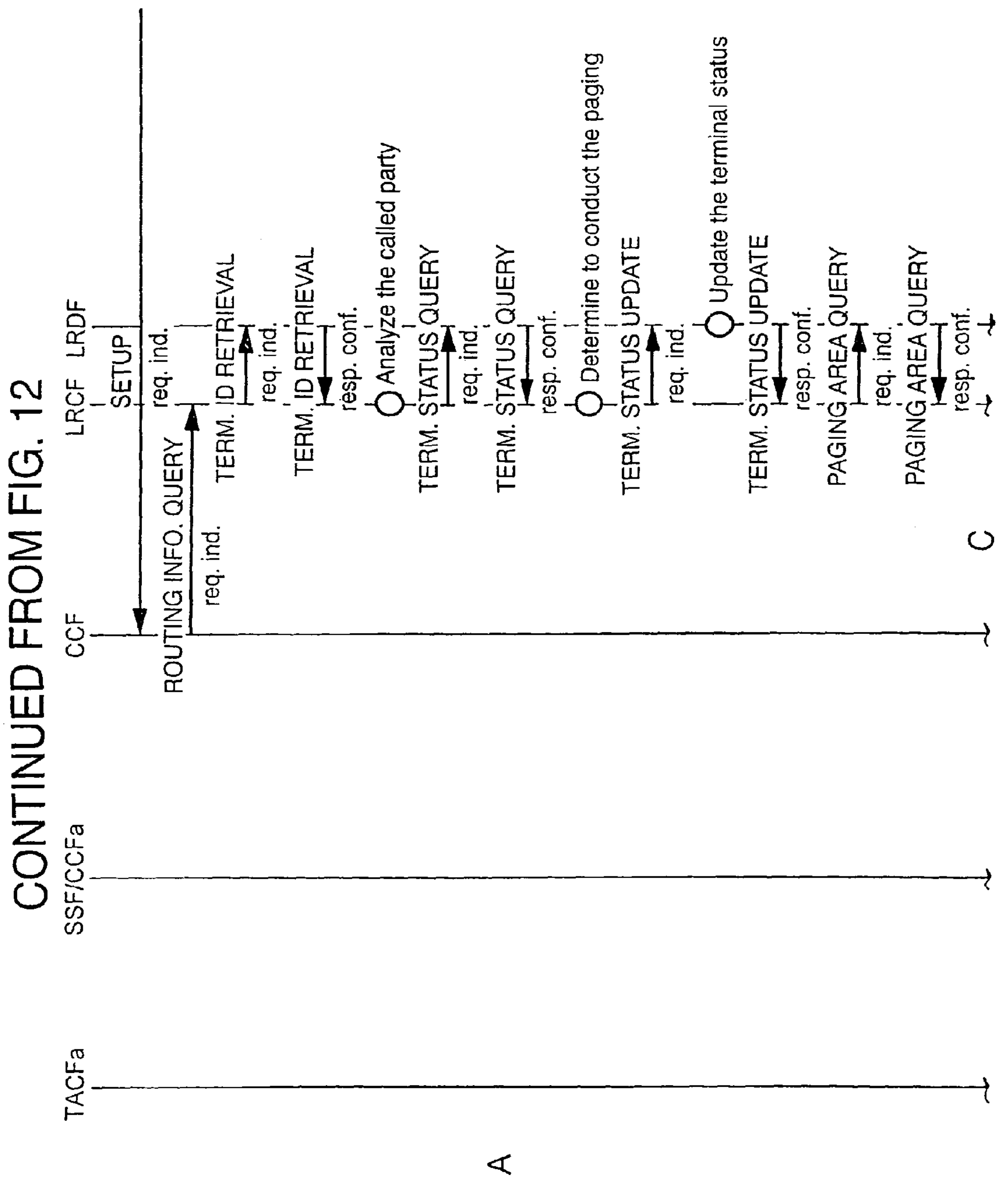
CONTINUED FROM FIG. 12
TACFa
SSF/CCFa
CCF
LRCF
LRDF
SETUP
req. ind.
ROUTING INFO. QUERY
req. ind.
TERM. ID RETRIEVAL
req. ind.
TERM. ID RETRIEVAL
resp. conf.
Analyze the called party
TERM. STATUS QUERY
req. ind.
TERM. STATUS QUERY
resp. conf.
Determine to conduct the paging
TERM. STATUS UPDATE
req. ind.
Update the terminal status
TERM. STATUS UPDATE
resp. conf.
PAGING AREA QUERY
req. ind.
PAGING AREA QUERY
resp. conf.
C
A

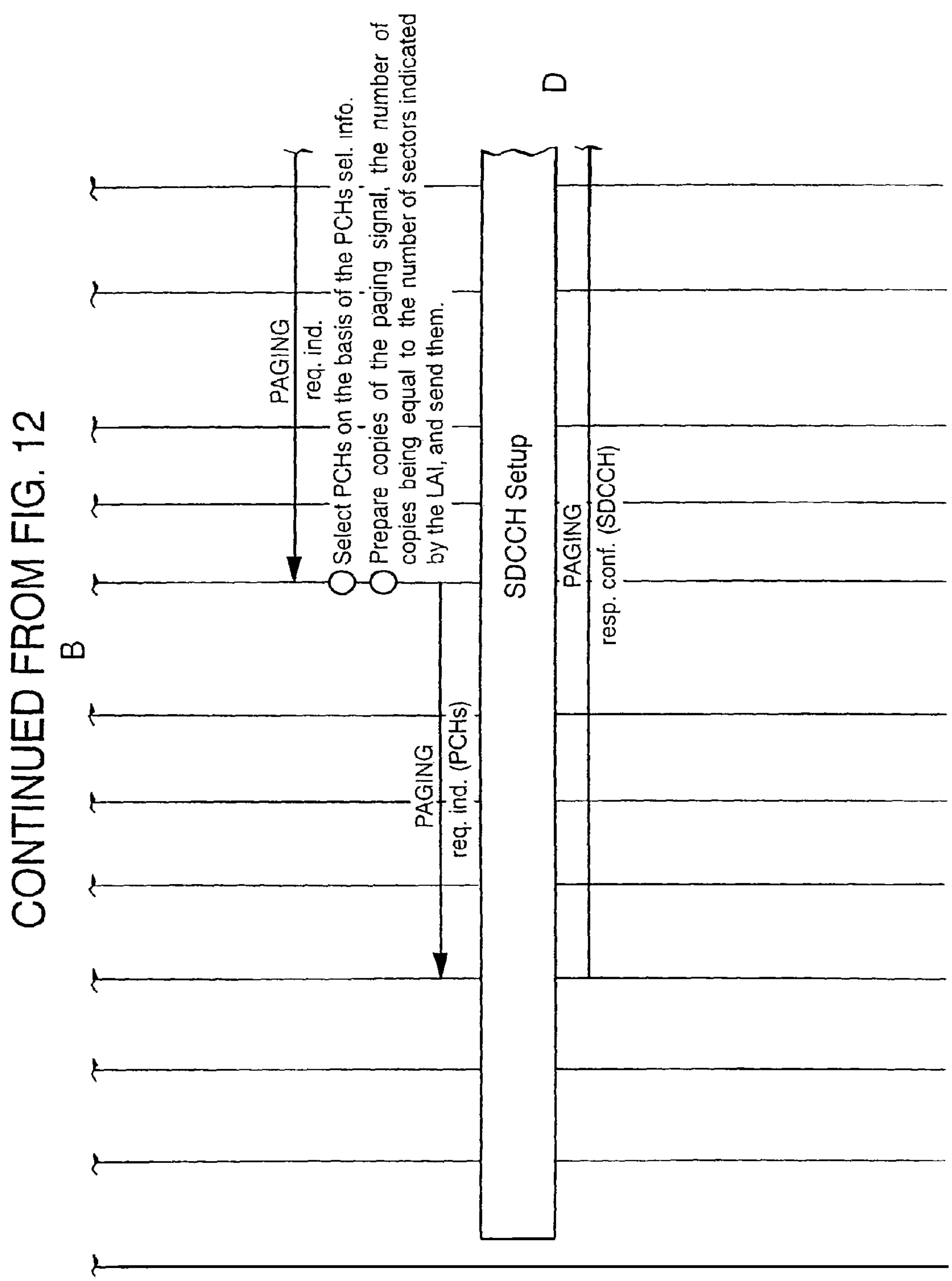
CONTINUED FROM FIG. 12
B
D
PAGING
req. ind.
Select PCHs on the basis of the PCHs sel. info.
Prepare copies of the paging signal, the number of copies being equal to the number of sectors indicated by the LAI, and send them.
SDCCH Setup
PAGING
resp. conf. (SDCCH)
PAGING
req. ind. (PCHs)

CONTINUED FROM FIG. 12
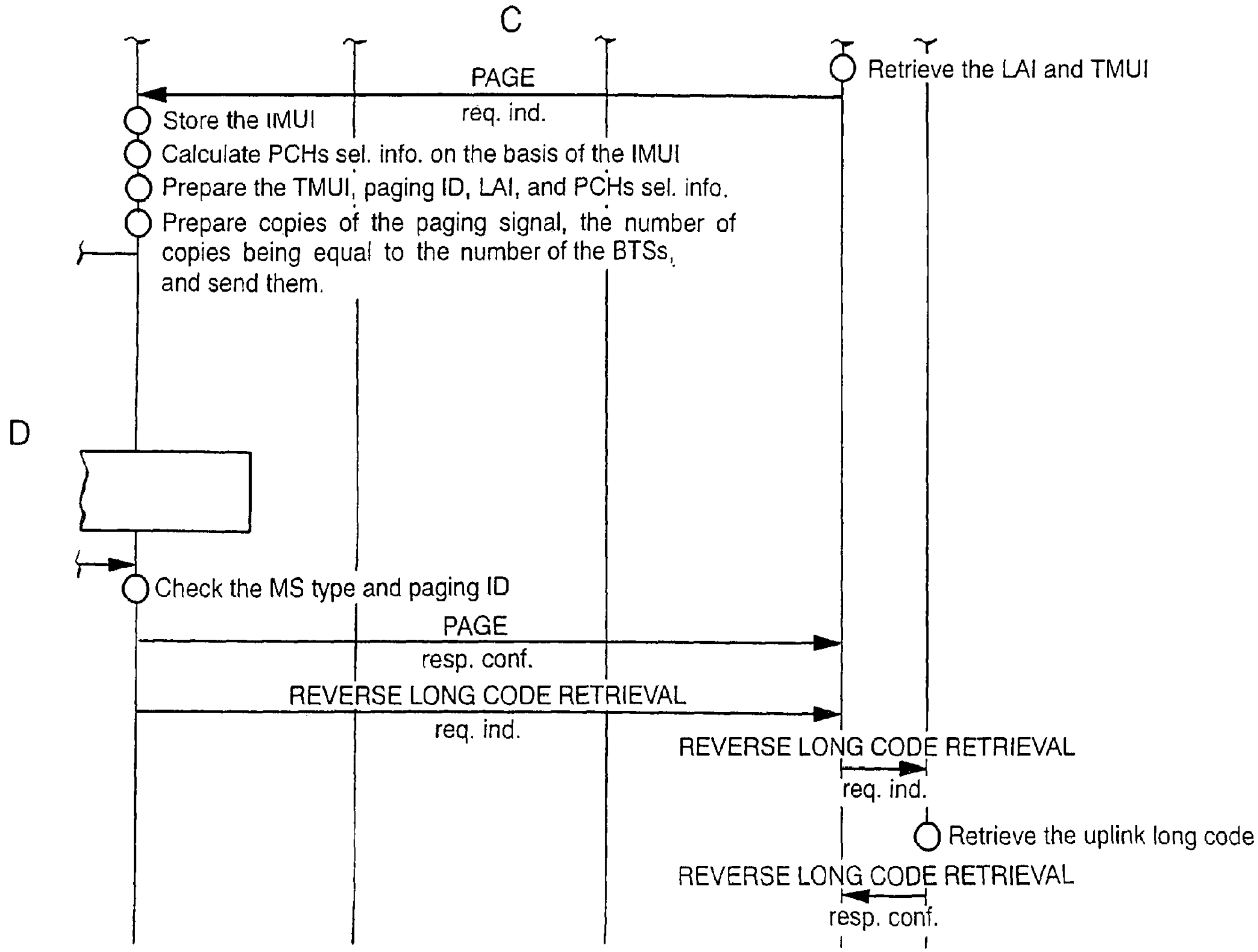

CONTINUED FROM FIG. 13
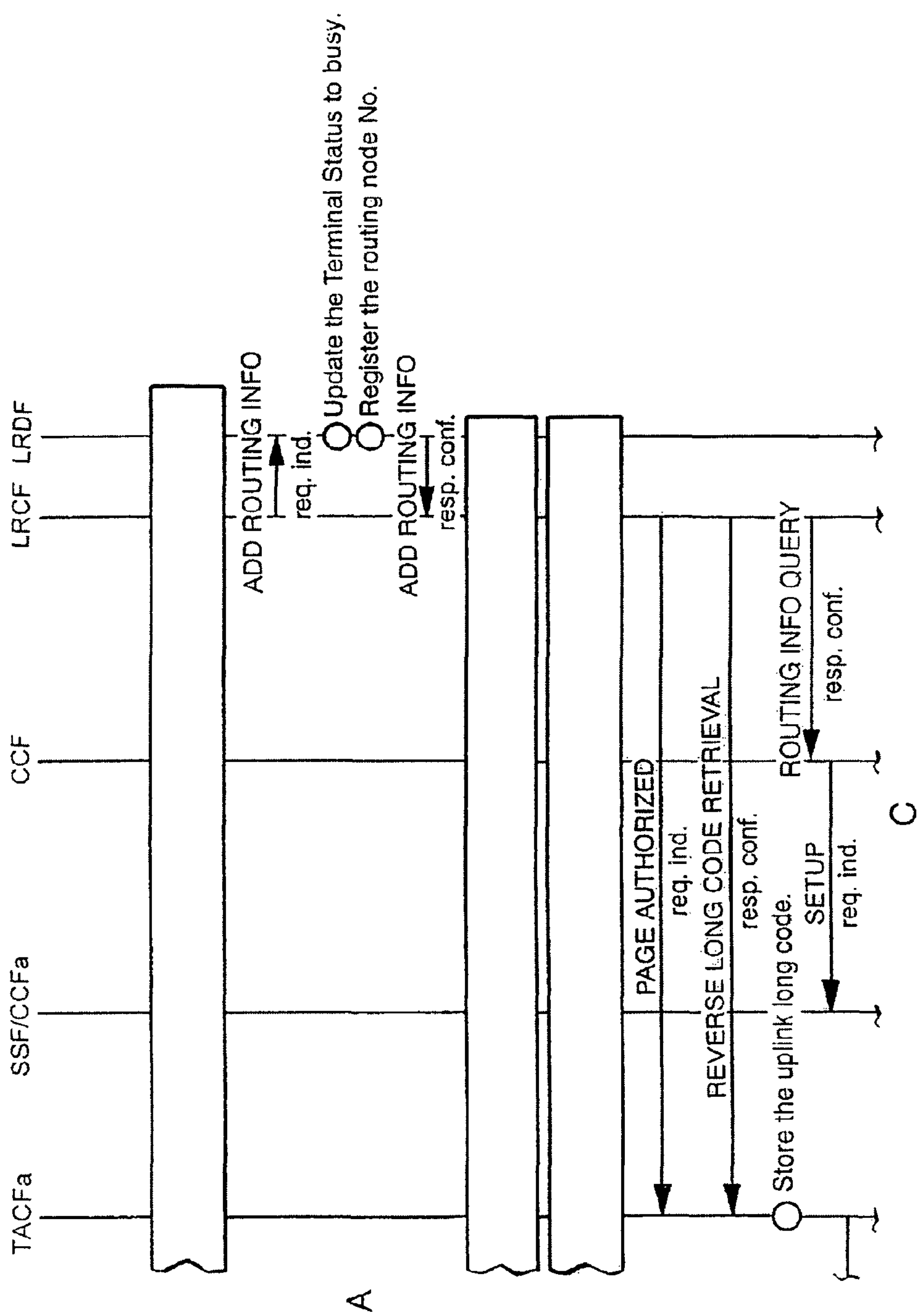

CONTINUED FROM FIG. 13
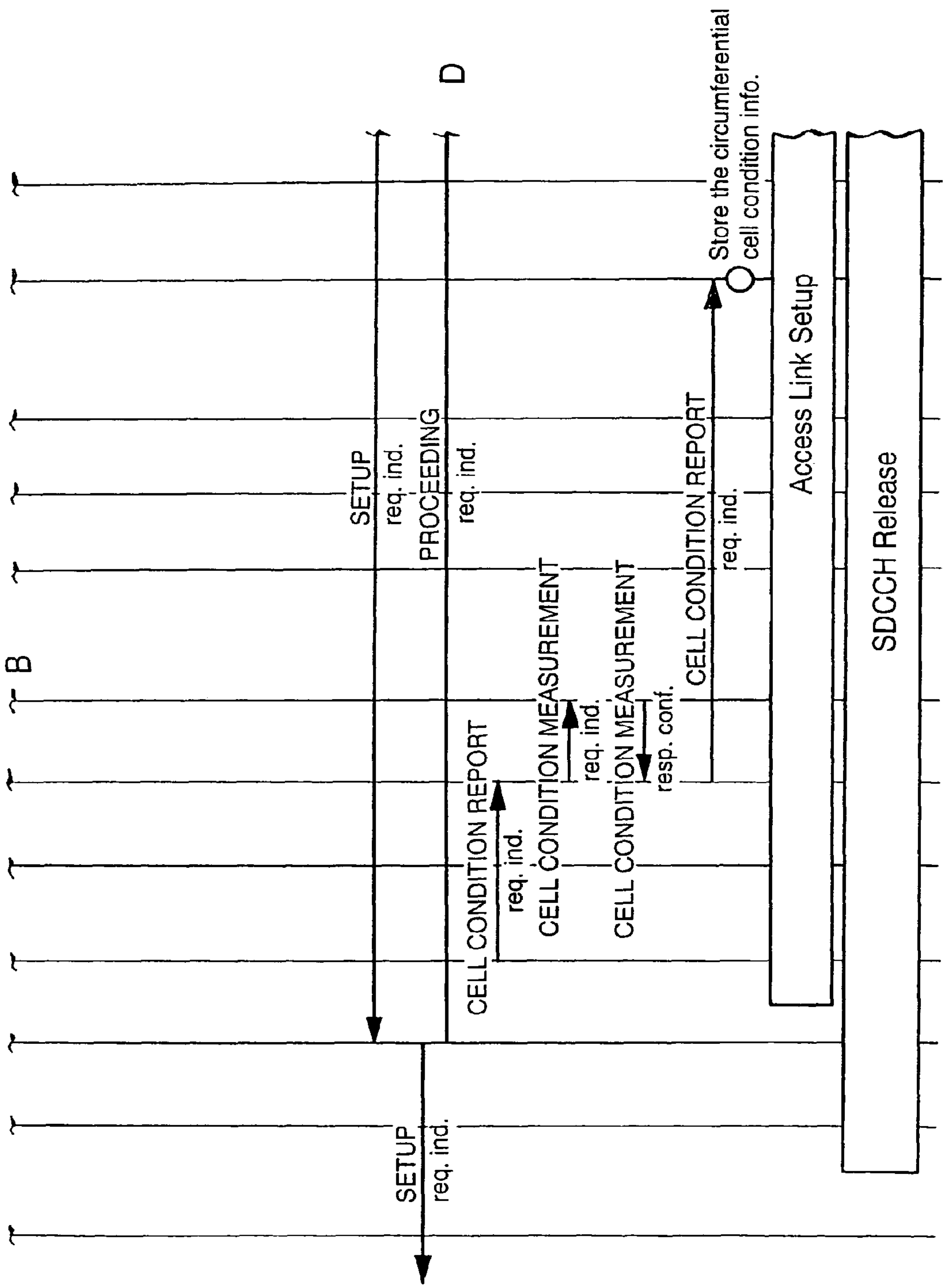

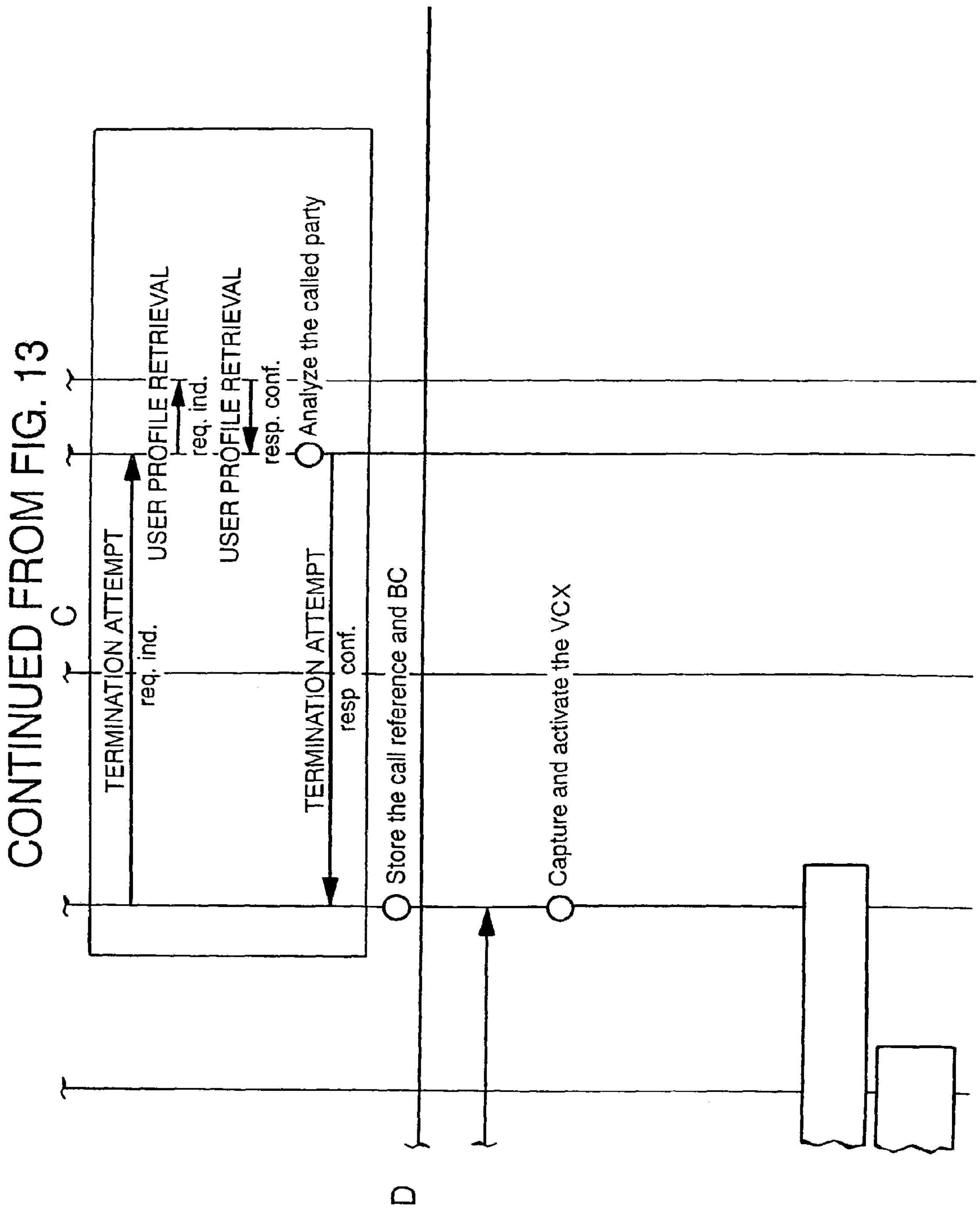
CONTINUED FROM FIG. 13
C
TERMINATION ATTEMPT
req. ind.
USER PROFILE RETRIEVAL
req. ind.
USER PROFILE RETRIEVAL
resp. conf.
Analyze the called party
TERMINATION ATTEMPT
resp conf.
Store the call reference and BC
Capture and activate the VCX
D CONTINUED FROM FIG. 14
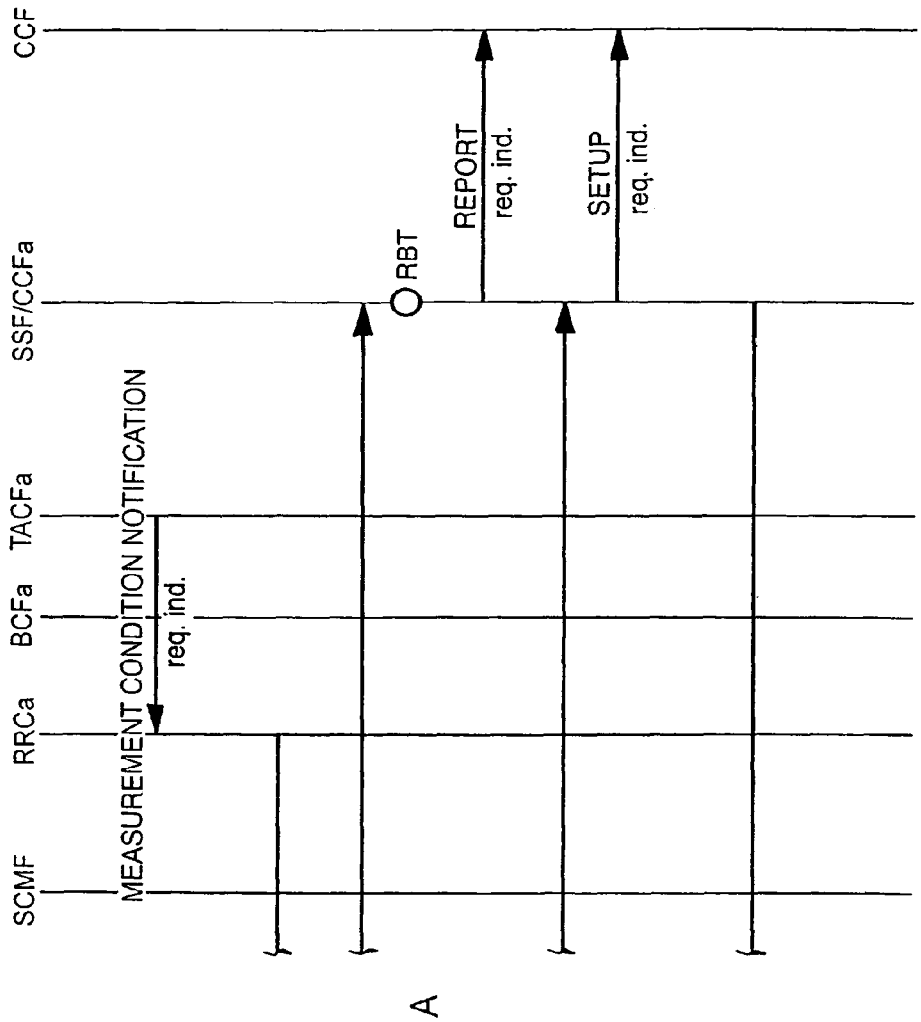

CONTINUED FROM FIG. 15
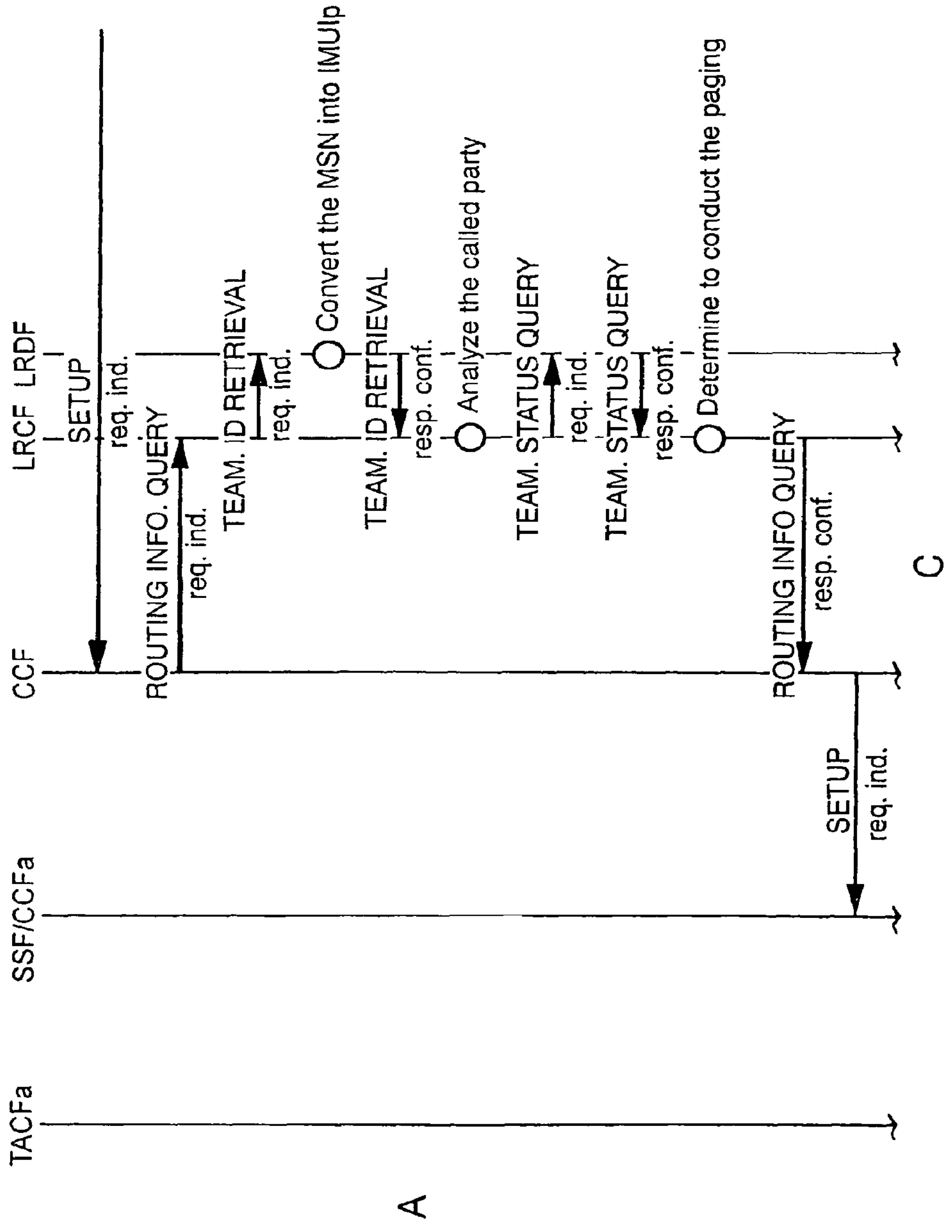

CONTINUED FROM FIG. 15
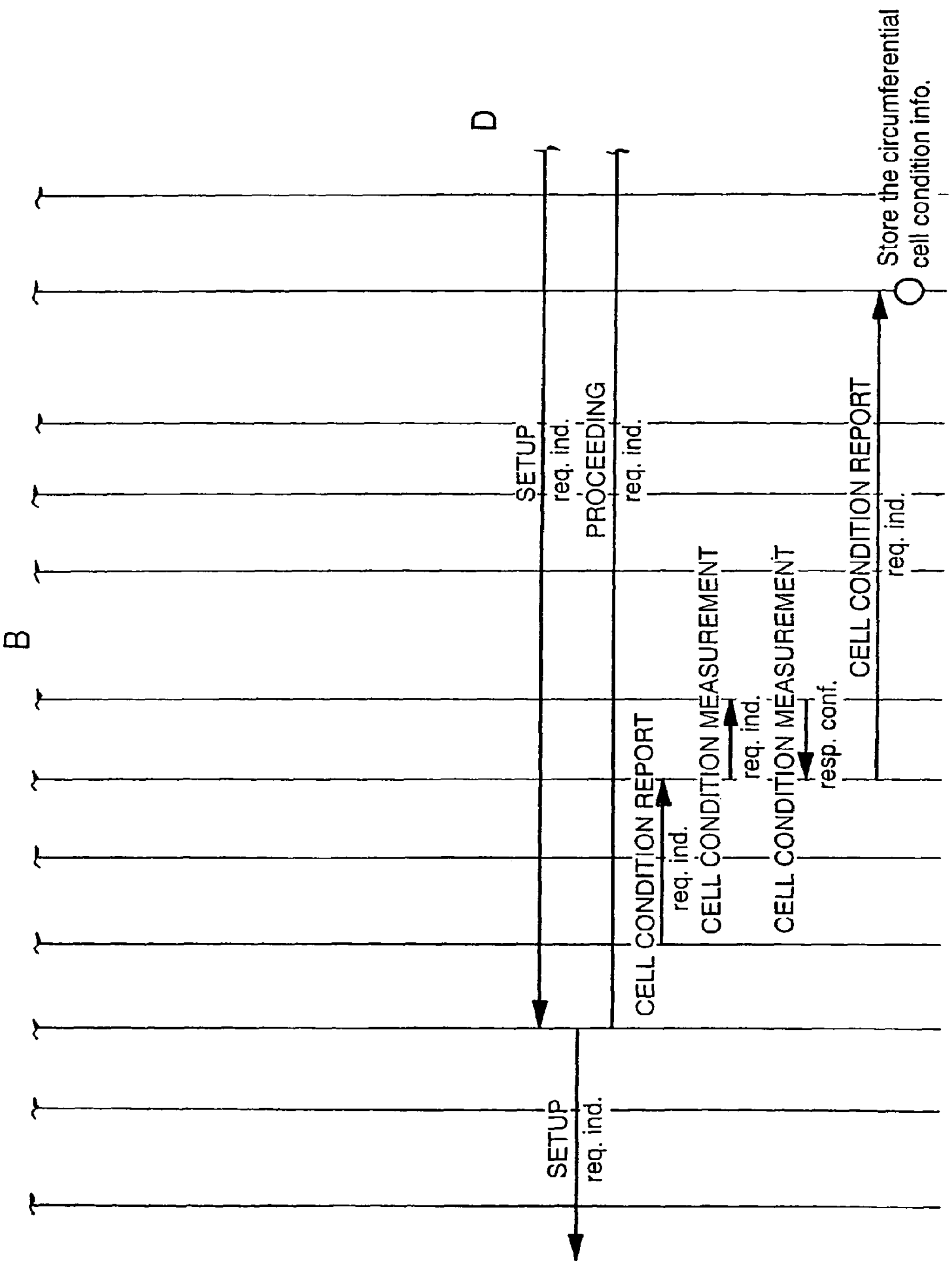

CONTINUED FROM FIG. 15
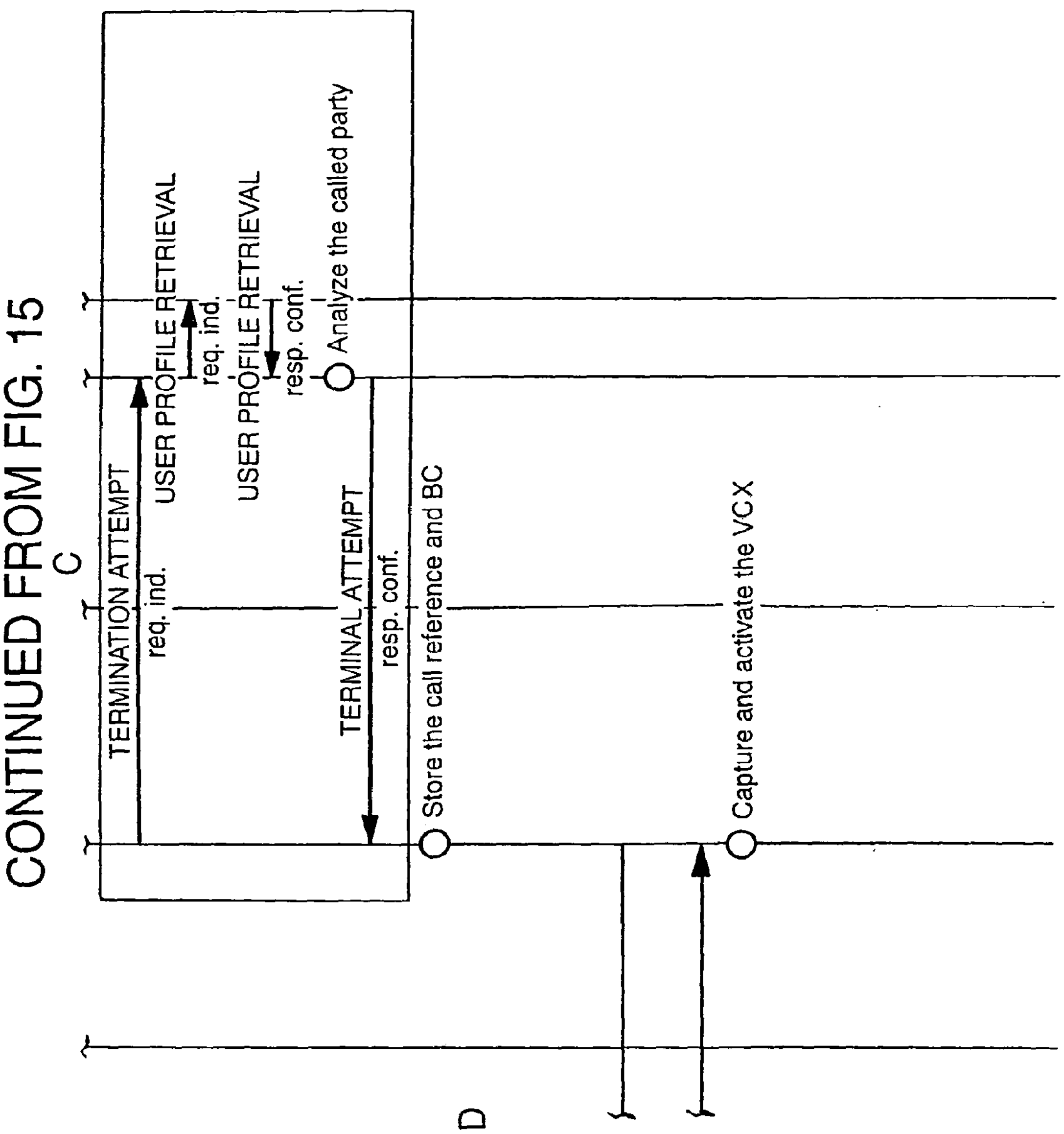

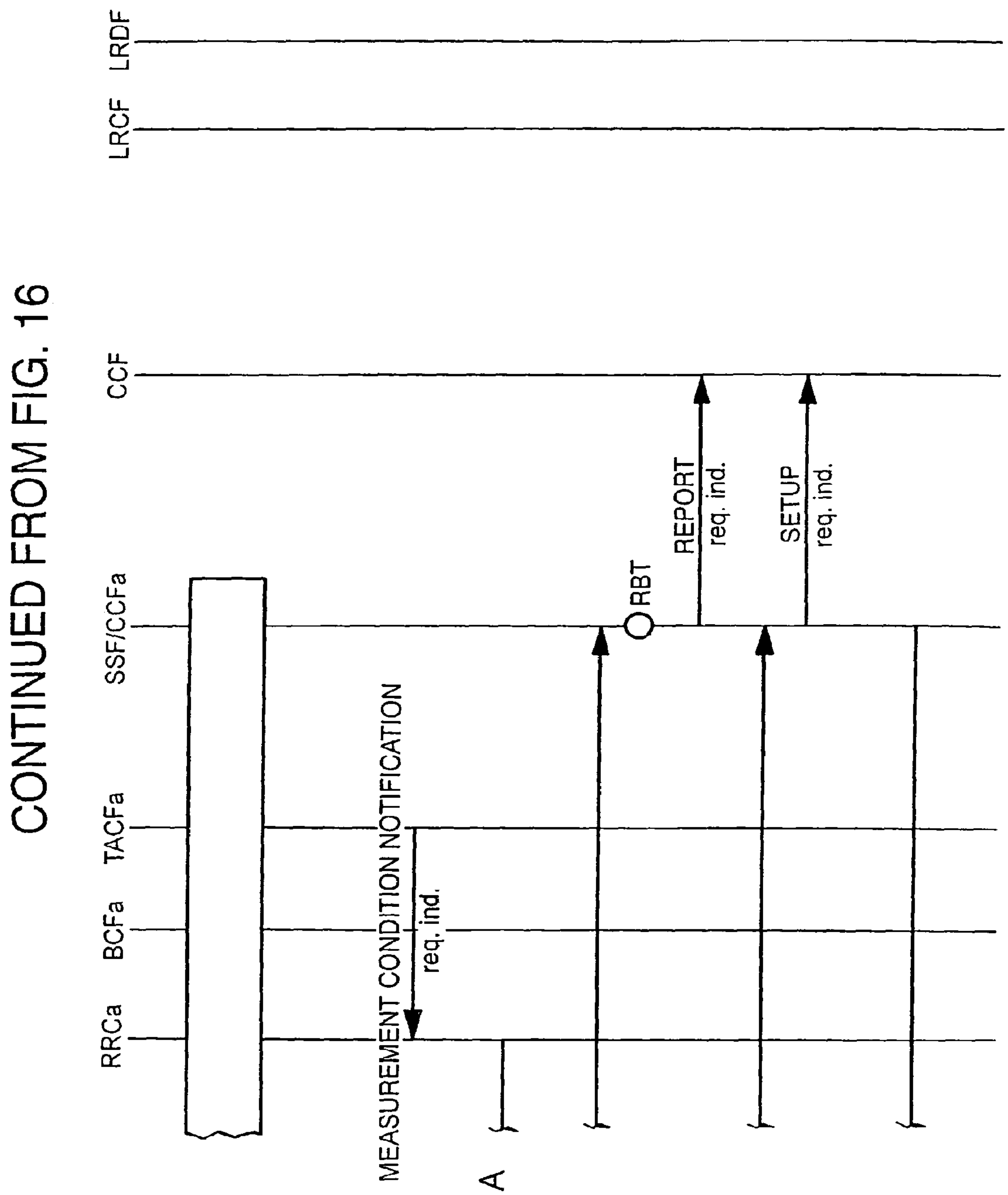
CONTINUED FROM FIG. 16
LRDF
LRCF
CCF
SSF/CCFa
TACFa
BCFa
RRCa
MEASUREMENT CONDITION NOTIFICATION
req. ind.
RBT
REPORT
req. ind.
SETUP
req. ind.
A CONTINUED FROM FIG. 22
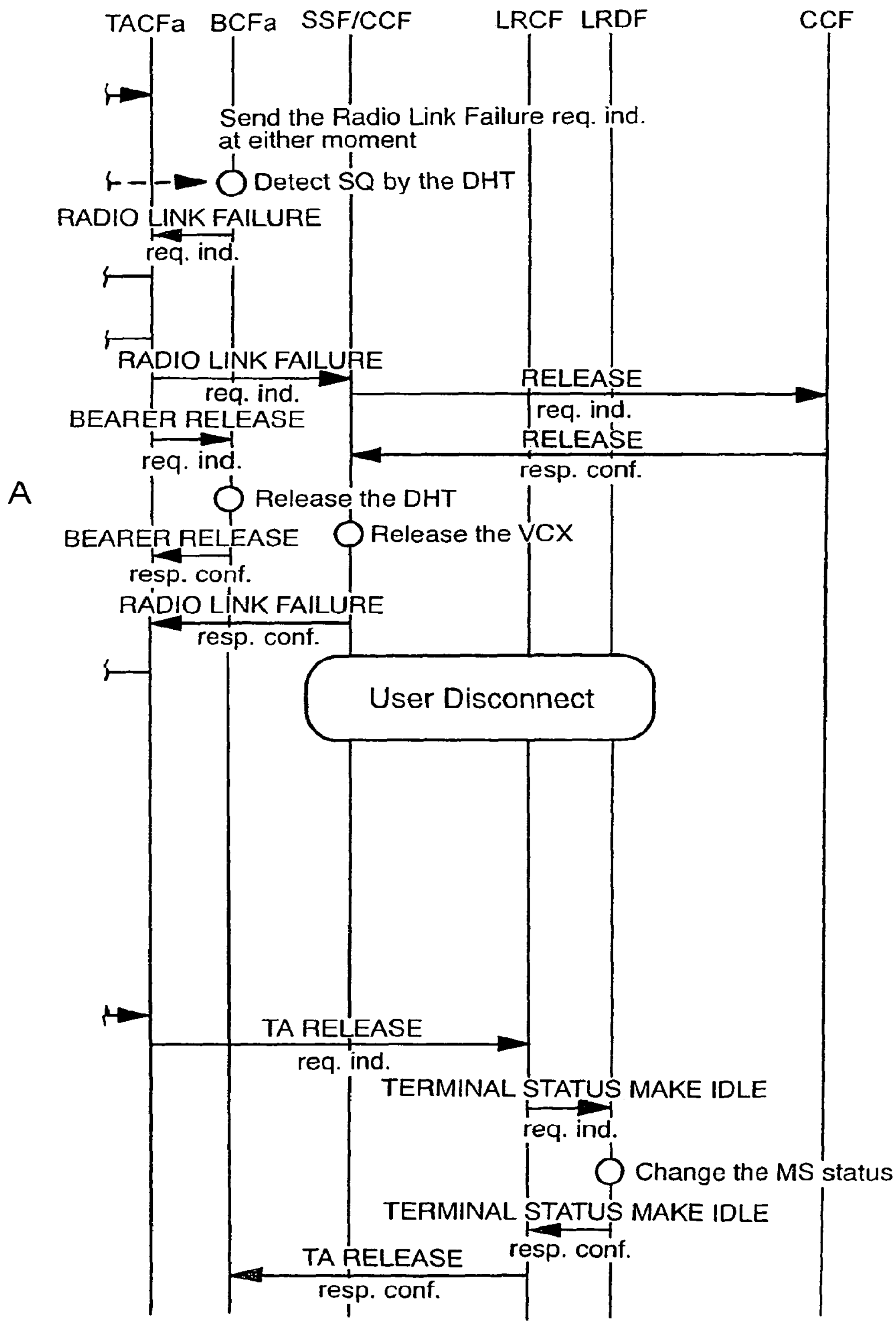

CONTINUED FROM FIG. 24
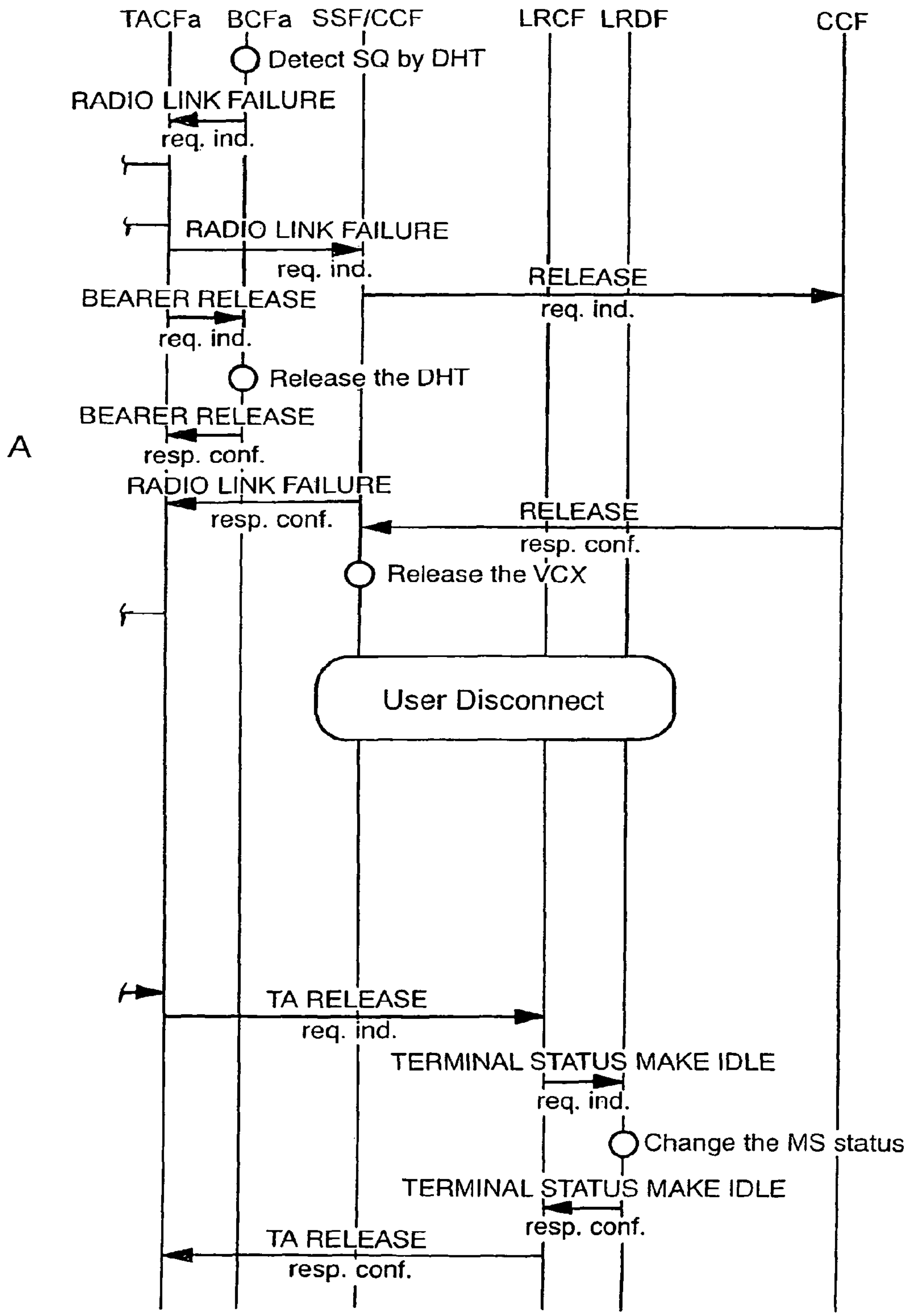

CONTINUED FROM FIG. 28
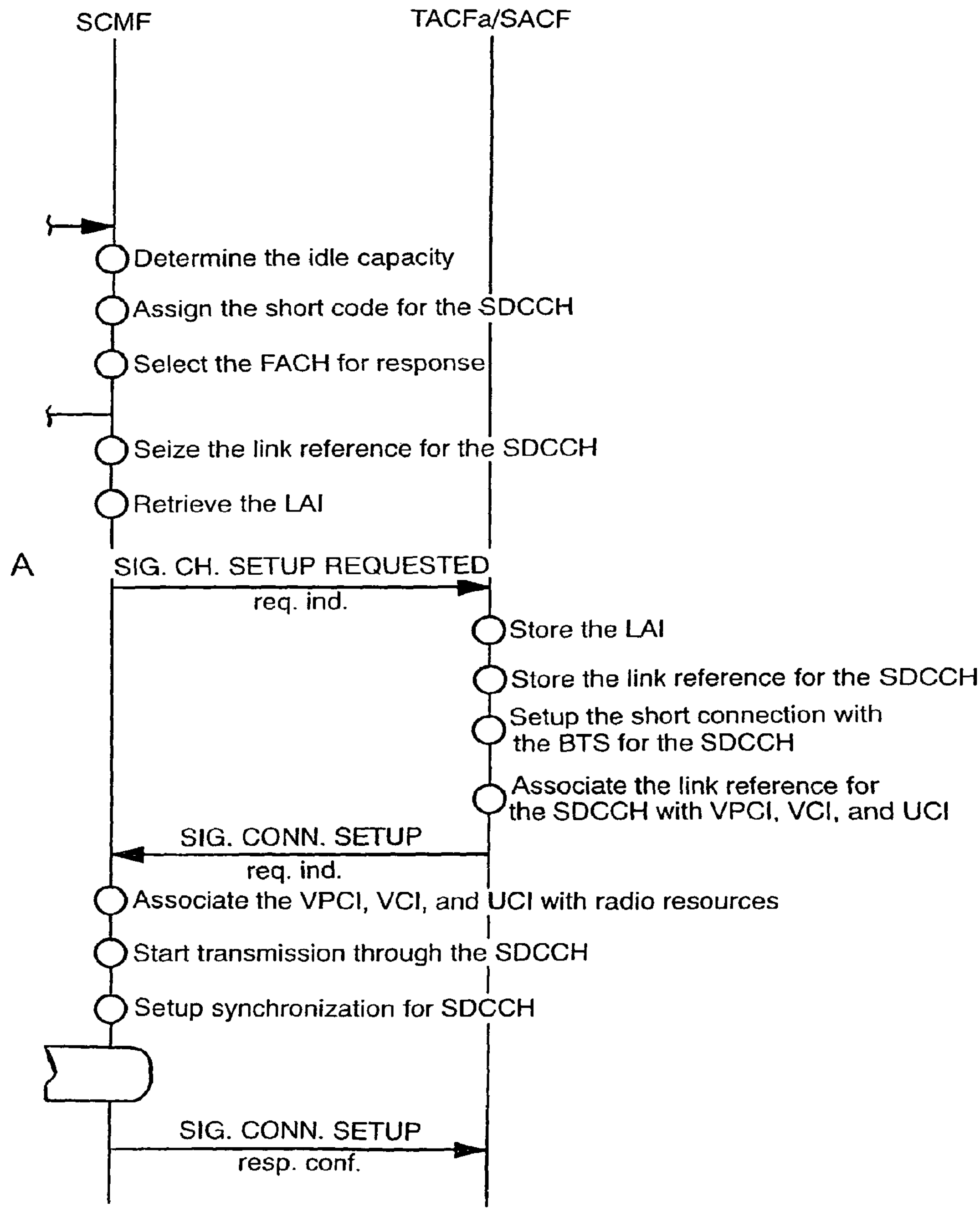

Note: Radio resources are selected under a BCFr controlled by a TACF which is different from that which received the call setup request (but which is under the control of a single CCF)

CONTINUED FROM FIG. 30
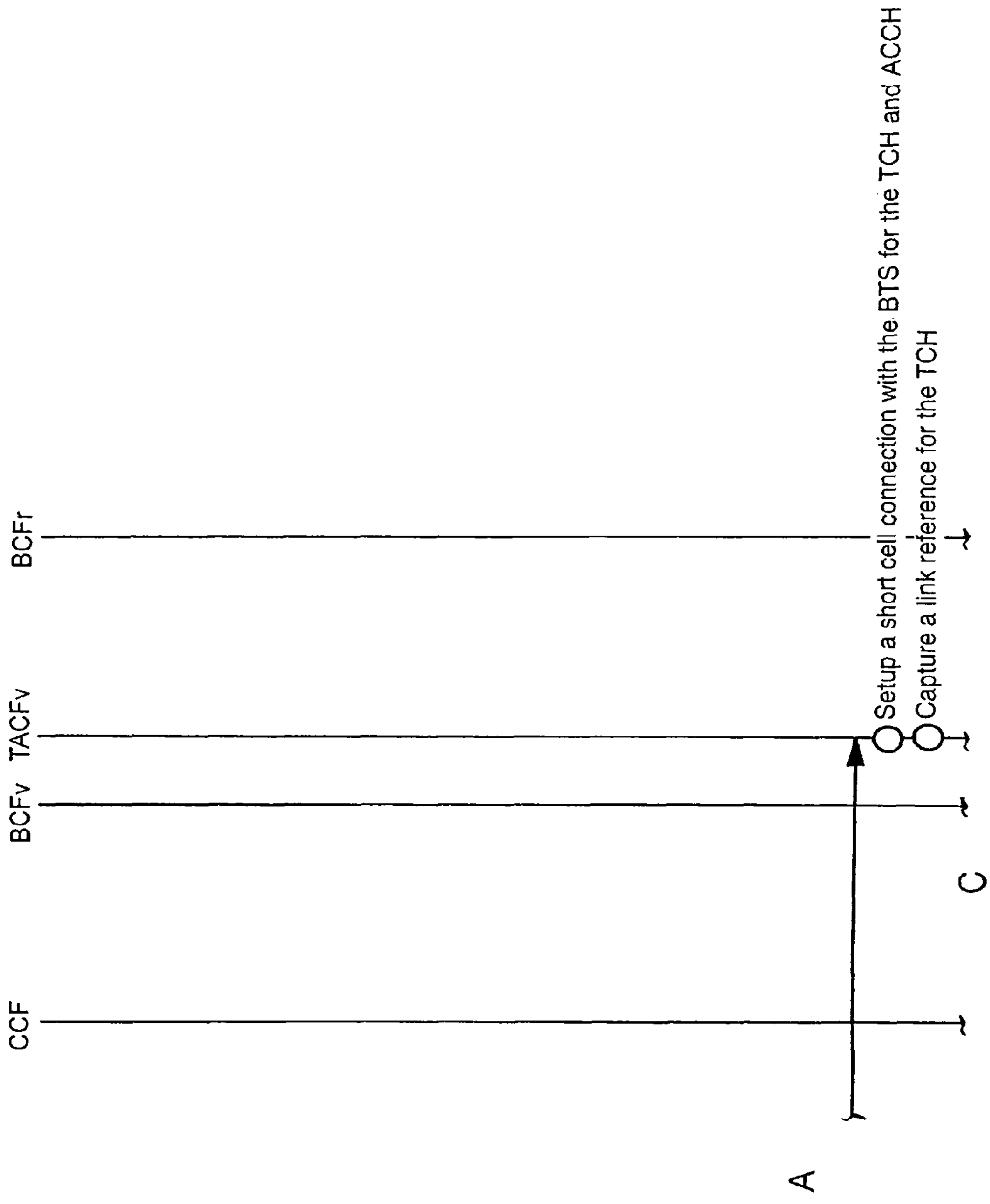

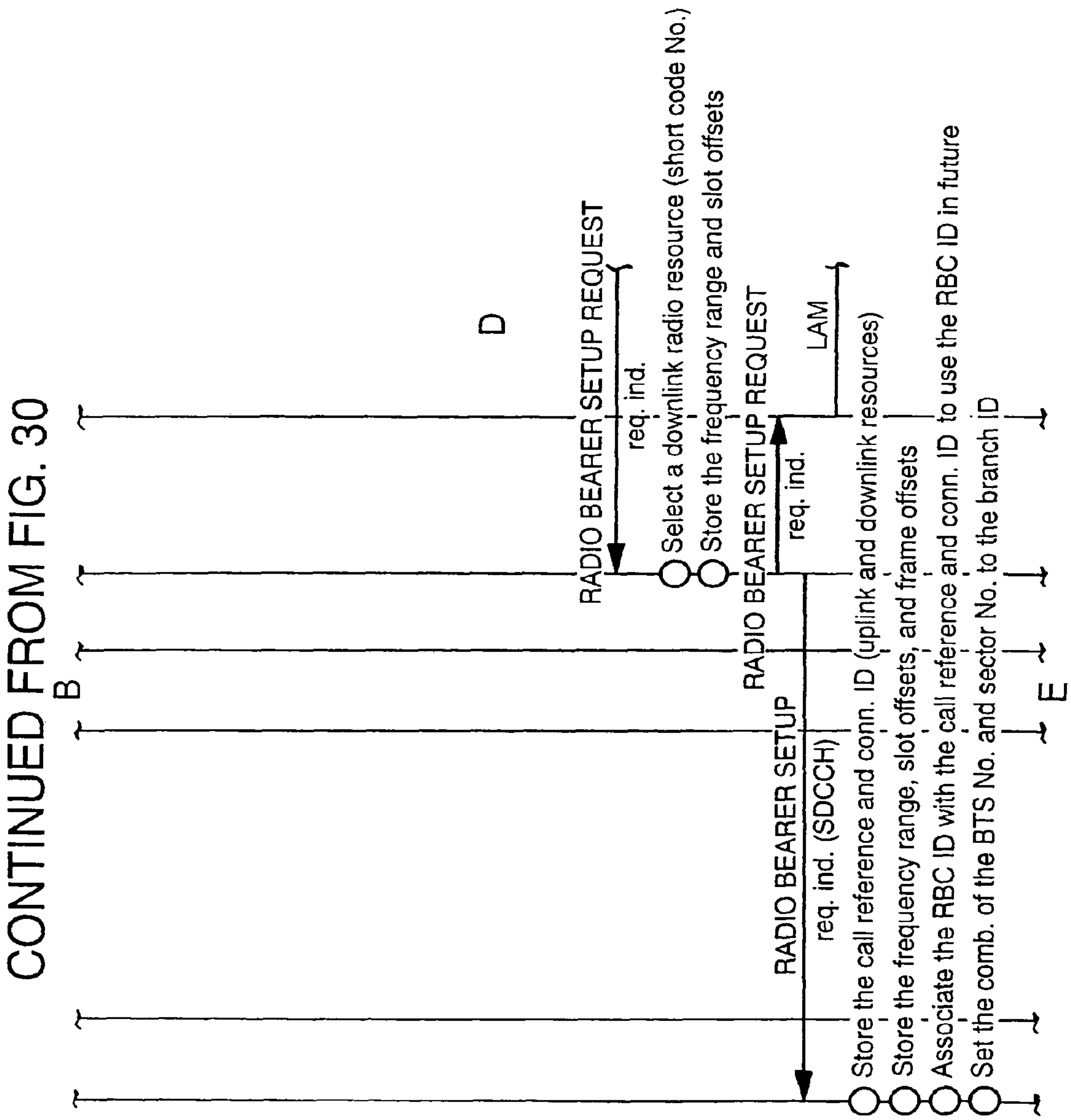
CONTINUED FROM FIG. 30
B
D
E
RADIO BEARER SETUP REQUEST
req. ind.
Select a downlink radio resource (short code No.)
Store the frequency range and slot offsets
RADIO BEARER SETUP REQUEST
req. ind.
LAM
RADIO BEARER SETUP
req. ind. (SDCCH)
Store the call reference and conn. ID (uplink and downlink resources)
Store the frequency range, slot offsets, and frame offsets
Associate the RBC ID with the call reference and conn. ID to use the RBC ID in future
Set the comb. of the BTS No. and sector No. to the branch ID CONTINUED FROM FIG. 30
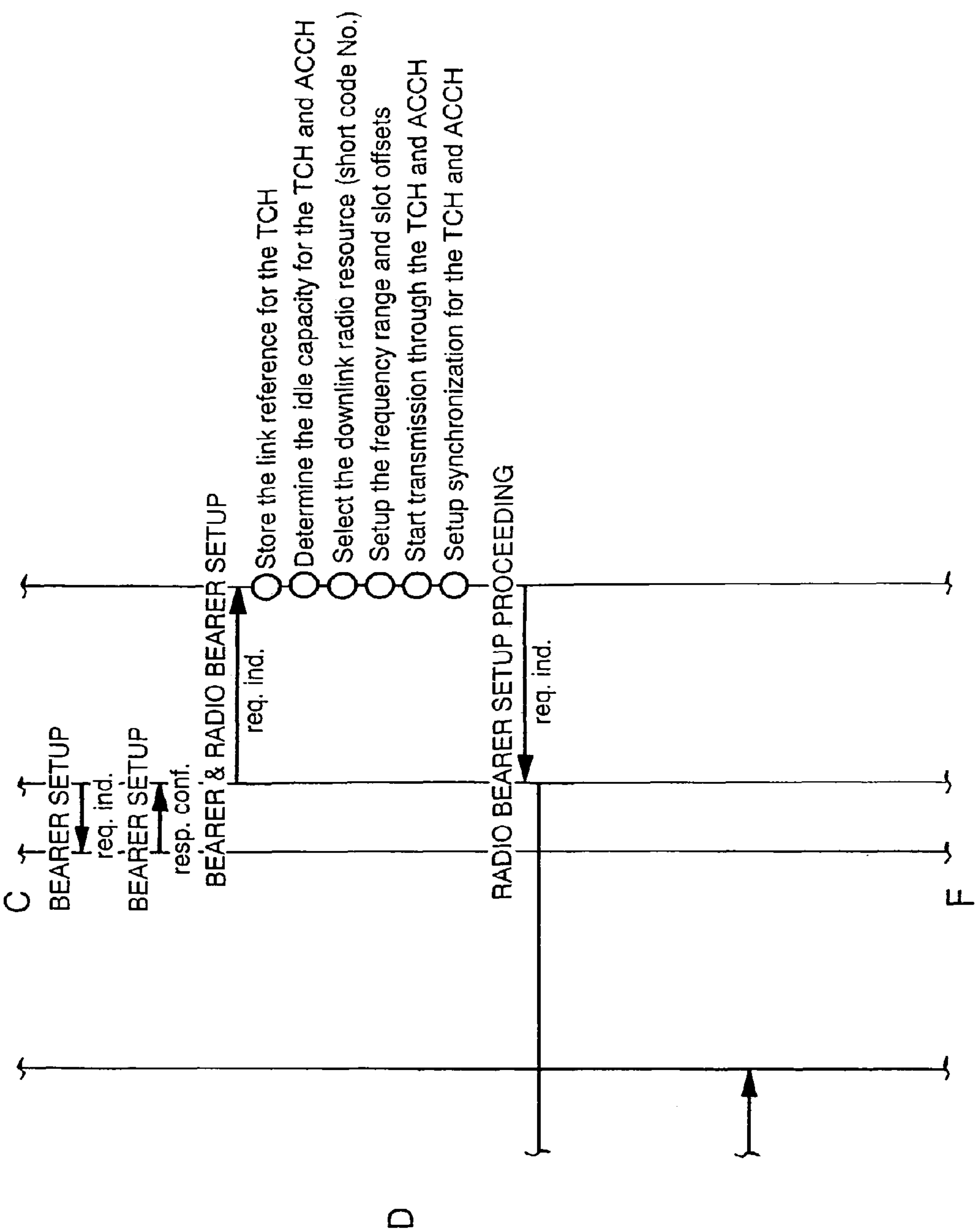

CONTINUED FROM FIG. 30
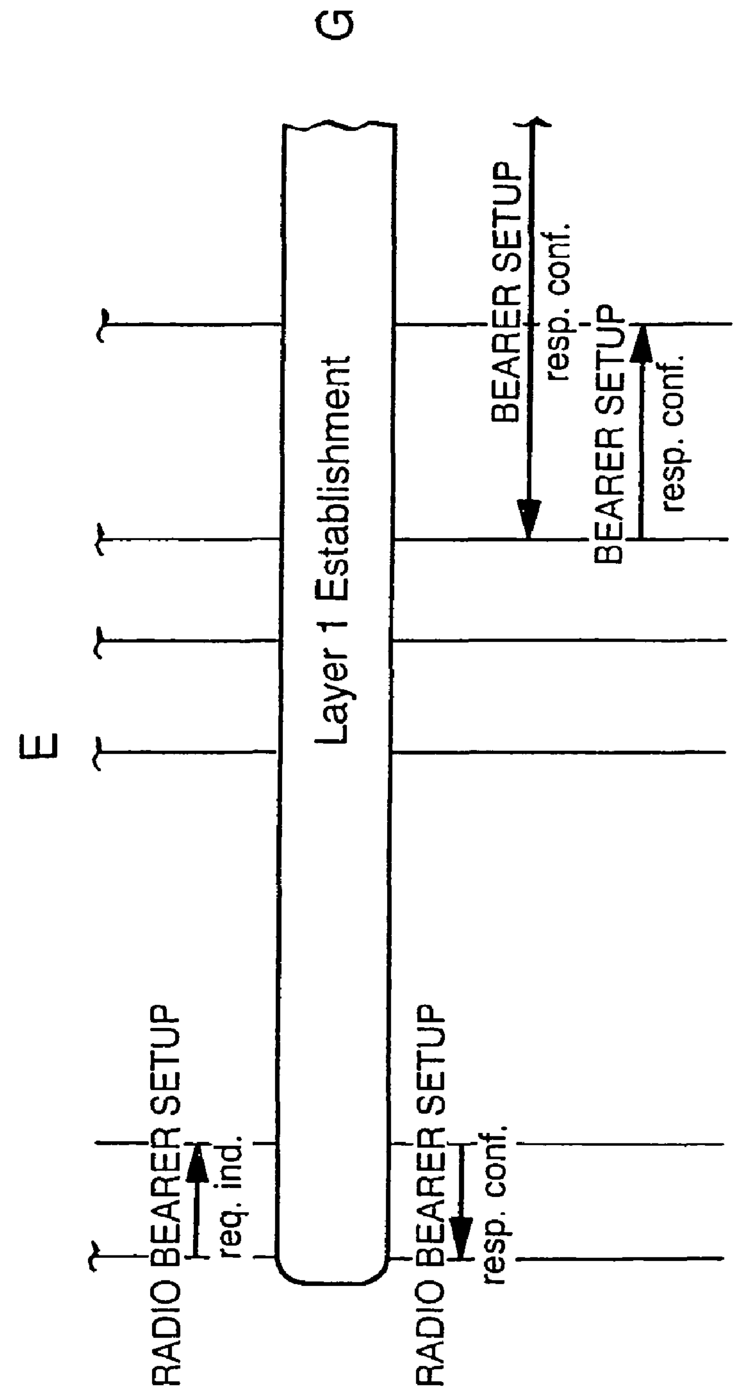

CONTINUED FROM FIG. 30
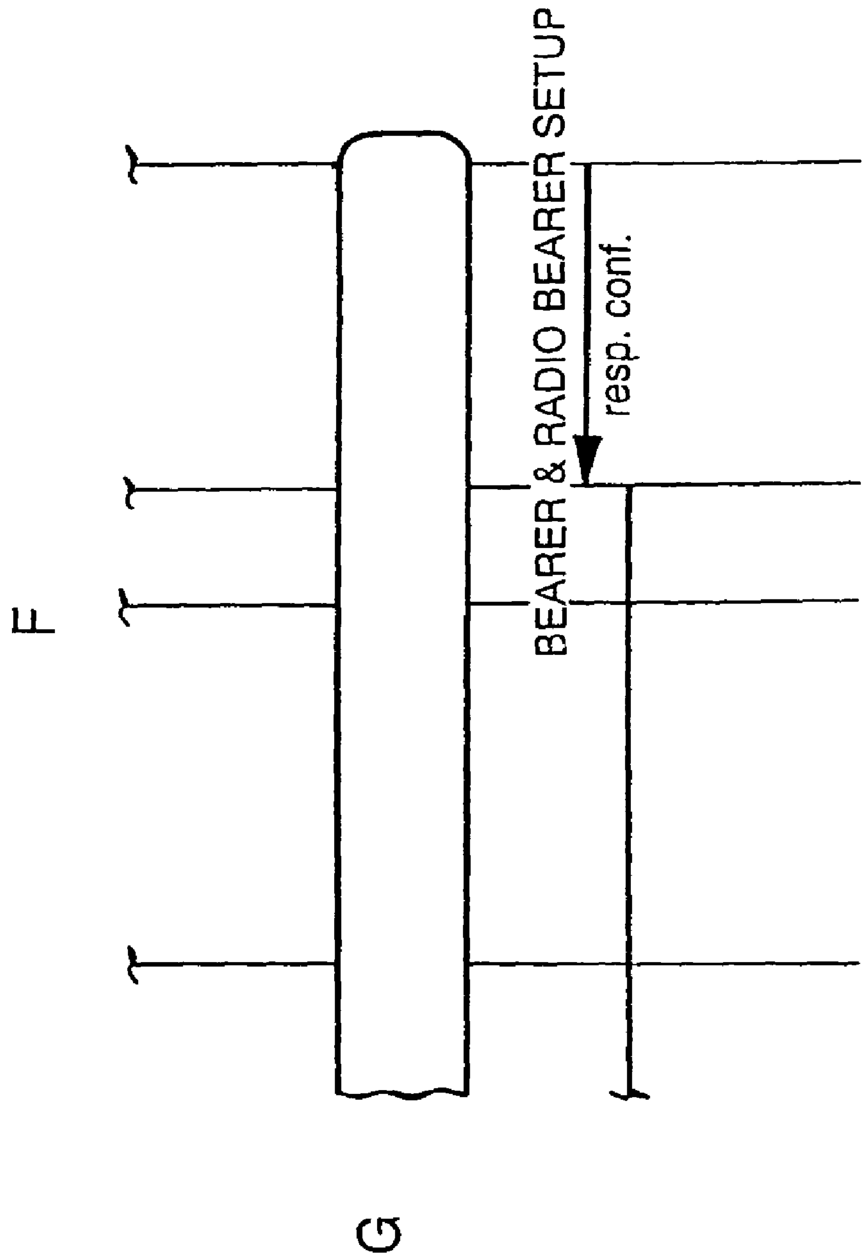

* : TA Release is concatenated only when the association of the MS is released by the call release.

CONTINUED FROM FIG. 32
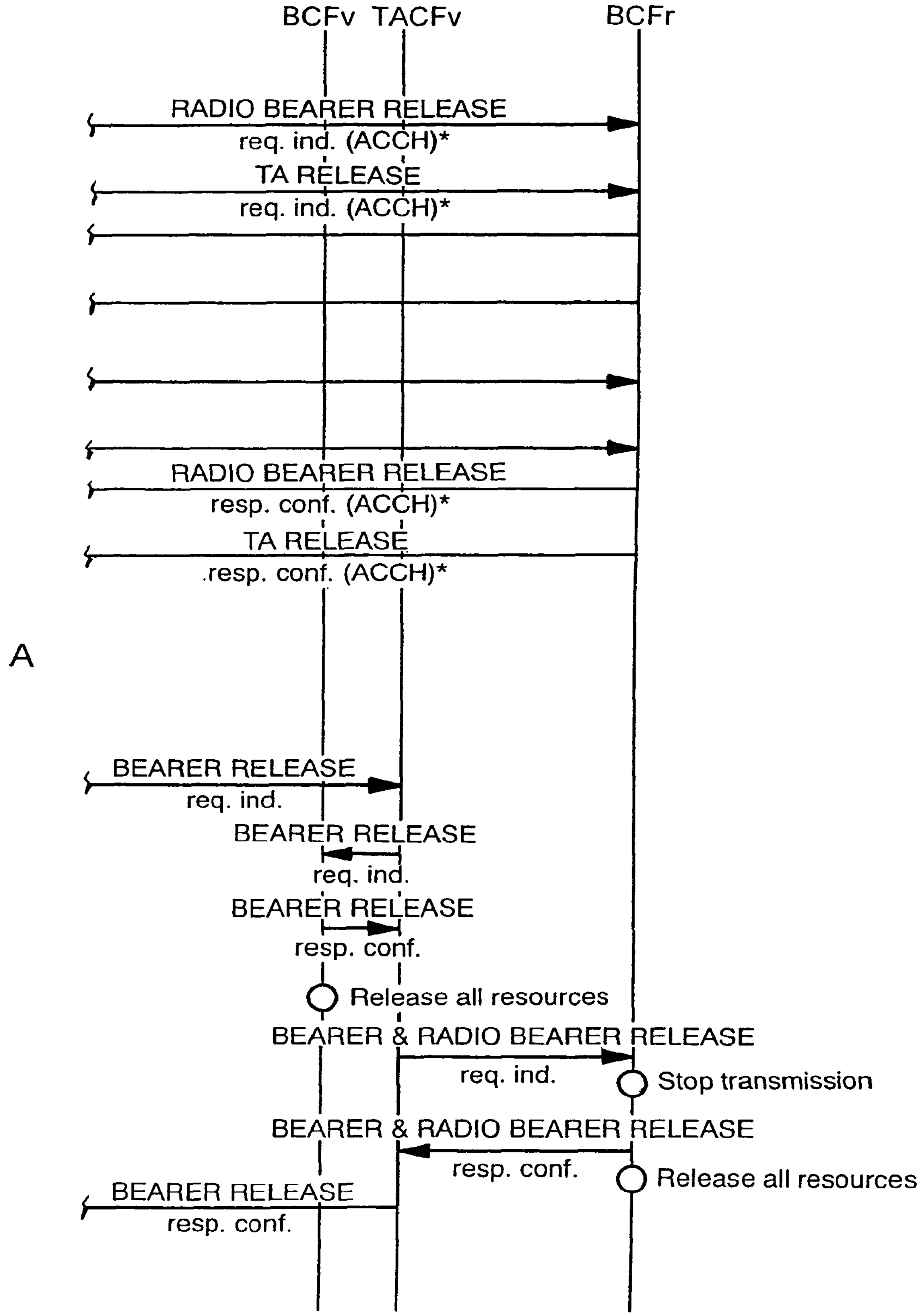

FIG. 35

Process 1: Handover trigger
→ Detection of handover triggering

Process 2: Handover resource reservation
→ Reservation of radio resources for handover Process 3: Handover execution
→ Preparing at network side, if any
→ Request the mobile terminal as indicated by trigger Process 4: Handover completion
→ Release of unneeded radio bearer and resources CONTINUED FROM FIG. 35
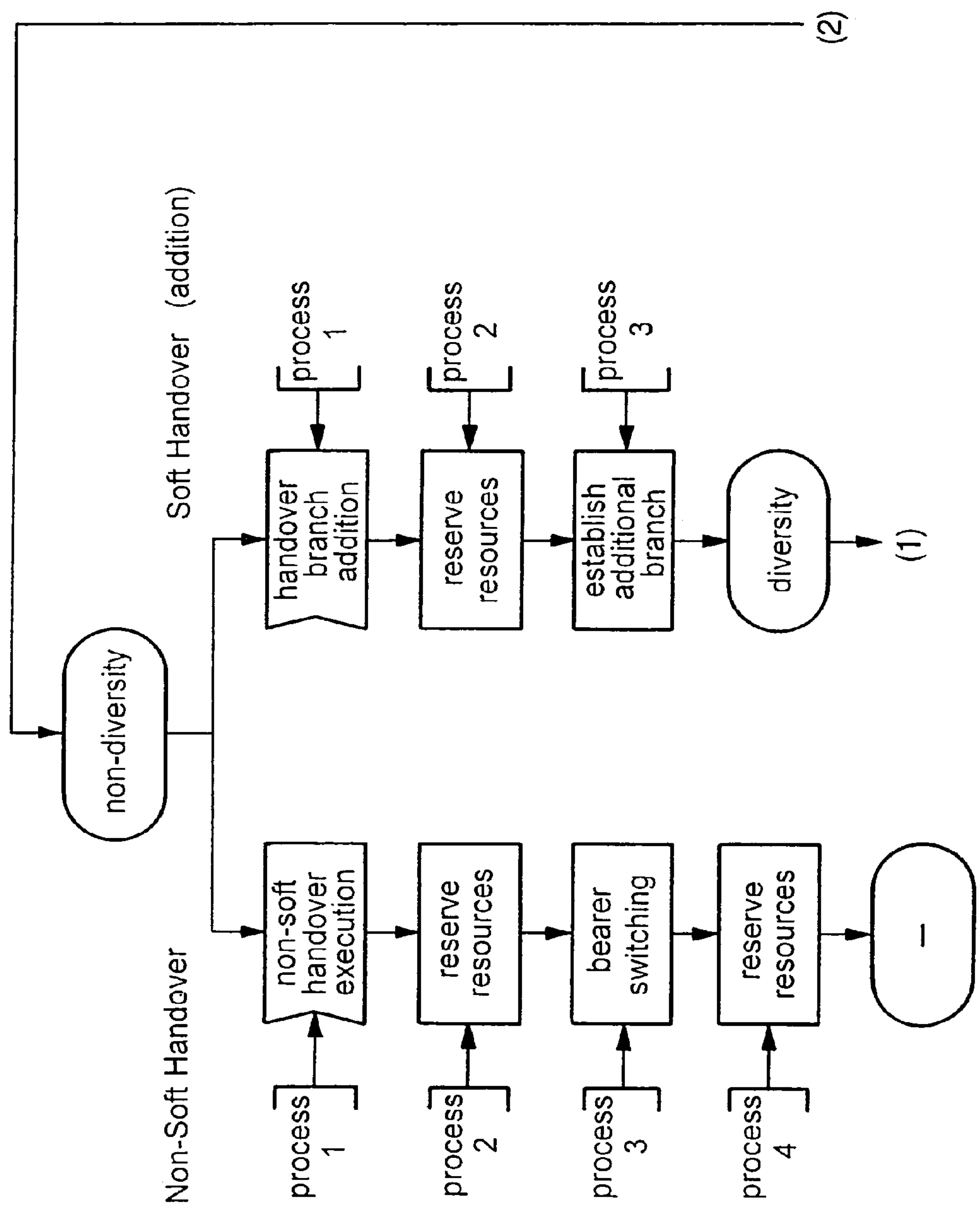

CONTINUED FROM FIG. 35
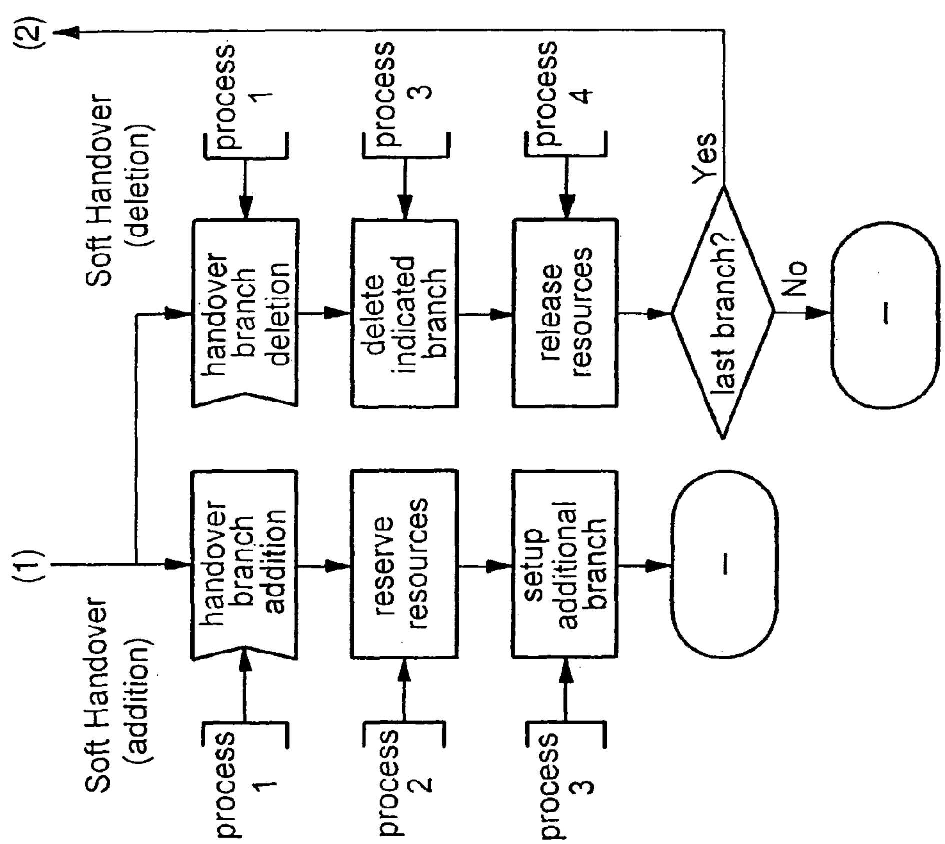

CONTINUED FROM FIG. 36
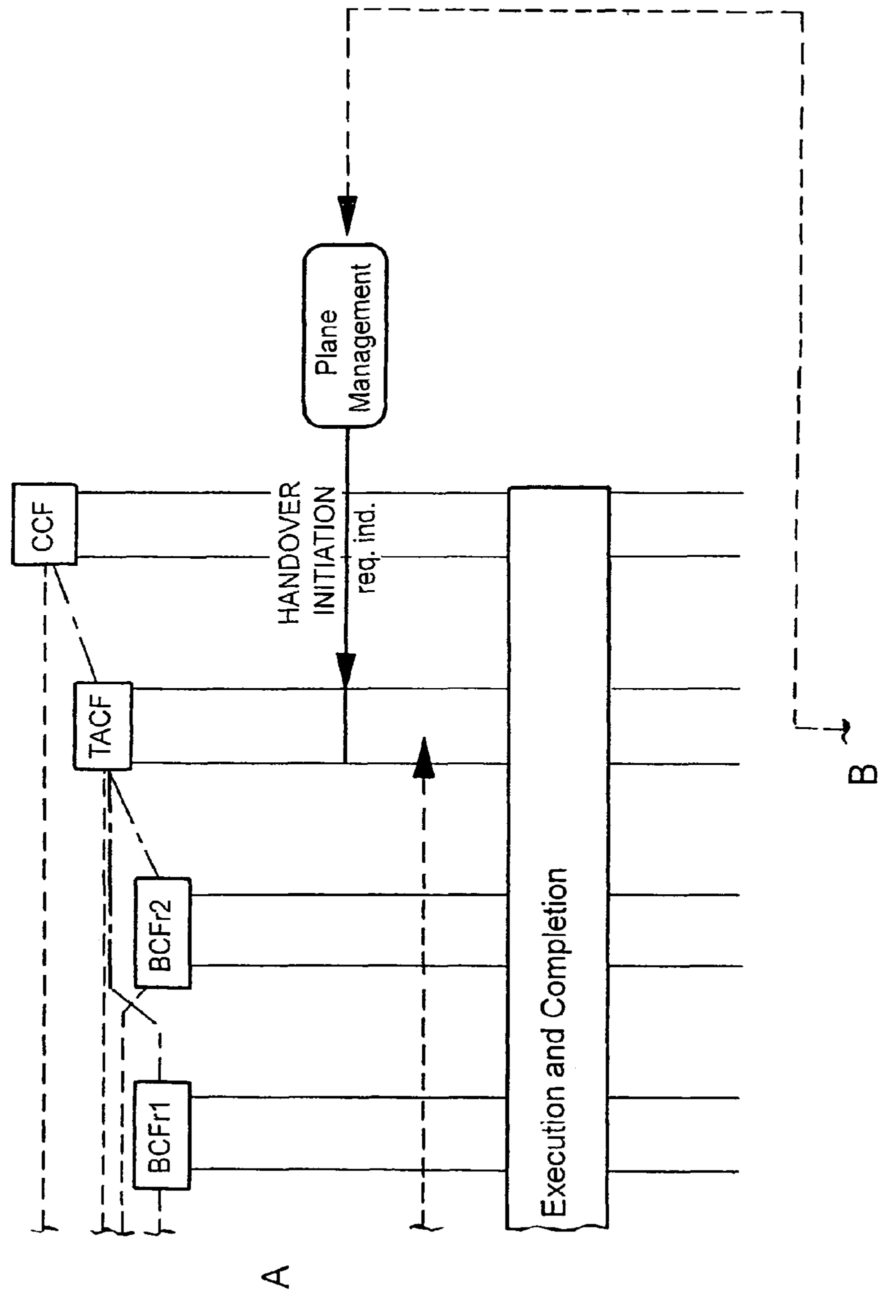

CONTINUED FROM FIG. 36
B
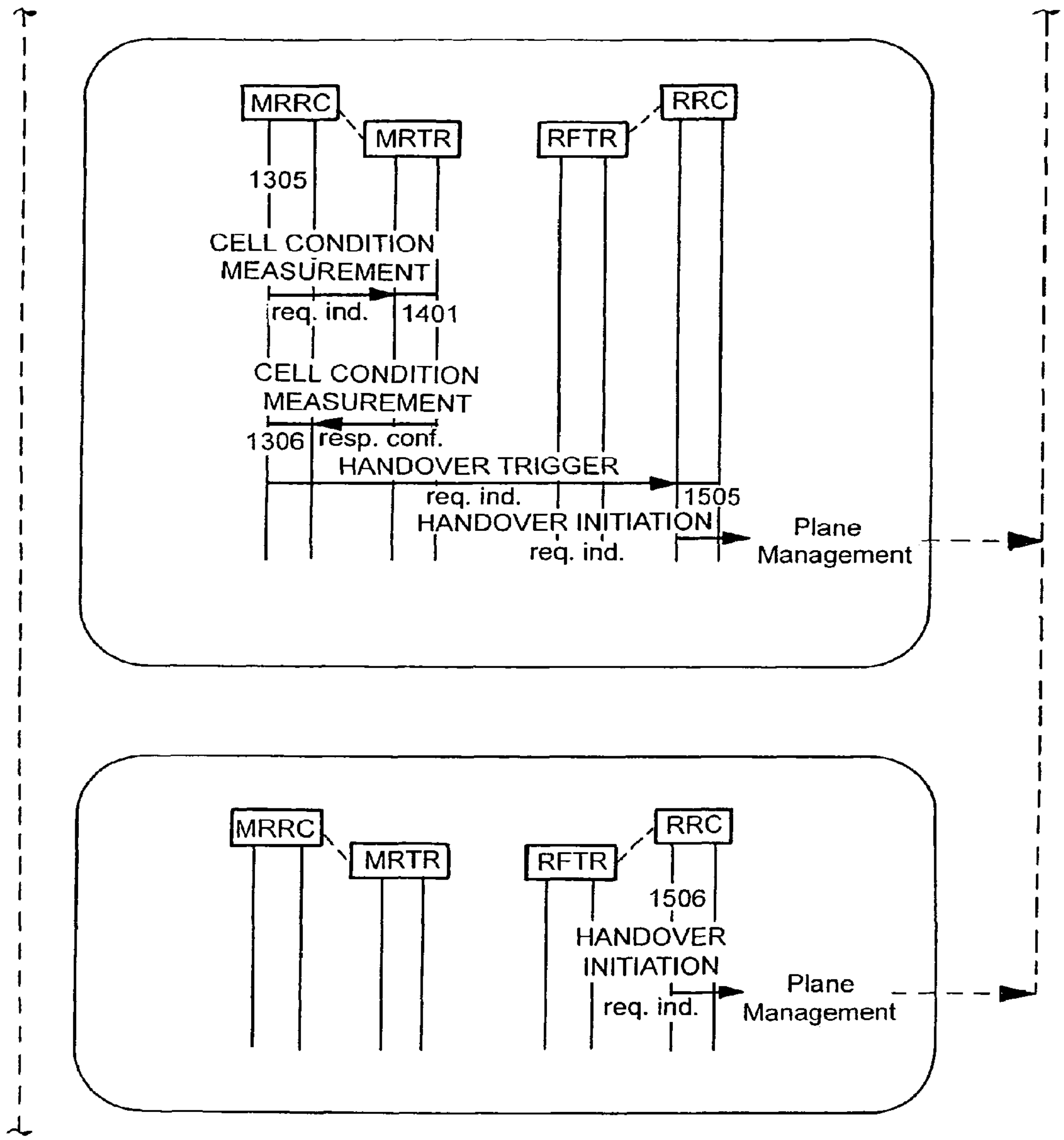
C

CONTINUED FROM FIG. 36
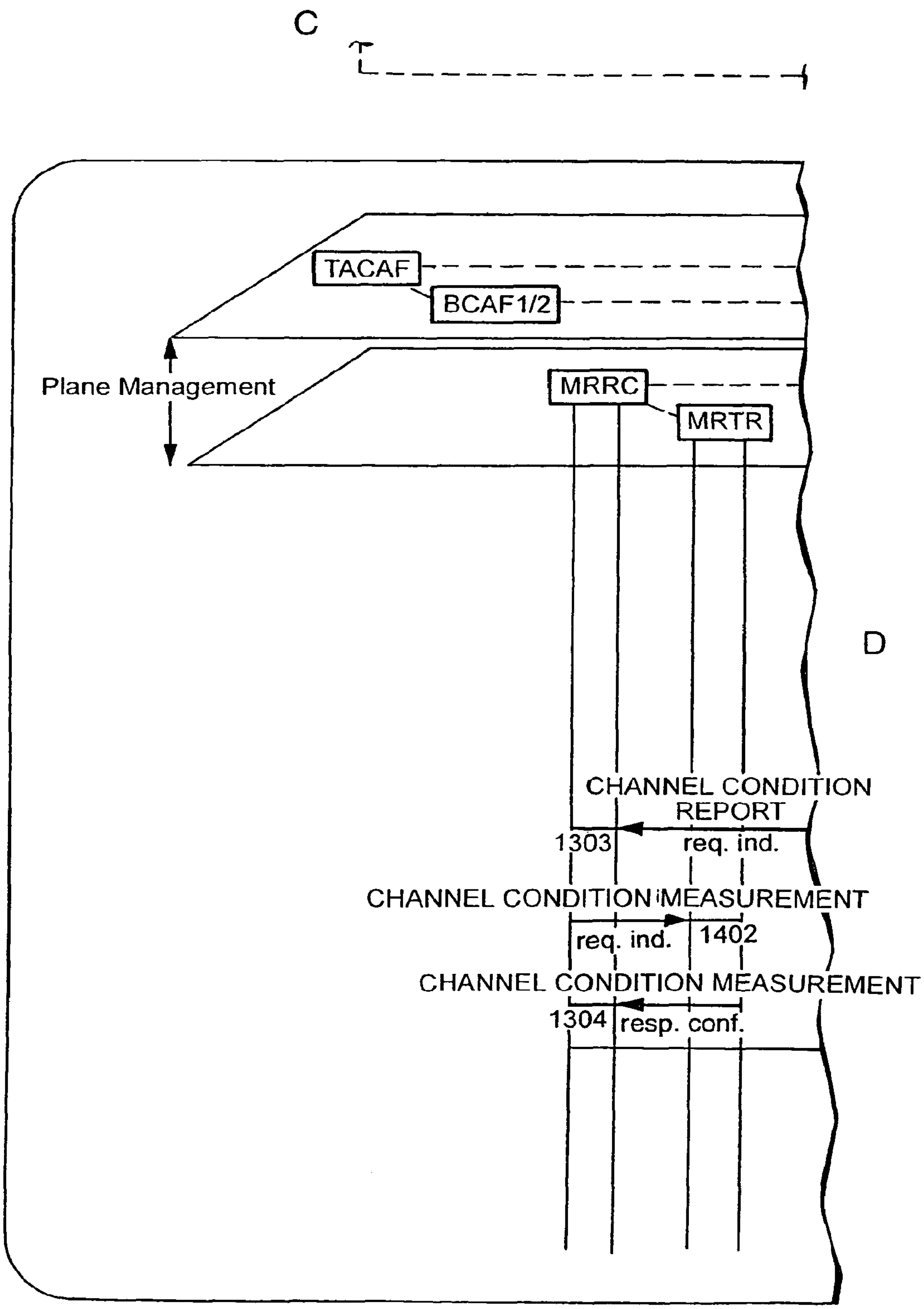

CONTINUED FROM FIG. 36
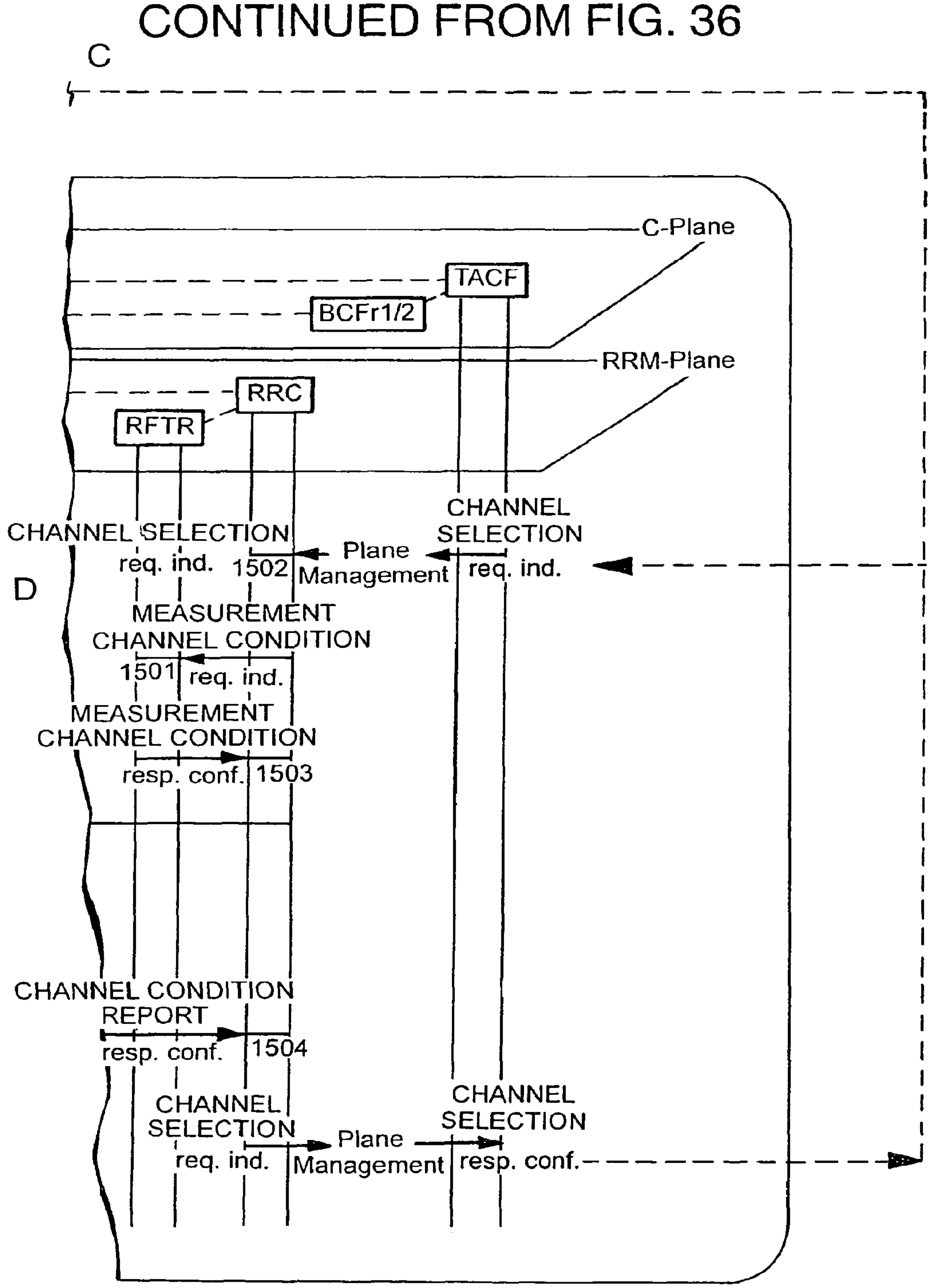

CONTINUED FROM FIG. 41
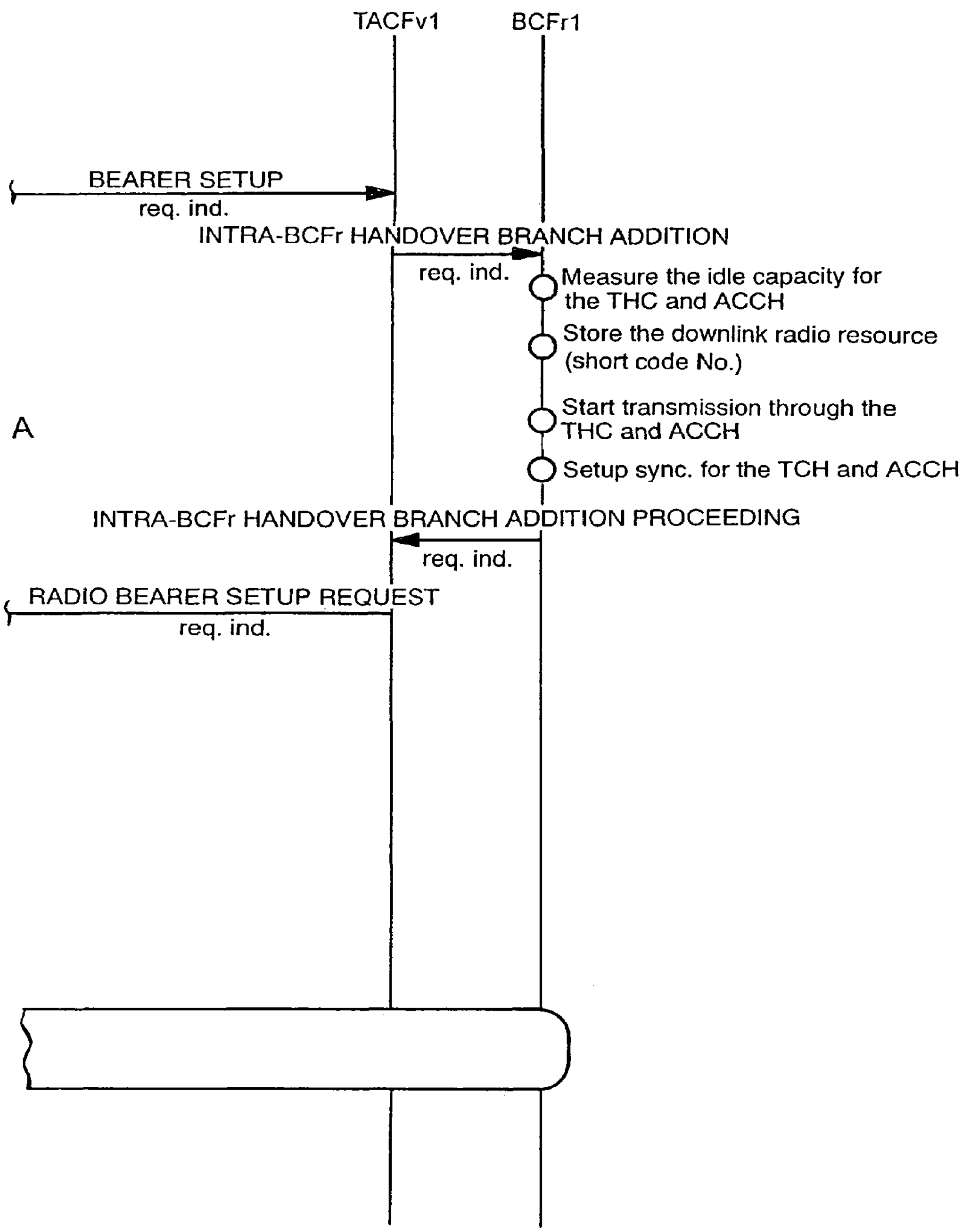

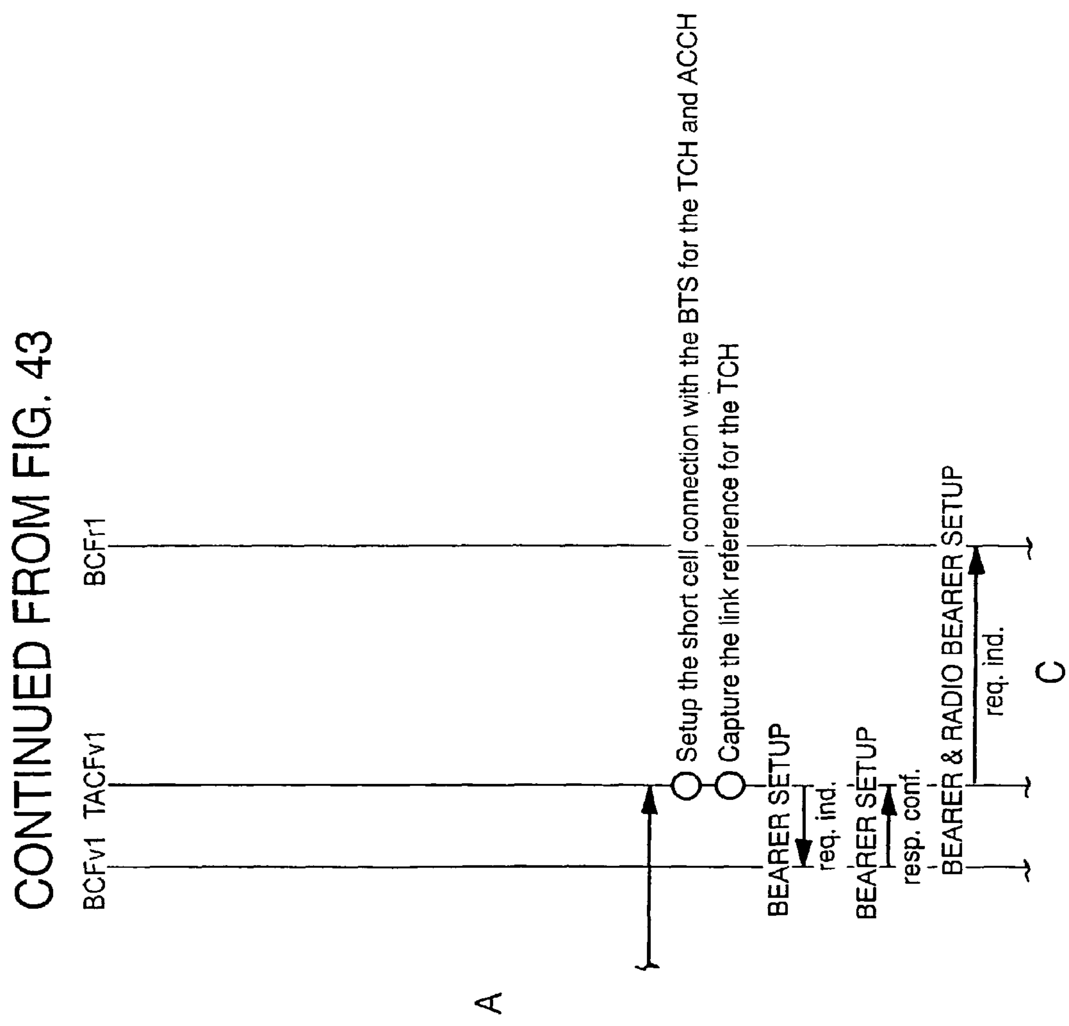
CONTINUED FROM FIG. 43
BCFv1
TACFv1
BCFr1
A
Setup the short cell connection with the BTS for the TCH and ACCH
Capture the link reference for the TCH
BEARER SETUP
req. ind.
BEARER SETUP
resp. conf.
BEARER & RADIO BEARER SETUP
req. ind.
C CONTINUED FROM FIG. 43
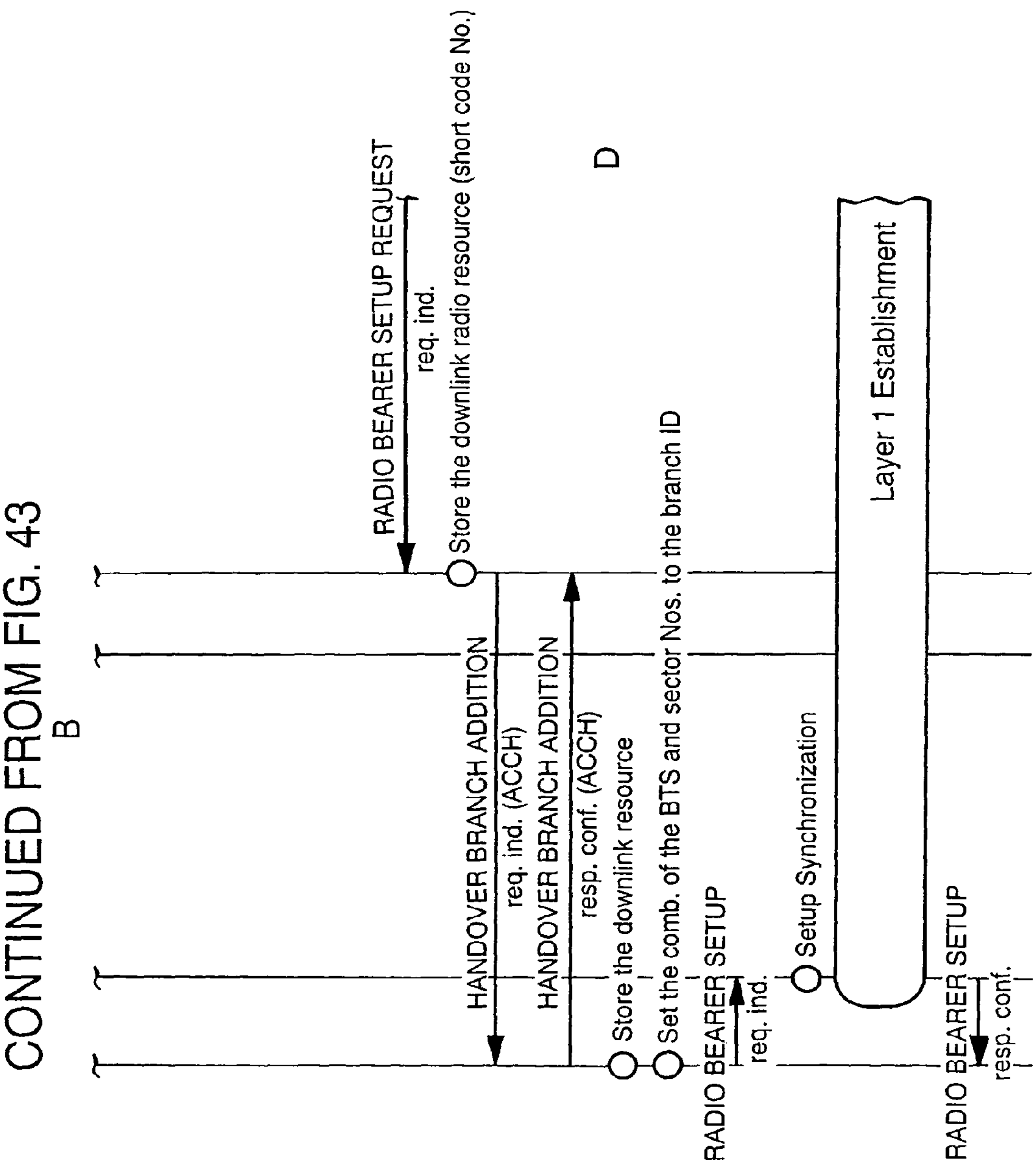

CONTINUED FROM FIG. 43
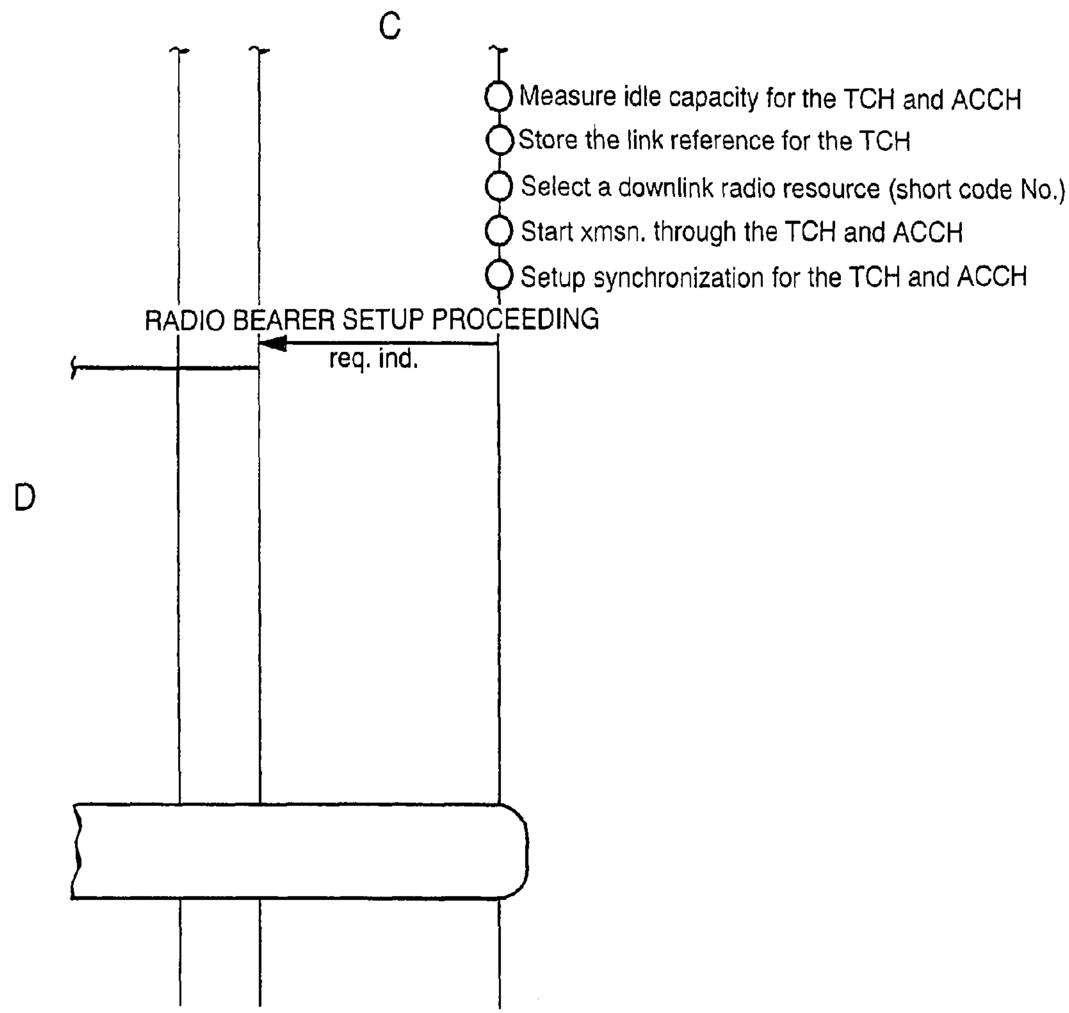

CONTINUED FROM FIG. 45
A
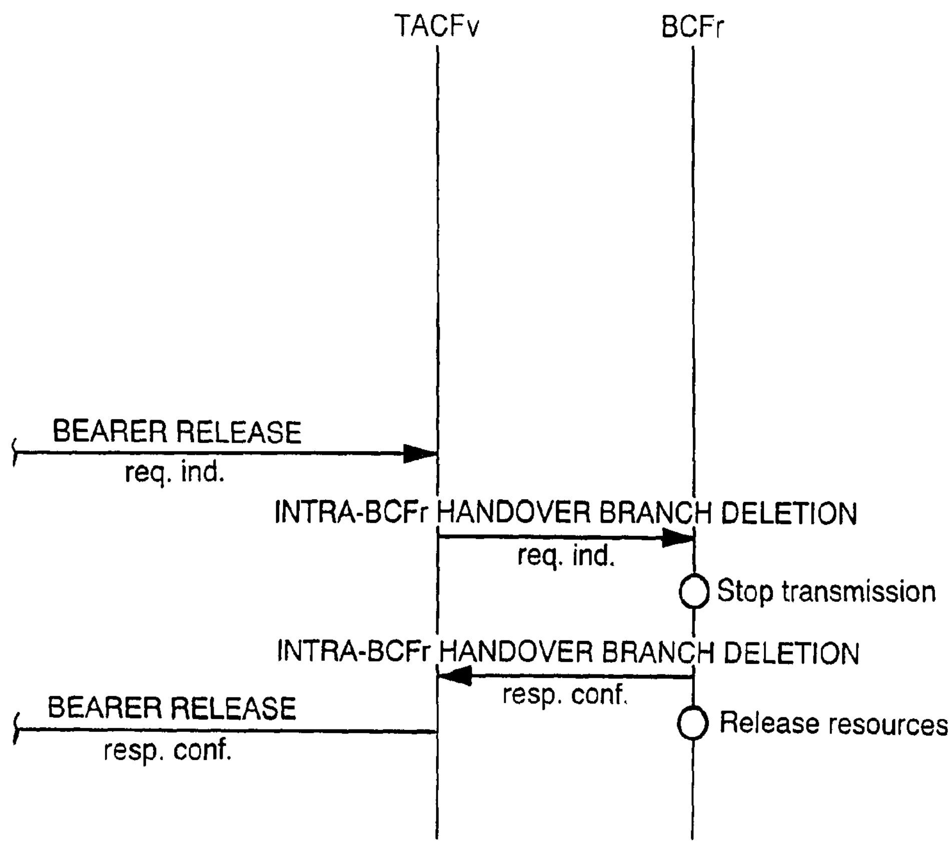

CONTINUED FROM FIG. 47
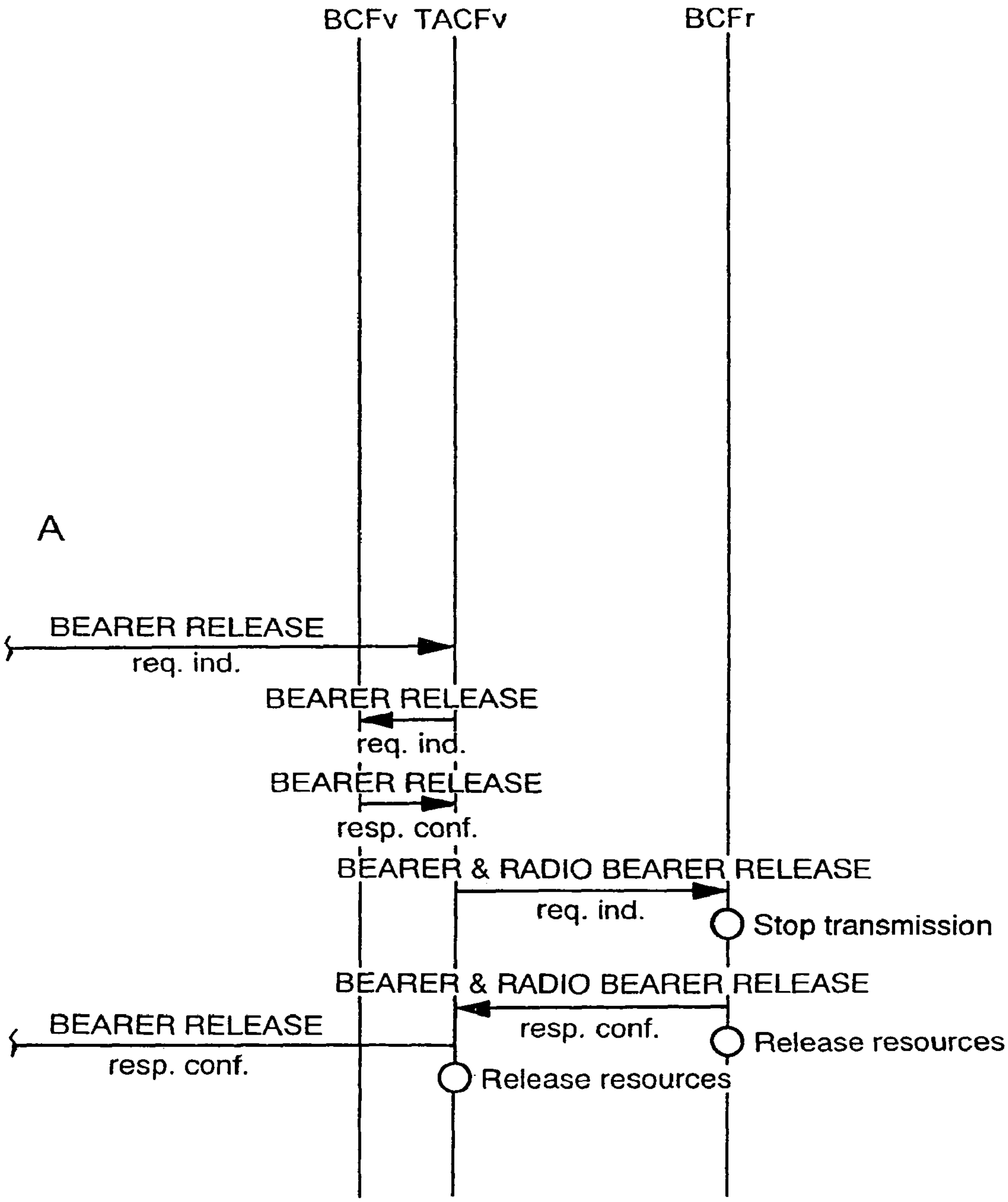

CONTINUED FROM FIG. 49
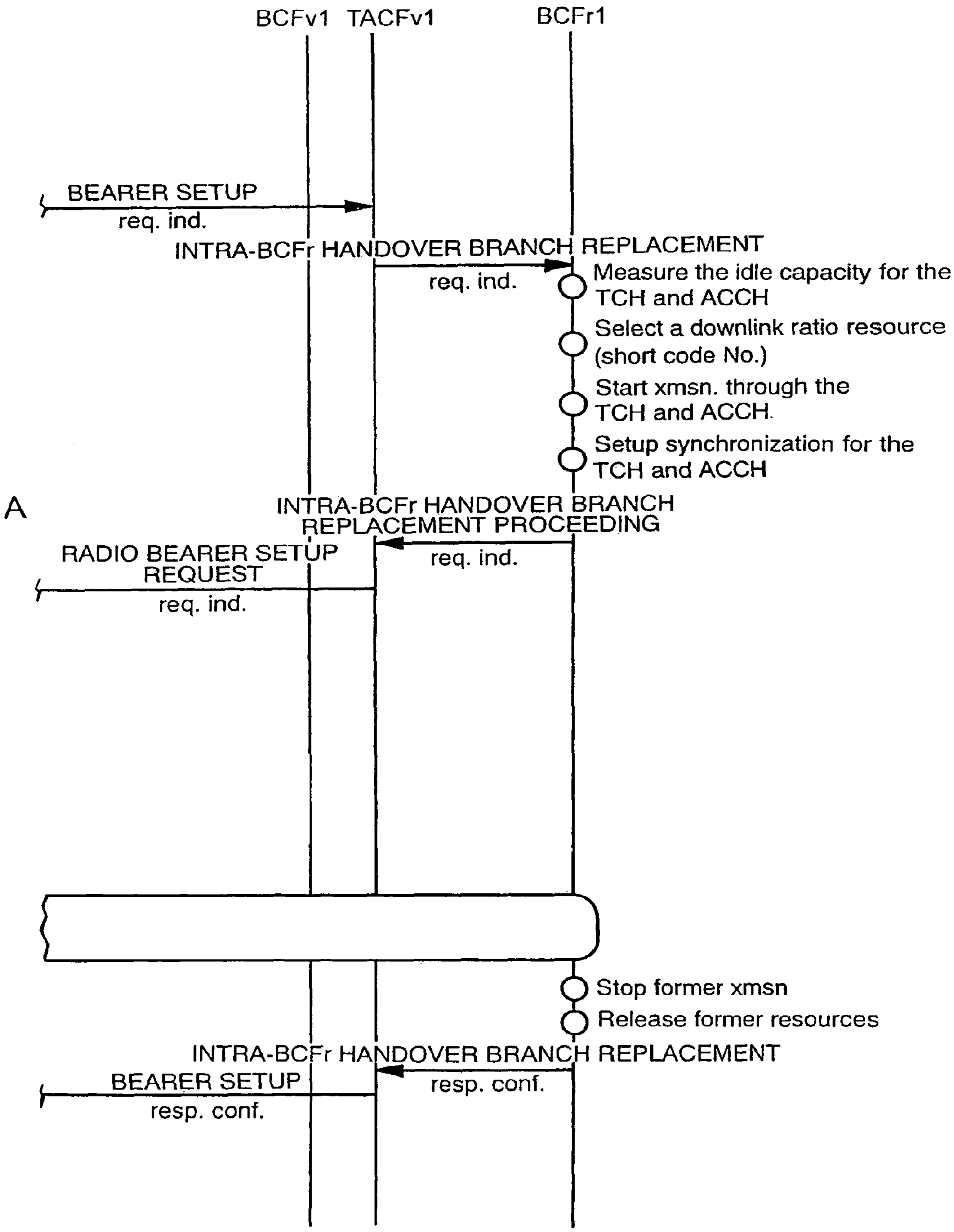

CONTINUED FROM FIG. 51
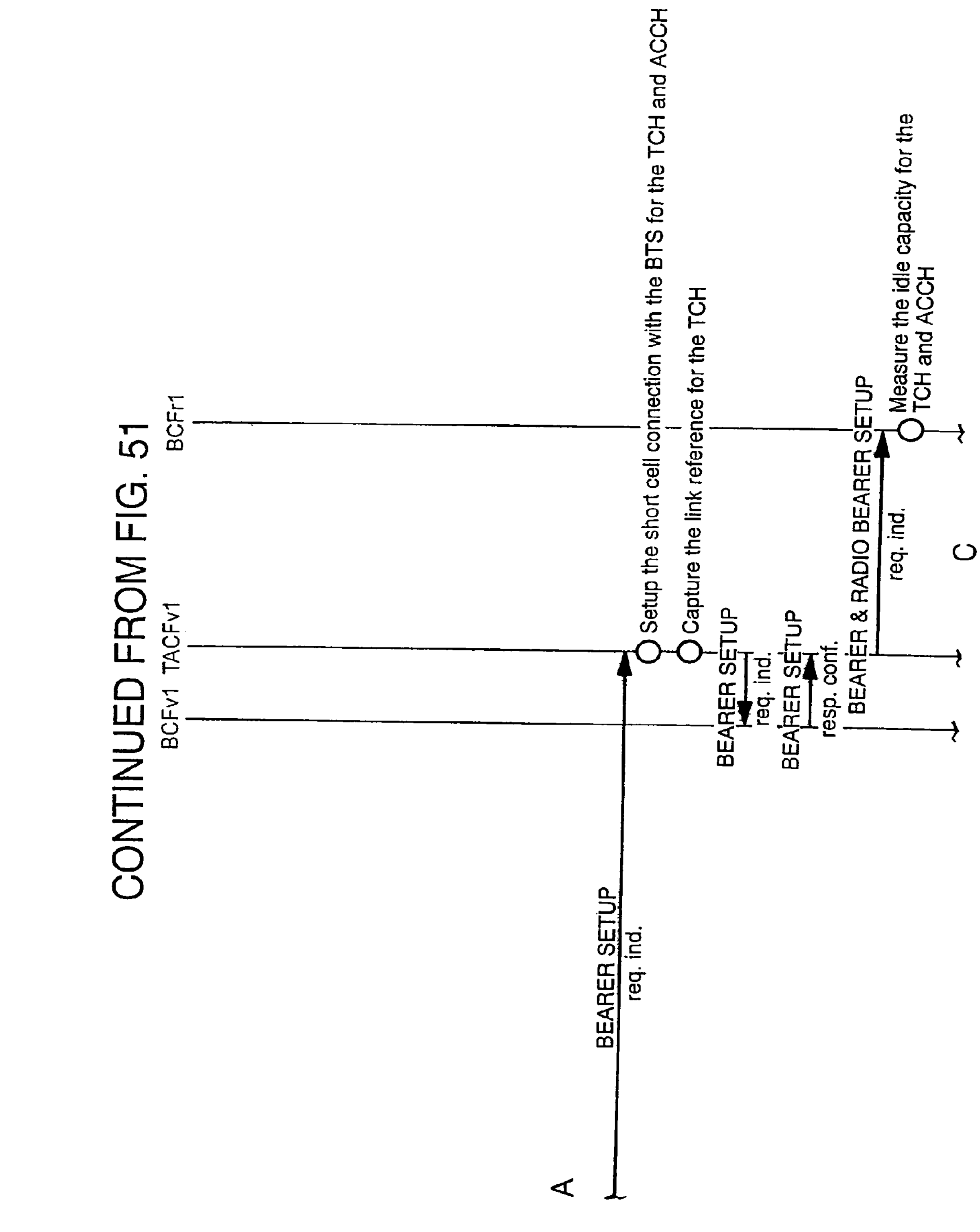

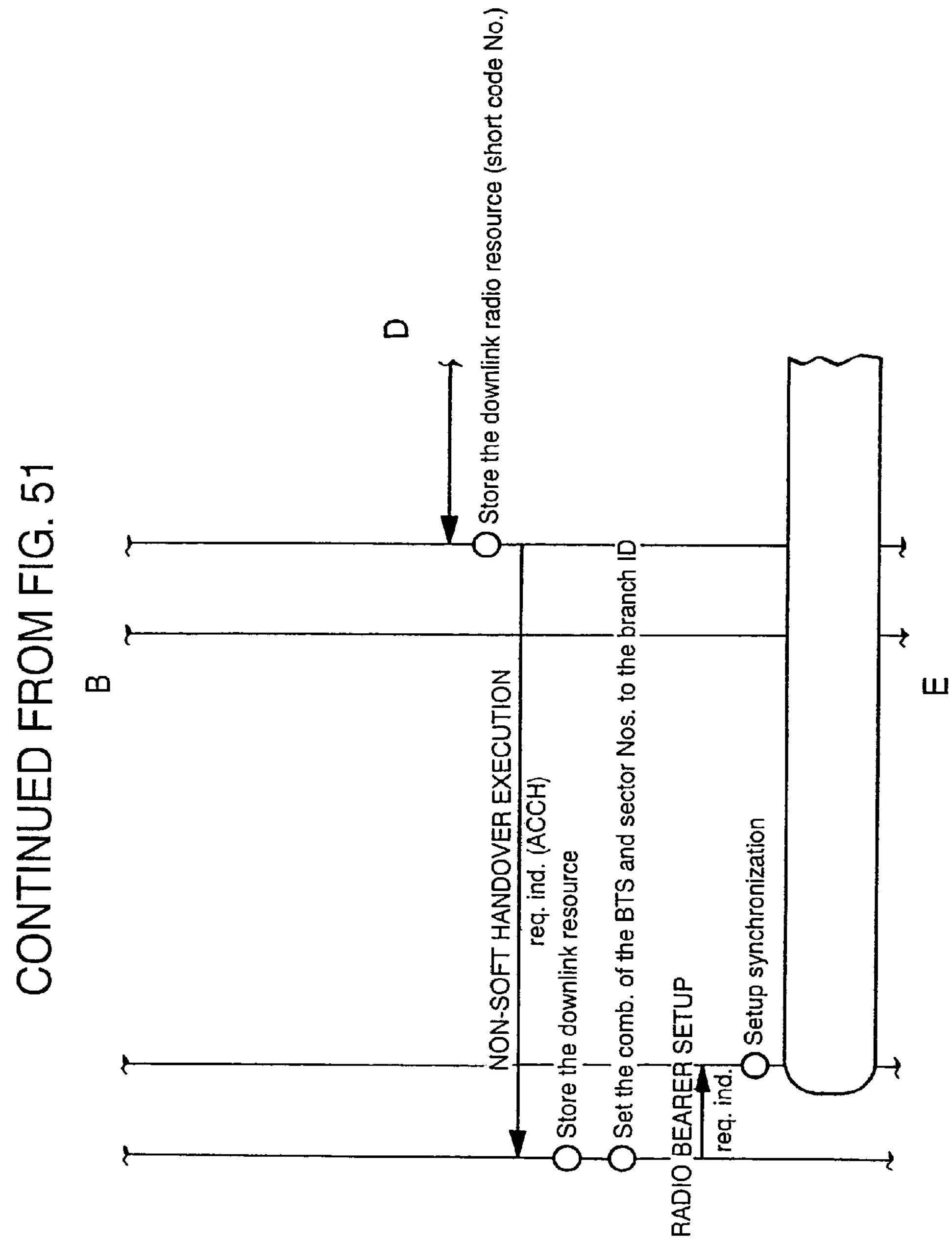
CONTINUED FROM FIG. 51
B
D
E
Store the downlink radio resource (short code No.)
NON-SOFT HANDOVER EXECUTION
req. ind. (ACCH)
Store the downlink resource
Set the comb. of the BTS and sector Nos. to the branch ID
RADIO BEARER SETUP
req. ind.
Setup synchronization CONTINUED FROM FIG. 51
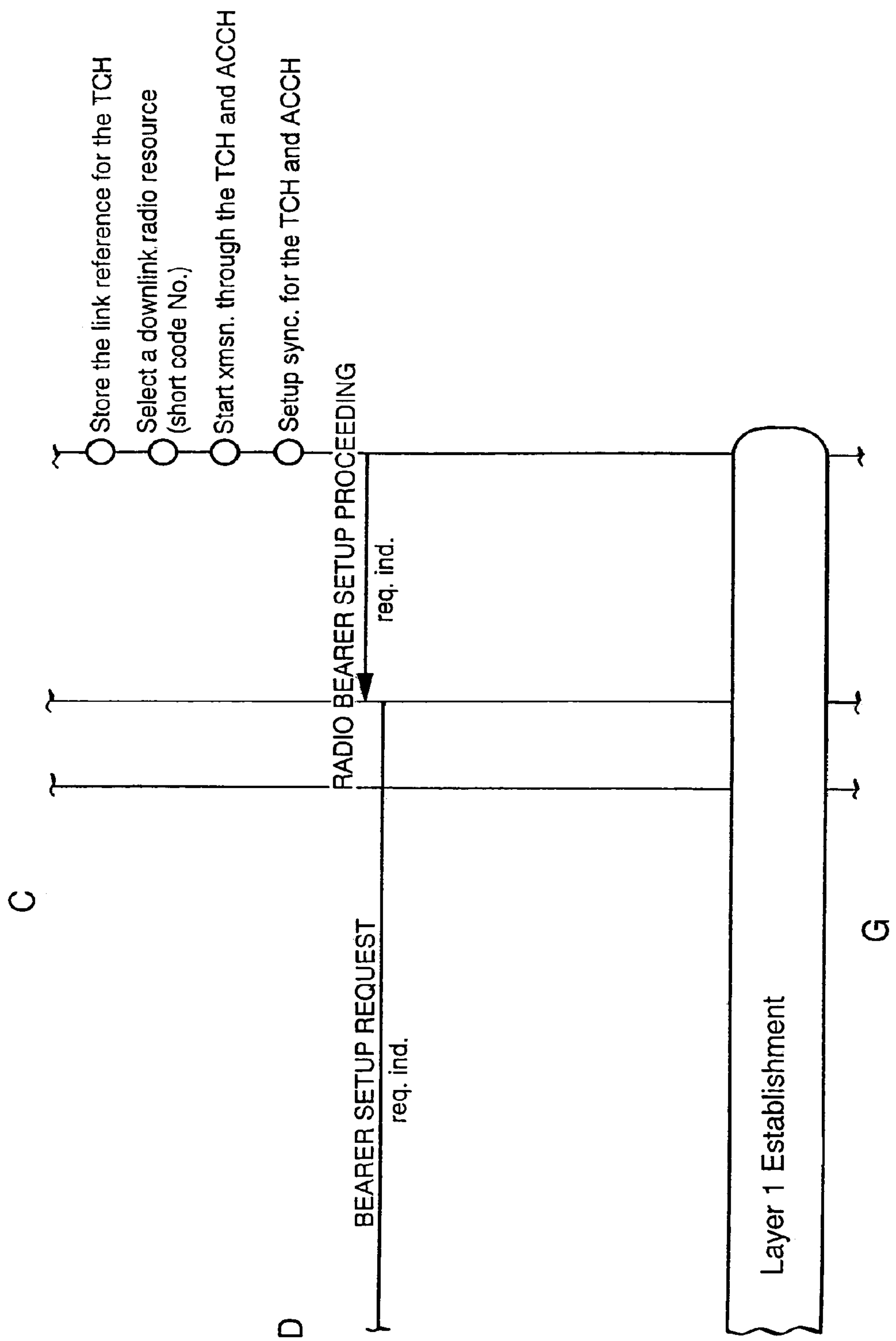

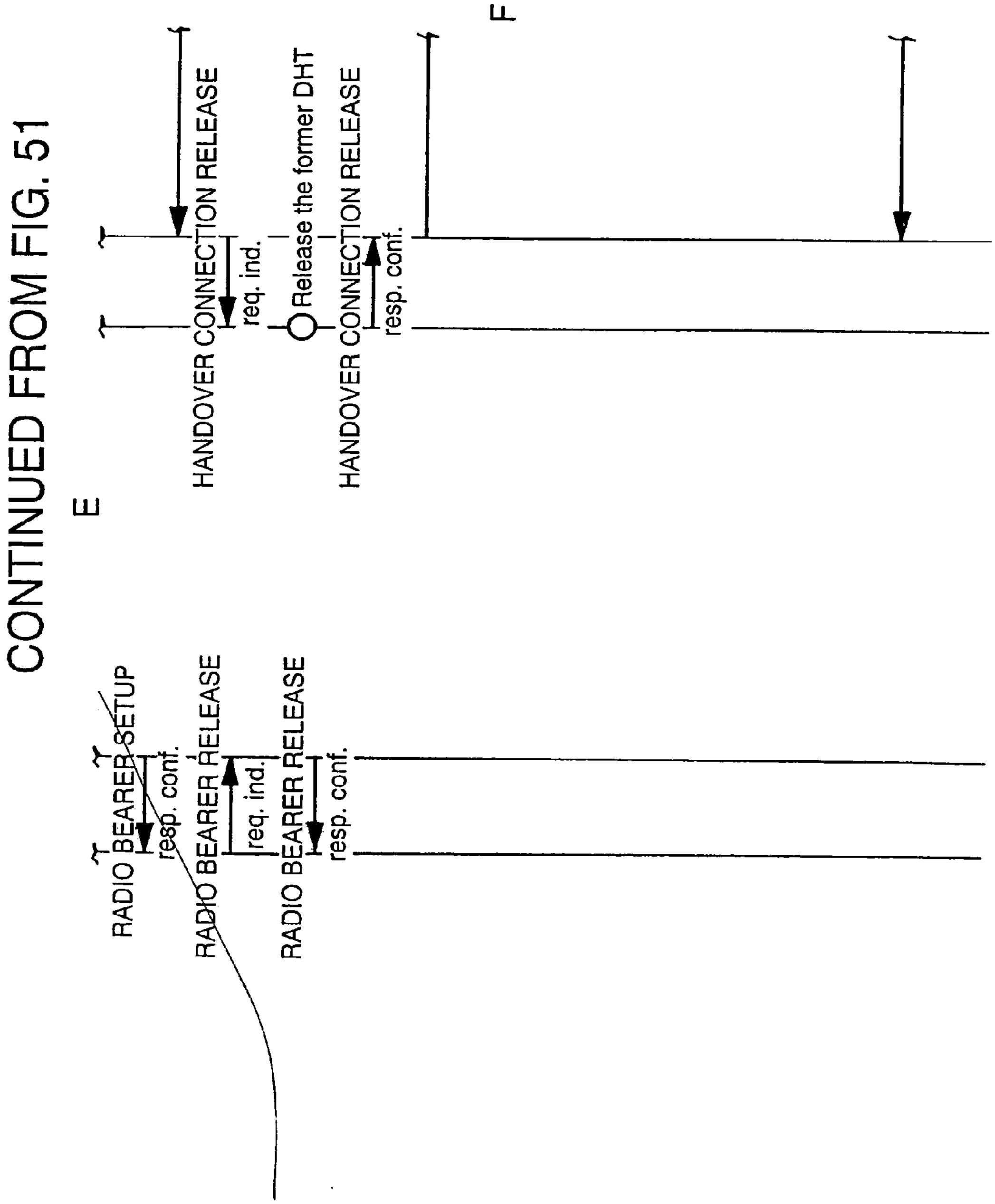
CONTINUED FROM FIG. 51
E
F
RADIO BEARER SETUP
resp. conf.
RADIO BEARER RELEASE
req. ind.
RADIO BEARER RELEASE
resp. conf.
HANDOVER CONNECTION RELEASE
req. ind.
Release the former DHT
HANDOVER CONNECTION RELEASE
resp. conf.

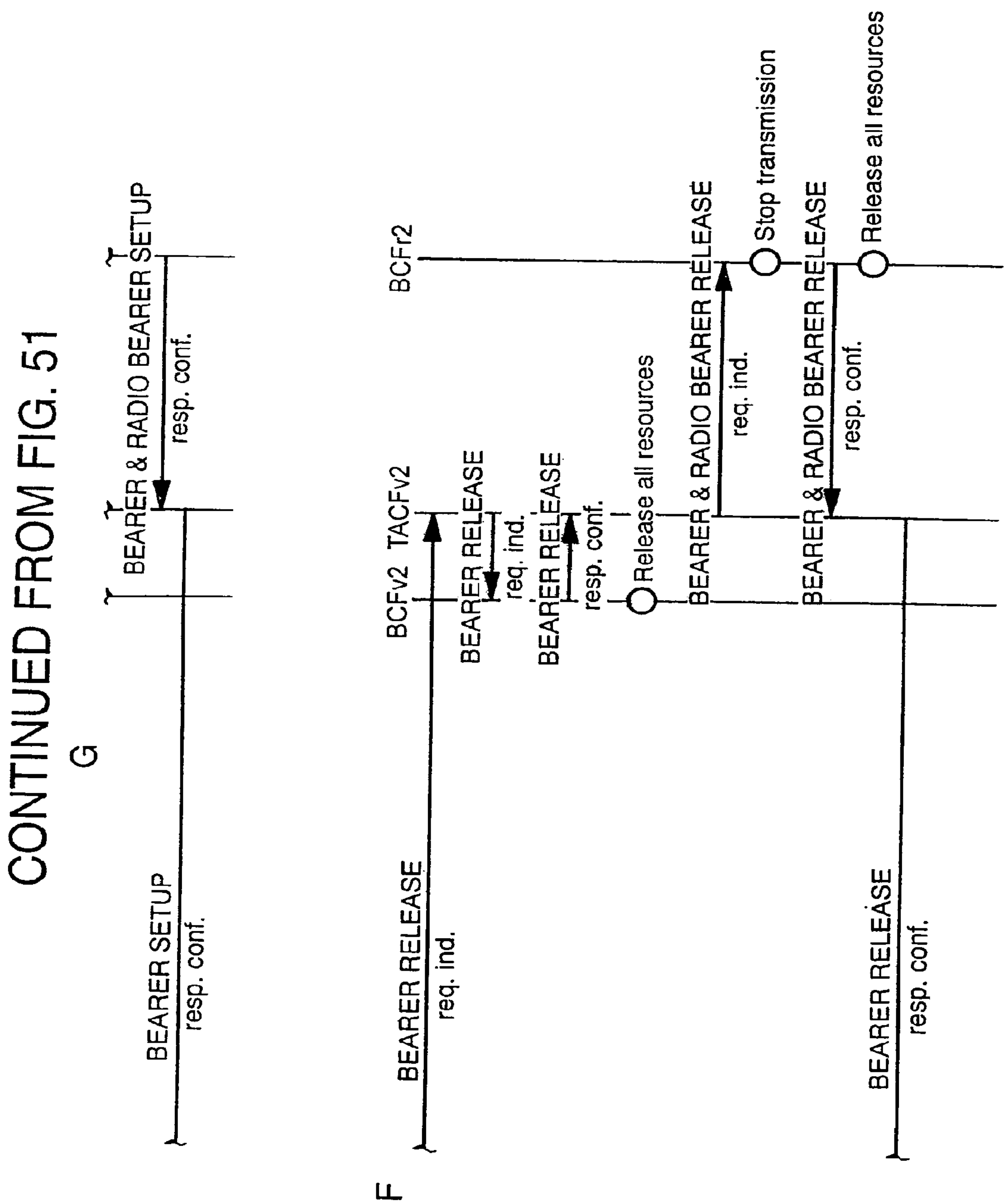
CONTINUED FROM FIG. 51
G
BEARER SETUP
resp. conf.
BEARER & RADIO BEARER SETUP
resp. conf.
BCFv2
TACFv2
BCFr2
BEARER RELEASE
req. ind.
BEARER RELEASE
req. ind.
BEARER RELEASE
resp. conf.
Release all resources
BEARER & RADIO BEARER RELEASE
req. ind.
Stop transmission
BEARER & RADIO BEARER RELEASE
resp. conf.
Release all resources
BEARER RELEASE
resp. conf.
F CONTINUED FROM FIG. 53
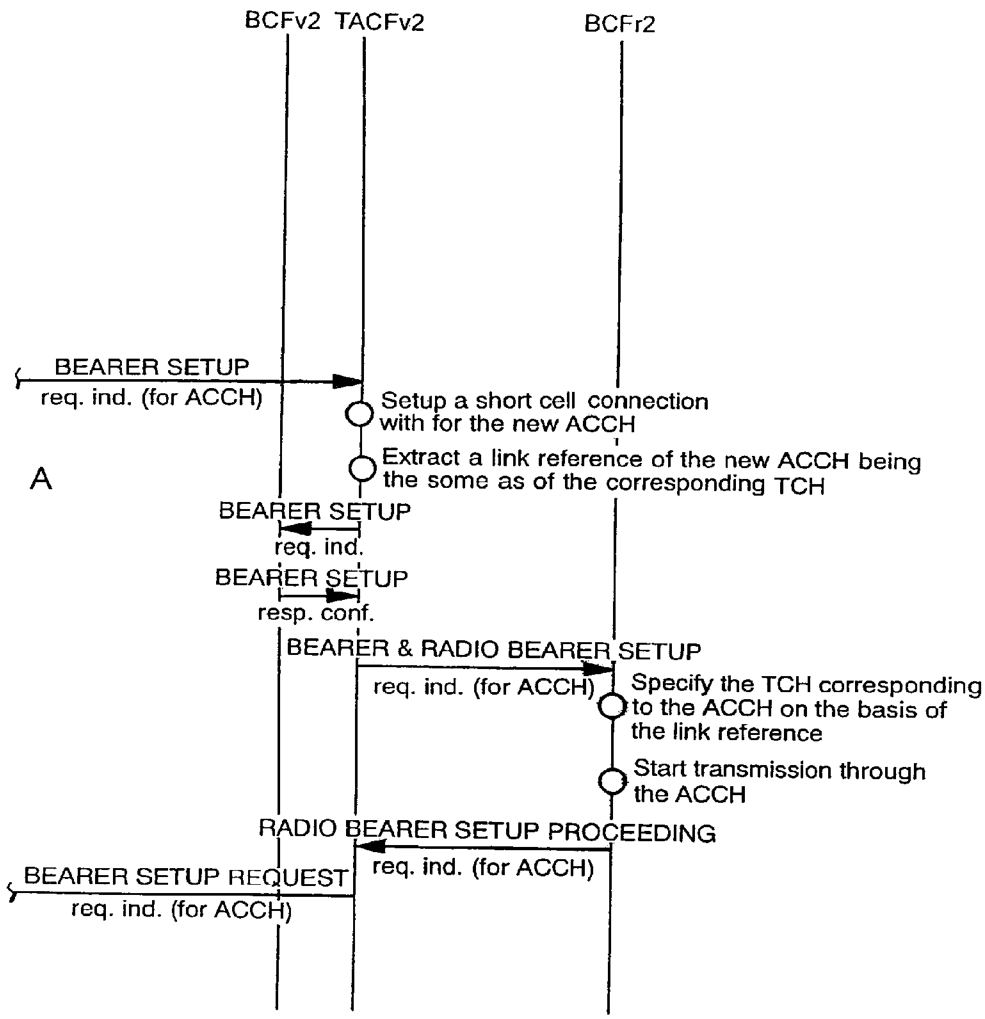

CONTINUED FROM FIG. 54
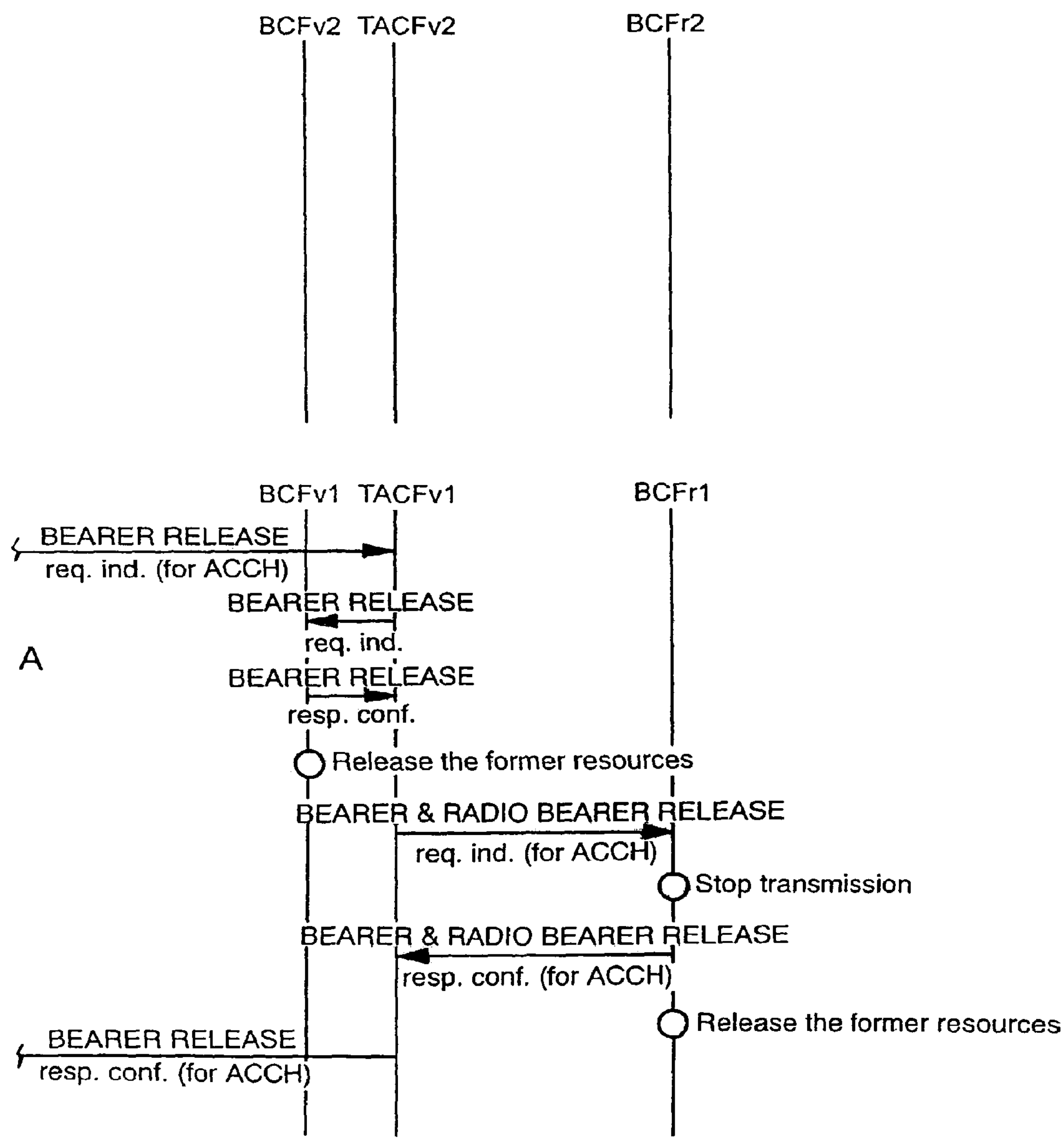

CONTINUED FROM FIG. 60
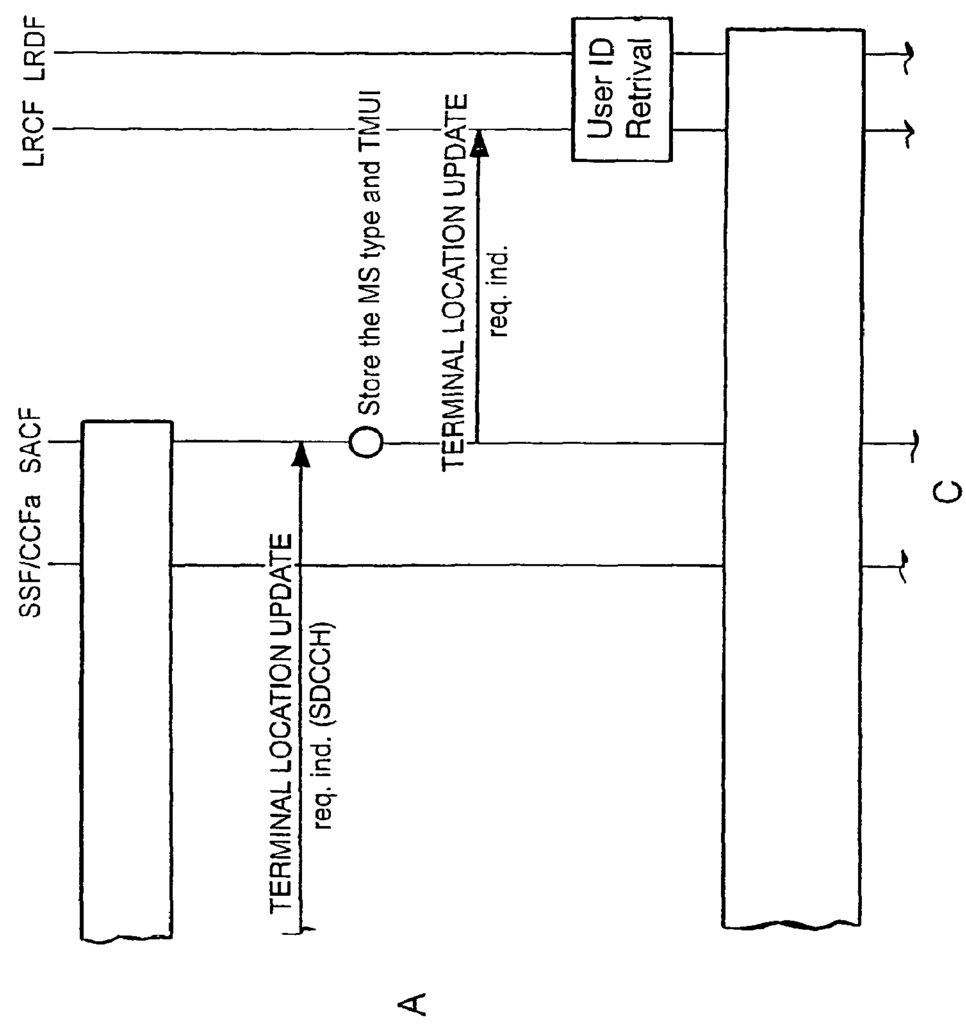

CONTINUED FROM FIG. 60
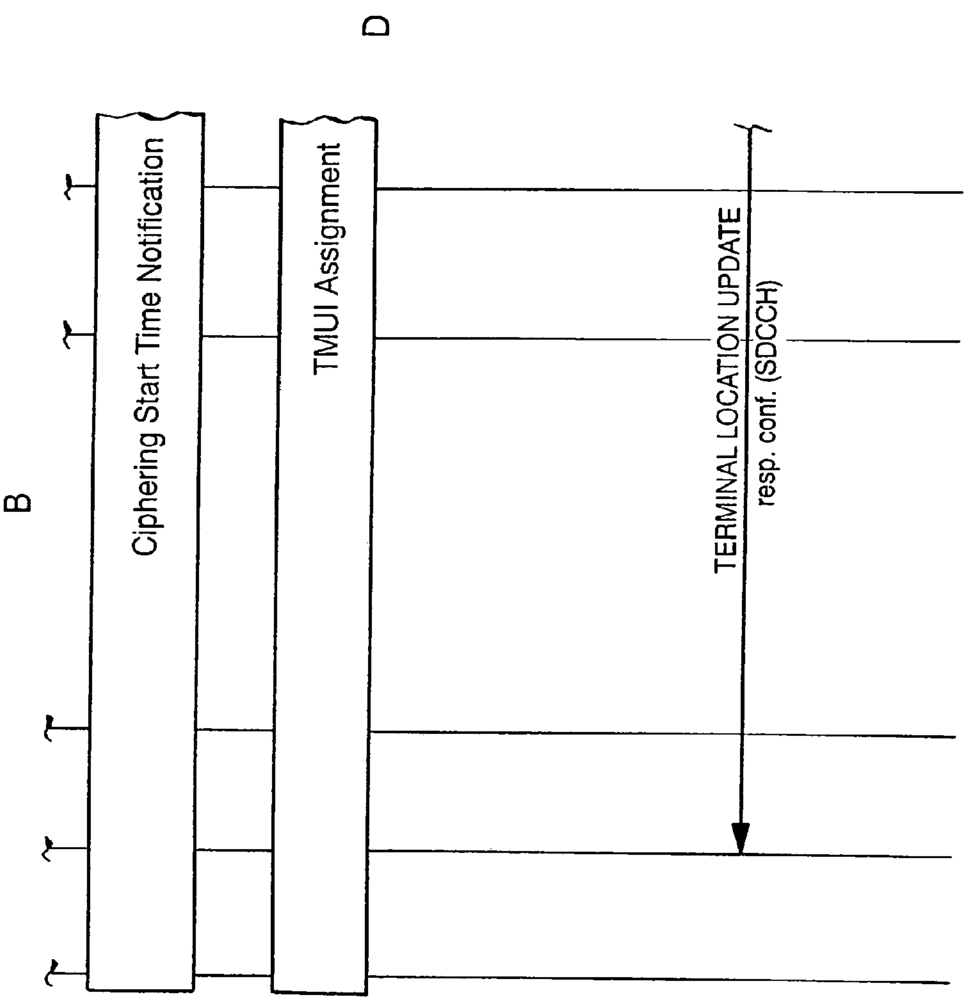

CONTINUED FROM FIG. 60
C
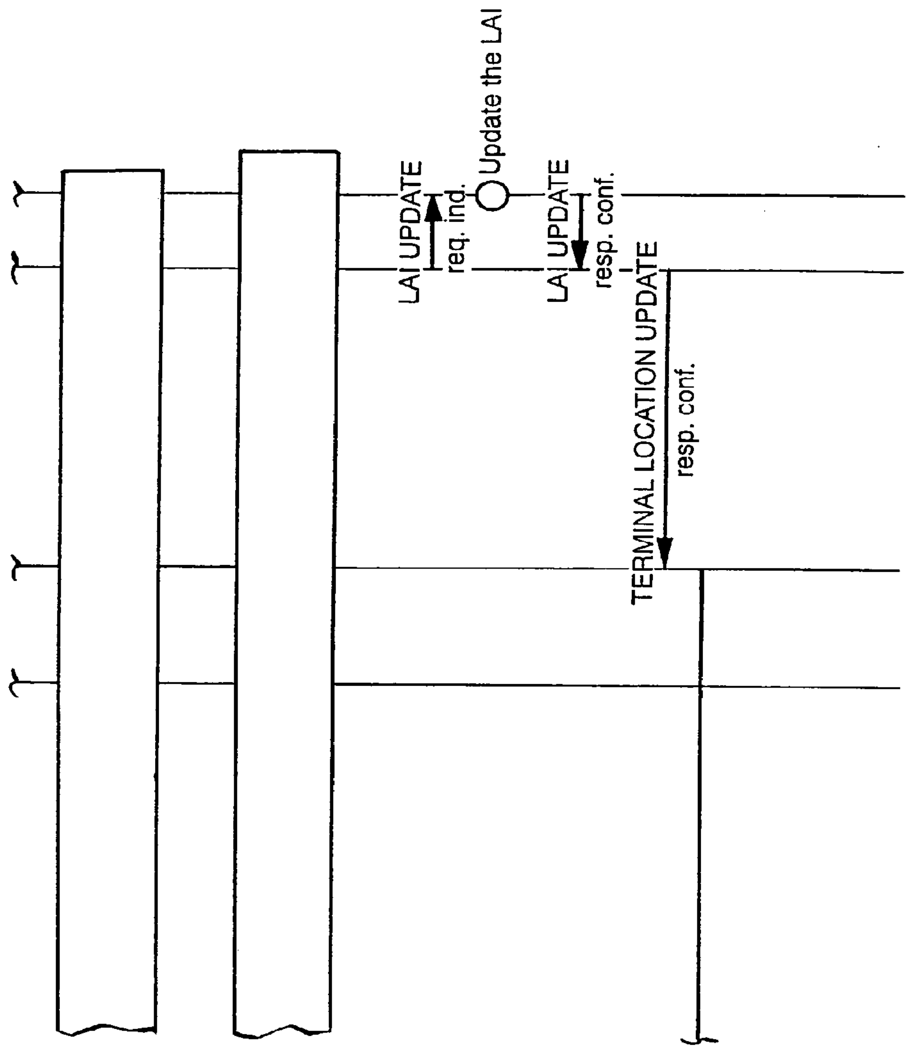
D

CONTINUED FROM FIG. 61
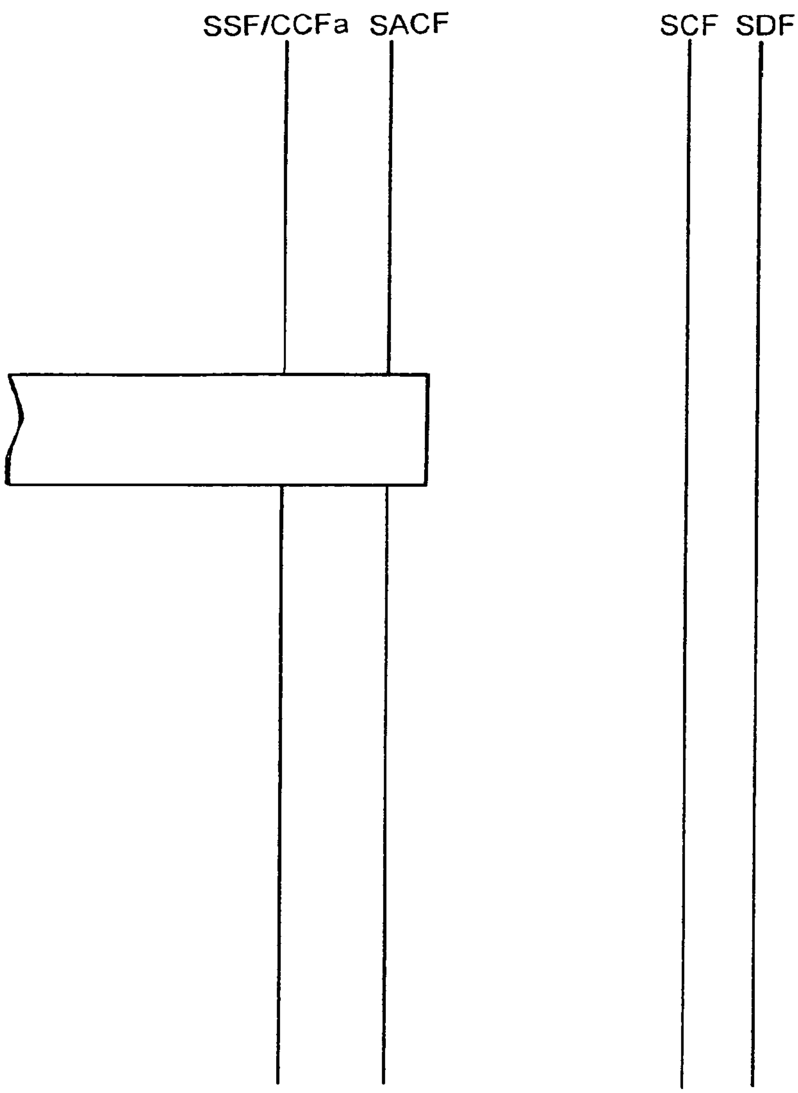

The ciphering key is delivered from LRDF and UIMF during the user authentication.

1) Transportation between MCF and SACF is for user authentication with non-call related case.
2) Transportation between TACAF and TACF is for user authentication with call related case.

MS: Mobile Station
BTS: Base Transceiver System
MCC: MOBILE Communications Control Center

FIG. 75

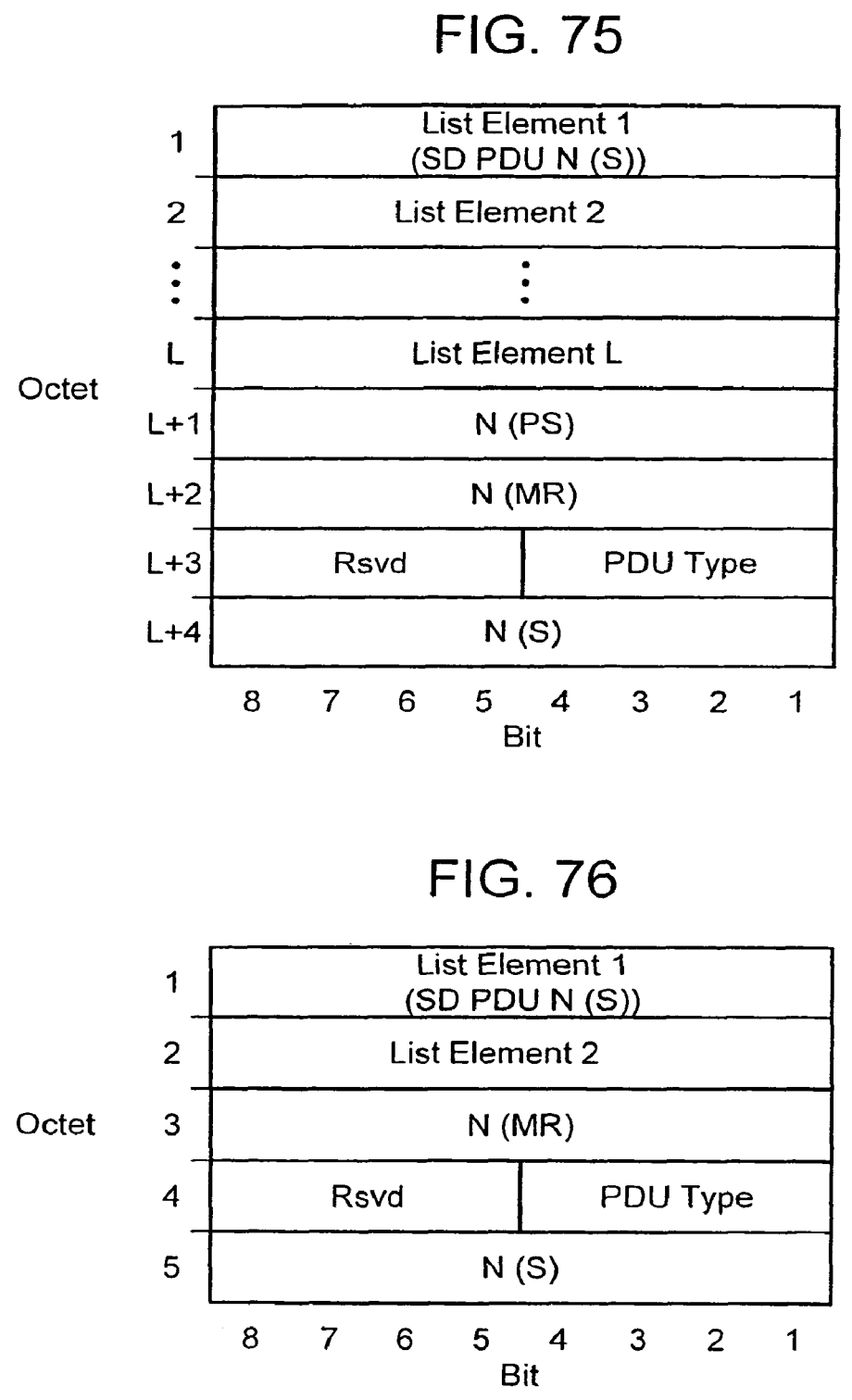

| Octet | Bits 8–5 | Bits 4–1 |
|---|---|---|
| 1 | List Element 1<br>(SD PDU N (S)) | |
| 2 | List Element 2 | |
| ⋮ | ⋮ | |
| L | List Element L | |
| L+1 | N (PS) | |
| L+2 | N (MR) | |
| L+3 | Rsvd | PDU Type |
| L+4 | N (S) | |

Bit: 8 7 6 5 4 3 2 1

FIG. 76

| Octet | Bits 8–5 | Bits 4–1 |
|---|---|---|
| 1 | List Element 1<br>(SD PDU N (S)) | |
| 2 | List Element 2 | |
| 3 | N (MR) | |
| 4 | Rsvd | PDU Type |
| 5 | N (S) | |

Bit: 8 7 6 5 4 3 2 1

FIG. 86

| Octet | 8 | 7 | 6 | 5 | 4 | 3 | 2 | 1 |
|---|---|---|---|---|---|---|---|---|
| 1 | Rsvd | | | | PDU Type | | | |
| 2 | N (MR) | | | | | | | |

Bit

FIG. 96

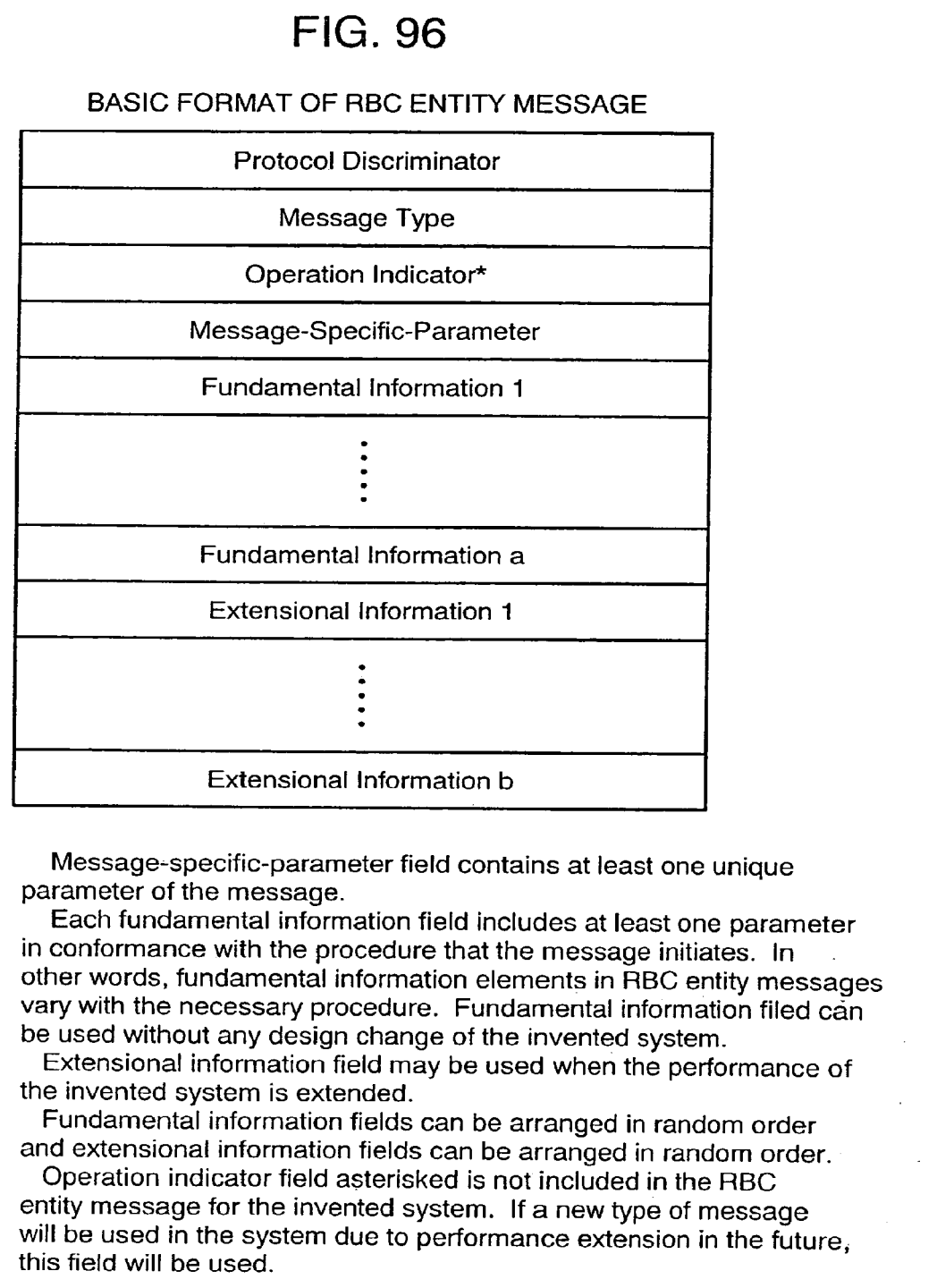

BASIC FORMAT OF RBC ENTITY MESSAGE

| |
|---|
| Protocol Discriminator |
| Message Type |
| Operation Indicator* |
| Message-Specific-Parameter |
| Fundamental Information 1 |
| ⋮ |
| Fundamental Information a |
| Extensional Information 1 |
| ⋮ |
| Extensional Information b |

Message-specific-parameter field contains at least one unique parameter of the message.

Each fundamental information field includes at least one parameter in conformance with the procedure that the message initiates. In other words, fundamental information elements in RBC entity messages vary with the necessary procedure. Fundamental information filed can be used without any design change of the invented system.

Extensional information field may be used when the performance of the invented system is extended.

Fundamental information fields can be arranged in random order and extensional information fields can be arranged in random order.

Operation indicator field asterisked is not included in the RBC entity message for the invented system. If a new type of message will be used in the system due to performance extension in the future, this field will be used.

Message-specific-parameter field is mandatory.

As to each parameter, if the length is variable, the length field indicates that there is no instruction.

As to each parameter, if there is not a parameter that may be used optionally, this fact is indicated by a bit or bits for indicating whether there is a parameter or not.

FIG. 98

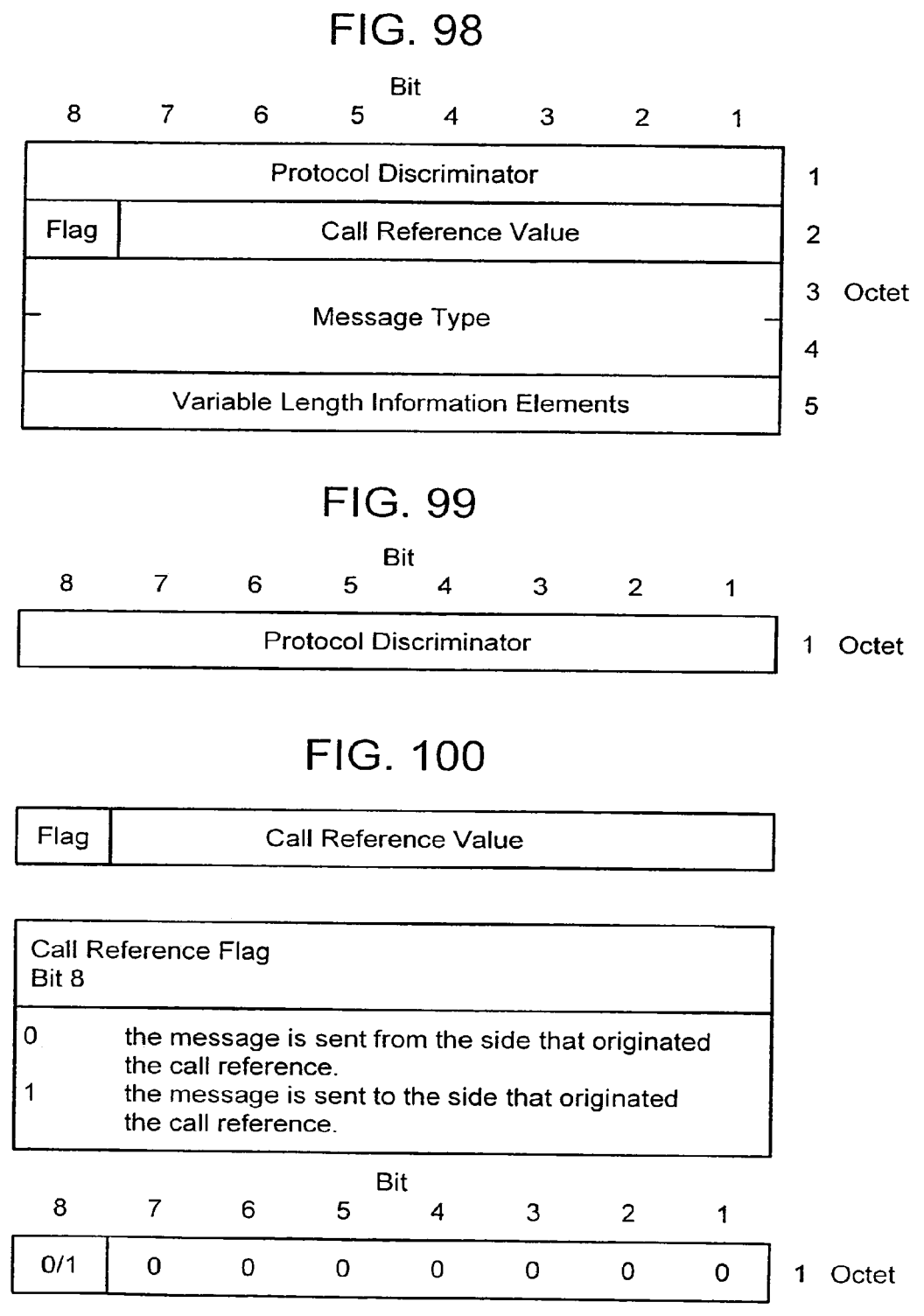

| Bit 8 | 7 | 6 | 5 | 4 | 3 | 2 | 1 | Octet |
|---|---|---|---|---|---|---|---|---|
| Protocol Discriminator | | | | | | | | 1 |
| Flag | Call Reference Value | | | | | | | 2 |
| Message Type | | | | | | | | 3 |
| | | | | | | | | 4 |
| Variable Length Information Elements | | | | | | | | 5 |

FIG. 99

| Bit 8 | 7 | 6 | 5 | 4 | 3 | 2 | 1 | |
|---|---|---|---|---|---|---|---|---|
| Protocol Discriminator | | | | | | | | 1 Octet |

FIG. 100

| | |
|---|---|
| Flag | Call Reference Value |

| Call Reference Flag<br>Bit 8 | |
|---|---|
| 0 | the message is sent from the side that originated the call reference. |
| 1 | the message is sent to the side that originated the call reference. |

| Bit 8 | 7 | 6 | 5 | 4 | 3 | 2 | 1 | |
|---|---|---|---|---|---|---|---|---|
| 0/1 | 0 | 0 | 0 | 0 | 0 | 0 | 0 | 1 Octet |

FIG. 101

Bit

| 8 | 7 | 6 | 5 | 4 | 3 | 2 | 1 | |
|---|---|---|---|---|---|---|---|---|
| 0/1 | 1 | 1 | 1 | 1 | 1 | 1 | 1 | 1 Octet |

FIG. 102

Bit

| 8 | 7 | 6 | 5 | 4 | 3 | 2 | 1 | Octet |
|---|---|---|---|---|---|---|---|---|
| Massage Type | | | | | | | | 1 |
| 1 Ext. | 0 Spare | 0 | Flag | 0 Spare | 0 Spare | Mag. Action Indicator | | 2 |

FIG. 103

Bit

| 8 | 7 | 6 | 5 | 4 | 3 | 2 | 1 | Octet |
|---|---|---|---|---|---|---|---|---|
| Information Element Identifier | | | | | | | | 1 |
| 1 Ext. | Coding Standard | | IE Instruction Field: Flag | Res. | IE Action Ind. | | | 2 (Note 1) |
| Length of Contents of Information Element | | | | | | | | 3 |
| | | | | | | | | 4 |
| Contents of Information Element | | | | | | | | 5 (Note 2) etc. |

T1162620-94/d008

Notes

1 IE instruction field (bits 1 to 5 of octet 2) is interpreted only for unexpected or unrecognized information element or information element with unrecognized contents. With respect to some information elements according to ITU-T Recommendation Q.2931, the value allocated in the IE instruction field is restricted to a combination of limited values (Refer to descriptions of respective infotrmation elements).

2 Usage example of the subfield identifier will be described in Appendix L.

FIG. 104

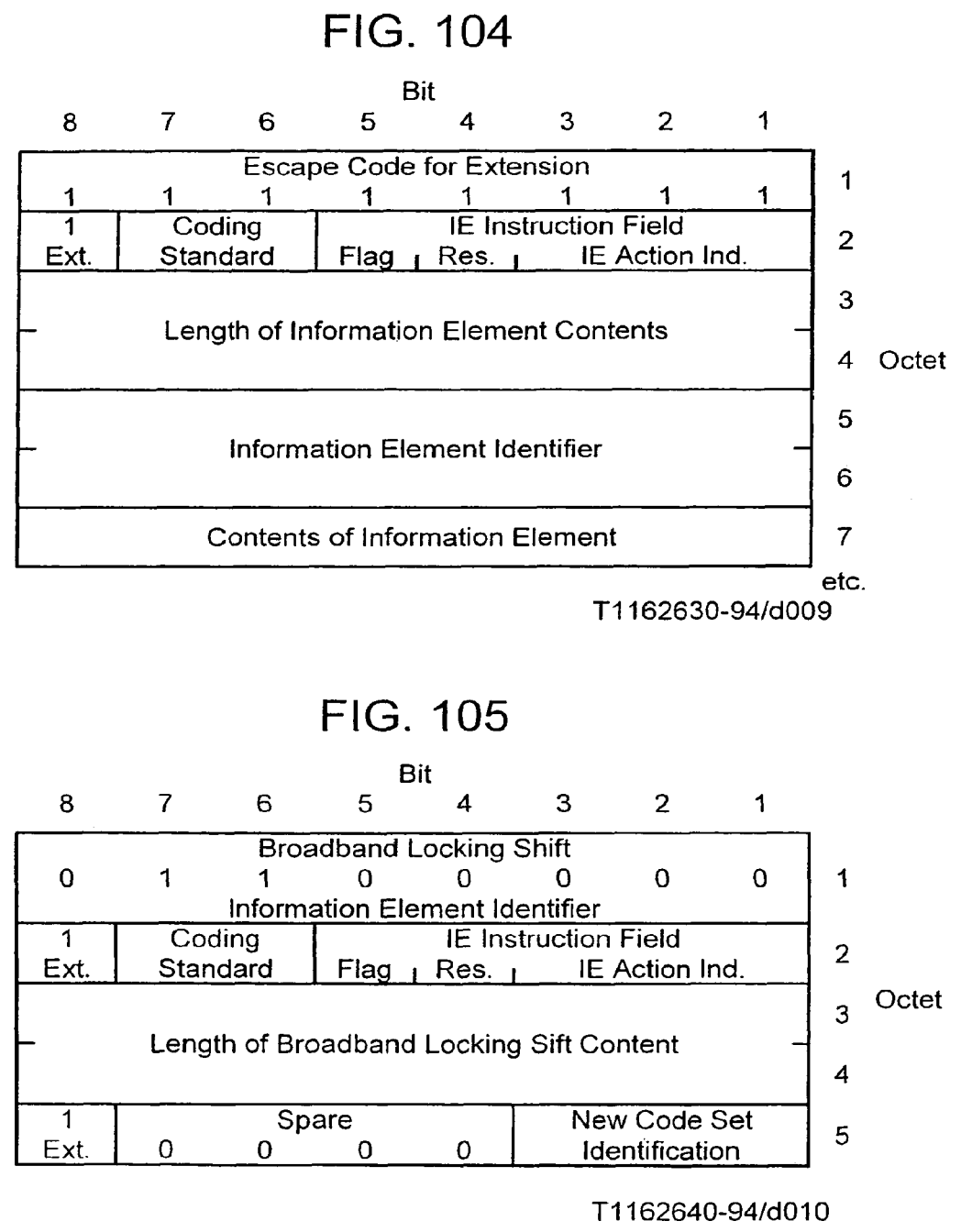

Bit

| 8 | 7 | 6 | 5 | 4 | 3 | 2 | 1 | Octet |
|---|---|---|---|---|---|---|---|---|
| Escape Code for Extension | | | | | | | | |
| 1 | 1 | 1 | 1 | 1 | 1 | 1 | 1 | 1 |
| 1 Ext. | Coding Standard | | IE Instruction Field: Flag | Res. | IE Action Ind. | | | 2 |
| Length of Information Element Contents | | | | | | | | 3 |
| | | | | | | | | 4 |
| Information Element Identifier | | | | | | | | 5 |
| | | | | | | | | 6 |
| Contents of Information Element | | | | | | | | 7 |
| | | | | | | | | etc. |

Bit

| 8 | 7 | 6 | 5 | 4 | 3 | 2 | 1 | Octet |
|---|---|---|---|---|---|---|---|---|
| Broadband Locking Shift | | | | | | | | |
| 0 | 1 | 1 | 0 | 0 | 0 | 0 | 0 | 1 |
| Information Element Identifier | | | | | | | | |
| 1 Ext. | Coding Standard | | IE Instruction Field: Flag | Res. | IE Action Ind. | | | 2 |
| Length of Broadband Locking Sift Content | | | | | | | | 3 |
| | | | | | | | | 4 |
| 1 Ext. | Spare 0 | 0 | 0 | 0 | New Code Set Identification | | | 5 |

Figures 106, 107:
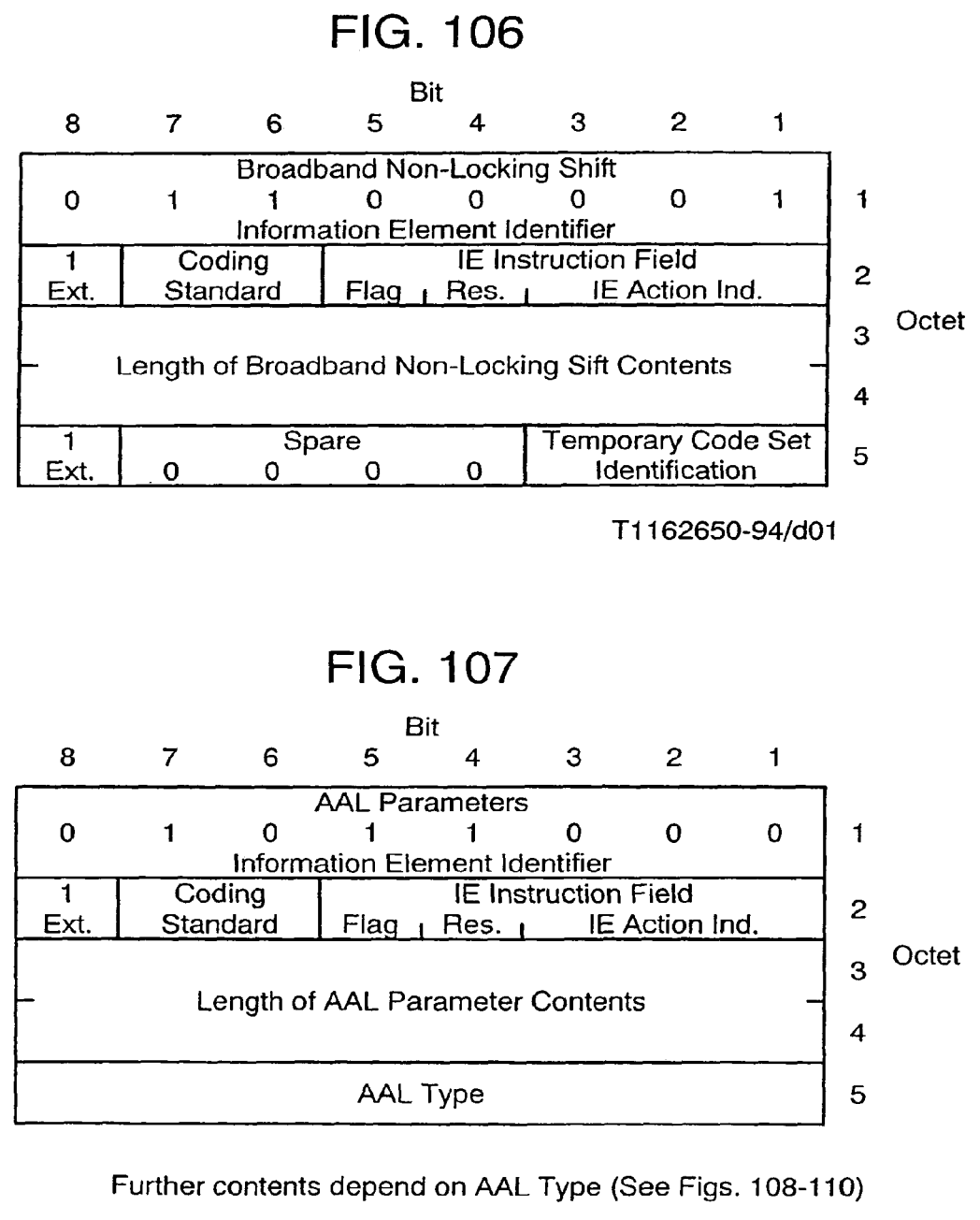

Bit

| 8 | 7 | 6 | 5 | 4 | 3 | 2 | 1 | Octet |
|---|---|---|---|---|---|---|---|---|
| Broadband Non-Locking Shift<br>Information Element Identifier | | | | | | | | |
| 0 | 1 | 1 | 0 | 0 | 0 | 0 | 1 | 1 |
| 1 Ext. | Coding Standard | | IE Instruction Field: Flag, Res., IE Action Ind. | | | | | 2 |
| Length of Broadband Non-Locking Sift Contents | | | | | | | | 3 |
| | | | | | | | | 4 |
| 1 Ext. | Spare 0 | 0 | 0 | 0 | Temporary Code Set Identification | | | 5 |

Bit

| 8 | 7 | 6 | 5 | 4 | 3 | 2 | 1 | Octet |
|---|---|---|---|---|---|---|---|---|
| AAL Parameters<br>Information Element Identifier | | | | | | | | |
| 0 | 1 | 0 | 1 | 1 | 0 | 0 | 0 | 1 |
| 1 Ext. | Coding Standard | | IE Instruction Field: Flag, Res., IE Action Ind. | | | | | 2 |
| Length of AAL Parameter Contents | | | | | | | | 3 |
| | | | | | | | | 4 |
| AAL Type | | | | | | | | 5 |

Further contents depend on AAL Type (See Figs. 108-110)

FIG. 108

(further contents for ALL type 1 )

| Field | Bit 8 | 7 | 6 | 5 | 4 | 3 | 2 | 1 | Octet |
|---|---|---|---|---|---|---|---|---|---|
| Subtype Identifier | 1 | 0 | 0 | 0 | 0 | 1 | 0 | 1 | 6 |
| Subtype | | | | | | | | | 6.1 |
| CBR Rate Identifier | 1 | 0 | 0 | 0 | 0 | 1 | 1 | 0 | 7 |
| CBR Rate | | | | | | | | | 7.1 |
| Multiplier Identifier | 1 | 0 | 0 | 0 | 0 | 1 | 1 | 1 | 8* (Note) |
| Multiplier | | | | | | | | | 8.1* (Note)<br>8.2* (Note) |
| Source Clock Frequency Recovery Method Identifier | 1 | 0 | 0 | 0 | 1 | 0 | 0 | 0 | 9* |
| Source Clock Frequency Recovery Method | | | | | | | | | 9.1* |
| Error Correction Method Identifier | 1 | 0 | 0 | 0 | 1 | 0 | 0 | 1 | 10* |
| Error Correction Method | | | | | | | | | 10.1* |
| Structured Data Transfer Block Size Identifier | 1 | 0 | 0 | 0 | 1 | 0 | 1 | 0 | 11* |
| Structured Data Transfer Block Size | | | | | | | | | 11.1*<br>11.2* |
| Partially Filled Cells Method Identifier | 1 | 0 | 0 | 0 | 1 | 0 | 1 | 1 | 12* |
| Partially Filled Cells Method | | | | | | | | | 12.1* |

Note
These asterisked octets are included only when octet 7.1 indicates n × 64 kbps or n × 8 kbps.

FIG. 109

(further contents for ALL type 3/4 )

| Bit 8 | 7 | 6 | 5 | 4 | 3 | 2 | 1 | Octet |
|---|---|---|---|---|---|---|---|---|
| Forward Maximum CPCS-SDU Size Identifier | | | | | | | | |
| 1 | 0 | 0 | 0 | 1 | 1 | 0 | 0 | 6* |
| Forward Maximum CPCS-SDU Size | | | | | | | | 6.1* 6.2* |
| Backward Maximum CPCS-SDU Size Identifier | | | | | | | | |
| 1 | 0 | 0 | 0 | 0 | 1 | 1 | 1 | 7* |
| Backward Maximum CPCS-SDU Size | | | | | | | | 7.1* 7.2* |
| MID Range Identifier | | | | | | | | |
| 1 | 0 | 0 | 0 | 0 | 0 | 1 | 0 | 8* |
| MID Range (Lowest MID Value) | | | | | | | | 8.1* 8.2* |
| MID Range (Highest MID Value) | | | | | | | | 8.3* 8.4* |
| SSCS-Type Identifier | | | | | | | | |
| 1 | 0 | 0 | 0 | 0 | 1 | 0 | 0 | 9* |
| SSCS-Type | | | | | | | | 9.1* |

Note
The indication of octet groups 6 through 8 used in connect message is designated in ITU-T Recommendation Q.2931.

FIG. 110

(further contents for ALL type 5)

| Bit 8 | 7 | 6 | 5 | 4 | 3 | 2 | 1 | Octet |
|---|---|---|---|---|---|---|---|---|
| Forward Maximum CPCS-SDU Size Identifier | | | | | | | | |
| 1 | 0 | 0 | 0 | 1 | 1 | 0 | 0 | 6* |
| Forward Maximum CPCS-SDU Size | | | | | | | | 6.1* 6.2* |
| Backward Maximum CPCS-SDU Size Identifier | | | | | | | | |
| 1 | 0 | 0 | 0 | 0 | 0 | 0 | 1 | 7* |
| Backward Maximum CPCS-SDU Size | | | | | | | | 7.1* 7.2* |
| SSCS-Type Identifier | | | | | | | | |
| 1 | 0 | 0 | 0 | 0 | 1 | 0 | 0 | 8* |
| SSCS-Type | | | | | | | | 8.1* |

Note

The indication of octet groups 6 and 7 used in connect message is designated in ITU-T Recommendation Q.2931.

FIG. 111

(further contents for User-defined AAL)

| Bit 8 7 6 5 4 3 2 1 | Octet |
|---|---|
| User Defined AAL Information | 5.1* |
| User Defined AAL Information | 5.2* |
| User Defined AAL Information | 5.3* |
| User Defined AAL Information | 5.4* |

FIG. 112

Bit

| 8 | 7 | 6 | 5 | 4 | 3 | 2 | 1 | Octet |
|---|---|---|---|---|---|---|---|---|
| ATM Traffic Descriptor | | | | | | | | |
| 0 | 1 | 0 | 1 | 1 | 0 | 0 | 1 | 1 |
| Information Element Identifier | | | | | | | | |
| 1 Ext. | Coding Standard | | IE Instruction Field: Flag | Res. | IE Action Ind. | | | 2 |
| Length of ATM Traffic Descriptor Contents | | | | | | | | 3 |
| | | | | | | | | 4 |
| Forward Peak Cell Rate Identifier (CLP=0) | | | | | | | | |
| 1 | 0 | 0 | 0 | 0 | 0 | 1 | 0 | 5 (Note 1) |
| Forward Peak Cell Rate (for CLP=0) | | | | | | | | 5.1 |
| | | | | | | | | 5.2 |
| | | | | | | | | 5.3 |
| Backward Peak Cell Rate Identifier (CLP=0) | | | | | | | | |
| 1 | 0 | 0 | 0 | 0 | 0 | 1 | 1 | 6 (Note 1) |
| Backward Peak Cell Rate (for CLP=0) | | | | | | | | 6.1 |
| | | | | | | | | 6.2 |
| | | | | | | | | 6.3 |
| Forward Peak Cell Rate Identifier (CLP=0+1) | | | | | | | | |
| 1 | 0 | 0 | 0 | 0 | 1 | 0 | 0 | 7 (Note 2) |
| Forward Peak Cell Rate (for CLP=0+1) | | | | | | | | 7.1 |
| | | | | | | | | 7.2 |
| | | | | | | | | 7.3 |
| Backward Peak Cell Rate Identifier (CLP=0+1) | | | | | | | | |
| 1 | 0 | 0 | 0 | 0 | 1 | 0 | 1 | 8 (Note 3) |

CONTINUED FROM FIG. 112

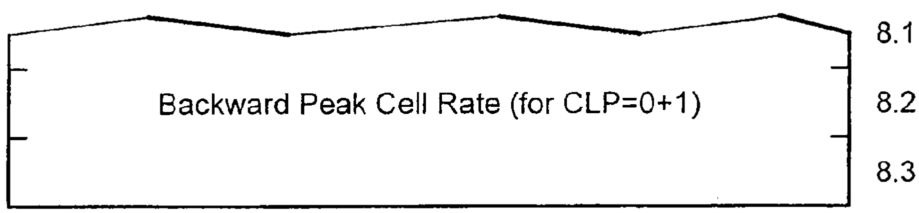

T1162710-94/d017

Notes

1 If the peak cell rate for which the CLP is zero is indicated, the difference between the peak cell rate for which the CLP is zero or one and the peak cell rate for which the CLP is zero should be used as the peak cell rate for which the CLP is one in the network resource allocation.

2 If only the peak cell rate for which the CLP is one or zero is indicated, a complete peak cell rate should be used by cells with which the CLP is zero.

FIG. 113

| Bit 8 | 7 | 6 | 5 | 4 | 3 | 2 | 1 | Octet |
|---|---|---|---|---|---|---|---|---|
| Broadband Bearer Capability | | | | | | | | |
| 0 | 1 | 0 | 1 | 1 | 1 | 1 | 0 | 1 |
| Information Element Identifier | | | | | | | | |
| 1 Ext. | Coding Standard | | IE Instruction Field: Flag | Res. | IE Action Ind. | | | 2 |
| Length of the Broadband Bearer Capability Contents | | | | | | | | 3 |
| | | | | | | | | 4 |
| 0/1 Ext. | 0 Spare | 0 | Bearer Class | | | | | 5 |
| 1 Ext. | 0 Spare | 0 | Traffic Type | | | Timing Requirements | | 5a* (Note) |
| 1 Ext. | Susceptibility to Clipping | | 0 Spare | 0 | 0 | User-Plane Connection Configuration | | 6 |

T1162720-94/d018

Note
The asterisked octet can be included when octet 5 indicates bearer class X.

FIG. 114

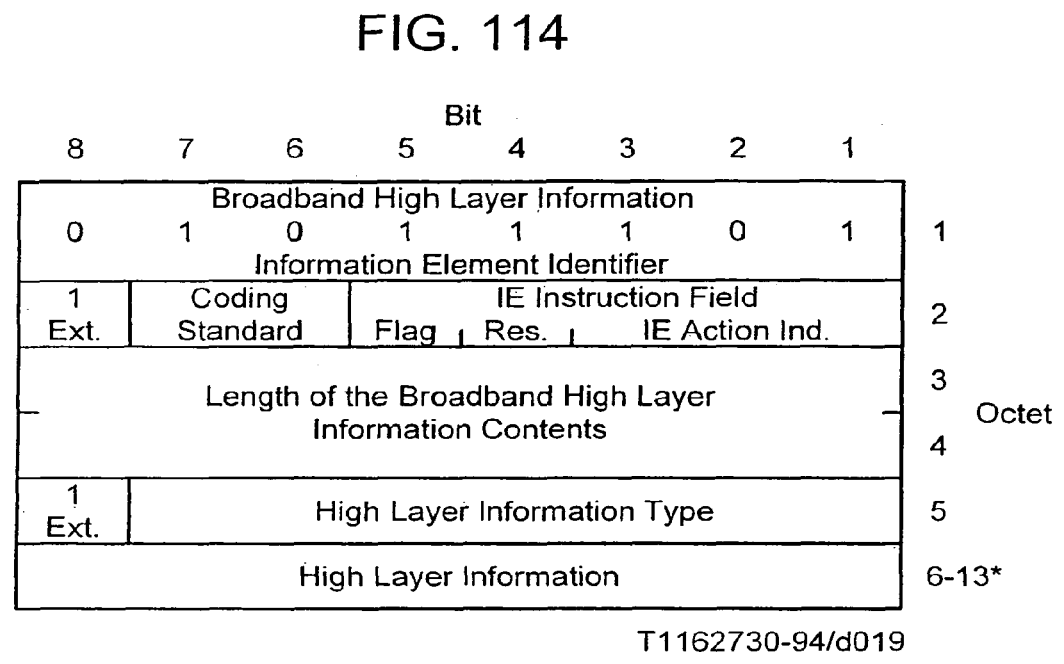

| Bit 8 | 7 | 6 | 5 | 4 | 3 | 2 | 1 | Octet |
|---|---|---|---|---|---|---|---|---|
| Broadband High Layer Information | | | | | | | | |
| 0 | 1 | 0 | 1 | 1 | 1 | 0 | 1 | 1 |
| Information Element Identifier | | | | | | | | |
| 1 Ext. | Coding Standard | | IE Instruction Field: Flag | Res. | IE Action Ind. | | | 2 |
| Length of the Broadband High Layer Information Contents | | | | | | | | 3–4 |
| 1 Ext. | High Layer Information Type | | | | | | | 5 |
| High Layer Information | | | | | | | | 6-13* |

Bit

| 8 | 7 | 6 | 5 | 4 | 3 | 2 | 1 | Octet |
|---|---|---|---|---|---|---|---|---|
| Broadband Low Layer Information | | | | | | | | |
| 0 | 1 | 0 | 1 | 1 | 1 | 1 | 1 | 1 |
| Information Element Identifier | | | | | | | | |
| 1 Ext. | Coding Standard | | IE Instruction Field Flag | Res. | IE Action Ind. | | | 2 |
| Length of the Broadband Low Layer Information Contents | | | | | | | | 3 |
| | | | | | | | | 4 |
| 1 Ext. | 0 Layer 1 Id. | 1 | User Information Layer 1 Protocol | | | | | 5* |
| 0/1 Ext. | 1 Layer 2 Id. | 0 | User Information Layer 2 Protocol | | | | | 6* |
| 0/1 Ext. | Mode | | 0 | 0 Spare | 0 | Q.933 Use | | 6a* (Note 1) |
| 1 Ext. | Window Size (k) | | | | | | | 6b* (Note 1) |
| 1 Ext. | User Specified Layer 2 Protocol Information | | | | | | | 6a* (Note 2) |
| 0/1 Ext. | 1 Layer 3 Id. | 1 | User Information Layer 3 Protocol | | | | | 7* |
| 0/1 Ext. | Mode | | 0 | 0 | 0 Spare | 0 | 0 | 7a* (Note 3) |
| 0/1 Ext. | 0 | 0 Spare | 0 | Default Packet Size | | | | 7b* (Note 3) |
| 1 Ext. | Packet Window Size | | | | | | | 7c* (Note 3) |
| 1 Ext. | User Specified Layer 3 Protocol Information | | | | | | | 7a* (Note 4) |

FIG. 116

| | |
|---|---|
| Additional Layer 3 Protocol Information | 7.1* (Note 5) |
| (cont.) | 7.2* (Note 5) |
| (cont.) | 7.3* (Note 5) |
| (cont.) | 7.4* (Note 5) |
| (cont.) | 7.5* (Note 5) |
| (cont.) | 7.6* (Note 5) |
| (cont.) | 7.7* (Note 5) |
| (cont.) | 7.8* (Note 5) |

T1162750-94/d021

Notes

1 This octet is included only when octet 6 indicates the procedure of acknowledge type HDLC.

2 This octet exists only if octet 6 indicates the user-specific layer 2 protocol.

3 This octet exists only if octet 7 indicates the layer 3 protocol in accordance with the ITU-T Recommendation X.25, ISO/IEC 8208, ITU-T Recommendation X.223, or ISO/IEC 8878.

4 This octet exists only if octet 7 indicates the user-specific layer 3 protocol.

5 These octets exist only if octet 7 indicates ISO/IEC TR9577.

FIG. 117

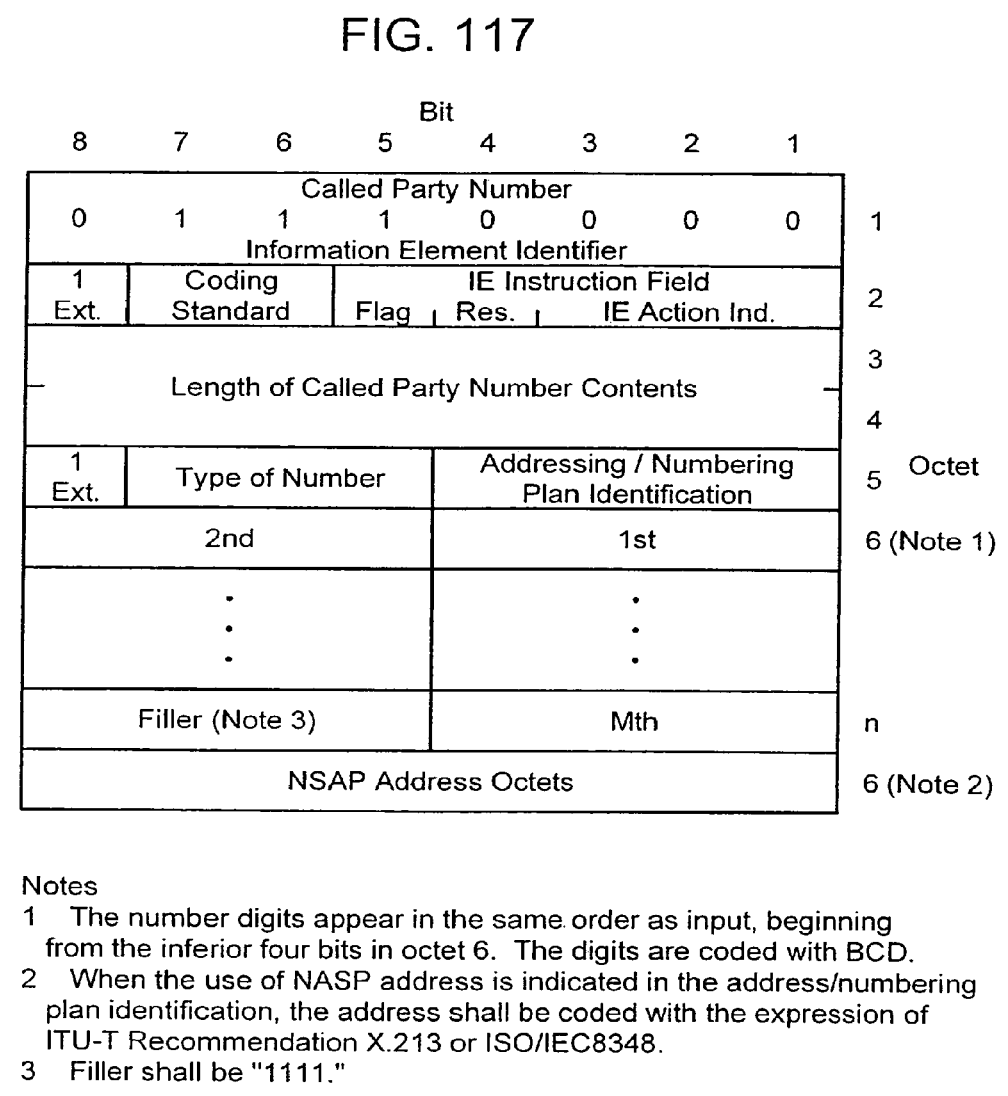

| Bit 8 | 7 | 6 | 5 | 4 | 3 | 2 | 1 | Octet |
|---|---|---|---|---|---|---|---|---|
| Called Party Number | | | | | | | | |
| 0 | 1 | 1 | 1 | 0 | 0 | 0 | 0 | 1 |
| Information Element Identifier | | | | | | | | |
| 1 Ext. | Coding Standard | | IE Instruction Field: Flag | Res. | IE Action Ind. | | | 2 |
| Length of Called Party Number Contents | | | | | | | | 3 |
| | | | | | | | | 4 |
| 1 Ext. | Type of Number | | | Addressing / Numbering Plan Identification | | | | 5 |
| 2nd | | | | 1st | | | | 6 (Note 1) |
| ⋮ | | | | ⋮ | | | | |
| Filler (Note 3) | | | | Mth | | | | n |
| NSAP Address Octets | | | | | | | | 6 (Note 2) |

Notes

1 The number digits appear in the same order as input, beginning from the inferior four bits in octet 6. The digits are coded with BCD.

2 When the use of NASP address is indicated in the address/numbering plan identification, the address shall be coded with the expression of ITU-T Recommendation X.213 or ISO/IEC8348.

3 Filler shall be "1111."

FIG. 118

Bit

| 8 | 7 | 6 | 5 | 4 | 3 | 2 | 1 | Octet |
|---|---|---|---|---|---|---|---|---|
| Called Party Sub-Address<br>0 | 1 | 1 | 1 | 0 | 0 | 0 | 1<br>Information Element Identifier | 1 |
| 1/0 Ext. | Coding Standard | | IE Instruction Field<br>Flag | Res. | IE Action Ind. | | | 2 |
| Length of Called Party Sub -Address Contents | | | | | | | | 3<br>4 |
| 1/0 Ext. | Type of Sub-Address | | | Odd / Even Indicator | 0 | 0<br>Spare | 0 | 5 |
| Sub-Address Information | | | | | | | | 6<br>etc. |

FIG. 119

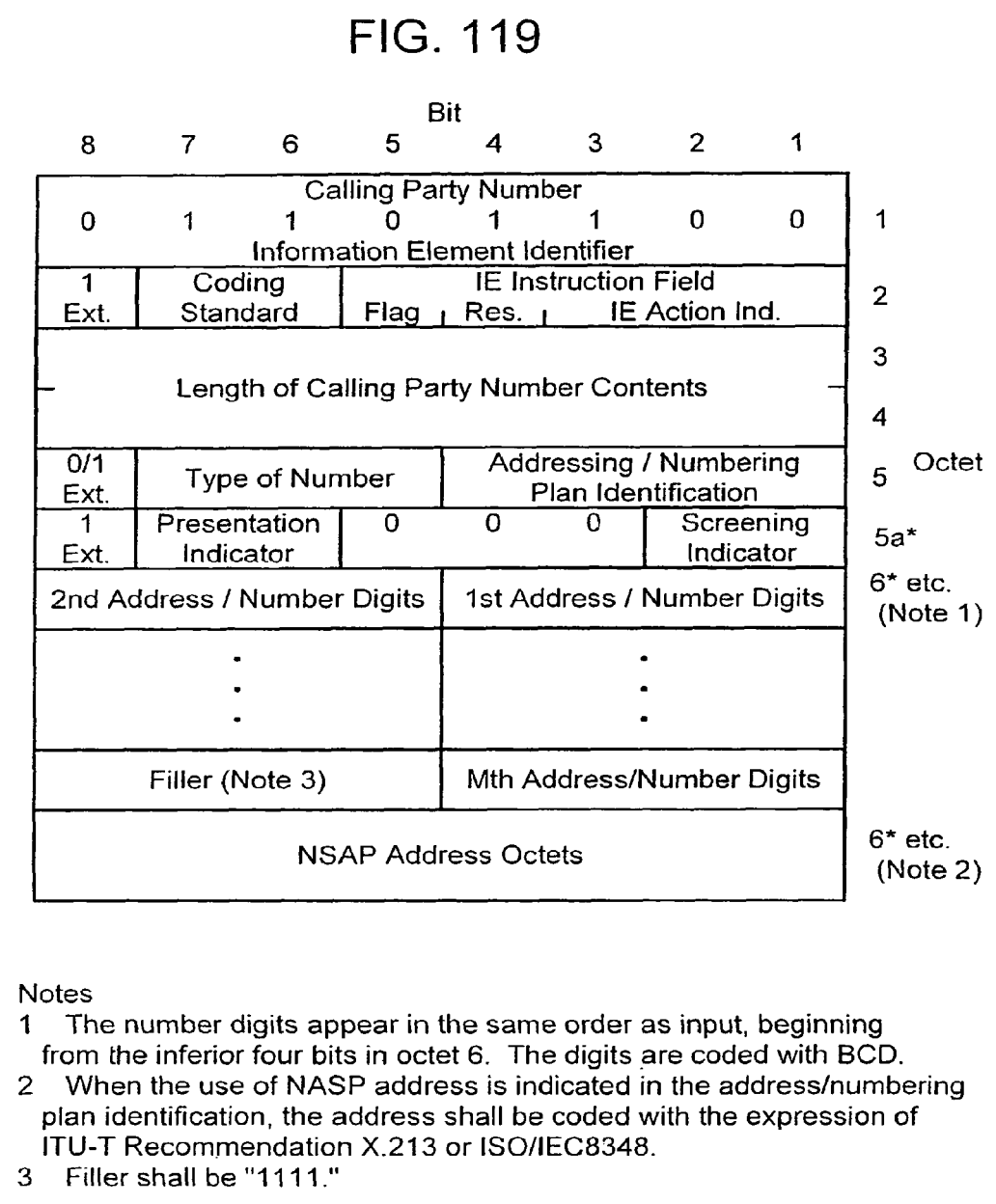

Bit

| 8 | 7 | 6 | 5 | 4 | 3 | 2 | 1 | Octet |
|---|---|---|---|---|---|---|---|---|
| Calling Party Number | | | | | | | | |
| 0 | 1 | 1 | 0 | 1 | 1 | 0 | 0 | 1 |
| Information Element Identifier | | | | | | | | |
| 1 Ext. | Coding Standard | | IE Instruction Field: Flag | Res. | IE Action Ind. | | | 2 |
| Length of Calling Party Number Contents | | | | | | | | 3 |
| | | | | | | | | 4 |
| 0/1 Ext. | Type of Number | | | Addressing / Numbering Plan Identification | | | | 5 |
| 1 Ext. | Presentation Indicator | | 0 | 0 | 0 | Screening Indicator | | 5a* |
| 2nd Address / Number Digits | | | | 1st Address / Number Digits | | | | 6* etc. (Note 1) |
| ⋮ | | | | ⋮ | | | | |
| Filler (Note 3) | | | | Mth Address/Number Digits | | | | |
| NSAP Address Octets | | | | | | | | 6* etc. (Note 2) |

Notes

1 The number digits appear in the same order as input, beginning from the inferior four bits in octet 6. The digits are coded with BCD.

2 When the use of NASP address is indicated in the address/numbering plan identification, the address shall be coded with the expression of ITU-T Recommendation X.213 or ISO/IEC8348.

3 Filler shall be "1111."

FIG. 120

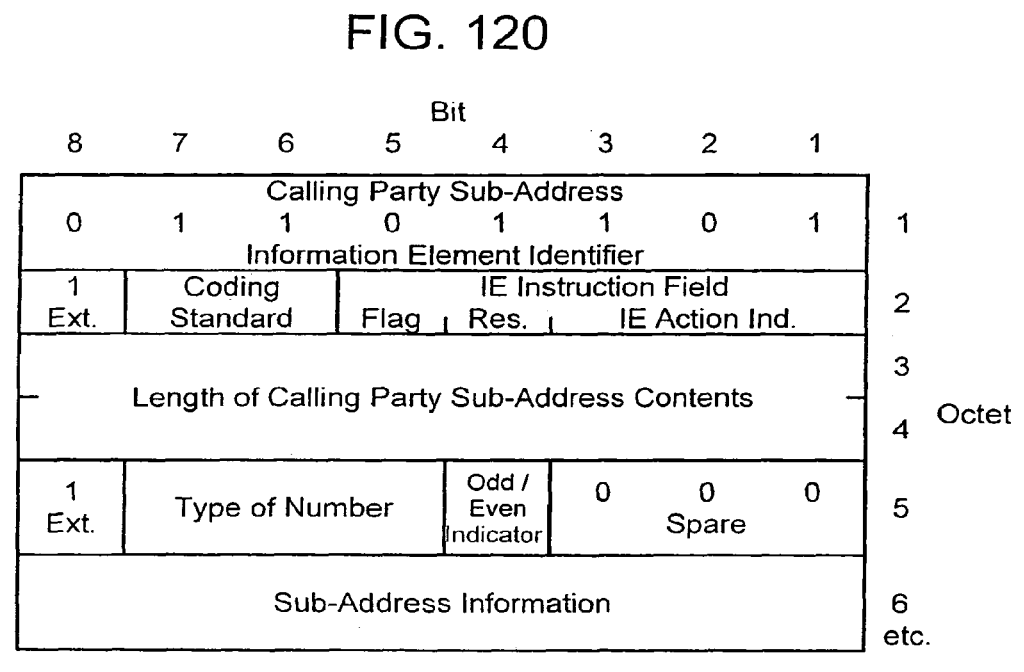

Bit

| 8 | 7 | 6 | 5 | 4 | 3 | 2 | 1 | Octet |
|---|---|---|---|---|---|---|---|---|
| Calling Party Sub-Address<br>0 | 1 | 1 | 0 | 1 | 1 | 0 | 1<br>Information Element Identifier | 1 |
| 1<br>Ext. | Coding Standard | | IE Instruction Field<br>Flag | Res. | IE Action Ind. | | | 2 |
| Length of Calling Party Sub-Address Contents | | | | | | | | 3<br>4 |
| 1<br>Ext. | Type of Number | | | Odd / Even Indicator | 0 | 0<br>Spare | 0 | 5 |
| Sub-Address Information | | | | | | | | 6<br>etc. |

FIG. 121

Bit

| 8 | 7 | 6 | 5 | 4 | 3 | 2 | 1 | Octet |
|---|---|---|---|---|---|---|---|---|
| Connection Identifier | | | | | | | | |
| 0 | 1 | 0 | 1 | 1 | 0 | 1 | 0 | 1 |
| Information Element Identifier | | | | | | | | |
| 1 Ext. | Coding Standard | | IE Instruction Field: Flag | IE Instruction Field: Res. | IE Instruction Field: IE Action Ind. | | | 2 |
| Length of Connection Identifier Contents | | | | | | | | 3 |
| | | | | | | | | 4 |
| 1 Ext. | 0 Spare | 0 Spare | Vp-Assoc. Signaling | | Preferred / Exclusive | | | 5 |
| VPCI | | | | | | | | 6 (Note 3) |
| | | | | | | | | 7 |
| VCI | | | | | | | | 8 (Notes 1 and 2) |
| | | | | | | | | 9 |

Notes

1 If the change addition indicator field designates an "arbitrary VCI," the VCI field must be ignored.

2 If the restart class is "001" (see ITU-T Recommendation Q.2931), the VCI field should be ignored.

3 If VP-associated signaling is designated in octet 5, the VPCI field must be ignored.

FIG. 122

| Bit 8 | 7 | 6 | 5 | 4 | 3 | 2 | 1 | Octet |
|---|---|---|---|---|---|---|---|---|
| End-to-end Transit Delay<br>0 | 1 | 0 | 0 | 0 | 0 | 1 | 0<br>Information Element Identifier | 1 |
| 1<br>Ext. | Coding Standard | | IE Instruction Field<br>Flag | Res. | IE Action Ind. | | | 2 |
| Length of End-to-end Transit Delay Contents | | | | | | | | 3<br>4 |
| Cumulative Transit Delay Identifier<br>0 | 0 | 0 | 0 | 0 | 0 | 0 | 1 | 5 |
| Cumulative Transit Delay Value | | | | | | | | 5.1<br>5.2 |
| Maximum End-to-end Transit Delay Identifier<br>0 | 0 | 0 | 0 | 0 | 0 | 1 | 1 | 6* |
| Maximum End-to-end Transit Delay Value | | | | | | | | 6.1*<br>6.2 |

FIG. 123

| Bit 8 | 7 | 6 | 5 | 4 | 3 | 2 | 1 | Octet |
|---|---|---|---|---|---|---|---|---|
| Quality Service Parameter<br>0 | 1 | 0 | 1 | 1 | 1 | 0 | 0<br>Information Element Identifier | 1 |
| 1<br>Ext. | Coding Standard | | IE Instruction Field<br>Flag | Res. | IE Action Ind. | | | 2 |
| Length of QOS Parameter Contents | | | | | | | | 3<br>4 |
| QOS Class Forward | | | | | | | | 5 |
| QOS Class Backward | | | | | | | | 6 |

FIG. 124

<table>
<tr><th colspan="8">Bit</th><th></th></tr>
<tr><th>8</th><th>7</th><th>6</th><th>5</th><th>4</th><th>3</th><th>2</th><th>1</th><th>Octet</th></tr>
<tr><td colspan="8">Broadband Repeat Indicator</td><td rowspan="3">1</td></tr>
<tr><td>0</td><td>1</td><td>1</td><td>0</td><td>0</td><td>0</td><td>1</td><td>1</td></tr>
<tr><td colspan="8">Information Element Identifier</td></tr>
<tr><td>1<br>Ext.</td><td colspan="2">Coding<br>Standard</td><td colspan="5">IE Instruction Field<br>Flag | Res. | IE Action Ind.</td><td>2</td></tr>
<tr><td colspan="8" rowspan="2">Length of Broadband Repeat Indicator Contents</td><td>3</td></tr>
<tr><td>4</td></tr>
<tr><td>1<br>Ext.</td><td>0</td><td>0<br>Spare</td><td>0</td><td colspan="4">Broadband Repeat Indicator</td><td>5</td></tr>
</table>

FIG. 125

<table>
<tr><th colspan="8">Bit</th><th></th></tr>
<tr><th>8</th><th>7</th><th>6</th><th>5</th><th>4</th><th>3</th><th>2</th><th>1</th><th>Octet</th></tr>
<tr><td colspan="8">Broadband Sending Complete</td><td rowspan="3">1</td></tr>
<tr><td>0</td><td>1</td><td>1</td><td>0</td><td>0</td><td>0</td><td>1</td><td>0</td></tr>
<tr><td colspan="8">Information Element Identifier</td></tr>
<tr><td>1<br>Ext.</td><td colspan="2">Coding<br>Standard</td><td colspan="5">IE Instruction Field<br>Flag | Res. | IE Action Ind.</td><td>2</td></tr>
<tr><td colspan="8" rowspan="2">Length of Broadband Sending Complete Contents</td><td>3</td></tr>
<tr><td>4</td></tr>
<tr><td rowspan="2">1<br>Ext.</td><td colspan="7">Broadband Sending Complete Indication</td><td rowspan="2">5</td></tr>
<tr><td>0</td><td>1</td><td>0</td><td>0</td><td>0</td><td>0</td><td>1</td></tr>
</table>

FIG. 126

| Bit 8 | 7 | 6 | 5 | 4 | 3 | 2 | 1 | Octet |
|---|---|---|---|---|---|---|---|---|
| Transit Network Selection | | | | | | | | |
| 0 | 1 | 1 | 1 | 1 | 0 | 1 | 1 | 1 |
| Information Element Identifier | | | | | | | | |
| 1 Ext. | Coding Standard | | IE Instruction Field: Flag | Res. | IE Action Ind. | | | 2 |
| Length of Transit Network Selection Contents | | | | | | | | 3 |
| | | | | | | | | 4 |
| 1 Ext. | Type of Network Identification | | | Network Identification Plan | | | | 5 |
| 0 | Network Identification (IA5 Characters) | | | | | | | 6 etc. |

FIG. 127

| Bit 8 | 7 | 6 | 5 | 4 | 3 | 2 | 1 | Octet |
|---|---|---|---|---|---|---|---|---|
| Notification Indicator | | | | | | | | |
| 0 | 0 | 1 | 0 | 0 | 1 | 1 | 1 | 1 |
| Information Element Identifier | | | | | | | | |
| 1 Ext. | Coding Standard | | IE Instruction Field: Flag | Res. | IE Action Ind. | | | 2 |
| Length of Notification Indicator Contents | | | | | | | | 3 |
| | | | | | | | | 4 |
| Further Contents as Defined in Other ITU-T Recommendations, e. g., Q.932 | | | | | | | | 5 |

FIG. 128

Bit

| 8 | 7 | 6 | 5 | 4 | 3 | 2 | 1 | Octet |
|---|---|---|---|---|---|---|---|---|
| OAM Traffic Descriptor<br>0 | 1 | 0 | 1 | 1 | 0 | 1 | 1<br>Information Element Identifier | 1 |
| 1<br>Ext. | Coding Standard | | IE Instruction Field<br>Flag | Res. | IE Action Ind. | | | 2 |
| Length of OAM Traffic Descriptor Contents | | | | | | | | 3<br>4 |
| 1<br>Ext. | Shaping Indicator | | Cmpl. Ind. | 0<br>Spare | User-Network Fault Mngt. Ind. | | | 5 |
| 1<br>Ext. | Fwd. e.-to-e. OAM F5 Flow Indicator | | | 0<br>Spare | Bwd. e.-to-e. OAM F5 Flow Indicator | | | 6 |

FIG. 129

Bit

| 8 | 7 | 6 | 5 | 4 | 3 | 2 | 1 | Octet |
|---|---|---|---|---|---|---|---|---|
| Narrow-band Bearer Capability<br>0 | 0 | 0 | 0 | 0 | 1 | 0 | 0<br>Information Element Identifier | 1 |
| 1<br>Ext. | Coding Standard | | IE Instruction Field<br>Flag | Res. | IE Action Ind. | | | 2 |
| Length of Narrow-band Bearer Capability Contents | | | | | | | | 3<br>4 |
| Further Contents as Described in Figure 4-11 and Table 4-6 of ITU-T Recommendation Q.931 | | | | | | | | |

FIG. 130

Bit

| 8 | 7 | 6 | 5 | 4 | 3 | 2 | 1 | Octet |
|---|---|---|---|---|---|---|---|---|
| Narrow-band High Layer Compatibility<br>0 | 1 | 1 | 1 | 1 | 1 | 0 | 1<br>Information Element Identifier | 1 |
| 1<br>Ext. | Coding Standard | | IE Instruction Field<br>Flag | Res. | IE Action Ind. | | | 2 |
| Length of Narrow-band High Layer Compatibility Contents | | | | | | | | 3<br>4 |
| Further Contents as in Figure 4-23 and Table 4-15 of ITU-T Recommendation Q.931 | | | | | | | | |

FIG. 131

Bit

| 8 | 7 | 6 | 5 | 4 | 3 | 2 | 1 | Octet |
|---|---|---|---|---|---|---|---|---|
| Narrow- band Low Layer Compatibility<br>0 | 1 | 1 | 1 | 1 | 1 | 0 | 0<br>Information Element Identifier | 1 |
| 1<br>Ext. | Coding Standard | | IE Instruction Field<br>Flag | Res. | IE Action Ind. | | | 2 |
| Length of Narrow-band Low Layer Compatibility Contents | | | | | | | | 3<br>4 |
| Further Contents as in Figure 4-25 and Table 4-16 of ITU-T Recommendation Q.931 | | | | | | | | |

FIG. 132

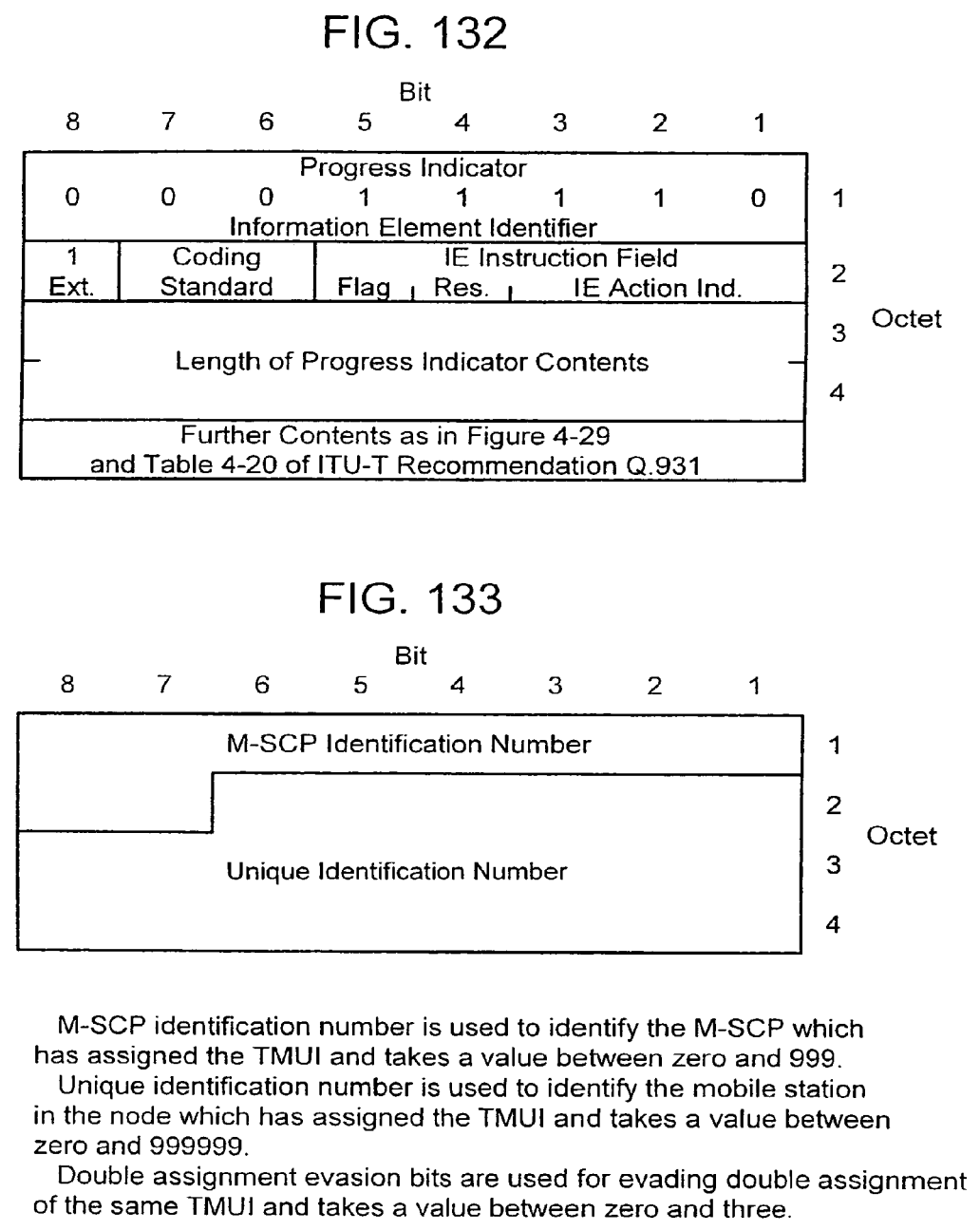

| Bit 8 | 7 | 6 | 5 | 4 | 3 | 2 | 1 | Octet |
|---|---|---|---|---|---|---|---|---|
| Progress Indicator | | | | | | | | |
| 0 | 0 | 0 | 1 | 1 | 1 | 1 | 0 | 1 |
| Information Element Identifier | | | | | | | | |
| 1 Ext. | Coding Standard | | IE Instruction Field: Flag | Res. | IE Action Ind. | | | 2 |
| Length of Progress Indicator Contents | | | | | | | | 3 |
| | | | | | | | | 4 |
| Further Contents as in Figure 4-29 and Table 4-20 of ITU-T Recommendation Q.931 | | | | | | | | |

FIG. 133

| Bit 8 | 7 | 6 | 5 | 4 | 3 | 2 | 1 | Octet |
|---|---|---|---|---|---|---|---|---|
| M-SCP Identification Number | | | | | | | | 1 |
| M-SCP Identification Number (cont.) | | Unique Identification Number | | | | | | 2 |
| Unique Identification Number | | | | | | | | 3 |
| | | | | | | | | 4 |

M-SCP identification number is used to identify the M-SCP which has assigned the TMUI and takes a value between zero and 999.

Unique identification number is used to identify the mobile station in the node which has assigned the TMUI and takes a value between zero and 999999.

Double assignment evasion bits are used for evading double assignment of the same TMUI and takes a value between zero and three.

FIG. 137

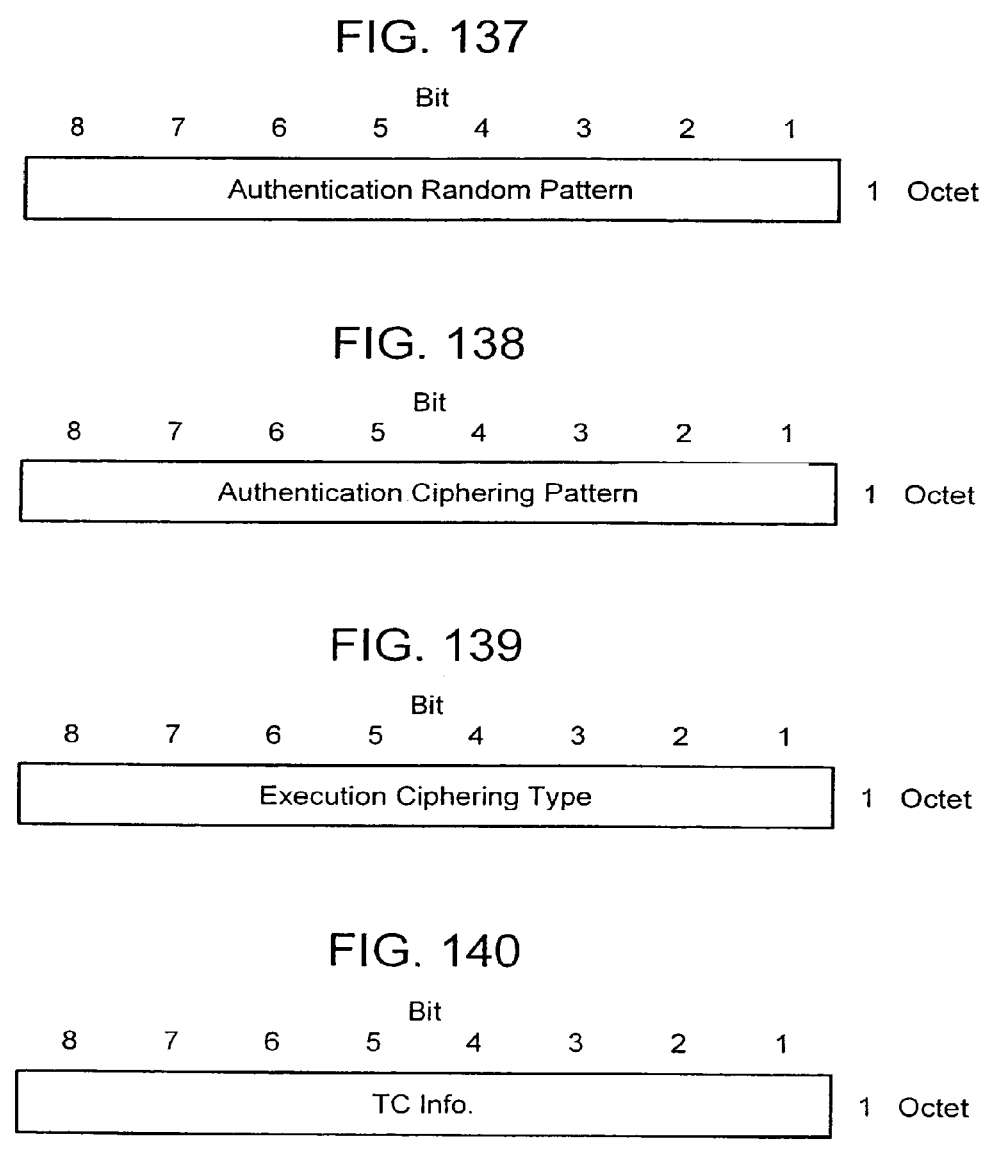

| Bit 8 | 7 | 6 | 5 | 4 | 3 | 2 | 1 | |
|---|---|---|---|---|---|---|---|---|
| Authentication Random Pattern | | | | | | | | 1 Octet |

FIG. 138

| Bit 8 | 7 | 6 | 5 | 4 | 3 | 2 | 1 | |
|---|---|---|---|---|---|---|---|---|
| Authentication Ciphering Pattern | | | | | | | | 1 Octet |

FIG. 139

| Bit 8 | 7 | 6 | 5 | 4 | 3 | 2 | 1 | |
|---|---|---|---|---|---|---|---|---|
| Execution Ciphering Type | | | | | | | | 1 Octet |

FIG. 140

| Bit 8 | 7 | 6 | 5 | 4 | 3 | 2 | 1 | |
|---|---|---|---|---|---|---|---|---|
| TC Info. | | | | | | | | 1 Octet |

FIG. 141

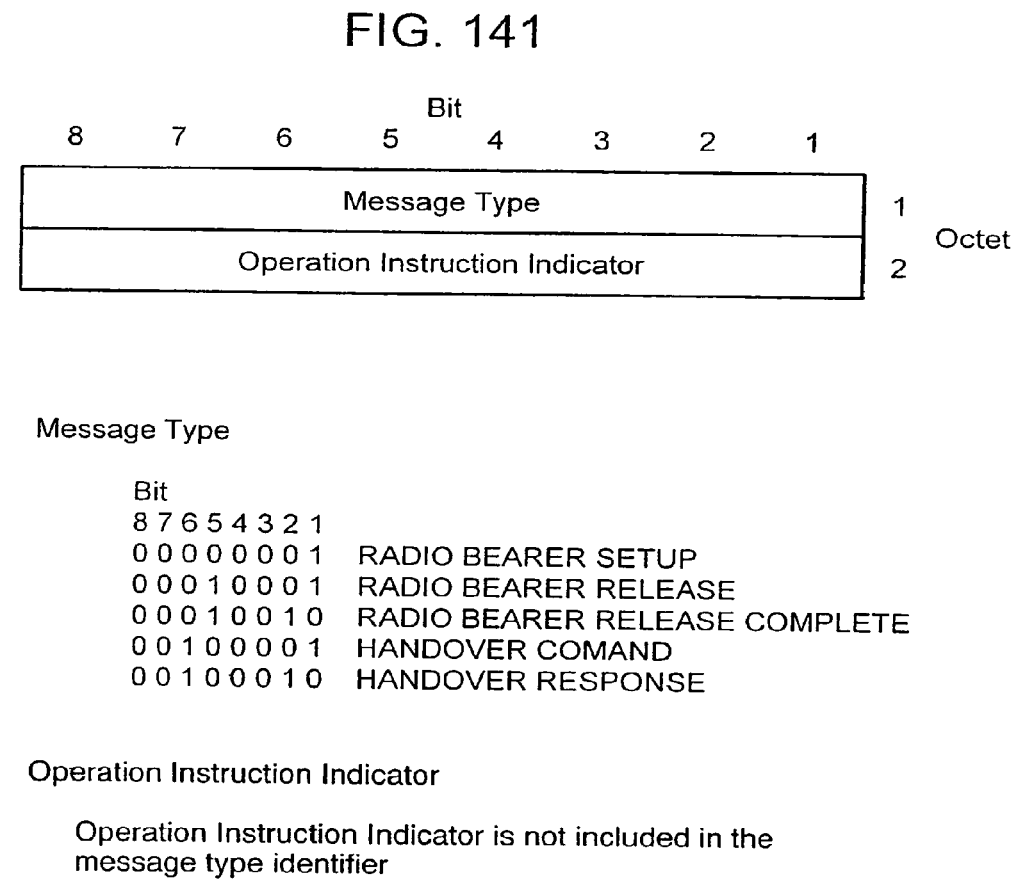

| Bit 8 7 6 5 4 3 2 1 | Octet |
|---|---|
| Message Type | 1 |
| Operation Instruction Indicator | 2 |

Message Type

| Bit 8 7 6 5 4 3 2 1 | |
|---|---|
| 0 0 0 0 0 0 0 1 | RADIO BEARER SETUP |
| 0 0 0 1 0 0 0 1 | RADIO BEARER RELEASE |
| 0 0 0 1 0 0 1 0 | RADIO BEARER RELEASE COMPLETE |
| 0 0 1 0 0 0 0 1 | HANDOVER COMAND |
| 0 0 1 0 0 0 1 0 | HANDOVER RESPONSE |

Operation Instruction Indicator

Operation Instruction Indicator is not included in the message type identifier

*: Extension Flag

IE Identifier

Bit
8 7 6 5 4 3 2 1
* * * * * * * *

RADIO BEARER SETUP INFORMATION
DHO BRANCH ADDITION
DHO BRANCH DELETION
ACCH REPLACEMENT
BRANCH REPLACEMENT
USER RATE REPLACEMENT
CODE REPLACEMENT
CODE TYPE REPLACEMENT

Extension Flag

Bit
8
0 Not Extended
1 Extended

FIG. 143

| Bit 8 | 7 | 6 | 5 | 4 | 3 | 2 | 1 | Octet |
|---|---|---|---|---|---|---|---|---|
| RBC ID | | | | | | | | 1 |
| CR | | | | | | | | 2 |
| CONN ID | | | | | | | | 3 |

RBC ID (RBC identifier) is a number for identifying the RBC connection which uniquely corresponds to a connection which can be identified by a CR and CONN ID in the CC protocol. It takes a value between 1 and H.

CR (call reference) is a call identifier for the CC protocol (see section 2.5.2.4.3.1).

CONN ID is a connection identifier for the CC protocol (see section 2.5.2.4.3.1).

FIG. 144

| Bit 8 | 7 | 6 | 5 | 4 | 3 | 2 | 1 | Octet |
|---|---|---|---|---|---|---|---|---|
| RBC ID | | | | | | | | 1 |
| Cause | | | | | | | | 2 |

RBC ID (RBC identifier) is a number for identifying the RBC connection which uniquely correspondsto a connection which can be identified by a CR and CONN ID in the CC protocol. It takes a value between 1 and H.

Cause Indicator

FIG. 145

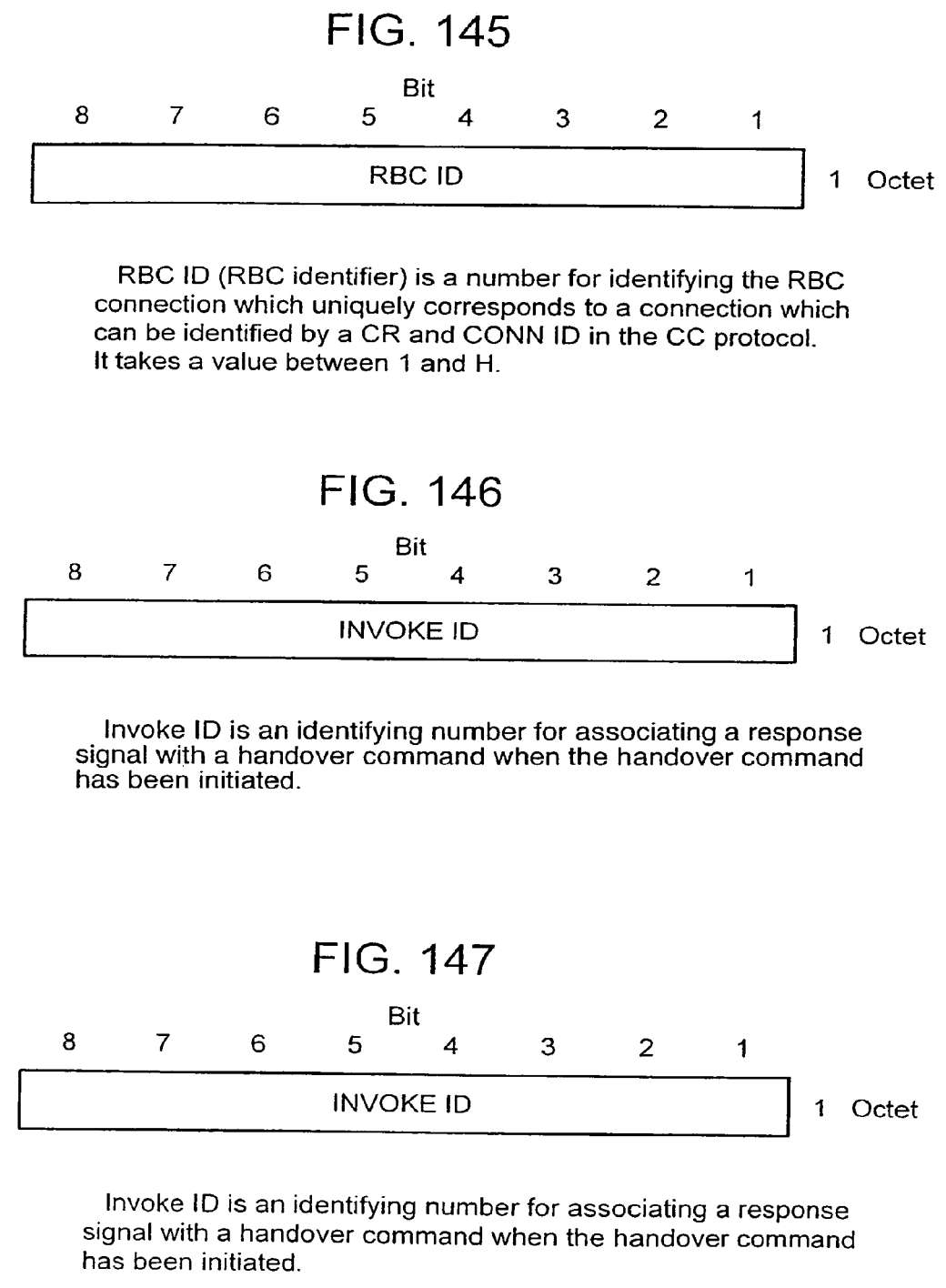

Bit

| 8 | 7 | 6 | 5 | 4 | 3 | 2 | 1 | |
|---|---|---|---|---|---|---|---|---|
| RBC ID | | | | | | | | 1 Octet |

RBC ID (RBC identifier) is a number for identifying the RBC connection which uniquely corresponds to a connection which can be identified by a CR and CONN ID in the CC protocol. It takes a value between 1 and H.

FIG. 146

Bit

| 8 | 7 | 6 | 5 | 4 | 3 | 2 | 1 | |
|---|---|---|---|---|---|---|---|---|
| INVOKE ID | | | | | | | | 1 Octet |

Invoke ID is an identifying number for associating a response signal with a handover command when the handover command has been initiated.

FIG. 147

Bit

| 8 | 7 | 6 | 5 | 4 | 3 | 2 | 1 | |
|---|---|---|---|---|---|---|---|---|
| INVOKE ID | | | | | | | | 1 Octet |

Invoke ID is an identifying number for associating a response signal with a handover command when the handover command has been initiated.

FIG. 148

| Bit 8 – 5 | Bit 4 – 1 | Octet |
|---|---|---|
| Information Element Identifier | | 1 |
| Length | | 2 |
| | | 3 |
| Frequency Band | | 4 |
| BTS Number | | 5 |
| | | 6 |
| Sector Number | | 7 |
| Uplink Short Code Type | | 8 |
| Number of Uplink Codes | | 9 |
| Uplink Short Code Number | | 10 |
| | Reserved | 11 |
| ⋮ | | |
| Uplink Short Code Number | | 10n (10+2(N-1)) |
| | Reserved | 11n (11+2(N-1)) |
| Downlink Short Code Type | | 12 |
| Number of Downlink Codes | | 13 |
| Downlink Short Code Number | | 14 |
| | Reserved | 15 |
| Frame Offset Group | Short Offset Group | 16 |
| ⋮ | | |
| Downlink Short Code Number | | 14m (14+3(M-1)) |
| | Reserved | 15m (15+3(M-1)) |
| Frame Offset Group | Short Offset Group | 16m (16+3(M-1)) |

FIG. 149

"Information element identifier" indicates the radio bearer setup fundamental information element and has a length of 8 bits.

"Length" indicates the length of the information element.

"Frequency band" indicates the frequency band which should be indicated at the first call. 256 frequency bands can be indicated by eight bits in this field, i.e., frequency band f1 is indicated by "00000000" in the "frequency band" and frequency band f256 is indicated by "11111111."

"BTS number" indicates the BTS identifying number in the network which is one or more.

"Sector number" indicates the sector identifying number in the same BTS, i.e., sector 1 is indicated by "00000001" while sector 12 is indicated by "00001100."

FIG. 150

"Uplink short code type" indicates the information transfer rate for each uplink code.

| Bit 8765 | Bandwidth | Bit 4321 | Code Type |
|---|---|---|---|
| 0000 | 20.0 MHz | 0000 | 1 chip/sym |
| 0001 | 10.0 MHz | 0001 | 2 chip/sym |
| 0010 | 5.0 MHz | . | . |
| 0011 | 1.25 MHz | . | . |
| Others | Reserved | 1001 | 512 chip/sym |
| | | 1010 | 1024 chip/sym |
| | | 1011 | 2048 chip/sym |
| | | Others | Reserved |

"Number of uplink codes" indicates the number of uplink short codes between one and N when a plurality of uplink short codes are availed for a single connection.

"Uplink short code number" indicates the identifying number of uplink short code between zero and 2047.

"Downlink short code type" indicates the information transfer rate for each downlink code.

| Bit 8765 | Bandwidth | Bit 4321 | Code Type |
|---|---|---|---|
| 0000 | 20.0 MHz | 0000 | 1 chip/sym |
| 0001 | 10.0 MHz | 0001 | 2 chip/sym |
| 0010 | 5.0 MHz | . | . |
| 0011 | 1.25 MHz | . | . |
| Others | Reserved | 1001 | 512 chip/sym |
| | | 1010 | 1024 chip/sym |
| | | 1011 | 2048 chip/sym |
| | | Others | Reserved |

FIG. 151

"Number of downlink codes" indicates the number of downlink short codes between one and M when a plurality of downlink short codes are availed for a single connection.

"Downlink short code number" indicates the identifying number of downlink short code between zero and 2047.

"Frame offset group" indicates which time slot in a single radio frame should be the front end of the logical frame when the mobile station communicates. This is formulated to uniformize traffic in a single frame time unit within the wired path. It takes a value of 0-15.

| Bit 8765 | |
|---|---|
| 0000 | 0 |
| . | . |
| . | . |
| . | . |
| 1111 | 15 |

"Slot offset group" indicates an offset value of downlink transmission timing for a short code. The downlink transmission timing may be offset by, at most, three subslots within a single slot in order to reduce redundancy of pilot symbols. The indication by the "slot offset group" field at the first call should be contained until the release of all calls of the mobile station. It takes a value of 0-3.

| Bit 4321 | |
|---|---|
| 0000 | 0 |
| 0001 | 1 |
| 0010 | 2 |
| 0011 | 3 |

FIG. 152

Bit

| 8 7 6 5 | 4 3 2 1 | Octet |
|---|---|---|
| Information Element Identifier | | 1 |
| Length | | 2<br>3 |
| BTS Number | | 4<br>5 |
| Sector Number | | 6 |
| Number of RBC IDs | | 7 |
| RBC ID | | 8 |
| Number of Downlink Codes | | 9 |
| Downlink Short Code Number | | 10 |
| | Reserved | 11 |
| Frame Offset Group | Slot Offset Group | 12 |
| ⋮ | | |
| Downlink Short Code Number | | 10m (10+3(M-1)) |
| | Reserved | 11m (11+3(M-1)) |
| Frame Offset Group | Slot Offset Group | 12m (12+3(M-1)) |

"Information element identifier" indicates the DHO branch addition information element and has a length of 8 bits.

"Length" indicates the length of the information element.

"BTS number" indicates the BTS identifying number in the network which is one or more.

FIG. 153

"Sector number" indicates the sector identifying number in the same BTS. The number is of 1-12, i.e., sector 1 is indicated by "00000001" while sector 12 is indicated by "00001100."

Bit Pattern
87654321
00000001 1
. .
. .
. .
00001100 12

"Number of RBC IDs" indicates the number of connections established simultaneously. It takes a value between 1 and H.

"RBC ID" is a number for identifying the RBC connection which uniquely corresponds to a connection which can be identified by a CR and CONN ID in the CC protocol. It takes a value between 1 and H.

"Number of downlink codes" indicates the number of downlink short codes between one and M when a plurality of downlink short codes are availed for a single connection.

"Downlink short code number" indicates the identifying number of downlink short code between zero and 2047.

"Frame offset group" indicates which time slot in a single radio frame should be the front end of the logical frame when the mobile station communicates. This is formulated to uniformize traffic in a single frame time unit within the wired path. It takes a value of 0-15.

Bit Pattern
8765
0000 0
. .
. .
. .
1111 15

FIG. 154

"Slot offset group" indicates an offset value of downlink transmission timing for a short code. The downlink transmission timing may be offset by, at most, three subslots within a single slot in order to reduce redundancy of pilot symbols. The indication by the "slot offset group" field at the first call should be contained until the release of all calls of the mobile station. It takes a value of 0-3.

| Bit Pattern | |
|---|---|
| 4321 | |
| 0000 | 0 |
| 0001 | 1 |
| 0010 | 2 |
| 0011 | 3 |

FIG. 155

Bit 8 7 6 5 4 3 2 1

| Field (bits 8–1) | Octet |
|---|---|
| Information Element Identifier | 1 |
| Length | 2<br>3 |
| BTS Number | 4<br>5 |
| Sector Number | 6 |

"Information element identifier" indicates the DHO branch deletion information element and has a length of 8 bits.

"Length" indicates the length of the information element.

"BTS number" indicates the BTS identifying number in the network which is one or more.

"Sector number" indicates the sector identifying number in the same BTS. The number is of 1-12, i.e., sector 1 is indicated by "00000001" while sector 12 is indicated by "00001100."

| Bit Pattern | |
|---|---|
| 87654321 | |
| 00000001 | 0 |
| . | . |
| . | . |
| . | . |
| 00001100 | 12 |

FIG. 156

Bit

| 8 | 7 | 6 | 5 | 4 | 3 | 2 | 1 | Octet |
|---|---|---|---|---|---|---|---|---|
| Information Element Identifier | | | | | | | | 1 |
| Length | | | | | | | | 2 |
| | | | | | | | | 3 |
| RBC ID | | | | | | | | 4 |

"Information element identifier" indicates the ACCH replacement information element and has a length of 8 bits.

"Length" indicates the length of the information element.

"RBC ID" is a number for identifying the RBC connection to which the ACCH is handed. It takes a value between 1 and H.

FIG. 157

| Bit 8 7 6 5 | Bit 4 3 2 1 | Octet |
|---|---|---|
| Information Element Identifier | | 1 |
| Length | | 2 |
| | | 3 |
| Frequency Band | | 4 |
| BTS Number | | 5 |
| | | 6 |
| Sector Number | | 7 |
| Number of RBC IDs | | 8 |
| RBC ID | | 9 |
| Number of Downlink Codes | | 10 |
| Downlink Short Code Number | | 11 |
| | Reserved | 12 |
| Frame Offset Group | Slot Offset Group | 13 |
| ⋮ | | |
| Downlink Short Code Number | | 11m (11+3(M-1)) |
| | Reserved | 12m (12+3(M-1)) |
| Frame Offset Group | Slot Offset Group | 13m (13+3(M-1)) |

"Information element identifier" indicates the branch replacement information element and has a length of 8 bits.

FIG. 158

"Length" indicates the length of the information element.

"Frequency band" indicates the frequency band, which is in the range between f1 and f256, established at the first call. 256 frequency bands can be indicated by eight bits in this field, i.e., frequency band f1 is indicated by "00000000" in the "frequency band" and frequency band f256 is indicated by "11111111."

Bit Pattern
87654321
00000000 f1
. .
. .
. .
11111111 f256

"BTS number" indicates the BTS identifying number in the network which is one or more.

"Sector number" indicates the sector identifying number in the same BTS. The number is of 1-12, i.e., sector 1 is indicated by "00000001" while sector 12 is indicated by "00001100."

Bit Pattern
87654321
00000001 0
. .
. .
. .
00001100 12

"Number of RBC IDs" indicates the number of connections established simultaneously. It takes a value between 1 and H.

"RBC ID" is a number for identifying the RBC connection which uniquely corresponds to a connection which can be identified by a CR and CONN ID in the CC protocol. It takes a value between 1 and H.

FIG. 159

"Number of downlink codes" indicates the number of downlink short codes between one and M when a plurality of downlink short codes are availed for a single connection.

"Downlink short code number" indicates the identifying number of downlink short code between zero and 2047.

"Frame offset group" indicates which time slot in a single radio frame should be the front end of the logical frame when the mobile station communicates. This is formulated to uniformize traffic in a single frame time unit within the wired path. It takes a value of 0-15.

Bit Pattern

| | |
|---|---|
| 8765 | |
| 0000 | 0 |
| . | . |
| . | . |
| . | . |
| 1111 | 15 |

"Slot offset group" indicates an offset value of downlink transmission timing for a short code. The downlink transmission timing may be offset by, at most, three subslots within a single slot in order to reduce redundancy of pilot symbols. The indication by the "slot offset group" field at the first call should be contained until the release of all calls of the mobile station. It takes a value of 0-3.

Bit Pattern

| | |
|---|---|
| 4321 | |
| 0000 | 0 |
| 0001 | 1 |
| 0010 | 2 |
| 0011 | 3 |

FIG. 160

Bit 8 7 6 5 4 3 2 1

| | | Octet |
|---|---|---|
| Information Element Identifier | | 1 |
| Length | | 2 |
| | | 3 |
| RBC ID | | 4 |
| Frequency Band | | 5 |
| BTS Number | | 6 |
| | | 7 |
| Sector Number | | 8 |
| Uplink Short Code Type | | 9 |
| Number of Uplink Codes | | 10 |
| Uplink Short Code Number | | 11 |
| | Reserved | 12 |
| ⋮ | | |
| Uplink Short Code Number | | 11n (11+2(N-1)) |
| | Reserved | 12n (12+2(N-1)) |
| Downlink Short Code Type | | 13 |
| Number of Downlink Code | | 14 |
| Downlink Short Code Number | | 15 |
| | Reserved | 16 |
| Frame Offset Group | Slot Offset Group | 17 |
| ⋮ | | |
| Downlink Short Code Number | | 15m (15+3(M-1)) |
| | Reserved | 16m (16+3(M-1)) |
| Frame Offset Group | Slot Offset Group | 17m (17+3(M-1)) |

FIG. 161

"Information element identifier" indicates the user rate replacement information element and has a length of 8 bits.

"Length" indicates the length of the information element.

"RBC ID" is a number for identifying the RBC connection to which the ACCH is handed. It takes a value between 1 and H.

"Frequency band" indicates the frequency band, which is in the range between f1 and f256, established at the first call. 256 frequency bands can be indicated by eight bits in this field, i.e., frequency band f1 is indicated by "00000000" in the "frequency band" and frequency band f256 is indicated by "11111111."

| Bit Pattern | |
|---|---|
| 87654321 | |
| 00000000 | f1 |
| . | . |
| . | . |
| . | . |
| 11111111 | f256 |

"BTS number" indicates the BTS identifying number in the network which is one or more.

"Sector number" indicates the sector identifying number in the same BTS. The number is of 1-12, i.e., sector 1 is indicated by "00000001" while sector 12 is indicated by "00001100."

| Bit Pattern | |
|---|---|
| 87654321 | |
| 00000001 | 1 |
| . | . |
| . | . |
| . | . |
| 00001100 | 12 |

FIG. 162

"Uplink short code type" indicates the information transfer rate for each uplink code.

| Bit 8765 | Bandwidth | Bit 4321 | Code Type |
|---|---|---|---|
| 0000 | 20.0 MHz | 0000 | 1 chip/sym |
| 0001 | 10.0 MHz | 0001 | 2 chip/sym |
| 0010 | 5.0 MHz | · | · |
| 0011 | 1.25 MHz | · | · |
| Others | Reserved | 1001 | 512 chip/sym |
| | | 1010 | 1024 chip/sym |
| | | 1011 | 2048 chip/sym |
| | | Others | Reserved |

"Number of uplink codes" indicates the number of uplink short codes between one and N when a plurality of uplink short codes are availed for a single connection.

"Uplink short code number" indicates the identifying number of uplink short code between zero and 2047.

"Downlink short code type" indicates the information transfer rate for each downlink code.

| Bit 8765 | Bandwidth | Bit 4321 | Code Type |
|---|---|---|---|
| 0000 | 20.0 MHz | 0000 | 1 chip/sym |
| 0001 | 10.0 MHz | 0001 | 2 chip/sym |
| 0010 | 5.0 MHz | · | · |
| 0011 | 1.25 MHz | · | · |
| Others | Reserved | 1001 | 512 chip/sym |
| | | 1010 | 1024 chip/sym |
| | | 1011 | 2048 chip/sym |
| | | Others | Reserved |

FIG. 163

"Number of downlink codes" indicates the number of downlink short codes between one and M when a plurality of downlink short codes are availed for a single connection.

"Downlink short code number" indicates the identifying number of downlink short code between zero and 2047.

"Frame offset group" indicates which time slot in a single radio frame should be the front end of the logical frame when the mobile station communicates. This is formulated to uniformize traffic in a single frame time unit within the wired path. It takes a value of 0-15.

Bit Pattern

| | |
|---|---|
| 8765 | |
| 0000 | 0 |
| • | • |
| • | • |
| • | • |
| 1111 | 15 |

"Slot offset group" indicates an offset value of downlink transmission timing for a short code. The downlink transmission timing may be offset by, at most, three subslots within a single slot in order to reduce redundancy of pilot symbols. The indication by the "slot offset group" field at the first call should be contained until the release of all calls of the mobile station. It takes a value of 0-3.

Bit Pattern

| | |
|---|---|
| 4321 | |
| 0000 | 0 |
| 0001 | 1 |
| 0010 | 2 |
| 0011 | 3 |

FIG. 164

| Bit 8 7 6 5 4 3 2 1 | Octet |
|---|---|
| Information Element Identifier | 1 |
| Length | 2 |
| | 3 |
| Number of RBC IDs | 4 |
| RBC ID | 5 |
| Short Code Type | 6 |
| Number of Former Short Codes | 7 |
| Former Short Code Number | 8 |
| Reserved | 9 |
| ⋮ | |
| Former Short Code Number | 8n (8+2(N-1)) |
| Reserved | 9n (9+2(N-1)) |
| Number of New Short Codes | 10 |
| New Short Code Number | 11 |
| Reserved | 12 |
| ⋮ | |
| New Short Code Number | 11m (11+2(M-1)) |
| Reserved | 12m (12+2(M-1)) |

"Information element identifier" indicates the user rate replacement information element and has a length of 8 bits.

"Length" indicates the length of the information element.

FIG. 165

"Number of RBC IDs" indicates the number of connections established simultaneously. It takes a value between 1 and H.

"RBC ID" is a number for identifying the RBC connection to which the ACCH is handed. It takes a value between 1 and H.

"Short code type" indicates the information transfer rate for each code.

| Bit 8765 | Bandwidth | Bit 4321 | Code Type |
|---|---|---|---|
| 0000 | 20.0 MHz | 0000 | 1 chip/sym |
| 0001 | 10.0 MHz | 0001 | 2 chip/sym |
| 0010 | 5.0 MHz | • | • |
| 0011 | 1.25 MHz | • | • |
| Others | Reserved | 1001 | 512 chip/sym |
| | | 1010 | 1024 chip/sym |
| | | 1011 | 2048 chip/sym |
| | | Others | Reserved |

"Number of former short codes" indicates the number of former short codes, which will be replaced, between one and N.

"Former short code number" indicates the identifying number of former short code, which will be replaced, between zero and 2047.

"Number of new short codes" indicates the number of new short codes between one and M.

"New short code number" indicates the identifying number of new short code between zero and 2047.

FIG. 166

Bit

| 8 | 7 | 6 | 5 | 4 | 3 | 2 | 1 | |
|---|---|---|---|---|---|---|---|---|
| Message Type | | | | | | | | 1 Octet |

Message Type

Bit Pattern
87654321
******** Radio resource facility

FIG. 167

Bit

| 8 | 7 | 6 | 5 | 4 | 3 | 2 | 1 | Octet |
|---|---|---|---|---|---|---|---|---|
| Facility IE Identifier | | | | | | | | 1 |
| Length of Facility IE | | | | | | | | 2 |
| Extn. | Rsvd. | | Profile | | | | | 3 |
| PDUs | | | | | | | | 4 |

"Profile" indicates the type of PDU (protocol data unit) which is contained in octet 4 and later octets Bit Pattern

54321

10001 ROSE protocol data unit

10010 CMIP protocol data unit

10011 ACSE protocol data unit

In the invented system, ROSE protocol is used.

"PDUs" field includes one or more PDUs which are ASEs (application service elements) identified by the "profile" field.

FIG. 168

Bit

| 8 7 6 5 4 3 2 1 | Octet |
|---|---|
| Component Type Tag | 1 |
| Component Length | 2 |
| Invoke Identifier Tag | 3 |
| Invoke Identifier Length | 4 |
| Invoke Identifier | 5 |
| Operation Value Tag | 6 |
| Operation Value | 7 |
| Operation Specific Parameter | 8 |

"Component type tag" is mandatory for each of all components and indicates the type of component as in the following.

| Bit Pattern 87654321 | |
|---|---|
| 10100001 | Invoke |
| 10100010 | Result return (termination) |
| 10100011 | Error return |
| 10100100 | Rejection |
| 10100101 | (Reserved) |
| 10100110 | (Reserved) |
| 10100111 | Result return (proceeding) |

"Component length" indicates the length of component excluding the lengths of component type tag field and component length field.

FIG. 169

"Invoke identifier tag" is used as a reference number for identifying the operation invoke, thereby associating a request with a response.

| Bit Pattern | |
|---|---|
| 87654321 | |
| 00000010 | Invoke Identifier Tag |
| 00000101 | Null |

"Invoke identifier length" indicates the length of the "invoke identifier" field.

"Invoke identifier" indicates the invoke identifier.

"Operation value tag" is included in the invoke component, and so on for indicating the type of operation.

| Bit Pattern | |
|---|---|
| 87654321 | |
| 00000010 | Local Operation Code Tag |
| 00000101 | Global Operation Code Tag |

"Operation value" indicates the type of information for defining the operation.

| Bit Pattern | |
|---|---|
| 87654321 | |
| ******** | Candidate zone information for call attempt or acceptance<br>n-use zone information<br>Added zone information for DHO<br>Deleted zone information for DHO<br>HHO zone information<br>Outer loop information<br>Quality deterioration notification information |

"Number of sectors" field contains a binary code representing a value between 1 and N.

"BTS identifier" is a number more than one for identifying the corresponding BTS in the network.

FIG. 172

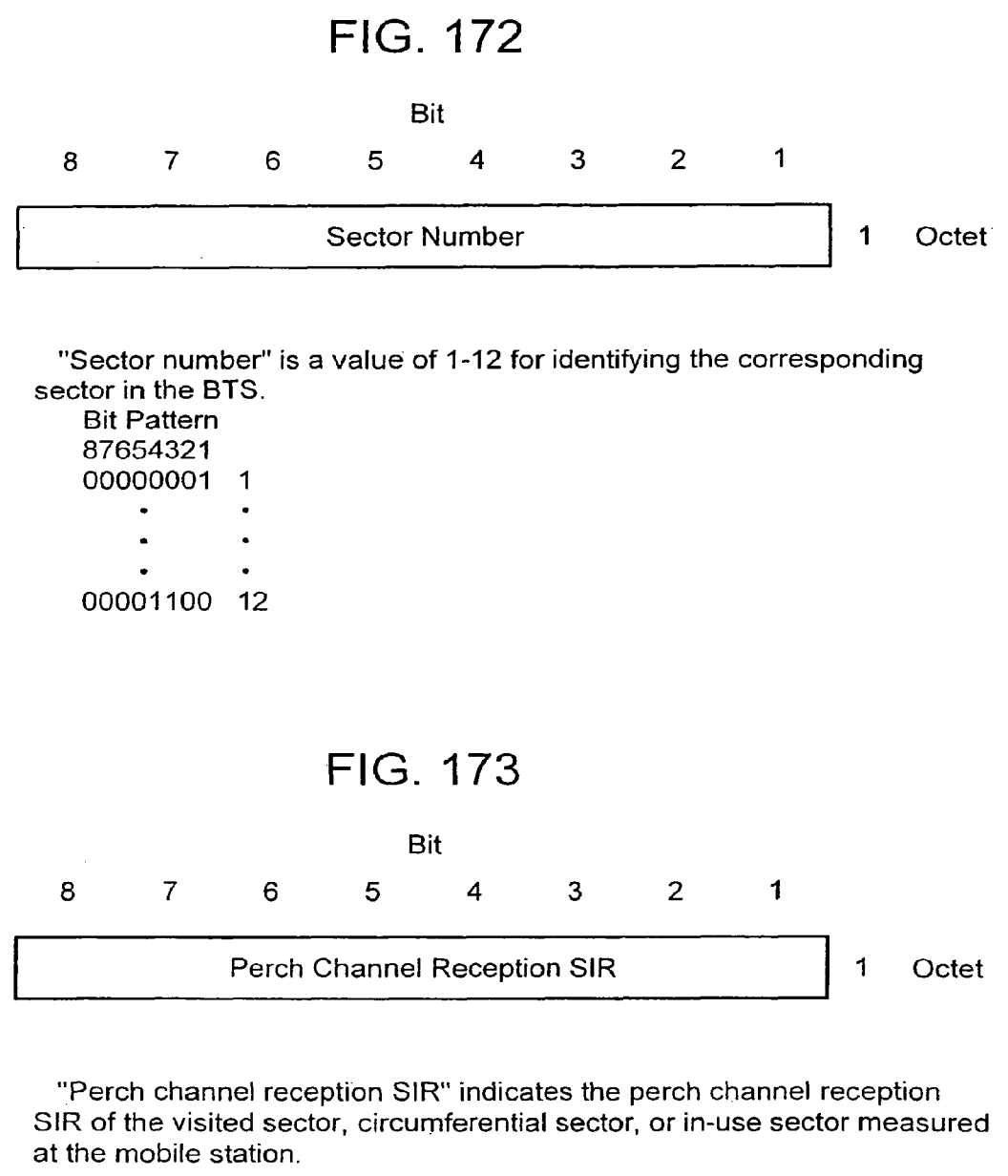

Bit

| 8 | 7 | 6 | 5 | 4 | 3 | 2 | 1 | |
|---|---|---|---|---|---|---|---|---|
| Sector Number | | | | | | | | 1 Octet |

"Sector number" is a value of 1-12 for identifying the corresponding sector in the BTS.

| Bit Pattern | |
|---|---|
| 87654321 | |
| 00000001 | 1 |
| • | • |
| • | • |
| • | • |
| 00001100 | 12 |

FIG. 173

Bit

| 8 | 7 | 6 | 5 | 4 | 3 | 2 | 1 | |
|---|---|---|---|---|---|---|---|---|
| Perch Channel Reception SIR | | | | | | | | 1 Octet |

"Perch channel reception SIR" indicates the perch channel reception SIR of the visited sector, circumferential sector, or in-use sector measured at the mobile station.

FIG. 174

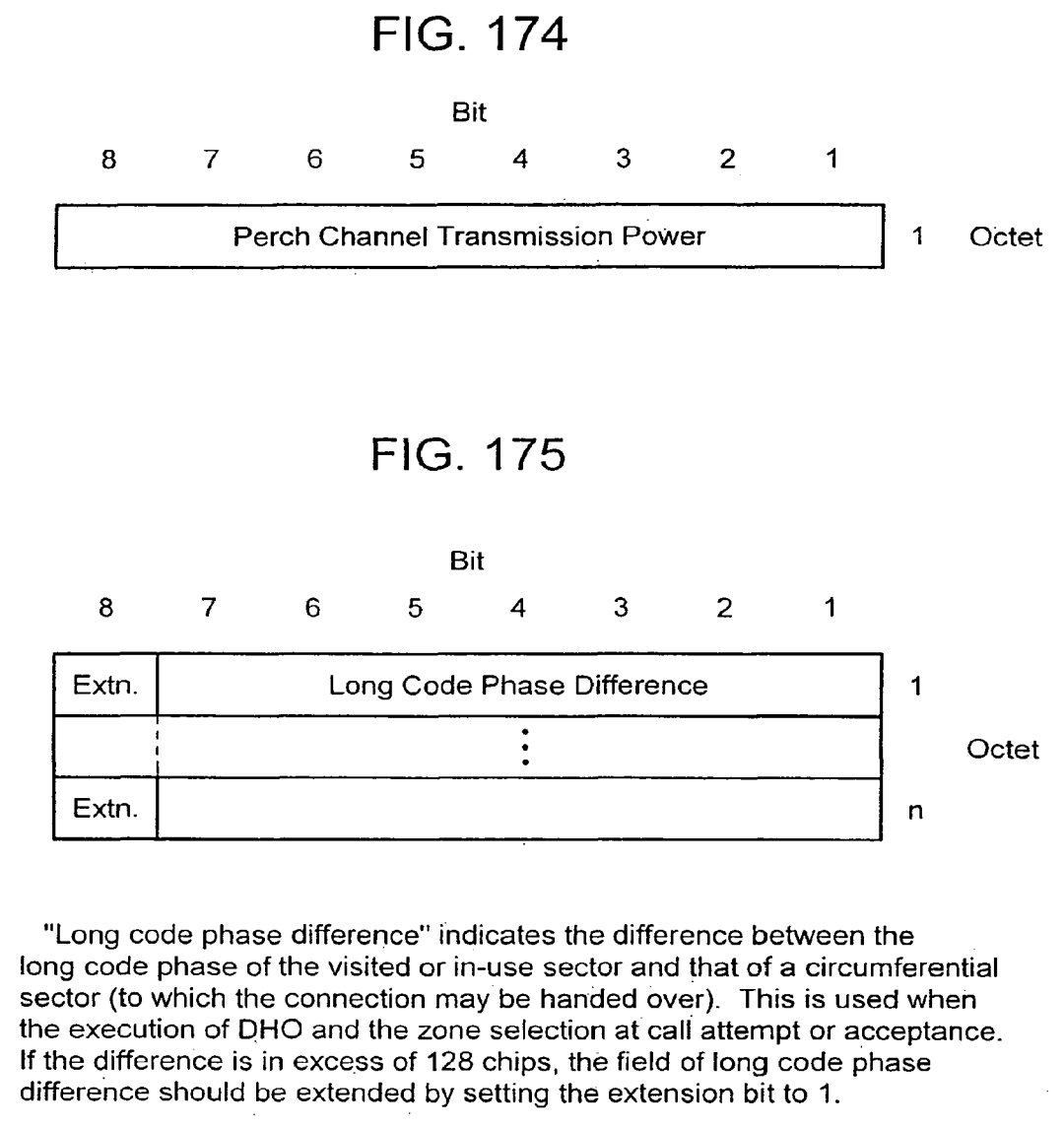

| Bit 8 | 7 | 6 | 5 | 4 | 3 | 2 | 1 | Octet |
|---|---|---|---|---|---|---|---|---|
| Perch Channel Transmission Power | | | | | | | | 1 |

FIG. 175

| Bit 8 | 7 | 6 | 5 | 4 | 3 | 2 | 1 | Octet |
|---|---|---|---|---|---|---|---|---|
| Extn. | Long Code Phase Difference | | | | | | | 1 |
| | ⋮ | | | | | | | |
| Extn. | | | | | | | | n |

"Long code phase difference" indicates the difference between the long code phase of the visited or in-use sector and that of a circumferential sector (to which the connection may be handed over). This is used when the execution of DHO and the zone selection at call attempt or acceptance. If the difference is in excess of 128 chips, the field of long code phase difference should be extended by setting the extension bit to 1.

FIG. 176

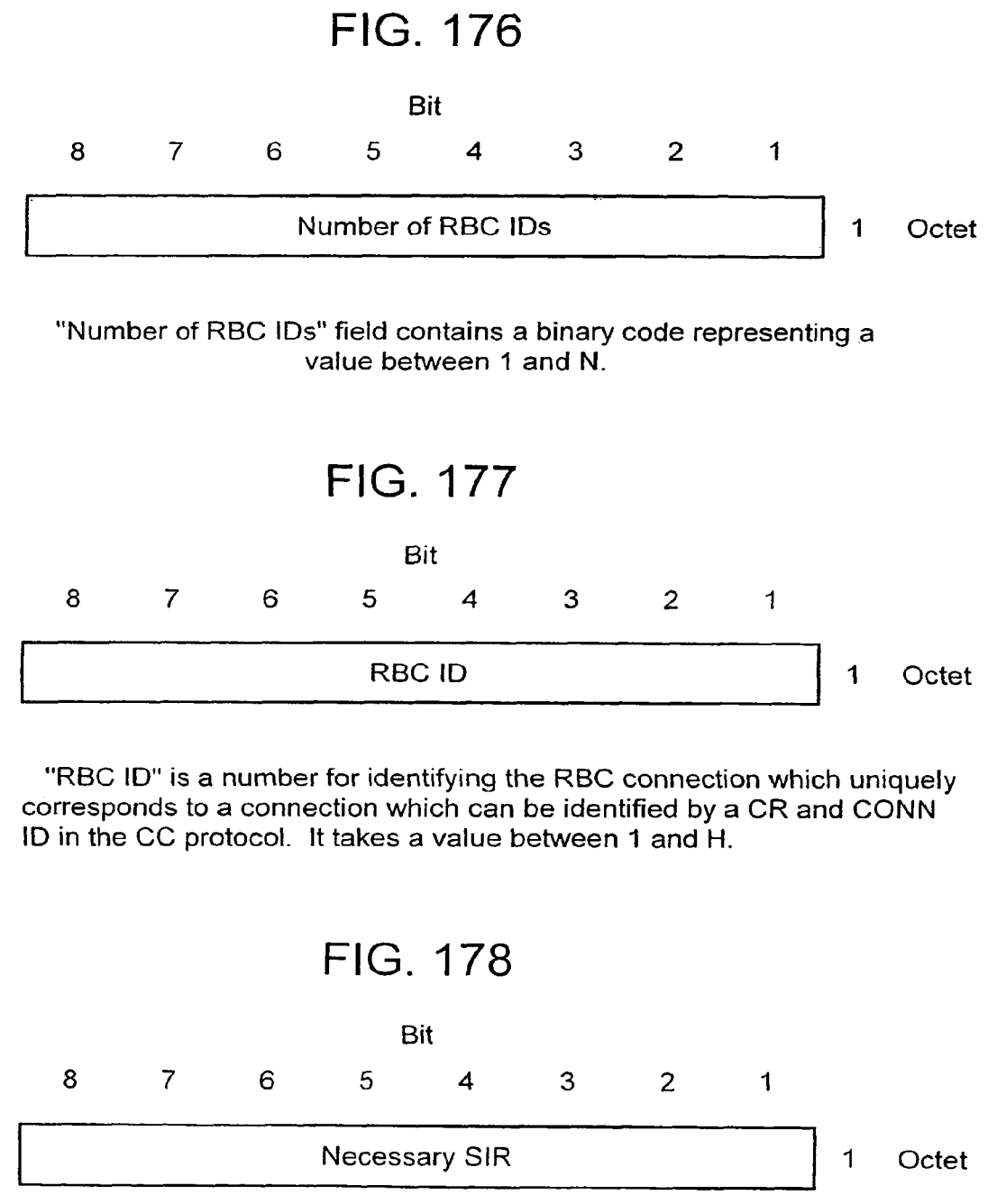

Bit

| 8 | 7 | 6 | 5 | 4 | 3 | 2 | 1 | |
|---|---|---|---|---|---|---|---|---|
| Number of RBC IDs | | | | | | | | 1 Octet |

"Number of RBC IDs" field contains a binary code representing a value between 1 and N.

FIG. 177

Bit

| 8 | 7 | 6 | 5 | 4 | 3 | 2 | 1 | |
|---|---|---|---|---|---|---|---|---|
| RBC ID | | | | | | | | 1 Octet |

"RBC ID" is a number for identifying the RBC connection which uniquely corresponds to a connection which can be identified by a CR and CONN ID in the CC protocol. It takes a value between 1 and H.

FIG. 178

Bit

| 8 | 7 | 6 | 5 | 4 | 3 | 2 | 1 | |
|---|---|---|---|---|---|---|---|---|
| Necessary SIR | | | | | | | | 1 Octet |

FIG. 179

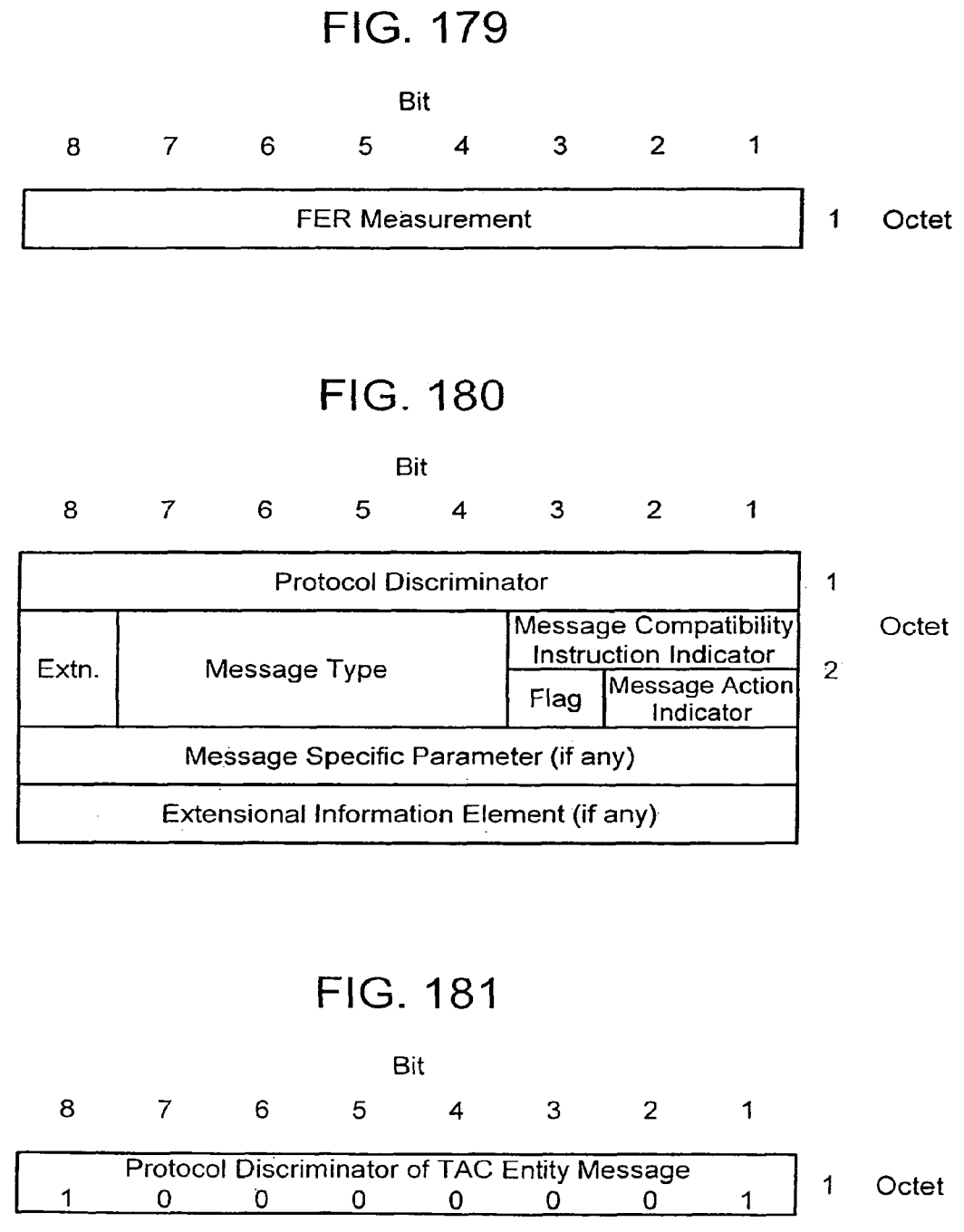

Bit

| 8 | 7 | 6 | 5 | 4 | 3 | 2 | 1 | |
|---|---|---|---|---|---|---|---|---|
| FER Measurement | | | | | | | | 1 Octet |

FIG. 180

Bit

<table>
<tr><td>8</td><td>7</td><td>6</td><td>5</td><td>4</td><td>3</td><td>2</td><td>1</td><td></td><td></td></tr>
<tr><td colspan="8">Protocol Discriminator</td><td>1</td><td rowspan="3">Octet</td></tr>
<tr><td rowspan="2">Extn.</td><td colspan="4" rowspan="2">Message Type</td><td colspan="3">Message Compatibility Instruction Indicator</td><td rowspan="2">2</td></tr>
<tr><td>Flag</td><td colspan="2">Message Action Indicator</td></tr>
<tr><td colspan="8">Message Specific Parameter (if any)</td><td></td><td></td></tr>
<tr><td colspan="8">Extensional Information Element (if any)</td><td></td><td></td></tr>
</table>

FIG. 181

Bit

| 8 | 7 | 6 | 5 | 4 | 3 | 2 | 1 | |
|---|---|---|---|---|---|---|---|---|
| Protocol Discriminator of TAC Entity Message | | | | | | | | 1 Octet |
| 1 | 0 | 0 | 0 | 0 | 0 | 0 | 1 | |

FIG. 182

Bit

<table>
<tr><td>8</td><td>7</td><td>6</td><td>5</td><td>4</td><td>3</td><td>2</td><td>1</td><td></td></tr>
<tr><td rowspan="2">Extn.</td><td colspan="4" rowspan="2">Message Type</td><td colspan="3">Message Compatibility Instruction Indicator</td><td rowspan="3">1 Octet</td></tr>
<tr><td>Flag</td><td colspan="2">Message Action Indicator</td></tr>
<tr><td>1</td><td>0</td><td>0</td><td>0</td><td>0</td><td>0</td><td>0</td><td>1</td></tr>
</table>

FIG. 183

Bit

| 8 | 7 | 6 | 5 | 4 | 3 | 2 | 1 | |
|---|---|---|---|---|---|---|---|---|
| TMUI | | | | | | | | Octet |
| Mobile Station Type | | | | | | | | |

FIG. 184

Bit

| 8 | 7 | 6 | 5 | 4 | 3 | 2 | 1 | |
|---|---|---|---|---|---|---|---|---|
| Paged MS ID | | | | | | | | |
| Mobile Station Type | | | | | | | | Octet |
| Paging ID | | | | | | | | |

FIG. 185

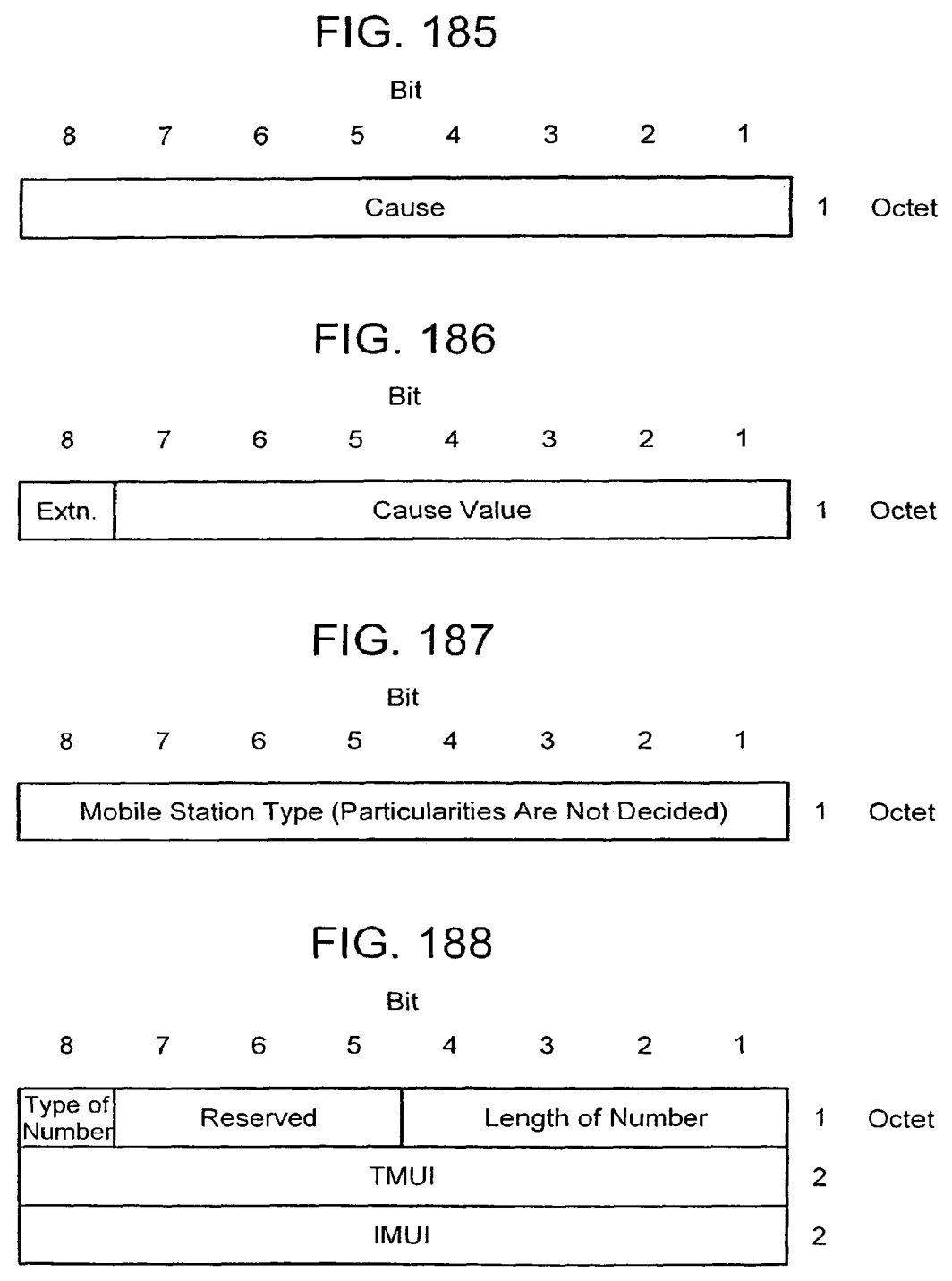

Bit

| 8 | 7 | 6 | 5 | 4 | 3 | 2 | 1 | |
|---|---|---|---|---|---|---|---|---|
| Cause | | | | | | | | 1 Octet |

FIG. 186

Bit

| 8 | 7 | 6 | 5 | 4 | 3 | 2 | 1 | |
|---|---|---|---|---|---|---|---|---|
| Extn. | Cause Value | | | | | | | 1 Octet |

FIG. 187

Bit

| 8 | 7 | 6 | 5 | 4 | 3 | 2 | 1 | |
|---|---|---|---|---|---|---|---|---|
| Mobile Station Type (Particularities Are Not Decided) | | | | | | | | 1 Octet |

FIG. 188

Bit

| 8 | 7 | 6 | 5 | 4 | 3 | 2 | 1 | |
|---|---|---|---|---|---|---|---|---|
| Type of Number | Reserved | | | Length of Number | | | | 1 Octet |
| TMUI | | | | | | | | 2 |
| IMUI | | | | | | | | 2 |

FIG. 192

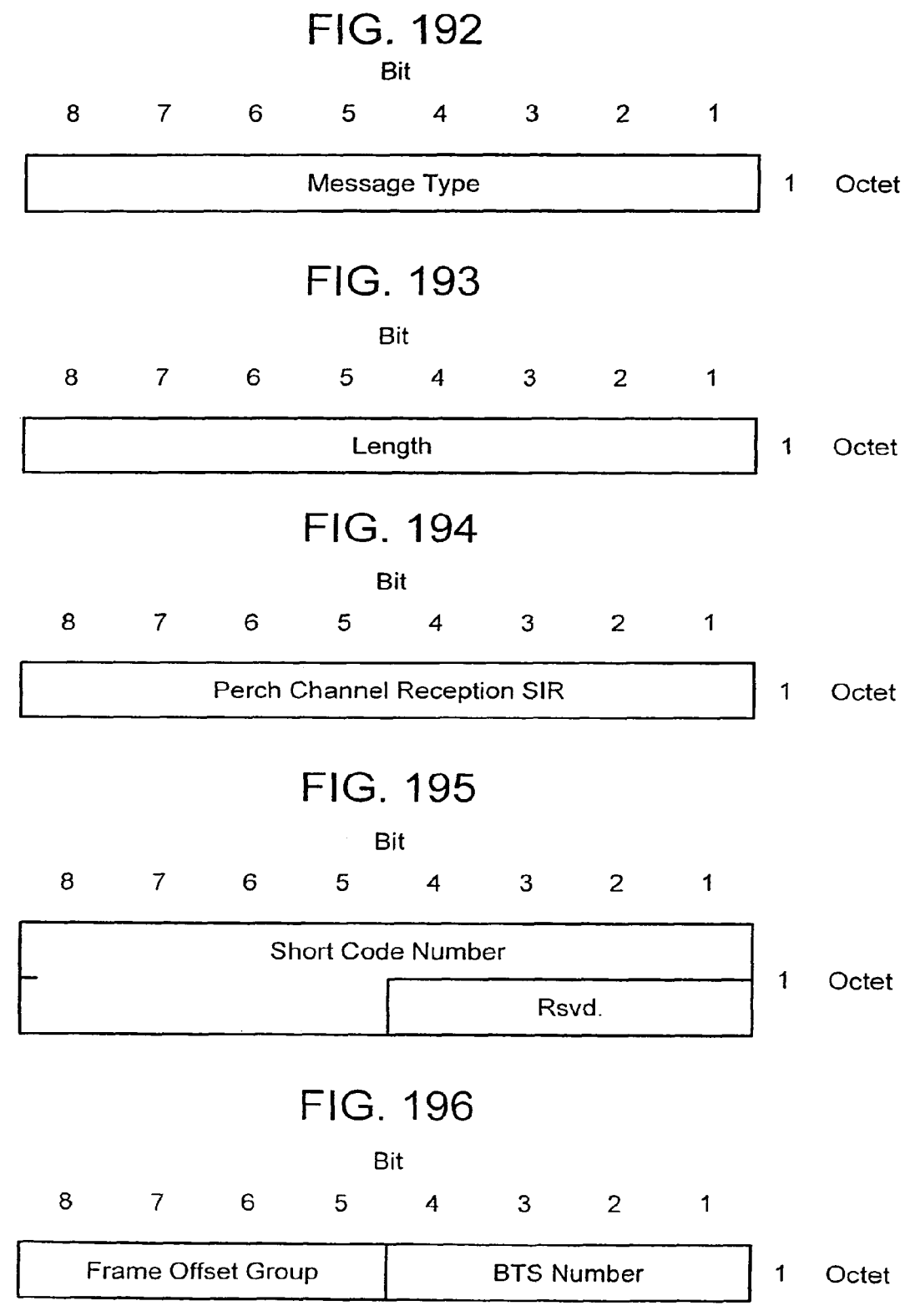

| Bit 8 | 7 | 6 | 5 | 4 | 3 | 2 | 1 | |
|---|---|---|---|---|---|---|---|---|
| Message Type | | | | | | | | 1 Octet |

FIG. 193

| Bit 8 | 7 | 6 | 5 | 4 | 3 | 2 | 1 | |
|---|---|---|---|---|---|---|---|---|
| Length | | | | | | | | 1 Octet |

FIG. 194

| Bit 8 | 7 | 6 | 5 | 4 | 3 | 2 | 1 | |
|---|---|---|---|---|---|---|---|---|
| Perch Channel Reception SIR | | | | | | | | 1 Octet |

FIG. 195

| Bit 8 | 7 | 6 | 5 | 4 | 3 | 2 | 1 | |
|---|---|---|---|---|---|---|---|---|
| Short Code Number | | | | Rsvd. | | | | 1 Octet |

FIG. 196

| Bit 8 | 7 | 6 | 5 | 4 | 3 | 2 | 1 | |
|---|---|---|---|---|---|---|---|---|
| Frame Offset Group | | | | BTS Number | | | | 1 Octet |

FIG. 197

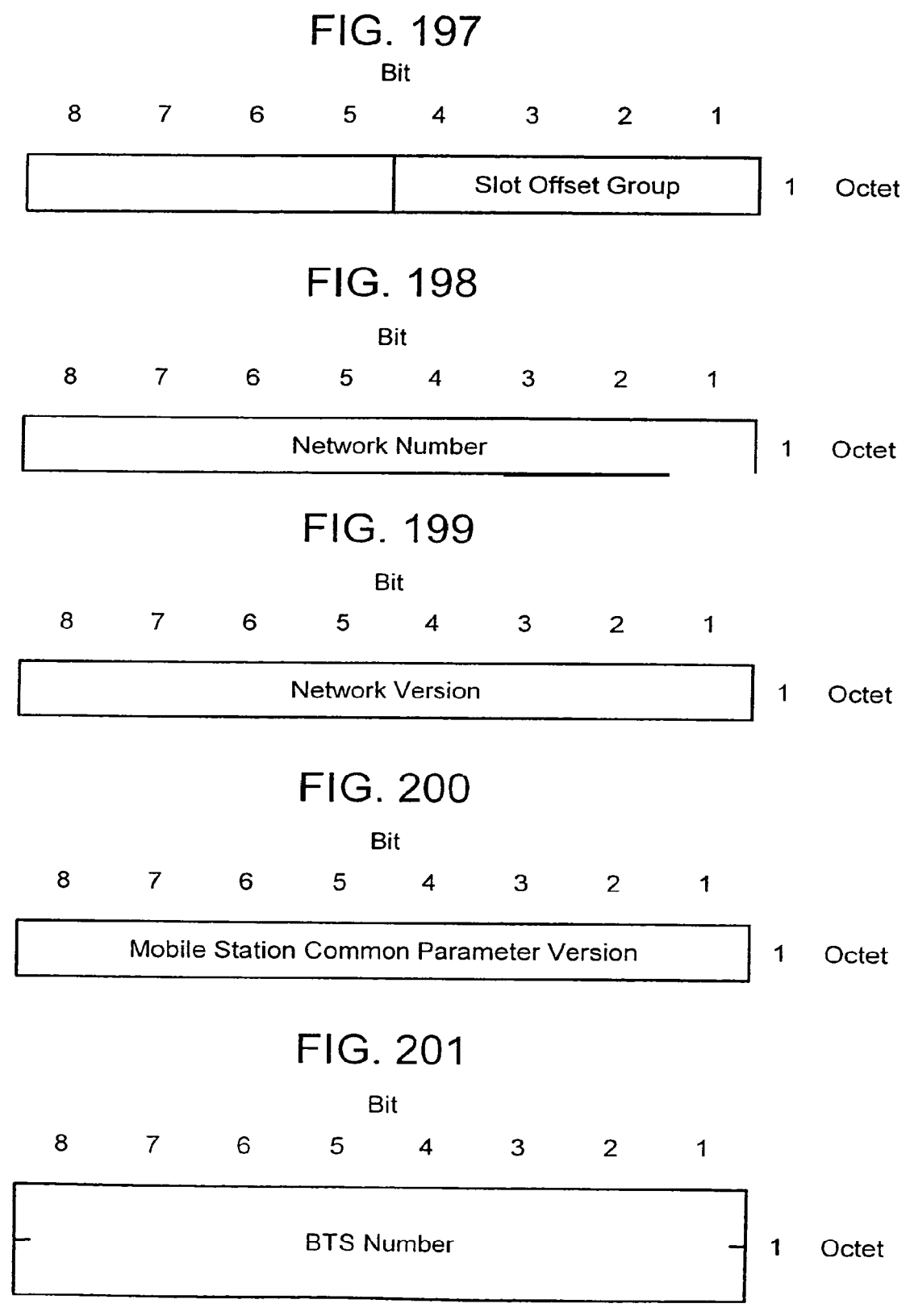

Bit

| 8 | 7 | 6 | 5 | 4 | 3 | 2 | 1 | |
|---|---|---|---|---|---|---|---|---|
| | | | | Slot Offset Group | | | | 1 Octet |

FIG. 198

Bit

| 8 | 7 | 6 | 5 | 4 | 3 | 2 | 1 | |
|---|---|---|---|---|---|---|---|---|
| Network Number | | | | | | | | 1 Octet |

FIG. 199

Bit

| 8 | 7 | 6 | 5 | 4 | 3 | 2 | 1 | |
|---|---|---|---|---|---|---|---|---|
| Network Version | | | | | | | | 1 Octet |

FIG. 200

Bit

| 8 | 7 | 6 | 5 | 4 | 3 | 2 | 1 | |
|---|---|---|---|---|---|---|---|---|
| Mobile Station Common Parameter Version | | | | | | | | 1 Octet |

FIG. 201

Bit

| 8 | 7 | 6 | 5 | 4 | 3 | 2 | 1 | |
|---|---|---|---|---|---|---|---|---|
| BTS Number | | | | | | | | 1 Octet |

FIG. 202

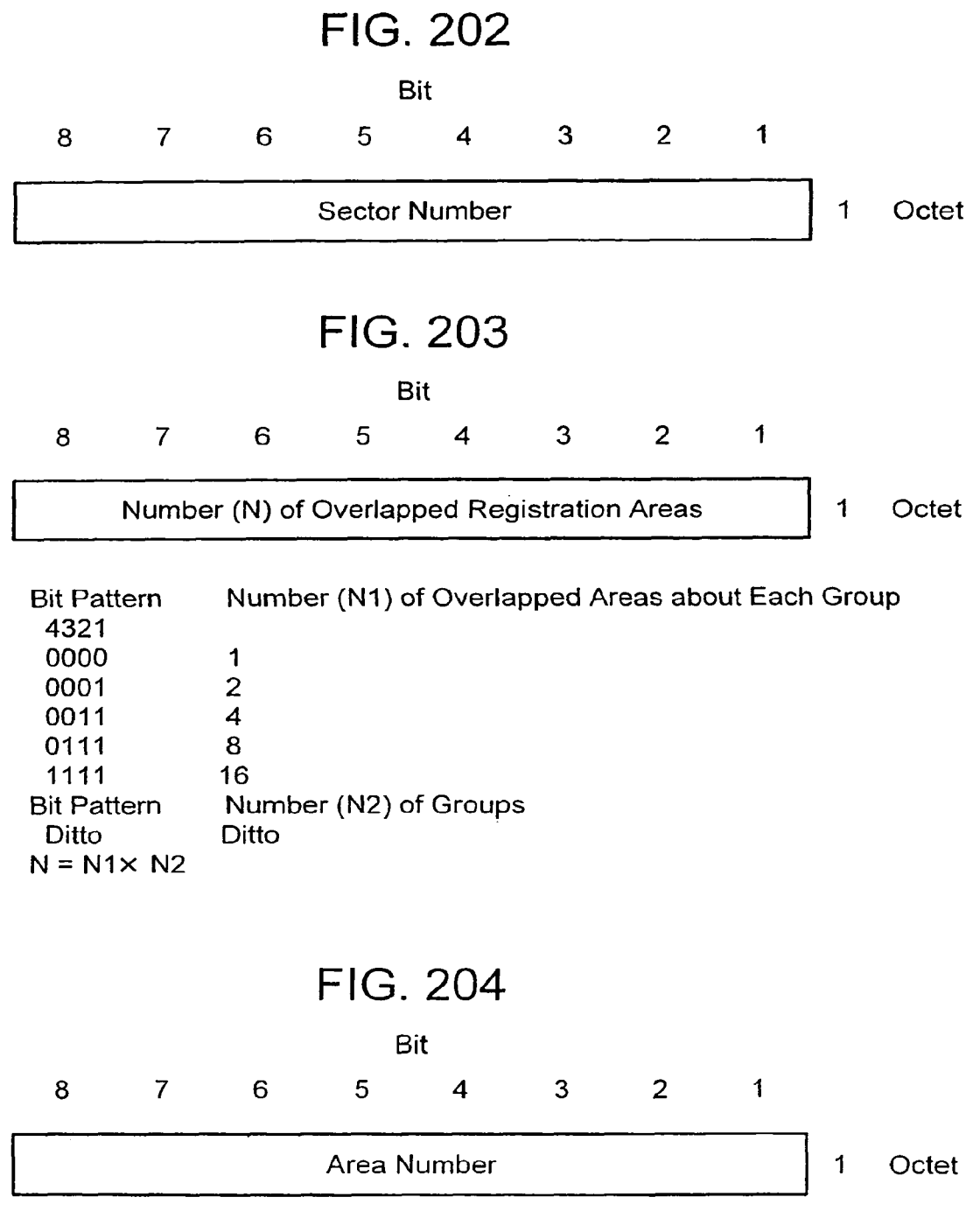

Bit

| 8 | 7 | 6 | 5 | 4 | 3 | 2 | 1 | | |
|---|---|---|---|---|---|---|---|---|---|
| Sector Number | | | | | | | | 1 | Octet |

FIG. 203

Bit

| 8 | 7 | 6 | 5 | 4 | 3 | 2 | 1 | | |
|---|---|---|---|---|---|---|---|---|---|
| Number (N) of Overlapped Registration Areas | | | | | | | | 1 | Octet |

| Bit Pattern 4321 | Number (N1) of Overlapped Areas about Each Group |
|---|---|
| 0000 | 1 |
| 0001 | 2 |
| 0011 | 4 |
| 0111 | 8 |
| 1111 | 16 |

| Bit Pattern | Number (N2) of Groups |
|---|---|
| Ditto | Ditto |

Bit

| 8 | 7 | 6 | 5 | 4 | 3 | 2 | 1 | | |
|---|---|---|---|---|---|---|---|---|---|
| Area Number | | | | | | | | 1 | Octet |

FIG. 205

| Bit 8 | 7 | 6 | 5 | 4 | 3 | 2 | 1 | |
|---|---|---|---|---|---|---|---|---|
| Area Registration Timer | | | | | | | | 1 Octet |

FIG. 206

| Bit 8 | 7 | 6 | 5 | 4 | 3 | 2 | 1 | |
|---|---|---|---|---|---|---|---|---|
| Calibrated Power Level Necessary for Reception at the Base Station | | | | | | | | 1 Octet |

FIG. 207

| Bit 8 | 7 | 6 | 5 | 4 | 3 | 2 | 1 | |
|---|---|---|---|---|---|---|---|---|
| Number (M) of Perch Channel LCs for Determination of Visited Zone | | | | | | | | 1 Octet |

FIG. 208

| Bit 8 | 7 | 6 | 5 | 4 | 3 | 2 | 1 | |
|---|---|---|---|---|---|---|---|---|
| Number (K) of Frequency Bands Used by the Base Station | | | | | | | | 1 Octet |

FIG. 209

| Bit 8 | 7 | 6 | 5 | 4 | 3 | 2 | 1 | |
|---|---|---|---|---|---|---|---|---|
| Frequency Band | | | | | | | | 1 Octet |

BC: Bearer Control
BSM: Base Station Management
RCM: Radio Control Management
(Not Used in the Invented System)
LR: Link Reference
TID: Transaction ID
PD: Protocol Discriminator

FIG. 215

| |
|---|
| Protocol Discriminator |
| Link Reference |
| Message Type |
| Fundamental Information Element 1 |
| ⋮ |
| Fundamental Information Element N |

The fundamental information element includes a parameter according to the necessary procedure, so that the parameter depends on the procedure.

FIG. 216

Message Format

| |
|---|
| Protocol Discriminator |
| Message Type |
| Fundamental Information Element 1 |
| ⋮ |
| Fundamental Information Element N |

The fundamental information element includes a parameter which is specific to the type of message.

FIG. 217

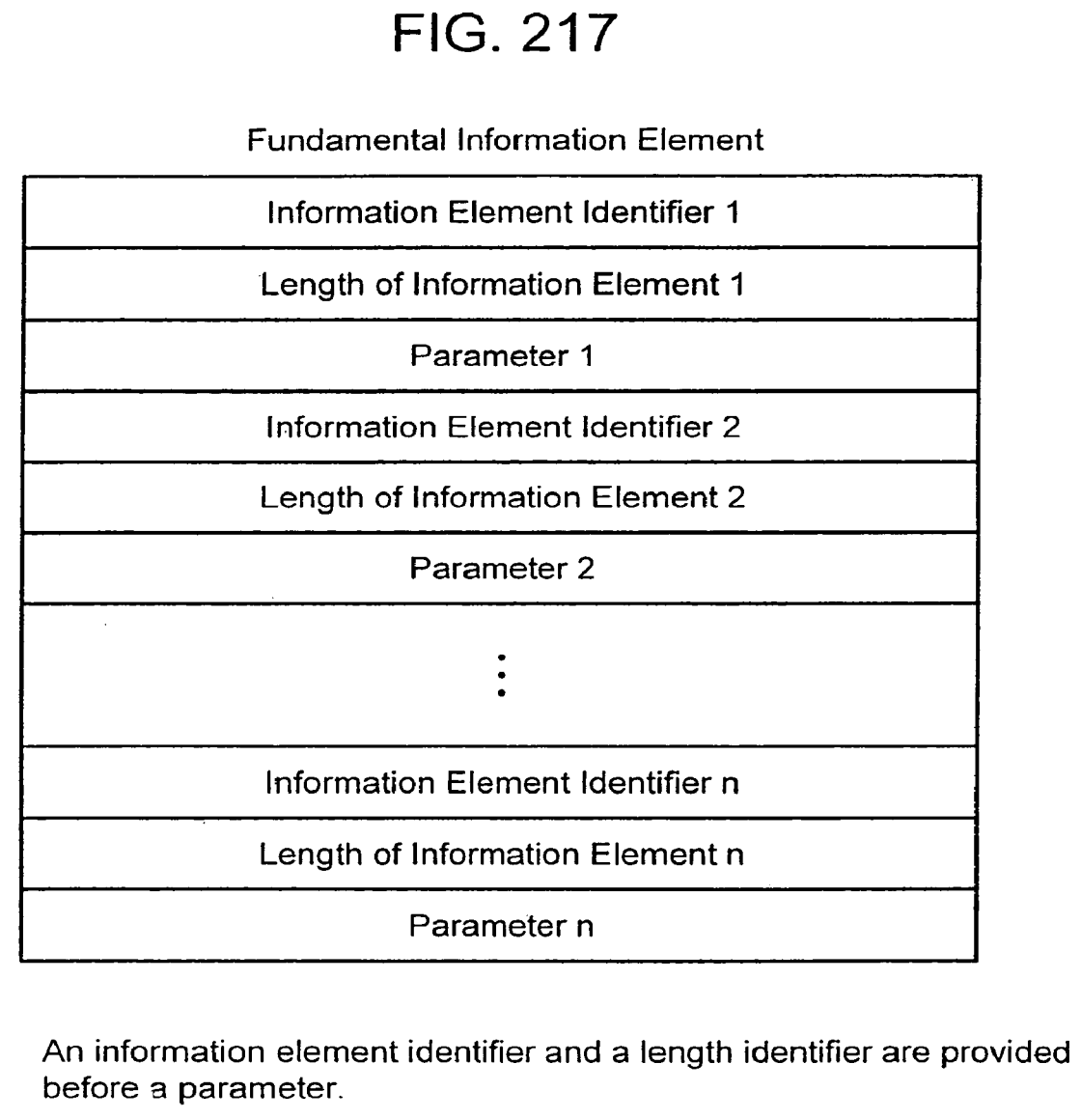

Fundamental Information Element

| |
|---|
| Information Element Identifier 1 |
| Length of Information Element 1 |
| Parameter 1 |
| Information Element Identifier 2 |
| Length of Information Element 2 |
| Parameter 2 |
| ⋮ |
| Information Element Identifier n |
| Length of Information Element n |
| Parameter n |

An information element identifier and a length identifier are provided before a parameter.

FIG. 218

| |
|---|
| Fundamental Information Element |
| Information Element Identifier |
| Parameter 1 |
| Parameter 2 |
| ⋮ |
| Parameter n |

FIG. 219

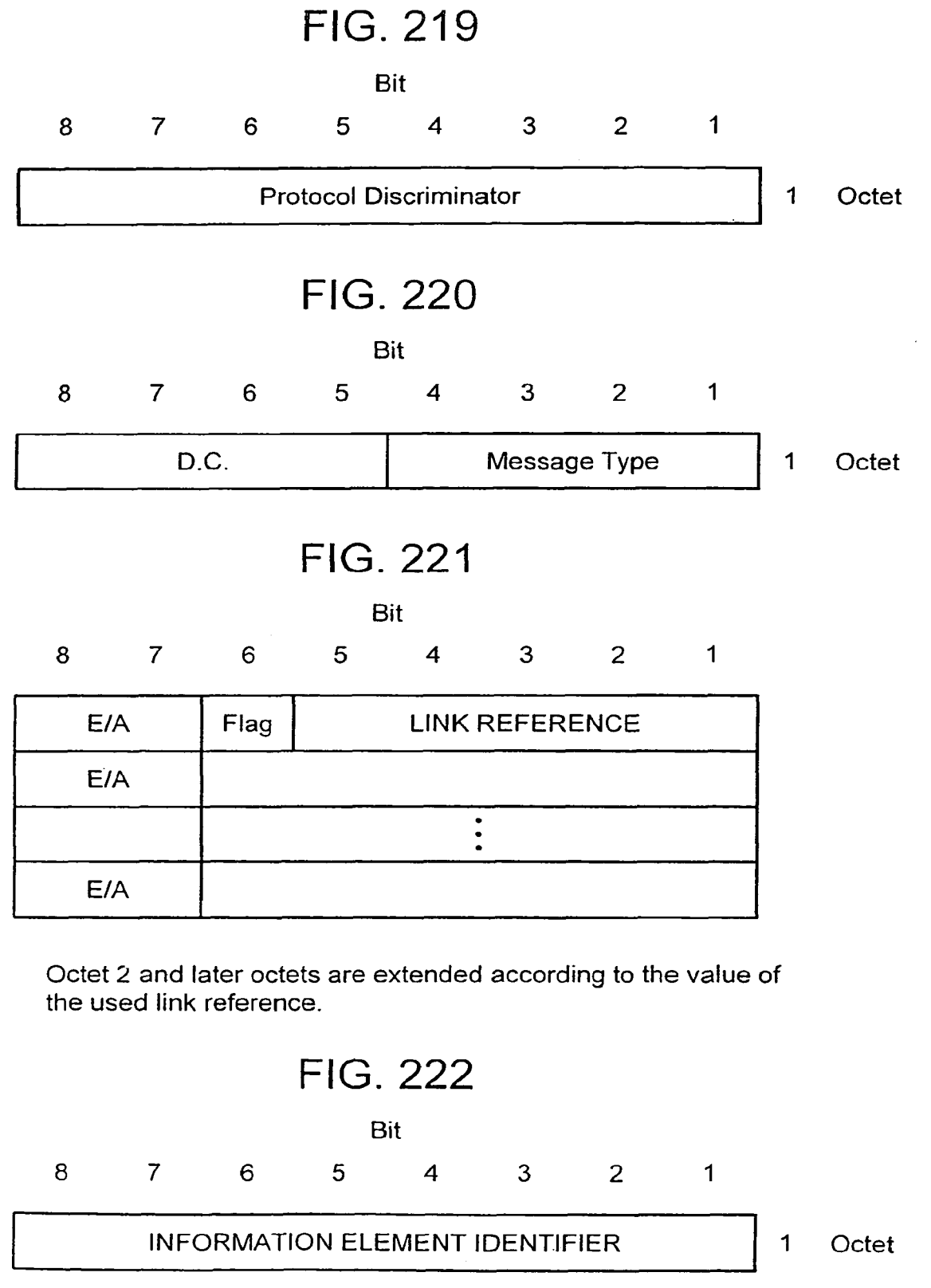

Bit

| 8 | 7 | 6 | 5 | 4 | 3 | 2 | 1 | |
|---|---|---|---|---|---|---|---|---|
| Protocol Discriminator | | | | | | | | 1 Octet |

FIG. 220

Bit

| 8 | 7 | 6 | 5 | 4 | 3 | 2 | 1 | |
|---|---|---|---|---|---|---|---|---|
| D.C. | | | | Message Type | | | | 1 Octet |

FIG. 221

Bit

| 8 | 7 | 6 | 5 | 4 | 3 | 2 | 1 |
|---|---|---|---|---|---|---|---|
| E/A | | Flag | LINK REFERENCE | | | | |
| E/A | | | | | | | |
| | | ⋮ | | | | | |
| E/A | | | | | | | |

Octet 2 and later octets are extended according to the value of the used link reference.

FIG. 222

Bit

| 8 | 7 | 6 | 5 | 4 | 3 | 2 | 1 | |
|---|---|---|---|---|---|---|---|---|
| INFORMATION ELEMENT IDENTIFIER | | | | | | | | 1 Octet |

FIG. 223

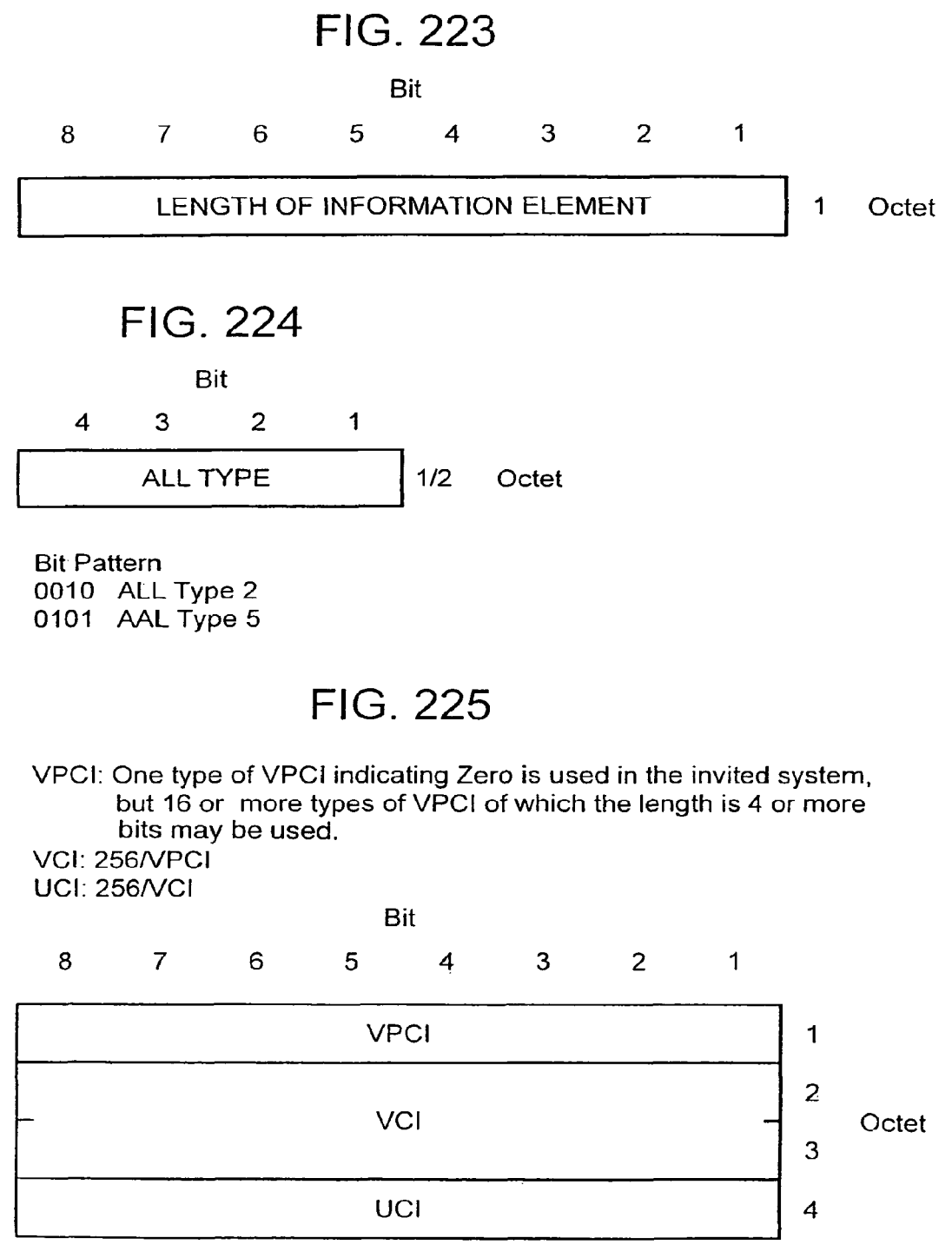

Bit

| 8 | 7 | 6 | 5 | 4 | 3 | 2 | 1 | | |
|---|---|---|---|---|---|---|---|---|---|
| LENGTH OF INFORMATION ELEMENT | | | | | | | | 1 | Octet |

FIG. 224

Bit

| 4 | 3 | 2 | 1 | | |
|---|---|---|---|---|---|
| ALL TYPE | | | | 1/2 | Octet |

Bit Pattern
0010 ALL Type 2
0101 AAL Type 5

FIG. 225

VPCI: One type of VPCI indicating Zero is used in the invited system, but 16 or more types of VPCI of which the length is 4 or more bits may be used.
VCI: 256/VPCI
UCI: 256/VCI Bit

| 8 | 7 | 6 | 5 | 4 | 3 | 2 | 1 | | |
|---|---|---|---|---|---|---|---|---|---|
| VPCI | | | | | | | | 1 | |
| VCI | | | | | | | | 2 | Octet |
| | | | | | | | | 3 | |
| UCI | | | | | | | | 4 | |

FIG. 226

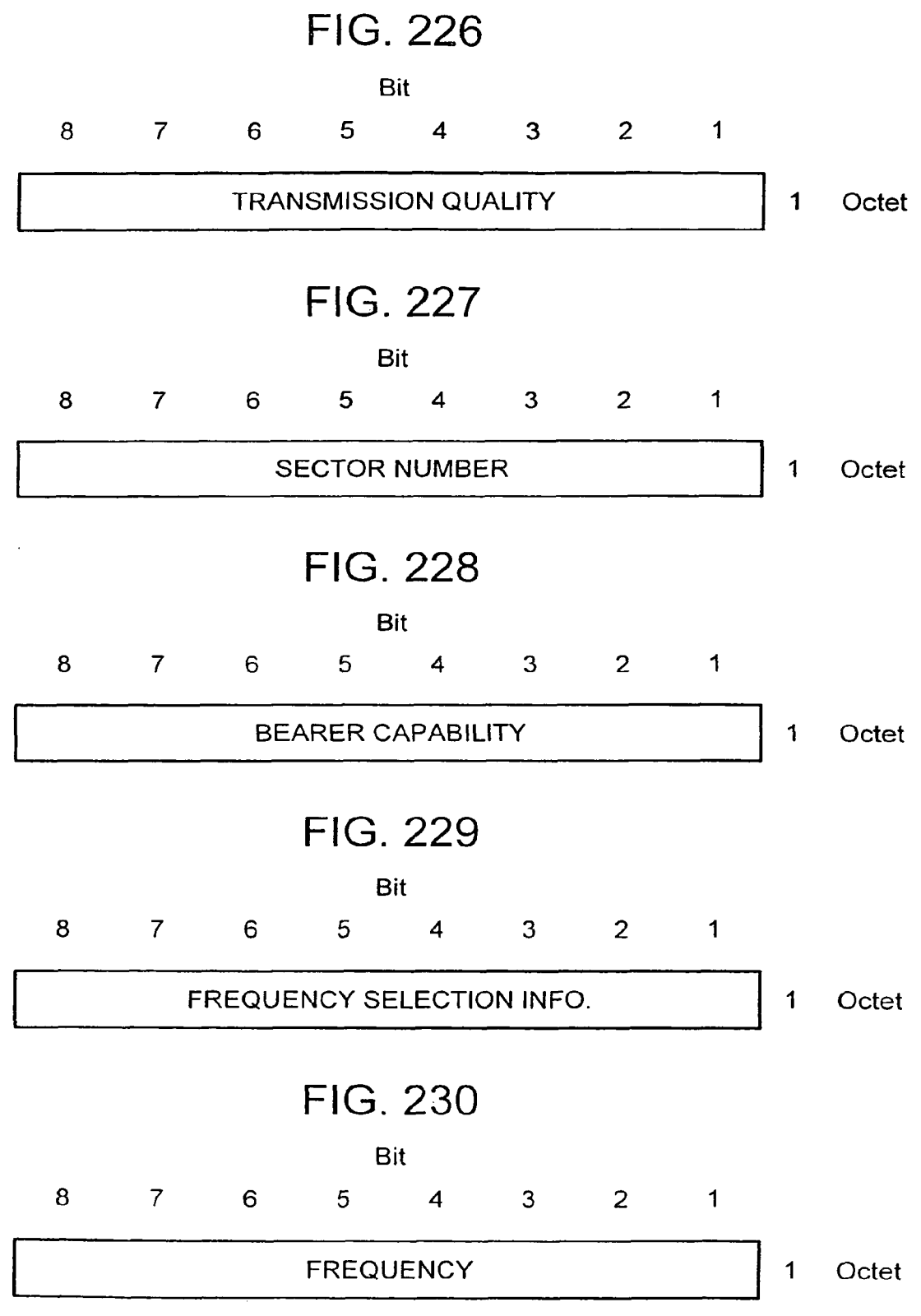

Bit

| 8 | 7 | 6 | 5 | 4 | 3 | 2 | 1 | |
|---|---|---|---|---|---|---|---|---|
| TRANSMISSION QUALITY | | | | | | | | 1 Octet |

FIG. 227

Bit

| 8 | 7 | 6 | 5 | 4 | 3 | 2 | 1 | |
|---|---|---|---|---|---|---|---|---|
| SECTOR NUMBER | | | | | | | | 1 Octet |

FIG. 228

Bit

| 8 | 7 | 6 | 5 | 4 | 3 | 2 | 1 | |
|---|---|---|---|---|---|---|---|---|
| BEARER CAPABILITY | | | | | | | | 1 Octet |

FIG. 229

Bit

| 8 | 7 | 6 | 5 | 4 | 3 | 2 | 1 | |
|---|---|---|---|---|---|---|---|---|
| FREQUENCY SELECTION INFO. | | | | | | | | 1 Octet |

FIG. 230

Bit

| 8 | 7 | 6 | 5 | 4 | 3 | 2 | 1 | |
|---|---|---|---|---|---|---|---|---|
| FREQUENCY | | | | | | | | 1 Octet |

FIG. 231

Bit

| 4 | 3 | 2 | 1 | |
|---|---|---|---|---|
| FRAME OFFSET GROUP | | | | 1/2 Octet |

FIG. 232

Bit

| 4 | 3 | 2 | 1 | |
|---|---|---|---|---|
| SLOT OFFSET GROUP | | | | 1/2 Octet |

FIG. 233

Bit

| 8 | 7 | 6 | 5 | 4 | 3 | 2 | 1 | |
|---|---|---|---|---|---|---|---|---|
| E/A | LONG CODE PHASE DIFFERENCE | | | | | | | |
| | ⋮ | | | | | | | Octet |
| E/A | | | | | | | | |

When the long code phase difference is in excess of 128 chip time, the field should be extended with extension bits.

| Bit 8765 | Bandwidth |
|---|---|
| 0000 | 20.0 MHz |
| 0001 | 10.0 MHz |
| 0010 | 5.0 MHz |
| 0011 | 1.25 MHz |
| Others | Reserved |

| Bit 4321 | Code Type (Chip Time) |
|---|---|
| 0000 | 1 chip/sym |
| 0001 | 2 chip/sym |
| · | · |
| · | · |
| 1001 | 512 chip/sym |
| 1010 | 1024 chip/sym |
| 1011 | 2048 chip/sym |
| Others | Reserved |

FIG. 236

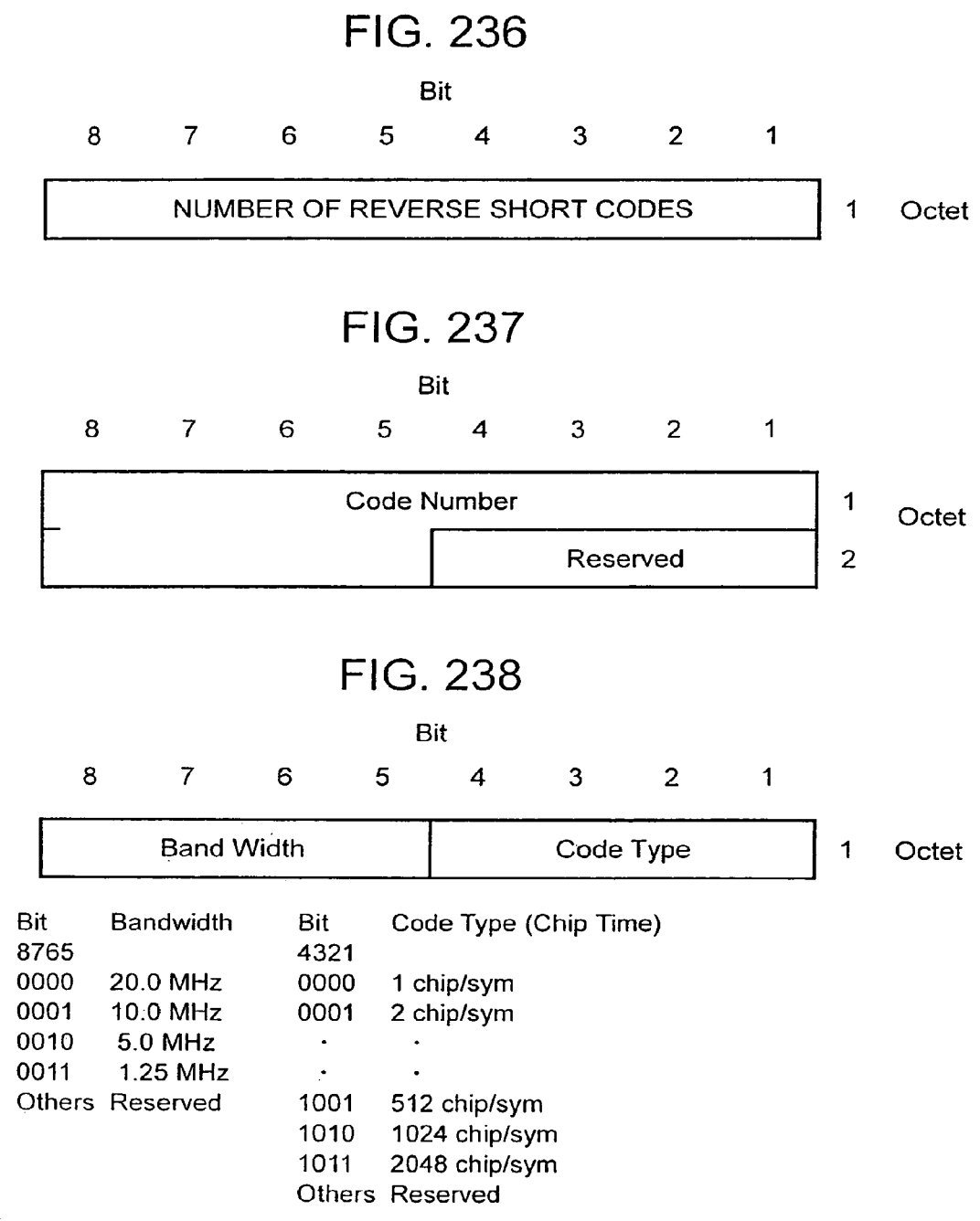

Bit

| 8 | 7 | 6 | 5 | 4 | 3 | 2 | 1 | | |
|---|---|---|---|---|---|---|---|---|---|
| NUMBER OF REVERSE SHORT CODES | | | | | | | | 1 | Octet |

FIG. 237

Bit

| 8 | 7 | 6 | 5 | 4 | 3 | 2 | 1 | | |
|---|---|---|---|---|---|---|---|---|---|
| Code Number | | | | | | | | 1 | Octet |
| | | | | Reserved | | | | 2 | |

FIG. 238

Bit

| 8 | 7 | 6 | 5 | 4 | 3 | 2 | 1 | | |
|---|---|---|---|---|---|---|---|---|---|
| Band Width | | | | Code Type | | | | 1 | Octet |

| Bit 8765 | Bandwidth | Bit 4321 | Code Type (Chip Time) |
|---|---|---|---|
| 0000 | 20.0 MHz | 0000 | 1 chip/sym |
| 0001 | 10.0 MHz | 0001 | 2 chip/sym |
| 0010 | 5.0 MHz | · | · |
| 0011 | 1.25 MHz | · | · |
| Others | Reserved | 1001 | 512 chip/sym |
| | | 1010 | 1024 chip/sym |
| | | 1011 | 2048 chip/sym |
| | | Others | Reserved |

FIG. 239

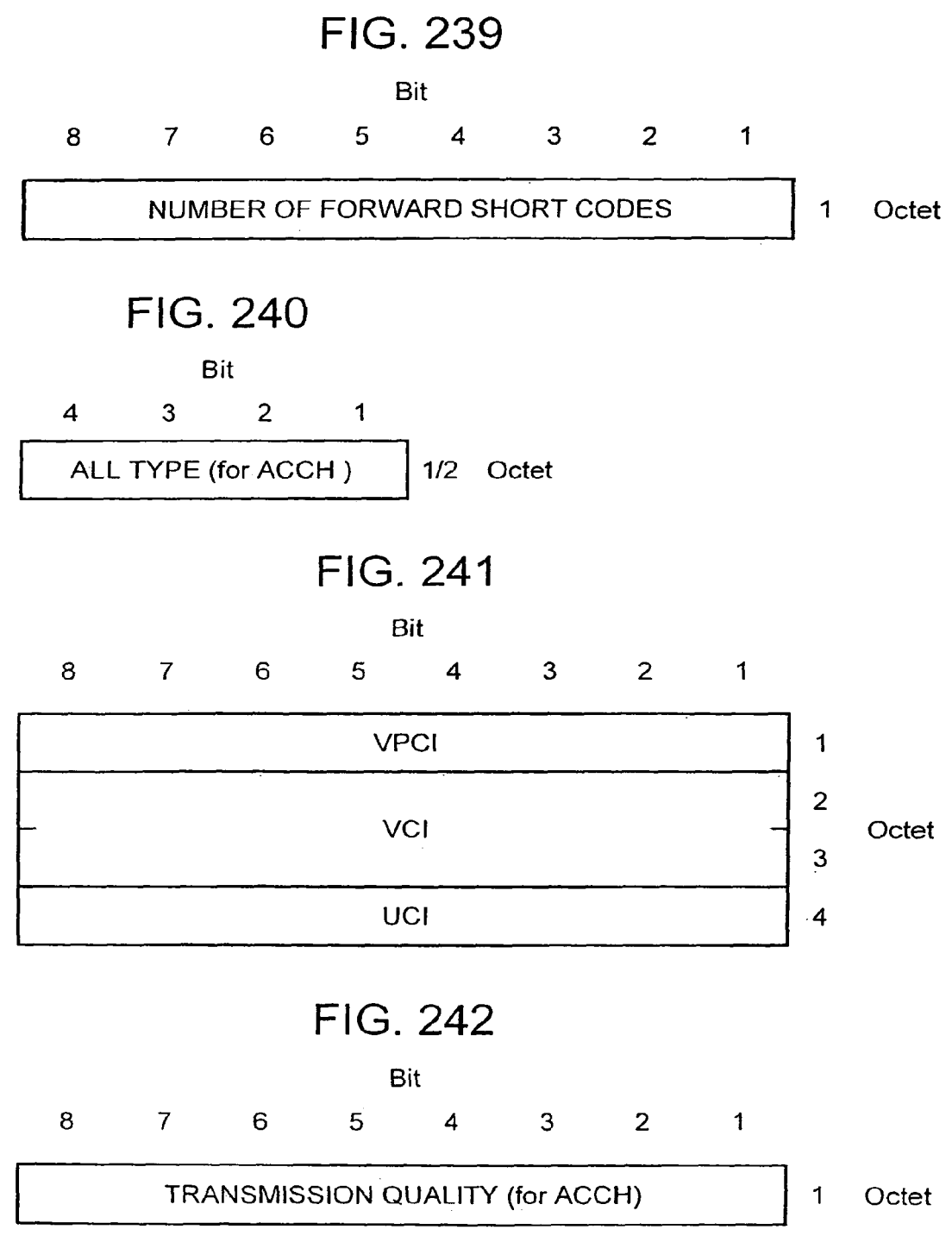

Bit

| 8 | 7 | 6 | 5 | 4 | 3 | 2 | 1 | | |
|---|---|---|---|---|---|---|---|---|---|
| NUMBER OF FORWARD SHORT CODES | | | | | | | | 1 | Octet |

FIG. 240

Bit

| 4 | 3 | 2 | 1 | | |
|---|---|---|---|---|---|
| ALL TYPE (for ACCH ) | | | | 1/2 | Octet |

FIG. 241

Bit

| 8 | 7 | 6 | 5 | 4 | 3 | 2 | 1 | | |
|---|---|---|---|---|---|---|---|---|---|
| VPCI | | | | | | | | 1 | |
| VCI | | | | | | | | 2 | Octet |
| | | | | | | | | 3 | |
| UCI | | | | | | | | 4 | |

FIG. 242

Bit

| 8 | 7 | 6 | 5 | 4 | 3 | 2 | 1 | | |
|---|---|---|---|---|---|---|---|---|---|
| TRANSMISSION QUALITY (for ACCH) | | | | | | | | 1 | Octet |

FIG. 246

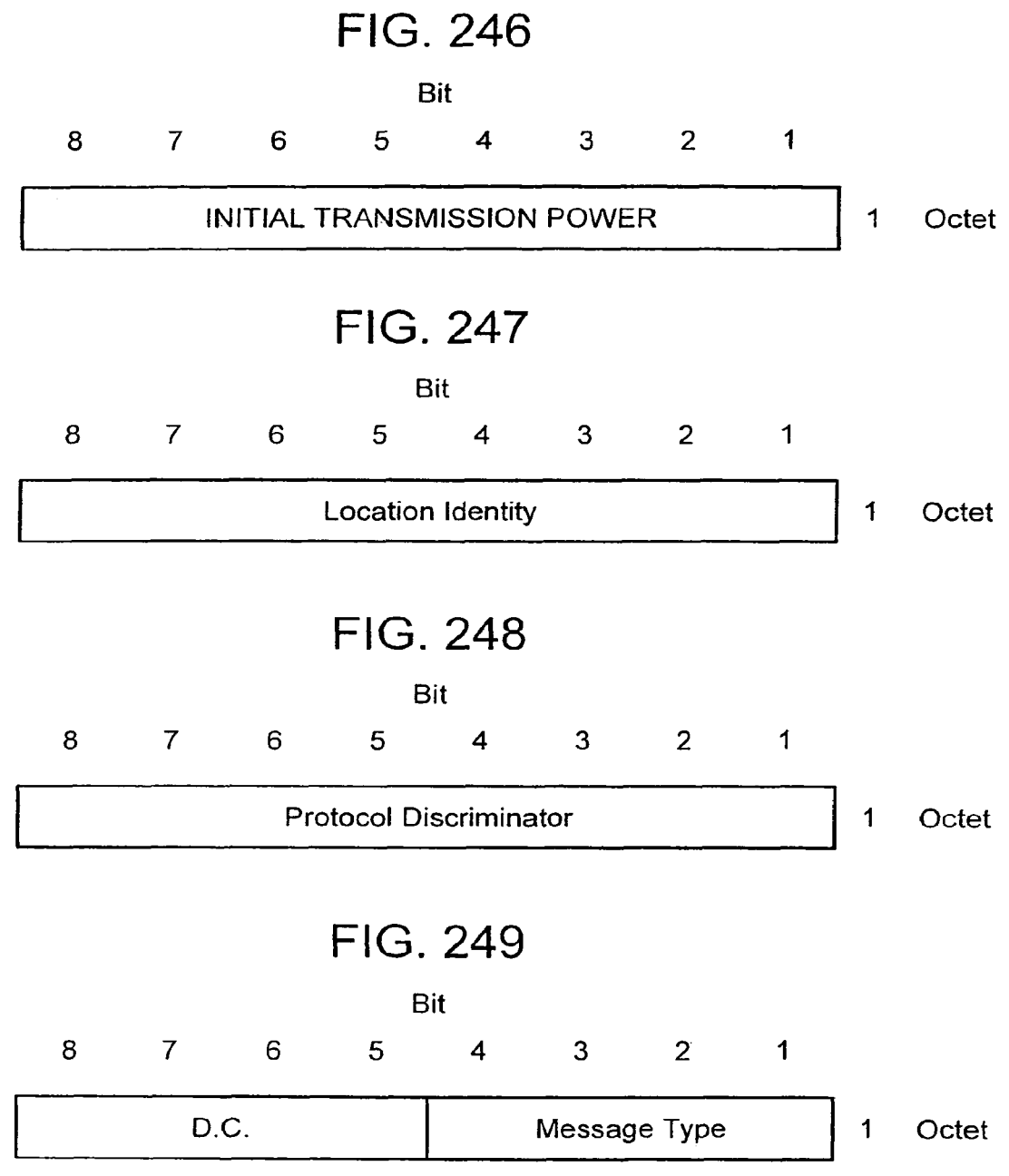

Bit

| 8 | 7 | 6 | 5 | 4 | 3 | 2 | 1 | |
|---|---|---|---|---|---|---|---|---|
| INITIAL TRANSMISSION POWER | | | | | | | | 1 Octet |

FIG. 247

Bit

| 8 | 7 | 6 | 5 | 4 | 3 | 2 | 1 | |
|---|---|---|---|---|---|---|---|---|
| Location Identity | | | | | | | | 1 Octet |

FIG. 248

Bit

| 8 | 7 | 6 | 5 | 4 | 3 | 2 | 1 | |
|---|---|---|---|---|---|---|---|---|
| Protocol Discriminator | | | | | | | | 1 Octet |

FIG. 249

Bit

| 8 | 7 | 6 | 5 | 4 | 3 | 2 | 1 | |
|---|---|---|---|---|---|---|---|---|
| D.C. | | | | Message Type | | | | 1 Octet |

FIG. 250

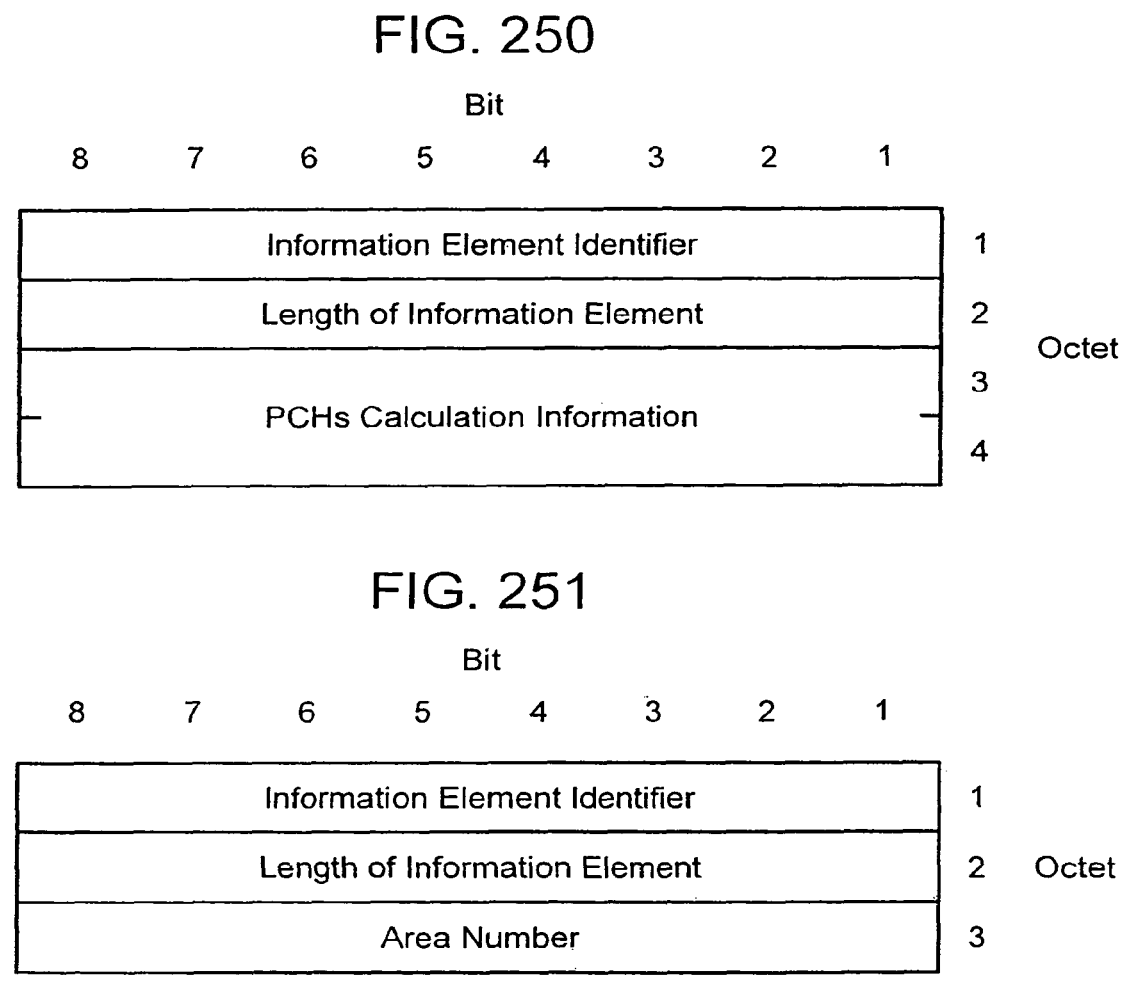

Bit: 8 7 6 5 4 3 2 1

| Field | Octet |
|---|---|
| Information Element Identifier | 1 |
| Length of Information Element | 2 |
| PCHs Calculation Information | 3 |
| | 4 |

FIG. 251

Bit: 8 7 6 5 4 3 2 1

| Field | Octet |
|---|---|
| Information Element Identifier | 1 |
| Length of Information Element | 2 |
| Area Number | 3 |

Bit

| 8 | 7 | 6 | 5 | 4 | 3 | 2 | 1 | Octet |
|---|---|---|---|---|---|---|---|---|
| Information Element Identifier | | | | | | | | 1 |
| Length of Information Element | | | | | | | | 2 |
| D.C. | | Paging ID | | | | | | 3 |

CONTINUED FROM FIG. 255
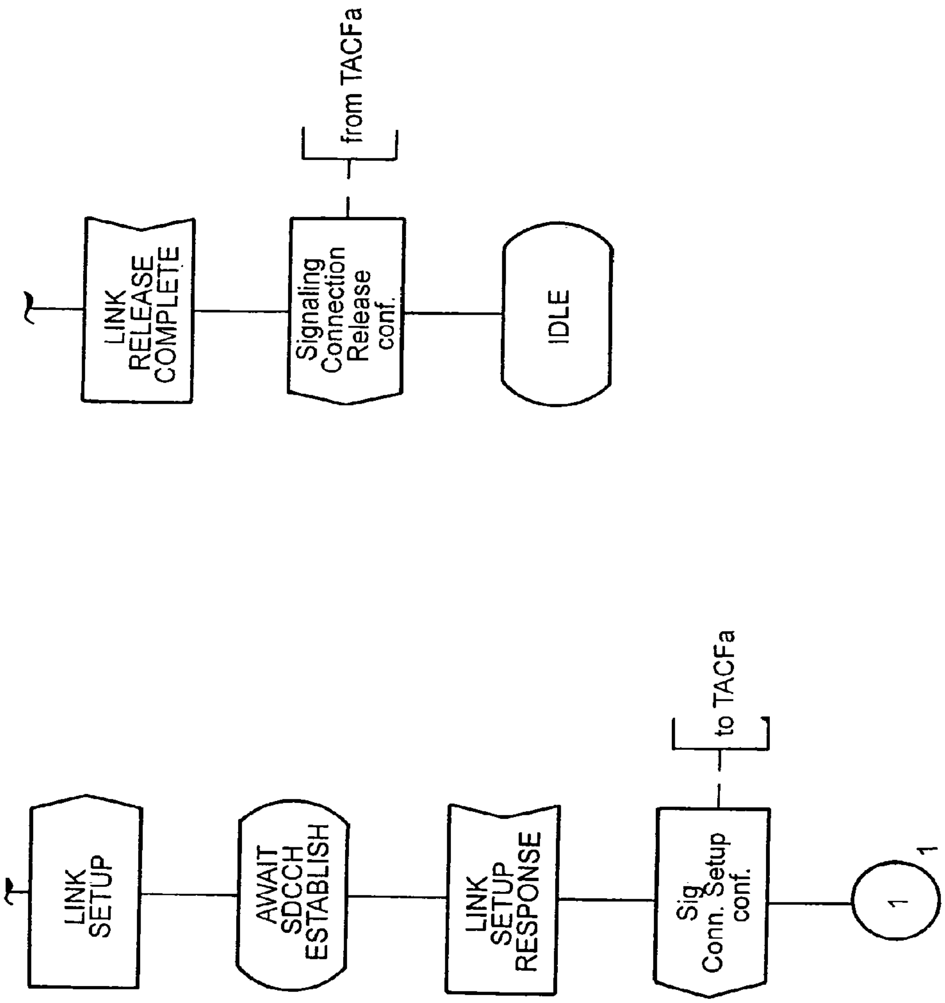
SDL DIAGRAM FOR BEARER CONTROL IN THE SDCCH EXECUTED IN THE BSC CONTINUED FROM FIG. 256
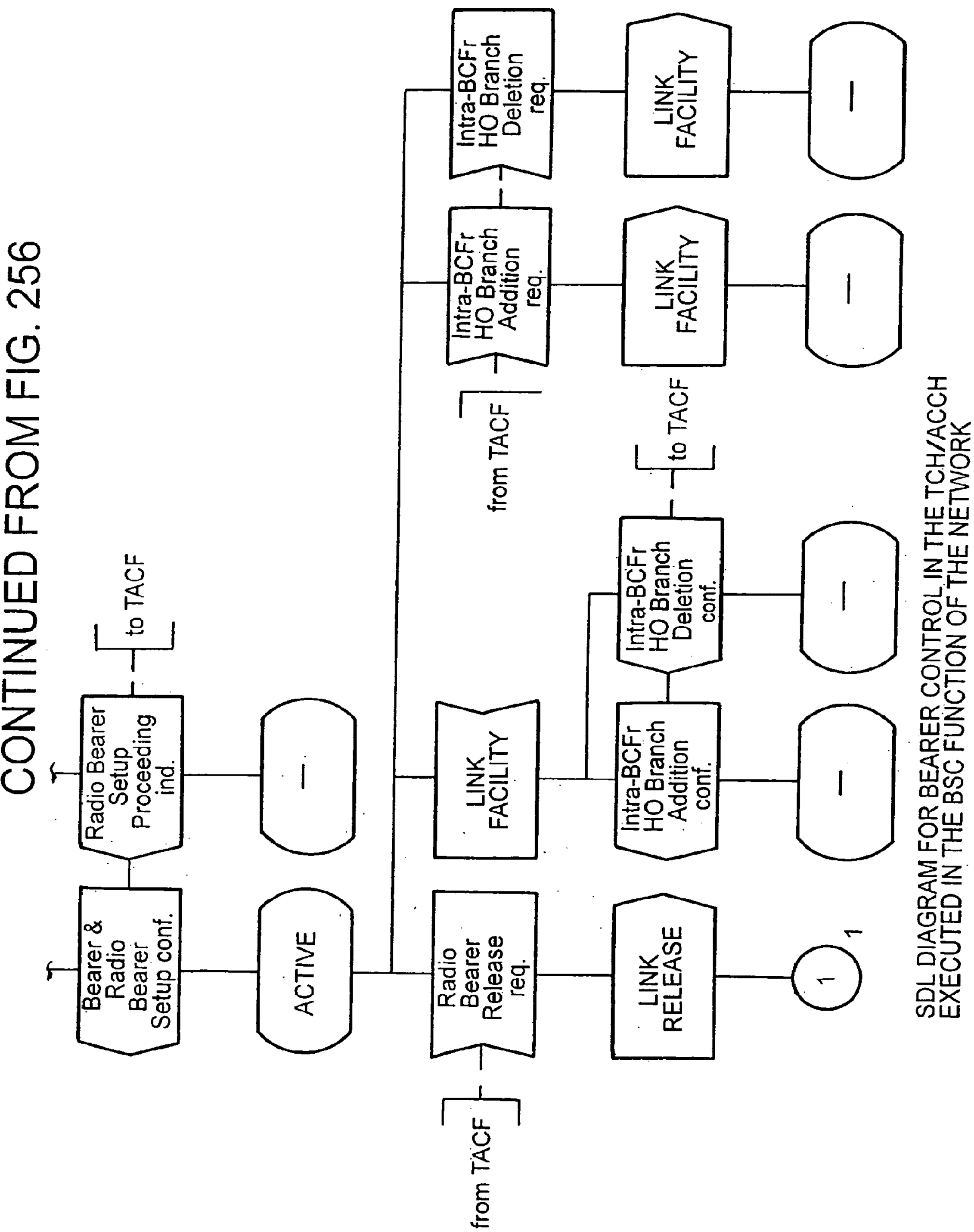
SDL DIAGRAM FOR BEARER CONTROL IN THE TCH/ACCH EXECUTED IN THE BSC FUNCTION OF THE NETWORK CONTINUED FROM FIG. 257
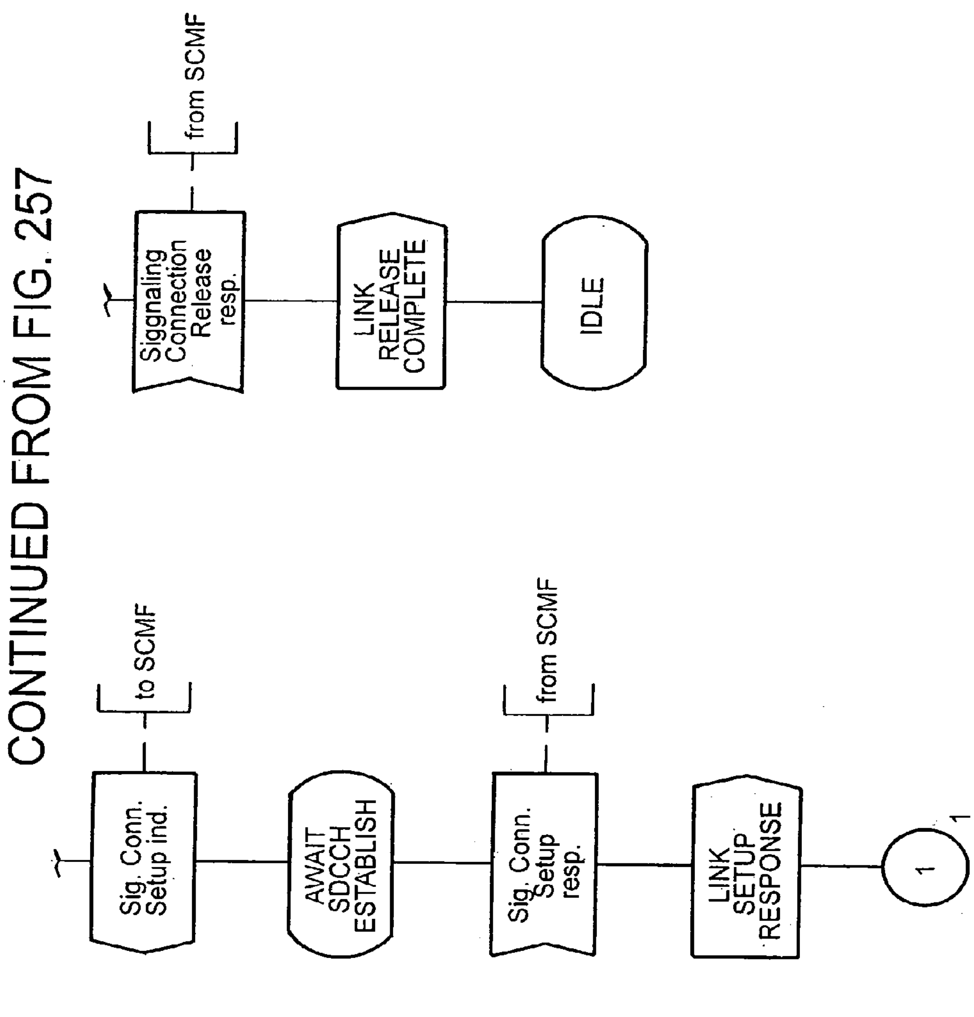
SDL DIAGRAM FOR BEARER CONTROL IN THE SDCCH EXECUTED IN THE BTS CONTINUED FROM FIG. 258
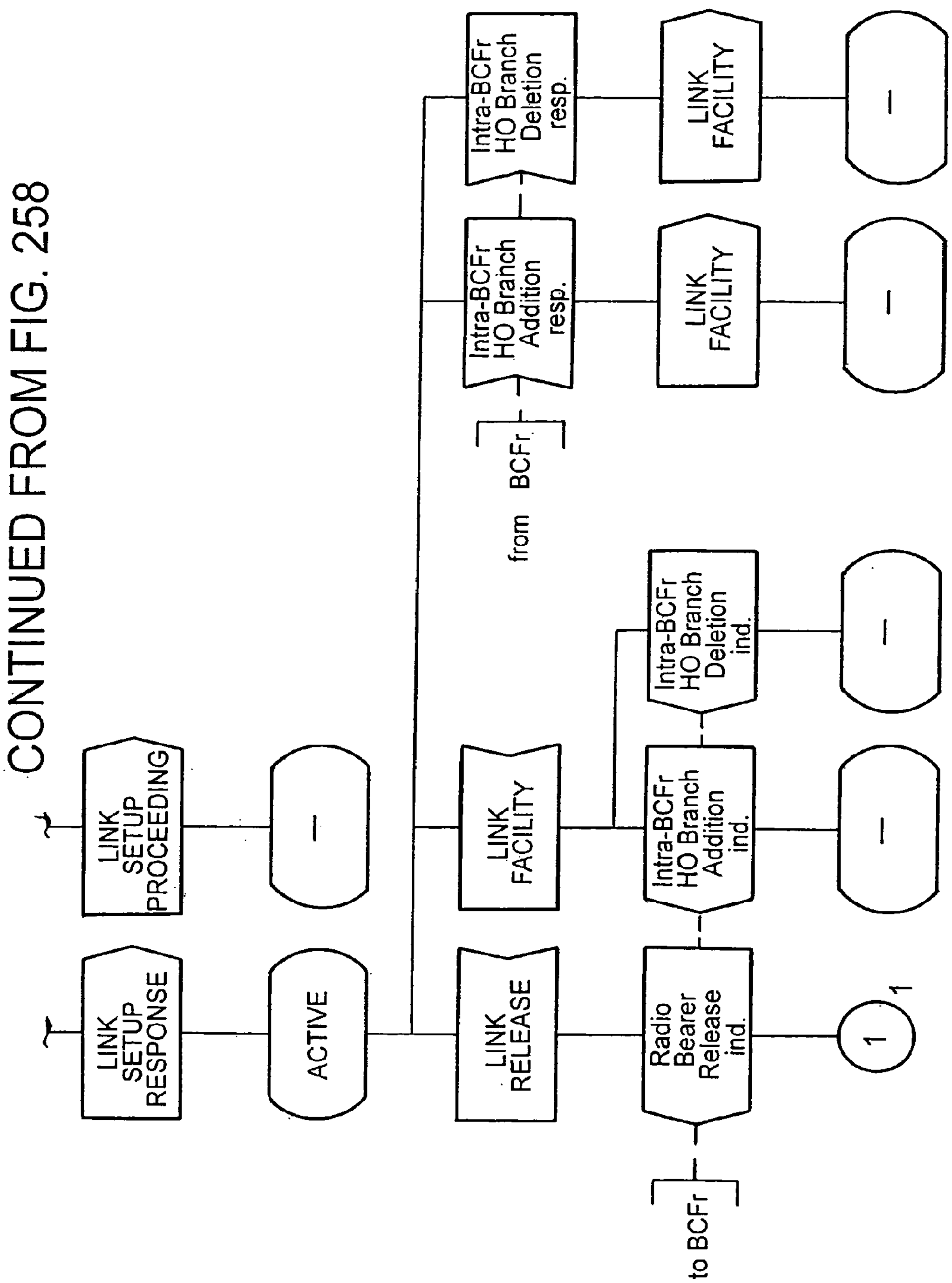
SDL DIAGRAM FOR BEARER CONTROL IN THE TCH / ACCH EXECUTED IN THE BTS

FIG. 265

| | ABBREVIATION | ORIGINAL FORM |
|---|---|---|
| 1 | BTS | Radio base terminal system |
| 2 | AMP | Transmission/reception amplifier function part |
| 3 | MDE | Base station modulation/demodulation function part |
| 4 | MS | Radio mobile station equipment |
| 5 | ANT | Antenna |
| 6 | HW | Cable transmission line |
| 7 | MCC-SIM | Radio control/switch simulator equipment |
| 8 | CODEC | Voice coding/decoding function unit |
| 9 | ADP | Adapter signal processor unit for data transmission |

FIG. 266

| Attribute | Content |
|---|---|
| Info. transfer capability | Voice/unrestricted digital |
| Transfer mode | Circuit switching/ packet switching (FFS) |
| Info. transfer rate | 8, 64, or n x 64 kbps |
| Call setup | Immediate |
| Commun. format | Point-to-point |
| Symmetry | Bi-directional symmetric |
| Voice coding | CS-ACELP (ITU-T Recm. G.729) |

FIG. 267

| | |
|---|---|
| Information transfer capability | Voice |
| Traffic type | Circuit switching |
| User information transfer rate | 8 kbps |
| Call setup | Immediate |
| Symmetry | Bi-directional symmetric |
| Communication format | Point-to-point |
| Interconnection | None |

FIG. 268

| | |
|---|---|
| Information transfer capability | Unrestricted |
| Traffic type | Circuit switching |
| User information transfer rate | 64 kbps |
| Call setup | Immediate |
| Symmetry | Bi-directional symmetric |
| Communication format | Point-to-point |
| Interconnection | None |

FIG. 269

| | |
|---|---|
| Information transfer capability | Unrestricted |
| Traffic type | Circuit switching |
| User information transfer rate | 384 kbps |
| Call setup | Immediate |
| Symmetry | Bi-directional symmetric |
| Communication format | Point-to-point |
| Interconnection | None |

FIG. 270

| FE Number | EE Name | FE Number | EE Name |
|---|---|---|---|
| EE01 | CCAF' | EE10 | SRF |
| EE02 | TACAF | EE11 | MCF |
| EE03 | BCAF | EE12 | SACF |
| EE04 | BCF | EE13 | MRRC |
| EE05 | TACF | EE14 | MRTR |
| EE06 | CCF' | EE15 | RRC |
| EE07 | LRCF | EE16 | RFTR |
| EE08 | LRDF | EE17 | TIMF |
| EE09 | SSF | EE18 | UIMF |

FIG. 271

| Relationship Designation | Related FEs | Relationship Designation | Related FEs |
|---|---|---|---|
| ra | FE01 and FE06 (CCAF'-CCF') | rp | FE13 and FE15 (MRRC-RRC) |
| rb | FE02 and FE05 (TACAF-TACF) | rq | FE15 and FE16 (RRC-RFTR) |
| rc | FE07 and FE09 (LRCF-SSF) | rr | FE03 and FE04 (BCAF-BCF) |
| rd | FE07 and FE08 (LRCF-LRDF) | rs | FE04 and FE06 (BCF-CCF') |
| re | FE09 and FE10 (SSF-SRF) | rt | FE05 and FE15 (TACF-RRC) |
| rf | FE07 and FE10 (LRCF-SRF) | ru | FE02 and FE13 (TACAF-MRRC) |
| rg | FE05 and FE07 (TACF-LRCF) | rv | FE02nd FE17 (TACAF-TIMF) |
| rh | FE05 and FE12 (TACF-SACF) | rw | FE11 and FE17 (MCF-TIMF) |
| ri | FE05 and FE06 (TACF-CCF') | rx | FE01 and FE18 (CCAF'-UIMF) |
| rj | FE05 and FE04 (TACF-BCF) | ry | FE11 and FE18 (MCF-UIMF) |
| rk | FE07 and FE12 (LRCF-SACF) | r44 | FE04a and FE04b (BCFr-BCF) |
| rl | FE11 and FE12 (MCF-SACF) | r66 | FE06 and FE06 (CCF'-CCF') |
| rm | FE01 and FE02 (CCAF-TACAF) | r77 | FE07 and FE07 (LRCF-LRCF) |
| rn | FE02 and FE03 (TACAF-BCAF) | r55 | FE05 and FE05 (TACF-TACF) |
| ro | FE13 and FE14 (MRRC-MRTR) | r88 | FE08 and FE08 (LRDF-LRDF) |

FIG. 272

| *IE* | *Relationship* | *Mandatory/Optional* |
|---|---|---|
| Call ID | rm | M |

FIG. 273

| *IE* | *Relationship* | *Mandatory/Optional* |
|---|---|---|
| User ID | rb | M |

FIG. 274

| *IE* | *Relationship* | *Mandatory/Optional* |
|---|---|---|
| TACF-LRCF Relationship ID | rg | M |
| User ID | rg | M |
| Service Address Information | rg | M |
| Anchor Tacf Instance ID | rg | M |
| Routing Address | rg | M |
| LAI | rg | O |

FIG. 275

| *IE* | *Relationship* | *Mandatory/Optional* |
|---|---|---|
| TACF-LRCF Relationship ID | rg | M |
| User ID | rg | M |

FIG. 276

| *IE* | *Relationship* | *Mandatory/Optional* |
|---|---|---|
| LRCF-LRDF Relationship ID | rd | M |
| User ID | rd | M |

FIG. 277

| *IE* | *Relationship* | *Mandatory/Optional* |
|---|---|---|
| LRCF-LRDF Relationship ID | rd | M |
| Reverse Long Code | rd | M |
| Result | rd | M |

FIG. 278

| *IE* | *Relationship* | *Mandatory/Optional* |
|---|---|---|
| LRCF-LRDF Relationship ID | rd | M |
| User ID | rd | M |
| Terminal Status | rd | M |

FIG. 279

| *IE* | *Relationship* | *Mandatory/Optional* |
|---|---|---|
| LRCF-LRDF Relationship ID | rd | M |

FIG. 280

| *IE* | *Relationship* | *Mandatory/Optional* |
|---|---|---|
| LRCF-LRDF Relationship ID | rd | M |
| User ID | rd | M |
| Routing Address | rd | M |
| Anchor TACF Instance ID | rd | M |

FIG. 281

| *IE* | *Relationship* | *Mandatory/Optional* |
|---|---|---|
| LRCF-LRDF Relationship ID | rd | M |

FIG. 282

| *IE* | *Relationship* | *Mandatory/Optional* |
|---|---|---|
| TACF-LRCF Relationship ID | rg | M |
| Result | rg | M |

FIG. 283

| *IE* | *Relationship* | *Mandatory/Optional* |
|---|---|---|
| TACF-LRCF Relationship ID | rg | M |
| Reverse Long Code | rg | M |
| Result | rg | M |

FIG. 284

| *IE* | *Relationship* | *Mandatory/Optional* |
|---|---|---|
| None | | |

FIG. 285

| *IE* | *Relationship* | *Mandatory/Optional* |
|---|---|---|
| Call ID | rm | M |

FIG. 286

| *IE* | *Relationship* | *Mandatory/Optional* |
|---|---|---|
| Call ID | ra | M |
| Bearer Capability | ra | M |
| Called Number | ra | M |
| Calling User ID | r: | M |
| QOS | ra | O |
| Transit Network Selection | ra | O |
| Low Layer Compatibility | ra | O |
| High Layer Compatibility | ra | O |

FIG. 287

| *IE* | *Relationship* | *Mandatory/Optional* |
|---|---|---|
| TACF Instance ID | ri | M |

FIG. 288

| *IE* | *Relationship* | *Mandatory/Optional* |
|---|---|---|
| Cell ID + Pilot Channel Info. | ro | M |
| Measurement Condition | ro | M |

FIG. 289

| *IE* | *Relationship* | *Mandatory/Optional* |
|---|---|---|
| Pilot Channel Reception Level | ro | M |
| Interference Level | ro | M |

FIG. 290

| *IE* | *Relationship* | *Mandatory/Optional* |
|---|---|---|
| Cell IDs + Pilot Channel Reception Levels + Interference Levels | rp | M |

FIG. 291

| *IE* | *Relationship* | *Mandatory/Optional* |
|---|---|---|
| LRCF-SSF Relationship ID | rc | M |
| Service Address Information | rc | M |
| Bearer Capability | rc | O |
| Calling User ID | rc | M |

FIG. 292

| *IE* | *Relationship* | *Mandatory/Optional* |
|---|---|---|
| LRCF-LRDF Relationship ID | rd | M |
| Calling User ID | rd | M |
| Selection | rd | M |

FIG. 293

| *IE* | *Relationship* | *Mandatory/Optional* |
|---|---|---|
| LRCF-LRDF Relationship ID | rd | M |
| User Profile | rd | M |

FIG. 294

| *IE* | *Relationship* | *Mandatory/Optional* |
|---|---|---|
| LRCF-SSF Relationship ID | rc | M |
| Calling Number | rc | M |
| Result | rc | M |

FIG. 295

| *IE* | *Relationship* | *Mandatory/Optional* |
|---|---|---|
| Call ID | r66 | M |
| Bearer Capability | r66 | M |
| Called Number | r66 | M |
| Calling Number | r66 | M |
| QOS | r66 | O |
| Transit Network Selection | r66 | O |
| Low Layer Compatibility | r66 | O |
| High Layer Compatibility | r66 | O |

FIG. 296

| *IE* | *Relationship* | *Mandatory/Optional* |
|---|---|---|
| Call ID | ra | M |

FIG. 297

| *IE* | *Relationship* | *Mandatory/Optional* |
|---|---|---|
| Number Of Measured Cells | rt | M |
| Cell IDs + Pilot Channels Info. | rt | M |
| Measurement Condition | rt | M |

FIG. 298

| *IE* | *Relationship* | *Mandatory/Optional* |
|---|---|---|
| Number of Measured Cells | rp | M |
| Cell IDs + Pilot Channels Info. | rp | M |
| Measurement Condition | rp | M |

FIG. 299

| *IE* | *Relationship* | *Mandatory/Optional* |
|---|---|---|
| Call ID | r66 | M |

FIG. 300

| *IE* | *Relationship* | *Mandatory/Optional* |
|---|---|---|
| Call ID | ra | M |

FIG. 301

| *IE* | *Relationship* | *Mandatory/Optional* |
|---|---|---|
| Call ID | r66 | M |
| Called Number | r66 | O |
| Connected Line ID | r66 | O |
| High Layer Compatibility | r66 | O |
| Low Layer Compatibility | r66 | O |

FIG. 302

| *IE* | *Relationship* | *Mandatory/Optional* |
|---|---|---|
| Call ID | ra | M |
| Called Number | ra | O |
| Connected Line ID | ra | O |
| High Layer Compatibility | ra | O |
| Low Layer Compatibility | ra | O |

FIG. 303

| *IE* | *Relationship* | *Mandatory/Optional* |
|---|---|---|
| Call ID | r66 | M |
| Bearer Capability | r66 | M |
| Called Number | r66 | O |
| Roaming Number | r66 | O |
| Calling User Number | r66 | M |
| QOS | r66 | O |
| Transit Network Selection | r66 | O |
| Low Layer Compatibility | r66 | O |
| High Layer Compatibility | r66 | O |

FIG. 304

| *IE* | *Relationship* | *Mandatory/Optional* |
|---|---|---|
| LRCF-SSF Relationship ID | rc | M |
| Called User Number | rc | O |
| Roaming Number | rc | O |
| Service Address Information | rc | M |

FIG. 305

| *IE* | *Relationship* | *Mandatory/Optional* |
|---|---|---|
| LRCF-LRDF Relationship ID | rd | M |
| Called User ID | rd | O |
| Roaming Number | rd | O |
| Selection | rd | M |

FIG. 306

| *IE* | *Relationship* | *Mandatory/Optional* |
| --- | --- | --- |
| LRCF-LRDF Relationship ID | rd | M |
| User ID | rd | M |

FIG. 307

| *IE* | *Relationship* | *Mandatory/Optional* |
| --- | --- | --- |
| LRCF-LRDF Relationship ID | rd | M |
| User ID | rd | M |
| Selection | rd | M |

FIG. 308

| *IE* | *Relationship* | *Mandatory/Optional* |
| --- | --- | --- |
| LRCF-LRDF Relationship ID | rd | M |
| Terminal Status | rd | M |

FIG. 309

| *IE* | *Relationship* | *Mandatory/Optional* |
| --- | --- | --- |
| LRCF-LRDF Relationship ID | rd | M |
| User ID | rd | M |
| Terminal Status | rd | M |

FIG. 310

| *IE* | *Relationship* | *Mandatory/Optional* |
| --- | --- | --- |
| LRCF-LRDF Relationship ID | rd | M |

FIG. 311

| *IE* | *Relationship* | *Mandatory/Optional* |
|---|---|---|
| LRCF-LRDF Relationship ID | rd | M |
| User ID | rd | M |
| Selection | rd | M |

FIG. 312

| *IE* | *Relationship* | *Mandatory/Optional* |
|---|---|---|
| LRCF-LRDF Relationship ID | rd | M |
| Paging Area | rd | M |

FIG. 313

| *IE* | *Relationship* | *Mandatory/Optional* |
|---|---|---|
| Paging Relationship ID | rg | M |
| User ID (TMUI) | rg | M |
| LAI (Paging Area) | rg | M |

FIG. 314

| *IE* | *Relationship* | *Mandatory/Optional* |
|---|---|---|
| Paging ID | rb | M |
| TMUI | rb | M |

FIG. 315

| *IE* | *Relationship* | *Mandatory/Optional* |
|---|---|---|
| Paging ID | rb | M |

FIG. 316

| *IE* | *Relationship* | *Mandatory/Optional* |
|---|---|---|
| Paging Relationship ID | rg | M |
| Radio Zone ID | rg | O |
| Anchor TACF Instance ID | rg | O |
| Routing Address | rg | O |

FIG. 317

| *IE* | *Relationship* | *Mandatory/Optional* |
|---|---|---|
| TACF-LRCF Relationship ID | rg | M |
| User ID | rg | M |

FIG. 318

| *IE* | *Relationship* | *Mandatory/Optional* |
|---|---|---|
| LRCF-LRDF Relationship ID | rd | M |
| User ID | rd | M |

FIG. 319

| *IE* | *Relationship* | *Mandatory/Optional* |
|---|---|---|
| LRCF-LRDF Relationship ID | rd | M |
| Reverse Long Code | rd | M |
| Result | rd | M |

FIG. 320

| *IE* | *Relationship* | *Mandatory/Optional* |
|---|---|---|
| Cell ID + Pilot Channel Info. | ro | M |
| Measurement Condition | ro | M |

FIG. 321

| *IE* | *Relationship* | *Mandatory/Optional* |
|---|---|---|
| Pilot Channel Reception Level | ro | M |
| Interference Level | ro | M |

FIG. 322

| *IE* | *Relationship* | *Mandatory/Optional* |
|---|---|---|
| Cell ID + Pilot Channel Info. | rp | M |
| Levels + Interference Levels | rp | M |

FIG. 323

| *IE* | *Relationship* | *Mandatory/Optional* |
|---|---|---|
| LRCF-LRDF Relationship ID | rd | M |
| User ID | rd | M |
| Routing Address | rd | M |
| TACF Instance ID | rd | M |

FIG. 324

| *IE* | *Relationship* | *Mandatory/Optional* |
|---|---|---|
| LRCF-LRDF Relationship ID | rd | M |

FIG. 325

| *IE* | *Relationship* | *Mandatory/Optional* |
|---|---|---|
| Paging Relationship ID | rg | M |
| Result | rg | M |

FIG. 326

| *IE* | *Relationship* | *Mandatory/Optional* |
|---|---|---|
| TACF-LRCF Relationship ID | rg | M |
| Reverse Long Code | rg | M |
| Result | rg | M |

FIG. 327

| *IE* | *Relationship* | *Mandatory/Optional* |
|---|---|---|
| LRCF-SSF Relationship ID | rc | M |
| Roaming Number | rc | O |
| Routing Address | rc | O |
| TACF Instance ID | rc | O |

FIG. 328

| *IE* | *Relationship* | *Mandatory/Optional* |
|---|---|---|
| Call ID | r66 | M |
| Roaming Number | r66 | M |
| Calling User ID | r66 | M |

FIG. 329

| *IE* | *Relationship* | *Mandatory/Optional* |
|---|---|---|
| LRCF-SSF Relationship ID | | M |
| Service Address Info. | | M |
| Called User Number | | M |

FIG. 330

| *IE* | *Relationship* | *Mandatory/Optional* |
|---|---|---|
| LRCF-LRDF Relationship ID | rd | M |
| Called User ID | rd | M |
| Selection | rd | M |

FIG. 331

| *IE* | *Relationship* | *Mandatory/Optional* |
|---|---|---|
| LRCF-LRDF Relationship ID | rd | M |
| User Profile | rd | M |

FIG. 332

| *IE* | *Relationship* | *Mandatory/Optional* |
|---|---|---|
| LRCF-SSF Relationship ID | | M |
| Result | | M |

FIG. 333

| *IE* | *Relationship* | *Mandatory/Optional* |
|---|---|---|
| Call ID | ra | M |
| Bearer Capability | ra | M |
| Called Number | ra | M |
| Calling User ID | ra | M |
| QOS Parameter | ra | O |
| Transit Network Selection | ra | O |
| Low Layer Compatibility | ra | O |
| High Layer Compatibility | ra | O |

FIG. 334

| *IE* | *Relationship* | *Mandatory/Optional* |
|---|---|---|
| Call ID | ra | M |

FIG. 335

| *IE* | *Relationship* | *Mandatory/Optional* |
|---|---|---|
| Number Of Measured Cells | rp | M |
| Cell IDs + Pilot Channels Info. | rp | M |
| Measurement Condition | rp | M |

FIG. 336

| *IE* | *Relationship* | *Mandatory/Optional* |
|---|---|---|
| Call ID | ra | M |

FIG. 337

| *IE* | *Relationship* | *Mandatory/Optional* |
|---|---|---|
| Call ID | ra | M |
| Bearer Capability | ra | M |
| Called Number | ra | O |
| QOS Parameter | ra | O |
| Transmit Network Selection | ra | O |
| Connected Line ID | ra | O |
| Low Layer Compatibility | ra | O |
| High Layer Compatibility | ra | O |

FIG. 338

| *IE* | *Relationship* | *Mandatory/Optional* |
|---|---|---|
| Call ID | ra | M |

FIG. 339

| *IE* | *Relationship* | *Mandatory/Optional* |
|---|---|---|
| Call ID | ra | M |
| Cause | ra | M |

FIG. 340

| *IE* | *Relationship* | *Mandatory/Optional* |
|---|---|---|
| Call ID | ra | M |

FIG. 341

| *IE* | *Relationship* | *Mandatory/Optional* |
|---|---|---|
| TACF-SCF Relationship ID | rg | M |
| User ID | rg | M |
| Service Address Info. | rg | M |

FIG. 342

| *IE* | *Relationship* | *Mandatory/Optional* |
|---|---|---|
| LRCF-LRDF Relationship ID | rd | M |
| User ID | rd | M |

FIG. 343

| *IE* | *Relationship* | *Mandatory/Optional* |
|---|---|---|
| TACF-LRCF Relationship ID | rg | M |

FIG. 344

| *IE* | *Relationship* | *Mandatory/Optional* |
|---|---|---|
| TACF-LRCF Relationship ID | rg | M |

FIG. 345

| *IE* | *Relationship* | *Mandatory/Optional* |
|---|---|---|
| Call ID | ra | M |
| Cause | ra | M |

FIG. 346

| *IE* | *Relationship* | *Mandatory/Optional* |
|---|---|---|
| Call ID | ra | M |

FIG. 347

| *IE* | *Relationship* | *Mandatory/Optional* |
|---|---|---|
| TACF-LRCF Relationship ID | rg | M |
| User ID | rg | M |
| Service Address Info. | rg | M |

FIG. 348

| *IE* | *Relationship* | *Mandatory/Optional* |
|---|---|---|
| LRCF-LRDF Relationship ID | rd | M |
| User ID | rd | M |

FIG. 349

| *IE* | *Relationship* | *Mandatory/Optional* |
|---|---|---|
| TACF-LRCF Relationship ID | rg | M |

FIG. 350

| *IE* | *Relationship* | *Mandatory/Optional* |
|---|---|---|
| TACF-LRCF Relationship ID | rg | M |

FIG. 351

| *IE* | *Relationship* | *Mandatory/Optional* |
|---|---|---|
| TACAF-BCAF Relationship ID | rn | M |
| Cause | rn | M |

FIG. 352

| *IE* | *Relationship* | *Mandatory/Optional* |
|---|---|---|
| Call ID | rm | M |

FIG. 353

| *IE* | *Relationship* | *Mandatory/Optional* |
|---|---|---|
| Call ID | rb | M |
| Cause | rb | M |

FIG. 354

| *IE* | *Relationship* | *Mandatory/Optional* |
|---|---|---|
| CCF-TACAF Relationship ID | ri | M |
| Call ID | ri | M |
| Cause | ri | M |

FIG. 355

| *IE* | *Relationship* | *Mandatory/Optional* |
|---|---|---|
| CCF-TACF Relationship ID | ri | M |

FIG. 356

| *IE* | *Relationship* | *Mandatory/Optional* |
|---|---|---|
| Call ID | rb | M |
| Cause | rb | M |

FIG. 357

| *IE* | *Relationship* | *Mandatory/Optional* |
|---|---|---|
| TACF-BCF Relationship ID | rjb | M |

FIG. 358

| *IE* | *Relationship* | *Mandatory/Optional* |
|---|---|---|
| TACF-BCF Relationship ID | rjb | M |

FIG. 359

| *IE* | *Relationship* | *Mandatory/Optional* |
|---|---|---|
| TACF-TACF Relationship ID | | M |
| Call ID | | M |

FIG. 360

| *IE* | *Relationship* | *Mandatory/Optional* |
|---|---|---|
| TACF-BCF Relationship ID | rjb | M |

FIG. 361

| *IE* | *Relationship* | *Mandatory/Optional* |
|---|---|---|
| TACF-BCF Relationship ID | rjb | M |

FIG. 362

| *IE* | *Relationship* | *Mandatory/Optional* |
|---|---|---|
| TACF-BCFr Relationship ID | rja | M |

FIG. 363

| *IE* | *Relationship* | *Mandatory/Optional* |
|---|---|---|
| TACF-BCFr Relationship ID | rja | M |

FIG. 364

| *IE* | *Relationship* | *Mandatory/Optional* |
|---|---|---|
| TACF-TACF Relationship ID | rb | M |

FIG. 365

| *IE* | *Relationship* | *Mandatory/Optional* |
|---|---|---|
| TACF-LRCF Relationship ID | rg | M |
| User ID | rg | M |
| Service Address Info. | rg | M |

FIG. 366

| *IE* | *Relationship* | *Mandatory/Optional* |
|---|---|---|
| LRCF-LRDF Relationship ID | rd | M |
| User ID | rd | M |

FIG. 367

| *IE* | *Relationship* | *Mandatory/Optional* |
|---|---|---|
| LRCF-LRDF Relationship ID | rd | M |

FIG. 368

| *IE* | *Relationship* | *Mandatory/Optional* |
|---|---|---|
| TACF-LRCF Relationship ID | rg | M |

FIG. 369

| *IE* | *Relationship* | *Mandatory/Optional* |
|---|---|---|
| Call ID | rjb | M |
| Cause | rjb | M |

FIG. 370

| *IE* | *Relationship* | *Mandatory/Optional* |
|---|---|---|
| CCF-TACAF Relationship ID | ri | M |
| Call ID | ri | M |
| Cause | ri | M |

FIG. 371

| *IE* | *Relationship* | *Mandatory/Optional* |
|---|---|---|
| CCF-TACF Relationship ID | ri | M |

FIG. 372

| *IE* | *Relationship* | *Mandatory/Optional* |
|---|---|---|
| Call ID | rb | M |
| Cause | rb | M |

FIG. 373

| *IE* | *Relationship* | *Mandatory/Optional* |
|---|---|---|
| Call ID | rm | M |

FIG. 374

| *IE* | *Relationship* | *Mandatory/Optional* |
|---|---|---|
| Call ID | rb | M |

FIG. 375

| *IE* | *Relationship* | *Mandatory/Optional* |
|---|---|---|
| TACF-BCF Relationship ID | rjb | M |

FIG. 376

| *IE* | *Relationship* | *Mandatory/Optional* |
|---|---|---|
| TACF-BCF Relationship ID | rjb | M |

FIG. 377

| *IE* | *Relationship* | *Mandatory/Optional* |
|---|---|---|
| TACF-TACF Relationship ID | | M |
| Call ID | | M |

FIG. 378

| *IE* | *Relationship* | *Mandatory/Optional* |
|---|---|---|
| TACF-BCF Relationship ID | rjb | M |

FIG. 379

| *IE* | *Relationship* | *Mandatory/Optional* |
|---|---|---|
| TACF-BCF Relationship ID | rjb | M |

FIG. 380

| *IE* | *Relationship* | *Mandatory/Optional* |
|---|---|---|
| TACF-BCFr Relationship ID | rja | M |

FIG. 381

| *IE* | *Relationship* | *Mandatory/Optional* |
|---|---|---|
| TACF-BCFr Relationship ID | rja | M |

FIG. 382

| *IE* | *Relationship* | *Mandatory/Optional* |
|---|---|---|
| TACF-TACF Relationship ID | | M |

FIG. 383

| *IE* | *Relationship* | *Mandatory/Optional* |
| --- | --- | --- |
| TACAF-BCAF Relationship ID | rn | M |

FIG. 384

| *IE* | *Relationship* | *Mandatory/Optional* |
| --- | --- | --- |
| TACAF-BCAF Relationship ID | rn | M |

FIG. 385

| *IE* | *Relationship* | *Mandatory/Optional* |
| --- | --- | --- |
| TACF-LRCF Relationship ID | rg | M |
| User ID | rg | M |
| Service Address Info. | rg | M |

FIG. 386

| *IE* | *Relationship* | *Mandatory/Optional* |
| --- | --- | --- |
| LRCF-LRDF Relationship ID | rd | M |
| User ID | rd | M |

FIG. 387

| *IE* | *Relationship* | *Mandatory/Optional* |
| --- | --- | --- |
| LRCF-LRDF Relationship ID | rd | M |

FIG. 388

| *IE* | *Relationship* | *Mandatory/Optional* |
| --- | --- | --- |
| TACF-LRCF Relationship ID | rg | M |

FIG. 389

| *IE* | *Relationship* | *Mandatory/Optional* |
|---|---|---|
| LRCF-SSF Relationship ID | rc | M |
| User ID | rc | M |
| Cause | rc | M |
| Service Address Info. | rc | M |

FIG. 390

| *IE* | *Relationship* | *Mandatory/Optional* |
|---|---|---|
| LRCF-LRDF Relationship ID | rd | M |
| User ID | rd | M |

FIG. 391

| *IE* | *Relationship* | *Mandatory/Optional* |
|---|---|---|
| LRCF-LRDF Relationship ID | rd | M |

FIG. 392

| *IE* | *Relationship* | *Mandatory/Optional* |
|---|---|---|
| LRCF-SSF Relationship ID | rc | M |

FIG. 393

| *IE* | *Relationship* | *Mandatory/Optional* |
|---|---|---|
| TACAF/MCF-SCMAF Relationship ID | | M |

FIG. 394

| *IE* | *Relationship* | *Mandatory/Optional* |
|---|---|---|
| Random Number | | M |
| Power Control Information | | M |

FIG. 395

| *IE* | *Relationship* | *Mandatory/Optional* |
|---|---|---|
| Random Number | | |
| Forward Link Info. | | M |
| Reverse Link Info. | | M |

FIG. 396

| *IE* | *Relationship* | *Mandatory/Optional* |
|---|---|---|
| SCMF-TACF/SACF | | M |
| Relationship ID | | |
| Location Information | | M |
| QOS | | M |

FIG. 397

| *IE* | *Relationship* | *Mandatory/Optional* |
|---|---|---|
| SCMF-TACF/SACF | | M |
| Relationship ID | | |
| Bearer ID | | M |
| | | M |

FIG. 398

| *IE* | *Relationship* | *Mandatory/Optional* |
|---|---|---|
| SCMF-TACF/SACF | | M |
| Relationship ID | | |

FIG. 399

| *IE* | *Relationship* | *Mandatory/Optional* |
|---|---|---|
| TACAF/MCF-SCMAF | | M |
| Relationship ID | | |

FIG. 400

| *IE* | *Relationship* | *Mandatory/Optional* |
|---|---|---|
| CCF-TACF Relationship ID | ri | M |
| Call ID (Assigned By CCAF) | ri | M |
| Bearer ID (CCF-BCF) | ri | M |
| User Information Rate(*) | ri | M |
| Information Transfer Capability(*) | ri | M |
| QOS | ri | O |

FIG. 401

| *IE* | *Relationship* | *Mandatory/Optional* |
|---|---|---|
| Base Station ID | rt | M |
| Power Control Info. | rt | M |

FIG. 402

| *IE* | *Relationship* | *Mandatory/Optional* |
|---|---|---|
| TACF-BCF Relationship ID | rjb | M |
| Bearer ID (CCF-BCF) | rjb | M |
| User Information Rate | rjb | M |

FIG. 403

| *IE* | *Relationship* | *Mandatory/Optional* |
|---|---|---|
| TACF-BCF Relationship ID | rjb | M |
| Bearer ID (BCF-BCF) | rjb | M |

FIG. 404

| *IE* | *Relationship* | *Mandatory/Optional* |
|---|---|---|
| TACF-TACF Relationship ID | ri | M |
| Call ID (Assigned By CCAF) | ri | M |
| Bearer ID (BCF-BCF) | ri | M |
| Base Station ID | ri | M |
| Anchor TACF Instance ID | ri | M |
| Radio Frequency Info. | ri | M |
| Forward Link Info. | ri | M |
| Reverse Link Info. | ri | M |
| Power Control Info. | ri | M |
| User Information Rate | ri | M |

FIG. 405

| *IE* | *Relationship* | *Mandatory/Optional* |
|---|---|---|
| TACF-BCF Relationship ID | rjb | M |
| Bearer ID (BCF-BCF) | rjb | M |
| User Information Rate | rjb | M |
| Base Station ID | rjb | M |

FIG. 406

| *IE* | *Relationship* | *Mandatory/Optional* |
|---|---|---|
| TACF-BCF Relationship ID | rjb | M |
| Bearer ID (BCF-BCFr) | rjb | M |

FIG. 407

| *IE* | *Relationship* | *Mandatory/Optional* |
|---|---|---|
| TACF-BCFr Relationship ID | rja | M |
| Bearer ID (BCF-BCFR) | rja | M |
| Radio Frequency Info. | rja | M |
| Forward Link Info. | rja | M |
| Reverse Link Info. | rja | M |
| Power Control Info. | rja | M |
| User Information Rate | rja | M |

FIG. 408

| *IE* | *Relationship* | *Mandatory/Optional* |
|---|---|---|
| TACF-BCFr Relationship ID | rja | M |
| Radio Frequency Info. | rja | M |
| Forward Link Info. | rja | M |
| Reverse Link Info. | rja | M |

FIG. 409

| *IE* | *Relationship* | *Mandatory/Optional* |
|---|---|---|
| TACF-TACF Relationship ID | r55 | M |
| Radio Frequency Info. | r55 | M |
| Forward Link Info. | r55 | M |
| Reverse Link Info. | r55 | M |

FIG. 410

| *IE* | *Relationship* | *Mandatory/Optional* |
|---|---|---|
| Call ID | rb | M |
| Radio Frequency Info. | rb | M |
| Forward Link Info. | rb | M |
| Reverse Link Info. | rb | M |
| User Information Rate | rb | M |

FIG. 411

| *IE* | *Relationship* | *Mandatory/Optional* |
|---|---|---|
| TACAF-BCAF Relationship ID | rn | M |
| Radio Frequency Info. | rn | M |
| Forward Link Info. | rn | M |
| Reverse Link Info. | rn | M |
| User Information Rate | rn | M |

FIG. 412

| *IE* | *Relationship* | *Mandatory/Optional* |
|---|---|---|
| TACAF-BCAF Relationship ID | rn | M |

FIG. 413

| *IE* | *Relationship* | *Mandatory/Optional* |
|---|---|---|
| TACF-BCFr Relationship ID | rja | M |

FIG. 414

| *IE* | *Relationship* | *Mandatory/Optional* |
|---|---|---|
| TACF-TACF Relationship ID | r55 | M |

FIG. 415

| *IE* | *Relationship* | *Mandatory/Optional* |
|---|---|---|
| CCF-TACF Relationship ID | ri | M |

FIG. 416

| *IE* | *Relationship* | *Mandatory/Optional* |
|---|---|---|
| CCF-TACF Relationship ID | rb | M |
| Call ID | rb | M |
| Cause | rb | M |

FIG. 417

| *IE* | *Relationship* | *Mandatory/Optional* |
|---|---|---|
| Call ID | rb | M |
| Cause | rb | M |

FIG. 418

| *IE* | *Relationship* | *Mandatory/Optional* |
|---|---|---|
| Call ID | rb | M |

FIG. 419

| *IE* | *Relationship* | *Mandatory/Optional* |
|---|---|---|
| TACF-BCF Relationship ID | rjb | M |

FIG. 420

| *IE* | *Relationship* | *Mandatory/Optional* |
|---|---|---|
| TACF-BCF Relationship ID | rjb | M |

FIG. 421

| *IE* | *Relationship* | *Mandatory/Optional* |
|---|---|---|
| TACF-TACF Relationship ID | rb | M |
| Call ID | rb | M |

FIG. 422

| *IE* | *Relationship* | *Mandatory/Optional* |
|---|---|---|
| TACF-BCF Relationship ID | rjb | M |

FIG. 423

| *IE* | *Relationship* | *Mandatory/Optional* |
|---|---|---|
| TACF-BCF Relationship ID | rjb | M |

FIG. 424

| *IE* | *Relationship* | *Mandatory/Optional* |
|---|---|---|
| TACF-BCFr Relationship ID | rja | M |

FIG. 425

| *IE* | *Relationship* | *Mandatory/Optional* |
|---|---|---|
| TACF-BCFr Relationship ID | rja | M |

FIG. 426

| *IE* | *Relationship* | *Mandatory/Optional* |
|---|---|---|
| TACF-TACF Relationship ID | rb | M |

FIG. 427

| *IE* | *Relationship* | *Mandatory/Optional* |
|---|---|---|
| CCF-TACF Relationship ID | ri | M |

FIG. 428

| *IE* | *Relationship* | *Mandatory/Optional* |
|---|---|---|
| TACAF-BCAF Relationship ID | rn | M |

FIG. 429

| *IE* | *Relationship* | *Mandatory/Optional* |
|---|---|---|
| TACAF-BCAF Relationship ID | rn | M |

FIG. 430

| *IE* | *Relationship* | *Mandatory/Optional* |
|---|---|---|
| TACAF/MCF-SCMAF Relationship ID | | M |

FIG. 431

| *IE* | *Relationship* | *Mandatory/Optional* |
|---|---|---|
| Tacf/Sacf-Scmf Relationship ID | | M |
| Bearer ID | | O |

FIG. 432

| *IE* | *Relationship* | *Mandatory/Optional* |
|---|---|---|
| TACF/SACF-SCMF Relationship ID | | M |

FIG. 433

| *IE* | *req. ind.* |
|---|---|
| TACF-TACF Relationship ID | M |
| Base Station ID | M |
| Anchor TACF Instance ID | M |
| Power Control Info. | M |

FIG. 434

| *IE* | *req. ind.* |
|---|---|
| TACF-BCFr Relationship ID | M |
| Base Station ID | M |
| Power Control Info. | M |

FIG. 435

| *IE* | *resp. conf.* |
|---|---|
| TACF-BCFr Relationship ID | M |
| Forward Link Info. | M |

FIG. 436

| *IE* | *req. ind.* |
|---|---|
| TACF-TACF Relationship ID | M |
| Forward Link Info. | M |

FIG. 437

| *IE* | *req. ind.* |
|---|---|
| Handover Branch ID | O *1 |
| Call ID | M *1 *2 |
| Forward Link Info. | M *1 *2 |

FIG. 438

| *IE* | *req. ind.* |
|---|---|
| TACAF-BCAF Relationship ID | M |
| Forward Link Info. | M |

FIG. 439

| *IE* | *resp. conf.* |
|---|---|
| TACAF-BCAF Relationship ID | M |

FIG. 440

| *IE* | *req. ind.* |
|---|---|
| BCF-TACF Relationship ID | M |
| Base Station ID | M |
| User Information Rate | M |
| Handover Mode | O*1 |

FIG. 441

| *IE* | *resp. conf.* |
|---|---|
| TACF-BCF Relationship ID | M |
| Bearer ID (BCF-BCF) | M* |

FIG. 442

| *IE* | *req. ind.* |
|---|---|
| TACF-TACF Relationship ID | M |
| Bearer ID (BCF-BCF) | M* |
| Base Station ID | M |
| Anchor TACF Instance ID | M |
| Radio Frequency Info. | O |
| Forward Link Info. | M |
| Reverse Link Info. | M |
| Power Control Info. | M |
| User Information Rate | M |

FIG. 443

| *IE* | *req. ind.* |
|---|---|
| TACF-BCF Relationship ID | M |
| Bearer ID (BCF-BCF) | M* |
| User Information Rate | M |
| Base Station ID | M |

FIG. 444

| *IE* | *resp. conf.* |
|---|---|
| TACF-BCF Relationship ID | M |
| Bearer ID (BCF-BCFR) | M* |

FIG. 445

| *IE* | *req. ind.* |
|---|---|
| TACF-BCFr Relationship ID | M |
| Bearer ID | M |
| Radio Frequency Info. | M |
| Forward Link Info. | M |
| Reverse Link Info. | M |
| Power Control Info. | M |
| User Information Rate | M |

FIG. 446

| *IE* | *resp. conf.* |
|---|---|
| TACF-BCFr Relationship ID | M |
| Radio Frequency Info. | M |
| Forward Link Info. | M |
| Reverse Link Info. | M |

FIG. 447

| *IE* | *req. ind.* |
|---|---|
| TACF-TACF Relationship ID | M |
| Radio Frequency Info. | M |
| Forward Link Info. | M |
| Reverse Link Info. | M |

FIG. 448

| *IE* | *req. ind.* |
|---|---|
| Handover Branch ID | M *1 |
| Call ID | M *1 |
| Radio Frequency Info. | M *1 *2 |
| Forward Link Info. | M *1 *2 |
| Reverse Link Info. | M *1 *2 |

FIG. 449

| *IE* | *req. ind.* |
|---|---|
| TACAF-BCAF Relationship ID | M |
| Radio Frequency Info. | M |
| Forward Link Info. | M |
| Reverse Link Info. | M |

FIG. 450

| *IE* | *resp. conf.* |
|---|---|
| TACAF-BCAF Relationship ID | M |

FIG. 451

| *IE* | *req. ind.* |
|---|---|
| TACF-TACF Relationship ID | M |

FIG. 452

| *IE* | *req. ind.* |
|---|---|
| Cause | M |
| Handover Branch ID | M *1 |
| Call ID | O *1 *2 |

FIG. 453

| *IE* | *req. ind.* |
|---|---|
| Call ID | M |

FIG. 454

| *IE* | *Req. ind.* |
|---|---|
| TACF-TACF Relationship ID | M |

FIG. 455

| *IE* | *Req. ind.* |
|---|---|
| TACF-BCFr Relationship ID | M |
| Cause | M* |

FIG. 456

| *IE* | *resp. conf.* |
|---|---|
| TACF-BCFr Relationship ID | M |

FIG. 457

| *IE* | *req. ind.* |
|---|---|
| TACF-TACF Relationship ID | M |

FIG. 458

| *IE* | *req. ind.* |
| --- | --- |
| Cause | M |
| Handover Branch ID | M *1 |
| Call ID | O *1 *2 |

FIG. 459

| *IE* | *req. ind.* |
| --- | --- |
| Call ID | M |

FIG. 460

| *IE* | *req. ind.* |
| --- | --- |
| TACAF-BCAF Relationship ID | M |

FIG. 461

| *IE* | *resp. conf.* |
| --- | --- |
| TACAF-BCAF Relationship ID | M |

FIG. 462

| *IE* | *req. ind.* |
| --- | --- |
| CCF-TACF Relationship ID | M |
| Released Bearer ID | M |

FIG. 463

| *IE* | *resp. conf.* |
| --- | --- |
| TACF-BCF Relationship ID | M |

FIG. 464

| *IE* | *req. ind.* |
|---|---|
| TACF-TACF Relationship ID | M |

FIG. 465

| *IE* | *req. ind.* |
|---|---|
| TACF-BCF Relationship ID | M |

FIG. 466

| *IE* | *resp. conf.* |
|---|---|
| TACF-BCF Relationship ID | M |

FIG. 467

| *IE* | *req. ind.* |
|---|---|
| TACF-BCFr Relationship ID | M |
| Cause | M* |

FIG. 468

| *IE* | *resp. conf.* |
|---|---|
| TACF-BCFr Relationship ID | M |

FIG. 469

| *IE* | *req. ind.* |
|---|---|
| TACF-TACF Relationship ID | M |

FIG. 470

| *IE* | *req. ind.* |
|---|---|
| TACF-TACF Relationship ID | M |
| Bearer ID (BCF-BCF) | M* |
| Bearer Capability | M |
| Base Station ID | M |
| Anchor TACF Instance ID | M |
| Radio Frequency Info. | M |
| Power Control Info. | M |

FIG. 471

| *IE* | *req. ind.* | *resp. conf.* |
|---|---|---|
| TACF-BCFr Relationship ID | M | M |
| TACF-BCFr Relationship ID for Intra-BS RHO | M | M |
| Radio Frequency Info. | M | *1 |
| Power Control Info. | M | *1 |

FIG. 472

| *IE* | *req. ind.* |
|---|---|
| TACF-BCFr Relationship ID | M |
| Radio Frequency Info. | M |
| Forward Link Info. | M |
| Reverse Link Info. | M |

FIG. 473

| *IE* | *req. ind.* |
|---|---|
| TACF-TACF Relationship ID | M |
| Radio Frequency Info. | M |
| Forward Link Info. | M |
| Reverse Link Info. | M |

FIG. 474

| *IE* | *req. ind.* |
|---|---|
| Handover Branch ID | O *1 |
| Call ID | M *1 *2 |
| Radio Frequency Info. | M *1 *2 |
| Forward Link Info. | M *1 *2 |
| Reverse Link Info. | M *1 *2 |

FIG. 475

| *IE* | *req. ind.* |
|---|---|
| TACAF-BCAF Relationship ID | M |
| Radio Frequency Info. | M |
| Forward Link Info. | M |
| Reverse Link Info. | M |

FIG. 476

| *IE* | *resp. conf.* |
|---|---|
| TACAF-BCAF Relationship ID | M |

FIG. 477

| *IE* | *req. ind.* |
|---|---|
| TACAF-BCAF Relationship ID | M |

FIG. 478

| *IE* | *resp. conf.* |
|---|---|
| TACAF-BCAF Relationship ID | M |

FIG. 479

| *IE* | *req. ind.* |
| --- | --- |
| TACF-TACF Relationship ID | M |

FIG. 480

| *IE* | *req. ind.* |
| --- | --- |
| BCF-TACF Relationship ID | M |
| Base Station ID | M |
| User Information Rate | M |
| Handover Mode | O*1 |

FIG. 481

| *IE* | *resp. conf.* |
| --- | --- |
| TACF-BCF Relationship ID | M |
| Bearer ID (BCF-BCF) | M* |

FIG. 482

| *IE* | *req. ind.* |
| --- | --- |
| TACF-TACF Relationship ID | M |
| Bearer ID (BCF-BCF) | M* |
| Base Station ID | M |
| Anchor TACF Instance ID | M |
| Radio Frequency Info. | M |
| Forward Link Info. | M |
| Reverse Link Info. | M |
| Power Control Info. | M |
| User Information Rate | M |

FIG. 483

| IE | req. ind. |
|---|---|
| TACF-BCF Relationship ID | M |
| Bearer ID (BCF-BCF) | M* |
| User Information Rate | M |
| Base Station ID | M |

FIG. 484

| IE | resp. conf. |
|---|---|
| TACF-BCF Relationship ID | M |
| Bearer ID (BCF-BCFr) | M* |

FIG. 485

| IE | req. ind. |
|---|---|
| TACF-BCFr Relationship ID | M |
| Bearer ID | M |
| Radio Frequency Info. | M |
| Forward Link Info. | M |
| Reverse Link Info. | M |
| Power Control Info. | M |
| User Information Rate | M |

FIG. 486

| IE | req. ind. |
|---|---|
| TACF-BCFr Relationship ID | M |
| Radio Frequency Info. | M |
| Forward Link Info. | M |
| Reverse Link Info. | M |

FIG. 487

| *IE* | *req. ind.* |
|---|---|
| TACF-TACF Relationship ID | M |
| Radio Frequency Info. | M |
| Forward Link Info. | M |
| Reverse Link Info. | M |

FIG. 488

| *IE* | *req. ind.* |
|---|---|
| Handover Branch ID | O *1 |
| Access Link ID | M *1 *2 |
| Radio Frequency Info. | M |
| Forward Link Info. | M *1 *2 |
| Reverse Link Info. | M *1 *2 |
| User Information Rate | O |

FIG. 489

| *IE* | *req. ind.* |
|---|---|
| TACAF-BCAF Relationship ID | M |
| Radio Frequency Info. | M |
| Forward Link Info. | M |
| Reverse Link Info. | M |
| Power Control Info. | M |
| User Information Rate | O |

FIG. 490

| *IE* | *resp. conf.* |
|---|---|
| TACAF-BCAF Relationship ID | M |

FIG. 491

| *IE* | *req. ind.* |
|---|---|
| TACAF-BCAF Relationship ID | M |

FIG. 492

| IE | resp. conf. |
| --- | --- |
| TACAF-BCAF Relationship ID | M |

FIG. 493

| IE | resp. conf. |
| --- | --- |
| TACF-BCFr Relationship ID | M |

FIG. 494

| IE | req. ind. |
| --- | --- |
| TACF-TACF Relationship ID | M |

FIG. 495

| IE | req. ind. |
| --- | --- |
| TACF-BCF Relationship ID | M |
| Released Handover Link ID | M |

FIG. 496

| IE | resp. conf. |
| --- | --- |
| TACF-BCF Relationship ID | M |

FIG. 497

| IE | req. ind. |
| --- | --- |
| TACF-TACF Relationship ID | M |

FIG. 498

| *IE* | *req. ind.* |
|---|---|
| TACF-BCF Relationship ID | M |

FIG. 499

| *IE* | *resp. conf.* |
|---|---|
| TACF-BCF Relationship ID | M |

FIG. 500

| *IE* | *req. ind.* |
|---|---|
| TACF-BCFr Relationship ID | M |
| Cause | M* |

FIG. 501

| *IE* | *resp. conf.* |
|---|---|
| TACF-BCFr Relationship ID | M |

FIG. 502

| *IE* | *req. ind.* |
|---|---|
| TACF-TACF Relationship ID | M |

FIG. 503

| *IE* | *req. ind.* |
|---|---|
| BCF-TACF Relationship ID | M |
| Base Station ID | M |
| Handover Mode | O* 1 |

FIG. 504

| IE | resp. conf. |
|---|---|
| TACF-BCF Relationship ID | M |
| Bearer ID (BCF-BCF) | M* |

FIG. 505

| IE | req. ind. |
|---|---|
| TACF-TACF Relationship ID | M |
| Bearer ID (BCF-BCF) | M* |
| Base Station ID | M |
| User Information Rate | M |

FIG. 506

| IE | req. ind. |
|---|---|
| TACF-BCF Relationship ID | M |
| Bearer ID (BCF-BCF) | M* |
| User Information Rate | M |
| Base Station ID | M |

FIG. 507

| IE | resp. conf. |
|---|---|
| TACF-BCF Relationship ID | M |
| Bearer ID (BCF-BCFr) | M* |

FIG. 508

| IE | req. ind. |
|---|---|
| TACF-BCFr Relationship ID | M |
| Bearer ID | M |

FIG. 509

| *IE* | *req. ind.* |
| --- | --- |
| TACF-BCFr Relationship ID | M |

FIG. 510

| *IE* | *req. ind.* |
| --- | --- |
| TACF-TACF Relationship ID | M |

FIG. 511

| *IE* | *req. ind.* |
| --- | --- |
| Call ID | M |

FIG. 512

| *IE* | *req. ind.* |
| --- | --- |
| TACAF-BCAF Relationship ID | M |

FIG. 513

| *IE* | *resp. conf.* |
| --- | --- |
| TACAF-BCAF Relationship ID | M |

FIG. 514

| *IE* | *req. ind.* |
| --- | --- |
| TACAF-BCAF Relationship ID | M |

FIG. 515

| *IE* | *resp. conf.* |
|---|---|
| TACAF-BCAF Relationship ID | M |

FIG. 516

| *IE* | *req. ind.* |
|---|---|
| TACF-BCF Relationship ID | M |
| Released Bearer ID | M |

FIG. 517

| *IE* | *resp. conf.* |
|---|---|
| TACF-BCF Relationship ID | M |

FIG. 518

| *IE* | *req. ind.* |
|---|---|
| TACF-TACF Relationship ID | M |

FIG. 519

| *IE* | *req. ind.* |
|---|---|
| TACF-BCF Relationship ID | M |

FIG. 520

| *IE* | *resp. conf.* |
|---|---|
| TACF-BCF Relationship ID | M |

FIG. 521

| *IE* | *req. ind.* |
|---|---|
| TACF-BCFr Relationship ID | M |
| Cause | M* |

FIG. 522

| *IE* | *resp. conf.* |
|---|---|
| TACF-BCFr Relationship ID | M |

FIG. 523

| *IE* | *req. ind.* |
|---|---|
| TACF-TACF Relationship ID | M |

FIG. 524

| *IE* | *req. ind.* |
|---|---|
| TACF-BCFr Relationship ID | M |
| Forward Link Info. | M |

FIG. 525

| *IE* | *req. ind.* |
|---|---|
| TACF-TACF Relationship ID | M |
| Forward Link Info. | M |

FIG. 526

| *IE* | *req. ind.* |
|---|---|
| Handover Branch ID | O *1 |
| Call ID | M *1 *2 |
| Forward Link Info. | M *1 *2 |

FIG. 527

| IE | req. ind. |
|---|---|
| TACAF-BCAF Relationship ID | M |
| Forward Link Info. | M |

FIG. 528

| IE | resp. conf. |
|---|---|
| TACAF-BCAF Relationship ID | M |

FIG. 529

| IE | resp. conf. |
|---|---|
| TACAF-BCAF Relationship ID | M |

FIG. 530

| IE | req. ind. |
|---|---|
| TACF-TACF Relationship ID | M |

FIG. 531

| IE | req. ind. |
|---|---|
| TACF-BCFr Relationship ID | M |
| Released Bearer ID | M |

FIG. 532

| IE | req. ind. |
|---|---|
| Power Control Info. | M |

FIG. 533

| IE | req. ind. |
| --- | --- |
| TACF-TACF Relationship ID | M |
| Base Station ID | M |
| Power Control Info. | M |

FIG. 534

| IE | req. ind. |
| --- | --- |
| TACF-BCFr Relationship ID | M |
| Base Station ID | M |
| Power Control Info. | M |

FIG. 535

| IE | req. ind. | resp. conf. |
| --- | --- | --- |
| Relationship ID | M | M |
| FPLMTS User ID | M | |
| LAI | M | |
| Result | | M |
| Terminal Status | O | |
| TC Info. | O | |

FIG. 536

| IE | req. ind. | resp. conf. |
| --- | --- | --- |
| Relationship ID | M | M |
| fPLMTS User ID | M | |
| Service Address Information | M | |
| LAI | M | |
| Result | | M |
| AUTH R | O | |
| Confirmation Of Global RAND | O | |
| CHCNT | O | |
| Terminal Status | O | |
| TC Info. | O | |

FIG. 537

| *IE* | *req. ind.* | *resp. conf.* |
|---|---|---|
| Relationship ID | M | M |
| FPLMTS User ID | M | |
| Result | | M |
| AUTH R | O | |
| Confirmation Of Global RAND | O | |
| CHCNT | O | |
| Terminal Status | O | |
| TC Info. | O | |

FIG. 538

| *IE* | *req. ind.* | *resp. conf.* |
|---|---|---|
| Relationship ID | M | M |
| IMUI | M | |
| Challenge | | M |
| Response | | M |
| Ciphering Key | | M |
| Result | | M |

FIG. 539

| *IE* | *req. ind.* | *resp. conf.* |
|---|---|---|
| Relationship ID | M | M |
| Challenge | M | |
| Response | | M |

FIG. 540

| *IE* | *req. ind.* | *resp. conf.* |
|---|---|---|
| Relationship ID | M | M |
| Challenge | M | |
| Response | | M |

FIG. 541

| *IE* | *req. ind.* | *resp. conf.* |
|---|---|---|
| Challenge | M | |
| Response | | M |
| Ciphering Key | | M |

FIG. 542

| *IE* | *req. ind.* | *resp. conf.* |
|---|---|---|
| Relationship ID | M | M |
| Ciphering Key | M | |

FIG. 543

| *IE* | *req. ind.* | *resp. conf.* |
|---|---|---|
| Relationship ID | M | M |
| Ciphering Key | M | |

FIG. 544

| *IE* | *req. ind.* | *resp. conf.* |
|---|---|---|
| Relationship ID | M | M |
| TMUI | M | |
| TMUI Assignment Source ID | M | |
| Result | | M |

FIG. 545

| *IE* | *req. ind.* | *resp. conf.* |
|---|---|---|
| Relationship ID | M | M |
| IMUI | M | |
| TMUI | | M |
| TMUI Assignment Source ID | | M |
| Result | | M |

FIG. 546

| *IE* | *req. ind.* | *resp. conf.* |
|---|---|---|
| Relationship ID | M | M |
| IMUI | M | |
| TMUI | M | |
| TMUI Assignment Source ID | M | |
| Result | | M |

FIG. 547

| *IE* | *req. ind.* | *resp. conf.* |
|---|---|---|
| Relationship ID | M | M |
| TMUI | M | |
| TMUI Assignment Source ID | M | |
| Result | | M |

FIG. 548

| *IE* | *req. ind.* | *resp. conf.* |
|---|---|---|
| Relationship ID | M | M |
| TMUI | M | |
| TMUI Assignment Source ID | M | |
| Result | | M |

FIG. 549

| *IE* | *req. ind.* | *resp. conf.* |
|---|---|---|
| Relationship ID | M | M |
| TMUI | M | |
| TMUI Assignment Source ID | M | |
| Result | | M |

FIG. 550

| *IE* | *req. ind.* | *resp. conf.* |
|---|---|---|
| Relationship ID | M | M |
| TMUI | M | |
| TMUI Assignment Source ID | M | |
| IMUI | | M |
| Result | | M |

FIG. 551

| *IE* | *req. ind.* | *resp. conf.* |
|---|---|---|
| Relationship ID | M | M |
| IMUI | | M |

FIG. 552

| *IE* | *req. ind.* | *resp. conf.* |
|---|---|---|
| Relationship ID | M | M |
| IMUI | | M |

FIG. 553

| *IE* | *req. ind.* | *resp. conf.* |
|---|---|---|
| Relationship ID | M | M |
| IMUI | | M |

FIG. 554

| *IE* | *req. ind.* | *resp. conf.* |
|---|---|---|
| Relationship ID | M | M |
| IMUI | | M |

FIG. 555

| Coding | Meaning |
|---|---|
| 000 | Layer 3 of Radio Interface of W-CDMA |
| Others | Reserved |

FIG. 556

| Coding | Meaning |
|---|---|
| 0 | Continue |
| 1 | End |

FIG. 557

| Coding | Meaning |
|---|---|
| 0 | Standard Code |
| 1 | Inverted Code |

FIG. 558

| Coding | Meaning |
|---|---|
| 00 | Version 0 |
| Others | Reserved |

FIG. 559

| Function | PDU name | PDU type field | Description |
|---|---|---|---|
| Establishment | BGN | 0001 | Request Initialization |
| | BGAK | 0010 | Request Acknowledgement |
| | BGREJ | 0111 | Connection Reject |
| Release | END | 0011 | Disconnect Command |
| | ENDAK | 0100 | Disconnect Acknowledgement |
| Resynchronization | RS | 0101 | Resynchronization Command |
| | RSAK | 0110 | Resynchronization Acknowledgement |
| Recovery | ER | 1001 | Recovery Command |
| | ERAK | 1111 | Recovery Acknowledgement |

FIG. 560

| Function | PDU name | PDU type field | Description |
|---|---|---|---|
| Assured Data Transfer | SD | 1000 | Sequenced Connection-mode Data |
| | POLL | 1010 | Transmitter State Information with Request for Receive State Information |
| | STAT | 1011 | Solicited Receiver State Information |
| | USTAT | 1100 | Unsolicited Receiver State Information |
| | SD-with-POLL | 0000 | Sequenced Connection-mode Data with State Information Request |
| Unacknowledged Data Transfer | UD | 1101 | Unnumbered User Data |
| Management Data Transfer | MD | 1110 | Unnumbered Management Data |

FIG. 561

| Length of CRC | Channel Through Which Corresponding Frame Is Transmitted |
|---|---|
| 16 bits | BCCH, RACH, FACH, SDCCH, ACCH, UPCH |
| 8 bits | PCH |

FIG. 562

| Bit Coding | Meaning |
|---|---|
| 00 | Middle |
| 01 | End |
| 10 | Top |
| 11 | Sole |

FIG. 563

| Bit Coding | Meaning |
|---|---|
| 0 | BCCH 1 |
| 1 | BCCH 2 |

FIG. 564

| Bit Coding | Uplink Interface Level |
|---|---|
| 1010 0001 | ≧ 60.0 dB (μ) |
| 1010 0000 | 59.8 to 60.0 dB (μ) |
| ⋮ | ⋮ |
| 0000 0001 | −20.0 to −19.5 dB |
| 0000 0000 | < −20.0 dB (μ) |

FIG. 565

| Usage | Identifier Value |
|---|---|
| SDCCH Setup Request Or Response Directly Before SDCCH Setup | 0-63 |
| Packet Transmission | 64-65535 |

FIG. 566

| Bit Coding | Meaning |
|---|---|
| 0 | User Information |
| 1 | Control Information |

FIG. 567

| Bit Coding | Meaning | |
|---|---|---|
| | RACH, Upnlink UPCH | FACH, Downlink UPCH |
| 0 | To MCC | From MCC |
| 1 | To BTS | From BTS |

FIG. 568

| Bit Coding | Meaning |
|---|---|
| 0 | Normal Mode |
| 1 | Ack Mode |

FIG. 569

| Length of CRC | Channel Through Which Corresponding Frame Is Transmitted |
|---|---|
| 16 bits | BCCH, RACH, FACH, SDCCH, UPCH |
| 14 bits | ACCH |

FIG. 570

| Message | Reference Section |
| --- | --- |
| Call Establishment Message | |
| ALERTING | 2.5.2.4.2.1.1.1 |
| CALL PROCEEDING | 2.5.2.4.2.1.1.2 |
| CONNECT | 2.5.2.4.2.1.1.3 |
| CONNECT ACKNOWLEDGE | 2.5.2.4.2.1.1.4 |
| PROGRESS | 2.5.2.4.2.1.1.5 |
| SETUP | 2.5.2.4.2.1.1.6 |
| SETUP ACKNOWLEDGE | |
| Call Clearing Message | |
| RELEASE | 2.5.2.4.2.1.1.7 |
| RELEASE COMPLETE | 2.5.2.4.2.1.1.8 |
| RESTART | |
| RESTART ACKNOWLEDGE | |
| Miscellaneous Message | |
| INFORMATION | 2.5.2.4.2.1.1.9 |

FIG. 571

Message Type : ALERTING
Significance : Global
Connection Discernment : ACCH
Direction Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| Connection Identifier | 2.5.2.4.2.1.3.16 | u → n | OF (Note 1) | V | 4-9? |
| Narrow-Band Bearer Capability | 2.5.2.4.2.1.4.2 | Both | OF (Note 2) | V | 4-14 |
| Narrow-Band High Layer Compatibility | 2.5.2.4.2.1.4.3 | Both | O (Note 3) | V | 4-7 |
| Notification Indicator | 2.5.2.4.2.1.3.23 | Both | O (Note 4) | V | 4-* |

FIG. 572

Message Type : ALERTING
Significance : Global
Connection Discernment : ACCH
Direction Both

| Information Element | Reference Section | Direction | Type | Length | |
|---|---|---|---|---|---|
| Progress Indicator | 2.5.2.4.2.1.4.5 | Both | O (Note 5) | V | 4-6 |
| Broadband High Layer Information | 2.5.2.4.2.1.3.8 | Both | O (Note 6) | V | 4-13 |
| Mobile Bearer Capability | | Both | O (Note 7) | | |
| Mobile High Layer Information | | Both | O (Note 8) | | |

Note 1 This should be studied further (this parameter will be used when the ATM will be applied on air interface in the future). If the alerting message is the first message among massages replying to a setup message and if the called user does not accept the connection identifier designated by the setup message, this connection identifier is mandatory in the alerting message from the called user to the network.

Note 2 This should be studied further (this parameter will be used when the ATM will be applied on the air interface in the future). The narrow-band bearer capability information element is included if the bearer capability selection procedure described in ITU-T Recommendation Q.931 is utilized.

FIG. 573

Note 3 The narrow-band high layer compatibility information element is included if the high layer compatibility selection procedure defined in ITU-T Recommendation Q.931 is used.

Note 4 This notification identifier information element is included if the notification procedure is applied. A plurality of notification identifier information elements can be included in this message. The maximum length and the allowable number of the elements depend on the network.

Note 5 This parameter is included in this message in case of interworking event. This parameter is included in this message in case of connection which provides the in-band information and pattern if this message is transmitted from the called user to the network and if ITU-T Recommendation Q.931 is applied. At most, two progress indicator information elements can be included in this message.

Note 6 The broadband high layer information element is included if the high layer information selection procedure is used.

Note 7 This should be studied further (The mobile bearer capability information element will be used when bearer capability is selected).

Note 8 This should be studied further.

FIG. 574

Message Type : CALLPROCEEDING
Significance : Local
Connection Discernment : SDCCH / ACCH
Direction : Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| Connection Identifier | 2.5.2.4.2.1.3.16 | Both | OF (Note 1) | V | 4-9? |
| Narrow-Band Bearer Capability | 2.5.2.4.2.1.4.2 | Both | OF (Note 2) | V | 4-14 |
| Narrow-Band High Layer Compatibility | 2.5.2.4.2.1.4.3 | Both | O (Note 3) | V | 4-7 |
| Notification Indicator | 2.5.2.4.2.1.3.23 | Both | O (Note 4) | V | 4-* |

FIG. 575

Message Type : CALLPROCEEDING
Significance : Local
Connection Discernment : SDCCH / ACCH
Direction : Both

| Information Element | Reference Section | Direction | Type | Length | |
|---|---|---|---|---|---|
| Progress Indicator | 2.5.2.4.2.1.4.5 | Both | O (Note 5) | V | 4-6 |
| Broadband High Layer Information | 2.5.2.4.2.1.3.8 | Both | O (Note 6) | V | 4-13 |
| Mobile Bearer Capability | | Both | O (Note 7) | | |
| Mobile High Layer Information | | Both | O (Note 8) | | |

Note 1 This should be studied further (this parameter will be used when the ATM will be applied on air interface in the future). If the call proceeding message is the first message among massages replying to a setup message, this connection identifier is mandatory in the call proceeding message from the network to the calling user. If the call proceeding message is the first message among massages replying to a setup message and if the called user does not accept the connection identifier designated by the setup message, this connection identifier is mandatory in the call proceeding message from the called user to the network.

Note 2 This should be studied further (this parameter will be used when the ATM will be applied on the air interface in the future). The narrow-band bearer capability information element is included if the bearer capability selection procedure described in ITU-T Recommendation Q.931 is utilized.

FIG. 576

Note 3 The narrow-band high layer compatibility information element is included if the high layer compatibility selection procedure defined in ITU-T Recommendation Q.931 is used.

Note 4 This notification identifier information element is included if the notification procedure is applied. A plurality of notification identifier information elements can be included in this message. The maximum length and the allowable number of the elements depend on the network.

Note 5 This parameter is included in this message in case of interworking event. This parameter is included in this message in case of connection which provides the in-band information and pattern if this message is transmitted from the called user to the network and if ITU-T Recommendation Q.931 is applied. At most, two progress indicator information elements can be included in this message.

Note 6 The broadband high layer information element is included if the high layer information selection procedure is used.

Note 7 This should be studied further (The mobile bearer capability information element will be used when bearer capability is selected).

Note 8 This should be studied further.

FIG. 577

Message Type : CONNECT
Significance : Global
Connection Discernment : ACCH
Direction : Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| AAL Parameters | 2.5.2.4.2.1.3.5 | Both | OF (Note 1) | V | 4-21 |
| Connection Identifier | 2.5.2.4.2.1.3.16 | u → n | OF (Note 2) | V | 4-9? |
| End-to-End Transit Delay | 2.5.2.4.2.1.3.17 | Both | O (Note 3) | V | 4-13 |
| Narrow-Band Bearer Capability | 2.5.2.4.2.1.4.2 | Both | O (Note 4) | V | 4-14 |

FIG. 578

Message Type : CONNECT
Significance : Global
Connection Discernment : ACCH
Direction : Both

| Information Element | Reference Section | Direction | Type | Length | |
|---|---|---|---|---|---|
| Narrow-Band High Layer Compatibility | 2.5.2.4.2.1.4.3 | Both | O (Note 5) | V | 4-7 |
| Narrow-Band Low Layer Compatibility | 2.5.2.4.2.1.4.4 | Both | O (Note 6) | V | 4-20 |
| Notification Indicator | 2.5.2.4.2.1.3.23 | Both | O (Note 7) | V | 4-* |
| OAM Traffic Descriptor | 2.5.2.4.2.1.3.24 | Both | O (Note 8) | V | 4-6 |
| Progress Indicator | 2.5.2.4.2.1.4.5 | Both | O (Note 9) | V | 4-8 |
| Broadband High Layer Information | 2.5.2.4.2.1.3.8 | Both | O (Note 10) | V | 4-13 |
| Broadband Low Layer Information | 2.5.2.4.2.1.3.9 | Both | O (Note 11) | V | 4-17 |
| Mobile Bearer Capability | | Both | O (Note 12) | | |
| Mobile High Layer Information | | Both | O (Note 13) | | |
| Mobile Low Layer Information | | Both | O (Note 14) | | |

FIG. 579

Note 1 This should be studied further (this parameter will be used when the ATM will be applied on air interface in the future). If the called user wants to send the calling user the AAL parameter information and the AAL parameter information element is present in the setup message, this AAL parameter information element is included in the connect message from the called user to the network. If the connect message from the called user to the network includes the AAL parameter information element, the AAL parameter information element is also included in the connect message from the network to the calling user (see ITU-T Recommendation Q.2931).

Note 2 This should be studied further (this parameter will be used when the ATM will be applied on air interface in the future). If the connect message is the first message among massages replying to a setup message and if the called user does not accept the connection identifier designated by the setup message, this connection identifier is mandatory in the connect message from the called user to the network.

Note 3 If the called user has received the end-to-end transit delay information element in the setup message, this end-to-end transit delay information element is included in the connect message from the called user to the network. If the connect message from the called user to the network includes the end-to-end transit delay information element, the end-to-end transit delay information element is also included in the connect message from the network to the calling user as described in the bearer capability selection procedure defined in ITU-T Recommendation Q.931.

Note 4 This should be studied further (this parameter will be used when the ATM will be applied on the air interface in the future). The narrow-band bearer capability information element is included if the bearer capability selection procedure described in ITU-T Recommendation Q.931 is utilized.

Note 5 The narrow-band high layer compatibility information element is included if the high layer compatibility selection procedure defined in ITU-T Recommendation Q.931 is used.

FIG. 580

Note 6 If the called user wants to send the calling user the narrow-band low layer compatibility information, this narrow-band low layer compatibility information element is included in the connect message from the called user to the network. If the connect message from the called user to the network includes the narrow-band low layer compatibility information element, the narrow-band low layer compatibility information element is also included in the connect message from the network to the calling user. For the narrow-band low layer information negotiation, this information element is included in the connect message as an option, but some network may not transfer this information element to the calling user (see ITU-T Recommendation Q.2931).

Note 7 This notification identifier information element is included if the notification procedure is applied. A plurality of notification identifier information elements can be included in this message. The maximum length and the allowable number of the elements depend on the network.

Note 8 This should be studied further (this parameter will be used when the ATM will be applied on air interface in the future). If the called user has received the OAM traffic descriptor information element in the setup message, this OAM traffic descriptor information element is included in the connect message from the called user to the network. If the connect message from the called user to the network includes the OAM traffic descriptor information element, the OAM traffic descriptor information element is also included in the connect message from the network to the calling user.

Note 9 This parameter is included in this message in case of interworking event or in case of connection which provides the in-band information and pattern. At most, two progress indicator information elements can be included in this message.

Note 10 The broadband high layer information element is included if the high layer information selection procedure is used.

FIG. 581

Note 11 If the called user wants to send the calling user the broadband low layer compatibility information, this broadband low layer compatibility information element is included in the connect message from the called user to the network. If the connect message from the called user to the network includes the broadband low layer compatibility information element, the broadband low layer compatibility information element is also included in the connect message from the network to the calling user. For the broadband low layer information negotiation, this information element is included in the connect message as an option, but some network may not transfer this information element to the calling user.

Note 12 This should be studied further (The mobile bearer capability information element will be used when bearer capability is selected).

Note 13 This should be studied further.

Note 14 This should be studied further.

FIG. 582

Message Type : CONNECT ACKOWLEDGE
Significance : Local
Connection Discernment : ACCH
Direction : Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| Notification Indicator | 2.5.2.4.2.3.23 | Both | O (Note) | V | 4-* |

Note This notification identifier information element is included if the notification procedure is applied. A plurality of notification identifier information elements can be included in this message. The maximum length and the allowable number of the elements depend on the network.

FIG. 583

Message Type : PROGRESS
Significance : Global
Connection Discernment : SDCCH / ACCH
Direction : Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| Narrow-Band Bearer Capability | 2.5.2.4.2.1.4.2 | Both | OF (Note 1) | V | 4-14 |
| Narrow-Band High Layer Compatibility | 2.5.2.4.2.1.4.3 | Both | O (Note 2) | V | 4-7 |
| Notification Indicator | 2.5.2.4.2.1.3.23 | Both | O (Note 3) | V | 4-* |
| Progress Indicator | 2.5.2.4.2.1.4.5 | Both | M (Note 4) | F | 6 |

FIG. 584

Message Type : PROGRESS
Significance : Global
Connection Discernment : SDCCH / ACCH
Direction : Both

| Information Element | Reference Section | Direction | Type | Length | |
|---|---|---|---|---|---|
| Broadband High Layer Information | 2.5.2.4.2.1.3.8 | Both | O (Note 5) | V | 4-13 |
| Mobile Bearer Capability | | Both | O (Note 6) | | |
| Mobile High Layer Information | | Both | O (Note 7) | | |

Note 1 This should be studied further (this parameter will be used when the ATM will be applied on the air interface in the future).. The narrow-band bearer capability information element is included if the bearer capability selection procedure described in of ITU-T Recommendation Q.931 is utilized. The narrow-band bearer capability information element indicates the bearer service used for the call or connection.

Note 2 The narrow-band high layer compatibility information element is included if the high layer compatibility selection procedure defined in ITU-T Recommendation Q.931 is used. The narrow-band high layer compatibility information element indicates the high layer compatibility used for the call.

Note 3 This notification identifier information element is included if the notification procedure is applied. A plurality of notification identifier information elements can be included in this message. The maximum length and the allowable number of the elements depend on the network.

FIG. 585

Note 4 At most, two progress indicator information elements can be included in this message.

Note 5 The broadband high layer information element is included if the high layer information selection procedure is used.

Note 6 This should be studied further (The mobile bearer capability information element will be used when bearer capability is selected).

Note 7 This should be studied further.

FIG. 586

Message Type : SETUP
Significance : Global
Connection Discernment : SDCCH / ACCH
Direction : Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| AAL Parameters | 2.5.2.4.2.1.3.5 | Both | OF (Note 1) | V | 4-21 |
| ATM Traffic Descriptor | 2.5.2.4.2.1.3.6 | Both | OF (Note 2) | V | 12-20 |
| Broadband Bearer Capability | 2.5.2.4.2.1.3.7 | Both | OF (Note 3) | V | 6-7 |
| Called Party Number | 2.5.2.4.2.1.3.11 | Both | O (Note 4) | V | 4-* |

FIG. 587

Message Type : SETUP
Significance : Global
Connection Discernment : SDCCH / ACCH
Direction : Both

| Information Element | Reference Section | Direction | Type | Length | |
|---|---|---|---|---|---|
| Called Party Sub-Address | 2.5.2.4.2.1.3.12 | Both | O (Note 5) | V | 4-25 |
| Called Party Number | 2.5.2.4.2.1.3.13 | Both | O (Note 6) | V | 4-* |
| Called Party Sub-Address | 2.5.2.4.2.1.3.14 | Both | O (Note 7) | V? | 4-25 |
| Connection Identifier | 2.5.2.4.2.1.3.16 | Both | O (Note 8) | V | 4-9? |
| End-to-End Transit Delay | 2.5.2.4.2.1.3.17 | Both | O (Note 9) | V | 4-10 |
| Broadband Repeat Indicator | 2.5.2.4.2.1.3.19 | Both | O (Note 10) | V | 4-5 |
| Narrow-Band Bearer Capability | 2.5.2.4.2.1.4.2 | Both | OF (Note 11) | V | 4-14 |
| Narrow-Band High layer Compatibility | 2.5.2.4.2.1.4.3 | Both | O (Note 12) | V | 4-7 |

FIG. 588

Message Type : SETUP
Significance : Global
Connection Discernment : SDCCH / ACCH
Direction : Both

| Information Element | Reference Section | Direction | Type | Length | |
|---|---|---|---|---|---|
| Broadband Repeat Indicator | 2.5.2.4.2.1.3.19 | Both | O (Note 13) | V | 4-5 |
| Narrow-Band Low layer Compatibility | 2.5.2.4.2.1.4.4 | Both | O (Note 14) | V | 4-20 |
| Notification Indicator | 2.5.2.4.2.1.3.23 | Both | O (Note 15) | V | 4-* |
| OAM Traffic Descriptor | 2.5.2.4.2.1.3.24 | Both | O (Note 16) | V | 4-6 |
| Progress Indicator | 2.5.2.4.2.1.4.5 | Both | OF (Note 17) | V | 4-6 |
| QOS Parameter | 2.5.2.4.2.1.3.18 | Both | M | F | 6 |
| Broad Band Sending Complete | 2.5.2.4.2.1.3.21 | Both | O (Note 18) | V | 4-5 |
| Transit Network Selection | 2.5.2.4.2.1.3.22 | u → n | O (Note 19) | V | 4-* |

FIG. 589

Message Type : SETUP
Significance : Global
Connection Discernment : SDCCH / ACCH
Direction : Both

| Information Element | Reference Section | Direction | Type | Length | |
|---|---|---|---|---|---|
| Broadband High Layer Information | 2.5.2.4.2.1.3.8 | Both | O (Note 20) | V | 4-13 |
| Broadband Repeat Indicator | 2.5.2.4.2.1.3.19 | Both | O (Note 21) | V | 4-5 |
| Broadband Low Layer Information | 5.2.4..2.1.3.9 | Both | O (Note 22) | V | 4-17 |
| Mobile Bearer Capability | | Both | M (Note 23) | | |
| Mobile High Layer Information | | Both | O (Note 24) | | |
| Mobile Low Layer Information | | Both | O (Note 25) | | |

Note 1 This should be studied further (this parameter will be used when the ATM will be applied on air interface in the future). If the calling user wants to send the called user the AAL parameter information, this AAL parameter information element is included in the setup message from the calling user to the network. If the setup message from the calling user to the network includes the AAL parameter information element, the AAL parameter information element is also included in the setup message from the network to the called user (see ITU-T Recommendation Q.2931).

FIG. 590

Note 2 This should be studied further (this parameter will be used when the ATM will be applied on air interface in the future).

Note 3 This should be studied further (this parameter will be used when the ATM will be applied on air interface in the future).

Note 4 The called party number information element is included in the setup message from the calling user to the network in order to inform the network of the called party number information. The called party number information element is also included in the setup message from the network to the calling party.

Note 5 The called party sub-address information element is included in the setup message from the calling user to the network if the calling user wants to indicate the called party sub-address. If the setup message from the calling user to the network includes the called party sub-address information element, the called party sub-address information element is also included in the setup message from the network to the called user.

Note 6 The calling party number information element is included in the setup message from the calling user or from the network in order to identify the calling user.

Note 7 The calling party sub-address information element is included in the setup message from the calling user to the network if the calling user wants to indicate the calling party sub-address. If the setup message from the calling user to the network includes the calling party sub-address information element, the calling party sub-address information element is also included in the setup message from the network to the called user.

Note 8 This should be studied further (this parameter will be used when the ATM will be applied on air interface in the future). The connection identifier is included in the setup message from the calling user to the network if the calling user wants to indicate the virtual channel. The connection identifier is included in the setup message from the network to the called user if the network wants to indicate the virtual channel. When the connection identifier is not included in the setup message, it is interpreted that discretionary virtual channel can be accepted. When asymmetric signaling procedure is adopted, the connection identifier may be excluded.

FIG. 591

Note 9 If the called user wants to indicate an end-to-end transit delay request and/or indicate an expected total transit delay with respect to user data transmission from the calling user to the network boundary, the this end-to-end transit delay information element is included in the setup message from the calling user to the network. If the setup message from the calling user to the network includes the end-to-end transit delay information element, the end-to-end transit delay information element is also included in the setup message from the network to the called user (see ITU-T Recommendation Q.2931).

Note 10 If the narrow-band bearer capability negotiation is used, the broadband repeat indicator information element is contained in the setup message and arranged directly before the first narrow-band bearer capability information element (see ITU-T Recommendation Q.2931).

Note 11 This should be studied further (this parameter will be used when the ATM will be applied on the air interface in the future). In N-ISDN service, this narrow-band bearer capability information element is mandatory (see section 6 of ITU-T Recommendation Q.2931). If the narrow-band bearer capability negotiation is used, a plurality of narrow-band bearer capability information elements may be included in the setup message (see ITU-T Recommendation Q.2931). If the narrow-band bearer capability negotiation is used, at most, three narrow-band bearer capability information elements may be included in the setup message in such a manner that the element of higher priority is arranged ahead: i.e., the element of first priority is arranged first. All networks do not necessarily support a plurality of narrow-band bearer capability information elements. Therefore, by negotiation at entry and the like, the network supporting a plurality of narrow-band bearer capability information elements enables the setup message to include three narrow-band bearer capability information elements (see ITU-T Recommendation Q.931). If the broadband repeat indicator information element is not arranged directly before the narrow-band bearer capability information elements, the narrow-band bearer capability information elements may be included in the setup message in such a manner that the element of lower priority is arranged ahead.

FIG. 592

Note 12 This should be studied further (this parameter will be used when the ATM will be applied on the air interface in the future). If the calling user wants to send the called user the narrow-band high layer compatibility information, this narrow-band high layer compatibility information element is included in the setup message from the calling user to the network. If the setup message from the calling user to the network includes the narrow-band high layer compatibility information element, the narrow-band high layer compatibility information element is also included in the setup message from the network to the called user. All networks do not necessarily support a plurality of narrow-band high layer compatibility information elements. Therefore, by negotiation at entry and the like, the network supporting a plurality of narrow-band high layer compatibility information elements enables the setup message to include three narrow-band high layer compatibility information elements (see ITU-T Recommendation Q.931). If the broadband repeat indicator information element is not arranged directly before the narrow-band high layer compatibility information elements, the narrow-band high layer compatibility information elements may be included in the setup message in such a manner that the element of low priority is arranged ahead.

Note 13 If two or more narrow-band low layer compatibility information is included in the setup message for the low layer compatibility negotiation, this broadband repeat indicator is included in the setup message.

Note 14 This should be studied further (this parameter will be used when the ATM will be applied on the air interface in the future). If the calling user wants to send the called user the narrow-band low layer compatibility information, this narrow-band low layer compatibility information element is included in the setup message from the calling user to the network. If the setup message from the calling user to the network includes the narrow-band low layer compatibility information element, the narrow-band low layer compatibility information element is also included in the setup message from the network to the called user. If the narrow-band bearer capability negotiation is used, two, three, or four narrow-band bearer capability information elements may be included in the setup message in such a manner that the element of higher priority is arranged ahead: i.e., the element of first priority is arranged first (see ITU-T Recommendation Q.2931).

FIG. 593

Note 15 This notification identifier information element is included if the notification procedure is applied. A plurality of notification identifier information elements can be included in this message. The maximum length and the allowable number of the elements depend on the network.

Note 16 This should be studied further (this parameter will be used when the ATM will be applied on air interface in the future). To indicate additional information related to OAM F5 end-to-end information flow, this OAM traffic descriptor information element is included in the setup message from the calling user to the network. However, the setup message without this OAM traffic descriptor information element does not mean that the OAM F5 end-to-end information flow is not used for this call. Instead, this setup message indicates that there is an end-to-end B-ISDN connection.

Note 17 This parameter is included in this message in case of interworking event or in case of connection which provides the in-band information and pattern. At most, two progress indicator information elements can be included in this message.

Note 18 This broadband sending complete parameter information element is mandatorily included in this message from the calling user if en-block sending procedure is applied. Interruption of the broadband sending complete parameter information element by the network is option. This broadband sending complete parameter information element is mandatorily included in this message from the network if en-block sending procedure is applied. If the broadband sending complete parameter information element is not included, it is unnecessary to apply the error correction procedure for lack of mandatory information element.

Note 19 This transit network selection information element is included in the setup message from the calling user in order to select transit network. At most, four transit network selection information elements may be included in the setup message.

FIG. 594

Note 20 If the calling user wants to send the called user the broadband high layer information, this broadband high layer information element is included in the setup message from the calling user to the network. If the setup message from the calling user to the network includes the broadband high layer information element, the broadband high layer information element is also included in the setup message from the network to the called user.

Note 21 If two or more broadband low layer information elements are included for the low layer information selection procedure, this broadband repeat indicator information element is included in the setup message from the calling user to the network. This broadband repeat indicator information element is arranged directly before the first broadband low layer information element.

Note 22 If the calling user wants to send the called user the broadband low layer information, this broadband low layer information element is included in the setup message from the calling user to the network. If the setup message from the calling user to the network includes the broadband low layer information element, the broadband low layer information element is also included in the setup message from the network to the called user. If the broadband low layer information negotiation is used, two or three broadband low layer information elements may be included in the setup message in such a manner that the element of higher priority is arranged ahead: i.e., the element of first priority is arranged first Note 23 This should be studied further (The mobile bearer capability information element will be used when bearer capability is selected)..

Note 24 This should be studied further.

Note 25 This should be studied further.

FIG. 595

Message Type : RELEASE
Significance : Global
Connection Discernment : SDCCH / ACCH
Direction : Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| Cause | 2.5.2.4.2.1.3.15 | Both | M (Note 1) | V | 6-34 |
| Notification Indicator | 2.5.2.4.2.1.3.23 | Both | O (Note 2) | V | 4-* |
| Progress Indicator | 2.5.2.4.2.1.4.5 | Both | O (Note 3) | V | 4-6 |

Note 1 At most, two cause information elements can be included in this message.

Note 2 This notification identifier information element is included if the notification procedure is applied. A plurality of notification identifier information elements can be included in this message. The maximum length and the allowable number of the elements depend on the network.

Note 3 If the in-band tone is provided, this progress indicator information element is included in the release massage from the network. Either of users, however, enables the release message to include the progress indicator information element and can provide the in-band tone. In such cases, the network shall ignore this information element and will not transfer in-band tone. At most, two progress indicator information elements can be included in the release message.

FIG. 596

Message Type : RELEASE COMPLETE
Significance : Local (Note 1)
Connection Discernment : SDCCH / ACCH
Direction : Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| Cause | 2.5.2.4.2.1.3.15 | Both | O (Note 2) | V | 4-34 |

Note 1 This message has the local significance. However, if this message is the first release complete message, it has the global significance.

Note 2 If this message is the first release complete message, this cause information element is mandatory. In addition, if the release complete message is sent as a result of the error correction condition, this cause information element is included in the release complete message. At most, two information elements may be included in the release

FIG. 597

Message Type : INFORMATION
Significance : Local (Note 1)
Connection Discernment : SDCCH / ACCH
Direction : Both

| Information Element | Reference Section | Direction | Type | Length | |
|---|---|---|---|---|---|
| Protocol Discriminator | 2.5.2.4.2.1.1 | Both | M | F | 1 |
| Call Reference | 2.5.2.4.2.1.1 | Both | M | F | 41 |
| Message Type | 2.5.2.4.2.1.2 | Both | M | F | 2 |
| Message Length | 4.4 | Both | M | F | 2 |
| Broadband Sending Complete | 2.5.2.4.2.1.3.21 | Both | O (Note 2) | V | 4-5 |
| Called Party Number | 2.5.2.4.2.1.3.11 | Both | O (Note 3) | V | 4-* |

complete message.

Note 1 This message has the local significance, however, information with global significance can be transferred by this message.

Note 2 This broadband sending complete information element is optional. If the user or network wants to indicate the completion of the overlap sending to the network or user, this broadband sending complete information element is included in the information message.

Note 3 In overlap sending procedure, this called party number information element is included in the information message

FIG. 598

| Message | Reference Section |
|---|---|
| MOBILITY FACILITY | 2.5.2.4.2.2.2 |

FIG. 599

Massage Type: MOBILITY FACILITY
Significance: Local
Direction: Both

| IE | Reference Section | Type | Length FV (oct) | | Note |
|---|---|---|---|---|---|
| Protocol Discriminator | | M | F | 1 | |
| Message Type | 2.5.2.4.2.2.1 | M | F | 2 | |
| Facility | 2.5.2.4.2.2.3 | M | F | | |

FIG. 600

Protocol Discriminator: MM-T
Channel: SDCCH
Direction: MS (MCF) to Network (SACF)

| IE | Reference Section | Type | Length FV | (oct) | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Invoke |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | Object Identifier |
| Operation Value | | M | F | 1 | Terminal Location Registration |
| Tag | | M | F | 1 | SET (Omissible ) |
| Length of Components | | M | F | 1 | (Omissible ) |
| Tag | | M | F | 1 | |
| Length | | M | F | 1 | |

FIG. 601

Protocol Discriminator: MM-T
Channel: SDCCH
Direction: MS (MCF) to Network (SACF)

| IE | Reference Section | Type | Length FV (oct) | | Note |
|---|---|---|---|---|---|
| Length | | M | F | 1 | |
| TMUI | | M | F | 4 | Primary User (Not for the 1st Reg.) |
| Tag | | M | F | 1 | |
| Length | | M | F | 1 | |
| TMUI Assignment Source ID | | M | V | | Primary User (Not for the 1st Reg.) |
| Tag | | M | F | 1 | |
| Length | | M | F | 1 | |
| IMUI | | M | V | | Primary User (for the 1st Reg.) |
| Tag | | O | F | 1 | |
| Length | | O | F | 1 | |
| TC Info | | O | F | | |

FIG. 602

1. RESPONSE MESSAGE INDICATING "RETURN RESULT" WHEN TERMINAL LOCATION HAS BEEN NORMALLY REGISTERED

Protocol Discriminator: MM-T
Channel: SDCCH
Direction: Network (SACF) to MS (MCF)

| IE | Reference Section | Type | Length FV | (oct) | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Result |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | |
| Operation Value | | M | F | 1 | Terminal Location Registration |

FIG. 603

2. RESPONSE MESSAGE INDICATING "RETURN ERROR" WHEN ABNORMALITY, E.G., APPLICATION ERROR HAS OCCURRED

Protocol Discriminator: MM-T
Channel: SDCCH
Direction: Network (SACF) to MS (MCF)

| IE | Reference Section | Type | Length FV | (oct) | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Error |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Error Value | | M | F | 1 | |
| Error Value | | M | F | 1 | |

FIG. 604

3. RESPONSE MESSAGE INDICATING "REJECT" WHEN AN ABNORMALITY, E.G., DISCREPANCY OF IE HAS OCCURRED

Protocol Discriminator: MM-T
Channel: SDCCH
Direction: Network (SACF) to MS (MCF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Reject |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Error Value | | M | F | 1 | |
| Problem | | M | F | 1 | |

FIG. 605

Protocol Discriminator: MM-T
Channel: SDCCH
Direction: Network (SACF/TACF) to MS (MCF/TACAF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Invoke |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | Object Identifier |
| Operation Value | | M | F | 1 | TUMI Assignment |
| Tag | | M | F | 1 | |
| Length | | M | F | 1 | |
| TMUI | | M | F | 4 | |

FIG. 606

1. RESPONSE MESSAGE INDICATING "RETURN RESULT" WHEN TMUI HAS BEEN NORMALLY ASSIGNED

Protocol Discriminator: MM-T
Channel: SDCCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Result |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | |
| Operation Value | | M | F | 1 | TUMI Assignment |

FIG. 607

2. RESPONSE MESSAGE INDICATING "RETURN ERROR" WHEN ABNORMALITY, E.G., APPLICATION ERROR HAS OCCURRED

Protocol Discriminator: MM-T
Channel: SDCCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Error |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Error Value | | M | F | 1 | |
| Error Value | | M | F | 1 | |

FIG. 608

3. RESPONSE MESSAGE INDICATING "REJECT" WHEN AN ABNORMALITY, E.G., DISCREPANCY OF IE HAS OCCURRED

Protocol Discriminator: MM-T
Channel: SDCCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Reject |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Problem Value | | M | F | 1 | |
| Problem | | M | F | 1 | |

FIG. 609

Protocol Discriminator: MM-T
Channel: SDCCH/ACCH
Direction: Network (SACF/TACF) to MS (MCF/TACAF)

| IE | Reference Section | Type | Length FV | (oct) | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Invoke |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | Object identifier |
| Operation Value | | M | F | 1 | Authentication challenge |
| Tag | | M | F | 1 | SET |
| Length of Components | | M | F | 1 | |
| Tag | | M | F | 4 | |

FIG. 610

Protocol Discriminator: MM-T
Channel: SDCCH
Direction: Network (SACF/TACF) to MS (MCF/TACAF)

| IE | Reference Section | Type | Length FV (oct) | | Note |
|---|---|---|---|---|---|
| Length | | M | F | 1 | |
| Execution Authentication Type | | M | F | 1 | |
| Tag | | M | F | 1 | |
| Length | | M | F | 1 | |
| Authentication Random Pattern | | M | V | | |

FIG. 611

1. RESPONSE MESSAGE INDICATING "RETURN RESULT" WHEN AUTHENTICATION HAS BEEN NORMALLY REQUESTED
Protocol Discriminator: MM-T
Channel: SDCCH/ACCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Result |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | |
| Operation Value | | M | F | 1 | Authentication Challenge |
| Tag | | M | F | 1 | |
| Length | | M | F | 1 | |
| Authentication Ciphering Pattern | | M | V | | |

FIG. 612

2. RESPONSE MESSAGE INDICATING "RETURN ERROR" WHEN ABNORMALITY, E.G., APPLICATION ERROR HAS OCCURRED

Protocol Discriminator: MM-T
Channel: SDCCH/ACCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Error |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Error Value | | M | F | 1 | |
| Error Value | | M | F | 1 | |

FIG. 613

3. RESPONSE MESSAGE INDICATING "REJECT" WHEN AN ABNORMALITY, E.G., DISCREPANCY OF IE HAS OCCURRED

Protocol Discriminator: MM-T
Channel: SDCCH/ACCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Reject |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Problem Value | | M | F | 1 | |
| Problem | | M | F | 1 | |

FIG. 614

Protocol Discriminator: MM-T
Channel: SDCCH/ACCH
Direction: Network (SACF/TACF) to MS (MCF/TACAF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Invoke |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | |
| Operation Value | | M | F | 1 | Start Ciphering |
| Tag | | M | F | 1 | |
| Length | | M | F | 1 | |
| Execution Ciphering pattern | | M | F | 4 | |

FIG. 615

1. RESPONSE MESSAGE INDICATING "RETURN RESULT" WHEN CIPHERING ONSET HAS BEEN NORMALLY NOTIFIED

Protocol Discriminator: MM-T
Channel: SDCCH/ACCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Result |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | |
| Operation Value | | M | F | 1 | Start Ciphering |

FIG. 616

2. RESPONSE MESSAGE INDICATING "RETURN ERROR" WHEN ABNORMALITY, E.G., APPLICATION ERROR HAS OCCURRED

Protocol Discriminator: MM-T
Channel: SDCCH/ACCH
Direction: MS (MCF/TACAF) to Network (SACF/TACF)

| IE | Reference Section | Type | Length FV | (oct) | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Error |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Error Value | | M | F | 1 | |
| Error Value | | M | F | 1 | |

FIG. 617

3. RESPONSE MESSAGE INDICATING "REJECT" WHEN AN ABNORMALITY, E.G., DISCREPANCY OF IE HAS OCCURRED

Protocol Discriminator: MM-T
Channel: SDCCH/ACCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Reject |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Problem Value | | M | F | 1 | |
| Problem | | M | F | 1 | |

FIG. 618

Protocol Discriminator: MM-T
Channel: SDCCH
Direction: Network (SACF/TACF) to MS (MCF/TACAF)

| IE | Reference Section | Type | Length FV | (oct) | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Invoke |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | |
| Operation Value | | M | F | 1 | IMUI Retrieval |

FIG. 619

1. RESPONSE MESSAGE INDICATING "RETURN RESULT" WHEN IMUI HAS BEEN NORMALLY INQUIRED
Protocol Discriminator: MM-T
Channel: SDCCH
Direction: MS(MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Result |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Operation Value Tag | | M | F | 1 | |
| Operation Value | | M | F | 1 | IMUI Retrieval |
| Tag | | M | F | 1 | |
| Length | | M | F | 1 | |
| IMUI | | M | V | | BCD |

FIG. 620

2. RESPONSE MESSAGE INDICATING "RETURN ERROR" WHEN ABNORMALITY, E.G., APPLICATION ERROR HAS OCCURRED

Protocol Discriminator: MM-T
Channel: SDCCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Return Error |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Error Value | | M | F | 1 | |
| Error Value | | M | F | 1 | |

FIG. 621

3. RESPONSE MESSAGE INDICATING "REJECT" WHEN AN ABNORMALITY, E.G., DISCREPANCY OF IE HAS OCCURRED

Protocol Discriminator: MM-T
Channel: SDCCH
Direction: MS (MCF/TACAF) to Network (SACF/TACF)

| IE | Reference Section | Type | Length FV (oct) | | Note |
|---|---|---|---|---|---|
| Protocol Discriminator | | M | F | 1 | |
| Message Type | | M | F | 2 | Mobility Facility |
| Information Element Identifier | | M | F | 1 | Facility |
| Length of Facility Contents | | M | F | 1 | |
| Protocol Profile | | M | F | 1 | Remote Operation Protocol |
| Component Type Tag | | M | F | 1 | Reject |
| Length of Component | | M | F | 1 | |
| Component Identifier Tag | | M | F | 1 | Invoke Identifier |
| Length of Component Identifier | | M | F | 1 | |
| Invoke Identifier | | M | F | 1 | |
| Tag | | M | F | 1 | |
| Length of Problem Value | | M | F | 1 | |
| Problem | | M | F | 1 | |

FIG. 622

| Message Type | Reference Section |
| --- | --- |
| RADIO BEARER SETUP | 2.5.2.4.2.3.4.1 |
| RADIO BEARER RELEASE | 2.5.2.4.2.3.4.2 |
| RADIO BEARER RELEASE COMPLETE | 2.5.2.4.2.3.4.3 |
| HANDOVER COMMAND | 2.5.2.4.2.3.4.4 |
| HANDOVER RESPONSE | 2.5.2.4.2.3.4.5 |

FIG. 623

| | When Bearer Is Setup | When Bearer Is Released | When Bearer Is Maintained |
| --- | --- | --- | --- |
| MASSAGE | RADIO BEARER SETUP | RADIO BEARER RELEASE<br>RADIO BEARER RELEASE COMPLETE | HANDOVER COMMAND<br>HANDOVER RESPONSE |

FIG. 624

Protocol Discriminator: RBC
Channel: SDCCH/ACCH
Direction: Network to MS

| Field | Information Element | Reference Section | Type | Length FV | (oct) | Note |
|---|---|---|---|---|---|---|
| | Protocol Discriminator | | M | F | 1 | |
| | Message Type | 2.5.2.4.3.3.1 | M | F | 1 | Operation Indicator is Excluded |
| | Message-Specific-Parameter | 2.5.2.4.3.3.3 | M | V | 3 | |
| Fundamental Information Field | Radio Bearer Setup Info. | 2.5.2.4.3.3.8 | O | V | ≦16 | |
| Fundamental Information Field | DHO Branch Add. Info. | 2.5.2.4.3.3.9 | O | V | ≦12 | |
| Fundamental Information Field | ACCH Repl. Info. | 2.5.2.4.3.3.11 | O | F | 4 | |
| Fundamental Information Field | Branch Repl. Info. | 2.5.2.4.3.3.12 | O | V | ≦13 | |
| Fundamental Information Field | DHO Branch Del. Info | 2.5.2.4.3.3.10 | O | F | 6 | |
| Fundamental Information Field | Code Repl. Info. | 2.5.2.4.3.3.14 | O | V | ≦12 | This should be Studied Further |
| Extensional Information Field | Extensional Information | | O | | | Details will be Decided at Future Performance Extension |

FIG. 625

Protocol Discriminator: RBC
Channel: ACCH
Direction: MS to Network and Network to MS

| Field | Information Element | Reference Section | Type | Length FV (oct) | | Note |
|---|---|---|---|---|---|---|
| Fundamental Information Field | Protocol Discriminator | | M | F | 1 | |
| | Message Type | 2.5.2.4.3.3.1 | M | F | 1 | Operation Indicator is Excluded |
| | Message-Specific-Paramete | 2.5.2.4.3.3.4 | M | F | 2 | |
| | ACCH Repl. Info. | 2.5.2.4.3.3.11 | O | F | 4 | |
| Extensional Information Field | Extensional Information | | O | | | Details will be Decided at Future Performance Extension |

FIG. 626

Protocol Discriminator: RBC
Channel: ACCH
Direction: MS to Network and Network to MS

| Field | Information Element | Reference Section | Type | Length FV | (oct) | Note |
|---|---|---|---|---|---|---|
| Fundamental Information Field | Protocol Discriminator | | M | F | 1 | |
| | Message Type | 2.5.2.4.3.3.1 | M | F | 1 | Operation Indicator is Excluded |
| | Message-Specific-Paramete | 2.5.2.4.3.3.5 | M | F | 1 | |
| | ACCH Repl. Info. | 2.5.2.4.3.3.11 | O | F | 4 | |
| Extensional Information Field | Extensional Information | | O | | | Details will be Decided at Future Performance Extension |

FIG. 627

Protocol Discriminator: RBC
Channel: ACCH
Direction: Network to MS

| Field | Information Element | Reference Section | Type | Length FV | Length (oct) | Note |
|---|---|---|---|---|---|---|
| | Protocol Discriminator | | M | F | 1 | |
| | Message Type | 2.5.2.4.3.3.1 | M | F | 1 | Operation Indicator is Excluded |
| | Message-Specific-Parameter | 2.5.2.4.3.3.6 | M | F | 1 | |
| Fundamental Information Field | User Rate Repl. Info. | 2.5.2.4.3.3.13 | O | V | ≦17 | |
| Fundamental Information Field | Branch Repl. Info. | 2.5.2.4.3.3.12 | O | V | ≦13 | |
| Fundamental Information Field | DHO Branch Add. Info. | 2.5.2.4.3.3.9 | O | V | ≦12 | This can be Multiplied in the Fund. Info. Filed |
| Fundamental Information Field | DHO Branch Del. Info | 2.5.2.4.3.3.10 | O | F | 6 | This can be Multiplied in the Fund. Info. Filed |
| Fundamental Information Field | Code Repl. Info. | 2.5.2.4.3.3.14 | O | V | ≦12 | This should be Studied Further |
| Extensional Information Field | Extensional Information | | O | | | Details will be Decided at Future Performance Extension |

FIG. 628

Protocol Discriminator: RBC
Channel: ACCH
Direction: MS to Network

| | Information Element | Reference Section | Type | Length FV (oct) | | Note |
|---|---|---|---|---|---|---|
| | Protocol Discriminator | | M | F | 1 | |
| | Message Type | 2.5.2.4.3.3.1 | M | F | 1 | Operation Indicator is Excluded |
| | Message-Specific-Parameter | 2.5.2.4.3.3.7 | M | F | 1 | |
| Extensional Information Field | Extensional Information | | O | | | Details will be Decided at Future Performance Extension |

FIG. 629

| Message Type | Reference Section |
|---|---|
| RADIO RESOURCE FACILITY | 2.5.2.4.2.4.2.1 |

FIG. 630

Protocol Discriminator: RRC
Channel: SDCCH/ACCH
Direction: MS to Network

| Information Element | Reference Section | Type | Length FV | (oct) | Note |
|---|---|---|---|---|---|
| Protocol Discriminator | | M | F | 1 | |
| Message Type | 2.5.2.4.3.4.1 | M | F | 1 | Operation Indicator is Excluded |
| Facility | 2.5.2.4.3.4.2 | M | F | 1 | |

FIG. 631

| Message | Coding | Reference Section | Note |
|---|---|---|---|
| TERMINAL ASSOCIATION SETUP | | 2.5.2.4.2.5...1 | |
| TERMINAL ASSOCIATION CONNECT | | 2.5.2.4.2.5...2 | |
| PAGING RESPONSE | | 2.5.2.4.2.5...3 | |
| PAGE AUTHORIZED | | 2.5.2.4.2.5...4 | |
| TERMINAL ASSOCIATION RELEASE | | 2.5.2.4.2.5...5 | |
| TERMINAL ASSOCIATION RELEASE COMPLETE | | 2.5.2.4.2.5...6 | |

FIG. 632

| Message | Information Flow |
|---|---|
| TERMINAL ASSOCIATION SETUP | TA SETUP req. ind. |
| TERMINAL ASSOCIATION CONNECT | TA SETUP resp. conf. |
| PAGING RESPONSE | Paging resp. conf. |
| PAGE AUTHORIZED | Page Authorized req. ind. |
| TERMINAL ASSOCIATION RELEASE | TA Release req. ind.. |
| TERMINAL ASSOCIATION RELEASE COMPLETE | TA Release resp. conf. |

FIG. 633

Protocol Discriminator: TAC
Channel: SDCCH
Direction: TACAF of MS to TACF of Network

| Information Element | Reference Section | Type | Length FV (oct) | | Note |
|---|---|---|---|---|---|
| Protocol Discriminator | 2.5.2.4.3.5..2 | M | F | 1 | |
| Message Type | 2.5.2.4.3.5..3 | M | F | 1 | |
| TERMINAL ASSOCIATION SETUP Message Specific Parameter | 2.5.2.4.3.5..4 (1) | M | V | | |

FIG. 634

Protocol Discriminator: TAC
Channel: SDCCH
Direction: TACF of Network to TACAF of MS

| Information Element | Reference Section | Type | Length FV (oct) | | Note |
|---|---|---|---|---|---|
| Protocol Discriminator | 2.5.2.4.3.5..2 | M | F | 1 | |
| Message Type | 2.5.2.4.3.5..3 | M | F | 1 | |

FIG. 635

Protocol Discriminator: TAC
Channel: SDCCH
Direction: TACAF of MS to TACF of Network

| Information Element | Reference Section | Type | Length FV | (oct) | Note |
|---|---|---|---|---|---|
| Protocol Discriminator | 2.5.2.4.3.5..2 | M | F | 1 | |
| Message Type | 2.5.2.4.3.5..3 | M | F | 1 | |
| PAGING RESPONSE Message Specific Parameter | 2.5.2.4.3.5..4 (2) | M | V | | |

FIG. 636

Protocol Discriminator: TAC
Channel: SDCCH/ACCH
Direction: TACF of Network to TACAF of MS and TACAF of MS to TACF of Network

| Information Element | Reference Section | Type | Length FV | (oct) | Note |
|---|---|---|---|---|---|
| Protocol Discriminator | 2.5.2.4.3.5..2 | M | F | 1 | |
| Message Type | 2.5.2.4.3.5..3 | M | F | 1 | |
| TERMINAL ASSOCIATION RELEASE Message Specific Parameter | 2.5.2.4.3.5..4 (3) | M | V | 1 | |

FIG. 637

Protocol Discriminator: TAC
Channel: SDCCH/ACCH
Direction: TACF of Network to TACAF of MS and
TACAF of MS to TACF of Network

| Information Element | Reference Section | Type | Length FV (oct) | | Note |
|---|---|---|---|---|---|
| Protocol Discriminator | 2.5.2.4.3.5..2 | M | F | 1 | |
| Message Type | 2.5.2.4.3.5..3 | M | F | 1 | |

FIG. 638

Protocol Discriminator: TAC
Channel: SDCCH/ACCH
Direction: TACF of Network to TACAF of MS

| Information Element | Reference Section | Type | Length FV (oct) | | Note |
|---|---|---|---|---|---|
| Protocol Discriminator | 2.5.2.4.3.5..2 | M | F | 1 | |
| Message Type | 2.5.2.4.3.5..3 | M | F | 1 | |

FIG. 639

Protocol Discriminator:
Channel: RACH
Direction: SCMAF of MS to SCMF of BTS

| Information Element | Reference Section | Type | Length FV (oct) | | Note |
|---|---|---|---|---|---|
| Message Type | 2.5.2.4.3.6.1 | M | F | 1 | |
| Perch Ch. Recpt. SIR | 2.5.2.4.3.6.3 | M | F | 1 | |

FIG. 640

Protocol Discriminator:
Channel: FACH
Direction: SCMF of BTS to SCMAF of MS

| Information Element | Reference Section | Type | Length FV (oct) | | Note |
|---|---|---|---|---|---|
| Message Type | 2.5.2.4.3.6.1 | M | F | 1 | |
| Short Code No. | 2.5.2.4.3.6.4 | M | F | 2 | for Uplink SDCCH |
| Short Code No. | 2.5.2.4.3.6.4 | M | F | 2 | for downlink SDCCH |
| Frame Offsets | 2.5.2.4.3.6.5 | M | F | 1/2 | for SDCCH |
| Slot Offsets | 2.5.2.4.3.6.6 | M | F | 1/2 | for SDCCH |

FIG. 641

Protocol Discriminator:
Channel: FACH
Direction: SCMF of BTS to SCMAF of MS

| Information Element | Reference Section | Type | Length FV (oct) | | Note |
|---|---|---|---|---|---|
| Message Type | 2.5.2.4.3.6.1 | M | F | 1 | |

FIG. 642

Protocol Discriminator:
Channel: BCCH
Direction: BCFr of BTS to BCAF of MS

| Information Element | Reference Section | Type | Length FV (oct) | | Note |
|---|---|---|---|---|---|
| Message Type | 2.5.2.4.3.6.1 | M | F | 1 | |
| Length | 2.5.2.4.3.6.2 | M | F | 1 | |
| Network No. | 2.5.2.4.3.6.7 | M | F | 1 | |
| Network Ver. | 2.5.2.4.3.6.8 | M | F | 1 | |
| MS-Common-Parameter Ver. | 2.5.2.4.3.6.9 | M | F | 1 | |
| BTS No. | 2.5.2.4.3.6.10 | M | F | 2 | |
| Sector No. | 2.5.2.4.3.6.11 | M | F | 1 | |
| N (No. of Areas the MS has been Registered) | 2.5.2.4.3.6.12 | M | F | 1 | |
| Area No. | 2.5.2.4.3.6.13 | M | F | 1 | First |
| : | | | | | |
| Area No. | 2.5.2.4.3.6.13 | M | F | 1 | N-th |
| Loc. Reg. Timer Count | 2.5.2.4.3.6.14 | M | F | 1 | |
| Corrected Pwr. for BS Recpt. | 2.5.2.4.3.6.15 | M | F | 1 | |
| MS Uplink Long Code No. | 2.5.2.4.3.6.16 | M | F | | |
| M (No. of LCs on PCH for Deciding the Visited Zone) | 2.5.2.4.3.6.17 | M | F | 1 | |
| PCH LC No. | 2.5.2.4.3.6.18 | M | F | | First |
| : | | | | | |
| PCH LC No. | 2.5.2.4.3.6.18 | M | F | | M-th |
| K (No. of Freq. Bands the BS Uses) | 2.5.2.4.3.6.19 | M | F | 1 | |
| Freq. Band | 2.5.2.4.3.6.20 | M | F | 1 | First |
| : | | | | | |
| Freq. Band | 2.5.2.4.3.6.20 | M | F | 1 | K-th |
| Restricted Info. | 2.5.2.4.3.6.21 | M | F | | |
| Control Ch. Structure Info. (Including Info. for Packet) | 2.5.2.4.3.6.22 | M | F | | |
| Extensional Information | 2.5.2.4.3.6.28 | | | | |

FIG. 643

Protocol Discriminator:
Channel: BCCH
Direction: BCFr of BTS to BCAF of MS

| Information Element | Reference Section | Type | Length FV (oct) | | Note |
|---|---|---|---|---|---|
| Message Type | 2.5.2.4.3.6.1 | M | F | 1 | |
| Length | 2.5.2.4.3.6.2 | M | F | 1 | |
| Call Acceptance Info. | 2.5.2.4.3.6.22 | M | F | | |

FIG. 644

Protocol Discriminator: TAC
Channel: PCH
Direction: BCFr of BTS to BCAF of MS

| Information Element | Reference Section | Type | Length FV (oct) | | Note |
|---|---|---|---|---|---|
| Message Type | 2.5.2.4.3.6.1 | M | F | 3 | |
| Bcst. Info. Recpt. Duration Length | 2.5.2.4.3.6.24 | M | F | 3 | |
| No. of Called MSs | 2.5.2.4.3.6.25 | M | F | 2 | |
| Paged MS ID | 2.5.2.4.3.6.26 | M | V* | | First Called MS |
| Paging ID | 2.5.2.4.3.6.27 | M | F | 6 | First Called MS |
| Paged MS ID | 2.5.2.4.3.6.26 | M | V* | | Second Called MS |
| Paging ID | 2.5.2.4.3.6.27 | M | F | 6 | Second Called MS |

FIG. 645

| Bits 8 7 6 5 4 3 2 1 | |
|---|---|
| 0 0 0 0 0 0 0 0 through 0 0 0 0 0 1 1 1 | Assigned to clause 4 of ITU-T Recommendation Q.931 and thus not Available for the Message Protocol Discriminator |
| 0 0 0 0 1 0 0 0 | User-Network Call Control Messages prescribed in Q.931 (or I.451) |
| 0 0 0 0 1 0 0 1 | User-Network Call/Connection Control Messages prescribed in Q.2931 |
| 0 0 0 1 0 0 0 0 through 0 0 1 1 1 1 1 1 | Reserved for Other Network Layer or Layer 3 Protocols, including Recommendation X. 25 (see Note) |
| 0 1 0 1 0 0 0 0 through 0 1 0 0 1 1 1 1 | National Use |

CONTINUED FROM FIG. 645

| | | | | | | | | |
|---|---|---|---|---|---|---|---|---|
| 0 | 1 | 0 | 1 | 0 | 0 | 0 | 0 | Reserved for Other Network Layer or Layer 3 Protocols, including Recommendation X. 25 (see Note) |
| through | | | | | | | | |
| 0 | 1 | 1 | 1 | 1 | 1 | 1 | 1 | |
| 1 | 0 | 0 | 0 | 0 | 0 | 0 | 0 | FPLMTS CC(MM-P) Message |
| 1 | 0 | 0 | 0 | 0 | 0 | 0 | 1 | FPLMTS TAC Message |
| 1 | 0 | 0 | 0 | 0 | 0 | 1 | 0 | FPLMTS MM-TM Message |
| 1 | 0 | 0 | 0 | 0 | 0 | 1 | 1 | FPLMTS RBC Message |
| 1 | 0 | 0 | 0 | 0 | 1 | 0 | 0 | FPLMTS RRC Message |
| 1 | 0 | 0 | 0 | 0 | 1 | 0 | 1 | FPLMTS OAM Message |
| 1 | 0 | 0 | 0 | 0 | 1 | 1 | 0 | FPLMTS BC Message |
| 1 | 0 | 0 | 0 | 0 | 1 | 1 | 1 | FPLMTS RCM Message |
| 1 | 0 | 0 | 0 | 1 | 0 | 0 | 0 | FPLMTS BSM Message |
| 1 | 0 | 0 | 0 | 1 | 0 | 0 | 1 | Reserved for Other Network Layer or Layer 3 Protocols, including Recommendation X. 25 (see Note) |
| through | | | | | | | | |
| 1 | 1 | 1 | 1 | 1 | 1 | 1 | 0 | |

All other values are reserved.

Note

These values are reserved for distinguishing the protocol discriminator from the first octet of a packet, including a general format discriminator, according to ITU-T Recommendation X.25.

FIG. 646

Message Type Identifier
(Including Message Compatibility Instruction Indicator)

Message Type Field (Octet 1)
Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Escape Code for a Nationally Specific Message Type (See Note 1) |
| 0 | 0 | 0 | . | . | . | . | . | Call Establishment Messages |
| | | | 0 | 0 | 0 | 0 | 1 | ALERTING |
| | | | 0 | 0 | 0 | 1 | 0 | CALL PROCEEDING |
| | | | 0 | 0 | 1 | 1 | 1 | CONNECT |
| | | | 0 | 1 | 1 | 1 | 1 | CONNECT ACKNOWLEDGE |
| | | | 0 | 0 | 0 | 1 | 1 | PROGRESS |
| | | | 0 | 0 | 1 | 0 | 1 | SETUP |
| | | | 0 | 1 | 1 | 0 | 1 | SETUP ACKNOWLEDGE |
| 0 | 1 | 0 | . | . | . | . | . | Call Clearing Messages |
| | | | 0 | 1 | 1 | 0 | 1 | RELEASE |
| | | | 1 | 1 | 0 | 1 | 0 | RELEASE COMPLETE |
| | | | 0 | 0 | 1 | 1 | 0 | RESTART |
| | | | 0 | 1 | 1 | 1 | 0 | RESTART ACKNOWLEDGE |

CONTINUED FROM FIG. 646

| 8 | 7 | 6 | 5 | 4 | 3 | 2 | 1 | |
|---|---|---|---|---|---|---|---|---|
| 0 | 1 | 1 | . | . | . | . | . | Miscellaneous Messages |
| | | | 1 | 1 | 0 | 1 | 1 | INFORMATION |
| | | | 0 | 1 | 1 | 1 | 0 | NOTIFY |
| | | | 1 | 1 | 1 | 0 | 1 | STATUS |
| | | | 1 | 0 | 1 | 0 | 1 | STATUS ENQUIRY |
| 1 | 1 | 1 | 1 | 1 | 1 | 1 | 1 | Reserved for extension for the case wherein all other values have been used (see note 2) |

Note 1 If this is used, the message type (excluding message compatibility instruction indicator) is indicated in octet 5 of the message in accordance with the rules of both nations and the content is indicated in the next octet.

Note 2 If this is used, the message type (excluding message compatibility instruction indicator) is indicated in octet 5 of the message in accordance with the rules of both nations and the content is indicated in the next octet.

FIG. 647

| | | |
|---|---|---|
| Flag (Octet 2) | | |
| Bit Pattern | | |
| 5 | | |
| 0 | | Message instruction field is not significant, so that regular error handling procedures are applied. |
| 1 | | Explicit instructions will follow and supersede the regular error handling procedures. |
| Message Action Indicator (Octet 2) | | |
| Bit Pattern | | |
| 2 | 1 | |
| 0 | 0 | Clear call |
| 0 | 1 | Discard and ignore |
| 1 | 0 | Discard and report status |
| 1 | 1 | Reserved |

FIG. 648

Format of Information Element Identifier (Octet 1)

Bit Pattern

| 8 | 7 | 6 | 5 | 4 | 3 | 2 | 1 | |
|---|---|---|---|---|---|---|---|---|
| 0 | 1 | 1 | 1 | 0 | 0 | 0 | 0 | Called Party Number |
| 0 | 1 | 1 | 1 | 0 | 0 | 0 | 1 | Called Party Sub-address |
| 0 | 1 | 1 | 1 | 1 | 0 | 0 | 0 | Transit Network Selection |
| 0 | 1 | 1 | 1 | 1 | 0 | 0 | 1 | Restart Indicator |
| 0 | 1 | 1 | 1 | 1 | 1 | 0 | 0 | Narrow-band Low Layer Compatibility |
| 0 | 1 | 1 | 1 | 1 | 1 | 0 | 1 | Narrow-band High Layer Compatibility |
| 0 | 1 | 1 | 0 | 0 | 0 | 0 | 0 | Broadband Locking Shift |
| 0 | 1 | 1 | 0 | 0 | 0 | 0 | 1 | Broadband Non-Locking Shift |
| 0 | 1 | 1 | 0 | 0 | 0 | 1 | 0 | Broadband Sending Complete |
| 0 | 1 | 1 | 0 | 0 | 0 | 1 | 1 | Broadband Repeat Indicator |
| 0 | 1 | 1 | 0 | 1 | 1 | 0 | 0 | Calling Party Number |
| 0 | 1 | 1 | 0 | 1 | 1 | 0 | 1 | Calling Party Sub-address |
| 0 | 1 | 0 | 1 | 1 | 0 | 0 | 0 | ATM Adaptation Layer Parameters |

CONTINUED FROM FIG. 648

| | | | | | | | | |
|---|---|---|---|---|---|---|---|---|
| 0 | 1 | 0 | 1 | 1 | 0 | 0 | 1 | ATM Traffic Descriptor |
| 0 | 1 | 0 | 1 | 1 | 0 | 1 | 0 | Connection Identifier |
| 0 | 1 | 0 | 1 | 1 | 0 | 1 | 1 | OAM Traffic Descriptor |
| 0 | 1 | 0 | 1 | 1 | 1 | 0 | 0 | Quality Of Service Parameter |
| 0 | 1 | 0 | 1 | 1 | 1 | 1 | 0 | Broadband Bearer Capability |
| 0 | 1 | 0 | 1 | 1 | 1 | 1 | 1 | Broadband Low Layer Information (B-LLI) |
| 0 | 1 | 0 | 1 | 1 | 1 | 0 | 1 | Broadband High Layer Information (B-HLI) |
| 0 | 1 | 0 | 0 | 0 | 0 | 1 | 0 | End-to-end Transit Delay |
| 0 | 0 | 1 | 0 | 0 | 1 | 1 | 1 | Notification Indicator |
| 0 | 0 | 0 | 1 | 0 | 1 | 0 | 0 | Call State |
| 0 | 0 | 0 | 1 | 1 | 1 | 1 | 0 | Progress Indicator |
| 0 | 0 | 0 | 0 | 0 | 1 | 0 | 0 | Narrow-band Bearer Capability |
| 0 | 0 | 0 | 0 | 1 | 0 | 0 | 0 | Cause |
| 0 | 1 | 0 | 1 | 0 | 0 | 0 | 0 | Mobile Bearer Capability |
| 0 | 1 | 0 | 1 | 0 | 0 | 0 | 1 | Mobile High Layer Information |
| 0 | 1 | 0 | 1 | 0 | 0 | 1 | 0 | Mobile Low Layer Information |

FIG. 649

| | | |
|---|---|---|
| Coding Standard (Octet 2) | | |
| Bit Pattern | | |
| 7 | 6 | |
| 0 | 0 | ITU-T standardized coding as described blow |
| 0 | 1 | ISO/IEC Standard (Note 1) |
| 1 | 0 | National Standard (Note 1) |
| 1 | 1 | Standard defined for the public or private network presented to the network side of the interface (Note 1) |
| Flag (Octet 2) | | |
| Bit Pattern | | |
| 5 | | |
| 0 | | IE instruction field is not significant, so that regular error handling procedures are applied. |
| 1 | | Explicit instructions will follow and supersede the regular error handling procedures. |
| Reserved (Octet 2) | | |
| Bit Pattern | | |
| 4 | | Reserved for a possible use to indicate a "pass along" request. |
| 0 | | Other usages |

CONTINUED FROM FIG. 649

IE Action Indicator (Octet 2)

| Bit Pattern | | | |
|---|---|---|---|
| 3 | 2 | 1 | |
| 0 | 0 | 0 | Clear call |
| 0 | 0 | 1 | Discard the information element and proceed |
| 0 | 1 | 0 | Discard the information element, proceed, and report status |
| 1 | 0 | 1 | Discard and ignore the message |
| 1 | 1 | 0 | Discard the message and report status |
| Others | | | Reserved |

Note 1 These coding manners should be applied only when necessary information elements can not be coded in accordance with TTC standard.

FIG. 650

New Code Set Identification (Octet 5)

Bit Pattern

| 3 | 2 | 1 | |
|---|---|---|---|
| 0 | 0 | 0 | Not Applicable |
| 0<br>to<br>0 | 0<br><br>1 | 1<br><br>1 | Reserved |
| 1 | 0 | 0 | Code Set 4: Information elements for ISO/IEC use |
| 1 | 0 | 1 | Code Set 5: Information elements for national use |
| 1 | 1 | 0 | Code Set 6: Information elements specialized for the local network (public or private network). |
| 1 | 1 | 1 | Code Set 7: Information elements specialized for usersll |

FIG. 651

Temporary Code Set Identification (Octet 5)

Bit Pattern

| 3 | 2 | 1 | |
|---|---|---|---|
| 0 | 0 | 0 | Code Set 0 (Initial Busy Code Set): Information elements according to ITU-T Recom. Q.293 |
| 0 | 0 | 1 | Reserved |
| to | | | |
| 0 | 1 | 1 | |
| 1 | 0 | 0 | Code Set 4: Information elements for ISO/IEC use |
| 1 | 0 | 1 | Code Set 5: Information elements for national use |
| 1 | 1 | 0 | Code Set 6: Information elements specialized for the local network (public or private network). |
| 1 | 1 | 1 | Code Set 7: Information elements specialized for users |

FIG. 652

AAL Type Identification (Octet 5)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 0 | AAL for voice (Notes 1 and 2) |
| 0 | 0 | 0 | 0 | 0 | 0 | 0 | 1 | AAL type 1 |
| 0 | 0 | 0 | 0 | 0 | 0 | 1 | 0 | AAL type 2 (Note 2) |
| 0 | 0 | 0 | 0 | 0 | 0 | 1 | 1 | AAL type 3/4 |
| 0 | 0 | 0 | 0 | 0 | 1 | 0 | 1 | AAL type 5 |
| 0 | 0 | 0 | 1 | 0 | 0 | 0 | 0 | User defined ALL |
| Others | | | | | | | | Reserved |

Note 1 Default AAL for voice is AAL designated in ITU-T Recom. I.363 for voice-band signal transport at 64 kbps (ITU-T Recoms. G.711 and G.722).

Note 2 If the AAL type identification indicates AAL type 2 or AAL for voice, further contents as in Figures 108 through 110 do not follow.

Subtype Field (Octet 6.1 for AAL type 1)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Null |
| 0 | 0 | 0 | 0 | 0 | 0 | 0 | 1 | Voice-band signal transport at 64 kbps (see ITU-T Recoms. G.711, G.722, and I.363; but this should be studied further) |
| 0 | 0 | 0 | 0 | 0 | 0 | 1 | 0 | Circuit transport (see 2.5.1.1 of ITU-T Recom. I.363) |
| 0 | 0 | 0 | 0 | 0 | 1 | 0 | 0 | High-quality audio signal transport (see ITU-T Recom. I.363, but this should be studied further) |
| 0 | 0 | 0 | 0 | 0 | 1 | 0 | 1 | Video signal transport (see ITU-T Recom. I.363, but this should be studied further) |
| Others | | | | | | | | Reserved |

CONTINUED FROM FIG. 652

CBR Rate Field (Octet 7.1 for AAL type 1)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 1 | 64 kbit/s |
| 0 | 0 | 0 | 0 | 0 | 1 | 0 | 0 | 1544 kbit/s |
| 0 | 0 | 0 | 0 | 0 | 1 | 0 | 1 | 6312 kbit/s |
| 0 | 0 | 0 | 0 | 0 | 1 | 1 | 0 | 32064 kbit/s |
| 0 | 0 | 0 | 0 | 0 | 1 | 1 | 1 | 44736 kbit/s |
| 0 | 0 | 0 | 0 | 1 | 0 | 0 | 0 | 97728 kbit/s |
| 0 | 0 | 0 | 1 | 0 | 0 | 0 | 0 | 2048 kbit/s |
| 0 | 0 | 0 | 1 | 0 | 0 | 0 | 1 | 8448 kbit/s |
| 0 | 0 | 0 | 1 | 0 | 0 | 1 | 0 | 34368 kbit/s |
| 0 | 0 | 0 | 1 | 0 | 0 | 1 | 1 | 139264 kbit/s |
| 0 | 1 | 0 | 0 | 0 | 0 | 0 | 0 | n × 64 kbit/s |
| 0 | 1 | 0 | 0 | 0 | 0 | 0 | 1 | n × 8 kbit/s |
| Others | | | | | | | | Reserved |

FIG. 653

Multiplier Field (Octets 8.1 and 8.2 for AAL type 1 and n × 64 kbps indication in octet 7.1)

Integer representation of values between 2 and $2^{16}$-1 for n × 64 kbit/s
Integer representation of values between 1 and 7 for n × 8 kbit/s

Source Clock Frequency Recovery Method Field (Octet 9.1 for AAL type 1)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Null (synchronous circuit transport) |
| 0 | 0 | 0 | 0 | 0 | 0 | 0 | 1 | Synchronous Residual Time Stamp (SRTS) method (asynchronous circuit transport, see 2.5.2.2.1 of ITU-T Recom. I.363) |
| 0 | 0 | 0 | 0 | 0 | 0 | 1 | 0 | Adaptive clock method (see 2.5.2.2.1 of ITU-T Recom. I.363) |
| Others | | | | | | | | Reserved |

Error Correction Method Field (Octet 10.1 for AAL type 1)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Null (No error correction is provided) |
| 0 | 0 | 0 | 0 | 0 | 0 | 0 | 1 | Forward error correction for loss sensitive signal transport (see ITU-T Recom. I.363) |
| 0 | 0 | 0 | 0 | 0 | 0 | 1 | 0 | Forward error correction for delay sensitive signal transport (see ITU-T Recom. I.363, but this should be studied further) |
| Others | | | | | | | | Reserved |

Structured Data Transfer Block Size Field (Octets 11.1 and 11.2 for AAL type 1)

16 bit integer representation of values between 1 and 65536 ($2^{16}$ - 1). This parameter represents the block size of SDT CBR service.

Note 3 If an ATM connection supporting the AAL 1 SDT (structured data transfer) service is provided, the SDT protocol can distinguish between the case wherein the SDT block size is one and the cases wherein the SDT block size is from 2 to $2^{16}$ - 1. See ITU-T Recom. I.363.

CONTINUED FROM FIG. 653

Partially Filled Cells Method Field (Octet 12.1 for AAL type 1)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 1 | Integer representation of the number of leading octets of SAR-PDU payload in use (values between 1 and 47) (see ITU-T Recom. I.363, but this should be studied further) |
| to | | | | | | | | |
| 0 | 0 | 1 | 0 | 1 | 1 | 1 | 1 | |

Forward Maximum CPCS-SDU Size Field (Octets 6.1 and 6.2 for AAL types 3/4 and 5)
16 bit integer representation of the values between 0 and 650535 ($2^{16}$ - 1).
This parameter is applied to the forward direction (from called user to calling user).

Backward Maximum CPCS-SDU Size Field (Octets 7.1 and 7.2 for AAL types 3/4 and 5)
16 bit integer representation of the values between 0 and 650535 ($2^{16}$ - 1).
This parameter is applied to the backward direction (from called user to calling user).

MID Range Field (Octets 8.1, 8.2, 8.3, and 8.4 for AAL type 3/4)
Integer representation of the lowest MID value for octets 8.1 and 8.2 and of the highest MID value for octets 8.3 and 8.4 of the MID range. This takes a value between zero and 1023.

FIG. 654

SSCS Type (Octet 9.1 for AAL type 3/4 and octet 8.1 for AAL type 5)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Null |
| 0 | 0 | 0 | 0 | 0 | 0 | 0 | 1 | Data SSCS based SSCOP (assured operation) |
| 0 | 0 | 0 | 0 | 0 | 0 | 1 | 0 | Data SSCS based SSCOP (non-assured operation) |
| 0 | 0 | 0 | 0 | 0 | 1 | 0 | 0 | Frame relay SSCS |
| Others | | | | | | | | Reserved |

User Defined AAL Information Field (Octets 5.1 to 5.4 for user defined AAL)

Bit Pattern 8 7 6 5 4 3 2 1

The contents of this field are user-specifieed.

Note 4 If the AAL parameter subfield is not included, the following defaults are allocated.

| | |
|---|---|
| Subtype | No default (mandatory for AAL type 1) |
| CBR Rate | No default (mandatory for AAL type 1) |
| Multiplier | No default (mandatory for CBR rate of n × 64 or n × 8 kbps) |
| Souce Clock Frequency Recovery Method | Default indicates no provision |
| Error Correction Method | Default indicates no provision |
| Structured Data Transfer Block Size | Default indicates no use of SDT |
| Partially Filled Cells Method | Default indicates 47 octets |
| Forward Maximum CPCS-SDU Size | Default indicates 65 or 535 octets |
| Backward Maximum CPCS-SDU Size | Default indicates 65 or 535 octets |
| MID Range | Default indicates zero to zero (non multiplexing by MID field) |
| SSCS Type | Default indicates no provision |

FIG. 655

Forward/backward Peak Cell Rate (octets i. 1-3. 3, where i may selected from 5, 6, 7 and 8).

A code expressing in pure 3 octets integer representation, the number of cells per second with bit 8 of the first octet being the most significant bit and bit 1 of the third octet being the least significant bit.

The "forward" direction is defined as that from the calling user to the called user.

The "backward" direction is the reverse, i.e., from the called user to the calling user.

FIG. 656

Bearer Class (Octet 5)

Bit Pattern

| 5 | 4 | 3 | 2 | 1 | |
|---|---|---|---|---|---|
| 0 | 0 | 0 | 0 | 1 | BCOB-A |
| 0 | 0 | 0 | 1 | 1 | BCOB-C (Note 1) |
| 0 | 0 | 0 | 0 | 1 | BCOB-X |
| Others | | | | | Reserved |

Traffic Type (Octet 5a)

Bit Pattern

| 5 | 4 | 3 | |
|---|---|---|---|
| 0 | 0 | 0 | No indication |
| 0 | 0 | 1 | Constant bit rate |
| 0 | 1 | 0 | Variable bit rate |
| Others | | | Reserved |

Timing Requirements (Octet 5a)

Bit Pattern

| 2 | 1 | |
|---|---|---|
| 0 | 0 | No indication |
| 0 | 1 | End-to-end timing required |
| 1 | 0 | End-to-end timing not required |
| 1 | 1 | Reserved |

CONTINUED FROM FIG. 656

Susceptibility to Clipping (Octet 6)

Bit Pattern

| 7 | 6 | |
|---|---|---|
| 0 | 0 | Not susceptible to clipping |
| 0 | 1 | Susceptible to clipping |
| Others | | Reserved |

User-Plane Connection Configuration (Octet 6)

Bit Pattern

| 2 | 1 | |
|---|---|---|
| 0 | 0 | Point-to-point |
| 0 | 1 | Point-to-multipoint (Note 2) |
| Others | | Reserved |

Notes

1. If bearer class BCOB-C is indicated, the network may allocate the resources only on the basis of the peak cell rate as if bearer class BCOB-A is requested.
2. Attention should be paid for that the point-to-multipoint connection procedure is not provided for resource 1. However, by supporting the code point, user can be a point-to-point connection segment within the point-to-multipoint connection. For instance, the user implementing resource 1 procedure receives a "point-to-multipoint" setup message by a user plane connection structure, this should be interpreted as coded to "point-to-point." This permits that the user can be a "leaf" of the point-to-multipoint connection.

FIG. 657

High Layer Information Type (Octet 5)

Bit Pattern

| 7 | 6 | 5 | 4 | 3 | 2 | 1 | |
|---|---|---|---|---|---|---|---|
| 0 | 0 | 0 | 0 | 0 | 0 | 0 | ISO/IEC (Note 1) |
| 0 | 0 | 0 | 0 | 0 | 0 | 1 | User-specific (Note 2) |
| 0 | 0 | 0 | 0 | 0 | 1 | 1 | Vendor-specific application identifier (Note 3) |
| 0 | 0 | 0 | 0 | 1 | 0 | 0 | Reference to B-ISDN teleservice recommendation of ITU-T SG 1 (Note 4) |
| Others | | | | | | | Reserved |

Notes

1. This code point is reserved for use of ISO/IEC standards.
2. If this bit pattern is used for the high layer information type parameter, the coding manner of octets 6 to 13 should be specified by the user. The use of code point needs the agreement between end users.

CONTINUED FROM FIG. 657

3. If this bit pattern is used for the high layer information type parameter, octets 6 to 12 should be coded as in the following.
   Octets 6 to 8 cooperate to include a globally given OUI (organizationally unique identifier defined in section 5.1 of IEEE Standard 802, 1990). Octets 0 and followers of the OUI are set to octets 6 and followers of the broadband high layer information element. The LSB of the OUI is set to bit 8 of the B-HLI element. The MSB of the OUI is set to bit 1 of the B-HLI element.
   Bit 7 of octet 6 should be always set to zero.
   Octets 9 to 12 cooperate to include an application identifier given by a vendor which can be identified by the OUI.
   Octet 13 is not used in the high layer information type.
4. The code point to identify the recommendation or standard is indicated in octet 6.
   Particular code point will be added when the corresponding recommendation or standard is completed.

High Layer Information (Octets 6 to 13)

The content of these octets depends on the high layer information type.

FIG. 658

User Information Layer 1 Protocol (Octet 5)

ALL bits pattern are reserved.

User Information Layer 2 Protocol (Octet 6)

Bit Pattern

| 5 | 4 | 3 | 2 | 1 | |
|---|---|---|---|---|---|
| 0 | 0 | 0 | 0 | 1 | Basic Mode in ISO 1745 |
| 0 | 0 | 0 | 1 | 0 | ITU-T Recom. Q.921 (ITU-T Recom.I.441) |
| 0 | 0 | 1 | 1 | 0 | Link layer in ITU-T Recom. X.25 (Notes 1 and 4) |
| 0 | 0 | 1 | 1 | 1 | Multilink in ITU-T Recom. X.25 (Note 4) |
| 0 | 1 | 0 | 0 | 0 | Extended LAPB for half-duplex operation in ITU-T Recom. T.71 |
| 0 | 1 | 0 | 0 | 1 | HDLC ARM in ISO/IEC 4335 (Note 4) |
| 0 | 1 | 0 | 1 | 0 | HDLC NRM in ISO/IEC 4335 (Note 4) |
| 0 | 1 | 0 | 1 | 1 | HDLC ABM in ISO/IEC 4335 (Note 4) |
| 0 | 1 | 1 | 0 | 0 | LAN logical link control in ISO/IEC 8802.2 |
| 0 | 1 | 1 | 0 | 1 | Single link procedure (SLP) in ITU-T Recom. X.75 (Note 4) |
| 0 | 1 | 1 | 1 | 0 | ITU-T Recom. Q.922 (Note 4) |
| 1 | 0 | 0 | 0 | 0 | User-specified (Note 2) |
| 1 | 0 | 0 | 0 | 1 | DTE-DTE operation in ISO/IEC 7776 (Notes 3 and 4) |
| Others | | | | | Reserved |

CONTINUED FROM FIG. 658

Note 1 This standard is conformable with the DTE-DCE operation in ISO/IEC 7776 (Notes 3 and 4).
Note 2 If this code is included, octet 6a should include a user code in accordance with the user specified layer 2 protocol.
Note 3 This standard is conformable with ITU-T Recom. X.25 revised in light of the application rule defined in standard ITU-T 90.
Note 4 If this code is included, octets 6a and 6b coded in light of TTC standard may be included.

Octet 6a for ITU-T Codings
Mode of Operation (Octet 6a)

Bit Pattern

| 7 | 6 | |
|---|---|---|
| 0 | 1 | Normal mode of operation |
| 1 | 0 | Extended mode of operation |
| Others | | Reserved |

Q.933 Use (Octet 6a)

Bit Pattern

| 2 | 1 | |
|---|---|---|
| 0 | 0 | For use when the coding defined in Recommendation Q.933 is not used |
| Others | | Reserved |

Octet 6a for User Protocol
User-Specified Layer 2 Protocol Information (Octet 6a)
The use and coding of octet 6a is according to user defined requirements.

FIG. 659

Window Size (k) (Octet 6b)

Bits 7 to 1 are coded as a binary coding of parameter value (k) in the range from 1 to 127.

User Information Layer 3 Protocol (Octet 7)

Bit Pattern

| 5 | 4 | 3 | 2 | 1 | |
|---|---|---|---|---|---|
| 0 | 0 | 1 | 1 | 0 | Packet layer in ITU-T Recom. X.25 (Note 6) |
| 0 | 0 | 1 | 1 | 1 | ISO/IEC 8208 (Packet level protocol for data terminal equipment in ITU-T Recom. X.25) (Note 6) |
| 0 | 1 | 0 | 0 | 0 | ITU-T Recom. X.223 or ISO/IEC 8878 (use of ISO/IEC 8208 and ITU-T Recom. X.25 to provide the OSI-CONS) (Note 6) |
| 0 | 1 | 0 | 0 | 1 | OSI connectionless mode protocol in ITU-T Recom. X.223 or ISO/IEC 8473 |
| 0 | 1 | 0 | 1 | 0 | Minimum network layer in ITU-T Recom. T.70 (40) |
| 0 | 1 | 0 | 1 | 1 | ISO/IEC TR 9577 (Note 7) |
| 1 | 0 | 0 | 0 | 0 | User-specified (Note 5) |
| Others | | | | | Reserved |

CONTINUED FROM FIG. 659

Note 5 If this code is included, octet 7a should include a user code in accordance with the user specified layer 3 protocol.

Note 6 If this code is included, octets 7a, 7b, and 7c coded in light of TTC standard may be included.

Note 7 If extended octets (7.1 to 7.8) are included, these octet indicate layer 3 protocol identifications, e.g., described in Appendixes C and D of ISO/IEC TR 9577, in accordance with ISO/IEC TR 9577. Otherwise, a network layer protocol identification (NLPID) carried on the connection is supported as defined in ISO/IEC TR 9577.

---

Octet 7a for ITU-T Codings
Mode of Operation (Octet 7a)

Bit Pattern

| 7 | 6 | |
|---|---|---|
| 0 | 1 | Normal packet-sequence numbering |
| 1 | 0 | Extended packet-sequence numbering |
| Others | | Reserved |

---

Octet 7a for User Protocol
User-Specified Layer 3 Protocol Information (Octet 7a)
The use and coding of octet 7a is according to user defined requirements.

FIG. 660

Default Packet Size (Octet 7b)

Bit Pattern

| 4 | 3 | 2 | 1 | |
|---|---|---|---|---|
| 0 | 1 | 0 | 0 | Default packet size 16 octets |
| 0 | 1 | 0 | 1 | Default packet size 32 octets |
| 0 | 1 | 1 | 0 | Default packet size 64 octets |
| 0 | 1 | 1 | 1 | Default packet size 128 octets |
| 1 | 0 | 0 | 0 | Default packet size 256 octets |
| 1 | 0 | 0 | 1 | Default packet size 512 octets |
| 1 | 0 | 1 | 0 | Default packet size 1024 octets |
| 1 | 0 | 1 | 1 | Default packet size 2048 octets |
| 1 | 1 | 0 | 0 | Default packet size 4096 octets |
| Others | | | | Reserved |

Packet Window Size (Octet 7c)

Bits 7 to 1 are coded as a binary coding of packet window size value in the range from 1 to 127.

Additional Layer 3 Protocol Information (Octets 7.1 to 7.8) for ISO/IEC TR 9577

Bit Pattern is as specified in ISO/IEC TR 9577

FIG. 661

Type of Number (Octet 5)

Bit Pattern

| 7 | 6 | 5 | |
|---|---|---|---|
| 0 | 0 | 0 | Undecided (Note 2) |
| 0 | 0 | 1 | International number (Notes 1, 3, and 6) |
| 0 | 1 | 0 | National number (Notes 1, 3, and 6) |
| 0 | 1 | 1 | Network specific number (Notes 4 and 6) |
| 1 | 0 | 0 | Subscriber number (Notes 1, 3, and 6) |
| 1 | 1 | 0 | Abbreviated number (Note 5) |
| 1 | 1 | 1 | Reserved for extension |
| Others | | | Reserved |

Note 1 The definitions of international, national, and subscriber numbers are described in ITU-T Recom. I.330.

Note 2 The indication, "undecided" is used when the addressing/numbering plan identification indicates NSAP address or when the user or network indicates the type of number with the number digit field. In the latter, the number digit field is formatted in compliance with the dialing procedure of the network. For instance, a prefix may exist and an escape code may exist additionally.

Note 3 This excludes any prefix.

Note 4 The indication, "network specific number" is used to indicate a management number or service number specialized for the network which provides the service. For instance, it is used for accessing the operator.

Note 5 The provision of this code is depending upon the network. The number indicated by this code is the abbreviation of a complete number in accordance with a specific numbering plan provided by the network.

CONTINUED FROM FIG. 661

Note 6 This code point is applied only when the ISDN numbering plan in ITU-T Recom. E.164 is used because of the indication of the default numbering plan of the network by implicitly indication or the indication that the numbering plan is undecided.

Addressing/Numbering Plan Identification (Octet 5) (Note 11)

Bit Pattern

| 4 | 3 | 2 | 1 | |
|---|---|---|---|---|
| 0 | 0 | 0 | 0 | Undecided (Note 7) |
| 0 | 0 | 0 | 1 | ISDN numbering plan in ITU-T Recom. E.164 |
| 0 | 0 | 1 | 0 | NSAP addressing in ISO/IEC 8348 (Notes 8 and 9) |
| 1 | 0 | 0 | 1 | Private numbering plan (Notes 8 and 10) |
| 1 | 1 | 1 | 1 | Reserved for extension |
| Others | | | | Reserved |

Note 7 The indication, "undecided" indicates the default numbering plan of the network. The network default numbering plan should be "ISDN numbering plan in ITU-T Recom. E.164 insofar as an agreement between end users or rule of a standard or recommendation is not prescribed.

Note 8 The use of this code point is an option of the network. An agreement or negotiation between the network operator and user is necessary in order that the network and user use the same numbering plan.

Note 9 When this code point is used, the numbering plan should be coded to indicate "undecided."

Note 10 When this code point is used, the usage of the numbering plan is out of this standard.

CONTINUED FROM FIG. 661

| |
|---|
| Note 11 All of the networks and users should support the ISDN numbering plan. If another numbering plan is used, the note in the numbering plan identifier should be referred to. |
| Address Number Digits (Octets 6, etc.)<br>This is used unless an alternative is specified.<br>This field is coded with IA5 characters, according to the formats specified in the appropriate numbering/dialing plan. |

FIG. 662

Type of Sub-Address Number (Octet 5)

Bit Pattern

| 7 | 6 | 5 | |
|---|---|---|---|
| 0 | 0 | 0 | NSAP (ITU-T Recom. X.213 or ISO/IEC 8348) |
| 0 | 0 | 1 | User-specified ATM end system address |
| 0 | 1 | 0 | User-specified |
| Others | | | Reserved |

Odd/Even Indicator (Octet 5) (Note 1)

Bit Pattern

| 4 | |
|---|---|
| 0 | Even number of address signals |
| 1 | Odd number of address signals |

Sub-Address Information (Octet 6, etc.)

The NSAP address according to ITU-T Recom. X.213 or ISO/IEC 8348 shall be formatted as specified by octet 6 which contains the authority and format identifier (AFI). The encoding is made according to the "preferred binary encoding" as defined in ITU-T Recom. X.213 or ISO/IEC 8348 except when used for terminal selection (Note 3).

CONTINUED FROM FIG. 662

For the definition of this type of sub-address, see ITU-T Recom. I.344
For user-specified ATM end system address, this field is encoded according to the user specification and has a maximum length of 20 octets (Note 4).
For user-specified sub-address, this field is encoded according to the user specification and has a maximum length of 20 octets. When interworking with networks complying with ITU-T Recom. X.25, the coding should be made with BCD.

Notes

1 It is recommended that users use the indication of NSAP in the type of sub-address number since it permits the use of binary, decimal, or IA5 characters in the standardized manner.
2 When the subaddress is used for terminal selection, it is recommended that users use the local IDI format wherein the AFI(authority and format identifier) field is encoded with BCD 50. In this case, IA5 character syntax using only digits from 0 to 9 is utilized as the DSP. The respective characters are coded in one octet according to the ITU-T Recom. T.50 or ISO/IEC 646, so that each most significant bit is zero parity.

FIG. 663

Type of Number (Octet 5)

Bit Pattern

| 7 | 6 | 5 | |
|---|---|---|---|
| 0 | 0 | 0 | Undecided (Note 2) |
| 0 | 0 | 1 | International Number (Notes 1, 3, and 6) |
| 0 | 1 | 0 | National number (Notes 1, 3, and 6) |
| 0 | 1 | 1 | Network specific number (Notes 4 and 6) |
| 1 | 0 | 0 | Subscriber number (Notes 1, 3, and 6) |
| 1 | 1 | 0 | Abbreviated number (Note 5) |
| 1 | 1 | 1 | Reserved for extension |
| Others | | | Reserved |

Note 1 The definitions of international, national, and subscriber numbers are described in ITU-T Recom. I.330.

Note 2 The indication, "undecided" is used when the addressing/numbering plan identification indicates NSAP address or when the user or network indicates the type of number with the number digit field. In the latter, the number digit field is formatted in compliance with the dialing procedure of the network. For instance, a prefix may exist and an escape code may exist additionally.

Note 3 This excludes any prefix and escape.

Note 4 The indication, "network specific number" is used to indicate a management number or service number specialized for the network which provides the service. For instance, it is used for accessing the operator.

Note 5 The provision of this code is depending upon the network. The number indicated by this code is the abbreviation of a complete number in accordance with a specific numbering plan provided by the network.

CONTINUED FROM FIG. 663

Note 6 This code point is applied only when the ISDN numbering plan in ITU-T Recom. E.164 is used because of the indication of the default numbering plan of the network by implicitly indication or the indication that the numbering plan is undecided.

Addressing/Numbering Plan Identification (Octet 5) (Note 11)

Bit Pattern

| 4 | 3 | 2 | 1 | |
|---|---|---|---|---|
| 0 | 0 | 0 | 0 | Undecided (Note 7) |
| 0 | 0 | 0 | 1 | ISDN numbering plan in ITU-T Recom. E.164 |
| 0 | 0 | 1 | 0 | NSAP addressing in ISO/IEC 8348 (Notes 8 and 9) |
| 1 | 0 | 0 | 1 | Private numbering plan (Notes 8 and 10) |
| 1 | 1 | 1 | 1 | Reserved for extension |
| Others | | | | Reserved |

Note 7 The indication, "undecided" indicates the default numbering plan of the network. The network default numbering plan should be "ISDN numbering plan in ITU-T Recom. E.164 insofar as an agreement between end users or rule of a standard or recommendation is not prescribed.

Note 8 The use of this code point is an option of the network. An agreement or negotiation between the network operator and user is necessary in order that the network and user use the same numbering plan.

Note 9 When this code point is used, the numbering plan should be coded to indicate "undecided."

Note 10 When this code point is used, the usage of the numbering plan is out of this standard.

FIG. 664

Presentation Indicator (Octet 5a)

Bit Pattern

| 7 | 6 | |
|---|---|---|
| 0 | 0 | Presentation is allowed |
| 0 | 1 | Presentation is restricted |
| 1 | 0 | Number is not availed |
| 0 | 0 | Reserved |

Note 12 On the interface between the calling user and the network, the presentation indicator used for indicating the calling user's intent to present the calling user's number to the called user. The use of presentation indicator can be decided in the subscription engagement. The omission of octet 5a in the network, wherein the engagement information as to the presentation restriction is not supported, should be interpreted as "00" (presentation is allowed).

Screening Indicator (Octet 5a)

Bit Pattern

| 2 | 1 | |
|---|---|---|
| 0 | 0 | Provided by the user and not screened by the network |
| 0 | 1 | Provided by the user and verified by the network |
| 1 | 0 | Provided by the user and screened out by the network |
| 1 | 1 | Provided by the network |

Note 13 The omission of octet 5a should be interpreted as "00" (provided by the user and not screened by the network).

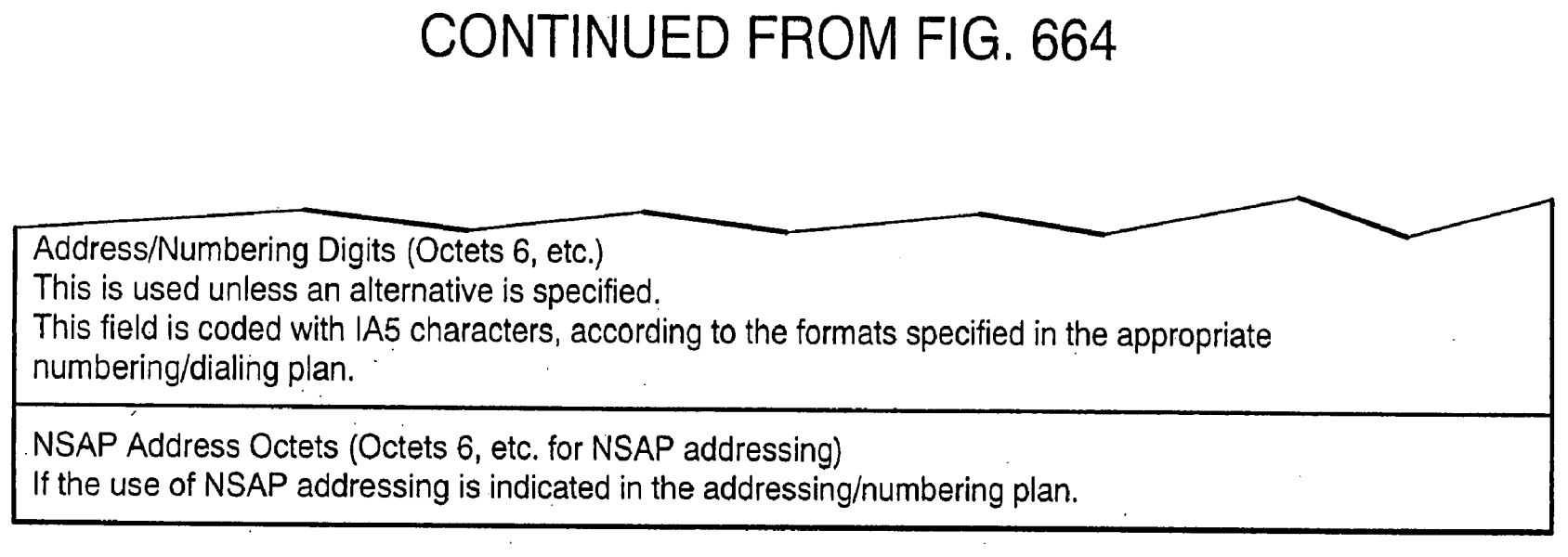

CONTINUED FROM FIG. 664

| |
|---|
| Address/Numbering Digits (Octets 6, etc.)<br>This is used unless an alternative is specified.<br>This field is coded with IA5 characters, according to the formats specified in the appropriate numbering/dialing plan. |
| NSAP Address Octets (Octets 6, etc. for NSAP addressing)<br>If the use of NSAP addressing is indicated in the addressing/numbering plan. |

FIG. 665

Type of Sub-Address (Octet 5)

Bit Pattern

| 7 | 6 | 5 | |
|---|---|---|---|
| 0 | 0 | 0 | NSAP (ITU-T Recom. X.213 or ISO/IEC 8348) |
| 0 | 0 | 1 | User-specified ATM end system address |
| 0 | 1 | 0 | User-specified |
| Others | | | Reserved |

Odd/Even Indicator (Octet 5) (Note 1)

Bit Pattern

| 4 | |
|---|---|
| 0 | Even number of address signals (Note 1) |
| 1 | Odd number of address signals (Note 1) |

Sub-Address Information (Octet 6, etc.)

The NSAP address according to ITU-T Recom. X.213 or ISO/IEC 8348 shall be formatted as specified by octet 6 which contains the authority and format identifier (AFI). The encoding is made according to the "preferred binary encoding" as defined in ITU-T Recom. X.213 or ISO/IEC 8348 except when used for terminal selection (Note 3).

ITU-T Recom. I.344

For user-specified ATM end system address, this field is encoded according to the user specification and has a maximum length of 20 octets (Note 4).

For user-specified sub-address, this field is encoded according to the user specification and has a maximum length of 20 octets. When interworking with networks complying with ITU-T Recom. X.25, the coding should be made with BCD.

CONTINUED FROM FIG. 665

Notes

1 It is recommended that users use the indication of NSAP in the type of sub-address number since it permits the use of binary, decimal, or IA5 characters in the standardized manner.

2 When the subaddress is used for terminal selection, it is recommended that users use the local IDI format wherein the AFI(authority and format identifier) field is encoded with BCD 50. In this case, IA5 character syntax using only digits from 0 to 9 is utilized as the DSP. The respective characters are coded in one octet according to the ITU-T Recom. T.50 or ISO/IEC 646, so that each most significant bit is zero parity.

3 When the NSAP code point is not appropriate, the user-specified ATM end system address is used between two ATM terminal devices.

FIG. 666

| |
|---|
| VP-Associated Signaling (Octet 5)<br><br>Bit Pattern<br>5 4<br>0 0 VP-associated signaling (the same VPI for user information as for signaling)<br>0 1 Explicit indication of VPCI<br>Others Reserved |
| Pref. /Ex.(Preferred/Exclusive) (Octet 5)<br><br>Bit Pattern<br>3 2 1<br>0 0 0 Exclusive VPCI, exclusive VCI<br>0 0 1 Exclusive VPCI, any VCI<br>Others Reserved |
| Virtual Path Connection Identifier (Octets 6 and 7)<br><br>A value between 0 and 65535 is coded for representing the identifier of the virtual path connection (Note 1). |
| Virtual Channel Identifier (Octets 8 and 9) (Note 2)<br><br>0 to 31 Not used for on-demand user plane connections.<br>32 to 65535 Identifier of the virtual channel (Note 3)<br><br>Note 1 The use of the VPCI is described in ITU-T Recom. Q.2931<br>The valid range of VPCIs is determined at the subscription engagement.<br>Note 2 The value in the virtual channel identifier is the same as the value in the VCI field of the corresponding ATM cell header. |

FIG. 667

| |
|---|
| Cumulative Transit Delay Value (Octets 5.1 and 5.2)<br><br>The cumulative transit delay value in milliseconds is encoded to a binary code. The coding rule for integer values described in 4.5.1 should be applied. The cumulative transit delay value occupies 16 bits total. |
| Maximum End-to-End Transit Delay Value (Octets 6.1 and 6.2)<br><br>The maximum end-to-end transit delay value in milliseconds is encoded to a binary code. The coding rule for integer values described in 4.5.1 should be applied. The maximum end-to-end transit delay value occupies 16 bits total. The value "1111 1111 1111 1111," however, should not be interpreted as a maximum end-to-end transit delay value. This code point indicates that: any end-to-end transit delay value may be acceptable; and deliver cumulative end-to-end transit delay value to the called user." |

FIG. 668

QOS Class for Forward (Octet 5)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Unspecified QOS class (Note 1) |
| 1 | 1 | 1 | 1 | 1 | 1 | 1 | 1 | Reserved for future indication of parameterized QOS (Note 2) |
| Others | | | | | | | | Reserved |

QOS Class for Backward (Octet 6)

Bit Pattern

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Unspecified QOS class (Note 1) |
| 1 | 1 | 1 | 1 | 1 | 1 | 1 | 1 | Reserved for future indication of parameterized QOS (Note 2) |
| Others | | | | | | | | Reserved |

Notes

1 If this class is indicated, the network does not guarantee any specific quality of service.

2 This code is reserved until QOS parameters are defined. The QOS parameters will be contained in octets 7 and followers.

FIG. 669

Broadband Repeat Indication (Octet 5)

Bit Pattern

| 4 | 3 | 2 | 1 | |
|---|---|---|---|---|
| 0 | 0 | 0 | 0 | Reserved for use described in ITU-T Recom. Q.2763 (ISUP) |
| 0 | 0 | 0 | 1 | Reserved for use described in ITU-T Recom. Q.2763 (ISUP) |
| 0 | 0 | 1 | 0 | Prioritizing list for selecting one possibility |

FIG. 670

Type of Network Identification (Octet 5)

Bit Pattern

| 7 | 6 | 5 | |
|---|---|---|---|
| 0 | 0 | 0 | Specified by user |
| 0 | 1 | 0 | National network identification (Note 1) |
| 0 | 1 | 1 | International network identification (Note 1) |
| Others | | | Reserved |

Note 1 When the type of network identification is coded as "010" (national network identification), the national network identification plan is coded in accordance with the national specification.

Network Identification Plan (Octet 5)

Bit Pattern

| 4 | 3 | 2 | 1 | |
|---|---|---|---|---|
| 0 | 0 | 0 | 0 | Undecided |
| 0 | 0 | 0 | 1 | Carrier Identification Code (Note 2) |
| 0 | 0 | 1 | 1 | Data Network Identification Code (ITU-T Recom. X.121) |
| Others | | | | Reserved |

Note 2 The carrier identification code is an appropriate fashion for a remote user to identify the network which serves it.

Network Identification Plan (Octet 6)

IA5 characters are organized according to the network identification plan specified.

FIG. 671

Shaping Indicator (Octet 5)

Bit Pattern

| 7 | 6 | |
|---|---|---|
| 0 | 0 | Requirement on shaping by the network is not specified by the user if shaping is applied by the network. |
| 0 | 1 | Aggregate-shaping of user and OAM cells is not allowed if shaping applied by the network. |
| Others | | Reserved |

Cmpl. Ind. (Compliance Indicator) (Octet 5)

Bit Pattern

| 5 | |
|---|---|
| 0 | The use of end-to-end OAM F5 flow is optional. |
| 1 | The use of end-to-end OAM F5 flow is mandatory. |

User-Network Fault Management Indicator (Octet 5)

Bit Pattern

| 3 | 2 | 1 | |
|---|---|---|---|
| 0 | 0 | 0 | No user-originated fault management indications (Note 1) |
| 0 | 0 | 1 | Use of user-originated fault management indications with a cell rate of 1 cell/s (Note 1) |
| Others | | | Reserved |

CONTINUED FROM FIG. 671

Fwd. e-to-e. (Forward End-to-End) OAM F5 Flow Indicator (Octet 6) (Notes 1 and 2)

Bit Pattern

| 7 6 5 | |
|---|---|
| 0 0 0 | 0% of the forward cell rate (for which the CLP is zero or one) specified in the ATM traffic descriptor information element for forward direction. |
| 0 0 1 | 0.1% of the forward cell rate (for which the CLP is zero or one) specified in the ATM traffic descriptor information element for forward direction. |
| 1 0 0 | 1% of the forward cell rate (for which the CLP is zero or one) specified in the ATM traffic descriptor information element for forward direction. |
| Others | Reserved |

Bwd. e-to-e. (Backward End-to-End) OAM F5 Flow Indicator (Octet 6) (Notes 1 and 2)

Bit Pattern

| 3 2 1 | |
|---|---|
| 0 0 0 | 0% of the forward cell rate (for which the CLP is zero or one) specified in the ATM traffic descriptor information element for forward direction. |
| 0 0 1 | 0.1% of the forward cell rate (for which the CLP is zero or one) specified in the ATM traffic descriptor information element for forward direction. |
| 1 0 0 | 1% of the forward cell rate (for which the CLP is zero or one) specified in the ATM traffic descriptor information element for forward direction. |
| Others | Reserved |

Notes

1 Any network-generated fault management indication, e.g., the alarm indication, is always transferred to the user regardless of the code point of the user-network fault management indicator.

2 The cell rate allocated to the forward and backward directions are the amount of the follows. The cell rate indicated in the user-network fault management indicator.

FIG. 672

| Information Element | Reference Section | FV | Length | Note |
|---|---|---|---|---|
| TMUI | (1) | F | 4 | Normal Binary Code |
| TMUI Assignment Source ID | (2) | V | 3 or more | BCD |
| IUMI | (3) | V | 1-8 | BCD |
| Execution Authentication Type | (4) | F | 1 | |
| Authentication Random Pattern | (5) | V | 1 or more | |
| Authentication Ciphering Pattern | (6) | V | 1 or more | |
| Execution Ciphering Type | (7) | F | 1 | |
| TC Info. | (8) | F | | |

FIG. 673

| Information Element | Reference Section | Type | Length FV (oct) | | Note |
|---|---|---|---|---|---|
| Number (N) of Candidate Sectors for Call Attempt or Acceptance | 2.5.2.4.3.4.5.1 | M | F | 1 | N is from One to 20 |
| BTS Number | 2.5.2.4.3.4.5.2 | M | F | 2 | For First Candidate Sector |
| Sector Number | 2.5.2.4.3.4.5.3 | M | F | 1 | |
| Perch Channel Reception SIR | 2.5.2.4.3.4.5.4 | M | F | 1 | |
| Perch Channel Xmsn Pwr | 2.5.2.4.3.4.5.5 | M | F | 1 | |
| Long Code Phase Difference | 2.5.2.4.3.4.5.6 | M | V | 1 or more | Represented in Chip Time |
| • • • • • • • • • • • • • | | | | | |
| BTS Number | 2.5.2.4.3.4.5.2 | M | F | 2 | For N-th Candidate Sector |
| Sector Number | 2.5.2.4.3.4.5.3 | M | F | 1 | |
| Perch Channel Reception SIR | 2.5.2.4.3.4.5.4 | M | F | 1 | |
| Perch Channel Xmsn Pwr | 2.5.2.4.3.4.5.5 | M | F | 1 | |
| Long Code Phase Difference | 2.5.2.4.3.4.5.6 | M | V | 1 or more | Represented in Chip Time |

FIG. 674

| Information Element | Reference Section | Type | Length FV (oct) | | Note |
|---|---|---|---|---|---|
| Number (N) of In-use Sectors | 2.5.2.4.3.4.5.1 | M | F | 1 | N is from One to Three |
| BTS Number | 2.5.2.4.3.4.5.2 | M | F | 2 | For First In-use Sector |
| Sector Number | 2.5.2.4.3.4.5.3 | M | F | 1 | |
| Perch Channel Reception SIR | 2.5.2.4.3.4.5.4 | M | F | 1 | |
| Perch Channel Xmsn Pwr | 2.5.2.4.3.4.5.5 | M | F | 1 | |
| • • • | • • • | • • • | • • • | • • • | • • • |
| BTS Number | 2.5.2.4.3.4.5.2 | M | F | 2 | For N-th In-use Sector |
| Sector Number | 2.5.2.4.3.4.5.3 | M | F | 1 | |
| Perch Channel Reception SIR | 2.5.2.4.3.4.5.4 | M | F | 1 | |
| Perch Channel Xmsn Pwr | 2.5.2.4.3.4.5.5 | M | F | 1 | |

FIG. 675

| Information Element | Reference Section | Type | Length FV (oct) | | Note |
|---|---|---|---|---|---|
| Number (N) of Candidate Sectors for DHO Branch Addition | 2.5.2.4.3.4.5.1 | M | F | 1 | N is from One to 20 |
| BTS Number | 2.5.2.4.3.4.5.2 | M | F | 2 | For First Candidate Sector |
| Sector Number | 2.5.2.4.3.4.5.3 | M | F | 1 | |
| Perch Channel Reception SIR | 2.5.2.4.3.4.5.4 | M | F | 1 | |
| Perch Channel Xmsn Pwr | 2.5.2.4.3.4.5.5 | M | F | 1 | |
| Long Code Phase Difference | 2.5.2.4.3.4.5.6 | M | V | 1 or more | Represented in Chip Time |
| • • • • • • • • • • • • • | | | | | |
| BTS Number | 2.5.2.4.3.4.5.2 | M | F | 2 | For N-th Candidate Sector |
| Sector Number | 2.5.2.4.3.4.5.3 | M | F | 1 | |
| Perch Channel Reception SIR | 2.5.2.4.3.4.5.4 | M | F | 1 | |
| Perch Channel Xmsn Pwr | 2.5.2.4.3.4.5.5 | M | F | 1 | |
| Long Code Phase Difference | 2.5.2.4.3.4.5.6 | M | V | 1 or more | Represented in Chip Time |

FIG. 676

| Information Element | Reference Section | Type | Length FV (oct) | | Note |
|---|---|---|---|---|---|
| Number (N) of Deleted Sectors for DHO Branch Deletion | 2.5.2.4.3.4.5.1 | M | F | 1 | N is from One to Three |
| BTS Number | 2.5.2.4.3.4.5.2 | | | | For First Deleted Sector |
| Sector Number | 2.5.2.4.3.4.5.3 | | | | |
| • • • | • • • | • • • | • • • | • • • | • • • |
| BTS Number | 2.5.2.4.3.4.5.2 | | | | For N-th Deleted Sector |
| Sector Number | 2.5.2.4.3.4.5.3 | | | | |

FIG. 677

| Information Element | Reference Section | Type | Length FV (oct) | | Note |
|---|---|---|---|---|---|
| Number (N) of Candidate Sectors for HHO | 2.5.2.4.3.4.5.1 | M | F | 1 | N is from One to 20 |
| BTS Number | 2.5.2.4.3.4.5.2 | M | F | 2 | For First Candidate Sector |
| Sector Number | 2.5.2.4.3.4.5.3 | M | F | 1 | |
| Perch Channel Reception SIR | 2.5.2.4.3.4.5.4 | M | F | 1 | |
| Perch Channel Xmsn Pwr | 2.5.2.4.3.4.5.5 | M | F | 1 | |
| Long Code Phase Difference | 2.5.2.4.3.4.5.6 | M | V | 1 or more | Represented in Chip Time |
| • • • | • • • | • • • | • • • | • • • | • • • |
| BTS Number | 2.5.2.4.3.4.5.2 | M | F | 2 | For N-th Candidate Sector |
| Sector Number | 2.5.2.4.3.4.5.3 | M | F | 1 | |
| Perch Channel Reception SIR | 2.5.2.4.3.4.5.4 | M | F | 1 | |
| Perch Channel Xmsn Pwr | 2.5.2.4.3.4.5.5 | M | F | 1 | |
| Long Code Phase Difference | 2.5.2.4.3.4.5.6 | M | V | 1 or more | Represented in Chip Time |

FIG. 678

| Information Element | Reference Section | Type | Length FV (oct) | | Note |
|---|---|---|---|---|---|
| Number of RBC IDs | 2.5.2.4.3.4.5.7 | M | F | 1 | R (Number of RBC IDs) Is from 1 to s |
| RBC ID | 2.5.2.4.3.4.5.8 | M | F | 1 | For First Call |
| Necessary SIR | 2.5.2.4.3.4.5.9 | M | F | 1 | |
| FER Measurement | 2.5.2.4.3.4.5.10 | M | F | 1 | |
| · · · · · · · · · · · · · | | | | | |
| RBC ID | 2.5.2.4.3.4.5.8 | M | F | 1 | For s-th Call |
| Necessary SIR | 2.5.2.4.3.4.5.9 | M | F | 1 | |
| FER Measurement | 2.5.2.4.3.4.5.10 | M | F | 1 | |

FIG. 679

| Information Element | Reference Section | Type | Length FV (oct) | | Note |
|---|---|---|---|---|---|
| (Not Identified) | | | | | |

FIG. 680

Extension (Octet 1) (Particularities Are Not Decided)

| Bit Pattern |
|---|
| 8 |
| 0 |
| 1 |

Message Type (Octet 1) (Particularities Are Not Decided)

| Bit Pattern 7 | 6 | 5 | 4 | |
|---|---|---|---|---|
| 0 | 0 | 0 | 0 | |
| 0 | 0 | 0 | 1 | TERMINAL ASSOCIATION SETUP |
| 0 | 0 | 1 | 0 | TERMINAL ASSOCIATION CONNECT |
| 0 | 0 | 1 | 1 | PAGING RESPONSE |
| 0 | 1 | 0 | 0 | PAGE AUTHORIZED |
| 0 | 1 | 0 | 1 | TERMINAL ASSOCIATION RELEASE |
| 0 | 1 | 1 | 0 | TERMINAL ASSOCIATION RELEASE COMPLETE |
| Others | | | | Reserved |
| 1 | 1 | 1 | 1 | Reserved for extension for the case wherein all other values for message type identifier have been used (see note) |

Note If this is used, the message type is indicated in octet 3 of the message and the contents of the message specific parameter and later parameters are indicated in the next octets.

CONTINUED FROM FIG. 680

Flag (Octet 1)

Bit Pattern

| 3 | |
|---|---|
| 0 | The message action indicator field has no meaning, so that a usual error process procedure will be applied. |
| 1 | Process should comply with the message action indicator, so that the usual error process procedure will not be applied. |

Message Action Indicator (Octet 1) (Particularities Are Not Decided)

Bit Pattern

| 2 | 1 |
|---|---|
| 0 | 0 |
| 0 | 1 |
| 1 | 0 |
| 0 | 1 |

FIG. 681

| Parameter | Reference Section | |
|---|---|---|
| TERMINAL ASSOCIATION SETUP Message Specific Parameter | 2.5.2.4.3.5...4.1(1) | |
| PAGING RESPONSE Message Specific Parameter | 2.5.2.4.3.5...4.1(2) | |
| TERMINAL ASSOCIATION RELEASE Message Specific Parameter | 2.5.2.4.3.5...4.1(3) | |

FIG. 682

| Subfield | Reference Section | F/V |
|---|---|---|
| TMUI | 2.5.2.4.3.5...4.2(6) | F |
| Mobile station Type | 2.5.2.4.3.5...4.2(3) | V |

FIG. 683

| Subfield | Reference Section | F/V |
|---|---|---|
| Paged MS ID | 2.5.2.4.3.5...4.2(4) | V |
| Mobile station Type | 2.5.2.4.3.5...4.2(3) | V |
| Paging ID | 2.5.2.4.3.5...4.2(5) | V |

FIG. 684

| Subfield | Reference Section | F/V |
|---|---|---|
| Cause | 2.5.2.4.3.5...4.2(2) | V |

FIG. 685

| IE of TAC Entity Message | Reference Section | Note |
|---|---|---|
| Cause | 2.5.2.4.3.5...4.2(2) | |
| Mobile station Type | 2.5.2.4.3.5...4.2(3) | |
| Paged MS ID | 2.5.2.4.3.5...4.2(4) | |
| Paging ID | 2.5.2.4.3.5...4.2(5) | |
| TMUI | 2.5.2.4.3.5...4.2(6) | |

FIG. 686

| |
|---|
| Extension (Octet 1)<br><br>Bit Pattern<br>8<br>0 There is a next octet (octet 2) or more octets<br>1 Final octet |
| Cause Value (Octet 1) (Particularities Are Not Decided)<br><br>Bit Pattern<br>7 6 5 4 3 2 1<br>0 0 1 [Ordinary Class]<br>0 0 0 0 Ordinary disconnection |

FIG. 687

Available Frequency Band (Octet 2) (Particularities Are Not Decided)

This indicates whether the mobile station can avail each of four frequency bands f1 through f4.

Available Code per Frequency Band (Octet 3) (Particularities Are Not Decided)

This indicates the available uplink long code per each frequency band.

Information Transfer Rate per Code (Octet 2)

This indicates the information transfer rate per the available uplink long code.

| Bit Pattern | |
|---|---|
| 0 0 0 0 | 8 kpbs |
| 0 0 0 1 | 16 kpbs |
| 0 0 1 0 | 32 kpbs |
| 0 0 1 1 | 64 kpbs |
| 0 1 0 0 | 128 kpbs |
| 0 1 0 1 | 256 kpbs |
| 0 1 1 0 | 512 kpbs |
| 0 1 1 1 | 1024 kpbs |
| 1 0 0 0 | 2048 kpbs |
| 1 0 0 1 | 4096 kpbs |
| 1 0 1 0 | 8192 kpbs |
| 1 0 1 1 | 16384 kpbs |
| Others | Reserved |

CONTINUED FROM FIG. 687

| |
|---|
| Authentication Type (Octet 1)<br>This indicates the type of authentication procedure that the mobile station can carry out.<br>Particularities are not decided. |
| Ciphering Type (Octet 1)<br>This indicates the type of ciphering procedure that the mobile station can carry out.<br>Particularities are not decided. |
| Maximum Transmit Power<br>This indicates the maximum transmission power that the mobile station can achieve.<br>Particularities are not decided. It may not be necessary. |
| Mobile Station Indicator<br>This indicates the type of mobile station. Particularities are not decided.<br>Bit Pattern<br>General<br>Maintenance<br>VIP<br>Reserved |

FIG. 688

| |
|---|
| Type of Number (Octet 1)<br>This indicate the type of number (TMUI or IMUI) in the next octet.<br>Bit Pattern<br>8<br>0 TMUI<br>1 IMUI |
| Length of Number (Octet 1)<br>This indicates the length of the TMUI or IMUI at octet 2 in octets. The length does not include the length of octet 1. |
| TMUI (Octet 2)<br>See the description of TMUI subfield. This is used in the paging message orpaging response message in ordinal occasion. |
| IMUI (Octet 2)<br>This is an integer code transformed from an IMUI in the BCD. This is used in the paging message (TAC entity message) or paging response message (BSM entity message) when the network has recognized that the TMUI stored in the mobile station is different from that stored in the network. The maximum length of IMUI is 50 bits. |

FIG. 689

Unique Identification Number
This is used for identifying the mobile station in the node for assigning the TMUI to the mobile station.
This is in the range from 0 to 999.

FIG. 690

| Message | Reference |
|---|---|
| BEARER SETUP MESSAGES<br>LINK SETUP REQUESTED<br>LINK SETUP<br>LINK SETUP PROCEEDING<br>LINK SETUP RESPONSE<br><br>BEARER RELEASE MESSAGES<br>LINK RELEASE<br>LINK RELEASE COMPLETE<br><br>OTHER MESSAGES<br>LINK FACILITY (FROM BSC FUNCTION OF NETWORK TO BS)<br>LINK FACILITY (FROM BS TO BSC FUNCTION OF NETWORK) | |

FIG. 691

| RELEVANCY TO STATE TRANSITION OF BC PROTOCOL ENTITY | YES | NO |
|---|---|---|
| | LINK SETUP REQUESTED<br>LINK SETUP<br>LINK SETUP PROCEEDING<br>LINK SETUP RESPONSE<br>LINK RELEASE<br>LINK RELEASE COMPLETE | LINK FACILITY (FROM BSC FUNCTION OF NETWORK TO BS)<br>LINK FACILITY (FROM BS TO BSC FUNCTION OF NETWORK) |

FIG. 692

Protocol Discriminator; BC
Connection Identification: Control Signal Between BTS and MSCNW (BSC Function)
Direction: SCMF of BTS to SACF and TACF of MSCNW (BSC function)

| Information Element | Reference Section | Type | Length FV (oct) | | Note |
|---|---|---|---|---|---|
| Protocol Discriminator | | M | F | 1 | |
| Link Reference | | M | V | | for SDCCH |
| Message Type | | M | F | 1 | |
| SDCCH Setup Request | | O | F | 4 | |
| LAI Setup Request | | O | F | 3 | |

FIG. 693

Protocol Discriminator: BC
Connection Identification: Control Signal Between BTS and MSCNW (BSC Function)
Direction: SACF and TACF of MSCNW (BSC Function) to SCMF of BTS
TACF of MSCNW (BSC Function) to BCFr of BTS

| Information Element | Reference Section | Type | Length FV | Length (oct) | Note |
|---|---|---|---|---|---|
| Protocol Discriminator | | M | F | 1 | |
| Link Reference | | M | V | | |
| Message Type | | M | F | 1 | |
| Link ID Fund. IE | | M | F | 7 | |
| TCH Setup Req. IE Without Freq. Ind. (Call Initiated) | | O | V | | |
| TCH Setup Req. IE Without Freq. Ind. (Active) | | O | V | | |
| TCH Setup Req. IE With Freq. Ind. | | O | V | | |
| DHO Branch Addn. Req. IE | | O | V | | |
| Intra-BS DHO Branch Addn. Req. IE | | O | F | 4 | |
| ACCH Setup Req. IE | | O | F | | |

FIG. 694

Protocol Discriminator: BC
Connection Identification: Control Signal Between BTS and MSCNW (BSC Function)
Direction: BCFr of BTS to TACF of MSCNW (BSC Function)

| Information Element | Reference Section | Type | Length FV | (oct) | Note |
|---|---|---|---|---|---|
| Protocol Discriminator | | M | F | 1 | |
| Link Reference | | M | V | | |
| Message Type | | M | F | 1 | |
| TCH Setup Acpt. IE Without Freq. Ind. (Call Initiated) | | O | V | | |
| TCH Setup Acpt. IE Without Freq. Ind. (Active) | | O | V | | |
| TCH Setup Acpt. IE With Freq. Ind. | | O | | | |
| Intra-BS DHO Branch Addn. Acpt. and Resp. IE | | O | V | | |
| ACCH Setup Acpt. and Resp. IE | | O | F | 3 | |

FIG. 695

Protocol Discriminator: BC
Connection Identification: Control Signal Between BTS and MSCNW (BSC Function)
Direction: BCFr of BTS to TACF of MSCNW (BSC Function)
SCMF of BTS to SACF and TACF of MSCNW (BSC Function)

| Information Element | Reference Section | Type | Length FV | (oct) | Note |
|---|---|---|---|---|---|
| Protocol Discriminator | | M | F | 1 | |
| Link Reference | | M | V | | |
| Message Type | | M | F | 1 | |
| TCH Setup Resp. IE Without Freq. Ind. (Call Initiated) | | O | V | | |
| TCH Setup Resp. IE Without Freq. Ind. (Active) | | O | V | | |
| TCH Setup Resp. IE With Freq. Ind. | | O | V | | |
| DHO Branch Addn. Resp. IE | | O | V | | |
| Intra-BS DHO Branch Addn. Resp. IE | | | V | | |
| ACCH Setup Resp. IE | | O | F | 3 | |

FIG. 696

Protocol Discriminator: BC
Connection Identification: Control Signal Between BTS and MSCNW (BSC Function)
Direction: TACF of MSCNW (BSC Function) to BCFr of BTS

| Information Element | Reference Section | Type | Length FV | (oct) | Note |
|---|---|---|---|---|---|
| Protocol Discriminator | | M | F | 1 | |
| Link Reference | | M | V | | |
| Message Type | | M | F | 1 | |
| Intra-BS DHO Branch Addn. Req. IE | | O | F | 3 | |
| Intra-BS DHO Branch Deln. Req. IE | | O | F | 3 | |
| Intra-BS DHO Initiation Req. IE | | O | F | 3 | |
| ACCH Setup Req. IE | | O | F | | |
| ACCH Rel. Req. IE | | O | F | 7 | |
| Freq. Repl. Req. IE Without Freq. Ind. | | O | F | 3 | |
| Freq. Repl. Req. IE with Freq. Ind. | | O | F | 3 | |
| Setup Completion Notification IE | | O | F | | |

FIG. 697

Protocol Discriminator: BC
Connection Identification: Control Signal Between BTS and MSCNW (BSC Function)
Direction: BCFr of BTS to TACF of MSCNW (BSC Function)

| Information Element | Reference Section | Type | Length FV | (oct) | Note |
|---|---|---|---|---|---|
| Protocol Discriminator | | M | F | 1 | |
| Link Reference | | M | V | | |
| Message Type | | M | F | 1 | |
| Intra-BS DHO Branch Addn. Resp. IE | | O | V | | |
| Intra-BS DHO Branch Deln. Resp. IE | | O | F | 3 | |
| Intra-BS DHO Initiation. Acpt. IE | | O | V | | |
| ACCH Setup Resp. IE | | O | F | 3 | |
| ACCH Rel. Resp. IE | | O | F | 3 | |
| Freq. Repl. Resp. IE with Freq. Ind. | | O | F | 3 | |
| Freq. Repl. Req. IE with Freq. Ind. | | O | V | | |
| Freq. Repl. Acpt. IE Without Freq. Ind. | | O | F | 4 | |
| Freq. Repl. Resp. IE Without Freq. Ind. | | O | F | 3 | |
| Code Repl. Req. IE | | O | V | | |

FIG. 698

Protocol Discriminator: BC
Connection Identification: Control Signal Between BTS and MSCNW (BSC Function)
Direction: TACF of MSCNW (BSC Function) to BCFr of BTS
SACF and TACF of MSCNW (BSC Function) to SCMF of BTS

| Information Element | Reference Section | Type | Length FV (oct) | | Note |
|---|---|---|---|---|---|
| Protocol Discriminator | | M | F | 1 | |
| Link Reference | | M | V | | |
| Message Type | | M | F | 1 | |
| Link ID Fund. IE | | O | F | 6 | |
| TCH Rel. Req. IE | | O | F | 3 | |
| SDCCH Rel. Req. IE | | O | F | 3 | |

FIG. 699

Protocol Discriminator: BC
Connection Identification: Control Signal Between BTS and MSCNW (BSC Function)
Direction: BCFr of BTS to TACF of MSCNW (BSC Function)
SACF and TACF of MSCNW (BSC Function) to SCMF of BTS

| Information Element | Reference Section | Type | Length FV (oct) | | Note |
|---|---|---|---|---|---|
| Protocol Discriminator | | M | F | 1 | |
| Link Reference | | M | V | | |
| Message Type | | M | F | 1 | |
| Cause Indication | | O (Note 1) | F | 3 | |

FIG. 700

| Use of Link Setup Message \ Element Used in Link Setup Message | Link ID Fund. IE | TCH Setup Req. IE Without Freq. Ind. (Call Initiated) | TCH Setup Req. IE Without Freq. Ind. (Active) |
|---|---|---|---|
| Setup of SDCCH | M | | |
| Setup of 1st Radio Branch for 1st Conn. of 1st Call | M | M | |
| Setup of 1st and 2nd Radio Branches for 1st Conn. of 1st Call | M | M | |
| Setup of 2nd Radio Branch for 1st Conn. of 1st Call | M | | |
| Setup of 2nd and 3rd Radio Branches for 1st Conn. of 1st Call | M | | |
| | | | |
| Setup of 1st Radio Branch for 2nd Conn. of 1st Call | M | | |
| Setup of 1st and 2nd Radio Branches for 2nd Conn. of 1st Call | M | | |
| Setup of 2nd Radio Branch for 2nd Conn. of 1st Call | M | | |
| Setup of 2nd and 3rd Radio Branches for 2nd Conn. of 1st Call | M | | |
| | | | |
| Setup of 1st Radio Branches for 1st Conn. of 2nd Call | M | | |
| Setup of 1st and 2nd Radio Branches for 1st Conn. of 2nd Call | M | | |
| Setup of 2nd Radio Branch for 1st Conn. of 2nd Call | M | | |
| Setup of 2nd and 3rd Radio Branches for 1st Conn. of 2nd Call | M | | |
| | | | |
| Freq. Repl. Without freq. Ind. (to Different Rate) | M | | M |
| Freq. Repl. with freq. Ind. (to Different Rate) | M | | |
| Rate Repl. (in Same Freq.) | M | | |

A

CONTINUED FROM FIG. 700

A

| TCH Setup Req. IE with Freq. Ind. | DHO Branch Addn. Req. IE | Intra-BS DHO Branch Addn. Req. IE | ACCH Setup Req. IE | Note |
|---|---|---|---|---|
| | | | | |
| | | | M | |
| | | M | M | |
| | M | | M | |
| | M | M | M | |
| | | | | |
| M | | | O | |
| M | | M | O | |
| | M | | O | |
| | M | M | O | |
| | | | | |
| M | | | O | |
| M | | M | O | |
| | M | | O | |
| | M | M | O | |
| | | | | |
| | | | O | |
| M | | | O | |
| M | | | O | |

FIG. 701

| Use of Link Setup Proceeding Message \ Element Used in Link Setup Proceeding Message | TCH Setup Acpt. IE Without Freq. Ind. (Call Initiated) | TCH Setup Acpt. IE Without Freq. Ind. (Active) |
|---|---|---|
| Setup of SDCCH | | |
| Setup of 1st Radio Branch for 1st Conn. of 1st Call | M | |
| Setup of 1st and 2nd Radio Branches for 1st Conn. of 1st Call | M | |
| Setup of 2nd Radio Branch for 1st Conn. of 1st Call | | |
| Setup of 2nd and 3rd Radio Branches for 1st Conn. of 1st Call | | |
| | | |
| Setup of 1st Radio Branch for 2nd Conn. of 1st Call | | |
| Setup of 1st and 2nd Radio Branches for 2nd Conn. of 1st Call | | |
| Setup of 2nd Radio Branch for 2nd Conn. of 1st Call | | |
| Setup of 2nd and 3rd Radio Branches for 2nd Conn. of 1st Call | | |
| | | |
| Setup of 1st Radio Branches for 1st Conn. of 2nd Call | | |
| Setup of 1st and 2nd Radio Branches for 1st Conn. of 2nd Call | | |
| Setup of 2nd Radio Branch for 1st Conn. of 2nd Call | | |
| Setup of 2nd and 3rd Radio Branches for 1st Conn. of 2nd Call | | |
| | | |
| Freq. Repl. Without freq. Ind. (to Different Rate) | | M |
| Freq. Repl. with freq. Ind. (to Different Rate) | | |
| Rate Repl. (in Same Freq.) | | |

A

CONTINUED FROM FIG. 701

| TCH Setup Acpt. IE with Freq. Ind. | Intra-BS DHO Branch Addn. Resp. IE | ACCH Setup Resp. IE | Note |
|---|---|---|---|
| | | | This Message Is Not Used |
| | | M | |
| | M | M | |
| | | | This Message Is Not Used |
| | | | This Message Is Not Used |
| | | | |
| M | | O | |
| M | M | O | |
| | | | This Message Is Not Used |
| | | | This Message Is Not Used |
| | | | |
| M | | O | |
| M | M | O | |
| | | | This Message Is Not Used |
| | | | This Message Is Not Used |
| | | | |
| | | M | |
| M | | M | |
| M | | M | |

| Element Used in Link Setup Response Message / Use of Link Setup Response Message | TCH Setup Resp. IE Without Freq. Ind. (Call Initiated) | TCH Setup Resp. IE Without Freq. Ind. (Active) |
|---|---|---|
| Setup of SDCCH | | |
| Setup of 1st Radio Branch for 1st Conn. of 1st Call | M | |
| Setup of 1st and 2nd Radio Branches for 1st Conn. of 1st Call | M | |
| Setup of 2nd Radio Branch for 1st Conn. of 1st Call | | |
| Setup of 2nd and 3rd Radio Branches for 1st Conn. of 1st Call | | |
| | | |
| Setup of 1st Radio Branch for 2nd Conn. of 1st Call | | |
| Setup of 1st and 2nd Radio Branches for 2nd Conn. of 1st Call | | |
| Setup of 2nd Radio Branch for 2nd Conn. of 1st Call | | |
| Setup of 2nd and 3rd Radio Branches for 2nd Conn. of 1st Call | | |
| | | |
| Setup of 1st Radio Branches for 1st Conn. of 2nd Call | | |
| Setup of 1st and 2nd Radio Branches for 1st Conn. of 2nd Call | | |
| Setup of 2nd Radio Branch for 1st Conn. of 2nd Call | | |
| Setup of 2nd and 3rd Radio Branches for 1st Conn. of 2nd Call | | |
| | | |
| Freq. Repl. Without freq. Ind. (to Different Rate) | | M |
| Freq. Repl. with freq. Ind. (to Different Rate) | | |
| Rate Repl. (in Same Freq.) | | |

A

CONTINUED FROM FIG. 702

A

| TCH Setup Resp. IE with Freq. Ind. | DHO Branch Addn. Resp. IE | Intra-BS DHO Branch Addn. Resp. IE | ACCH Setup Resp. IE | Note |
|---|---|---|---|---|
| | | | | |
| | | | | |
| | | | | |
| | M | | M | |
| | M | M | M | |
| | | | | |
| M | | | | |
| M | | | | |
| | M | | O | |
| | M | M | O | |
| | | | | |
| M | | | | |
| M | | | | |
| | M | | O | |
| | M | M | O | |
| | | | | |
| | | | | |
| M | | | | |
| M | | | M | |

FIG. 703

| Use of Link Facility Message \ Element Used in Link Facility Message from NW (BSC Func.) to BTS | Intra-BS DHO Branch Addn. Req. IE | Intra-BS DHO Branch Deln. Req. IE | Intra-BS HHO Initiation Req. IE |
|---|---|---|---|
| Freq. Repl. Without Freq. Ind. in the Same Sector | | | M |
| Freq. Repl. with Freq. Ind. in the Same Sector | | | M |
| Freq. Repl. Without Freq. Ind. in the Same Sector and the Sector Added for Intra-BS DHO | | | M |
| Freq. Repl. with Freq. Ind. in the Same Sector and the Sector Added for Intra-BS DHO | | | M |
| Intra-BS DHO Sector Addn. | M | | |
| Intra-BS DHO Sector Deln. | | M | |
| Inter-sector HHO Without Freq. Addn. | | | M |
| Inter-sector HHO with Freq. Addn. | | | M |
| Inter-sector HHO Without Freq. Addn. and Intra-BS DHO Sector Addn. | M | | M |
| Inter-sector HHO with Freq. Addn. and Intra-BS DHO Sector Addn. | M | | M |
| ACCH Setup | | | |
| ACCH Rel. | | | |
| Setup Completion Notification IE | | | |

A

CONTINUED FROM FIG. 703

A

| ACCH Setup Req. IE | ACCH Rel. Req. IE | Freq. Repl. Req. IE Without Freq. Ind. | Freq. Repl. Req. IE with Freq. Ind. |
|---|---|---|---|
| | | M | |
| | | | M |
| | | M | |
| | | | M |
| | | | |
| | | | |
| | | M | |
| | | | M |
| | | M | |
| | | | M |
| M | | | |
| | M | | |
| | | | |

FIG. 704

| Element Used in Link Facility Message from NW (BSC Func.) to BTS / Use of Link Facility Message | Setup Completion Notification IE | Note |
|---|---|---|
| Freq. Repl. Without Freq. Ind. in the Same Sector | | When Quality Is Deteriorated |
| Freq. Repl. with Freq. Ind. in the Same Sector | | When Freq. Repl. Req. by BTS Is Necessary |
| Freq. Repl. Without Freq. Ind. in the Same Sector and the Sector Added for Intra-BS DHO | | |
| Freq. Repl. with Freq. Ind. in the Same Sector and the Sector Added for Intra-BS DHO | | |
| Intra-BS DHO Sector Addn. | | |
| Intra-BS DHO Sector Deln | | |
| Inter-sector HHO Without Freq. Addn. | | |
| Inter-sector HHO with Freq. Addn. | | |
| Inter-sector HHO Without Freq. Addn. and Intra-BS DHO Sector Addn. | | |
| Inter-sector HHO with Freq. Addn. and Intra-BS DHO Sector Addn. | | |
| ACCH Setup | | |
| ACCH Rel. | | |
| Setup Completion Notification IE. | M | |

FIG. 705

| Element Used in Link Facility Message from BTS to NW (BSC Func.) / Use of Link Facility Message | Intra-BS DHO Branch Addn. Resp. IE | Intra-BS DHO Branch Deln. Resp. IE | Intra-BS HHO Initiation. Acpt. IE |
|---|---|---|---|
| Freq. Repl. Without Freq. Ind. in the Same Sector | | | M*1 |
| Freq. Repl. with Freq. Ind. in the Same Sector | | | M |
| Freq. Repl. Without Freq. Ind. in the Same Sector and the Sector Added for Intra-BS DHO | M | | |
| Freq. Repl. with Freq. Ind. in the Same Sector and the Sector Added for Intra-BS DHO | M | | |
| Intra-BS DHO Sector Addn. | M | | |
| Intra-BS DHO Sector Deln. | | M. | |
| Inter-sector HHO Without Freq. Addn. | | | M |
| Inter-sector HHO with Freq. Addn. | | | M |
| Inter-sector HHO Without Freq. Addn. and Intra-BS DHO Sector Addn. | M | | M |
| Inter-sector HHO with Freq. Addn. and Intra-BS DHO Sector Addn. | M | | M |
| ACCH Setup | | | |
| ACCH Rel. | | | |
| Freq. Repl. (Req. by BTS) | | | M*1 |
| Code Repl. | | | |

A

CONTINUED FROM FIG. 705

A

| ACCH Setup Resp. IE | ACCH Rel. Resp. IE | Freq. Repl. Resp. IE with Freq. Ind. | Freq. Repl. Req. IE with Freq. Ind. |
|---|---|---|---|
| | | | |
| | | M | |
| | | | |
| | | M | |
| | | | |
| | | | |
| | | | |
| | | M | |
| | | | |
| | | M | |
| M | | | |
| | M | | |
| | | M*2 | M*3 |
| | | | |

*1 When Activating Radio Resources and Radio Facilities
*2 After Synchronization
*3 When Freq. Repl. Req. by BTS Is Necessary

FIG. 706

| Element Used in Link Facility Message from BTS to NW (BSC Func.) / Use of Link Facility Message | Freq. Repl. Acpt. IE Without Freq. Ind. | Freq. Repl. Resp. IE Without Freq. Ind. | Code Repl. Req. IE | Note |
|---|---|---|---|---|
| Freq. Repl. Without Freq. Ind. in the Same Sector | M*1 | M*2 | | |
| Freq. Repl. with Freq. Ind. in the Same Sector | | | | |
| Freq. Repl. Without Freq. Ind. in the Same Sector and the Sector Added for Intra-BS DHO | M | M | | |
| Freq. Repl. with Freq. Ind. in the Same Sector and the Sector Added for Intra-BS DHO | | | | |
| Intra-BS DHO Sector Addn. | | | | |
| Intra-BS DHO Sector Deln. | | | | |
| Inter-sector HHO Without Freq. Addn. | M | M | | |
| Inter-sector HHO with Freq. Addn. | | | | |
| Inter-sector HHO Without Freq. Addn. and Intra-BS DHO Sector Addn. | M | M | | |
| Inter-sector HHO with Freq. Addn. and Intra-BS DHO Sector Addn. | | | | |
| ACCH Setup | | | | |
| ACCH Rel. | | | | |
| Freq. Repl. (Req. by BTS) | | | | |
| Code Repl. | | | M | |

*1 When Activating Radio Resources and Radio Facilities
*2 After Synchronization

FIG. 707

| Message | Reference Section |
| --- | --- |
| PAGING | 2.5.3.6.2.2.1 |

FIG. 708

Protocol Discriminator: BSM
Connection Identification: Control Signal Between BTS and NW (BSC Function)
Direction: TACF of NW (BSC Function) to BCFr of BTS

| Information Element | Reference Section | Type | Length FV (oct) | | Note |
|---|---|---|---|---|---|
| Protocol Discriminator | 2.5.3.6.3.2.1 | M | F | 1 | |
| Message Type | 2.5.3.6.3.2.2 | M | F | 1 | |
| PCHs Calculation Info. | 2.5.3.6.3.2.3 | M | F | 4 | |
| Area Number | 2.5.3.6.3.2.4 | M | F | 3 | Note 1 |
| Paged MS ID | 2.5.3.6.3.2.5 | M | V | ?-10 | Note 2 |
| Paging ID | 2.5.3.6.3.2.6 | M | F | 3 | |

FIG. 709

Message: Link Setup or Link Release
Direction: SACF and TACF of NW (BSC Function) to SCMF and BCFr of BTS

| Information Element | Reference Section | Type | Length FV (oct) | | Note |
|---|---|---|---|---|---|
| IE Identifier | | M | F | 1 | |
| Length | | M | F | 1 | |
| AAL Type and Link Identifier | | M | F | 4.5 | |

FIG. 710

Message: Link Setup
Direction: TACF of NW (BSC Function) to BCFr of BTS

| Information Element | Reference Section | Type | Length FV | Length (oct) | Note |
|---|---|---|---|---|---|
| IE Identifier | | M | F | 1 | |
| Length | | M | F | 1 | |
| Communication Quality | | M | F | 1 | |
| Downlink Xmsn Rate | | M | F | | |
| Uplink Xmsn Rater | | M | F | | |
| Sector Number | | M | F | 1 | |
| Information Transfer Capability | | M | F | | |
| Condition to Select Frequency Band | | M | F | 1 | |
| Frame Offset Group | | M | F | 1/2 | |
| Long Code Phase Difference Info. | | M | V | | |
| Initial Xmsn Pwr | | M | F | 1 | |
| Uplink Long Code Number | | M | F | 6 | |
| Uplink Short Code Type | | M | F | 1 | |
| Number (N) of Uplink Codes | | M | F | 1 | |
| 1st Uplink Short Code Number | | M | F | 2 | |
| • • • • • • • • • • • • • • • • | | | | | |
| n-th Uplink Short Code Number | | M | F | 2 | |

FIG. 711

Message: Link Setup
Direction: TACF of NW (BSC Function) to BCFr of BTS

| Information Element | Reference Section | Type | Length FV | (oct) | Note |
|---|---|---|---|---|---|
| IE Identifier | | M | F | 1 | |
| Length | | M | F | 1 | |
| Communication Quality | | M | F | 1 | |
| Downlink Xmsn Rate | | M | F | | |
| Uplink Xmsn Rate | | M | F | | |
| Sector Number | | M | F | 1 | |
| Information Transfer Capability | | M | F | | |
| Condition to Select Frequency Band | | M | F | 1 | |
| Frame Offset Group | | M | F | 1/2 | |
| Slot Offset Group | | M | F | 1/2 | |
| Long Code Phase Difference Info. | | M | V | | |
| Initial Xmsn Pwr | | M | F | 1 | |
| Uplink Long Code Number | | M | F | 6 | |
| Uplink Short Code Type | | M | F | 1 | |
| Number (N) of Uplink Codes | | M | F | 1 | |
| 1st Uplink Short Code Number | | M | F | 2 | |
| . . . . . . . . . . . . . . . . | | | | | |
| n-th Uplink Short Code Number | | M | F | 2 | |

FIG. 712

Message: Link Setup
Direction: TACF of NW (BSC Function) to BCFr of BTS

| Information Element | Reference Section | Type | Length FV | (oct) | Note |
|---|---|---|---|---|---|
| IE Identifier | | M | F | 1 | |
| Length | | M | F | 1 | |
| Communication Quality | | M | F | 1 | |
| Downlink Xmsn Rate | | M | F | | |
| Uplink Xmsn Rate | | M | F | | |
| Sector Number | | M | F | 1 | |
| Information Transfer Capability | | M | F | | |
| Frequency Band | | M | F | 1 | |
| Frame Offset Group | | M | F | 1/2 | |
| Slot Offset Group | | M | F | 1/2 | |
| Long Code Phase Difference Info. | | M | V | | |
| Initial Xmsn Pwr | | M | F | 1 | |
| Uplink Long Code Number | | M | F | 6 | |
| Uplink Short Code Type | | M | F | 1 | |
| Number (N) of Uplink Codes | | M | F | 1 | |
| 1st Uplink Short Code Number | | M | F | 2 | |
| • • • • • • • • • • • • • • • • | | | | | |
| n-th Uplink Short Code Number | | M | F | 2 | |

FIG. 713

Message: Link Setup
Direction: TACF of NW (BSC Function) to BCFr of BTS

| Information Element | Reference Section | Type | Length FV | (oct) | Note |
|---|---|---|---|---|---|
| IE Identifier | | M | F | 1 | |
| Length | | M | F | 1 | |
| Communication Quality | | M | F | 1 | |
| Downlink Xmsn Rate | | M | F | | |
| Uplink Xmsn Rate | | M | F | | |
| Sector Number | | M | F | 1 | |
| Information Transfer Capability | | M | F | | |
| Frequency Band | | M | F | 1 | |
| Frame Offset Group | | M | F | 1/2 | |
| Slot Offset Group | | M | F | 1/2 | |
| Long Code Phase Difference Info. | | M | V | | |
| Initial Xmsn Pwr | | M | F | 1 | |
| Uplink Long Code Number | | M | F | 6 | |
| Uplink Short Code Type | | M | F | 1 | |
| Number (N) of Uplink Codes | | M | F | 1 | |
| 1st Uplink Short Code Number | | M | F | 2 | |
| . . . . . . . . . . . . . . . . | | | | | |
| n-th Uplink Short Code Number | | M | F | 2 | |
| Downlink Short Code Type | | M | F | 1 | |
| Number (N) of Downlink Codes | | M | F | 1 | |

FIG. 714

Message: Link Setup or Link Facility from NW (BSC Function) to BTS
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| Sector Number | | M | F | 1 | |

FIG. 715

Message: Link Setup or Link Facility from NW (BSC Function) to BTS
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| AAL Type and Link Identifier for ACCH | | M | F | 4.5 | |
| Communication Quality for ACCH | | M | F | 1 | |
| Downlink Xmsn Rate for ACCH | | M | F | | |
| Uplink Xmsn Rate for ACCH | | M | F | | |

FIG. 716

Message: Link Setup Proceeding
Direction: BCFr of BTS to TACF of NW (BSC Function)

| Information Element | Reference Section | Type | Length FV | (oct) | Note |
|---|---|---|---|---|---|
| IE Identifier | | M | F | 1 | |
| Length | | M | F | 1 | |
| Frequency Band | | M | F | 1 | |
| Slot Offset Group | | O | F | 1/2 | Mandatory for the 1st Call Attempt and Acceptance |
| Downlink Short Code Type | | M | F | 1 | |
| Number (N) of Downlink Codes | | M | F | 1 | |
| 1st Downlink Short Code Number | | M | F | 2 | |
| • • • • • • • • • • • • • • • • | | | | | |
| n-th Downlink Short Code Number | | M | F | 2 | |
| Result | | M | F | 1 | |

FIG. 717

Message: Link Setup Proceeding
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Frequency Band | | M | F | 1 | |
| Downlink Short Code Type | | M | F | 1 | |
| Number (N) of Downlink Codes | | M | F | 1 | |
| 1st Downlink Short Code Number | | M | F | 2 | |
| • • • • • • • • • • • • • • • • | | | | | |
| n-th Downlink Short Code Number | | M | F | 2 | |
| Result | | M | F | 1 | |

FIG. 718

Message: Link Setup Proceeding
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Downlink Short Code Type | | M | F | 1 | |
| Number (N) of Downlink Codes | | M | F | 1 | |
| 1st Downlink Short Code Number | | M | F | 2 | |
| • • • • • • • • • • • • • • • • | | | | | |
| n-th Downlink Short Code Number | | M | F | 2 | |
| Result | | M | F | 1 | |

FIG. 719

Message: Link Setup Response
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| . . . . . . . . . . . . . . . . | | | | | |

FIG. 720

Message: Link Setup Response
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Result | | M | F | 1 | |

FIG. 721

Message: Link Setup Response
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Result | | M | F | 1 | |

FIG. 722

Message: Link Setup Response
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Number (N) of Downlink Codes | | M | F | 1 | |
| 1st Downlink Short Code Number | | M | F | 2 | |
| • • • • • • • • • • • • • • • • | | | | | |
| n-th Downlink Short Code Number | | M | F | 2 | |

FIG. 723

Message: Link Setup Response or Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Sector Number | | M | F | 1 | |
| Number (N) of Downlink Codes | | M | F | 1 | |
| 1st Downlink Short Code Number | | M | F | 2 | |
| • • • • • • • • • • • • • • • • | | | | | |
| n-th Downlink Short Code Number | | M | F | 2 | |
| Result | | M | F | 1 | |

FIG. 724

Message: Link Setup Response or Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Result | | M | F | 1 | |

FIG. 725

Message: Link Facility
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| Sector Number | | M | F | 1 | |

FIG. 726

Message: Link Facility
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| Sector Number | | M | F | 1 | |

FIG. 727

Message: Link Facility
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| Sector Number | | M | F | 1 | |

FIG. 728

Message: Link Facility
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| AAL Type and Link Identifier for ACCH | | M | F | 4.5 | |

FIG. 729

Message: Link Facility
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| Condition to Select Frequency Band | | M | F | 1 | |

FIG. 730

Message: Link Facility
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| Frequency Band | | M | F | 1 | |

FIG. 731

Message: Link Facility
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| Result | | M | F | 1 | |

FIG. 732

Message: Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Sector Number | | M | F | 1 | |
| Result | | M | F | 1 | |

FIG. 733

Message: Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Sector Number | | M | F | 1 | |
| Number (N) of Downlink Codes | | M | F | 1 | |
| 1st Downlink Short Code Number | | M | F | 2 | |
| • • • • • • • • • • • • • • • • | | | | | |
| n-th Downlink Short Code Number | | M | F | 2 | |
| Result | | M | F | 1 | |

FIG. 734

Message: Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Result | | M | F | 1 | |

FIG. 735

Message: Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Result | | M | F | 1 | |

FIG. 736

Message: Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Frequency Band | | M | F | 1 | |
| Number (N) of Downlink Codes | | M | F | 1 | |
| 1st Downlink Short Code Number | | M | F | 2 | |
| • • • | • • • | • • • | • • • | • • • | |
| n-th Downlink Short Code Number | | M | F | 2 | |
| Result | | M | F | 1 | |

FIG. 737

Message: Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Frequency Band | | M | F | 1 | |
| Result | | M | F | 1 | |

FIG. 738

Message: Link Facility
Direction: BCFr of BTS to TACF of NW (BSC Function)

| Information Element | Reference Section | Type | Length FV (oct) | | Note |
|---|---|---|---|---|---|
| IE Identifier | | M | F | 1 | |
| Length | | M | F | 1 | |
| Result | | M | F | 1 | |

FIG. 739

Message: Link Facility
Direction: BCFr of BTS to TACF of NW (BSC Function)

| Information Element | Reference Section | Type | Length FV | (oct) | Note |
|---|---|---|---|---|---|
| IE Identifier | | M | F | 1 | |
| Length | | M | F | 1 | |
| Frequency Band | | M | F | 1 | |
| Number (N) of Downlink Codes | | M | F | 1 | |
| 1st Old Downlink Short Code Number | | M | F | 2 | |
| 1st New Downlink Short Code Number | | M | F | 2 | |
| • • • • • • • • • • • • • • • • | | | | | |
| n-th Old Downlink Short Code Number | | M | F | 2 | |
| n-th New Downlink Short Code Number | | M | F | 2 | |

FIG. 740

Message: Link Release
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| Cause | | M | F | 1 | |

FIG. 741

Message: Link Release Complete
Direction: TACF and SACF of NW (BSC Function) to SCMF of BTS

| Information Element | Reference Section | Type | Length FV (oct) | | Note |
|---|---|---|---|---|---|
| IE Identifier | | M | F | 1 | |
| Length | | M | F | 1 | |
| Cause | | M | F | 1 | |

FIG. 742

Message: Link Release Complete
Direction: BCFr of BTS to TACF of NW (BSC Function)
SACF and TACF of NW (BSC Function) to SCMF of BTS

| Information Element | Reference Section | Type | Length FV (oct) | | Note |
|---|---|---|---|---|---|
| IE Identifier | | M | F | 1 | |
| Length | | M | F | 1 | |
| Cause | | M | F | 1 | |

FIG. 743

Message: Link Setup Requested
Direction: TACF of NW (BSC Function) to BCFr of BTS

| Information Element | Reference Section | Type | Length FV (oct) | | Note |
|---|---|---|---|---|---|
| IE Identifier | | M | F | 1 | |
| Length | | M | F | 1 | |
| AAL Type | | M | F | 1/2 | |
| Communication Quality | | M | F | 1 | |

FIG. 744

Message: Link Setup Requested
Direction: SCMF of BTS to SACF and TACF of MSCNW (BSC Function)

| Information Element | Reference Section | Type | Length FV (oct) | | Note |
|---|---|---|---|---|---|
| IE Identifier | | M | F | 1 | |
| Length | | M | F | 1 | |
| Location Identity | | M | F | 1 | |

FIG. 745

| |
|---|
| Protocol Discriminator (Octet 1)<br><br>Bit Pattern<br>8 7 6 5 4 3 2 1<br>1 0 0 0 0 1 1 0 BC (Bearer Control) |

FIG. 746

Protocol Discriminator (Octet 1)

Bit Pattern
4 3 2 1
0 0 0 0

LINK SETUP REQUESTED
LINK SETUP
LINK SETUP PROCEEDING
LINK SETUP RESPONSE
LINK RELEASE
LINK RELEASE COMPLETE
LINK FACILITY (FROM BSC FUNCTION OF NETWORK TO BS)
LINK FACILITY (FROM BS TO BSC FUNCTION OF NETWORK)

FIG. 747

Protocol Discriminator (Octet 1)

Bit Pattern

| 8 | 7 | 6 | 5 | 4 | 3 | 2 | 1 | |
|---|---|---|---|---|---|---|---|---|
| 1 | 0 | 0 | 0 | 1 | 0 | 0 | 0 | BSM (BS Management) |

FIG. 748

Message Type (Octet 1)

Bit Pattern

| 4 | 3 | 2 | 1 | |
|---|---|---|---|---|
| 0 | 0 | 0 | 0 | Escape Code for a Nationally Specific Message |
| 0 | 0 | 0 | 1 | Paging |

FIG. 749

Number Type (Octet 3)

Bit Pattern
8 TMUI
1 Intger IMUI

FIG. 750

Number Length (Octet 3)

Bit Pattern
3 2 1
1 0 0 Four Octets (Length of the TMUI)
1 1 1 Seven Octets (Maximum Length of the Integer IMUI )

CONTINUING FIG. 761
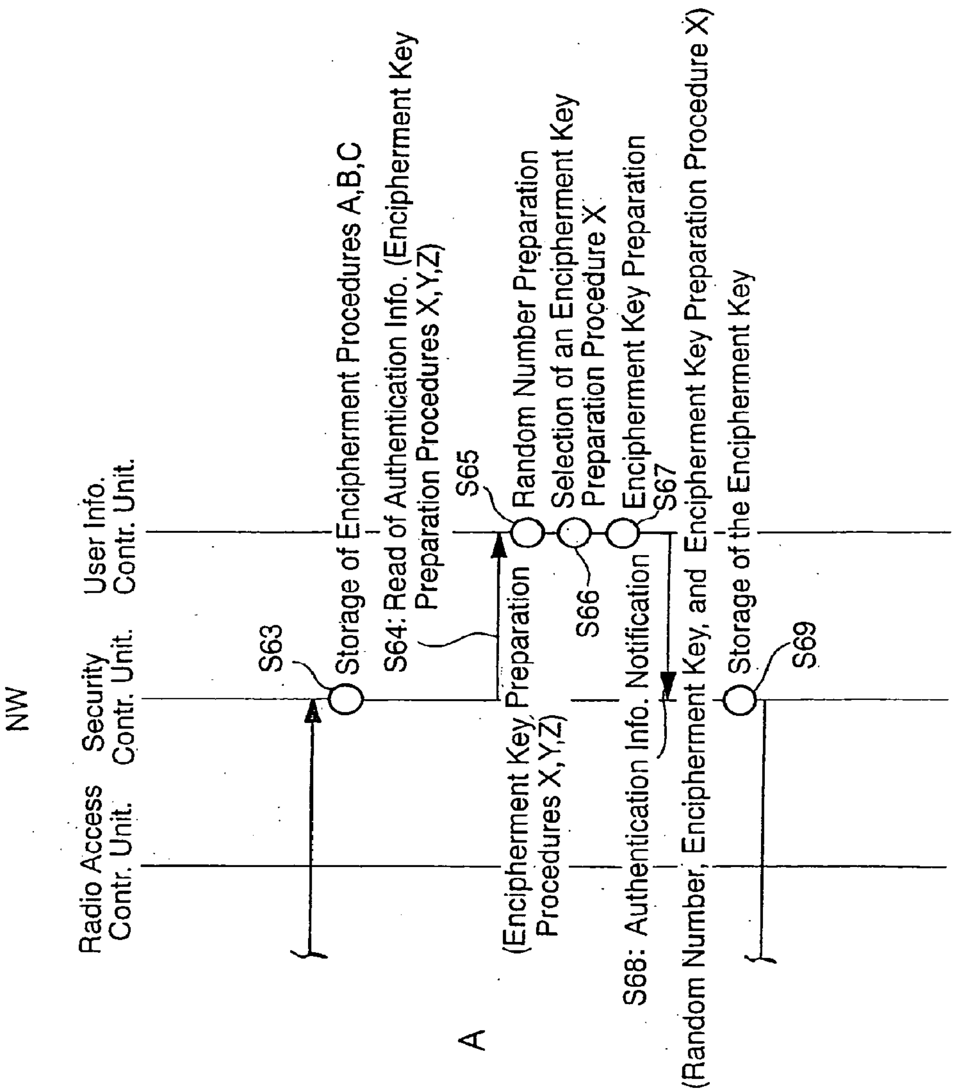

Procedure of Inter-cell Diversity Handover Branch Addition

Procedure of Inter-cell Diversity Handover Branch Addition

Simultaneous Execution of Access Link Setup And Inter-cell Diversity Handover Branch Addition Simultaneous Execution of Access Link Setup And Inter-cell Diversity Handover Simultaneous Execution of Branch Replacement And Diversity Handover Branch Addition Simultaneous Execution of Setup of Call 2 And Diversity Handover Branch Addition
(Equalizing the Branch Structure for call 1 with That for Call 1)

Single Call Communication
(Call 1)

(a)

Occurence of Call 2 During
Communication by Call 1

(b)

Simultaneous Execution of Setup of Call 2 And Diversity Handover Branch Addition (Changing the Branch Structure for Call1 And Equalizing the Branch Structure for Call 2 with That for Call 1)

BCFr2-1: Instance in BTS2 for Call 1

CONTINUED FROM FIG. 778
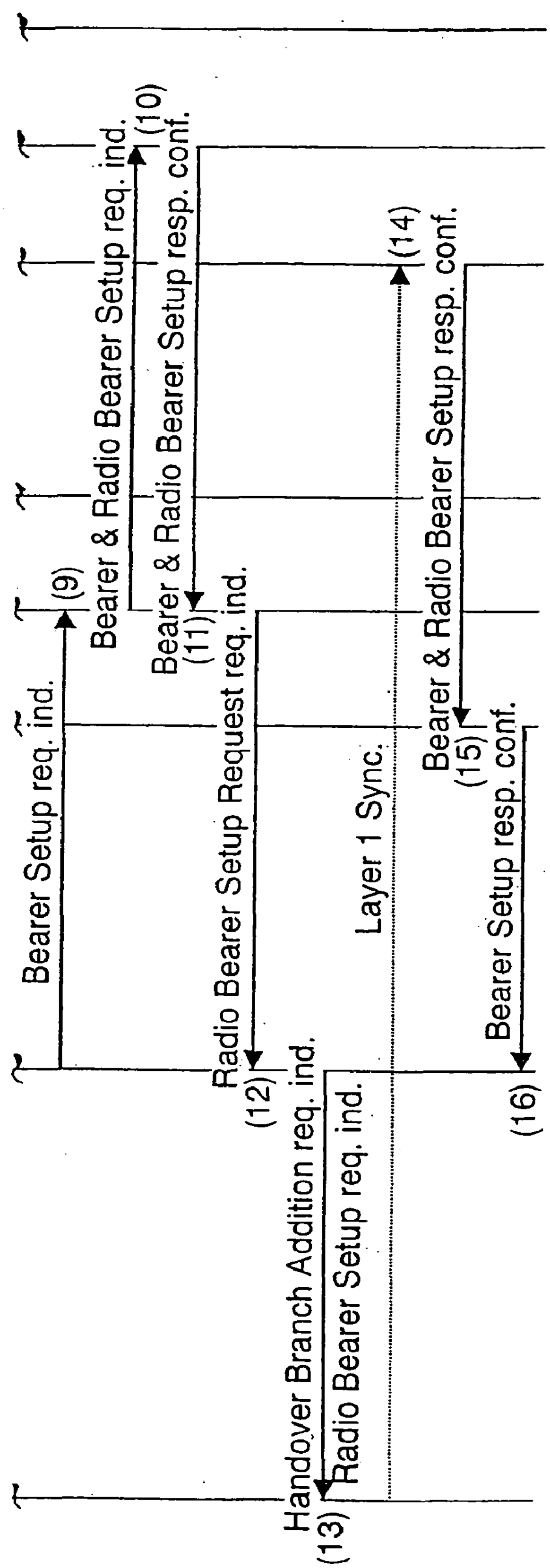

Simultaneous Execution of Setup of Call 2 And Branch Replacement Handover from BTS1 to BTS2 (Changing the Branch Structure for call 1 And Equalizing the Branch Structure for Call 2 with That for Call 1)

CONTINUED FROM FIG. 779
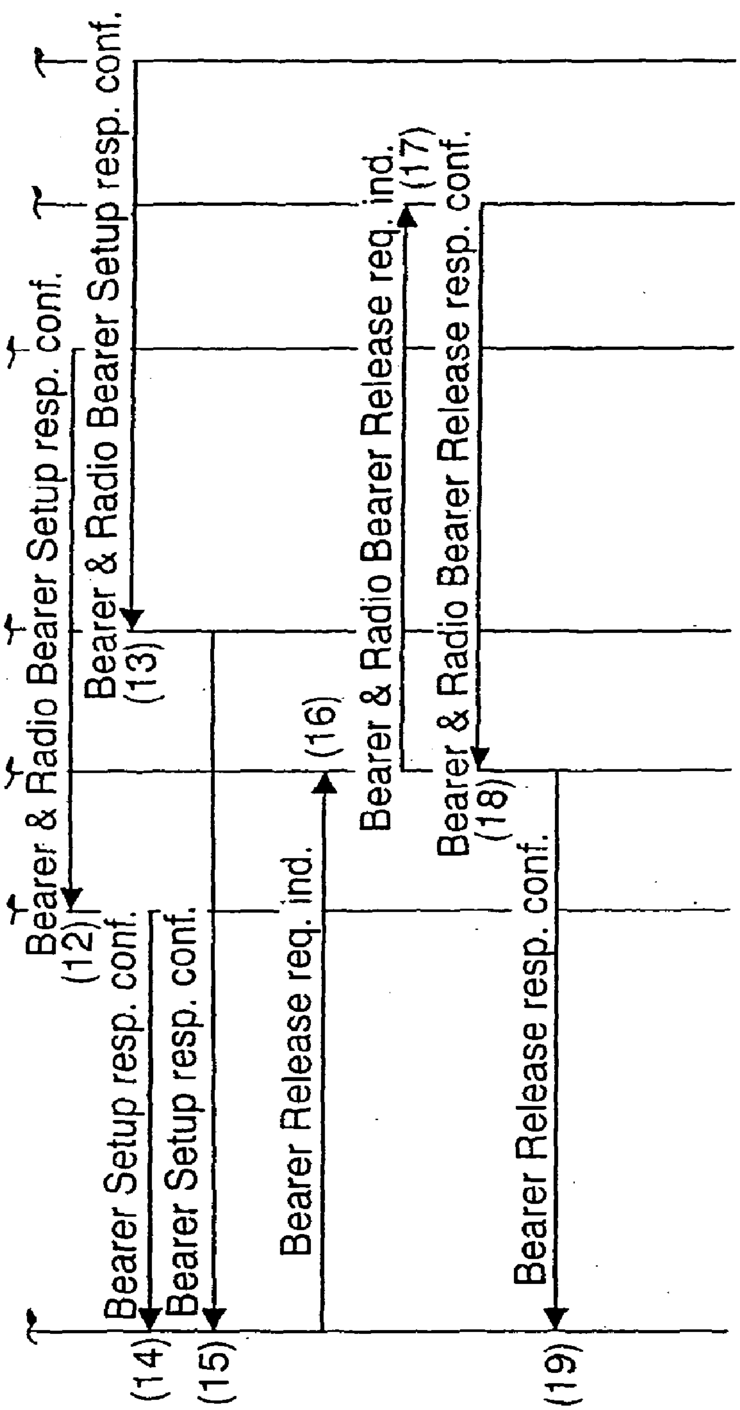

Simultaneous Plural Call Communication (Calls 1 and 2)

(a)

Addition of Branch Corresponding to BTS3

(b)

Simultaneous Plural Call Communication
(Calls 1 and 2)
(a)

Branch Replacement of f1 by f2
(b)

Procedure of DHO Branch Addition Corresponding to BTS3 for A Plurality of Calls 1 and 2

Procedure of Branch Replacement Handover from BTS1 to BTS3 for A Plurality of Calls 1 and 2

Procedure of Branch Replacement Handover from BTS1 to BTS3 And Continuance of Only Priority Call 1 from the State Where Simultaneous Plural Call Communication Using Calls 1 and 2

METHOD AND SYSTEM FOR MOBILE COMMUNICATIONS

CROSS REFERENCE TO RELATED APPLICATIONS

This is a division of U.S. application Ser. No. 09/403,431, filed Feb. 23, 2000, U.S. Pat. No. 7,236,787, published Jun. 26, 2007 which is a national stage of International application number PCT/JP98/01906, filed Apr. 24, 1998, and which also claims priority of Japanese application number Hei 9-123782, filed Apr. 24, 1997, all of which applications are incorporated herein by reference.

TECHNICAL FIELD

The present invention generally relates to a method and system for mobile communication and especially relates to a method and system adopted to transmission of various sorts of data in accordance with the development of multimedia.

BACKGROUND ART

Conventionally, portable telephones have been widely spread, and TDMA (time division multiple access) and FDMA (frequency division multiple access) were used for access methods for portable telephones. In these days, CDMA (code division multiple access) is being adopted instead of TDMA and FDMA because of various merits, such as high efficiency at usage of frequency band, facility of change of transmission rate, and preservation from eavesdropping.

However, CDMA according to prior art is prepared mainly for voice transmission and therefore is not suitable for data communication. In recent years, as the development of multimedia, not only voice but also various kinds of data that can be processed in computers and so on should be transmitted. Therefore, communication access between mobile stations and network should be suitable for transmitting various types of data in the near future.

DISCLOSURE OF INVENTION

It is therefore an object of the present invention to provide a method and system for mobile communication suitable for transmitting various types of data in accordance with the development of multimedia.

The present invention provides a method for mobile communication carried out among a plurality of mobile stations and a network, personal identifiers being previously and respectively assigned to the mobile stations, the method comprising the steps of: assigning temporary identifiers respectively to mobile stations which are communicable with the network; storing the personal identifiers and the temporary identifiers of the mobile stations by the network; storing the personal identifier and the temporary identifier of each mobile station by the mobile station; detecting by the network that one of the temporary identifiers stored in itself is different from that stored in the corresponding mobile station; and reassigning by the network another temporary identifier to the mobile station of which the former temporary identifier stored in the network is detected to be different from that stored in the corresponding mobile station.

By virtue of the above invention, it is possible to provide a method and system for CDMA wireless communication suitable for transmitting various types of data in accordance with the development of multimedia.

The present invention provides a base station controller communicating with a mobile station, which is able to conduct diversity reception, via a plurality of radio base stations under control of a switching center, the controller comprising enciphering means for enciphering transmitted information, which has been received from the switching center and should be transmitted to the mobile station, so as to generate enciphered transmitted information.

In addition, the present invention provides a base station controller communicating with a mobile station, which is able to conduct diversity reception, via a plurality of radio base stations under control of a switching center, the controller comprising: retransmission-control-information-adding means for adding retransmission control information to enciphered transmitted information which has been previously enciphered by the switching center; and transmitting means for transmitting the enciphered transmitted information with the retransmission control information to the radio base stations.

Additionally, the present invention provides a switching center communicating with a mobile station, which is able to conduct diversity reception, via a plurality of radio base stations and a base station controller, the switching center comprising enciphering means for enciphering transmitted information, which should be transmitted to the mobile station, so as to generate enciphered transmitted information.

In addition, the present invention provides a system for mobile communication including a mobile station which is able to conduct diversity reception, a plurality of radio base stations, and a base station controller communicating via the radio base stations under control of a switching center, the system being characterized in that the base station controller enciphers information, which should be transmitted from the side of the switching center to the side of the mobile station, before distributing the information to the radio base stations.

Additionally, the present invention provides a system for mobile communication including a mobile station which is able to conduct diversity reception, a plurality of radio base stations, and a base station controller communicating via the radio base stations under control of a switching center, the system being characterized in that the switching center enciphers information, which should be transmitted from the side of the switching center to the side of the mobile station, before distributing the information to the radio base stations.

In addition, the present invention provides a system for mobile communication including a mobile station which is able to conduct diversity reception, a plurality of radio base stations, and a base station controller communicating via the radio base stations under control of a switching center, the system comprising layer-2-enciphering-means for enciphering information that should be processed only in one or more layers which are the same as or higher than layer 2 of the OSI reference model.

Additionally, the present invention provides a system for mobile communication including a mobile station which is able to conduct diversity reception, a plurality of radio base stations, and a base station controller communicating via the radio base stations under control of a switching center, the system comprising: layer-3-enciphering-means for enciphering information that should be processed only in one or more layers which are the same as or higher than layer 3 of the OSI reference model; and layer-2-mutual-notifying-means for facilitating notification between layers of different devices corresponding to layer 2 of the OSI reference model about an onset of transmission of enciphered information.

Furthermore, the present invention provides a system for mobile communication including a mobile station which is able to conduct diversity reception, a plurality of radio base stations, and a base station controller communicating via the radio base stations under control of a switching center, the system comprising: layer-3-enciphering-means for enciphering information that should be processed only in one or more layers which are the same as or higher than layer 3 of the OSI reference model; retransmission-control-information-adding means, at a layer corresponding to layer 2 of the OSI reference model, for adding retransmission control information to information which has been previously enciphered by the layer-3-enciphering means; and transmitting means for transmitting the enciphered transmitted information with the retransmission control information to the radio base stations.

In addition, the present invention provides a method for controlling a base station controller communicating with a mobile station, which is able to conduct diversity reception, via a plurality of radio base stations under control of a switching center, the system for mobile communication comprising the step of enciphering transmitted information, which has been received from the switching center and should be transmitted to the mobile station, so as to generate enciphered transmitted information.

Furthermore, the present invention provides a method for controlling a base station controller communicating with a mobile station, which is able to conduct diversity reception, via a plurality of radio base stations under control of a switching center, the method comprising the steps of: adding retransmission control information to enciphered transmitted information which has been previously enciphered by the switching center; and transmitting the enciphered transmitted information with the retransmission control information to the radio base stations.

Furthermore, the present invention provides a method for controlling a switching center communicating with a mobile station, which is able to conduct diversity reception, via a plurality of radio base stations and a base station controller, the method comprising the step of enciphering transmitted information, which should be transmitted to the mobile station, so as to generate enciphered transmitted information.

Additionally, the present invention provides a method for controlling a system for mobile communication including a mobile station which is able to conduct diversity reception, a plurality of radio base stations, and a base station controller communicating via the radio base stations under control of a switching center, the method comprising the step of, at the base station controller, enciphering information, which should be transmitted from the side of the switching center to the side of the mobile station, before transmitting the information to the base station controller.

Furthermore, the present invention provides a method for controlling a system for mobile communication including a mobile station which is able to conduct diversity reception, a plurality of radio base stations, and a base station controller communicating via the radio base stations under control of a switching center, the method comprising the step of, at the switching center, enciphering information, which should be transmitted from the side of the switching center to the side of the mobile station, before distributing the information to the radio base stations.

In addition, the present invention provides a method for controlling a system for mobile communication including a mobile station which is able to conduct diversity reception, a plurality of radio base stations, and a base station controller communicating via the radio base stations under control of a switching center, the method comprising the step of enciphering information that should be processed only in one or more layers which are the same as or higher than layer 2 of the OSI reference model.

Additionally, the present invention provides a method for controlling a system for mobile communication including a mobile station which is able to conduct diversity reception, a plurality of radio base stations, and a base station controller communicating via the radio base stations under control of a switching center, the method comprising the steps of: enciphering information that should be processed only in one or more layers which are the same as or higher than layer 3 of the OSI reference model; and facilitating notification between layers of different devices corresponding to layer 2 of the OSI reference model about an onset of transmission of enciphered information.

The present invention provides a method for controlling a system for mobile communication including a mobile station which is able to conduct diversity reception, a plurality of radio base stations, and a base station controller communicating via the radio base stations under control of a switching center, the method comprising the steps of: enciphering information that should be processed only in one or more layers which are the same as or higher than layer 3 of the OSI reference model; adding retransmission control information at a layer corresponding to layer 2 of the OSI reference model to information which has been previously enciphered by the enciphering step; and transmitting the enciphered transmitted information with the retransmission control information to the radio base stations.

By virtue of the invention as described above, it is possible for a mobile station to conduct diversity reception although the mobile station cannot simultaneously process enciphered transmission signal and non-enciphered transmission signal.

In addition, the present invention provides a mobile station communicating with a network over the air, comprising decipherment-onset-time-setting-means for setting a time to start deciphering an enciphered reception signal dependently on a time to start enciphering a transmission signal in the network and independently of a time to start enciphering a transmission signal in the mobile station.

Furthermore, the present invention provides a mobile station further comprising deciphering means for deciphering an enciphered reception signal received from the network over the air, the decipherment-onset-time-setting-means including encipherment-onset-request-determining means for determining if a reception encipherment onset request is received from the network or not; and decipherment-instructing means for instructing the deciphering means to start deciphering in accordance with a time when the reception encipherment onset request has been received on the basis of the determination.

Additionally, the present invention provides a mobile station communicating with a network over the air, comprising encipherment-onset-time-setting-means for setting a time to start enciphering a transmission signal independently of a time to start deciphering an enciphered reception signal.

Furthermore, the present invention provides a mobile station further comprising transmission-encipherment-onset-requesting means for transmitting a transmission encipherment onset request to the network over the air; and enciphering means for enciphering the transmission signal so as to generate an enciphered transmission signal, the encipherment-onset-time-setting-means including encipherment-instructing means for instructing the enciphering means to start enciphering in accordance with a time when the transmission encipherment onset request has been transmitted.

In addition, the present invention provides a controller in a network communicating with a mobile station over the air, comprising decipherment-onset-time-setting-means for setting a time to start deciphering an enciphered reception signal dependently on a time to start enciphering a transmission signal in the mobile station and independently of a time to start enciphering a transmission signal in the controller.

Furthermore, the present invention provides a controller in a network further comprising deciphering means for deciphering an enciphered reception signal received from the mobile station over the air, the decipherment-onset-time-setting-means including encipherment-onset-request-determining means for determining if a reception encipherment onset request is received from the network or not; and decipherment-instructing means for instructing the deciphering means to start deciphering in accordance with a time when the reception encipherment onset request has been received on the basis of the determination.

The present invention provides a controller in a network communicating with a mobile station over the air, comprising encipherment-onset-time-setting-means for setting a time to start enciphering a transmission signal independently of a time to start deciphering an enciphered reception signal.

Furthermore, the present invention provides a controller in a network further comprising transmission-encipherment-onset-requesting means for transmitting a transmission encipherment onset request to the mobile station over the air; and enciphering means for enciphering the transmission signal so as to generate an enciphered transmission signal, the encipherment-onset-time-setting-means including encipherment-instructing means for instructing the enciphering means to start enciphering in accordance with a time when the transmission encipherment onset request has been transmitted.

Additionally, the present invention provides a system for mobile communication comprising a mobile station and a network communicating with each other over the air, the network comprising: encipherment-onset-requesting means for transmitting an encipherment onset request to the mobile station over the air; first-enciphered-transmission-signal-generating means for enciphering a first transmission signal which should be transmitted from the network to the mobile station after the transmission of the encipherment onset request, thereby generating a first enciphered transmission signal; first-enciphered-transmission-signal-transmitting means for transmitting the first enciphered transmission signal to the mobile station; response determining means for determining if an encipher onset response by the mobile station indicating that the encipherment onset request is acceptable is received or not; and first deciphering means for starting to decipher a second enciphered transmission signal from the mobile station on the basis of the determination of the response determining means when the mobile station accepts the encipherment onset request, the mobile station comprising: request determining means for determining if the encipherment onset request is received or not; encipherment-onset-responding means for transmitting the encipherment onset response on the basis of the determination of the request determining means when the encipherment onset request is accepted; second deciphering means for starting to decipher the first enciphered transmission signal from the network when the encipherment onset request is accepted; second-enciphered-transmission-signal-generating means for enciphering a second transmission signal which should be transmitted from the mobile station to the network after the transmission of the encipherment onset response, thereby generating a second enciphered transmission signal; and second-enciphered-transmission-signal-transmitting means for transmitting the second enciphered transmission signal to the network.

In addition, the present invention provides a method for controlling a mobile station communicating with a network over the air, comprising the step of setting a time to start deciphering an enciphered reception signal dependently on a time to start enciphering a transmission signal in the network and independently of a time to start enciphering a transmission signal in the mobile station.

Furthermore, the present invention provides a method for controlling a mobile station, further comprising the step of deciphering an enciphered reception signal received from the network over the air, the step of setting a time to start deciphering including the steps of determining if a reception encipherment onset request is received from the network or not; and instructing to start the deciphering step in accordance with a time when the reception encipherment onset request has been received on the basis of the determination.

Additionally, the present invention provides a method for controlling a mobile station communicating with a network over the air, comprising the step of setting a time to start enciphering a transmission signal independently of a time to start deciphering an enciphered reception signal.

Furthermore, the present invention provides a method for controlling a mobile station, further comprising the steps of transmitting a transmission encipherment onset request to the network over the air; and enciphering the transmission signal so as to generate an enciphered transmission signal, the step of setting a time to start enciphering including the step of instructing to start the enciphering step in accordance with a time when the transmission encipherment onset request has been transmitted.

In addition, the present invention provides a method for controlling a controller in a network communicating with a mobile station over the air, comprising the step of setting a time to start deciphering an enciphered reception signal dependently on a time to start enciphering a transmission signal in the mobile station and independently of a time to start enciphering a transmission signal in the controller.

Furthermore, the present invention provides a method for controlling a controller in a network further comprising the step of deciphering an enciphered reception signal received from the mobile station over the air, the step of setting a time to start deciphering including the steps of determining if a reception encipherment onset request is received from the network or not; and instructing to start the deciphering step in accordance with a time when the reception encipherment onset request has been received on the basis of the determination.

Additionally, the present invention provides a method for controlling a controller in a network communicating with a mobile station over the air, comprising the step of setting a time to start enciphering a transmission signal independently of a time to start deciphering an enciphered reception signal.

Furthermore, the present invention provides a method for controlling a controller in a network further comprising the steps of transmitting a transmission encipherment onset request to the mobile station over the air; and enciphering the transmission signal so as to generate an enciphered transmission signal, the step of setting a time to start enciphering including the step of instructing to start the enciphering step in accordance with a time when the transmission encipherment onset request has been transmitted.

In addition, the present invention provides a method for controlling a system for mobile communication in which a mobile station and a network communicate with each other over the air, the method comprising the steps of: transmitting an encipherment onset request from the network to the mobile station over the air; enciphering a first transmission signal which should be transmitted from the network to the mobile station after the transmission of the encipherment onset request, thereby generating a first enciphered transmission signal; transmitting the first enciphered transmission signal to the mobile station; determining if an encipher onset response by the mobile station indicating that the encipherment onset request is acceptable is received or not; starting to decipher a second enciphered transmission signal from the mobile station on the basis of the determination of the response determining step when the mobile station accepts the encipherment onset request; determining if the encipherment onset request is received or not; transmitting the encipherment onset response on the basis of the determination of the request determining step when the encipherment onset request is accepted; starting to decipher the first enciphered transmission signal from the network when the encipherment onset request is accepted; enciphering a second transmission signal which should be transmitted from the mobile station to the network after the transmission of the encipherment onset response, thereby generating a second enciphered transmission signal; and transmitting the second enciphered transmission signal to the network.

By virtue of the aspects of the invention as set forth, although the structural elements in the network are not provided with the function to read both of enciphered and non-enciphered signals simultaneously as simplifying the system, the timing of the encipherment onset is aligned in the base station and the network, so that the communication between the mobile station and the network can be facilitated surely and smoothly.

Additionally, the present invention provides a mobile station communicating with a network over the air, comprising encipherment-procedure-notifying-means for notifying the network about encipherment-procedure-specifying-information specifying one or more possible encipherment procedures of the mobile station.

Furthermore, the present invention provides a mobile station, wherein the encipherment-procedure-notifying-means further including enciphering-key-generation-procedure-notifying-means for notifying the network about enciphering-key-generation-procedure-specifying-information specifying one or more possible enciphering key generation procedures of the mobile station.

In addition, the present invention provides a mobile station communicating with a network over the air, comprising encipherment communication means for conducting an encipherment procedure corresponding to an encipherment request given by the network and for communicating with the network.

Furthermore, the present invention provides a mobile station, wherein the encipherment communication means includes enciphering-key-generating-means for generating an enciphering key corresponding to enciphering-key-generation-procedure-specifying-means specifying an enciphering key generation procedure notified by the network; and enciphering means for conducting an encipherment procedure using the enciphering key generated by the enciphering-key-generating-means.

Additionally, the present invention provides a controller in a network communicating with a mobile station over the air, comprising encipherment-procedure-selecting means for selecting an encipherment procedure for communication in accordance with encipherment-procedure-specifying-information, specifying one or more possible encipherment procedures of the mobile station, notified by the mobile station; and encipherment requesting means for notifying the mobile station about an encipherment request requesting the mobile station to conduct an encipherment using the encipherment procedure selected by the encipherment-procedure-selecting means.

Furthermore, the present invention provides a controller in a network further comprising enciphering-key-generation-procedure-selecting-means for selecting an enciphering key generation procedure in accordance with enciphering-key-generation-procedure-specifying-information, specifying one or more possible encipherment procedures of the mobile station, notified by the mobile station; and enciphering-key-notifying means for notifying the base station about the enciphering key generation procedure selected by the enciphering-key-generation-procedure-selecting-means.

By virtue of the aspects of the invention as set forth, it is possible to select the encipherment procedure adapted to the security level instructed by the mobile station or the mobile station user, thereby conducting the encipherment procedure. It is also possible select the encipherment procedure adapted to the multimedia service for transporting voice or moving picture from the mobile station or the network, thereby conducting the encipherment procedure. Furthermore, if it is necessary to enhance the security level for future extension of communication systems and for newly executed services, it will be possible to readily introduce a newly developed encipherment procedure. In addition, if a plurality of networks are provided with the ability for conducting one or more common encipherment procedures, it is possible to conduct one of the encipherment procedures when the mobile station roams across the service areas of the networks although all of the possible encipherment procedures are not commonly shared. Even in this case, it is also possible in each network to conduct one or more original encipherment procedures.

The present invention provides a method for controlling access links between a mobile station and a network, characterized in that a plurality of branches are established between the network and the mobile station upon a call attempt to or from the mobile station located at a position where the mobile station can communicate using diversity handover, the plurality of branches including a main branch and at least one auxiliary branch for additional use in order that the mobile station may communicate using diversity handover, thereby enabling the mobile station to commence the diversity handover using the plurality of branches.

In addition, the present invention provides a mobile station characterized in that it establishes a plurality of branches between the network and the mobile station upon the reception of a message from the network when no access link is established between the network and the mobile station, the message including a request for establishing the branches, thereby commencing the diversity handover using the plurality of branches.

Additionally, the present invention provides a base station controller characterized in that it establishes a plurality of branches between a network and a mobile station upon a call attempt to or from the mobile station at a location where the mobile station can communicate using diversity handover, the plurality of branches including a main branch and at least one auxiliary branch for additional use in order that the mobile station may communicate using diversity handover.

In addition, the present invention provides a base station controller characterized in that it transmits a message to both of a base station and a mobile station upon a call attempt to or from the mobile station at a location where the mobile station can communicate by means of intra-cell diversity handover wherein the mobile station and the base station communicate with each other using a plurality of branches, the message including a request for establishing a plurality of branches including a main branch and at least one auxiliary branch for additional use in order that the mobile station may communicate by means of intra-cell diversity handover.

Additionally, the present invention provides a base station controller characterized in that it transmits a message to a plurality of base stations upon a call attempt to or from the mobile station at a location where the mobile station can communicate by means of inter-cell diversity handover wherein the mobile station communicates with the plurality of base stations, the message including a request for establishing a plurality of branches between the mobile station and the corresponding base stations.

In addition, the present invention provides a base station characterized in that it establishes a plurality of branches between the base station and the mobile station according to an instruction from a base station controller upon a call attempt to or from the mobile station at a location where the mobile station can communicate by means of intra-cell diversity handover wherein the mobile station and the base station communicate with each other using the plurality of branches, the plurality of branches including a main branch and at least one auxiliary branch for additional use in order that the mobile station may communicate by means of intra-cell diversity handover, thereby enabling the mobile station to commence the intra-cell diversity handover.

By virtue of the aspects of the invention as set forth, when there is the mobile station at a location where it can communicate by means of intra-cell diversity handover wherein the mobile station and the base station communicate with each other using the plurality of branches, a series of procedures for establishing the main branch and for adding the auxiliary branch can be carried out upon the call attempt to or from the mobile station. Therefore, the number of signal flows can be reduced, so that it is possible to transit diversity handover condition efficiently and to decrease the interference to other radio access links.

The present invention provides a method for controlling a branch replacement characterized in that at least a current branch between a network and a mobile station are replaced with a plurality of branches necessary for communication using diversity handover when the branch replacement is necessary for the mobile station and when it is recognized that the mobile station can commence communicating using diversity handover if the branch replacement is carried out, thereby enabling the mobile station to commence diversity handover.

Additionally, the present invention provides a mobile station characterized in that it replaces at least a current branch between a network and the mobile station with a plurality of branches necessary for communication using diversity handover when a branch replacement is necessary for the mobile station and when the mobile station can commence communicating using the diversity handover branches if the branch replacement is carried out, thereby commencing diversity handover.

In addition, the present invention provides a base station controller characterized in that it replaces at least a current branch between a network and a mobile station with a plurality of branches necessary for communication using diversity handover when a branch replacement is necessary for the mobile station and when it is recognized that the mobile station can commence communicating using diversity handover if the branch replacement is carried out, thereby enabling the mobile station to commence diversity handover.

Additionally, the present invention provides a base station controller characterized in that it transmits a message to a base station and a mobile station when a branch replacement is necessary for the mobile station and when it is recognized that, if the branch replacement is carried out, the mobile station can commence communicating by means of intra-cell diversity handover wherein the mobile station and the base station communicate with each other using a plurality of branches, the message including an instruction to carry out the branch replacement and an instruction to add at least one auxiliary branch for additional use in order to communicate using diversity handover.

In addition, the present invention provides a base station controller characterized in that it transmits an instruction to a plurality of base stations and a message to a mobile station when a branch replacement is necessary for the mobile station and when it is recognized that the mobile station can commence communicating by means of inter-cell diversity handover if the branch replacement is carried out, the instruction instructing the base stations to set branches necessary for the diversity handover, the message including an instruction to carry out the branch replacement and an instruction to add at least one auxiliary branch for additional use in order to communicate using diversity handover.

Additionally, the present invention provides a base station characterized in that it replaces a branch for a mobile station and adds at least one auxiliary branch for the mobile station according to instructions of a message once the base station receives the message from a base station controller, the message including an instruction to carry out branch replacement and an instruction to add at least one auxiliary branch for additional use in order to communicate using diversity handover, thereby commencing the intra-cell diversity handover.

The aspects of the invention as set forth replaces the current branch or branches with the branches adapted to diversity handover upon a trigger for the branch replacement when it is recognized that the diversity handover can be commenced if the branch replacement is conducted. Therefore, the number of signal flows can be reduced, so that it is possible to transit diversity handover condition efficiently and to decrease the interference to other radio access links.

The present invention provides a branch controlling method for a mobile station capable of treating a plurality of calls simultaneously, characterized in that when a new call occurs while the mobile station treats an existent call, at least either of branch structures for both of the calls or at least either of communication frequency bands for both of the calls is controlled, so that the branch structures are the same as each other and the communication frequency bands are the same as each other.

In addition, the present invention provides a branch controlling method for a mobile station capable of treating a plurality of calls simultaneously, characterized in that when a new call occurs while the mobile station treats an existent call, a branch structure and a communication frequency band being the same as those for the existent call are assigned to the new call.

Additionally, the present invention provides a mobile station capable of treating a plurality of calls simultaneously, characterized in that when a new call occurs while the mobile station treats an existent call, the mobile station uses a branch structure being the same as that for the existent call to the new call and a communication frequency band being the same as that for the existent call to the new call in accordance with an instruction from a network.

In addition, the present invention provides a base station controller adapted for a mobile station capable of treating a plurality of calls simultaneously, characterized in that when a new call occurs while the mobile station treats an existent call, the base station controller controls at least either of branch structures for both of the calls or at least either of communication frequency bands for both of the calls, so that the branch structures are the same as each other and the communication frequency bands are the same as each other.

Additionally, the present invention provides a base station controller adapted for a mobile station capable of treating a plurality of calls simultaneously, characterized in that when a new call occurs while the mobile station treats an existent call, the base station controller assigns a branch structure and a communication frequency band being the same as that for the existent call to the new call.

By virtue of the aspects of the invention as set forth, it is possible to assigns the same branch structure and the same frequency band for the plurality of calls including the existent and new calls, so as to ease the control for both of the calls.

The present invention provides a branch controlling method adapted for a mobile station capable of treating a plurality of calls simultaneously, characterized in that when a new call occurs while the mobile station treats an existent call and when it is impossible to assign a branch structure or a communication frequency band, being the same as the branch structure or the communication frequency band for the existent call, to the new call, another branch structure or another communication frequency band which can continue both of the existent and new calls is selected, and the selected branch structure or communication frequency band is assigned to both of the existent and new calls.

The present invention provides a mobile station capable of treating a plurality of calls simultaneously, characterized in that when a new call occurs while the mobile station treats an existent call and when it is impossible to assign a branch structure or a communication frequency band, being the same as the branch structure or the communication frequency band for the existent call, to the new call, the mobile station assigns another branch structure or another communication frequency band, which can continue both of the existent and new calls, to both of the existent and new calls in accordance with an instruction from a network.

The present invention provides a base station controller adapted for a mobile station capable of treating a plurality of calls simultaneously, characterized in that when a new call occurs while the mobile station treats an existent call and when it is impossible to assign a branch structure or a communication frequency band, being the same as the branch structure or the communication frequency band for the existent call, to the new call, the base station controller selects another branch structure or another communication frequency band which can continue both of the existent and new calls, and assigns the selected branch structure or communication frequency band to both of the existent and new calls.

By virtue of the aspects of the invention as set forth, it is possible to assigns the same branch structure and the same frequency band for the plurality of calls including the existent and new calls, so as to ease the control for both of the calls.

The present invention provides a branch controlling method adapted for a mobile station, characterized in that when a trigger of handover occurs to the mobile station which is treating a plurality of calls, a branch structure or a communication frequency band which can continue all of the calls is selected, and the selected branch structure or communication frequency band are assigned to all of the calls commonly.

The present invention provides a mobile station capable of treating a plurality of calls simultaneously, characterized in that when a trigger of handover occurs to the mobile station which is treating a plurality of calls, the mobile station, according to an instruction from a network, alters a branch structure or a communication frequency band for all of the calls to a new branch structure or a new communication frequency band for all of the calls commonly.

The present invention provides a base station controller adapted for a mobile station, characterized in that when a trigger of handover occurs to the mobile station which is treating a plurality of calls, the base station controller selects a branch structure or a communication frequency band which can continue all of the calls, and assigns the selected branch structure or communication frequency band to all of the calls commonly.

By virtue of the aspects of the invention as set forth, it is possible to assigns the same branch structure and the same frequency band for the plurality of calls during communicating although handover is carried out, so as to ease the control for all of the calls.

The present invention provides a branch controlling method adapted for a mobile station, characterized in that when a trigger of handover occurs to the mobile station which is treating a plurality of calls and when there is not a branch structure which can continue all of the calls in relation to the mobile station or when there is not a communication frequency band which can continue all of the calls in relation to the mobile station, another branch structure or another communication frequency band which can continue a plurality of calls being high in priority among the calls are selected; the other call or calls are released; and the selected branch structure and communication frequency band are assigned to the priority calls.

In addition, the present invention provides a mobile station characterized in that when a trigger of handover occurs to the mobile station which is treating a plurality of calls and when there is not a branch structure which can continue all of the calls in relation to the mobile station or when there is not a communication frequency band which can continue all of the calls in relation to the mobile station, the mobile station, according to an instruction from a network, releases a call or calls being low in priority; and assigns a branch structure and a communication frequency band selected by the network to a plurality of calls being high in priority.

Additionally, the present invention provides a base station controller adapted for a mobile station, characterized in that when a trigger of handover occurs to the mobile station which is treating a plurality of calls and when there is not a branch structure which can continue all of the calls in relation to the mobile station or there is not a communication frequency band which can continue all of the calls in relation to the mobile station, the base station controller selects another branch structure and another communication frequency band which can continue a plurality of calls being high in priority among the calls; releases the other call or calls; and assigns the selected branch structure and communication frequency band to the priority calls.

By virtue of the aspects of the invention as set forth, it is possible to continue the calls with a high priority when the trigger for handover occurs although there are not a branch structure and a communication frequency band which can continue all of the calls. In other words, it is possible to continue at least the calls with a high priority although there are not ample wireless communication resources.

In addition, the present invention provides a method for establishing a control channel in a mobile communication system wherein a mobile station treats a plurality of calls using a plurality of sets of wireless communication resources, characterized in that a single control channel is established between the mobile station and a network for transporting control information therebetween in a manner that the control channel is formed by one of the sets of wireless communication resources which are being used for a plurality of calls by the mobile station.

By virtue of the invention, it is possible to reduce the number of hardware elements for transporting control information in comparison with the case that all of the plurality of calls utilize control channels, respectively. In addition, it is possible to exclude complicated control procedures, e.g., management of the transportation order of control information in the plurality of control channels.

Additionally, the present invention provides a method for controlling to replace a control channel, characterized in that while a mobile station treats a plurality of calls using a plurality of sets of wireless communication resources and transmits or receives control information to or from a network via a single control channel formed by one of the sets of the wireless communication resources, and when a first call using the control channel formed by one of the sets of the wireless communication resources should be released and a second call should be continued, the control channel, which is formed by one of the sets of the wireless communication resources and should be released, is replaced with a new control channel formed by another set of the wireless communication resources, thereby continuing to control the second call.

In addition, the present invention provides a base station controller, characterized in that while a mobile station treats a plurality of calls using a plurality of sets of wireless communication resources and transmits or receives control information to or from a network via a control channel formed by one of the sets of the wireless communication resources, and when a first call using the control channel formed by one of the sets of the wireless communication resources should be released and a second call should be continued, the controller replaces the control channel, which is formed by one of the sets of the wireless communication resources and should be released, to a new control channel formed by another set of the wireless communication resources, thereby continuing to control the second call.

By virtue of the aspects of the invention as set forth, while a mobile station transmits or receives control information with respect to a plurality of calls via a common control channel, and when a first call using the control channel formed by one of the sets of the wireless communication resources should be released and a second call should be continued by means of another set of the wireless communication resources, the control channel is replaced. Accordingly, after the replacement, by means of the new control channel, it is possible to continue the transportation of control signal for the second call.

The present invention provides a method for determining a radio zone and an uplink transmission power, characterized in that each of base stations transmits broadcast information indicating a perch channel transmission power level and an uplink interference level via a corresponding perch channel; and a mobile station receives the broadcast information from near base stations around the mobile station;

detects respective reception levels of the perch channels for the near base stations;

calculates respective path losses between the mobile station and respective near base stations on the basis of the respective reception levels and the respective perch channel transmission power levels within the broadcast information;

calculates respective necessary uplink transmission power levels between the mobile station and respective near base stations on the basis of the calculated respective path losses, the respective uplink interference levels within the broadcast information, and required signal-to-interference ratios involved in reception by the near base stations;

selects a radio zone in which the necessary uplink transmission power level is minimum among the respective necessary uplink transmission power levels, the base station of the selected radio zone being ready for communication with the mobile station or being able to commence communication with the mobile station after handover; and controls an uplink transmission power in the selected radio zone based on the necessary uplink transmission power level of the selected radio zone.

Additionally, the present invention provides a base station comprising means for transmitting broadcast information indicating a perch channel transmission power level and an uplink interference level via a perch channel.

In addition, the present invention provides a mobile station characterized in that it receives broadcast information from near base stations around the mobile station via respective perch channels, the broadcast information from each of the near base stations indicating a perch channel transmission power level and an uplink interference level;

detects respective reception levels of the perch channels for the near base stations;

calculates respective path losses between the mobile station and respective near base stations on the basis of the respective reception levels and the respective perch channel transmission power levels within the broadcast information;

calculates respective necessary uplink transmission power levels between the mobile station and respective near base stations on the basis of the calculated respective path losses, the respective uplink interference levels within the broadcast information, and required signal-to-interference ratios involved in reception by the near base stations;

selects a radio zone of which the necessary uplink transmission power level is minimum among the respective necessary uplink transmission power levels, the base station of the selected radio zone being ready for communication with the mobile station or being able to commence communication with the mobile station after handover; and controls an uplink transmission power in the selected radio zone based on the necessary uplink transmission power level of the selected radio zone.

By virtue of the aspects of the invention as set forth, although perch channel transmission power levels for respective base stations are different from each other or one another, it is possible to optimize the uplink transmission power of the mobile station.

The present invention provides a handover controlling method for additionally establishing a handover branch between a mobile station and a network, characterized in that a procedure for additional establishment of a branch is completed with a state transition to which the mobile station can commence communicating without waiting for a confirmation of synchronization for all branches.

The present invention provides a handover controlling method further characterized in that the procedure for additional branch establishment is completed with confirmation of synchronization for one branch among the branches established for the mobile station.

Additionally, the present invention provides a mobile station characterized in that if the mobile station has received a request from a network to establish a new additional branch between the network and the mobile station, the mobile station establishes the new branch and then starts diversity reception upon reception of a signal through the new branch.

In addition, the present invention provides a base station characterized in that if the base station has received a request from a base station controller to establish a new additional branch between a mobile station and the base station for carrying out intra-cell diversity handover, the base station additionally establishes the new branch and then starts intra-cell diversity reception upon reception of a signal through the new branch.

Additionally, the present invention provides a base station characterized in that if the base station has received a request from a base station controller to establish a new additional branch between a mobile station and the base station for carrying out inter-cell diversity handover, the base station establishes the new branch and then starts sending the received signals to the base station controller that executes inter-cell diversity reception upon reception of a signal through the new branch.

In addition, the present invention provides a base station controller characterized in that when the base station controller establishes a new additional branch between a mobile station and a network, the base station controller provides a request for establishing the new branch and then completes a procedure for additional establishment of the new branch without waiting for a confirmation of synchronization for all branches between the mobile station and the network.

Furthermore, the present invention provides a base station controller further characterized in that it provides the request for establishing the new branch being necessary for inter-cell diversity handover, and then starts inter-cell diversity reception upon reception of signals through the branches being necessary for inter-cell diversity handover.

By virtue of the aspects of the invention as set forth, since the procedure for additional establishment of the new branch is completed when the mobile station can communicate, the additional establishment procedure can be ended in a short time period.

The present invention provides a radio mobile communication system wherein a plurality of channels can be established on a single carrier frequency by code division multiplex access, characterized in that the system comprises code-resource-assigning means for assigning at least a part of an assignable code resource to one of the channels in accordance with a transmission rate necessary for the corresponding channel, the part corresponding to a certain bandwidth corresponding to the transmission rate.

Furthermore, the present invention provides a radio mobile communication system further comprising channel-assigning means for assigning one of the channels, to which a part of the assignable code resource is assigned, to a mobile station in accordance with a transmission rate necessary for the mobile station.

Additionally, the present invention provides a radio mobile communication system wherein a plurality of channels can be established on a single carrier frequency by code division multiplex access, characterized in that the system comprises a plurality of assignable code resources, each of code resources corresponding to a certain bandwidth and being independent of the other code resources; and reassigning means for reassigning a part of an assignable code resource to one of the channels to which a part of another assignable code resource is already assigned if there is not an unused code resource corresponding to a bandwidth suitable for a necessary transmission rate when assigning an unused assignable code resource to one of the channels in accordance with the necessary transmission rate.

Additionally, the present invention provides a radio mobile communication system further comprising unused-code-resource determining means for determining if there is an unused code resource corresponding to a bandwidth suitable for a necessary transmission rate or not when assigning an unused assignable code resource to one of the channels in accordance with the necessary transmission rate necessary.

Furthermore, the present invention provides a radio mobile communication system according to claim 91, wherein at least one standard code resource corresponding to a predetermined bandwidth is preselected and the system comprises assignment-possibility-determining means for determining at predetermined moments if there is at least one unused standard code resource or not, the reassigning means reassigning a part of an assignable code resource to one of the channels to which a part of another assignable code resource is already assigned until an unused standard code resource is reserved if the determination result by the assignment-possibility-determining means has been negative.

In addition, the present invention provides a radio base station for which a plurality of channels can be established on a single carrier frequency by code division multiplex access, characterized in that it comprises code-resource-assignment-possibility-determining means for determining whether or not it is possible to assign at least a part of an assignable code resource to one of channels in accordance with a transmission rate necessary for the corresponding channel, the part corresponding to a certain bandwidth corresponding to the transmission rate.

The present invention provides a base station controller further comprising channel-assigning means for assigning a channel, to which a part of assignable code resource is assigned, to a mobile station in accordance with a transmission rate necessary for the mobile station.

Additionally, the present invention provides a method for controlling a radio mobile communication system wherein a plurality of channels can be established on a single carrier frequency by code division multiplex access, characterized in that the method comprises code-resource-assigning step for assigning at least a part of an assignable code resource to one of the channels in accordance with a transmission rate necessary for the corresponding channel, the part corresponding to a certain bandwidth corresponding to the transmission rate.

In addition, the present invention provides a method for controlling a radio mobile communication system including a plurality of assignable code resources, each of code resources corresponding to a certain bandwidth and being independent of the other code resources, a plurality of channels being capable of being established on a single carrier frequency by code division multiplex access, characterized in that in order to assign an unused assignable code resource to one of the channels in accordance with a necessary transmission rate, the method comprises the steps of determining whether or not there is an unused code resource having a code resource length in accordance with the necessary transmission rate; and reassigning a part of an assignable code resource to one of the channels to which a part of another assignable code resource is already assigned if the determination indicates that there is not an unused code resource having a bandwidth suitable for the necessary transmission rate.

Additionally, the present invention provides a method for controlling radio base station for which a plurality of channels can be established on a single carrier frequency by code division multiplex access, characterized in that it comprises a code-resource-assignment-possibility-determining step for determining whether or not it is possible to assign at least a part of an assignable code resource to one of channels in accordance with a transmission rate necessary for the corresponding channel, the part corresponding to a certain bandwidth corresponding to the transmission rate.

In addition, the present invention provides a method for controlling a radio base station comprising a channel-assigning step for assigning a channel, to which a part of an assignable code resource is assigned to a mobile station in accordance with a transmission rate necessary for the mobile station.

By virtue of the aspects of the invention as set forth, it is possible to minimize the number of reassignments or rearrangements of code resources for channels, and call generations do not involve the rearrangement of code resource. Therefore, it is possible to reduce connection time delay.

BRIEF DESCRIPTION OF DRAWINGS

FIG. 35 is a flow chart showing handover processes in general.

FIG. 75 is a diagram representing the format of a STAT PDU.

FIG. 76 is a diagram representing the format of a USTAT PDU.

Figure 86:
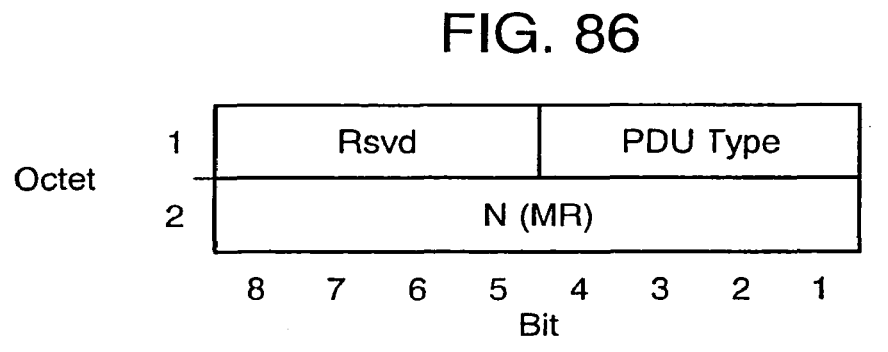

FIG. 86 is a diagram representing the format of an ERAK PDU.

FIG. 96 represents the basic format of RBC entity message of the invented system.

FIG. 98 is a diagram representing a common structure of CC (call/connection control) entity protocol messages.

FIG. 99 is a diagram representing a protocol discriminator of the CC entity protocol messages.

FIG. 100 is a diagram representing a call reference of the CC entity protocol messages.

FIG. 101 is a diagram representing a dummy call reference of the CC entity protocol messages.

FIG. 102 is a diagram representing the format of a message type identifier of each CC entity message.

FIGS. 103 and 104 are diagrams respectively representing the formats of variable length information elements according to FPLMTS.

FIG. 105 is a diagram representing the coding format of a broadband locking shift information element.

FIG. 106 is a diagram representing the coding format of a broadband non-locking shift information element.

FIGS. 107 through 111 form a diagram representing the coding format of an AAL parameter information element.

FIG. 112 is a diagram representing the format of an ATM traffic descriptor information element.

FIG. 113 is a diagram representing the format of a broadband bearer capability information element.

FIG. 114 is a diagram representing the format of a broadband high layer information element.

FIGS. 115 and 116 form a diagram representing the format of a broadband low layer information element.

FIG. 117 is a diagram representing the format of a called party number information element.

FIG. 118 is a diagram representing the format of a called party sub-address information element.

FIG. 119 is a diagram representing the format of a calling party number information element.

FIG. 120 is a diagram representing the format of a calling party sub-address information element.

FIG. 121 is a diagram representing the format of a connection identifier information element.

FIG. 122 is a diagram representing the format of an end-to-end transit delay information element.

FIG. 123 is a diagram representing the format of a QOS (quality of service) parameter information element.

FIG. 124 is a diagram representing the format of a broadband repeat indicator information element.

FIG. 125 is a diagram representing the format of a broadband sending complete information element.

FIG. 126 is a diagram representing the format of a transit network selection information element.

FIG. 127 is a diagram representing the format of a notification indicator information element.

FIG. 128 is a diagram representing the format of an OAM traffic descriptor information element.

FIG. 129 is a diagram representing the format of a narrowband bearer capability information element.

FIG. 130 is a diagram representing the format of a narrowband high layer compatibility information element.

FIG. 131 is a diagram representing the format of a narrowband low layer compatibility information element.

FIG. 132 is a diagram representing the format of a progress indicator information element.

FIG. 133 is a diagram representing the format of a TMUI information element.

FIG. 134 is a diagram representing the format of a TMUI assignment source ID.

FIG. 135 is a diagram representing the format of an IMUI.

FIG. 136 is a diagram representing the format of an execution authentication type.

FIG. 137 is a diagram representing the format of an authentication random pattern.

FIG. 138 is a diagram representing the format of an authentication ciphering pattern.

FIG. 139 is a diagram representing the format of an execution ciphering type.

FIG. 140 is a diagram representing the format of a TC information.

FIG. 141 is a diagram representing the format of a message type identifier of the RBC entity message.

FIG. 142 is a diagram representing the format of an information element identifier.

FIG. 143 is a diagram representing the format of a radio bearer setup message specific parameter.

FIG. 144 is a diagram representing the format of a radio bearer release message specific parameter.

FIG. 145 is a diagram representing the format of a radio bearer release complete message specific parameter.

FIG. 146 is a diagram representing the format of a handover command message specific parameter.

FIG. 147 is a diagram representing the format of a handover response message specific parameter.

FIGS. 148 to 151 form a diagram representing the format of a radio bearer setup information.

FIGS. 152 through 154 form a diagram representing the format of a DHO (diversity handover) branch addition information element.

FIG. 155 is a diagram representing the format of a DHO (diversity handover) branch deletion information element.

FIG. 156 is a diagram representing the format of an ACCH replacement information element.

FIGS. 157 through 159 form a diagram representing the format of a branch replacement information element.

FIGS. 160 through 163 form a diagram representing the format of a user rate replacement information element.

FIGS. 164 and 165 form a diagram representing the format of a code replacement information element.

Figure 166:
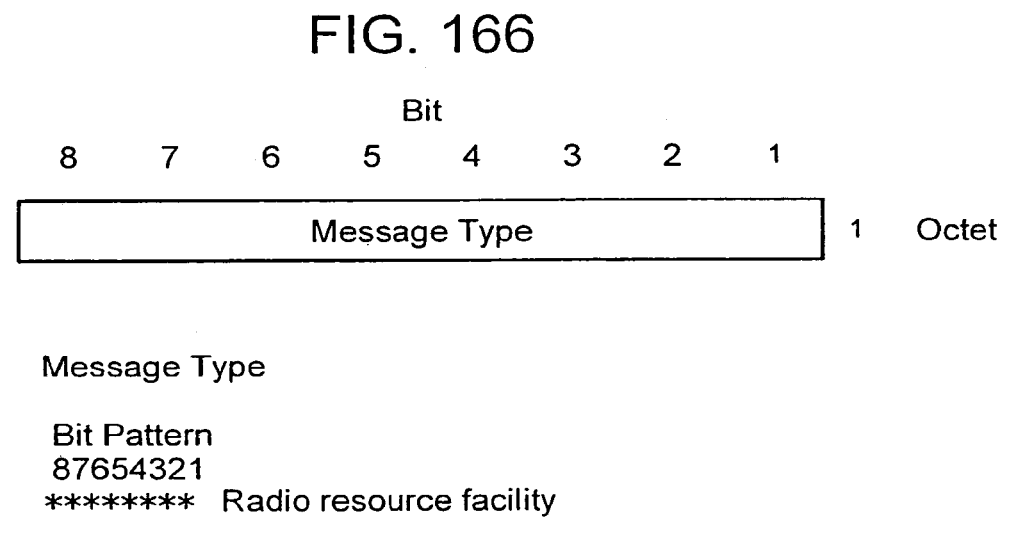

FIG. 166 is a diagram representing the format of a message type identifier in RRC entity messages.

FIG. 167 is a diagram representing the format of a facility information element.

FIGS. 168 and 169 form a diagram representing the format of an ROSE PDU.

Figure 170:
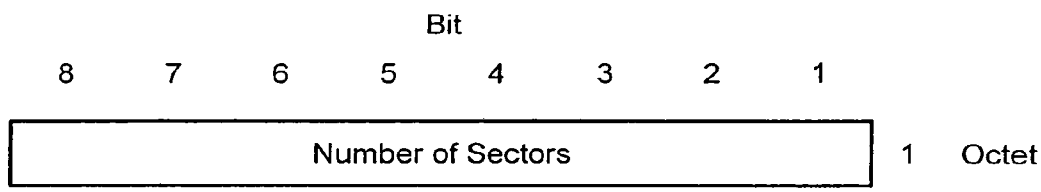

FIG. 170 is a diagram representing the common format of parameters of number of visited candidate sectors, number of in-use visited sectors, number of candidate sectors to be added at DHO, number of sectors to be deleted at DHO, and candidate sectors for HHO.

Figure 171:
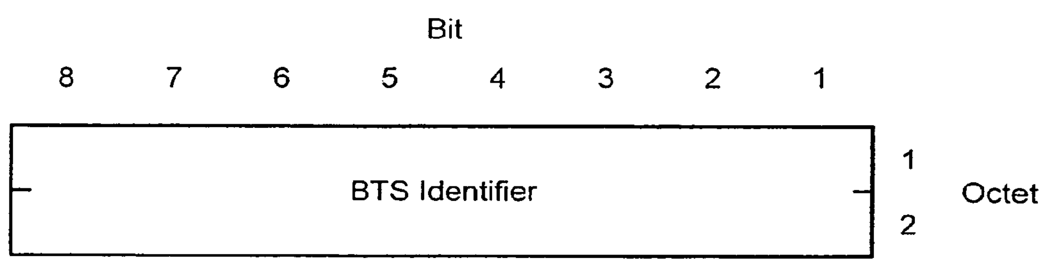

FIG. 171 is a diagram representing the format of a BTS number parameter.

FIG. 172 is a diagram representing the format of a sector number parameter.

FIG. 173 is a diagram representing the format of a perch channel reception SIR parameter.

FIG. 174 is a diagram representing the format of a perch channel transmission power parameter.

FIG. 175 is a diagram representing the format of a long code phase difference parameter.

FIG. 176 is a diagram representing the format of a parameter of the number of RBC IDs.

FIG. 177 is a diagram representing the format of a parameter of the RBC ID.

FIG. 178 is a diagram representing the format of a parameter of the necessary SIR.

FIG. 179 is a diagram representing the format of a parameter of FER measurement.

FIG. 180 is a diagram representing the format of a TAC entity message.

FIG. 181 is a diagram representing the format of a protocol discriminator.

FIG. 182 is a diagram representing the format of a message type identifier.

FIG. 183 is a diagram representing the format of a terminal association setup message specific parameter.

FIG. 184 is a diagram representing the format of a paging response message specific parameter.

FIG. 185 is a diagram representing the format of a terminal association release message specific parameter.

FIG. 186 is a diagram representing the format of a cause information element.

FIG. 187 is a diagram representing the format of a mobile station type information element.

FIG. 188 is a diagram representing the format of a paged MS ID information element.

Figure 189:
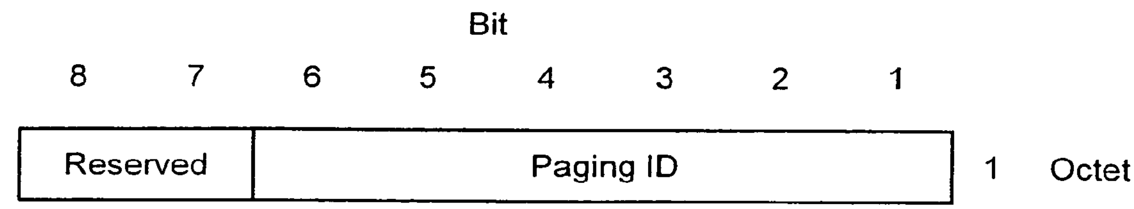

FIG. 189 is a diagram representing the format of a paging ID information element.

Figure 190:
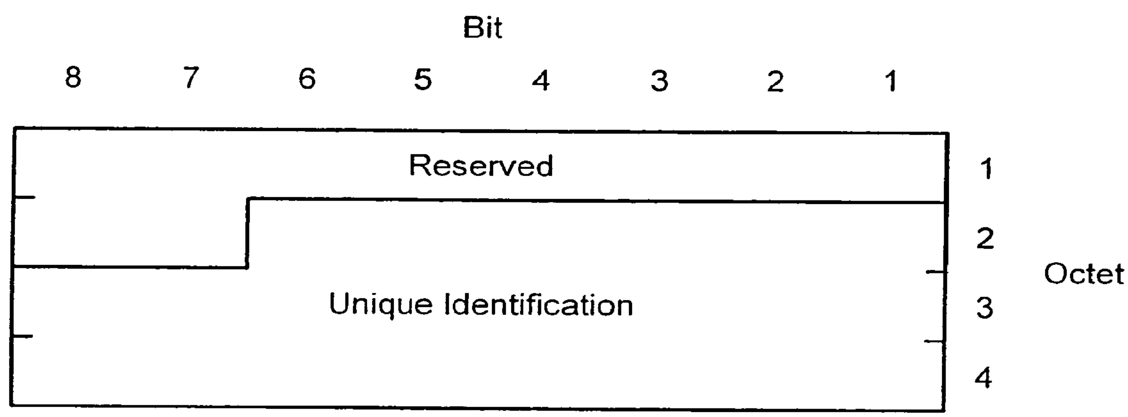

FIG. 190 is a diagram representing the format of a TMUI information element.

Figure 191:
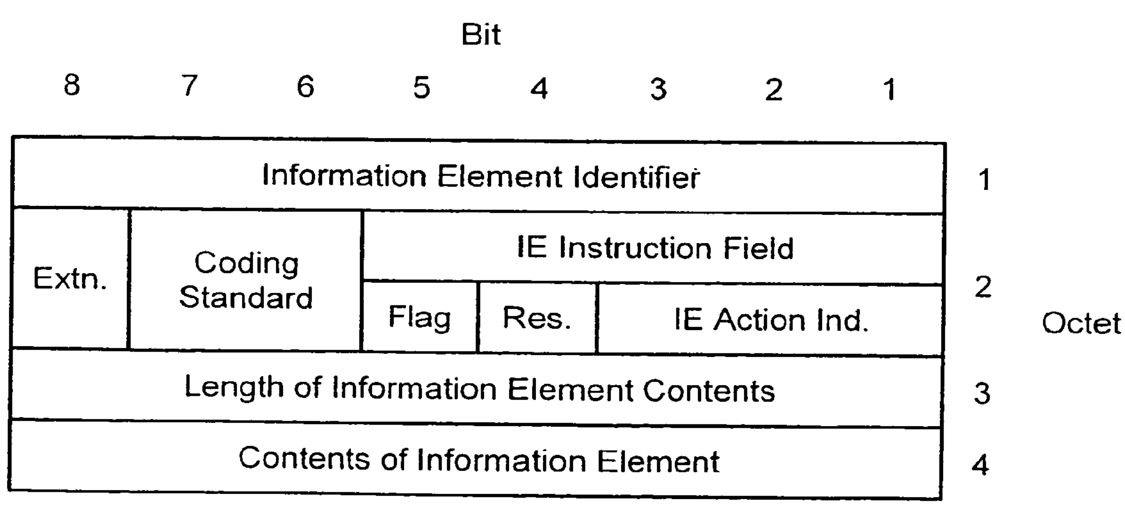

FIG. 191 is a diagram representing the format of an extensional information element for TAC entity messages.

FIG. 192 is a diagram representing the format of a message type information element.

FIG. 193 is a diagram representing the format of a length information element.

FIG. 194 is a diagram representing the format of a perch channel reception SIR information element.

FIG. 195 is a diagram representing the format of a short code number information element.

FIG. 196 is a diagram representing the format of a frame offset group information element.

FIG. 197 is a diagram representing the format of a slot offset group information element.

FIG. 198 is a diagram representing the format of a network number group information element.

FIG. 199 is a diagram representing the format of a network version information element.

FIG. 200 is a diagram representing the format of a mobile station common parameter version information element.

FIG. 201 is a diagram representing the format of a BTS number information element.

FIG. 202 is a diagram representing the format of a sector number information element.

FIG. 203 is a diagram representing the format of an information element indicating the number (N) of registration areas overlapped in one radio zone.

FIG. 204 is a diagram representing the format of an area number information element.

FIG. 205 is a diagram representing the format of an information element indicating the calibrated power level necessary for reception at the base station.

FIG. 206 is a diagram representing the format of an information element indicating the calibrated power level necessary for reception at the base station.

FIG. 207 is a diagram representing the format of an information element indicating the number (M) of perch channel LC for determination of visited zone.

FIG. 208 is a diagram representing the format of an information element indicating the number (K) of frequency bands used by base station.

FIG. 209 is a diagram representing the format of a frequency band information element.

Figure 210:
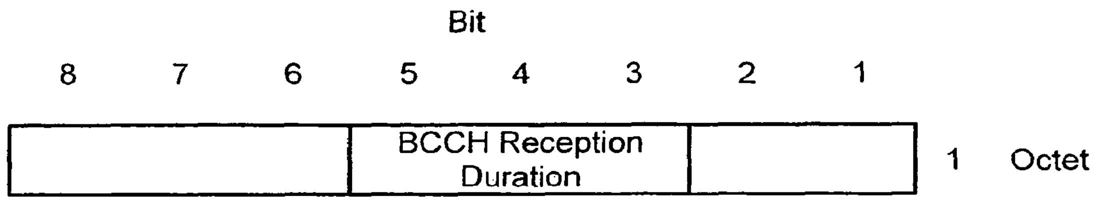

FIG. 210 is a diagram representing the format of a BCCH reception duration information element.

Figure 211:
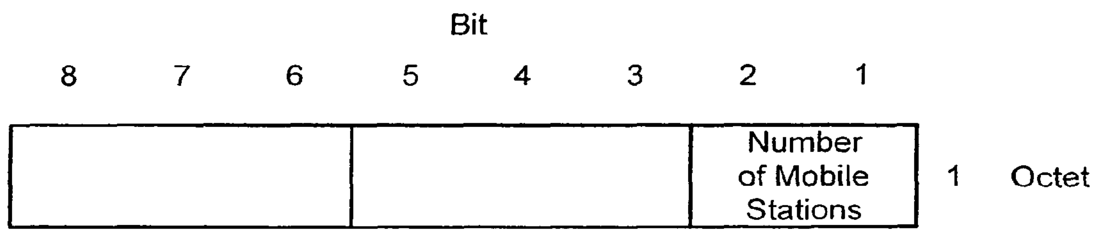

FIG. 211 is a diagram representing the format of an information element indicating the number of paged mobile stations.

Figure 212:
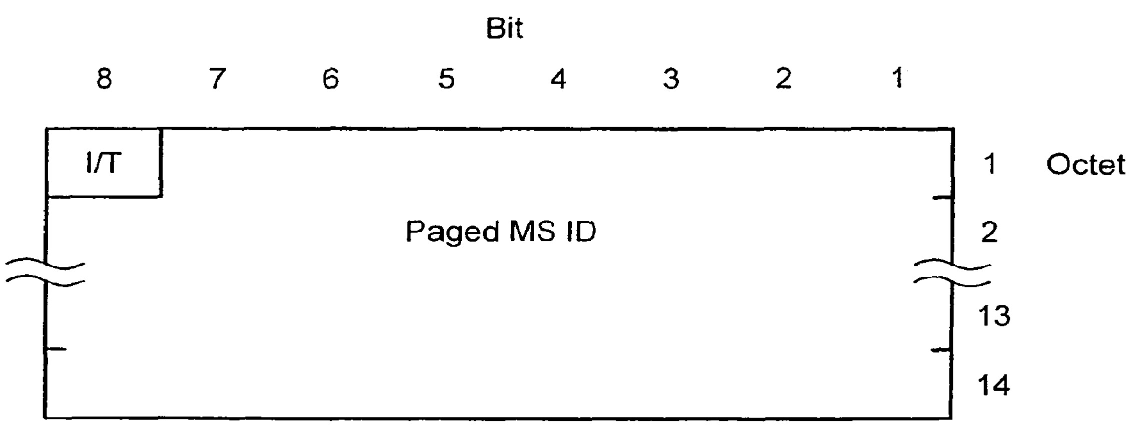

FIG. 212 is a diagram representing the format of a paged MS ID information element.

Figure 213:
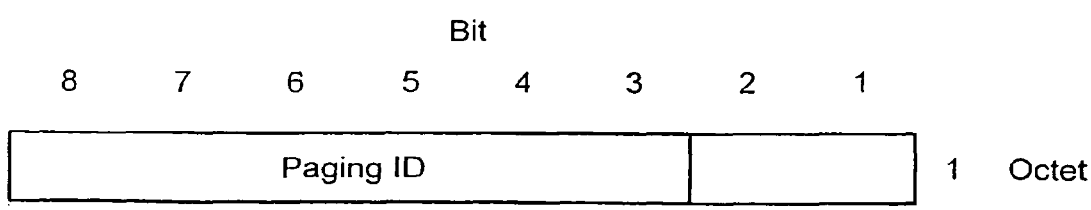

FIG. 213 is a diagram representing the format of a paging ID information element.

Figure 214:
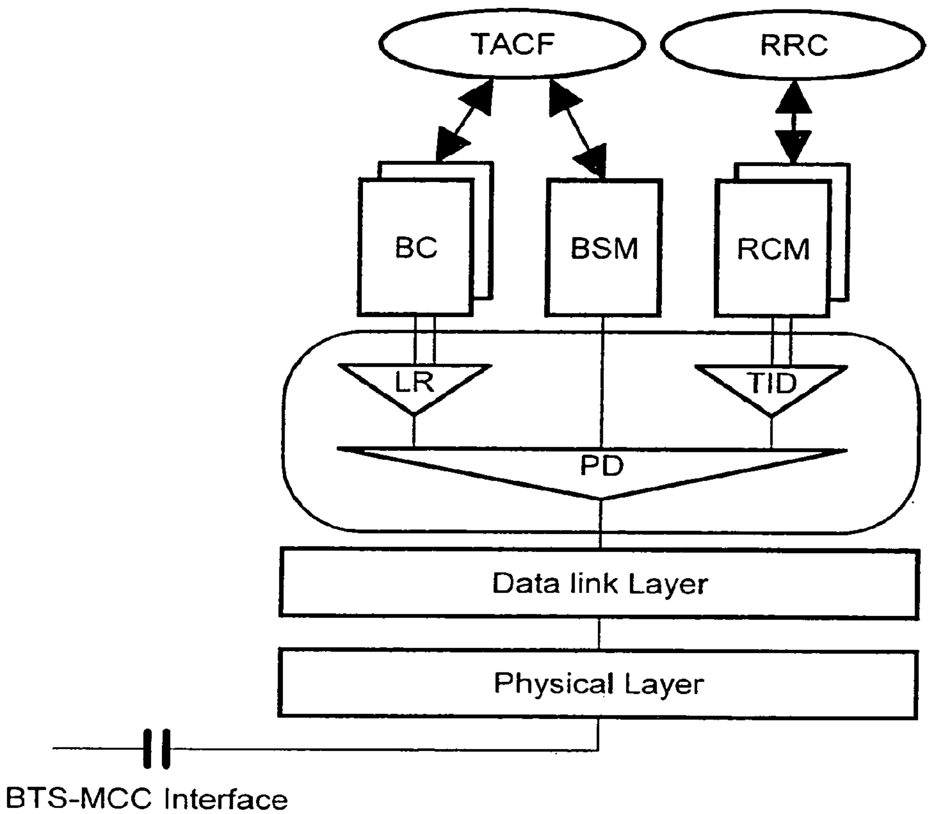

FIG. 214 is a conceptual diagram representing the protocol architecture on a BTS-MCC interface.

FIG. 215 is a diagram representing the format of a BC entity message.

FIG. 216 is a diagram representing the format of a BSM entity message.

FIG. 217 is a diagram representing the format of the pattern of fundamental information elements in the BSM entity message.

Figure 218:
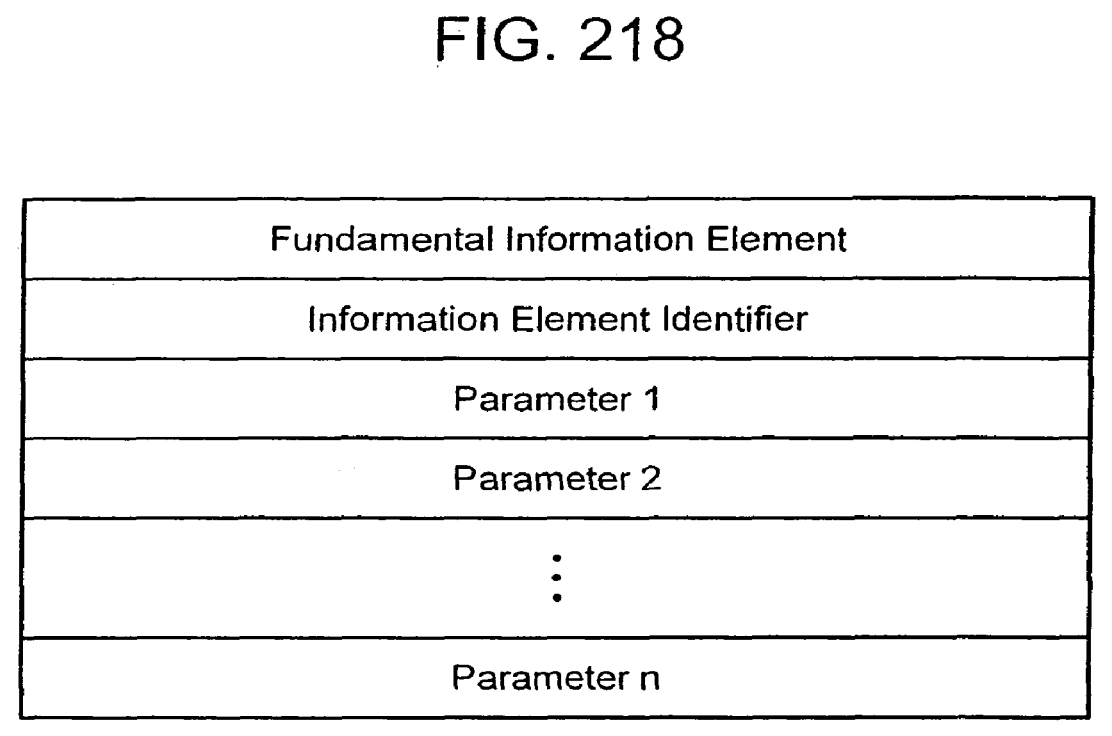

FIG. 218 is a diagram representing the format of the pattern of each fundamental information element in the BC entity message.

FIG. 219 is a diagram representing the format of a protocol discriminator of a BC entity message.

FIG. 220 is a diagram representing the format of a message type identifier of a BC entity message.

FIG. 221 is a diagram representing the format of a parameter of link reference of a BC entity message.

FIG. 222 is a diagram representing the format of an information element identifier of a BC entity message.

FIG. 223 is a diagram representing the format of a length of information element of a BC entity message.

FIG. 224 is a diagram representing the format of an AAL type parameter of a BC entity message.

FIG. 225 is a diagram representing the format of a link identifier of a BC entity message.

FIG. 226 is a diagram representing the format of a transmission quality parameter of a BC entity message.

FIG. 227 is a diagram representing the format of a sector number of a BC entity message.

FIG. 228 is a diagram representing the format of a bearer capability parameter of a BC entity message.

FIG. 229 is a diagram representing the format of a frequency selection information of a BC entity message.

FIG. 230 is a diagram representing the format of a frequency of a BC entity message.

FIG. 231 is a diagram representing the format of a frame offset group parameter of a BC entity message.

FIG. 232 is a diagram representing the format of a slot offset group of a BC entity message.

FIG. 233 is a diagram representing the format of a long code phase difference parameter of a BC entity message.

Figure 234:
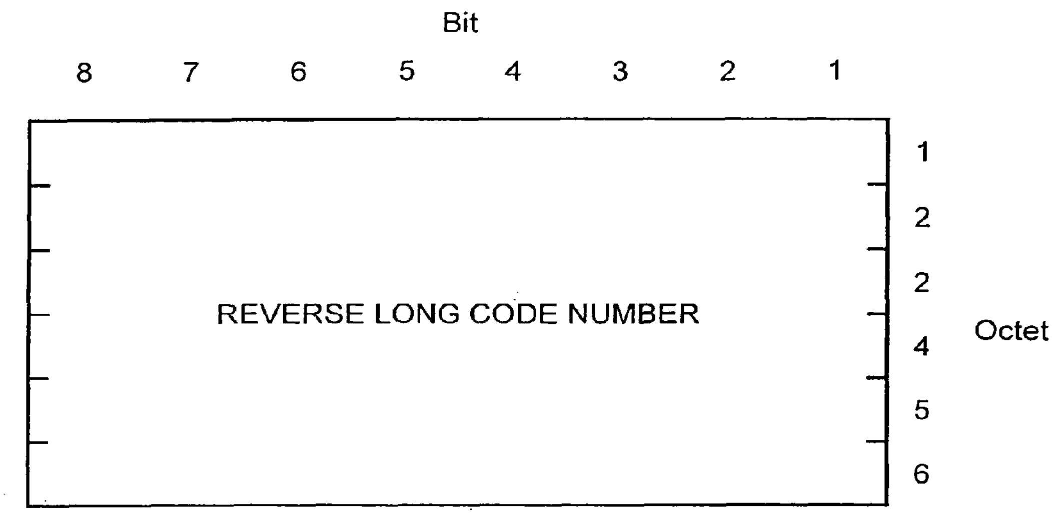

FIG. 234 is a diagram representing the format of a reverse long code number of a BC entity message.

Figure 235:
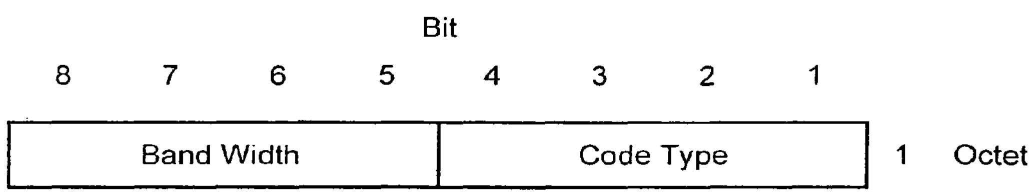

FIG. 235 is a diagram representing the format of a reverse short code type parameter of a BC entity message.

FIG. 236 is a diagram representing the format of a parameter of the number of reverse short codes of a BC entity message.

FIG. 237 is a diagram representing the format of a reverse short code number of a BC entity message.

FIG. 238 is a diagram representing the format of a forward short code type parameter of a BC entity message.

FIG. 239 is a diagram representing the format of a parameter of number of forward short codes of a BC entity message.

FIG. 240 is a diagram representing the format of an AAL type parameter for ACCH of a BC entity message.

FIG. 241 is a diagram representing the format of a link identifier for ACCH of a BC entity message.

FIG. 242 is a diagram representing the format of a transmission quality for ACCH of a BC entity message.

Figure 243:
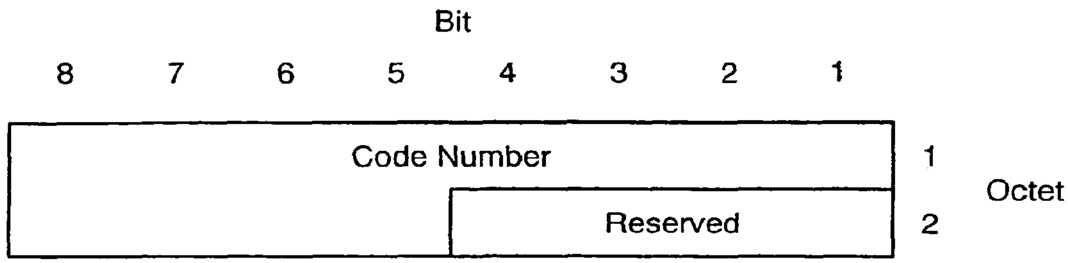

FIG. 243 is a diagram representing the format of a forward short code number of a BC entity message.

Figure 244:
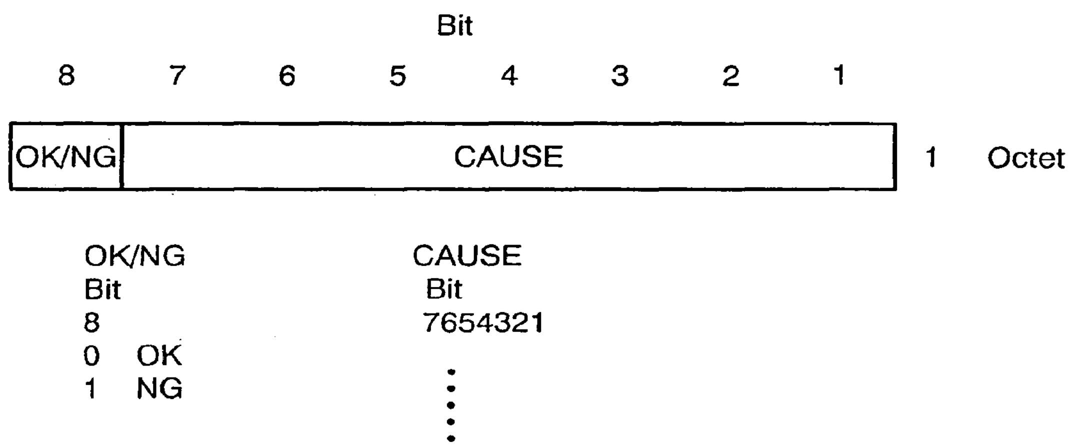

FIG. 244 is a diagram representing the format of a result parameter of a BC entity message.

Figure 245:
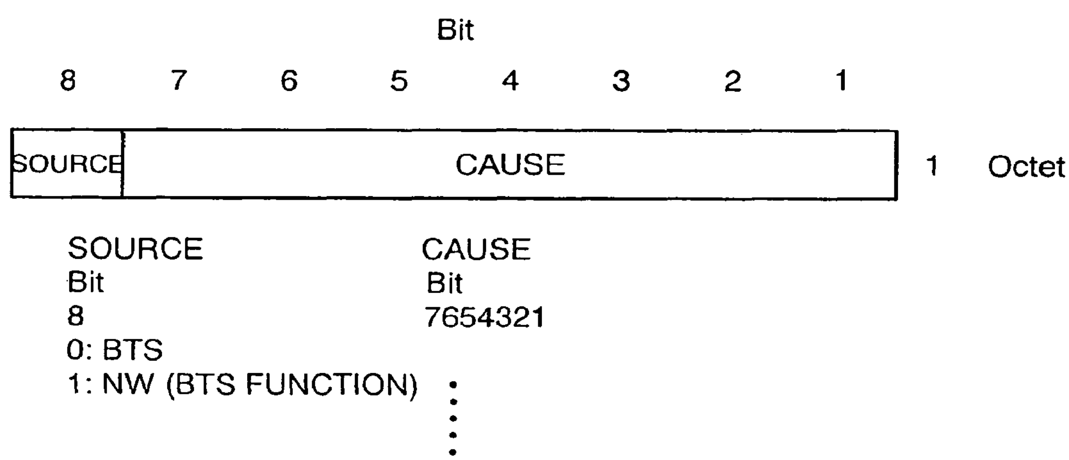

FIG. 245 is a diagram representing the format of a cause parameter of a BC entity message.

FIG. 246 is a diagram representing the format of an initial transmission power parameter of a BC entity message.

FIG. 247 is a diagram representing the format of a location identity parameter of a BC entity message.

FIG. 248 is a diagram representing the format of a protocol discriminator of a BSM entity message.

FIG. 249 is a diagram representing the format of a message type identifier of a BSM entity message.

FIG. 250 is a diagram representing the format of a PCHs calculation information of a BSM entity message.

FIG. 251 is a diagram representing the format of an area number of a BSM entity message.

Figure 252:
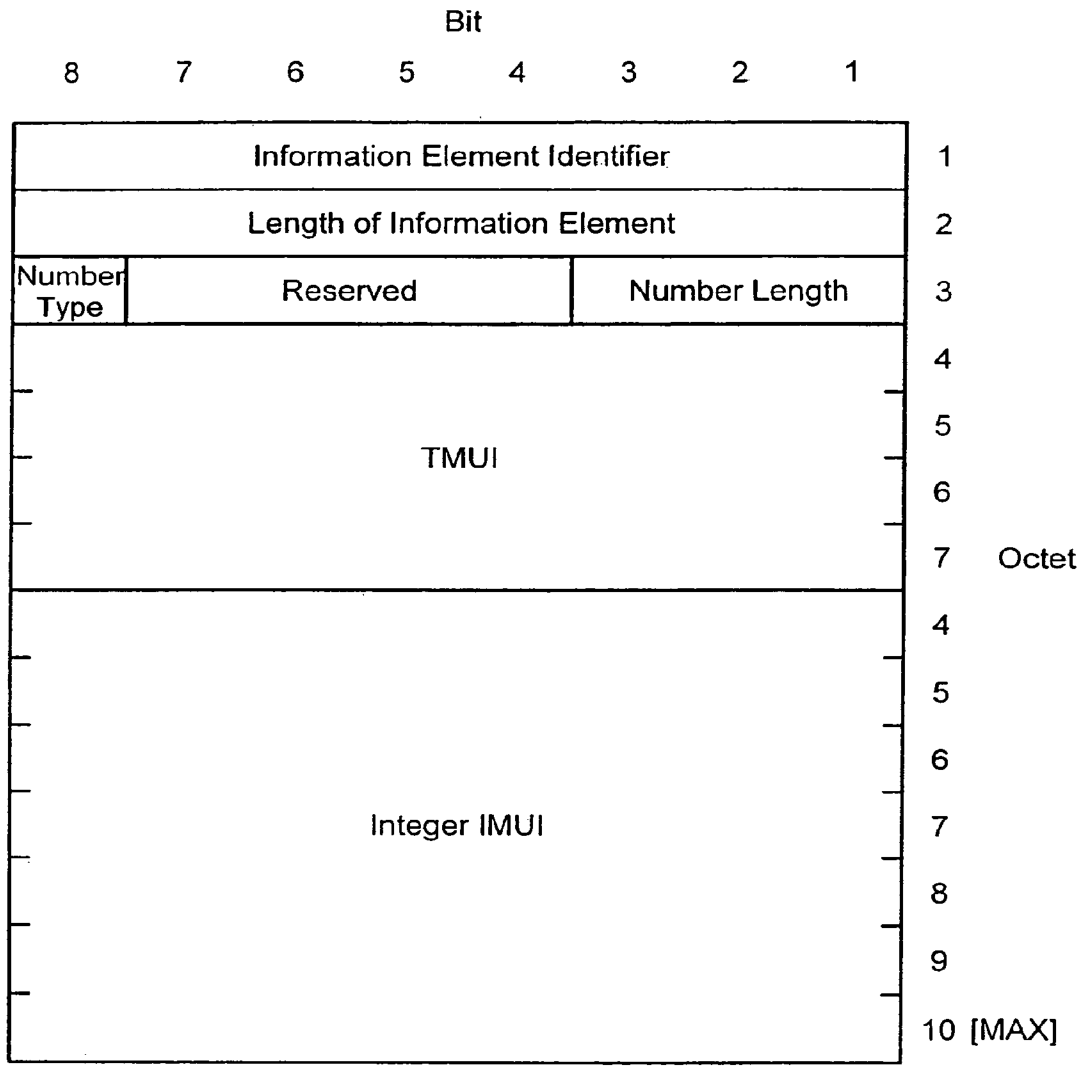

FIG. 252 is a diagram representing the format of a paged MS ID of a BSM entity message.

Figures 253, 254:
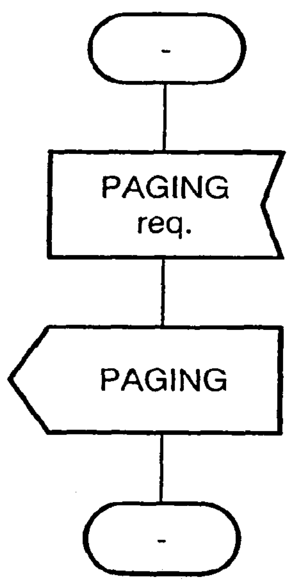

FIG. 253 is a diagram representing the format of a paging ID of a BSM entity message.

FIG. 254 represents an SDL diagram for base station management.

Figure 255:
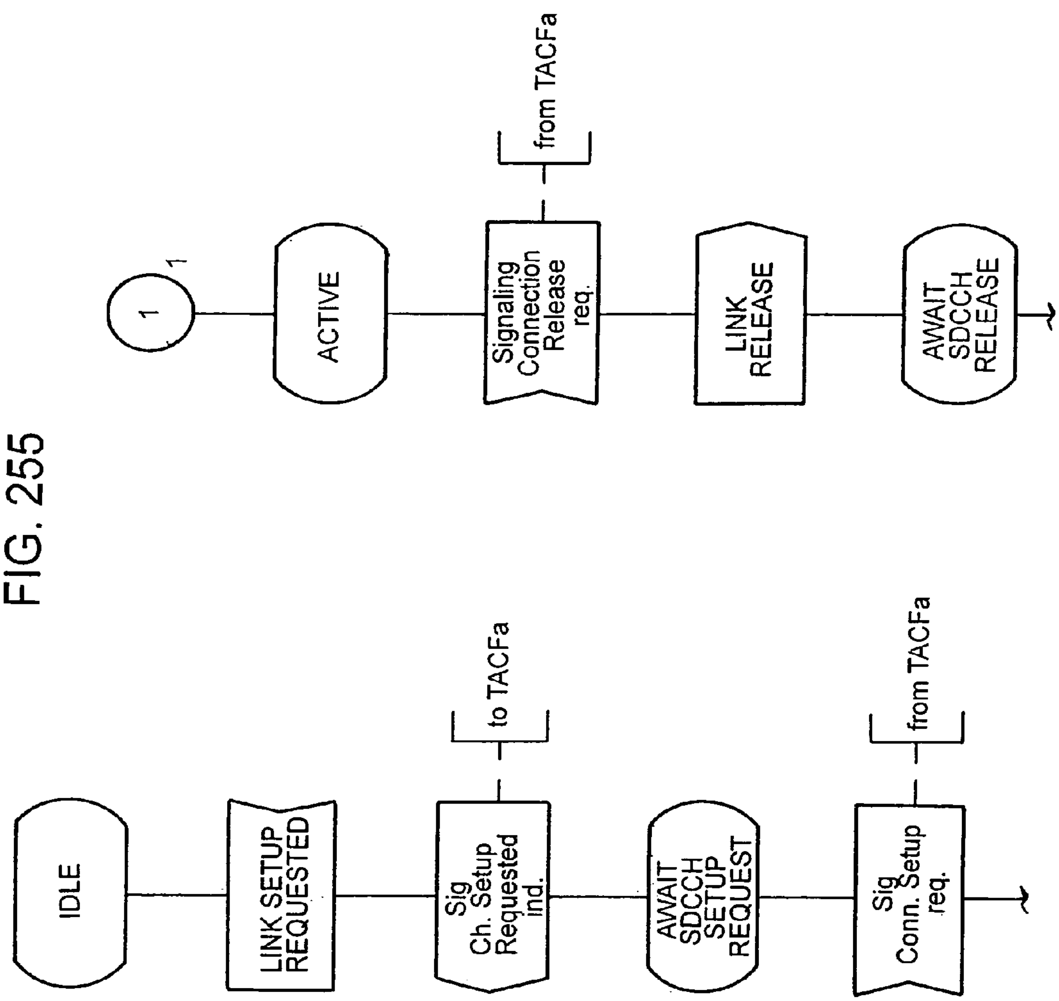

FIG. 255 represents an SDL diagram for bearer control in the SDCCH executed in the BSC function of the network.

Figure 256:
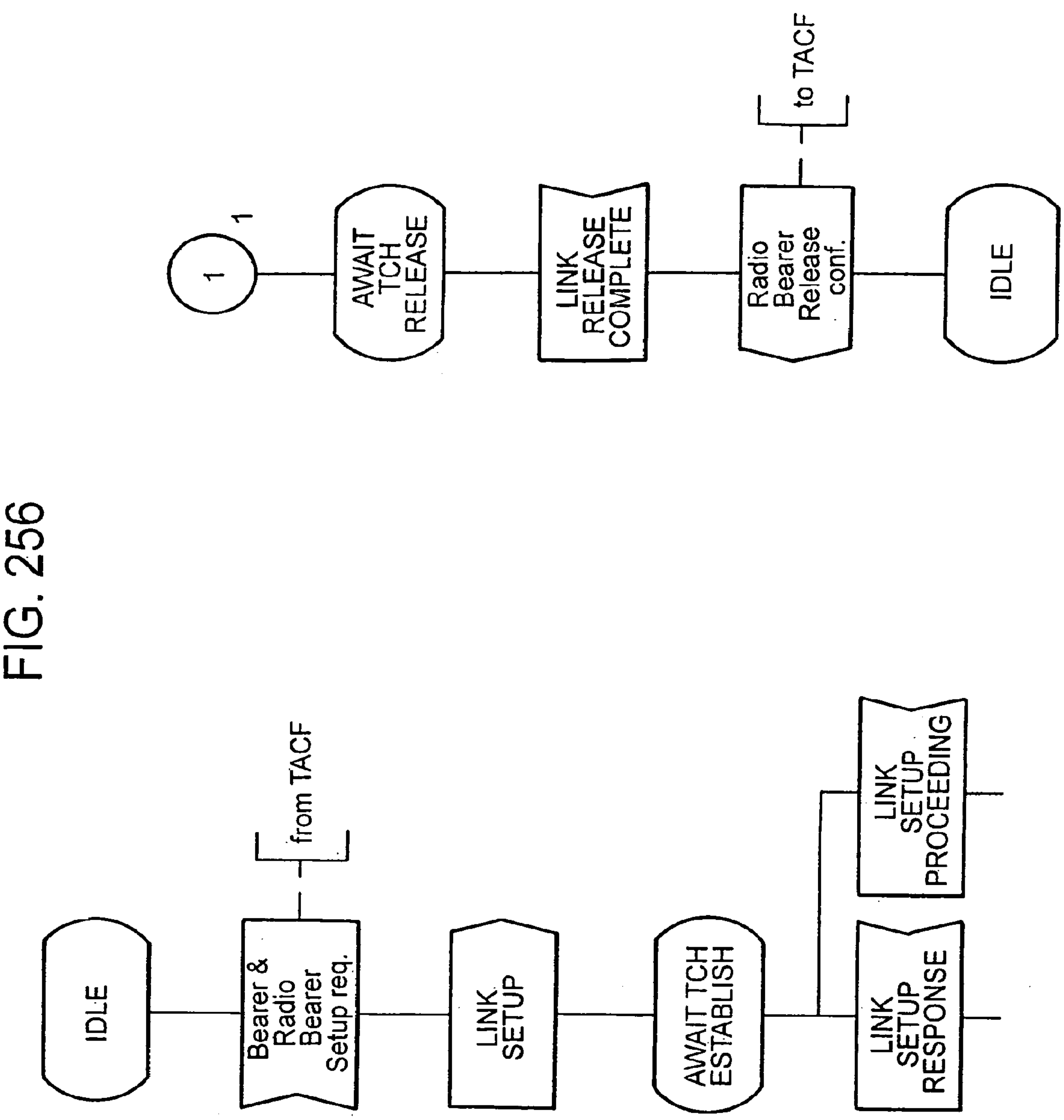

FIG. 256 represents an SDL diagram for bearer control in the TCH/ACCH executed in the BSC function of the network.

Figure 257:
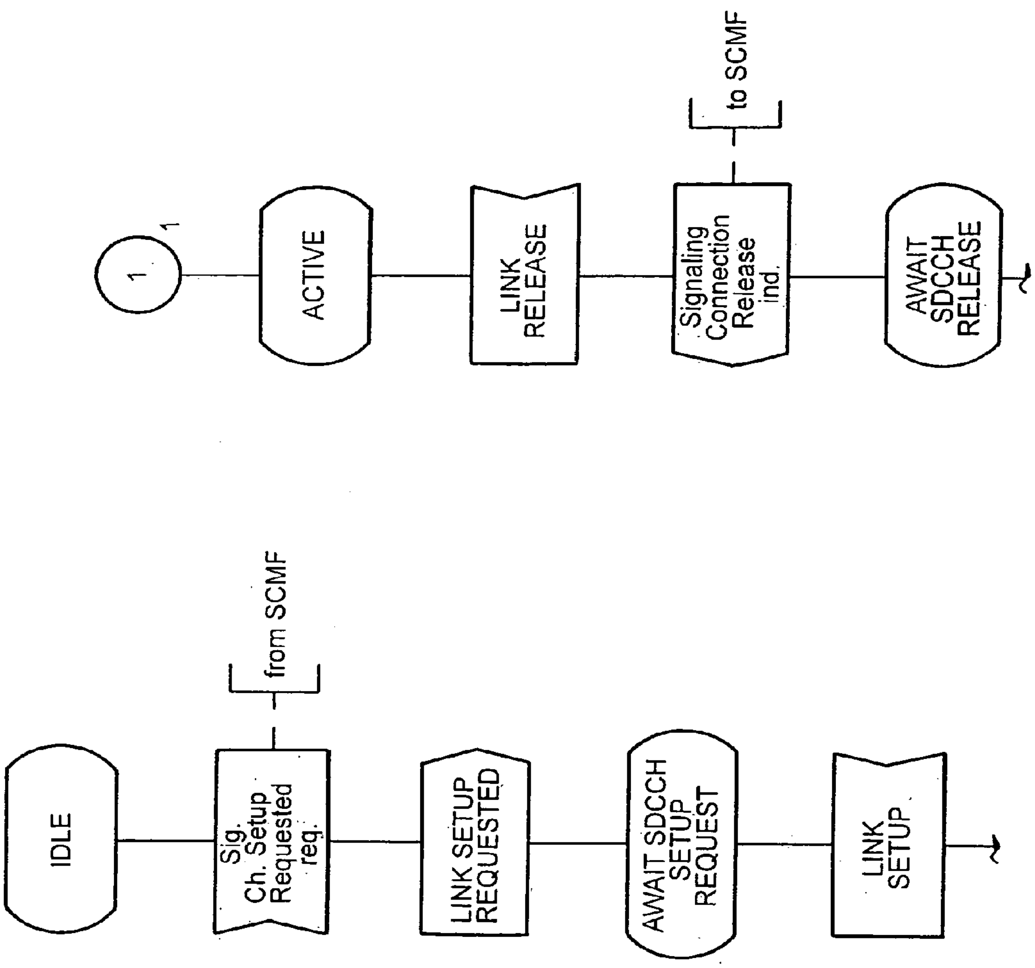

FIG. 257 represents an SDL diagram for bearer control in the SDCCH executed in the BTS.

Figure 258:
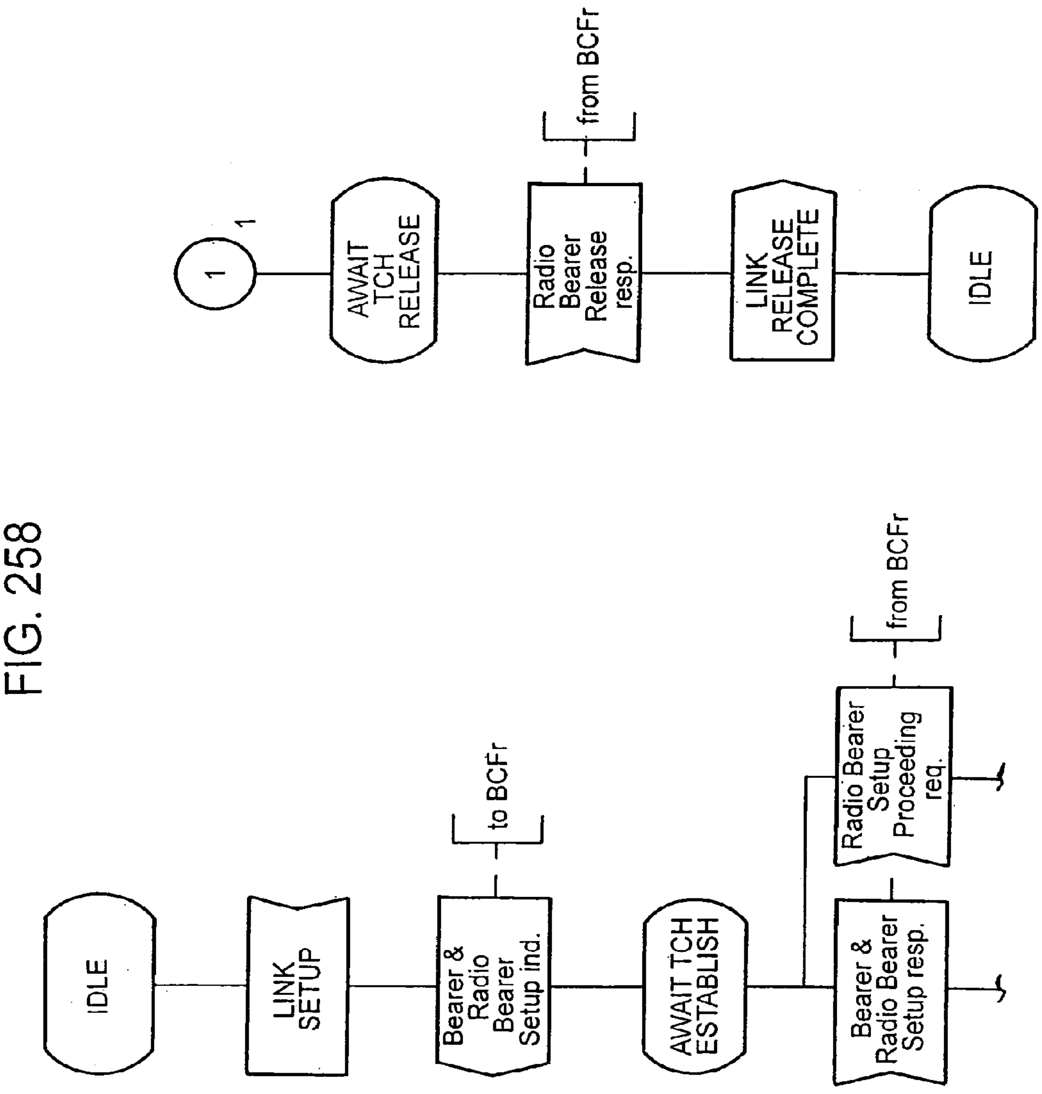

FIG. 258 represents an SDL diagram for bearer control in the TCH/ACCH executed in the BTS.

Figure 259:
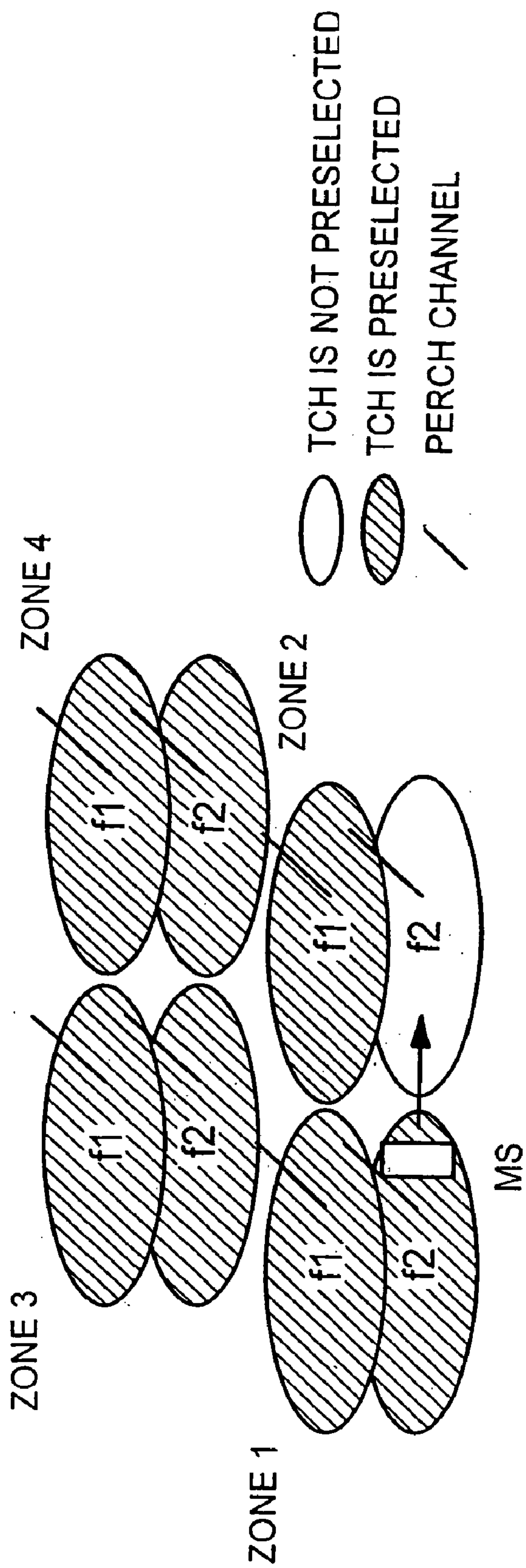

FIG. 259 is a diagram showing radio zones and a travelling mobile station in the invented system for describing an exemplified handover process.

Figure 260:
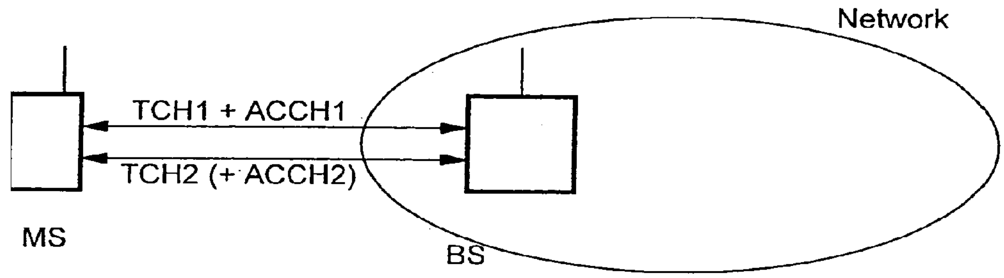

FIG. 260 is a block diagram showing an example of mobile communications system wherein a mobile station communicates through a plurality of calls.

Figure 261:
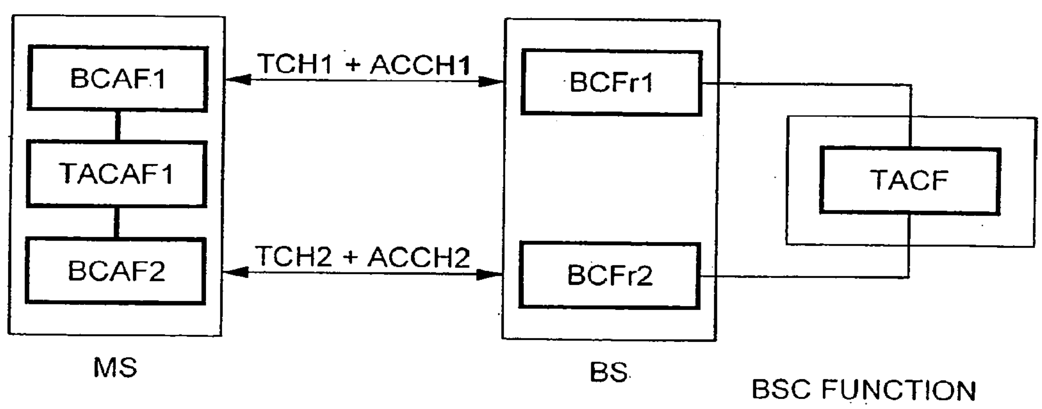

FIG. 261 is a block diagram showing the invented mobile communications system wherein a mobile station communicates through a plurality of calls and capable of replacing an associated control channel.

Figure 262:
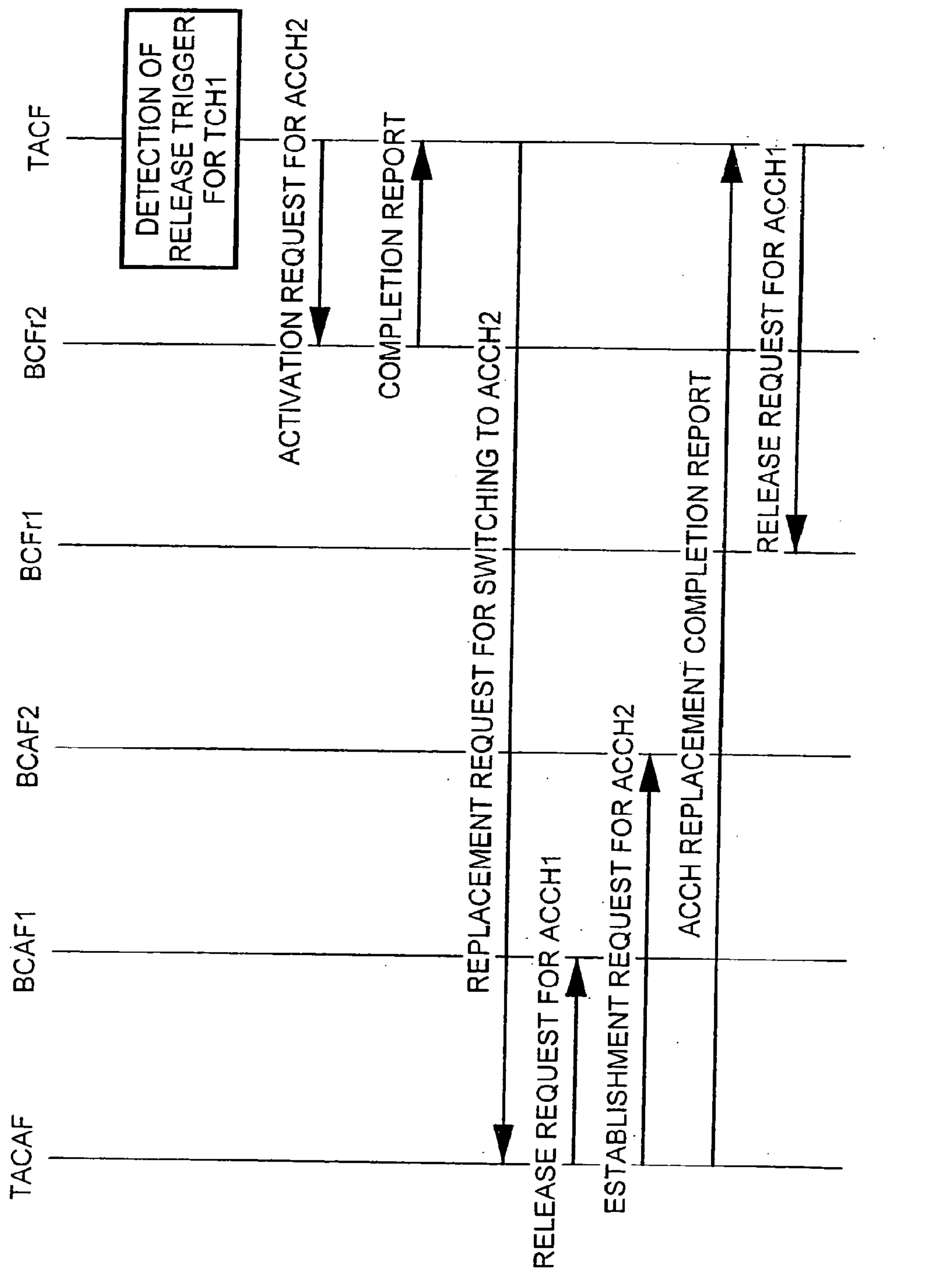

FIG. 262 is a sequential diagram representing the ACCH replacement procedure carried out by the invented system.

Figure 263:
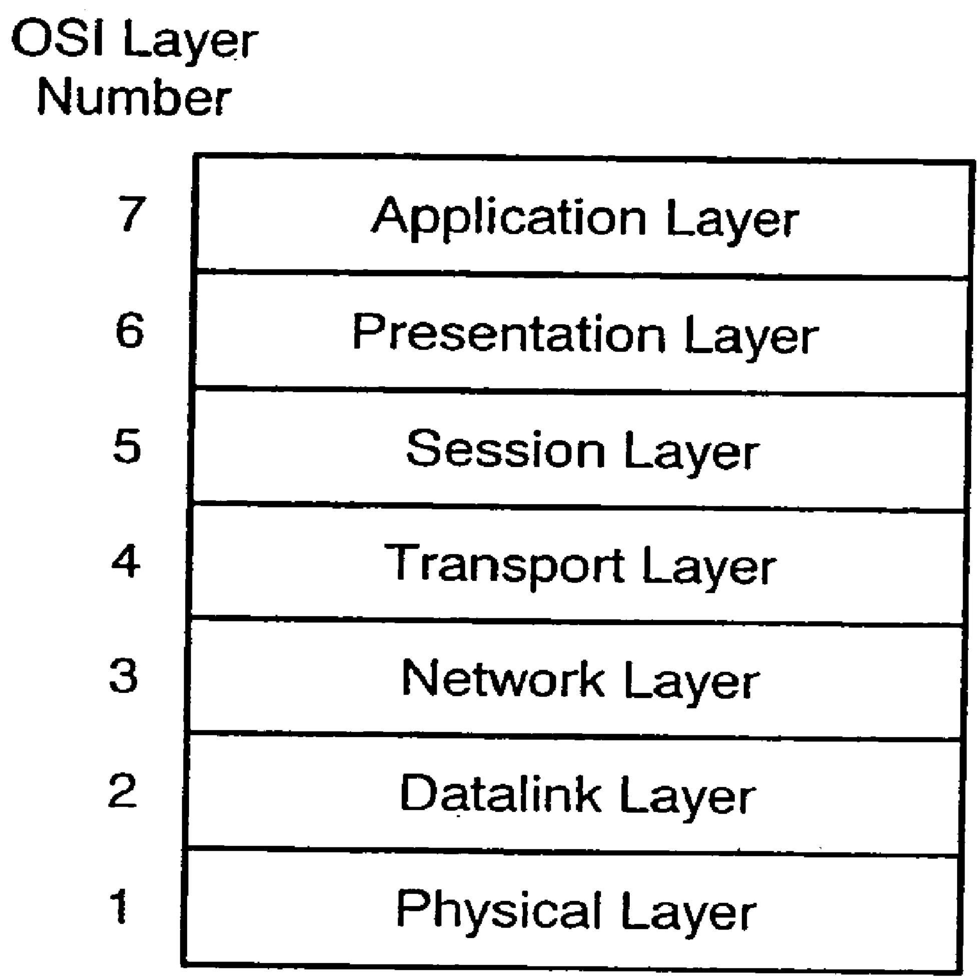

FIG. 263 is a diagram showing the OSI reference model.

Figure 264:
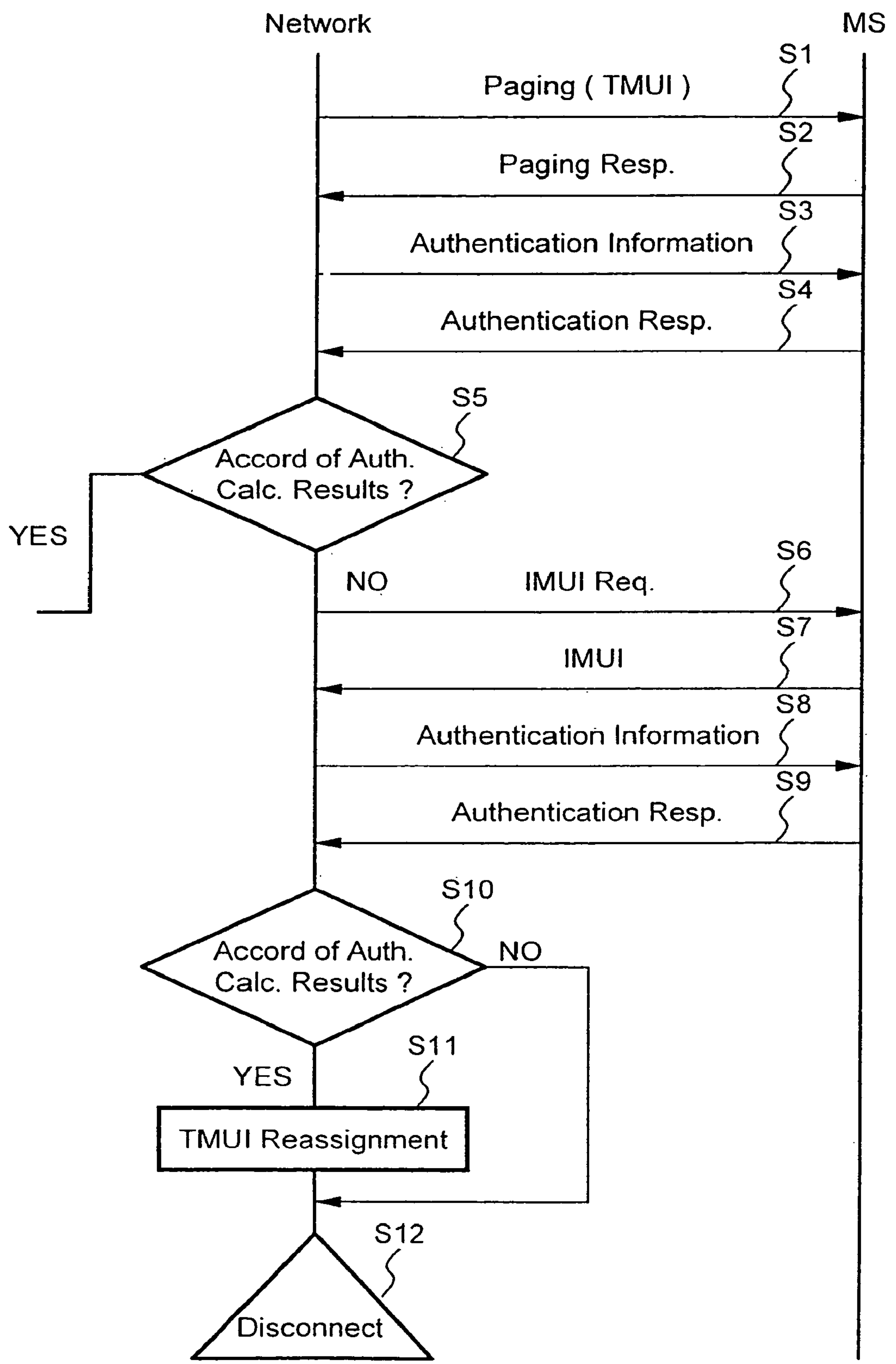

FIG. 264 is a diagram representing a sequential operation by the network and a mobile station MS in the invented system, which starts after a call attempt comes in the network.

FIG. 265 is a table indicating the glossary of the abbreviations used in the present specification.

FIG. 266 is a table representing the features of services provided by the invented system.

FIG. 267 is a table representing the features of the voice bearer service at 8 kbps provided by the invented system.

FIG. 268 is a table representing the features of the unrestricted bearer service at 64 kbps provided by the invented system.

FIG. 269 is a table representing the features of the multiple-rate unrestricted bearer service provided by the invented system.

FIG. 270 is a table representing the correlation between FE numbers and functional entities in the system.

FIG. 271 is a table representing the correlation between the relationship designations and the related functional entities.

FIG. 272 is a table representing the detail of a TA SETUP request indication.

FIG. 273 is a table representing the detail of another TA SETUP request indication.

FIG. 274 is a table representing the detail of a TA SETUP PERMISSION request indication.

FIG. 275 is a table representing the detail of a REVERSE LONG CODE RETRIEVAL request indication used to retrieve the reverse long code.

FIG. 276 is a table representing the detail of another REVERSE LONG CODE RETRIEVAL request indication used to retrieve the reverse long code.

FIG. 277 is a table representing the detail of a REVERSE LONG CODE RETRIEVAL response confirmation used to retrieve the reverse long code.

FIG. 278 is a table representing the detail of a TERMINAL STATUS UPDATE request indication used to update the terminal status.

FIG. 279 is a table representing the detail of a TERMINAL STATUS UPDATE response confirmation.

FIG. 280 is a table representing the detail of an ADD-ROUTING INFORMATION request indication sent to an LRDF to add the routing address to the subscriber's profile.

FIG. 281 is a table representing the detail of an ADD-ROUTING INFORMATION response confirmation.

FIG. 282 is a table representing the detail of a TA SETUP PERMISSION response confirmation issued by the LRCF to inform the TACF that the mobile terminal access to the network is authorized.

FIG. 283 is a table representing the detail of a REVERSE LONG CODE RETRIEVAL response confirmation used to retrieve the reverse long code.

FIG. 284 is a table representing the detail of a TA SETUP response confirmation used to notify that the terminal access has been established.

FIG. 285 is a table representing the detail of another TA SETUP response confirmation used to confirm that the setup of terminal access and the connection between a CCAF and TACAF have been completed.

FIG. 286 is a table representing the detail of a SETUP request indication used to request the establishment of a connection.

FIG. 287 is a table representing the detail of a TACF INSTANCE ID INDICATION request indication used to retrieve the reverse long code.

FIG. 288 is a table representing the detail of a CELL CONDITION MEASUREMENT request indication.

FIG. 289 is a table representing the detail of a CELL CONDITION MEASUREMENT response confirmation that provides the result of the cell selection information measurement requested by the CELL CONDITION MEASUREMENT request indication.

FIG. 290 is a table representing the detail of a CELL CONDITION REPORT request indication.

FIG. 291 is a table representing the detail of a CALL SETUP PERMISSION request indication issued by an SSF to request the authorization of the calling user.

FIG. 292 is a table representing the detail of a USER PROFILE RETRIEVAL request indication used to request the user profile to be retrieved.

FIG. 293 is a table representing the detail of a USER PROFILE RETRIEVAL response confirmation.

FIG. 294 is a table representing the detail of a CALL SETUP PERMISSION response confirmation issued by the LRCF to inform the calling user is authorized.

FIG. 295 is a table representing the detail of a SETUP request indication used to request the establishment of a connection.

FIG. 296 is a table representing the detail of a PROCEEDING request indication.

FIG. 297 is a table representing the detail of a MEASUREMENT CONDITION NOTIFICATION request indication used by the network to indicate conditions, which the mobile terminal measures, and to report the cell selection information.

FIG. 298 is a table representing the detail of another MEASUREMENT CONDITION NOTIFICATION request indication used by the network to indicate conditions, which the mobile terminal measures, and to report cell selecting information.

FIG. 299 is a table representing the detail of a REPORT request indication used to report status and/or other types of information (e.g. alerting, suspended, hold, and resume) transported within the network.

FIG. 300 is a table representing the detail of another REPORT request indication used to report status and/or other types of information (e.g. alerting, suspended, hold, and resume) transported within the network.

FIG. 301 is a table representing the detail of a SETUP response confirmation used to confirm that the connection has been established.

FIG. 302 is a table representing the detail of another SETUP response confirmation used to confirm that the connection has been established.

FIG. 303 is a table representing the detail of a SETUP request indication used to report the establishment of a connection.

FIG. 304 is a table representing the detail of a ROUTING INFORMATION QUERY request indication used to inquire the routing information.

FIG. 305 is a table representing the detail of a TERMINAL ID RETRIEVAL request indication used to request the user profile to be retrieved.

FIG. 306 is a table representing the detail of a TERMINAL ID RETRIEVAL response confirmation that is the response to the TERMINAL ID RETRIEVAL request indication.

FIG. 307 is a table representing the detail of a TERMINAL STATUS QUERY request indication used to inquire the terminal status (e.g. if terminal access is active or not).

FIG. 308 is a table representing the detail of a TERMINAL STATUS QUERY response confirmation that is the response to the TERMINAL STATUS QUERY request indication.

FIG. 309 is a table representing the detail of a TERMINAL STATUS UPDATE request indication used to update the terminal status.

FIG. 310 is a table representing the detail of a TERMINAL STATUS UPDATE response confirmation that is the response to the TERMINAL STATUS UPDATE request indication.

FIG. 311 is a table representing the detail of a PAGING AREA QUERY request indication used to inquire the paging area where TACF resides when it is observed that the terminal access is not active.

FIG. 312 is a table representing the detail of a PAGING AREA QUERY response confirmation is the response to the PAGING AREA QUERY request indication.

FIG. 313 is a table representing the detail of a PAGE request indication used to trigger a TACF of paging.

FIG. 314 is a table representing the detail of a PAGING request indication used to page a mobile terminal for determining its position in the network and for the routing for a call.

FIG. 315 is a table representing the detail of a PAGING response confirmation used to respond to the request indication.

FIG. 316 is a table representing the detail of a PAGE response confirmation that is the response to the request indication and notifies a LRCF of the paging result.

FIG. 317 is a table representing the detail of a REVERSE LONG CODE RETRIEVAL request indication used to retrieve the reverse long code.

FIG. 318 is a table representing the detail of another REVERSE LONG CODE RETRIEVAL request indication used to retrieve the reverse long code.

FIG. 319 is a table representing the detail of a REVERSE LONG CODE RETRIEVAL response confirmation used to retrieve the reverse long code.

FIG. 320 is a table representing the detail of a CELL CONDITION MEASUREMENT request indication used by the MRRC to trigger the measurement of cell selecting information.

FIG. 321 is a table representing the detail of a CELL CONDITION MEASUREMENT response confirmation provides the result of the cell selection information measurement requested by the CELL CONDITION MEASUREMENT request indication.

FIG. 322 is a table representing the detail of a CELL CONDITION REPORT request indication used by the mobile terminal to report the cell selection information.

FIG. 323 is a table representing the detail of an ADD-ROUTING INFORMATION request indication sent to the LRDFp to add the routing information to the subscriber's profile.

FIG. 324 is a table representing the detail of an ADD-ROUTING INFORMATION response confirmation that is the response to the ADD-ROUTING INFORMATION request indication.

FIG. 325 is a table representing the detail of a PAGE AUTHORIZED request indication at relationship rg used to notify the TACF of the result of the terminal authentication.

FIG. 326 is a table representing the detail of a REVERSE LONG CODE RETRIEVAL response confirmation used to retrieve the reverse long code.

FIG. 327 is a table representing the detail of a ROUTING INFORMATION QUERY response confirmation that is the response to the request indication.

FIG. 328 is a table representing the detail of a SETUP request indication used to request the establishment of a connection.

FIG. 329 is a table representing the detail of a TERMINATION ATTEMPT request indication used to request the user's profile which may be needed to proceed the call process.

FIG. 330 is a table representing the detail of a USER PROFILE RETRIEVAL request indication used to retrieve the called user's profile from the LRDF.

FIG. 331 is a table representing the detail of a USER PROFILE RETRIEVAL response confirmation that is the response to the request indication from the LRCF.

FIG. 332 is a table representing the detail of a TERMINATION ATTEMPT response confirmation that is the response to the request indication from the SSF.

FIG. 333 is a table representing the detail of a SETUP request indication used to request the establishment of a connection.

FIG. 334 is a table representing the detail of a PROCEEDING request indication optionally reports that the received connection setup is valid and authenticated and that further routing and progressing of the call is proceeding.

FIG. 335 is a table representing the detail of a MEASUREMENT CONDITION NOTIFICATION request indication used by the network to indicate conditions, which the mobile terminal measures, and to report the cell selection information.

FIG. 336 is a table representing the detail of a REPORT request indication used to report status and/or other types of information transported in the network.

FIG. 337 is a table representing the detail of a SETUP response confirmation used to confirm that the connection has been established.

FIG. 338 is a table representing the detail of a CONNECTED request indication used to acknowledge that a previously sent SETUP response confirmation has been received and accepted.

FIG. 339 is a table representing the detail of a RELEASE request indication used to release the resources associated with the call connection, such as call ID and channels.

FIG. 340 is a table representing the detail of a RELEASE response confirmation used to indicate that all resources pervasively associated with the connection have been released.

FIG. 341 is a table representing the detail of a TA RELEASE request indication used to inform an SCF that the attempt of call release has been detected.

FIG. 342 is a table representing the detail of a TERMINAL-STATUS-MAKE-IDLE request indication used to idle the terminal call status.

FIG. 343 is a table representing the detail of a TERMINAL-STATUS-MAKE-IDLE response confirmation that is the response to the TERMINAL-STATUS-MAKE-IDLE request indication.

FIG. 344 is a table representing the detail of a TA RELEASE response confirmation used for the confirmation to the TA RELEASE request indication.

FIG. 345 is a table representing the detail of a RELEASE request indication used to release the resources associated with the call connection such as the call reference and channels.

FIG. 346 is a table representing the detail of a RELEASE response confirmation used to indicate that all resources previously associated with the connection have been released.

FIG. 347 is a table representing the detail of a TA RELEASE request indication issued by the TACF to inform the LRCF that the attempt of call release has been detected.

FIG. 348 is a table representing the detail of a TERMINAL-STATUS-MAKE-IDLE request indication used to idle the terminal call status.

FIG. 349 is a table representing the detail of a TERMINAL-STATUS-MAKE-IDLE response confirmation that is the response to the TERMINAL-STATUS-MAKE-IDLE request indication.

FIG. 350 is a table representing the detail of a TA RELEASE response confirmation used for a confirmation of the TERMINAL-STATUS-MAKE-IDLE request indication.

FIG. 351 is a table representing the detail of a RADIO LINK FAILURE request indication used to notify a radio link failure detected by a BCAF or BCFr.

FIG. 352 is a table representing the detail of a RELEASE NOTIFICATION request indication used to indicate that a connection between the network and the terminal has been released.

FIG. 353 is a table representing the detail of a RADIO LINK FAILURE request indication used to notify that the link failure has been detected.

FIG. 354 is a table representing the detail of another RADIO LINK FAILURE request indication used to notify that the link failure has been detected.

FIG. 355 is a table representing the detail of a RADIO LINK FAILURE response confirmation that is a response confirmation of the RADIO LINK FAILURE request indication.

FIG. 356 is a table representing the detail of a RADIO BEARER RELEASE request indication used to request to release radio bearers.

FIG. 357 is a table representing the detail of a BEARER RELEASE request indication issued by the TACF to the BCF to release the radio bearer.

FIG. 358 is a table representing the detail of a BEARER RELEASE response confirmation that is a response confirmation of the BEARER RELEASE request indication.

FIG. 359 is a table representing the detail of another BEARER RELEASE request indication sent by an anchor TACF to request a serving TACF to release the bearer involved in the call that should be released.

FIG. 360 is a table representing the detail of another BEARER RELEASE request indication issued by the TACF to BCF to release the radio bearer.

FIG. 361 is a table representing the detail of another BEARER RELEASE response confirmation that is a response confirmation of the BEARER RELEASE request indication.

FIG. 362 is a table representing the detail of a BEARER-AND-RADIO-BEARER RELEASE request indication issued by the TACF to release the bearer-and-radio-bearer.

FIG. 363 is a table representing the detail of a BEARER-AND-RADIO-BEARER RELEASE response confirmation used for a confirmation of the release of the bearer-and-radio-bearer requested by the BEARER-AND-RADIO-BEARER RELEASE request indication.

FIG. 364 is a table representing the detail of another BEARER RELEASE response confirmation that is a confirmation response to inform the TACF that the previous request to release the radio bearer has been completed.

FIG. 365 is a table representing the detail of a TA RELEASE request indication issued by the TACF to inform the LRCF that the attempt of releasing call has detected.

FIG. 366 is a table representing the detail of a TERMINAL-STATUS-MAKE-IDLE request indication used to request to update the user profile.

FIG. 367 is a table representing the detail of a TERMINAL-STATUS-MAKE-IDLE response confirmation that is a response to the TERMINAL-STATUS-MAKE-IDLE request indication.

FIG. 368 is a table representing the detail of a TA RELEASE response confirmation used for a response confirmation of the TA RELEASE request indication.

FIG. 369 is a table representing the detail of a RADIO LINK FAILURE request indication used to notify that a link failure has been detected and reported by either BCFr or BCFa.

FIG. 370 is a table representing the detail of another RADIO LINK FAILURE request indication used to notify that the link failure has been detected.

FIG. 371 is a table representing the detail of a RADIO LINK FAILURE response confirmation that is a confirmation response to the RADIO LINK FAILURE request indication.

FIG. 372 is a table representing the detail of a RADIO BEARER RELEASE request indication used to request to release the radio bearer.

FIG. 373 is a table representing the detail of a RELEASE NOTIFICATION request indication used to indicate that the connection between the network and the terminal has been released.

FIG. 374 is a table representing the detail of a RADIO BEARER RELEASE response confirmation that is a response confirmation of the RADIO BEARER RELEASE request indication.

FIG. 375 is a table representing the detail of a BEARER RELEASE request indication issued by the TACF to BCF to release the radio bearer.

FIG. 376 is a table representing the detail of a BEARER RELEASE response confirmation that is a response confirmation of the BEARER RELEASE request indication.

FIG. 377 is a table representing the detail of another BEARER RELEASE request indication sent by the anchor TACF to request the serving TACF to release the radio bearer involved in the call that should be released.

FIG. 378 is a table representing the detail of another BEARER RELEASE request indication issued by the TACF to BCF to release the radio bearer.

FIG. 379 is a table representing the detail of a BEARER RELEASE response confirmation that is a response confirmation of the BEARER RELEASE request indication.

FIG. 380 is a table representing the detail of a BEARER-AND-RADIO-BEARER RELEASE request indication issued by the TACF to release the bearer and radio bearer.

FIG. 381 is a table representing the detail of a BEARER-AND-RADIO-BEARER RELEASE response confirmation used for a confirmation of the release of the bearer and radio bearer requested by the BEARER-AND-RADIO-BEARER RELEASE request indication.

FIG. 382 is a table representing the detail of another BEARER RELEASE response confirmation that is a confirmation response for informing the TACF that the previous request to release the radio bearer has been completed.

FIG. 383 is a table representing the detail of a RADIO BEARER RELEASE request indication issued to request to release the radio bearer.

FIG. 384 is a table representing the detail of another RADIO BEARER RELEASE response confirmation used to confirm the release of radio bearer requested by the RADIO BEARER RELEASE request indication.

FIG. 385 is a table representing the detail of a TA RELEASE request indication issued by the TACF to inform the LRCF that the attempt of call release has been detected.

FIG. 386 is a table representing the detail of a TERMINAL-STATUS-MAKE-IDLE request indication used to request to update the user profile.

FIG. 387 is a table representing the detail of a TERMINAL-STATUS-MAKE-IDLE response confirmation that is a response to the TERMINAL-STATUS-MAKE-IDLE request indication.

FIG. 388 is a table representing the detail of another TA RELEASE response confirmation is used for confirmation to the TA RELEASE request indication.

FIG. 389 is a table representing the detail of a CALL DISCONNECT request indication used to notify the LRCF that a “user disconnect” has been detected.

FIG. 390 is a table representing the detail of a USER-PROFILE-UPDATE request indication used to request to update the user profile.

FIG. 391 is a table representing the detail of a USER-PROFILE-UPDATE response confirmation that is a response to the USER-PROFILE-UPDATE response confirmation.

FIG. 392 is a table representing the detail of a CALL DISCONNECT response confirmation that is a response to the request made by the CALL DISCONNECT request indication.

FIG. 393 is a table representing the detail of a SIGNALING CHANNEL SETUP REQUEST request indication used by the MCF and TACF to request the network to setup the signaling channels.

FIG. 394 is a table representing the detail of a SIGNALING CHANNEL SETUP request indication used by an SCMAF to request to the network to allocate the signaling channels.

FIG. 395 is a table representing the detail of a SIGNALING CHANNEL SETUP response confirmation used by the SCMF to allocate the radio resources to the signaling channels.

FIG. 396 is a table representing the detail of a SIGNALING CHANNEL SETUP REQUESTED request indication used to indicate the reception of the signaling channel setup request (initial access detection) from the mobile terminal and to request the network to setup the corresponding signaling channels in the network.

FIG. 397 is a table representing the detail of a SIGNALING CONNECTION SETUP request indication used by the TACF and SACF to setup the signaling connection among them and the SCMF.

FIG. 398 is a table representing the detail of a SIGNALING CONNECTION SETUP response confirmation used to report the establishment of the signaling channels including the physical radio channel and the intra-network channel.

FIG. 399 is a table representing the detail of a SIGNALING CHANNEL SETUP REQUEST response confirmation used by the SCMAF to report the setup of the signaling channels to the network.

FIG. 400 is a table representing the detail of a BEARER SETUP request indication used to request the establishment of the access bearer from the CCF to TACF.

FIG. 401 is a table representing the detail of a CHANNEL SELECTION response confirmation used to report reserved radio resources to the TACF, which requested the reservation.

FIG. 402 is a table representing the detail of a BEARER SETUP request indication sent from the TACF to BCF to request the establishment of the access bearer.

FIG. 403 is a table representing the detail of a BEARER SETUP response confirmation sent to confirm the establishment of the access bearer and to indicate the bearer ID of the bearer between the BCF and BCF.

FIG. 404 is a table representing the detail of another BEARER SETUP request indication used to request the establishment of the access bearer from the TACFa to TACFv.

FIG. 405 is a table representing the detail of another BEARER SETUP request indication sent from the TACF to BCF to request the establishment of the access bearer.

FIG. 406 is a table representing the detail of another BEARER SETUP response confirmation sent from the BCF to TACF to request the establishment of the access bearer.

FIG. 407 is a table representing the detail of a BEARER-AND-RADIO-BEARER SETUP request indication sent from the TACF to BCFr to request the establishment of the radio bearer and the bearer between the BCF and BCFr.

FIG. 408 is a table representing the detail of a RADIO BEARER SETUP PROCEEDING request indication used by the BCFr to report that the instructed radio bearer setup is valid and the establishment of the radio bearer is proceeding.

FIG. 409 is a table representing the detail of a RADIO BEARER SETUP REQUEST request indication issued by the TACF, which controls a new access bearer, to the TACF, which has the signaling connection, to request to newly assign a radio bearer to the mobile terminal.

FIG. 410 is a table representing the detail of a RADIO BEARER SETUP request indication sent from the TACF to TACAF to request the establishment of the radio bearer.

FIG. 411 is a table representing the detail of another RADIO BEARER SETUP request indication sent from the TACAF to BCAF to request the establishment of the radio bearer.

FIG. 412 is a table representing the detail of a RADIO BEARER SETUP response confirmation sent from the BCAF to TACAF to confirm that the establishment of radio bearer has been completed.

FIG. 413 is a table representing the detail of a BEARER-AND-RADIO-BEARER SETUP response confirmation sent to confirm that the establishment of radio bearer and bearer between the BCF and BCFr have been completed.

FIG. 414 is a table representing the detail of a BEARER SETUP response confirmation used to confirm that the establishment of access bearer has been completed.

FIG. 415 is a table representing the detail of another BEARER SETUP response confirmation used to confirm that the establishment of access bearer has been completed.

FIG. 416 is a table representing the detail of a BEARER RELEASE request indication sent by an anchor CCF to notify an anchor TACF that the attempt or event of call release has been detected and that the bearer involved in the call is being released.

FIG. 417 is a table representing the detail of a RADIO BEARER RELEASE request indication used by the TACFa to request to release the radio bearer.

FIG. 418 is a table representing the detail of a RADIO BEARER RELEASE response confirmation that is a response confirmation of the RADIO BEARER RELEASE request indication.

FIG. 419 is a table representing the detail of a BEARER RELEASE request indication issued by the TACF to BCF to release the radio bearer.

FIG. 420 is a table representing the detail of a BEARER RELEASE response confirmation that is a response confirmation of the BEARER RELEASE request indication.

FIG. 421 is a table representing the detail of another BEARER RELEASE request indication sent by the TACFa to request the TACFv to release the bearer involved in the call is being released.

FIG. 422 is a table representing the detail of another BEARER RELEASE request indication issued by the TACF to BCF to release the radio bearer.

FIG. 423 is a table representing the detail of a BEARER RELEASE response confirmation that is a response confirmation of the BEARER RELEASE request indication.

FIG. 424 is a table representing the detail of a BEARER-AND-RADIO-BEARER RELEASE request indication issued by the TACF to release the bearer and radio bearer.

FIG. 425 is a table representing the detail of a BEARER-AND-RADIO-BEARER RELEASE response confirmation used for a confirmation of the release of the bearer and radio bearer requested by the BEARER-AND-RADIO-BEARER. RELEASE request indication.

FIG. 426 is a table representing the detail of another BEARER RELEASE response confirmation that is a confirmation of the BEARER RELEASE request indication.

FIG. 427 is a table representing the detail of another BEARER RELEASE response confirmation that is a response confirmation to inform the CCF that the previous request to release the radio bearer has been completed.

FIG. 428 is a table representing the detail of another RADIO BEARER RELEASE request indication issued by the TACAF to request the radio bearer release.

FIG. 429 is a table representing the detail of another RADIO BEARER RELEASE request indication used by the BOCA to confirm the radio bearer release requested by the RADIO BEARER RELEASE request indication.

FIG. 430 is a table representing the detail of a SIGNALING CHANNEL RELEASE REQUEST request indication used by the MCF and TACF to request the release of a signaling channel.

FIG. 431 is a table representing the detail of a SIGNALING CONNECTION RELEASE request indication used by the TACF and SACF to request the release of the signaling channel (in both of the network and the radio resources).

FIG. 432 is a table representing the detail of a SIGNALING CONNECTION RELEASE response confirmation used to report the release of the signaling channel.

FIG. 433 is a table representing the detail of a BEARER SETUP request indication sent from the TACFa to TACFv to request the setup of an access bearer.

FIG. 434 is a table representing the detail of an INTRA-BCFr HANDOVER BRANCH ADDITION request indication.

FIG. 435 is a table representing the detail of an INTRA-BCFr HANDOVER BRANCH ADDITION response confirmation that is a response to the INTRA-BCFr HANDOVER BRANCH ADDITION request indication and is sent from the BCFr to TACF to indicate the completion of setup of the physical radio channel(s).

FIG. 436 is a table representing the detail of a RADIO BEARER SETUP REQUEST request indication sent from the visited TACF, which controls the newly assigned radio bearer, to TACFa to request to setup the radio bearer between the mobile terminal and BCFr controlled by the visited TACF.

FIG. 437 is a table representing the detail of a HANDOVER BRANCH ADDITION request indication sent from the TACF to TACAF to notify of the intra-BCFr handover branch addition, and requesting to add a new physical radio channel to an existing physical radio channel.

FIG. 438 is a table representing the detail of a RADIO BEARER SETUP request indication sent from the TACAF to BCAF to request to setup a radio bearer.

FIG. 439 is a table representing the detail of a RADIO BEARER SETUP response confirmation that is a response to the RADIO BEARER SETUP request indication sent from the BCAF to TACAF to indicate the completion of the radio bearer setup.

FIG. 440 is a table representing the detail of a HANDOVER CONNECTION SETUP request indication notifying of a handover initiation and to request to setup an access bearer.

FIG. 441 is a table representing the detail of a HANDOVER CONNECTION SETUP response confirmation sent from the BCF to TACF to confirm the HANDOVER CONNECTION SETUP request indication.

FIG. 442 is a table representing the detail of a BEARER SETUP request indication sent from the TACFa to TACFv to setup an access bearer.

FIG. 443 is a table representing the detail of another BEARER SETUP request indication sent from the TACF to BCF to request the bearer setup.

FIG. 444 is a table representing the detail of a BEARER SETUP response confirmation sent from the BCF to TACF to confirm the BEARER SETUP request indication.

FIG. 445 is a table representing the detail of a BEARER-AND-RADIO-BEARER SETUP request indication.

FIG. 446 is a table representing the detail of a BEARER-AND-RADIO-BEARER SETUP response confirmation sent from the BCFr to TACF to indicate the completion of setting up of the radio bearer and bearer between the BCFr and BCF.

FIG. 447 is a table representing the detail of a RADIO BEARER SETUP REQUEST request indication sent from the visited TACF, which controls the newly assigned radio bearer, to the TACFa to request to setup the radio bearer between the mobile terminal and BCFr.

FIG. 448 is a table representing the detail of a HANDOVER BRANCH ADDITION request indication notifying of the handover branch addition request.

FIG. 449 is a table representing the detail of a RADIO BEARER SETUP request indication sent from the TACAF to BCAF.

FIG. 450 is a table representing the detail of a RADIO BEARER SETUP response confirmation sent from the BCAF to TACAF to indicate the completion of the radio bearer setup.

FIG. 451 is a table representing the detail of a BEARER SETUP response confirmation sent from the TACFa to TACFv to confirm the establishment of the access bearer.

FIG. 452 is a table representing the detail of a HANDOVER BRANCH DELETION request indication.

FIG. 453 is a table representing the detail of a HANDOVER BRANCH DELETION response confirmation sent from the TACAF to TACF to confirm the HANDOVER BRANCH DELETION request indication.

FIG. 454 is a table representing the detail of a BEARER RELEASE request indication sent from the TACFa to TACFv to release the access bearer.

FIG. 455 is a table representing the detail of an INTRA-BCFr HANDOVER BRANCH DELETION request indication sent from the TACF to BCFr to request the release of the physical radio channel(s).

FIG. 456 is a table representing the detail of an INTRA-BCFr HANDOVER BRANCH DELETION response confirmation sent from the BCFr to TACF to indicate the release of the physical radio channel(s).

FIG. 457 is a table representing the detail of a BEARER RELEASE response confirmation sent from the TACFv to TACFa to confirm the BEARER RELEASE request indication.

FIG. 458 is a table representing the detail of a HANDOVER BRANCH DELETION request indication sent from the TACF to TACAF.

FIG. 459 is a table representing the detail of a HANDOVER BRANCH DELETION response confirmation sent from the TACAF to TACF to confirm the HANDOVER BRANCH DELETION request indication.

FIG. 460 is a table representing the detail of a RADIO BEARER RELEASE request indication sent from the TACAF to BCAF to request the radio bearer release.

FIG. 461 is a table representing the detail of a RADIO BEARER RELEASE response confirmation sent from the BCFr to TACAF to indicate the completion of the radio bearer release.

FIG. 462 is a table representing the detail of a HANDOVER CONNECTION RELEASE request indication sent from the TACF to BCF to release the indicated bearer in the diversity handover state.

FIG. 463 is a table representing the detail of a HANDOVER CONNECTION RELEASE response confirmation sent from the BCF to TACF to confirm the HANDOVER CONNECTION RELEASE request indication.

FIG. 464 is a table representing the detail of a BEARER RELEASE request indication sent from the TACFa to TACFv to release the access bearer.

FIG. 465 is a table representing the detail of another BEARER RELEASE request indication sent from the TACF to BCF to request the bearer release.

FIG. 466 is a table representing the detail of a BEARER RELEASE response confirmation sent from the BCF to TACF to confirm the BEARER RELEASE request indication.

FIG. 467 is a table representing the detail of a BEARER-AND-RADIO-BEARER RELEASE request indication sent from the TACF to BCFr to request the bearer between the BCF and BCFr and the radio bearer.

FIG. 468 is a table representing the detail of a BEARER-AND-RADIO-BEARER RELEASE response confirmation sent from the BCFr to TACF to indicate the completion of the release of the bearer and the radio bearer.

FIG. 469 is a table representing the detail of a BEARER RELEASE response confirmation sent from the TACFv to TACFa to confirm the BEARER RELEASE request indication.

FIG. 470 is a table representing the detail of a BEARER SETUP request indication sent from the TACFa to TACFv to setup an access bearer.

FIG. 471 is a table representing the detail of an INTRA-BCFr HANDOVER BRANCH REPLACEMENT response confirmation sent from the BCFr to TACF to indicate the completion of the setup of the physical radio channel(s).

FIG. 472 is a table representing the detail of an INTRA-BCFr HANDOVER BRANCH REPLACEMENT PROCEEDING request indication sent from the BCFr to TACF to indicate that the request of the handover branch replacement is accepted.

FIG. 473 is a table representing the detail of a RADIO BEARER SETUP REQUEST request indication sent from the visited TACF, which controls the newly assigned radio bearer, to the anchor TACFa to request to setup the radio bearer between the mobile terminal and BCFr controlled by the visited TACF.

FIG. 474 is a table representing the detail of a NON-SOFT HANDOVER EXECUTION request indication sent from the TACF to TACAF to notify of a non-soft handover execution request initiation.

FIG. 475 is a table representing the detail of a RADIO BEARER SETUP request indication sent from the TACAF to BCAF to request to setup a radio bearer.

FIG. 476 is a table representing the detail of a RADIO BEARER SETUP response confirmation sent from the BCAF to TACAF to indicate the completion of the radio bearer setup.

FIG. 477 is a table representing the detail of a RADIO BEARER RELEASE request indication sent from the TACAF to BCAF to request the radio bearer release.

FIG. 478 is a table representing the detail of a RADIO BEARER RELEASE response confirmation sent from the BCAF to TACAF to indicate the completion of the radio bearer release.

FIG. 479 is a table representing the detail of a BEARER SETUP response confirmation sent from the TACFa to TACFv to confirm the establishment of the access bearer.

FIG. 480 is a table representing the detail of a HANDOVER CONNECTION SETUP request indication sent from the TACFa to BCFa to notify of a handover initiation.

FIG. 481 is a table representing the detail of a HANDOVER CONNECTION SETUP response confirmation sent from the BCF to TACF to confirm the HANDOVER CONNECTION SETUP request indication.

FIG. 482 is a table representing the detail of a BEARER SETUP request indication sent from the TACFa to TACFv to set up a new handover link.

FIG. 483 is a table representing the detail of another BEARER SETUP request indication sent from the TACF to BCF to request a new handover link in the network.

FIG. 484 is a table representing the detail of a BEARER SETUP response confirmation sent from the BCF to TACF to confirm a BEARER SETUP request indication.

FIG. 485 is a table representing the detail of a BEARER-AND-RADIO-BEARER SETUP request indication sent from the TACF to BCFr to request to set up a bearer between the BCF and BCFr and a radio bearer.

FIG. 486 is a table representing the detail of a RADIO BEARER SETUP PROCEEDING request indication sent from the BCFr to TACF to indicate that the request of the access radio link setup is accepted and that the BCFr starts setting up the access radio link.

FIG. 487 is a table representing the detail of a RADIO BEARER SETUP REQUEST request indication.

FIG. 488 is a table representing the detail of a NON-SOFT ANDOVER EXECUTION request indication sent from the TACF to TACAF to notify of a NON-SOFT HANDOVER EXECUTION request indication.

FIG. 489 is a table representing the detail of a RADIO BEARER SETUP request indication sent from the TACAF to BCAF to request to set up an access radio link.

FIG. 490 is a table representing the detail of a RADIO BEARER SETUP response confirmation sent from the BCAF to TACAF to indicate the completion of the setup of the access radio link.

FIG. 491 is a table representing the detail of a RADIO BEARER RELEASE request indication sent from the TACAF to BCAF to request to release the access radio link.

FIG. 492 is a table representing the detail of a RADIO BEARER RELEASE response confirmation sent from the BCAF to TACAF to request to release the access radio link.

FIG. 493 is a table representing the detail of a BEARER-AND-RADIO-BEARER SETUP response confirmation sent from the BCFr to TACF to indicate the completion of the setup of the access radio link and the link between the BCFr and BCF.

FIG. 494 is a table representing the detail of a BEARER SETUP response confirmation sent from the TACFa to TACFv to confirm the establishment of the handover link.

FIG. 495 is a table representing the detail of a HANDOVER CONNECTION RELEASE request indication sent from the TACF to BCFa to request to remove the indicated handover link.

FIG. 496 is a table representing the detail of a HANDOVER CONNECTION RELEASE response confirmation sent from the BCF to TACF to confirm the HANDOVER CONNECTION RELEASE-request indication.

FIG. 497 is a table representing the detail of a BEARER RELEASE request indication sent from the TACFa to TACFv to request to release the handover link in the network.

FIG. 498 is a table representing the detail of another BEARER RELEASE request indication sent from the TACF to BCF to request to release the handover link in the network.

FIG. 499 is a table representing the detail of a BEARER RELEASE response confirmation sent from the BCF to TACF to confirm the BEARER RELEASE request indication.

FIG. 500 is a table representing the detail of a BEARER-AND-RADIO-BEARER RELEASE request indication sent from the TACF to BCFr to request to release the access link or handover link between the BCF and BCFr and between BCAF and BCF.

FIG. 501 is a table representing the detail of a BEARER-AND-RADIO-BEARER RELEASE response confirmation sent from the BCFr to TACF to indicate the completion of the release of the access link or hand over link.

FIG. 502 is a table representing the detail of a BEARER RELEASE response confirmation sent from the TACFv to TACFa to confirm the BEARER RELEASE request indication.

FIG. 503 is a table representing the detail of a HANDOVER CONNECTION SETUP request indication sent from a TACFa to a BAFa to notify of a handover initiation and to request to setup an ACCH.

FIG. 504 is a table representing the detail of a HANDOVER CONNECTION SETUP response confirmation sent from the BCF to the TACFa to confirm the HANDOVER CONNECTION SETUP request indication.

FIG. 505 is a table representing the detail of a BEARER SETUP request indication sent from the TACFa to a TACFv to setup an access bearer for the ACCH.

FIG. 506 is a table representing the detail of another BEARER SETUP request indication sent from the TACFv to the BCF to setup an access bearer for the ACCH.

FIG. 507 is a table representing the detail of a BEARER SETUP response confirmation sent from the BCF to the TACFv to confirm the BEARER SETUP request indication.

FIG. 508 is a table representing the detail of a BEARER-AND-RADIO-BEARER SETUP request indication sent from the TACFv to the BCFr.

FIG. 509 is a table representing the detail of a RADIO BEARER SETUP PROCEEDING request indication sent from the BCFr to the TACFv.

FIG. 510 is a table representing the detail of a RADIO BEARER SETUP REQUEST request indication.

FIG. 511 is a table representing the detail of another RADIO BEARER SETUP request indication sent from the TACFa to TACAF.

FIG. 512 is a table representing the detail of another RADIO BEARER SETUP request indication sent from the TACAF to BCAF.

FIG. 513 is a table representing the detail of a RADIO BEARER SETUP response confirmation sent from the BCAF to the TACAF to indicate the completion of the radio bearer setup for the new ACCH.

FIG. 514 is a table representing the detail of a RADIO BEARER RELEASE request indication sent from the TACAF to another BCAF to request to release a previous radio bearer.

FIG. 515 is a table representing the detail of a RADIO BEARER RELEASE response confirmation sent from the BCAF to the TACAF to indicate the completion of the radio bearer release.

FIG. 516 is a table representing the detail of a HANDOVER CONNECTION RELEASE request indication sent from the TACFa to the BCFa to request to remove the previous bearer in the soft handover state.

FIG. 517 is a table representing the detail of a HANDOVER CONNECTION RELEASE response confirmation sent from the BCF to the TACF to confirm the HANDOVER CONNECTION RELEASE request indication.

FIG. 518 is a table representing the detail of a BEARER RELEASE request indication sent from the TACFa to TACFv to request to release the access bearer FIG. 519 is a table representing the detail of another BEARER RELEASE request indication sent from the TACF to BCF to request to release the bearer.

FIG. 520 is a table representing the detail of a BEARER RELEASE response confirmation sent from the BCF to the TACF to confirm the BEARER RELEASE request indication.

FIG. 521 is a table representing the detail of a BEARER-AND-RADIO-BEARER RELEASE request indication sent from the TACF to BCFr to request to release the bearer between the BCF and BCFr and the radio bearer.

FIG. 522 is a table representing the detail of a BEARER-AND-RADIO-BEARER RELEASE response confirmation sent from the BCFr to TACAF to indicate the completion of the release of the bearer and radio bearer.

FIG. 523 is a table representing the detail of a BEARER RELEASE response confirmation sent from the TACFv to TACFa to confirm the BEARER RELEASE request indication.

FIG. 524 is a table representing the detail of a CODE REPLACEMENT request indication sent from a BCFr to a TACF to request change of codes.

FIG. 525 is a table representing the detail of another CODE REPLACEMENT request indication sent from the visited TACF to a TACFa to request change of codes.

FIG. 526 is a table representing the detail of another CODE REPLACEMENT request indication sent from the TACF to a TACAF to request change of codes.

FIG. 527 is a table representing the detail of another CODE REPLACEMENT request indication sent from the TACAF to the BCAF to request to change of codes.

FIG. 528 is a table representing the detail of a CODE REPLACEMENT response confirmation sent from the BCAF to the TACAF to indicate the completion of the change of codes.

FIG. 529 is a table representing the detail of another CODE REPLACEMENT response confirmation sent from the TACAF to the TACFa to confirm the CODE REPLACEMENT request indication.

FIG. 530 is a table representing the detail of another CODE REPLACEMENT response confirmation sent from the TACFa to the TACFv to confirm the CODE REPLACEMENT request indication.

FIG. 531 is a table representing the detail of another CODE REPLACEMENT response confirmation sent from the TACF to the BCFr to confirm the CODE REPLACEMENT request indication.

FIG. 532 is a table representing the detail of a CELL CONDITION REPORT request indication sent from an MRRC to an RRC periodically to notify of the radio conditions of respective handover branches.

FIG. 533 is a table representing the detail of a TRANSMISSION POWER CONTROL request indication sent from a TACFa to TACFv to notify of the instructed transmission power.

FIG. 534 is a table representing the detail of another TRANSMISSION POWER CONTROL request indication sent from a TACFv to BCFr to notify of the instructed transmission power.

FIG. 535 is a table representing the detail of an LAI UPDATE request indication sent from the visited SCF to the SDF.

FIG. 536 is a table representing the detail of a TERMINAL LOCATION UPDATE request indication sent from the SACF to the visited SCF.

FIG. 537 is a table representing the detail of another TERMINAL LOCATION UPDATE request indication sent from the MCF to the SACF.

FIG. 538 is a table representing the detail of an AUTHENTICATION INFORMATION RETRIEVAL request indication and an AUTHENTICATION INFORMATION RETRIEVAL response confirmation.

FIG. 539 is a table representing the detail of an AUTHENTICATION CHALLENGE request indication and the AUTHENTICATION CHALLENGE response confirmation transported between the LRCF and TACF; and the LRCF and SACF.

FIG. 540 is a table representing the detail of an AUTHENTICATION CHALLENGE request indication and an AUTHENTICATION CHALLENGE response confirmation transported between the TACF and TACAF; and the SACF and MCF.

FIG. 541 is a table representing the detail of an AUTHENTICATION request indication and an AUTHENTICATION response confirmation.

FIG. 542 is a table representing the detail of a start ciphering IF transported between the TACF and TACAF; and the LRCF to TACF.

FIG. 543 is a table representing the detail of another start ciphering IF transported between the LRCF and SACF.

FIG. 544 is a table representing the detail of a TMUI ASSIGNMENT request indication and a TMUI ASSIGNMENT response confirmation transported between the TACF and TACAF.

FIG. 545 is a table representing the detail of a TMUI QUERY request indication and a TMUI QUERY response confirmation.

FIG. 546 is a table representing the detail of a TMUI MODIFY request indication and a TMUI MODIFY response confirmation.

FIG. 547 is a table representing the detail of another TMUI ASSIGNMENT request indication and another TMUI ASSIGNMENT response confirmation transported between the LRCF to TACF.

FIG. 548 is a table representing the detail of another TMUI ASSIGNMENT request indication and another TMUI ASSIGNMENT response confirmation transported between the LRCF and SACF.

FIG. 549 is a table representing the detail of another TMUI ASSIGNMENT request indication and another TMUI ASSIGNMENT response confirmation transported between the SACF and MCF.

FIG. 550 is a table representing the detail of an IMUI RETRIEVAL request indication and an IMUI RETRIEVAL response confirmation transported between the LRCF and LRDF.

FIG. 551 is a table representing the detail of another IMUI RETRIEVAL request indication and another IMUI RETRIEVAL response confirmation transported between the SACF and LRCF.

FIG. 552 is a table representing the detail of another IMUI RETRIEVAL request indication and another IMUI RETRIEVAL response confirmation transported between the MCF and SACF.

FIG. 553 is a table representing the detail of another IMUI RETRIEVAL request indication and another IMUI RETRIEVAL response confirmation transported between the TACF and LRCF.

FIG. 554 is a table representing the detail of another IMUI RETRIEVAL request indication and another IMUI RETRIEVAL response confirmation transported between the TACAF and TACF.

FIG. 555 is a table representing the detail of the service access point identifier in a layer 3 compatible sub-sub-layer PDU.

FIG. 556 is a table representing the detail of the ST in the layer 3 compatible sub-sub-layer PDU.

FIG. 557 is a table representing the detail of the code type indicator in the layer 3 compatible sub-sub-layer PDU.

FIG. 558 is a table representing the detail of the reserved parameter in the layer 3 compatible sub-sub-layer PDU.

FIGS. 559 and 560 form a table representing various types of LLC protocol data units (PDUs).

FIG. 561 is a table representing the relationship between the length of CRC fields in an MAC PDU and channels through which corresponding frame is transmitted.

FIG. 562 is a table representing the bit coding of the ST field in a layer 1 frame and the meaning thereof.

FIG. 563 is a table representing the bit coding of the BI field in a layer 1 frame and the meaning thereof.

FIG. 564 is a table representing the bit coding of the uplink interference field in a layer 1 frame and the meaning thereof.

FIG. 565 is a table representing the relationship between the usage of the PID field in a layer 1 frame and the range of PID value.

FIG. 566 is a table representing the bit coding of the U/C field in a layer 1 frame and the meaning thereof.

FIG. 567 is a table representing the bit coding of the TN field in a layer 1 frame and the meanings thereof.

FIG. 568 is a table representing the bit coding of the MO field in a layer 1 frame and the meanings thereof.

FIG. 569 is a table representing the relationship between the length of CRC fields and channels through which corresponding frames are transmitted.

FIG. 570 is a list representing various messages belonging to CC (call/connection control) entity message.

FIG. 571 through 573 form a list representing information elements constituting an alerting message.

FIG. 574 through 576 form a list representing information elements constituting a call proceeding message.

FIG. 577 through 581 form a list representing information elements constituting a connect message.

FIG. 582 is a list representing information elements constituting a connect acknowledge message.

FIGS. 583 through 585 form a list representing information elements constituting a progress message.

FIGS. 586 through 594 form a list representing information elements constituting a setup message.

FIG. 595 is a list representing information elements constituting a release message.

FIG. 596 is a list representing information elements constituting a release complete message.

FIG. 597 is a list representing information elements constituting an information message.

FIG. 598 is a list representing a message (mobility facility message) belonging to the MM-T (terminal mobility management) entity message.

FIG. 599 is a list representing the generic formats of the mobility facility message.

FIGS. 600 and 601 form a list representing information elements constituting a mobility facility message transferred from a mobile station to the network for requesting terminal location registration.

FIG. 602 is a list representing information elements constituting a mobility facility message indicating "return result" issued when the terminal location has been normally registered.

FIG. 603 is a list representing information elements constituting a mobility facility message indicating "return error" issued when an abnormality, for example, an application error has occurred.

FIG. 604 is a list representing information elements constituting a mobility facility message indicating "return error" when an abnormality, for example, a discrepancy of an information element has occurred.

FIG. 605 is a list representing information elements constituting a mobility facility message transferred for notifying a mobile station of the TMUI allocated to the mobile station.

FIG. 606 is a list representing information elements constituting a mobility facility message indicating "return result" issued when the TMUI has been normally assigned.

FIG. 607 is a list representing information elements constituting a mobility facility message indicating "return error" issued when an abnormality, for example, an application error has occurred.

FIG. 608 is a list representing information elements constituting a mobility facility message indicating "return error" when an abnormality, for example, a discrepancy of an information element has occurred.

FIGS. 609 and 610 form a list representing information elements constituting a mobility facility message transferred from the network to a mobile station for authenticating the mobile station by the mobile service switching center.

FIG. 611 is a list representing information elements constituting a mobility facility message indicating "return result" issued when the authentication has been normally requested.

FIG. 612 is a list representing information elements constituting a mobility facility message indicating "return error" issued when an abnormality, for example, an application error has occurred.

FIG. 613 is a list representing information elements constituting a mobility facility message indicating "return error" when an abnormality, for example, a discrepancy of an information element has occurred.

FIG. 614 is a list representing information elements constituting a mobility facility message transferred for notifying a mobile station of ciphering onset.

FIG. 615 is a list representing information elements constituting a mobility facility message indicating "return result" issued when the ciphering onset has been normally notified.

FIG. 616 is a list representing information elements constituting a mobility facility message indicating "return error" issued when an abnormality, for example, an application error has occurred.

FIG. 617 is a list representing information elements constituting a mobility facility message indicating "return error" when an abnormality, for example, a discrepancy of an information element has occurred.

FIG. 618 is a list representing information elements constituting a mobility facility message transferred for inquiring of a mobile station as to the IMUI of the mobile station.

FIG. 619 is a list representing information elements constituting a mobility facility message indicating "return result" issued when the IMUI has been normally inquired.

FIG. 620 is a list representing information elements constituting a mobility facility message indicating "return error" issued when an abnormality, for example, an application error has occurred.

FIG. 621 is a list representing information elements constituting a mobility facility message indicating "return error" when an abnormality, for example, a discrepancy of an information element has occurred.

FIG. 622 is a list representing messages belonging to RBC entity message.

FIG. 623 is a list representing classification of RBC entity message.

FIG. 624 is a list representing the format of radio bearer setup message.

FIG. 625 is a list representing the format of radio bearer release message.

FIG. 626 is a list representing the format of radio bearer release complete message.

FIG. 627 is a list representing the format of handover command message.

FIG. 628 is a list representing the format of handover response message.

FIG. 629 is a list representing a message (radio resource facility message) belonging to RRC entity message.

FIG. 630 is a list representing the format of the RRC facility message.

FIG. 631 is a list representing TAC entity messages.

FIG. 632 is a list representing the relationship between TAC entity message and information flow.

FIG. 633 is a list representing the format of a terminal association setup message.

FIG. 634 is a list representing the format of a terminal association connect message.

FIG. 635 is a list representing the format of a paging response message.

FIG. 636 is a list representing the format of a terminal association release message.

FIG. 637 is a list representing the format of a terminal association release message.

FIG. 638 is a list representing the format of a page authorized message.

FIG. 639 is a list representing the format of a signaling channel setup request message.

FIG. 640 is a list representing the format of a signaling channel setup response message.

FIG. 641 is a list representing the format of a signaling channel setup failure message.

FIG. 642 is a list representing the format of a first broadcast information message.

FIG. 643 is a list representing the format of a second broadcast information message.

FIG. 644 is a list representing the format of a paging message.

FIG. 645 is a list representing the bit coding manner of a protocol discriminator in the CC entity message.

FIGS. 646 and 647 form a list representing the bit coding manner of a message type identifier.

FIGS. 648 and 649 form a list representing the bit coding manner of a variable length information element according to FPLMTS.

FIG. 650 is a list representing the bit coding manner of a broadband locking shift information element.

FIG. 651 is a list representing the bit coding manner of a broadband non-locking shift information element.

FIGS. 652 through 654 form a list representing the bit coding manner of an AAL parameter information element.

FIG. 655 is a list representing the bit coding manner of an ATM traffic descriptor information element.

FIG. 656 is a list representing the bit coding manner of a broadband bearer capability information element.

FIG. 657 is a list representing the bit coding manner of a broadband high layer information element.

FIGS. 658 through 660 form a list representing the bit coding manner of a broadband low layer information element.

FIG. 661 is a list representing the bit coding manner of a called party number information element.

FIG. 662 is a list representing the bit coding manner of a called party sub-address information element.

FIGS. 663 and 664 form a list representing the bit coding manner of a calling party number information element.

FIG. 665 is a list representing the bit coding manner of a calling party sub-address information element.

FIG. 666 is a list representing the bit coding manner of a connection identifier information element.

FIG. 667 is a list representing the bit coding manner of an end-to-end transit delay information element.

FIG. 668 is a list representing the bit coding manner of a QOS parameter information element.

FIG. 669 is a list representing the bit coding manner of a broadband repeat indicator information element.

FIG. 670 is a list representing the bit coding manner of a transit network selection information element.

FIG. 671 is a list representing the bit coding manner of an OAM traffic descriptor information element.

FIG. 672 is a list representing the bit coding manner of an MM-T specific information elements.

FIG. 673 is a list representing parameters of a candidate zone information for call attempt or acceptance.

FIG. 674 is a list representing parameters of an in-use zone information.

FIG. 675 is a list representing parameters of an added zone information for DHO.

FIG. 676 is a list representing parameters of a deleted zone information for DHO.

FIG. 677 is a list representing parameters of a HHO zone information.

FIG. 678 is a list representing parameters of an outer loop information.

FIG. 679 is a list representing parameters of a quality deterioration notification information.

FIG. 680 is a list representing the bit coding manner of a TAC entity message.

FIG. 681 is a list representing TAC entity message specific parameters.

FIG. 682 is a list representing the bit coding manner of a terminal association setup message specific parameter.

FIG. 683 is a list representing the bit coding manner of a paging response message specific parameter.

FIG. 684 is a list representing the bit coding manner of a terminal association release message specific parameter.

FIG. 685 is a list representing information elements which may be contained in subfields of TAC entity message specific parameters.

FIG. 686 is a list representing the bit coding manner of a cause information element.

FIG. 687 is a list representing the bit coding manner of a mobile station type information element.

FIG. 688 is a list representing the bit coding manner of a paged MS ID information element.

FIG. 689 is a list representing the bit coding manner of a paging ID information element.

FIG. 690 is a list representing types of BC entity messages.

FIG. 691 is a list representing a classification of BC entity messages.

FIG. 692 is a list representing structural information elements of a link setup requested message.

FIG. 693 is a list representing structural information elements of a link setup message.

FIG. 694 is a list representing structural information elements of a link setup proceeding message.

FIG. 695 is a list representing structural information elements of a link setup response message.

FIG. 696 is a list representing structural information elements of a link facility message sent from the MSCNW to the BTS.

FIG. 697 is a list representing structural information elements of another link facility message sent from the BTS to the MSCNW.

FIG. 698 is a list representing structural information elements of a link release message.

FIG. 699 is a list representing structural information elements of a link release complete message.

FIG. 700 is a list representing the combinations of the fundamental information elements in the link setup message in various uses.

FIG. 701 is a list representing the combinations of the fundamental information elements in the link setup proceeding message in various uses.

FIG. 702 is a list representing the combinations of the fundamental information elements in the link setup response message in various uses.

FIGS. 703 and 704 form a list representing the combinations of the fundamental information elements in the link facility message in various uses.

FIGS. 705 and 706 form a list representing the combinations of the fundamental information elements in the other link facility message in various uses.

FIG. 707 is a list representing a message belonging to the BSM entity message.

FIG. 708 is a list representing structural information elements of a paging message.

FIG. 709 is a list representing the format of a link ID information element.

FIG. 710 is a list representing the format of a TCH setup request information element without frequency indication.

FIG. 711 is a list representing the format of a TCH setup request information element without frequency indication.

FIG. 712 is a list representing the format of a TCH setup request information element with frequency indication.

FIG. 713 is a list representing the format of a DHO branch addition request information element.

FIG. 714 is a list representing the format of an intra-BS DHO branch addition request information element.

FIG. 715 is a list representing the format of an ACCH setup request information element.

FIG. 716 is a list representing the format of a TCH setup acceptance information element without frequency indication.

FIG. 717 is a list representing the format of a TCH setup acceptance information element without frequency indication.

FIG. 718 is a list representing the format of a TCH setup acceptance information element with frequency indication.

FIG. 719 is a list representing the format of a TCH setup response information element without frequency indication.

FIG. 720 is a list representing the format of a TCH setup response information element without frequency indication.

FIG. 721 is a list representing the format of a TCH setup response information element with frequency indication.

FIG. 722 is a list representing the format of a DHO branch addition response information element.

FIG. 723 is a list representing the format of an intra-BS DHO branch addition response information element.

FIG. 724 is a list representing the format of an ACCH setup response information element.

FIG. 725 is a list representing the format of an intra-BS DHO branch addition request information element.

FIG. 726 is a list representing the format of an intra-BS DHO branch deletion request information element.

FIG. 727 is a list representing the format of an intra-BS HHO branch addition request information element.

FIG. 728 is a list representing the format of an ACCH release request information element.

FIG. 729 is a list representing the format of a frequency replacement setup request information element without frequency indication.

FIG. 730 is a list representing the format of a frequency replacement setup request information element with frequency indication.

FIG. 731 is a list representing the format of a setup completion notification information element.

FIG. 732 is a list representing the format of an intra-BS HHO branch deletion response information element.

FIG. 733 is a list representing the format of an intra-BS HHO branch addition response information element.

FIG. 734 is a list representing the format of an ACCH release response information element.

FIG. 735 is a list representing the format of a frequency-indicated frequency replacement setup response information element.

FIG. 736 is a list representing the format of a frequency-indicated frequency replacement setup request information element.

FIG. 737 is a list representing the format of a frequency-non-indicated frequency replacement setup acceptance information element.

FIG. 738 is a list representing the format of a frequency-non-indicated frequency replacement setup response information element.

FIG. 739 is a list representing the format of a code replacement request information element.

FIG. 740 is a list representing the format of a TCH release request information element.

FIG. 741 is a list representing the format of an SDCCH release request information element.

FIG. 742 is a list representing the format of a cause information element.

FIG. 743 is a list representing the format of an SDCCH setup request information element.

FIG. 744 is a list representing the format of an LAI setup request information element.

FIG. 745 is a list representing the format of a protocol discriminator of a BC entity message.

FIG. 746 is a list representing the format of a message type identifier of a BC entity message.

FIG. 747 is a list representing the format of a protocol discriminator of a BSM entity message.

FIG. 748 is a list representing the format of a message type identifier of a BSM entity message.

FIG. 749 is a list representing the format of a number type parameter indicating the type of number which is included at octet 4 and later octets in the paged MS ID shown in FIG. 252.

FIG. 750 is a list representing the format of a number length parameter indicating the length of number which is included at octet 4 and later octets in the paged MS ID shown in FIG. 252.

Figure 751:
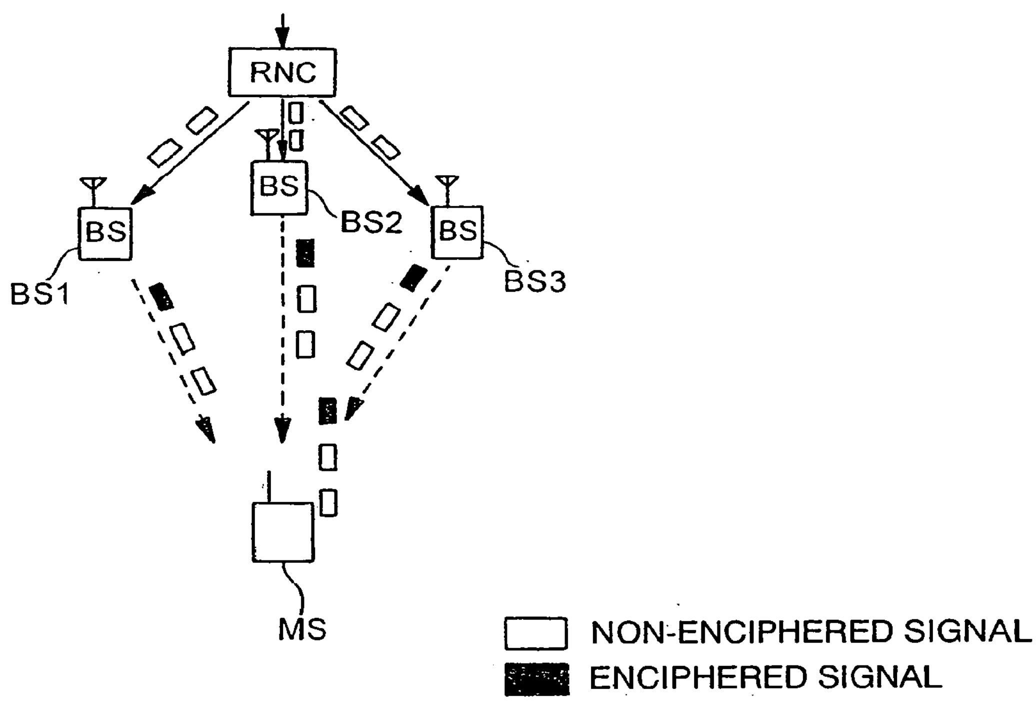

FIG. 751 is a block diagram showing a part of the mobile communications system in which a signal is ciphered and successfully received.

Figure 752:
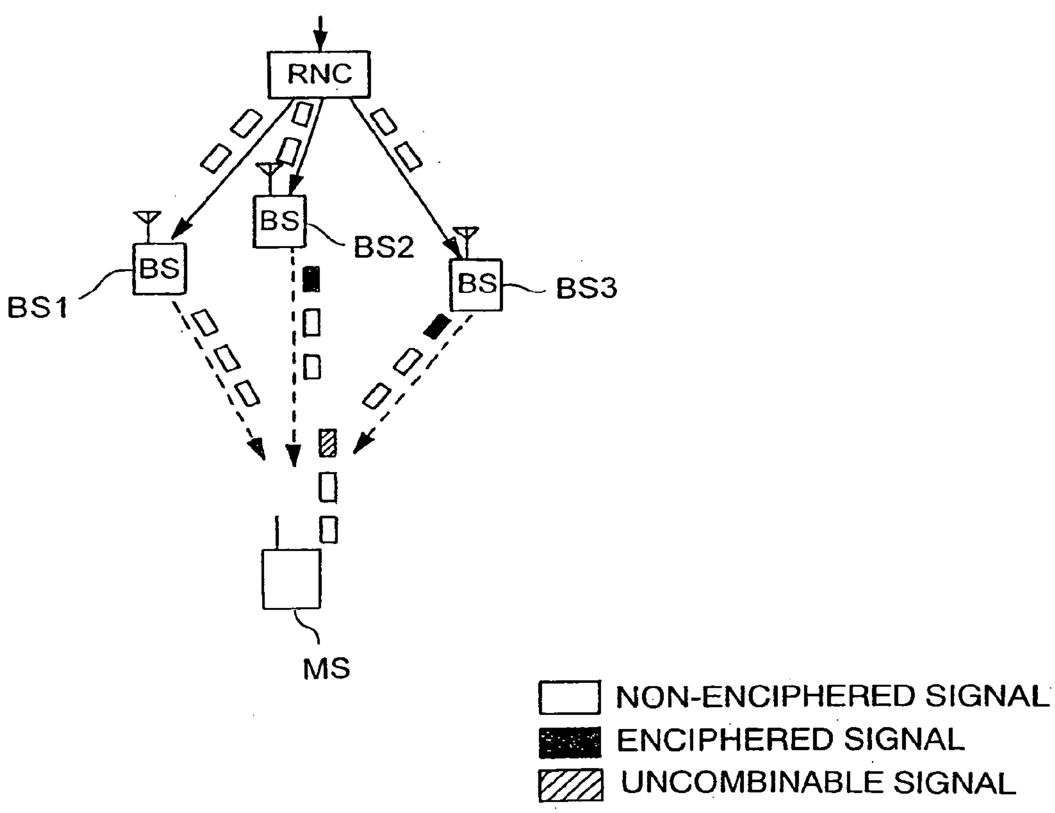

FIG. 752 is a block diagram similar to FIG. 751, but the ciphered signal is not successfully received.

Figure 753:
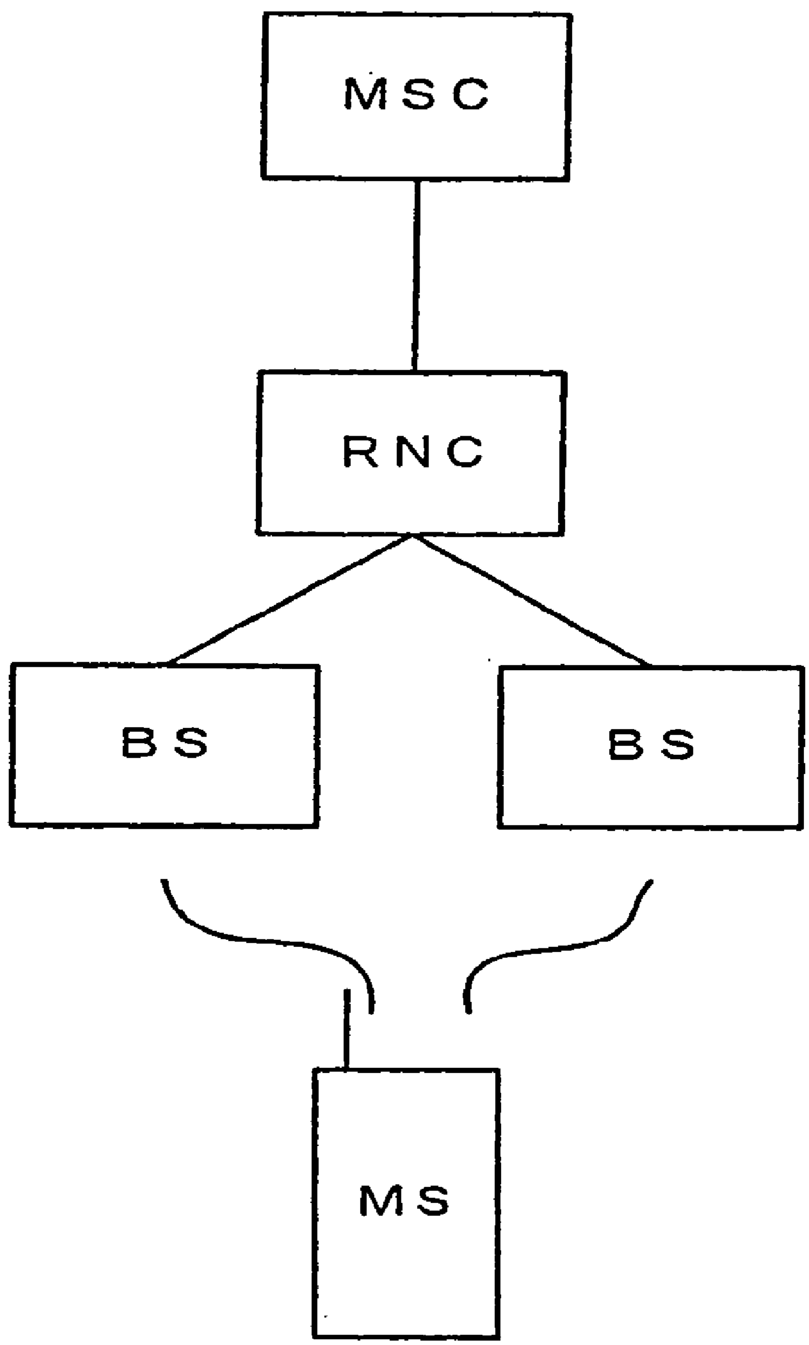

FIG. 753 is a block diagram showing a part of the mobile communications system for the description of an encipherment procedure.

Figure 754:
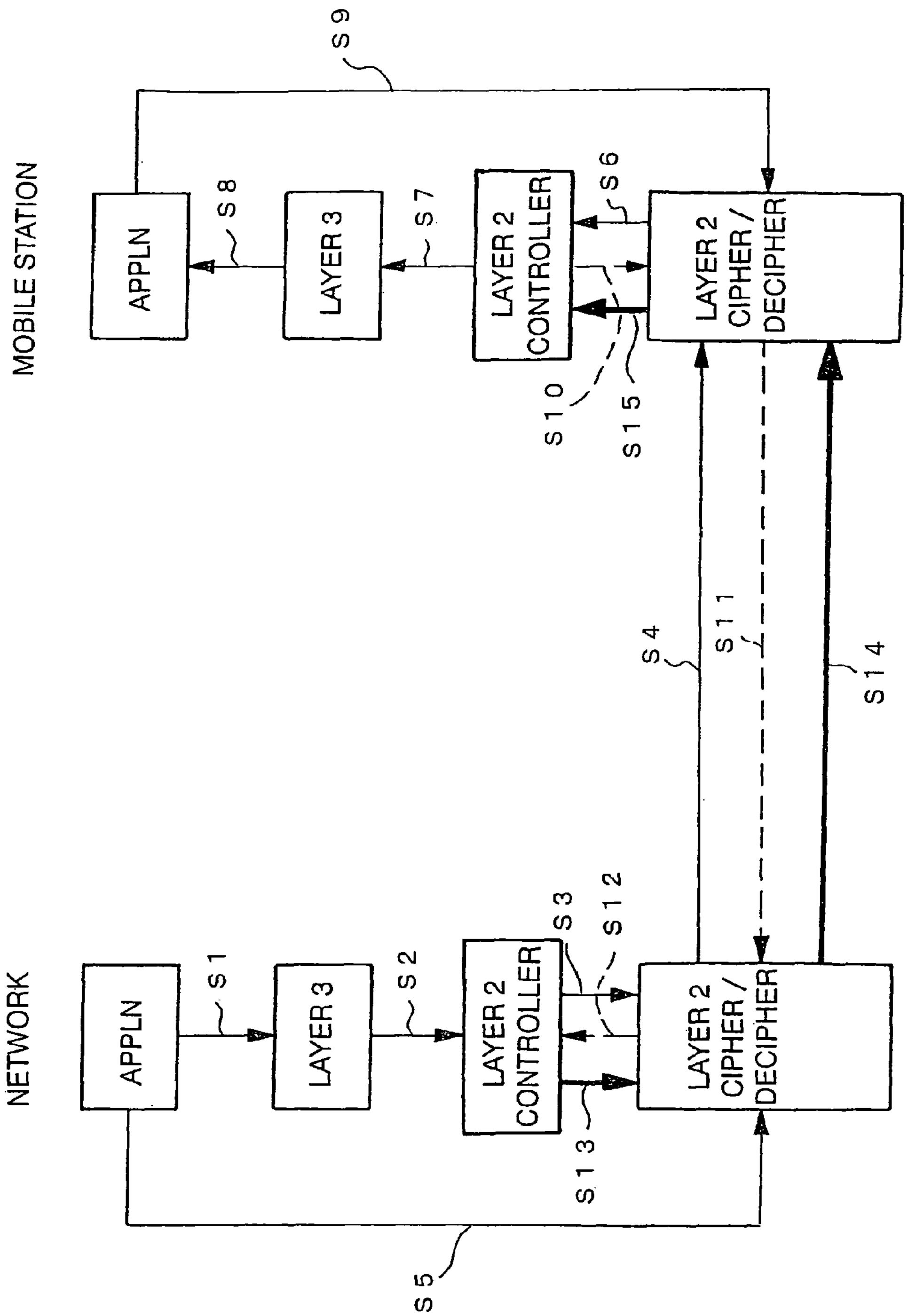

FIG. 754 is a block diagram representing the operation of the encipherment procedure in the invented system.

Figure 755:
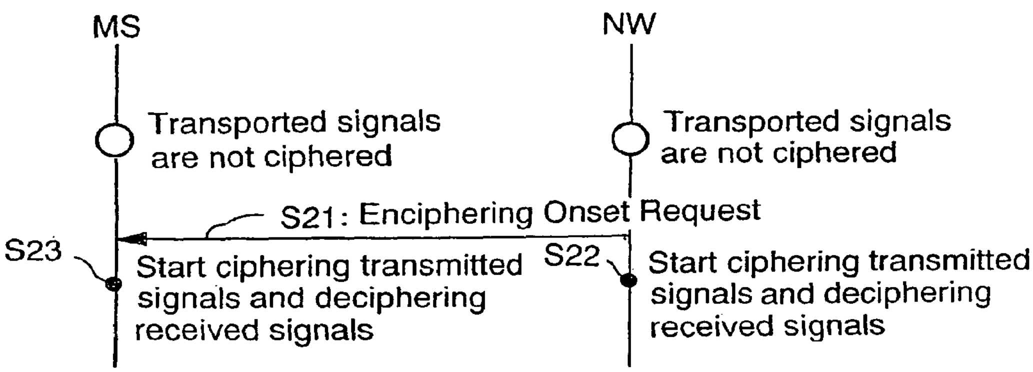

FIG. 755 is a ciphering procedure sequence diagram in normal operation where the network and the mobile station commence to encipher transmitted signals and to decipher received signals after transmission of an enciphering onset request from the network to the mobile station.

Figure 756:
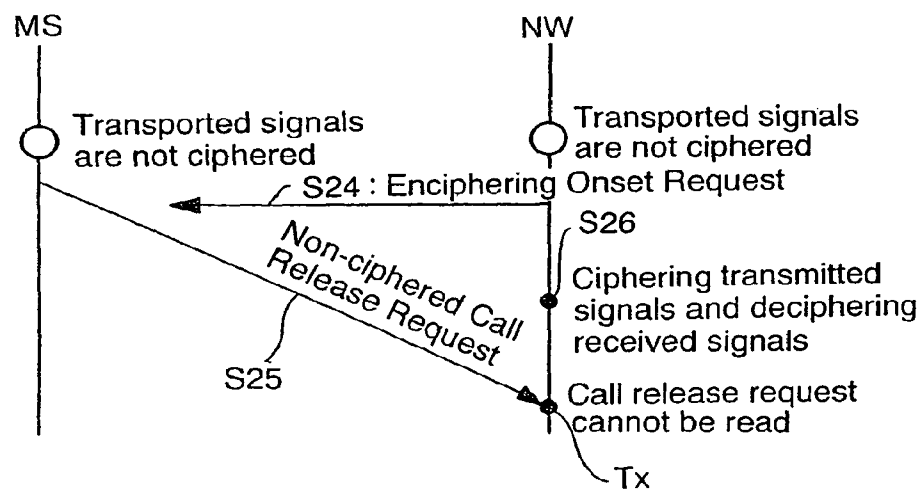

FIG. 756 is a sequence diagram representing a disadvantage of the ciphering procedure sequence represented in FIG. 755.

Figure 757:
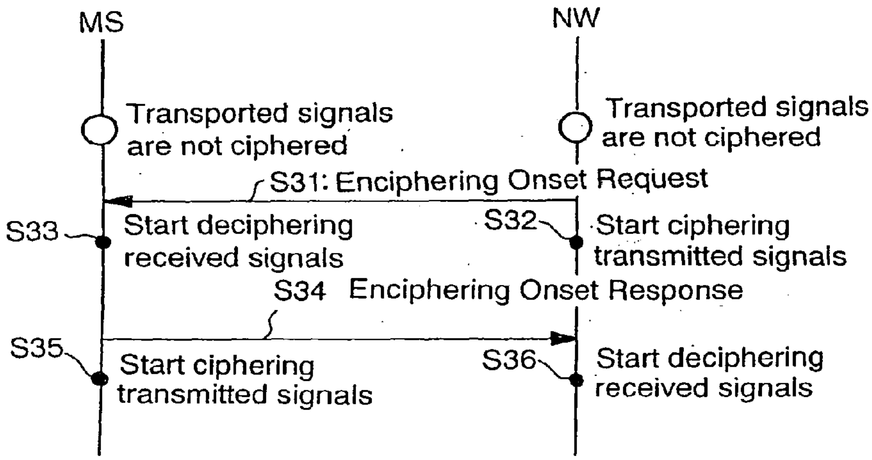

FIG. 757 is a ciphering procedure sequence diagram in normal operation according to a control method described in section 3.1.

Figure 758:
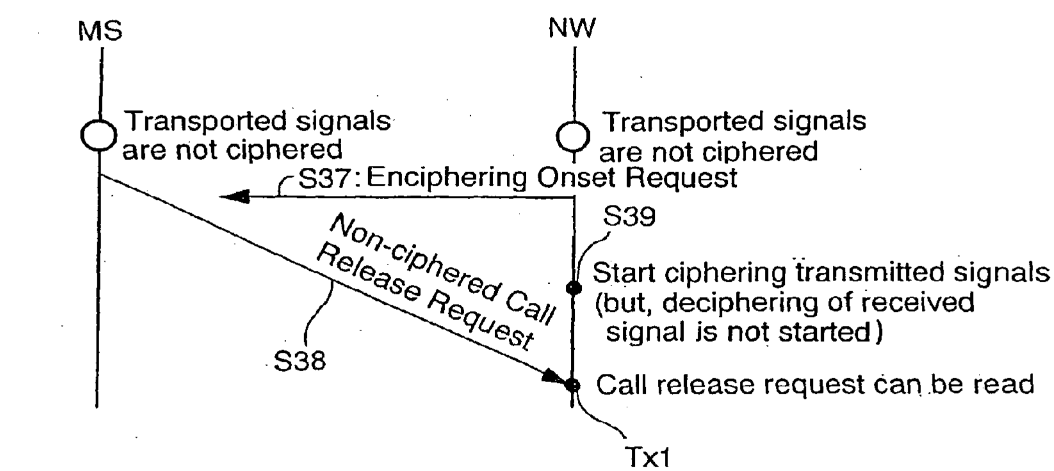

FIG. 758 is a sequence diagram representing an advantage of the ciphering procedure sequence according to a control method described in section 3.1.

Figure 759:
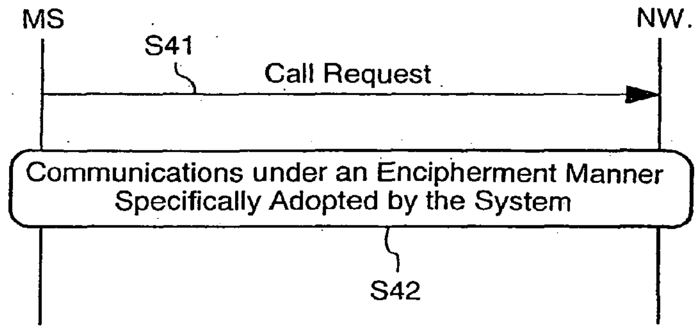

FIG. 759 is a schematic sequence diagram representing an encipherment method in a mobile communications system, in which only a specific encipherment manner is adopted.

Figure 760:
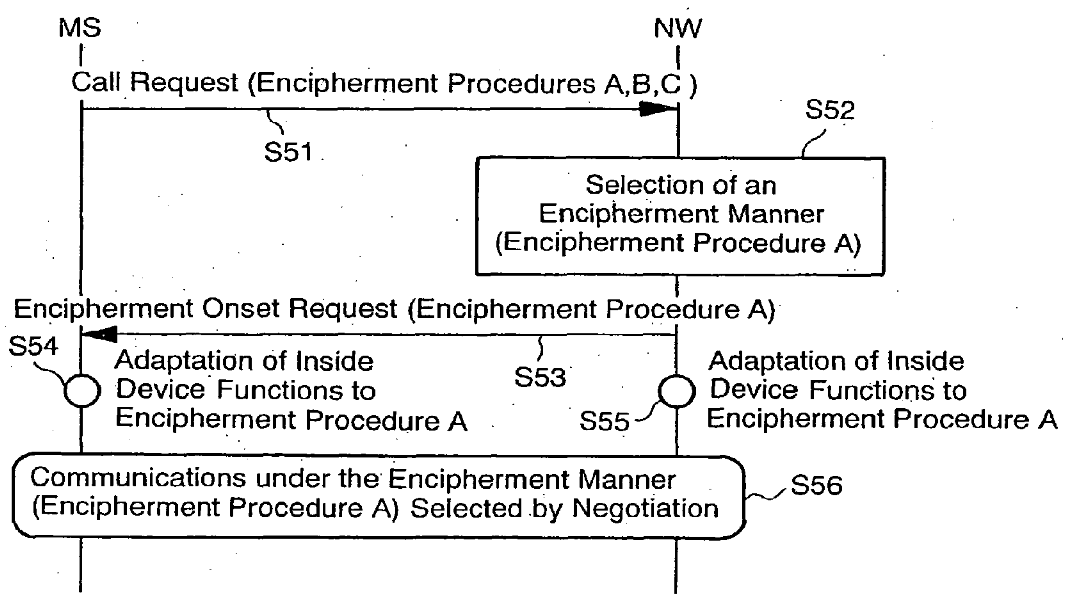

FIG. 760 represents a schematic sequence diagram representing a selection of encipherment manner by negotiation between mobile station and network in accordance with a control method described in section 3.2.

Figure 761:
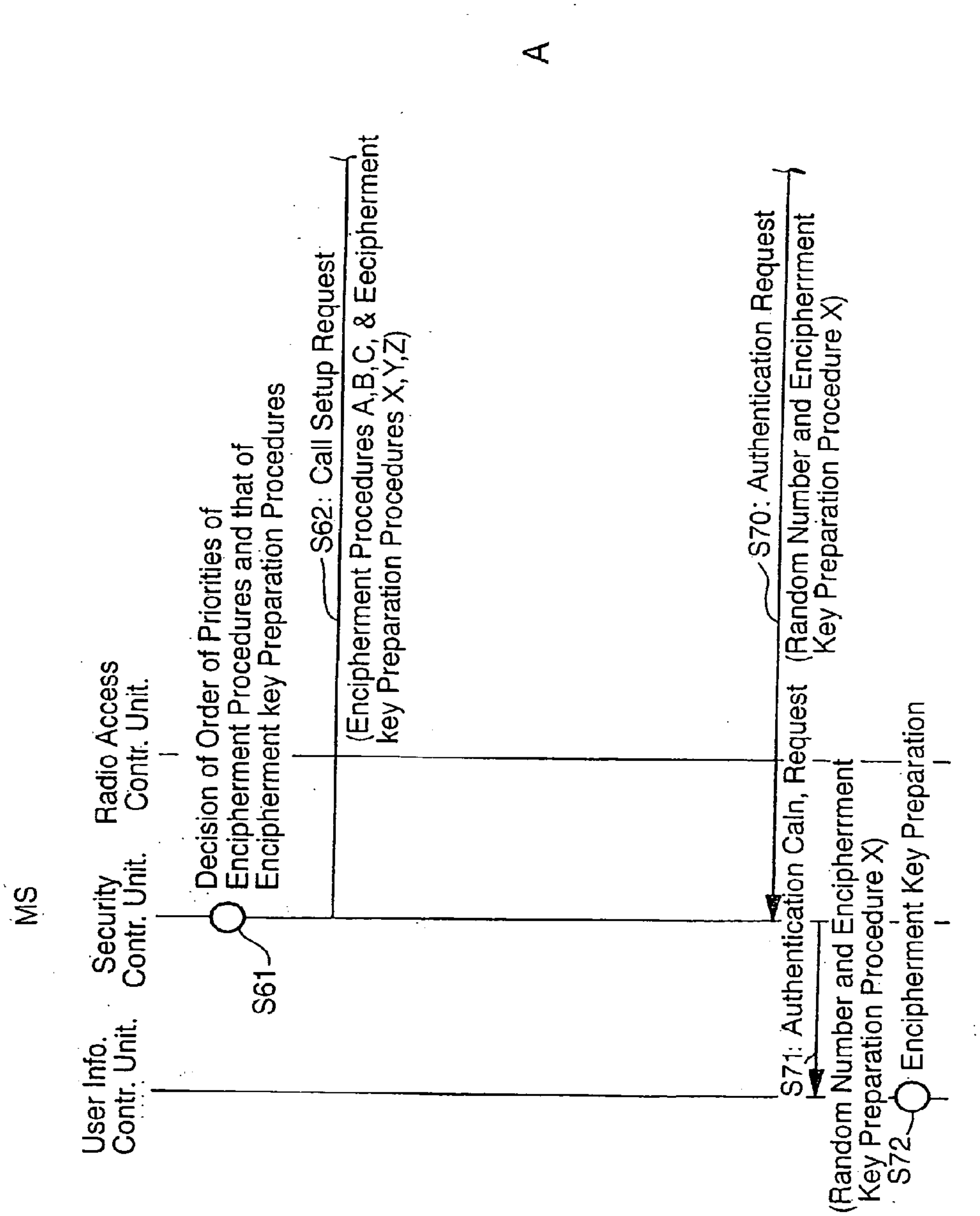
Figure 762:
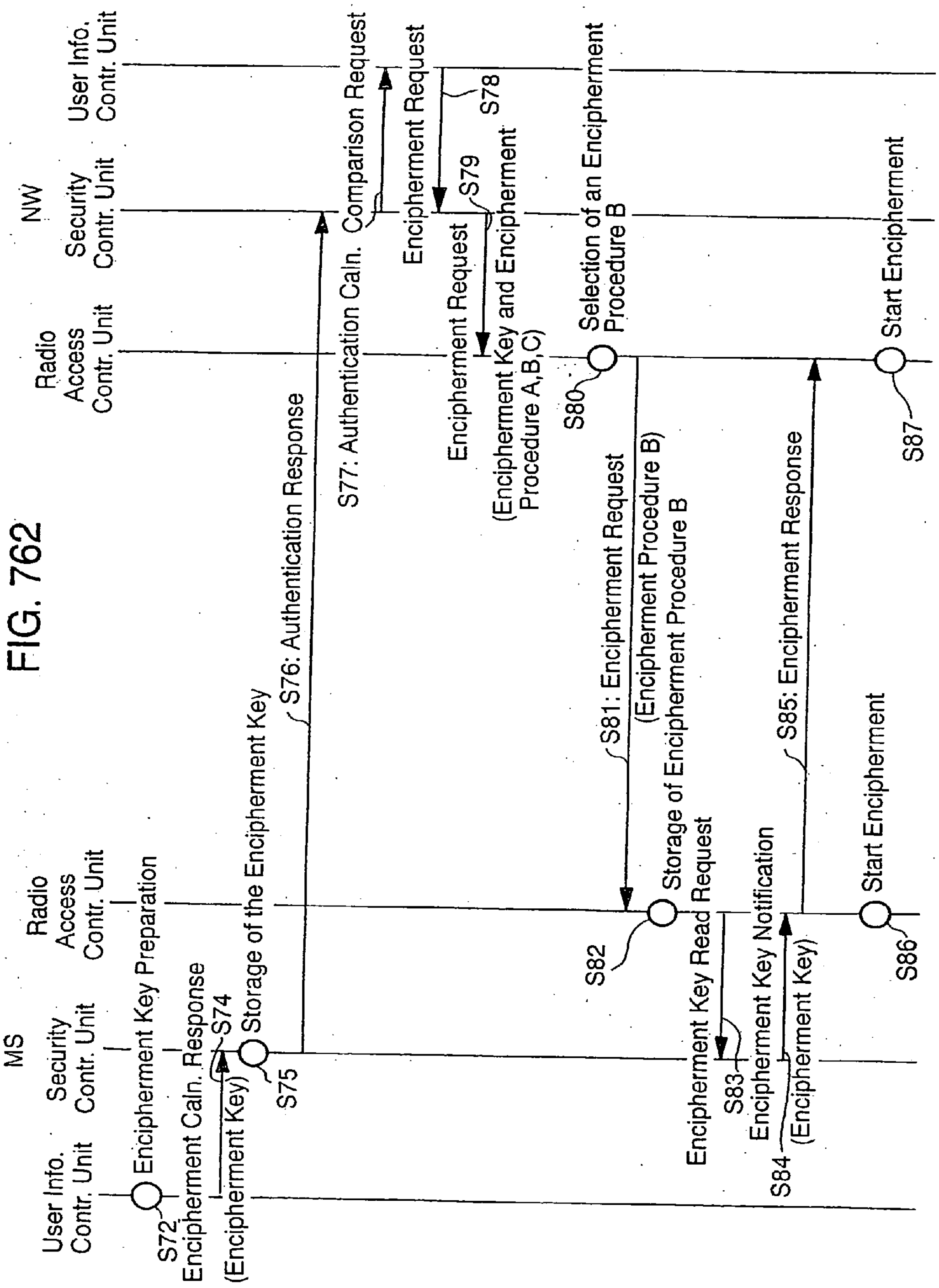

FIGS. 761 and 762 constitute a detailed sequence diagram representing the control method described in section 3.2.

Figure 763:
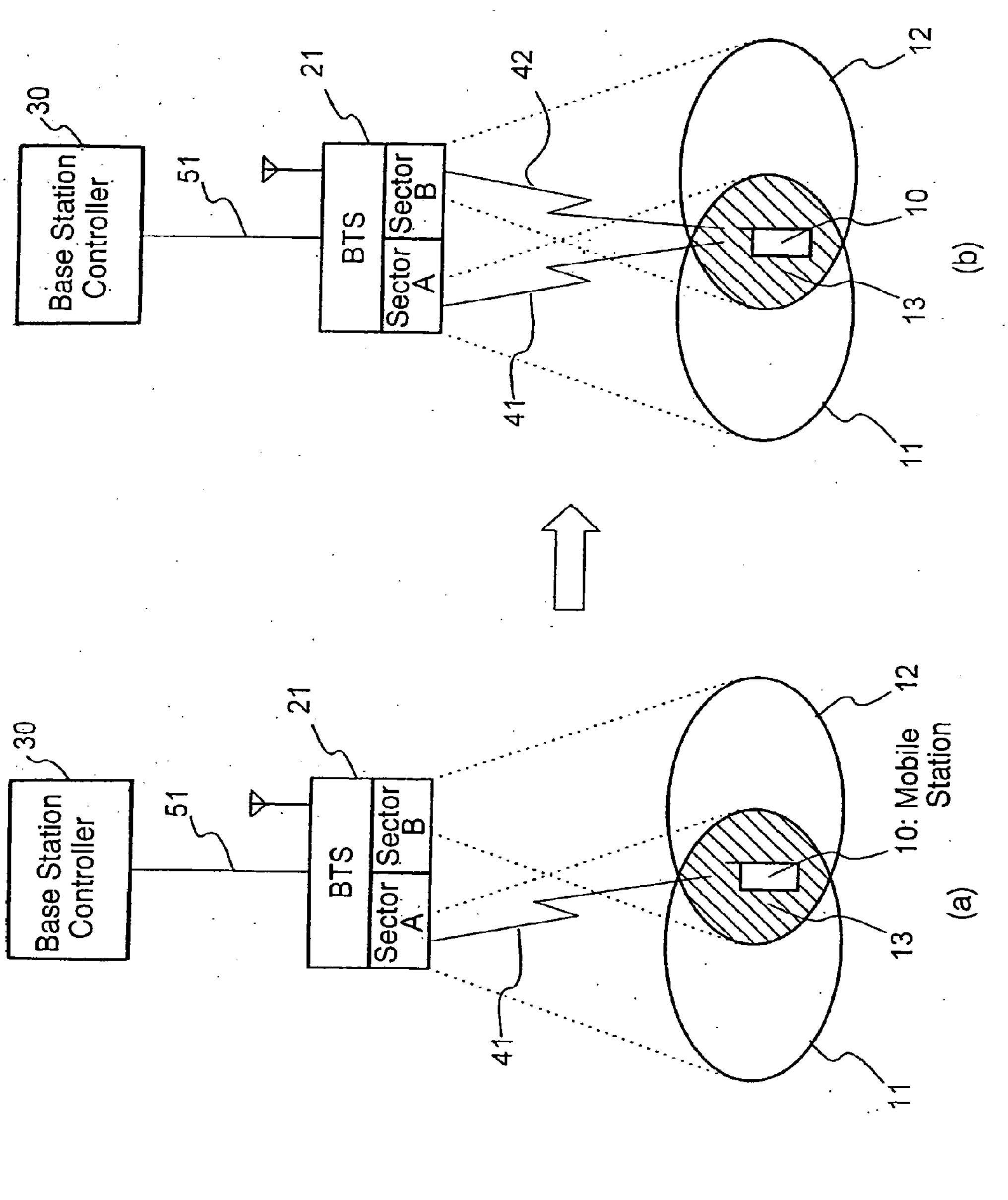

FIG. 763 is a diagram representing a conventional method for establishing access link for a mobile station when the mobile station locates at a position where intra-cell diversity handover can be carried out.

Figure 764:
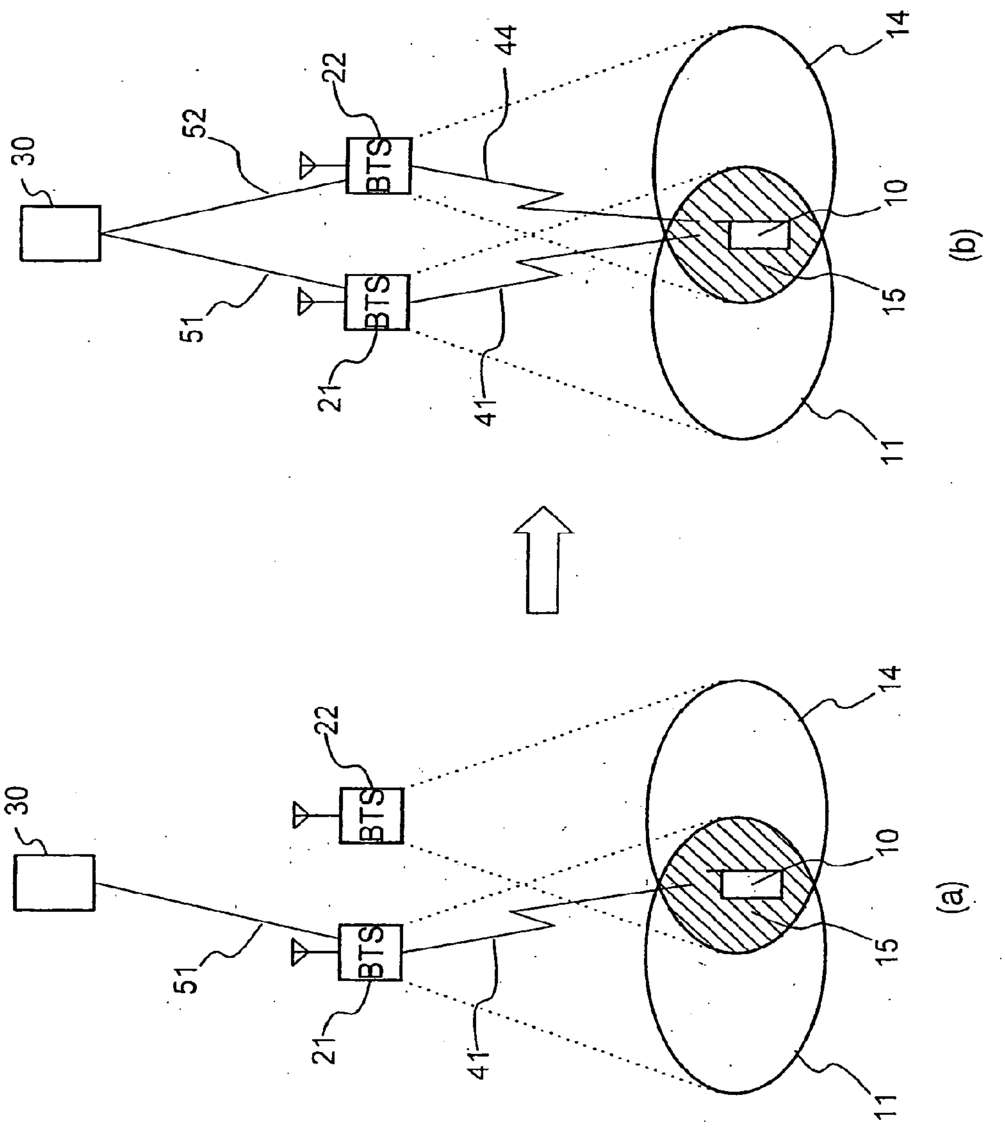

FIG. 764 is a diagram representing a conventional method for establishing access link for a mobile station when the mobile station locates at a position where inter-cell diversity handover can be carried out.

Figure 765:
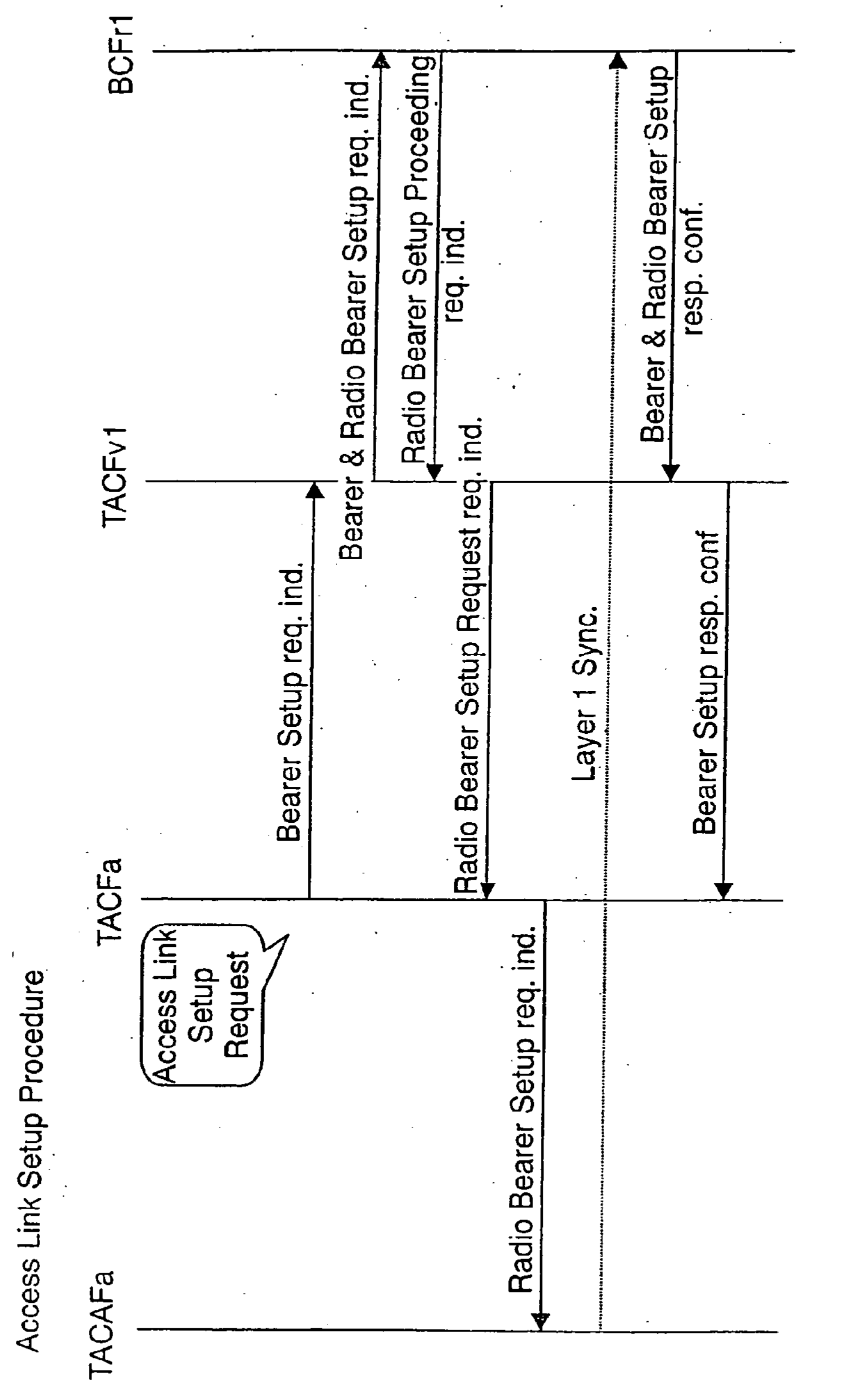

FIG. 765 is a sequential flow diagram representing a series of information flows transported between the mobile station and the network for carrying out the access link setup procedure.

Figure 766:
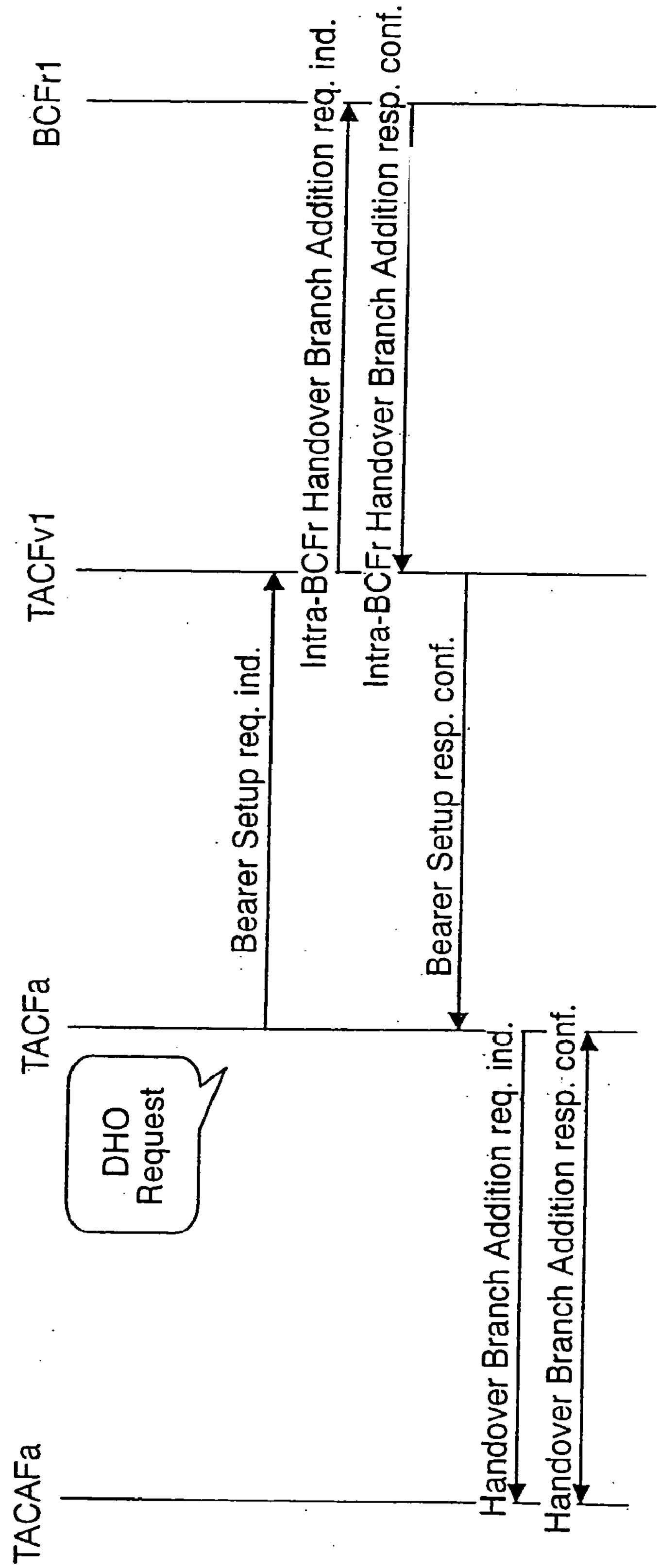

FIG. 766 is a sequential flow diagram representing a series of information flows transported between the mobile station and the network for entering the intra-cell diversity handover procedure.

Figure 767:
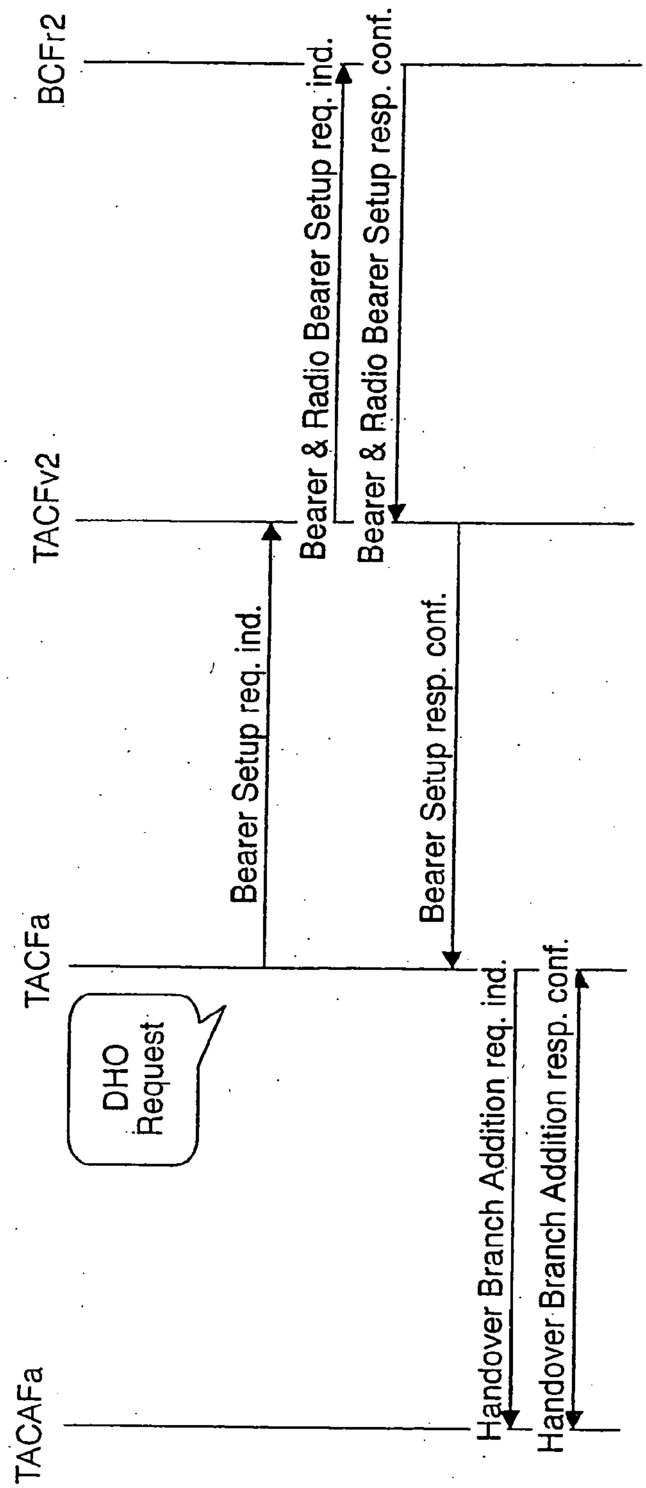

FIG. 767 is a sequential flow diagram representing a series of information flows transported between the mobile station and the network for entering the intra-cell diversity handover procedure.

Figure 768:
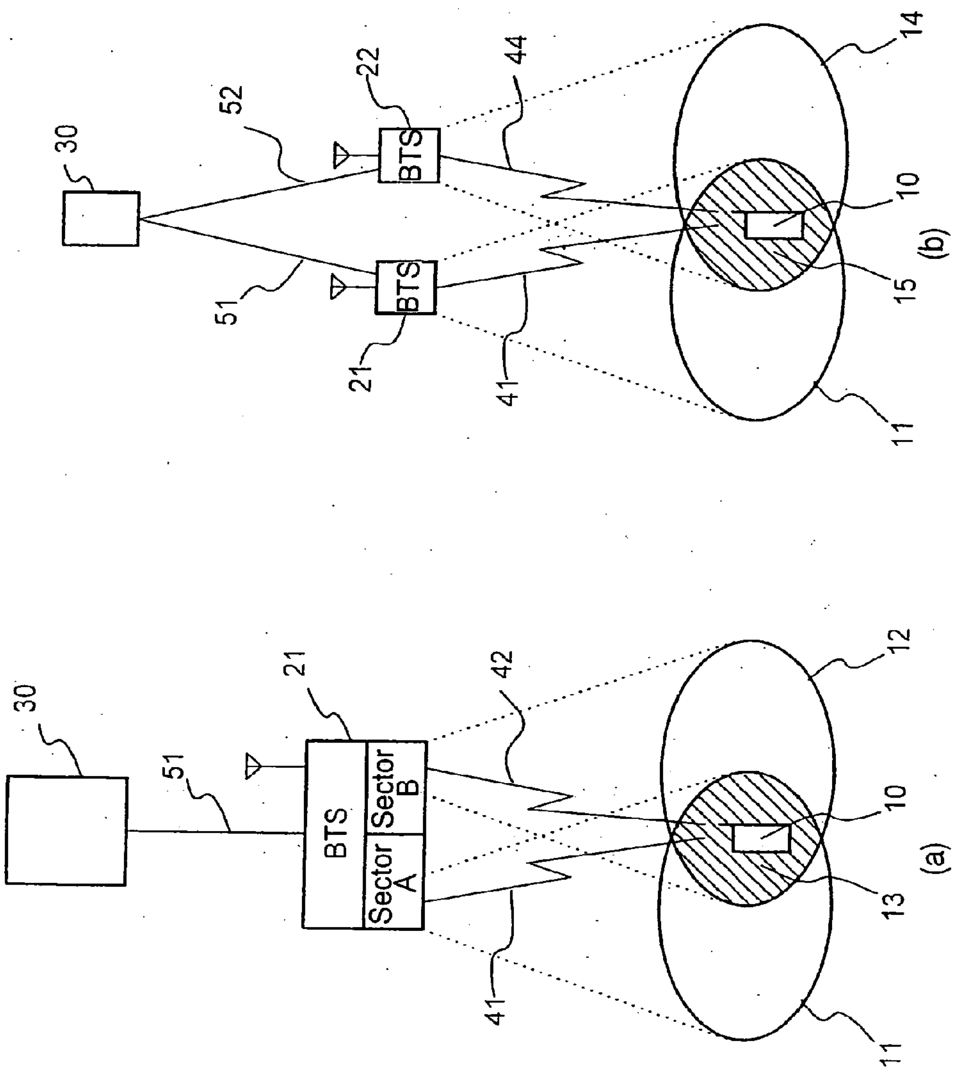

FIG. 768 is a diagram representing features of the invented system for starting diversity handover simultaneously with the access link setup.

Figure 769:
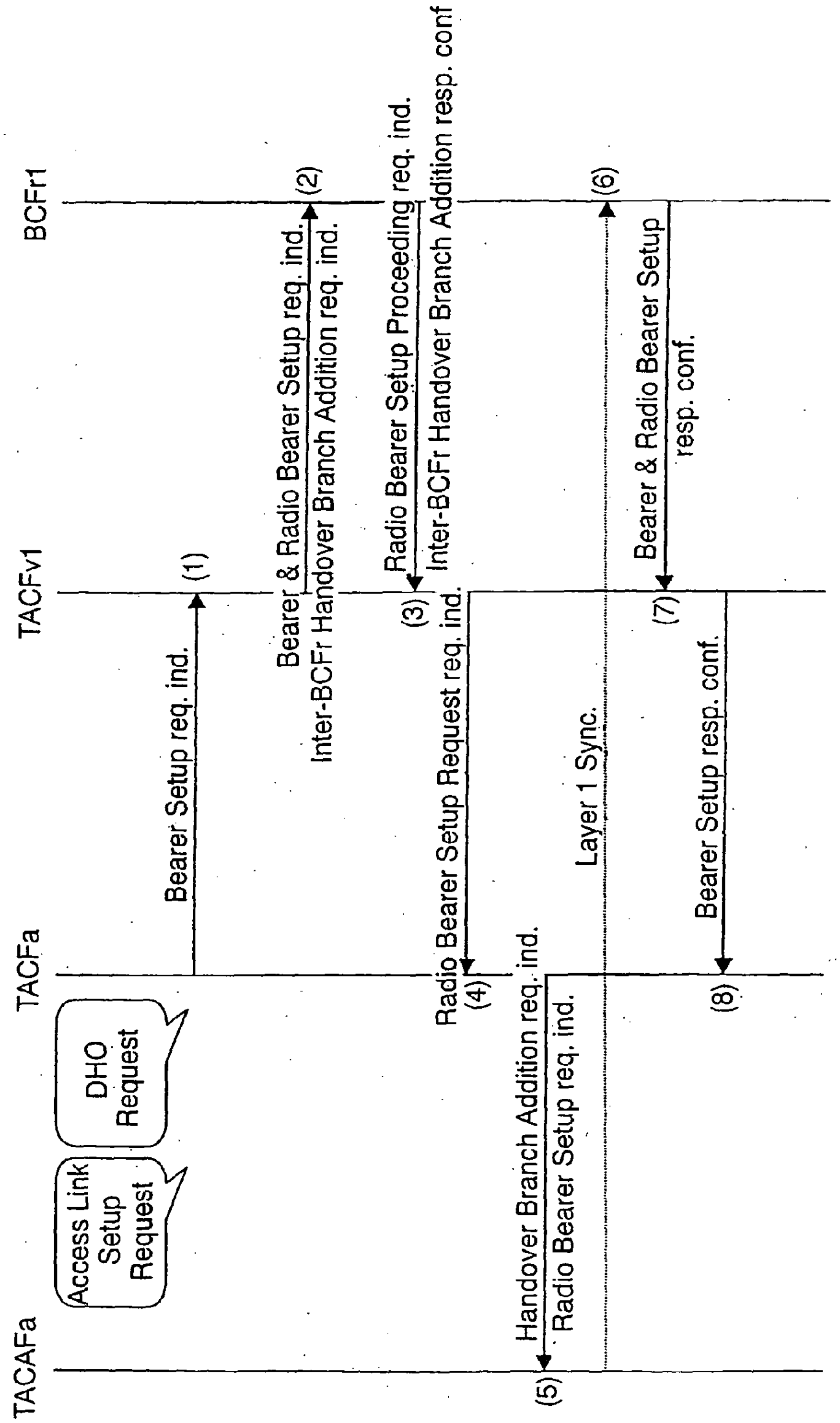

FIG. 769 is a sequential flow diagram representing the start of intra-cell diversity handover simultaneously with the access link setup.

Figure 770:
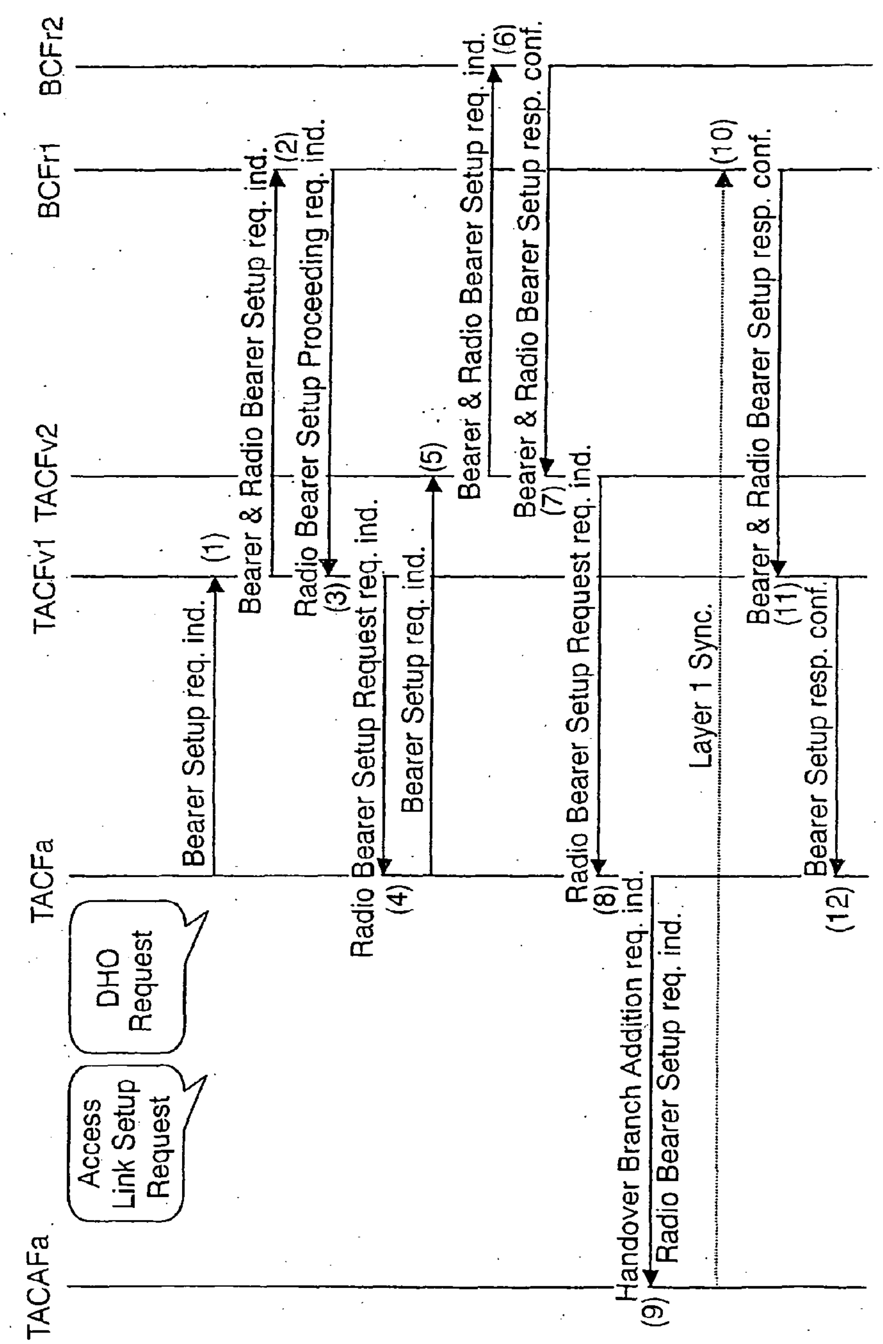

FIG. 770 is a sequential flow diagram representing the start of inter-cell diversity handover simultaneously with the access link setup.

Figure 771:
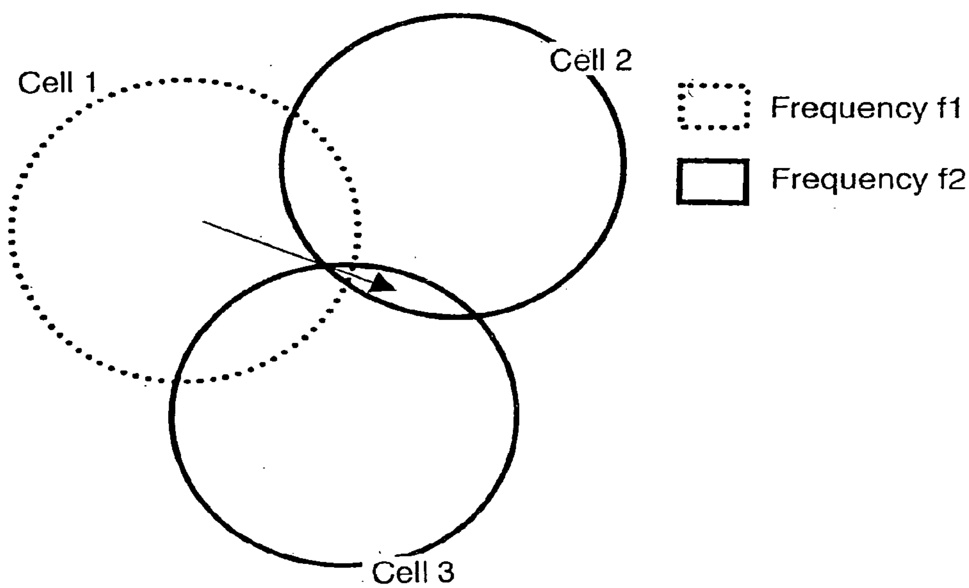

FIG. 771 is a diagram representing a situation where transition to diversity handover is necessary immediately after the completion of branch replacement.

Figure 772:
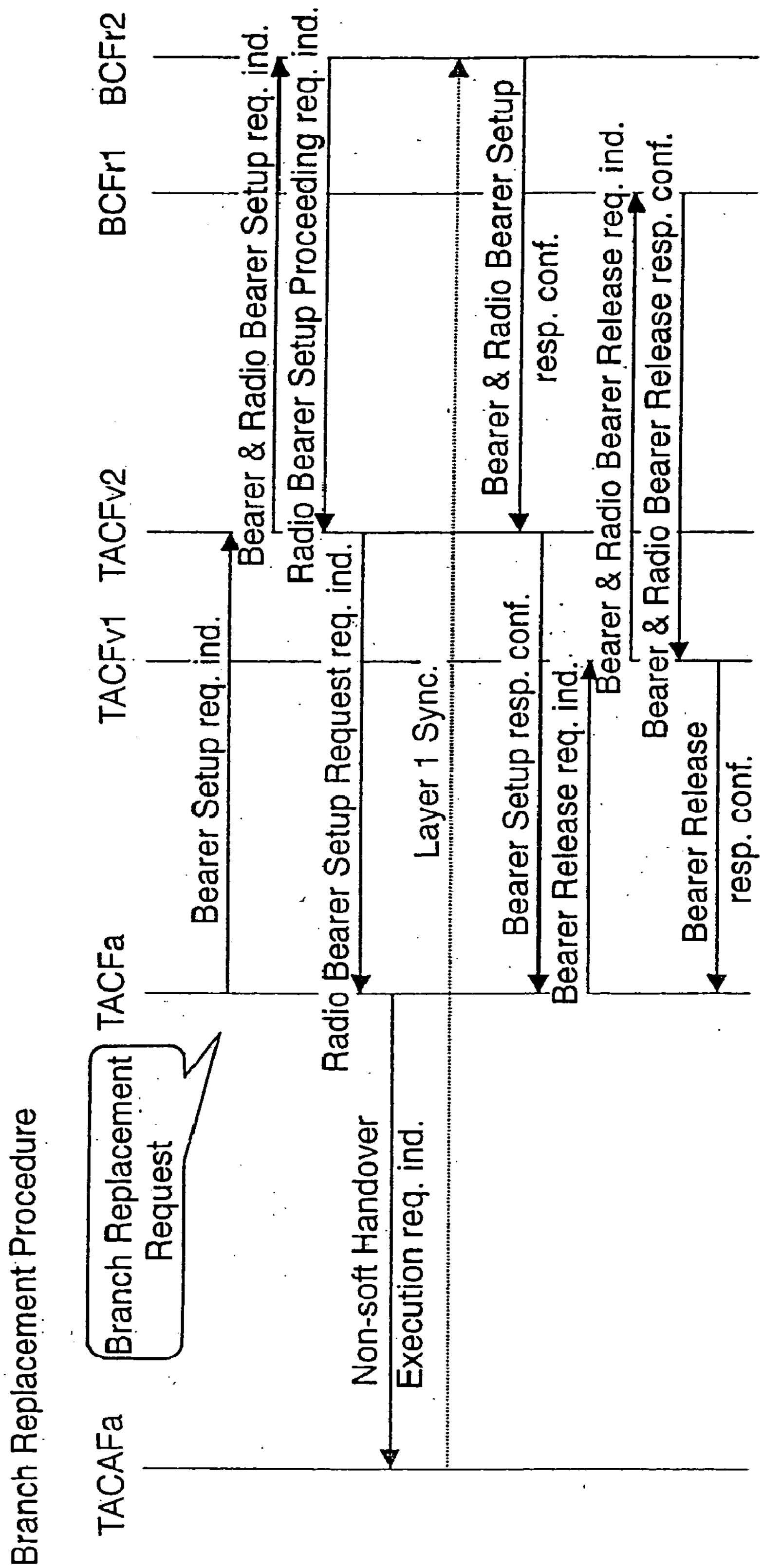

FIG. 772 is a sequential flow diagram representing a series of information flows transported between the mobile station and the network for carrying out the branch replacement.

Figure 773:
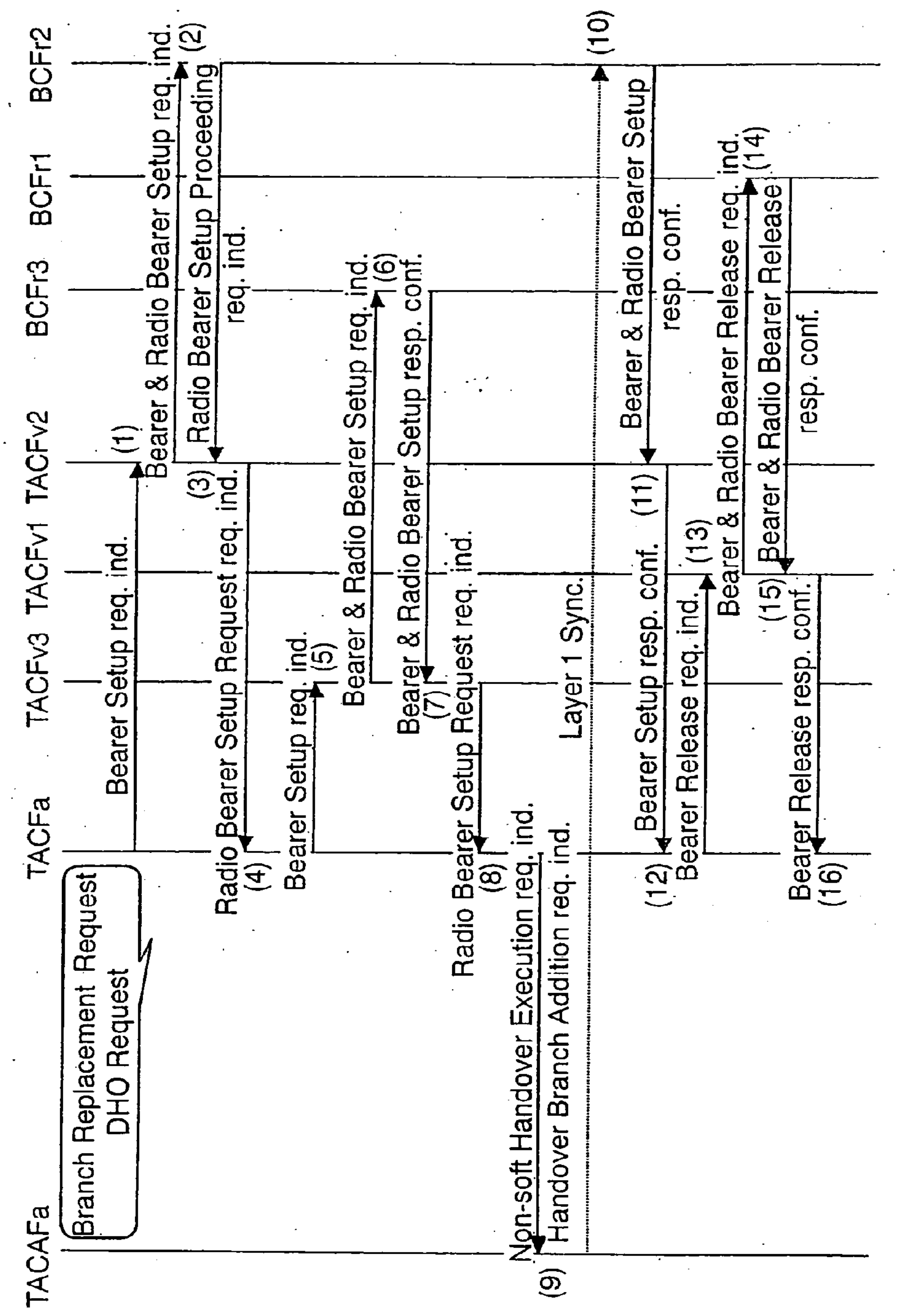

FIG. 773 is a sequential flow diagram representing an operation in the invented system which is carried out when the mobile station moves to a diversity handover zone.

Figure 774:
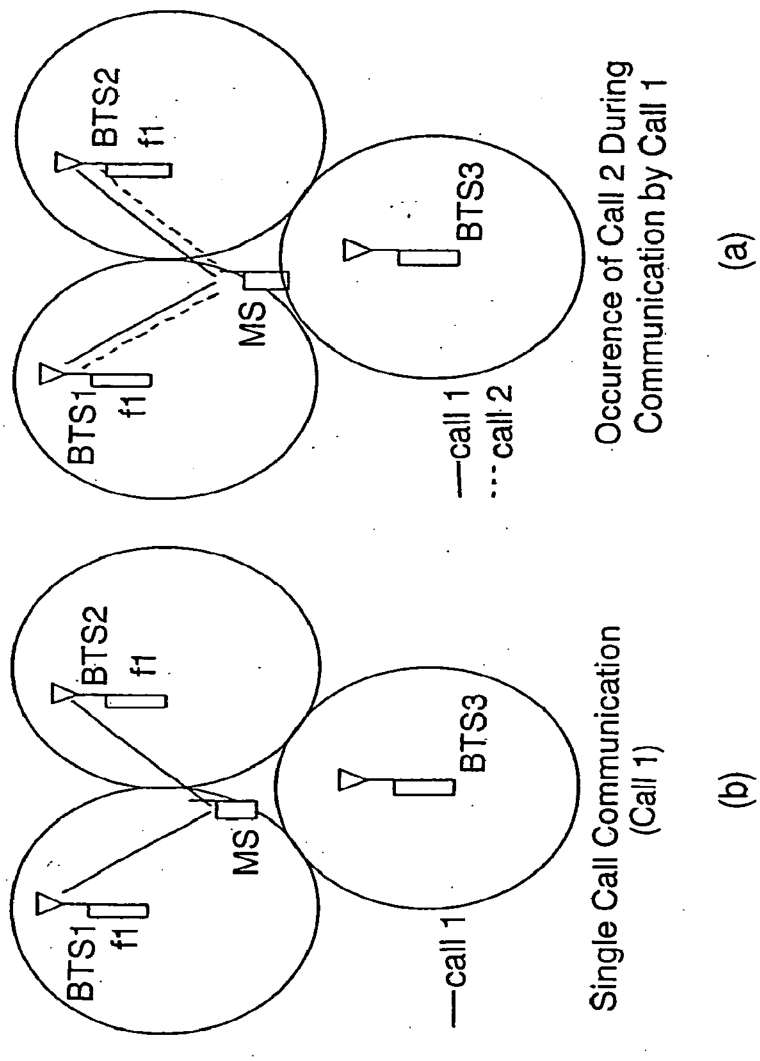

FIG. 774 is a diagram representing an embodying method for controlling branch structure and frequency band in the system according to the presented invention when a call attempt occurs to or from a mobile station that can treats a plurality of calls simultaneously and is treating a call.

Figure 775:
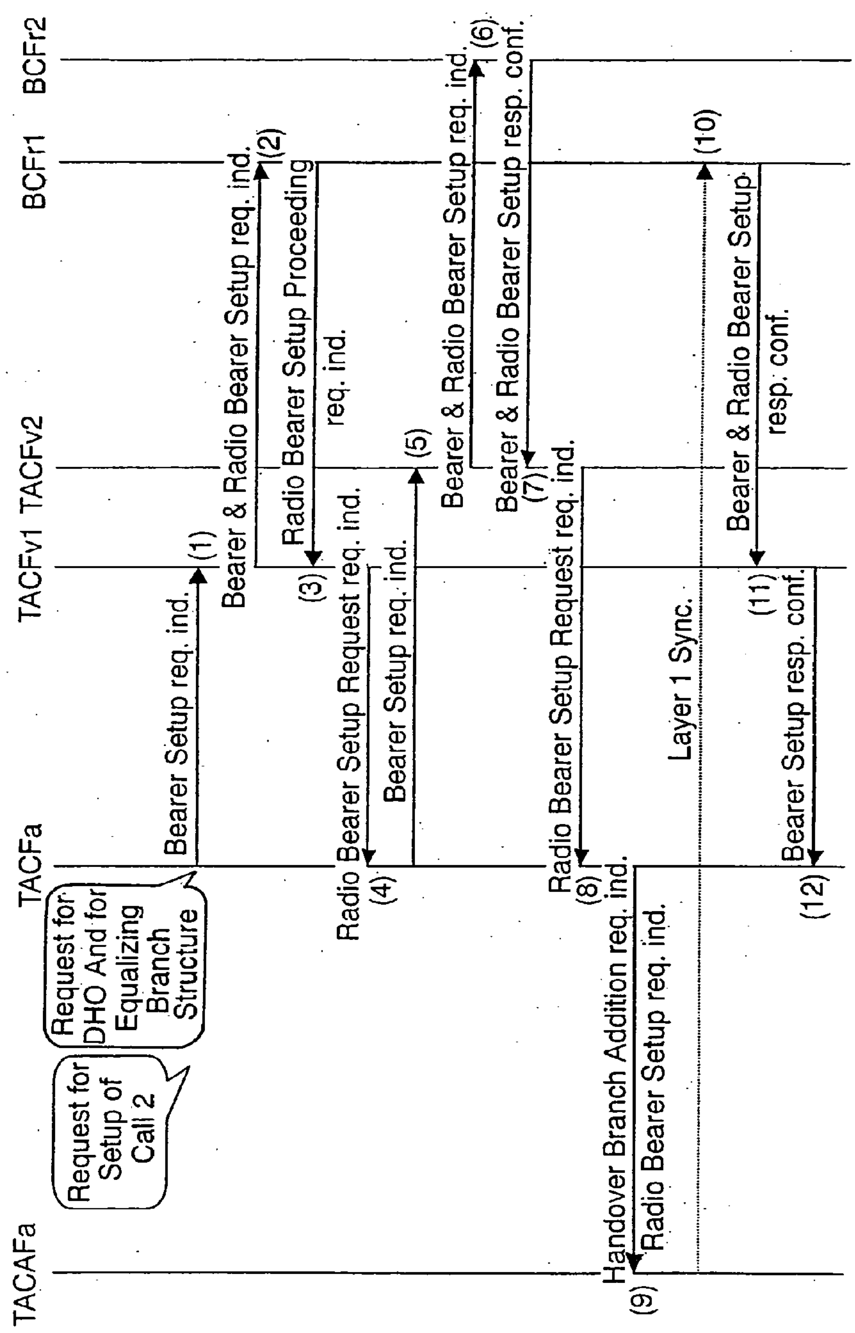

FIG. 775 is a sequential flow diagram representing the operation exemplified in FIG. 774 of the system.

Figure 776:
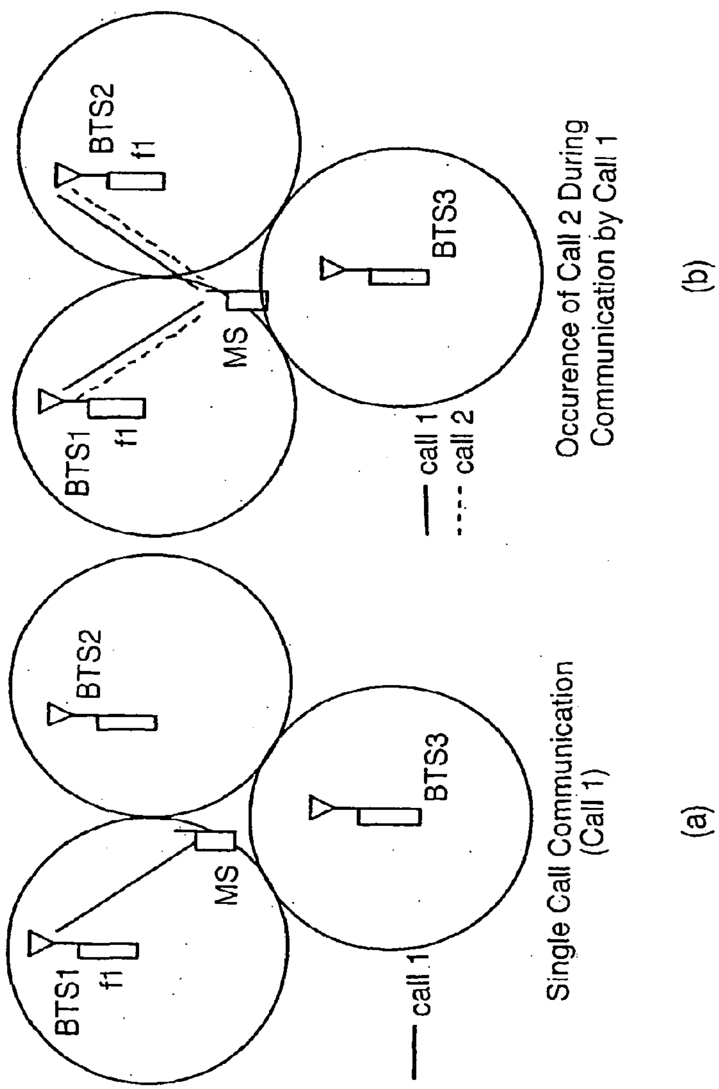

FIG. 776 is a diagram representing another embodying method for controlling branch structure and frequency band in the system according to the presented invention when a call attempt occurs to or from a mobile station that can treats a plurality of calls simultaneously and is treating a call.

Figure 777:
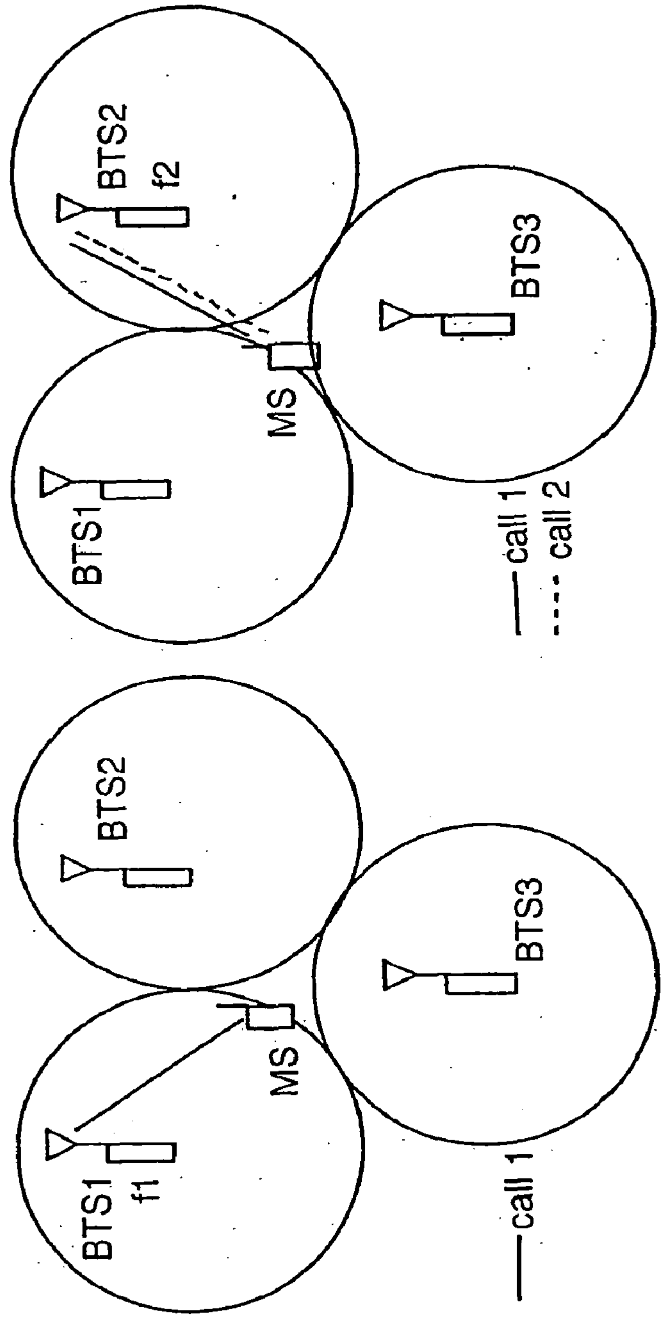

FIG. 777 is a diagram representing another embodying method for controlling branch structure and frequency band in the system according to the presented invention when a call attempt occurs to or from a mobile station that can treats a plurality of calls simultaneously and is treating a call.

Figure 778:
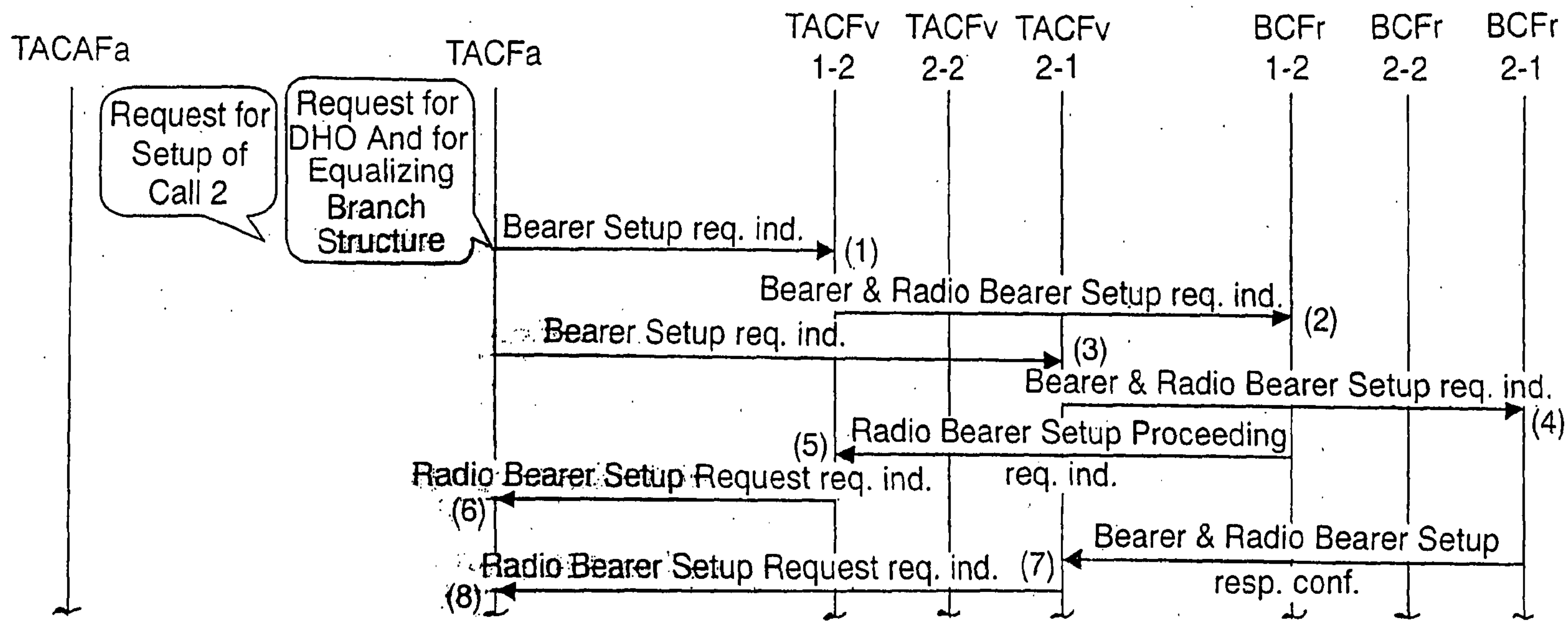

FIG. 778 is a sequential flow diagram representing the operation exemplified in FIG. 776 of the system.

Figure 779:
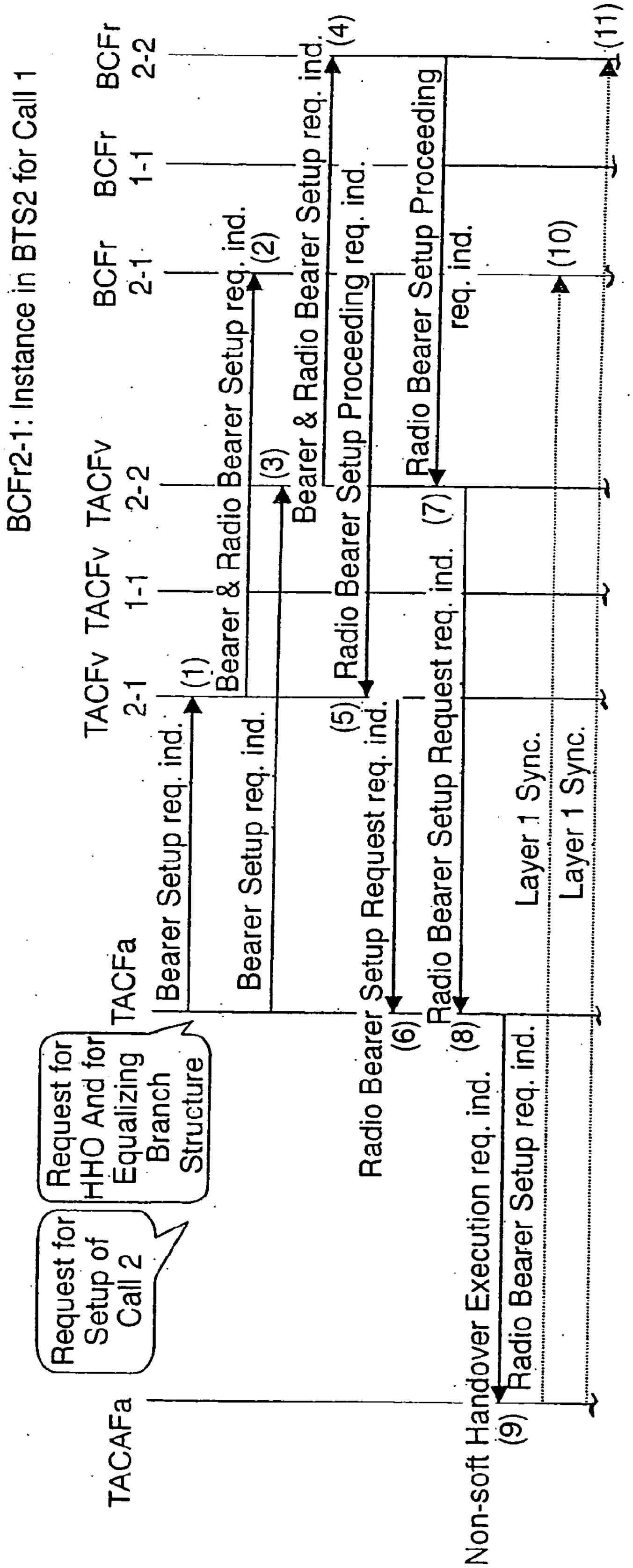

FIG. 779 is a sequential flow diagram representing the operation exemplified in FIG. 777 of the system.

Figure 780:
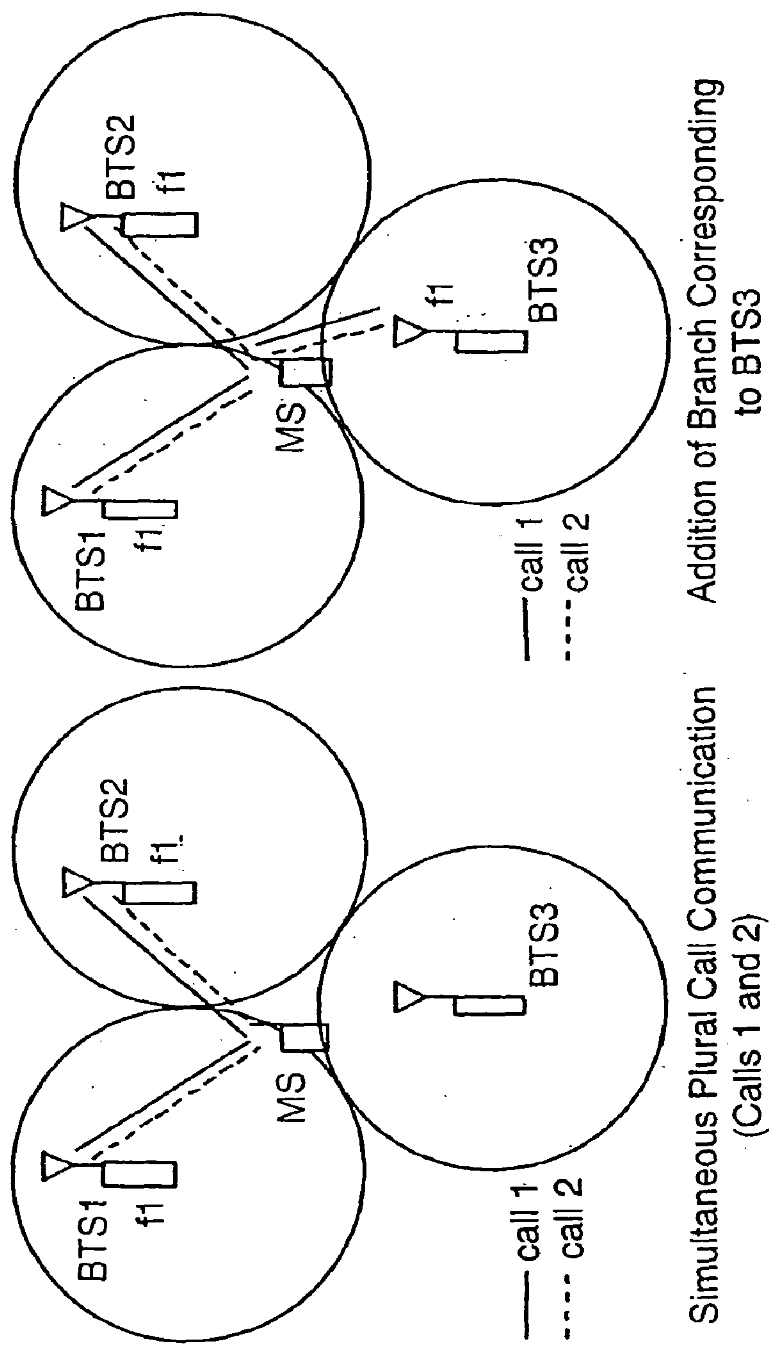

FIG. 780 is a diagram representing a control method executed in the system according to the present invention when a trigger of handover occurs to the mobile station which is treating a plurality of calls.

Figure 781:
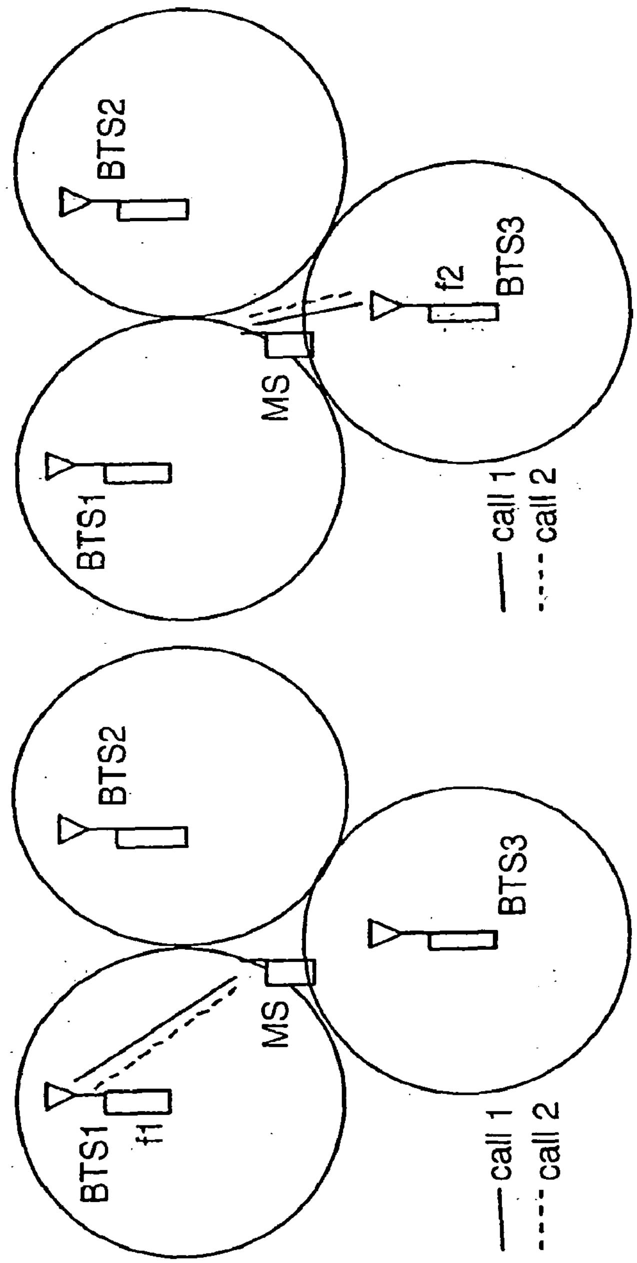

FIG. 781 is a diagram representing another control method executed in the system according to the present invention when a trigger of handover occurs to the mobile station which is treating a plurality of calls.

Figure 782:
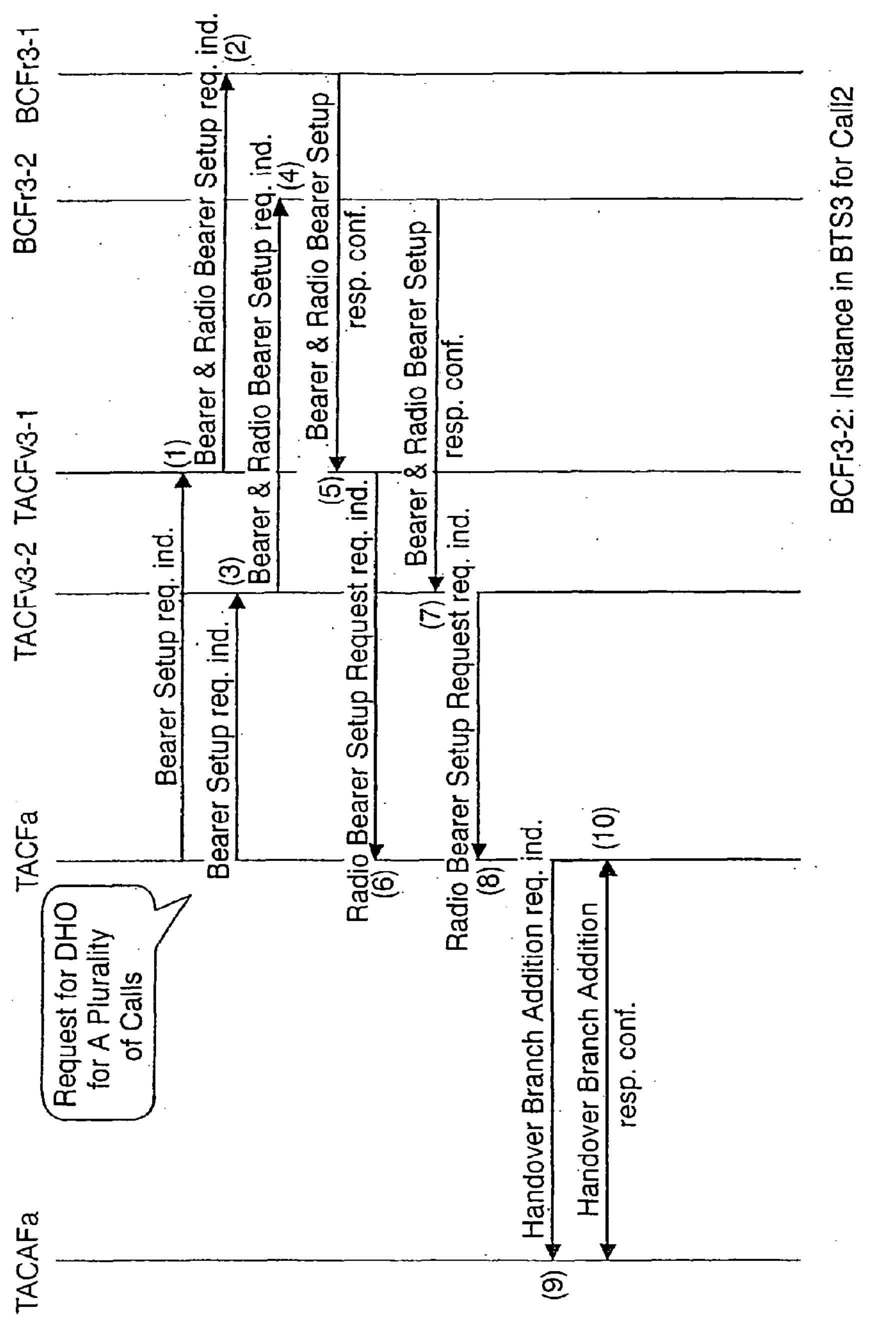

FIG. 782 is a sequential flow diagram representing the operation exemplified in FIG. 780 of the system.

Figure 783:
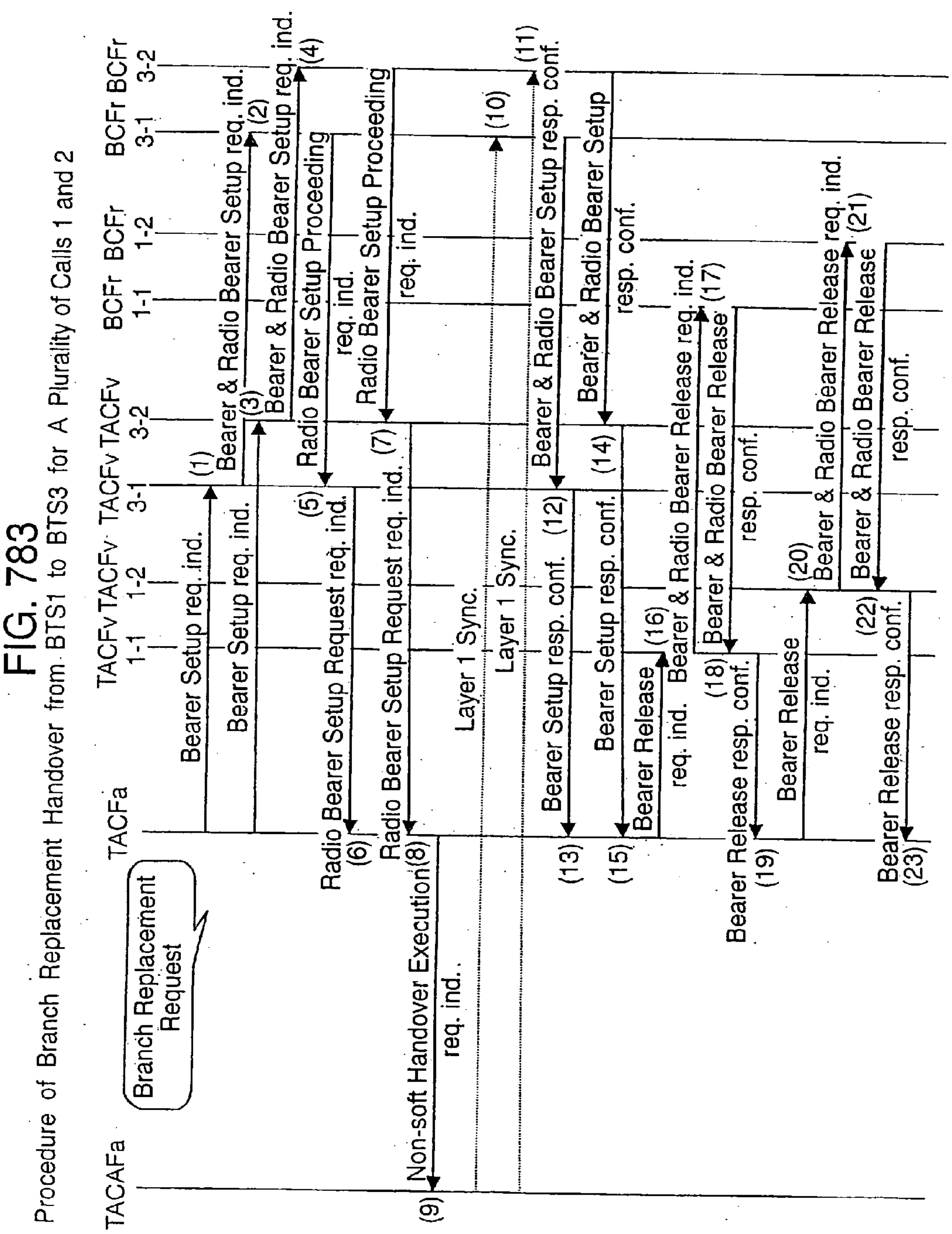

FIG. 783 is a sequential flow diagram representing the operation exemplified in FIG. 781 of the system.

Figure 784:
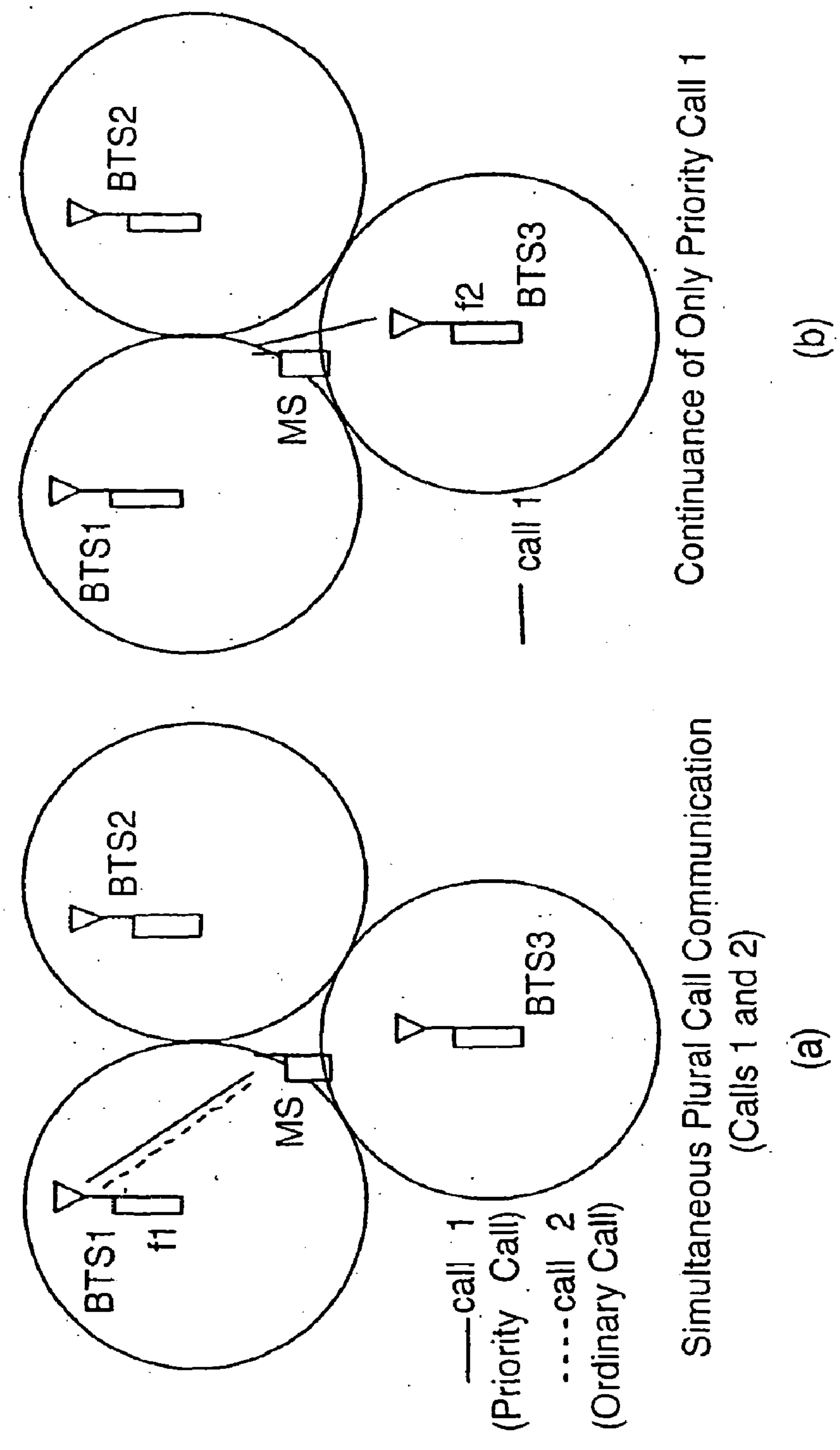

FIG. 784 is a diagram representing another control method executed in the system according to the present invention when a trigger of handover occurs to the mobile station which is treating a plurality of calls.

Figure 785:
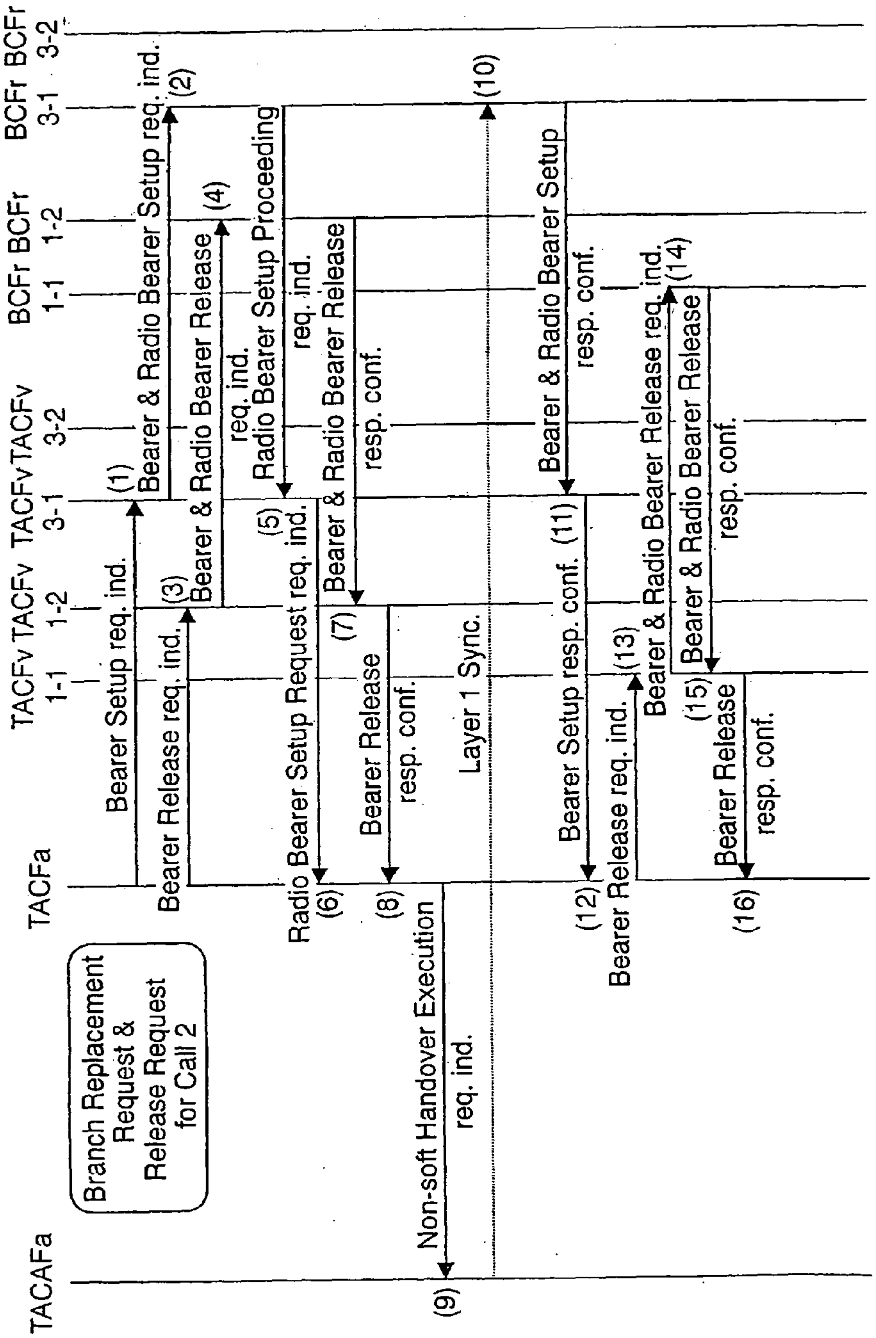

FIG. 785 is a sequential flow diagram representing the operation exemplified in FIG. 784 of the system.

Figure 786:
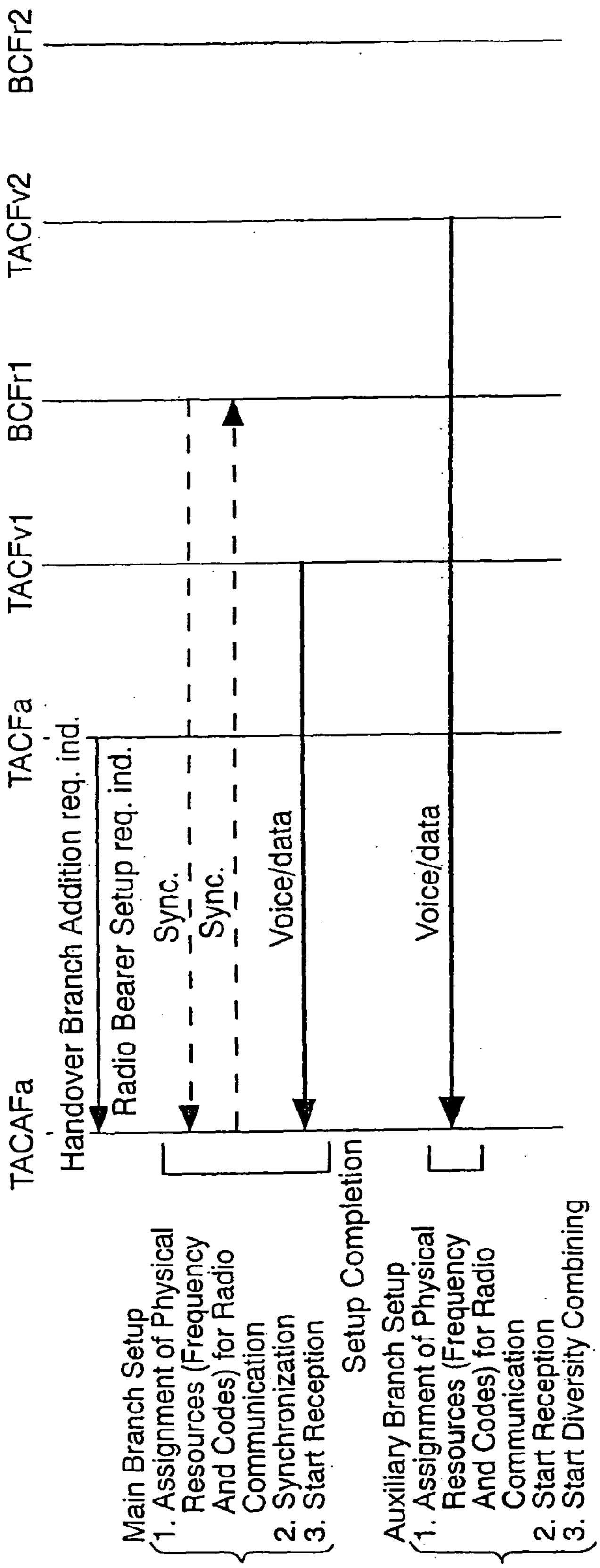

FIG. 786 is a sequential flow diagram representing an operation for the start of inter-cell diversity handover simultaneously with the access link setup.

Figure 787:
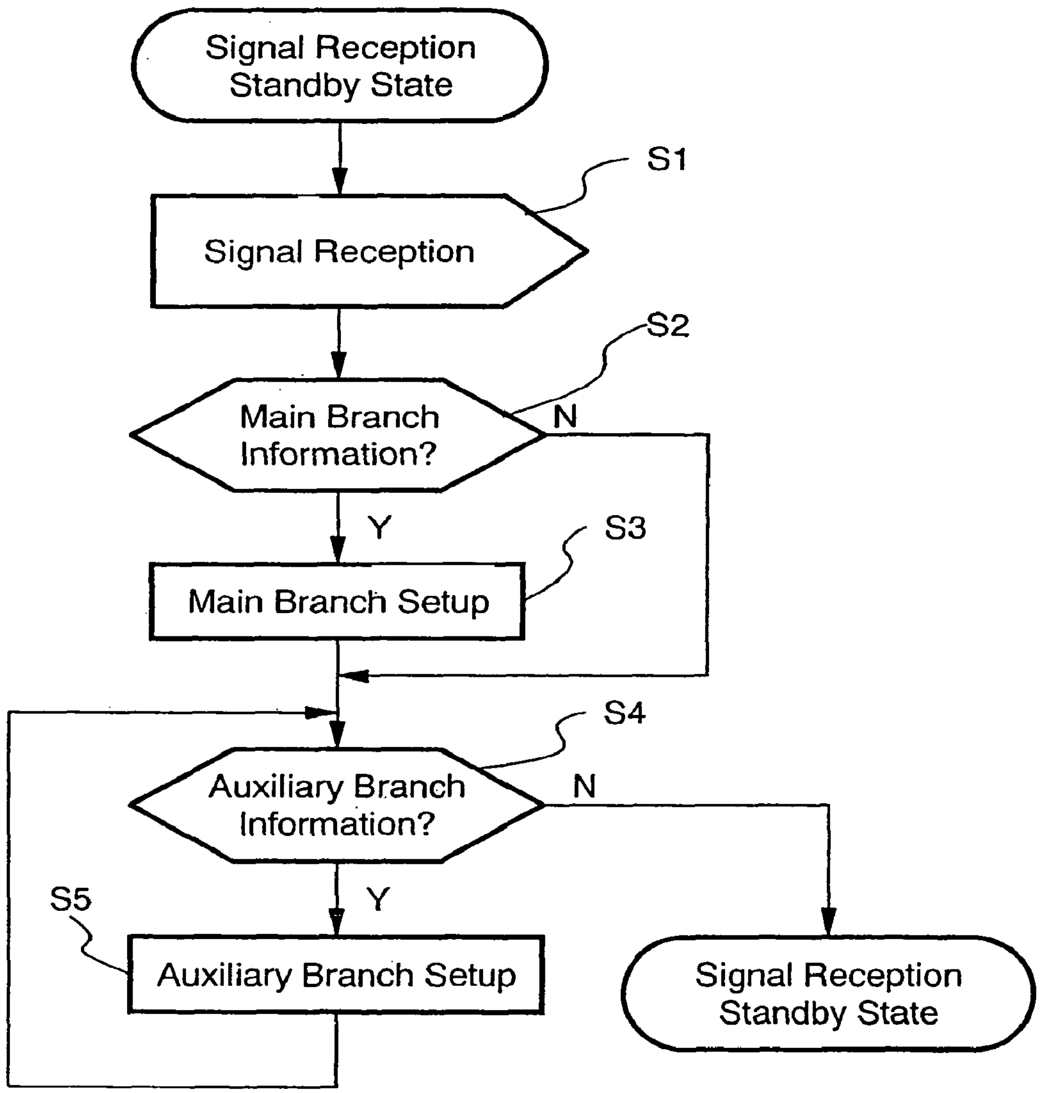

FIG. 787 is a flowchart of an operation of the mobile station, which is appropriate to realizing the operation in FIG. 786.

Figure 788:
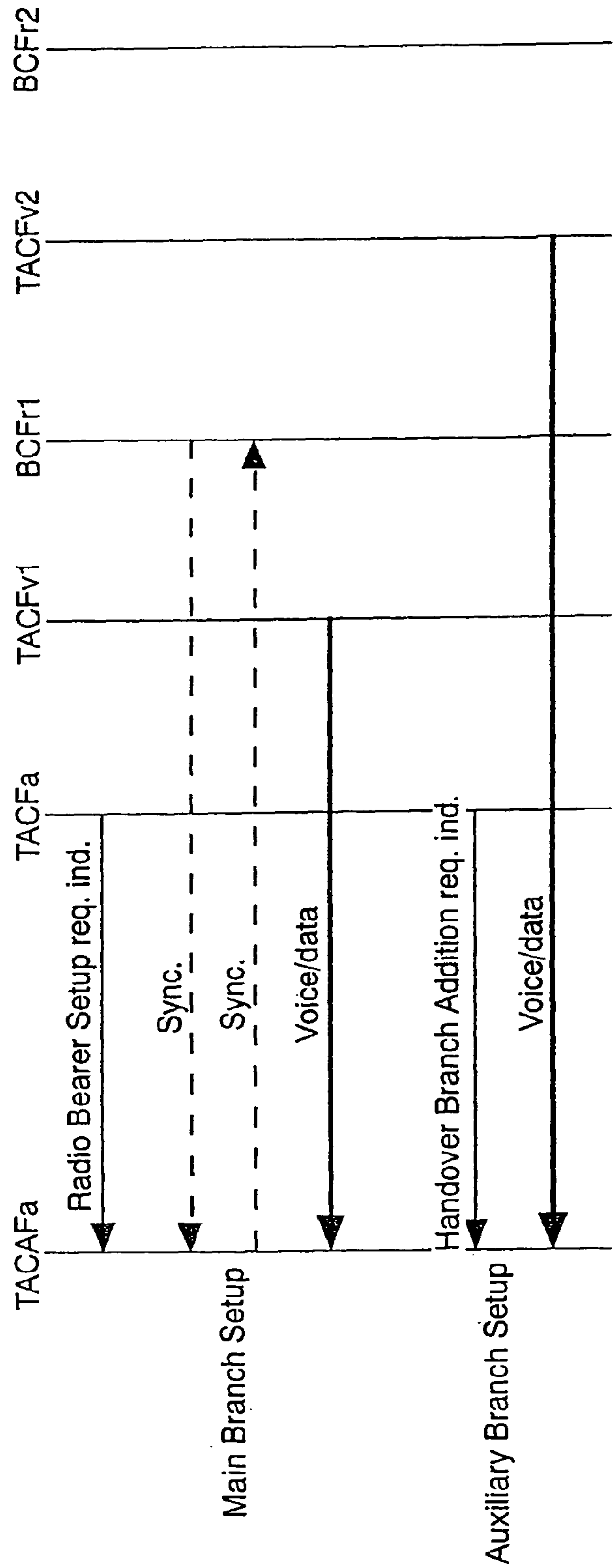

FIG. 788 is a sequential flow diagram representing a conventional operation for access link setup for a mobile station when the mobile station is located at the position where it can carry out intra-cell diversity handover.

Figure 789:
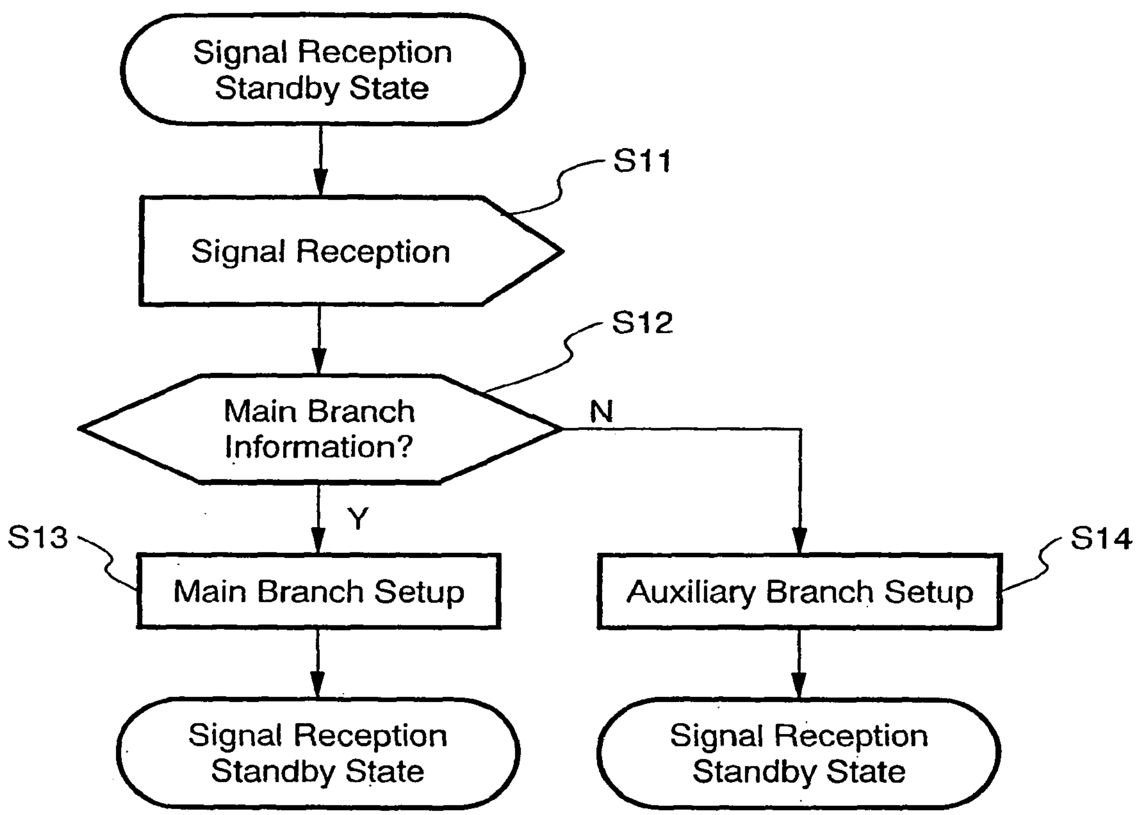

FIG. 789 is a flowchart of an operation of the mobile station for realizing the operation in FIG. 786.

Figure 790:
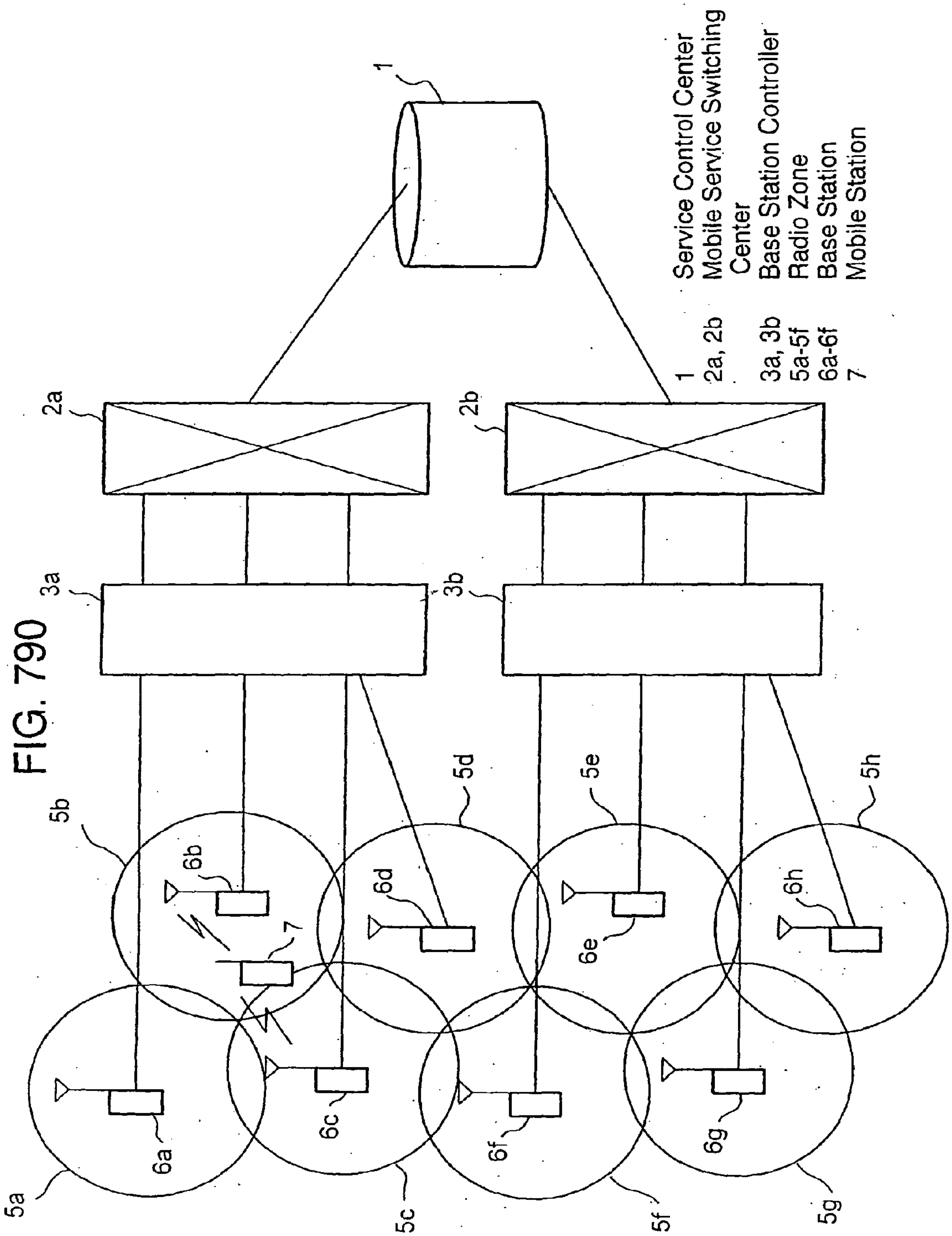

FIG. 790 is a diagram showing a part of the invented system for describing the ACCH replacement.

Figure 53:
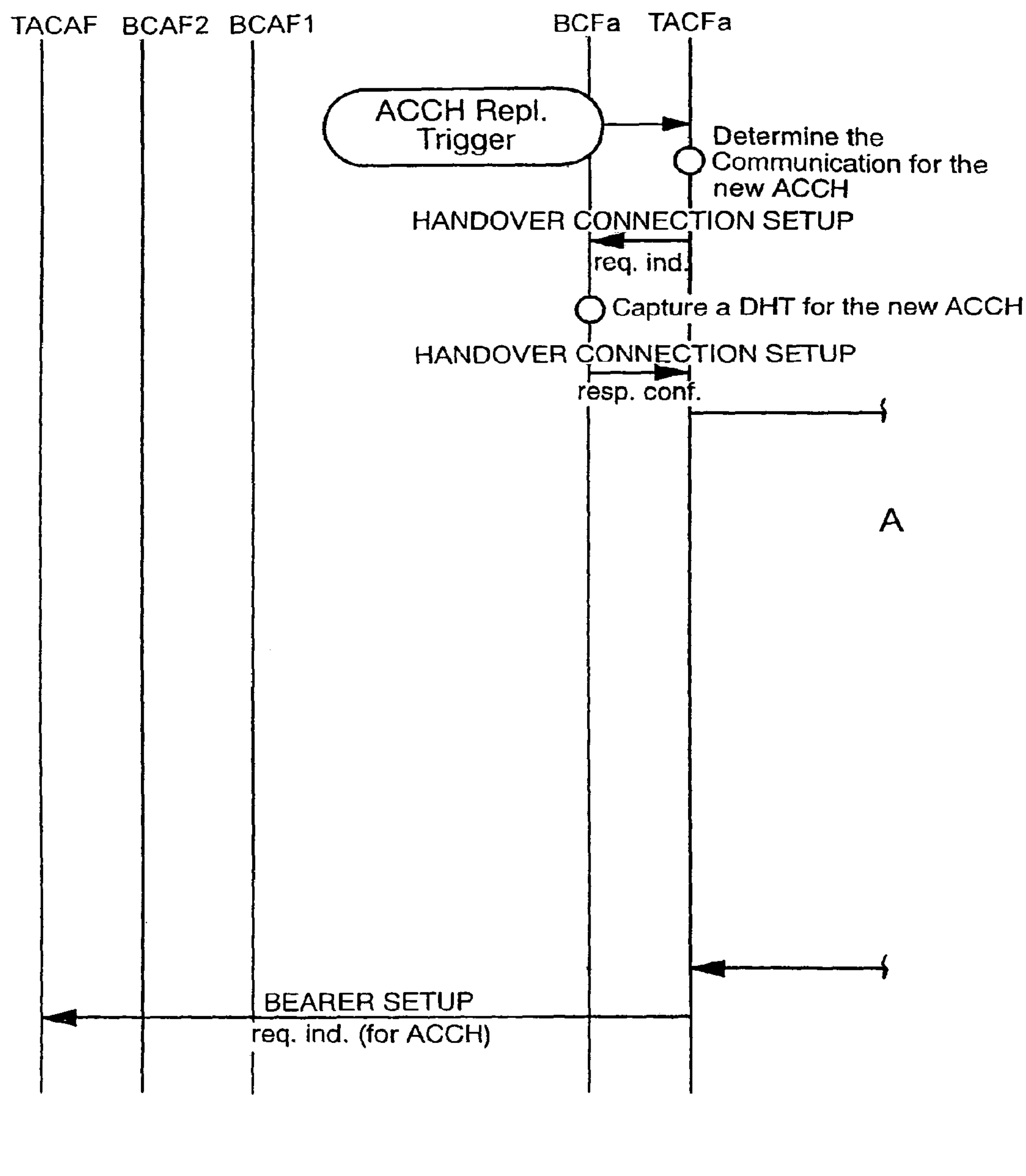
FIGS. 53 and 54 cooperate to form an information flow diagram of the ACCH replacement procedure executed in the communication control plane.
Figure 54:
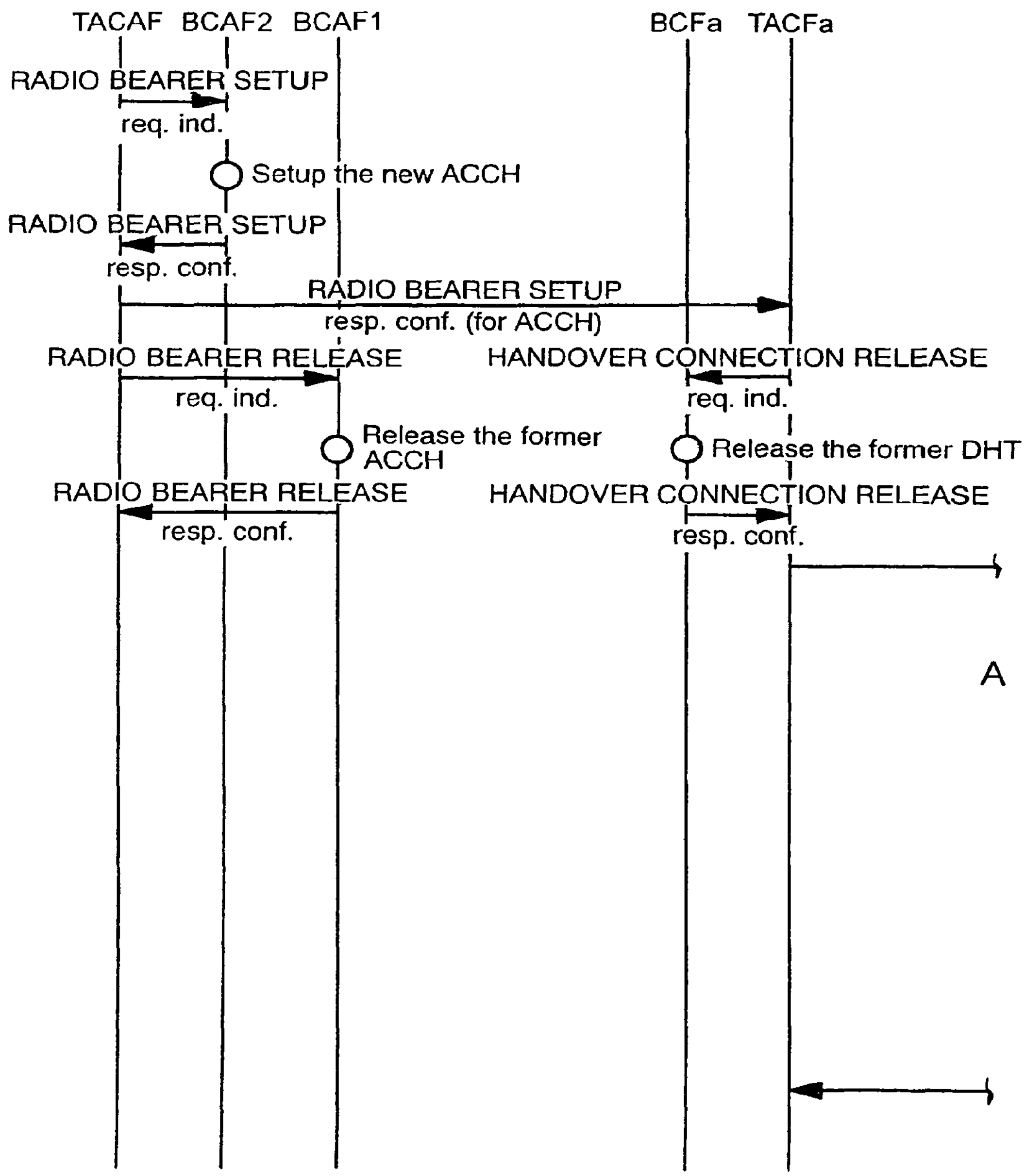
Figure 791:
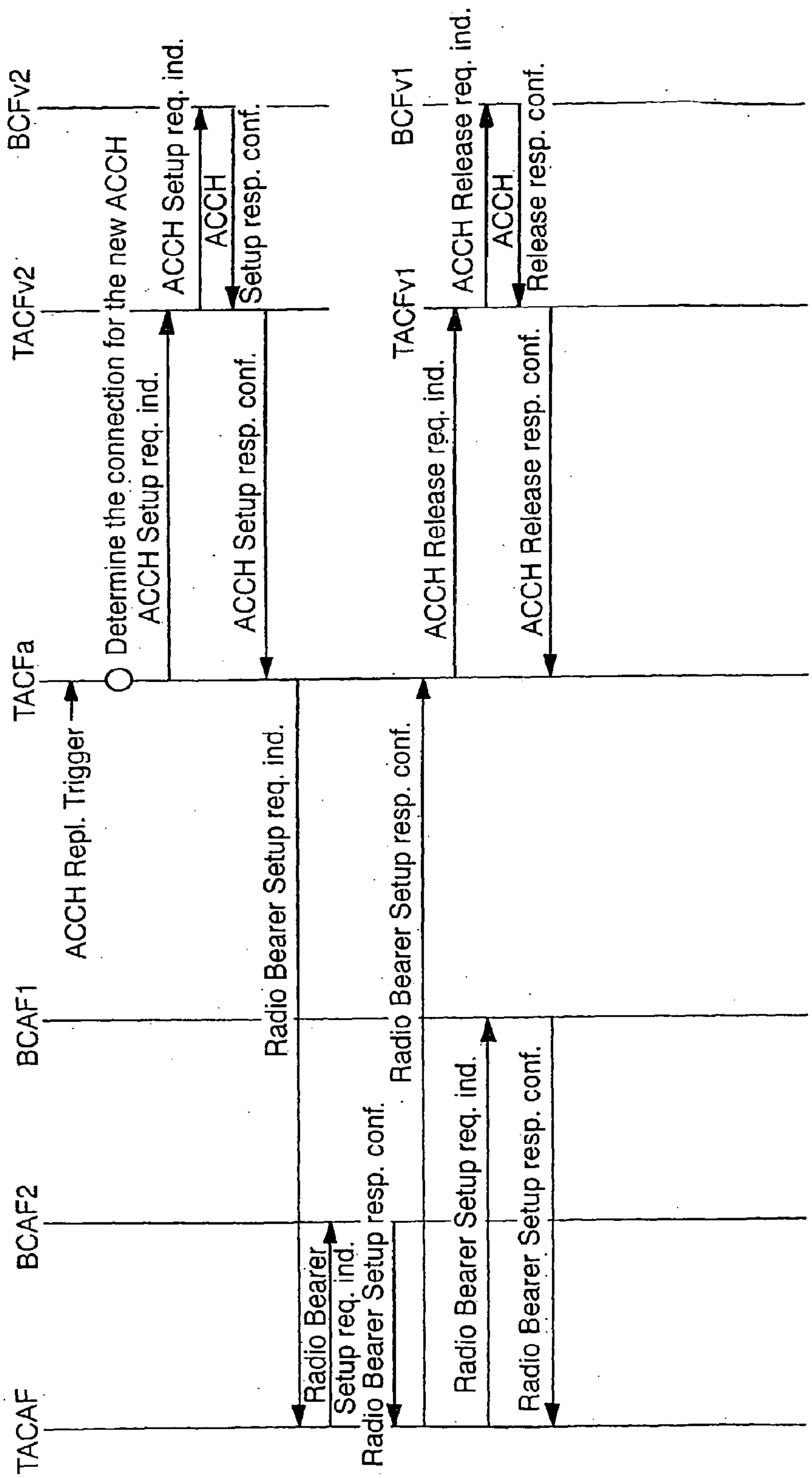

FIG. 791 is a sequential diagram representing an alteration of the ACCH replacement procedure, similar to that shown in FIGS. 53 and 54, but is not accompany with the replacement of wired access link.

Figure 792:
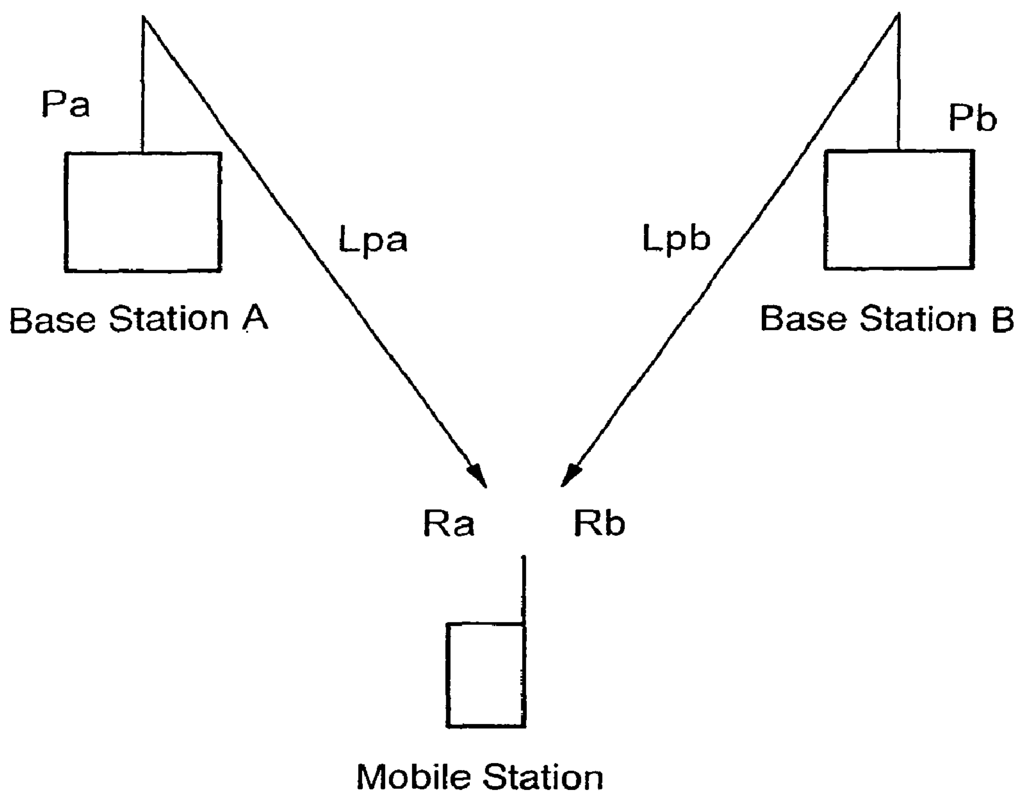

FIG. 792 is a diagram for describing the uplink transmission power control for the mobile stations in the invented system.

Figure 793:
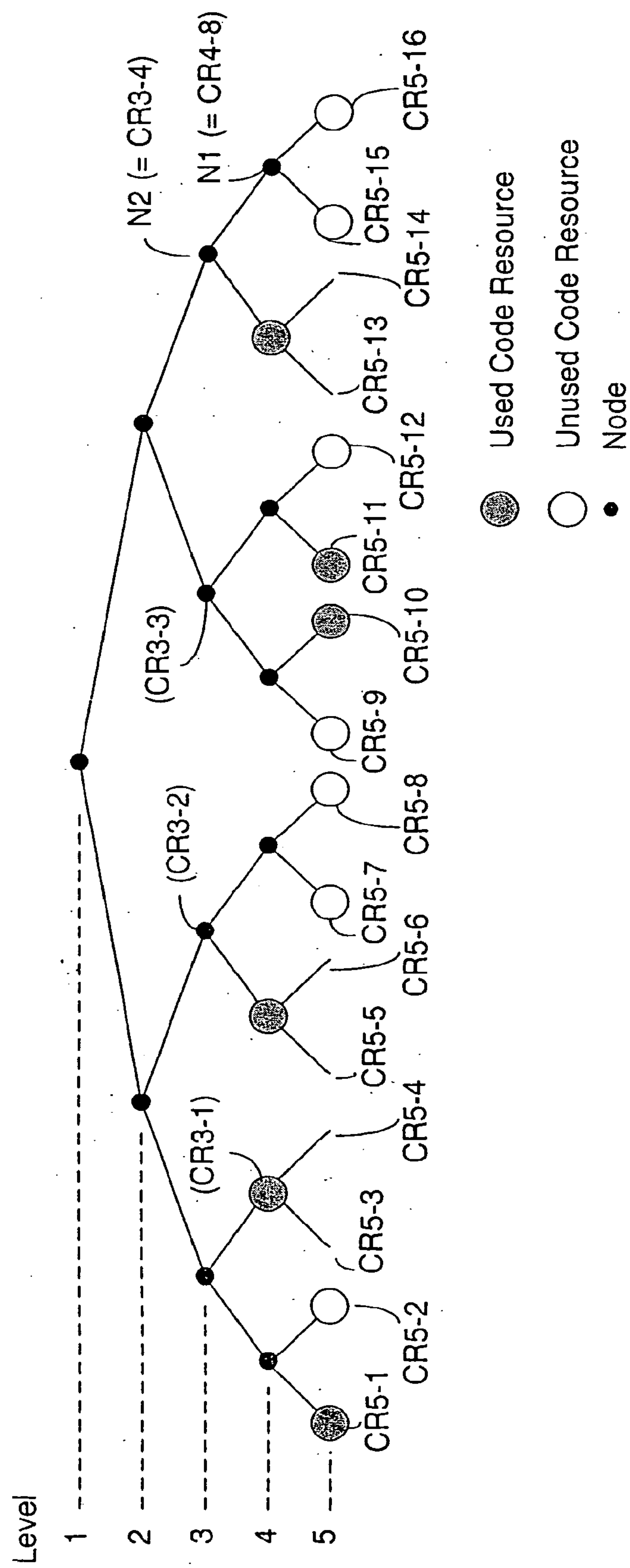
Figure 794:
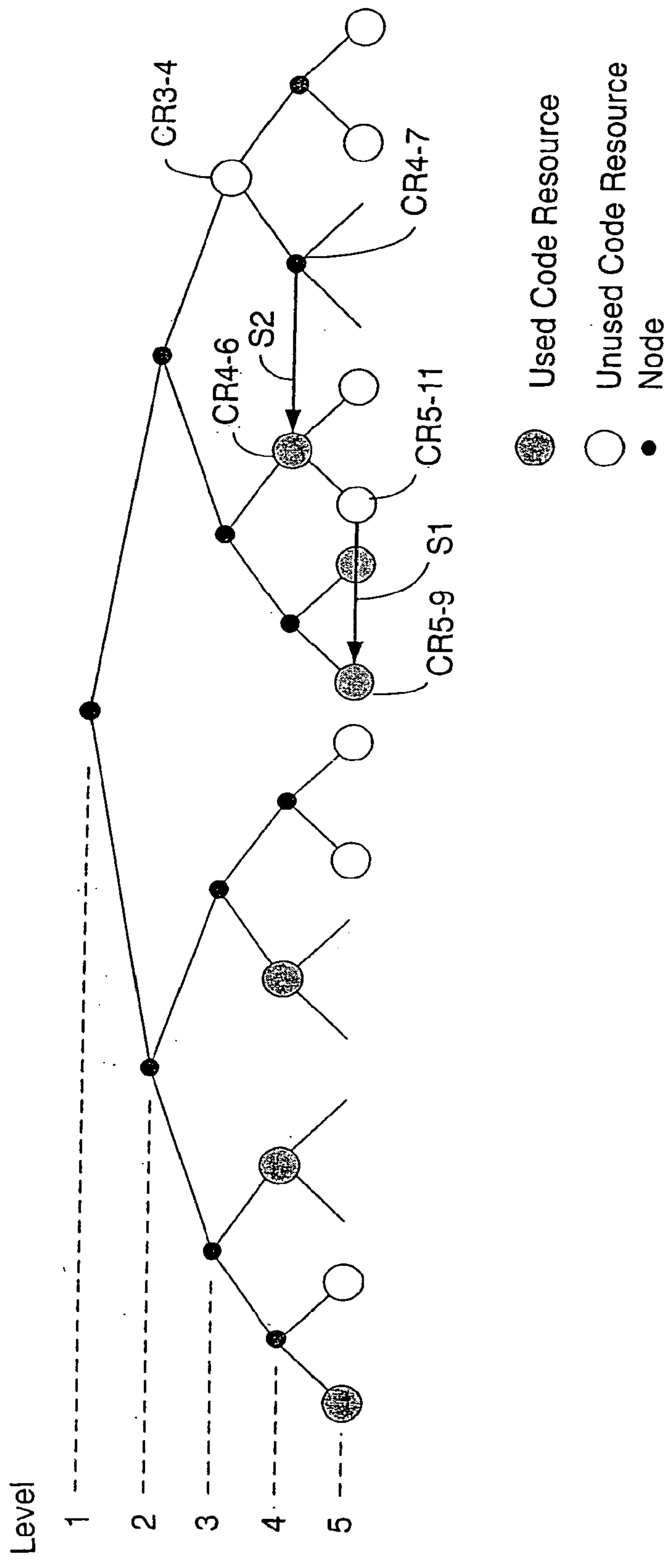

FIGS. 793 and 794 are diagrams representing a method for reassigning code resources in section 3.10.

BEST MODE FOR CARRYING OUT INVENTION

1. General Description of System

1.1. Introduction

This system is a mobile communications system wherein W-CDMA (wide-band code division multiple access) is adopted for the radio access manner in order to enhance efficiency for frequency utilization, to process multiplexed and high-rate signals flexibly, and to improve the communication quality to the level equivalent to fixed networks.

1.2 Entire System Structure

Figure 1:
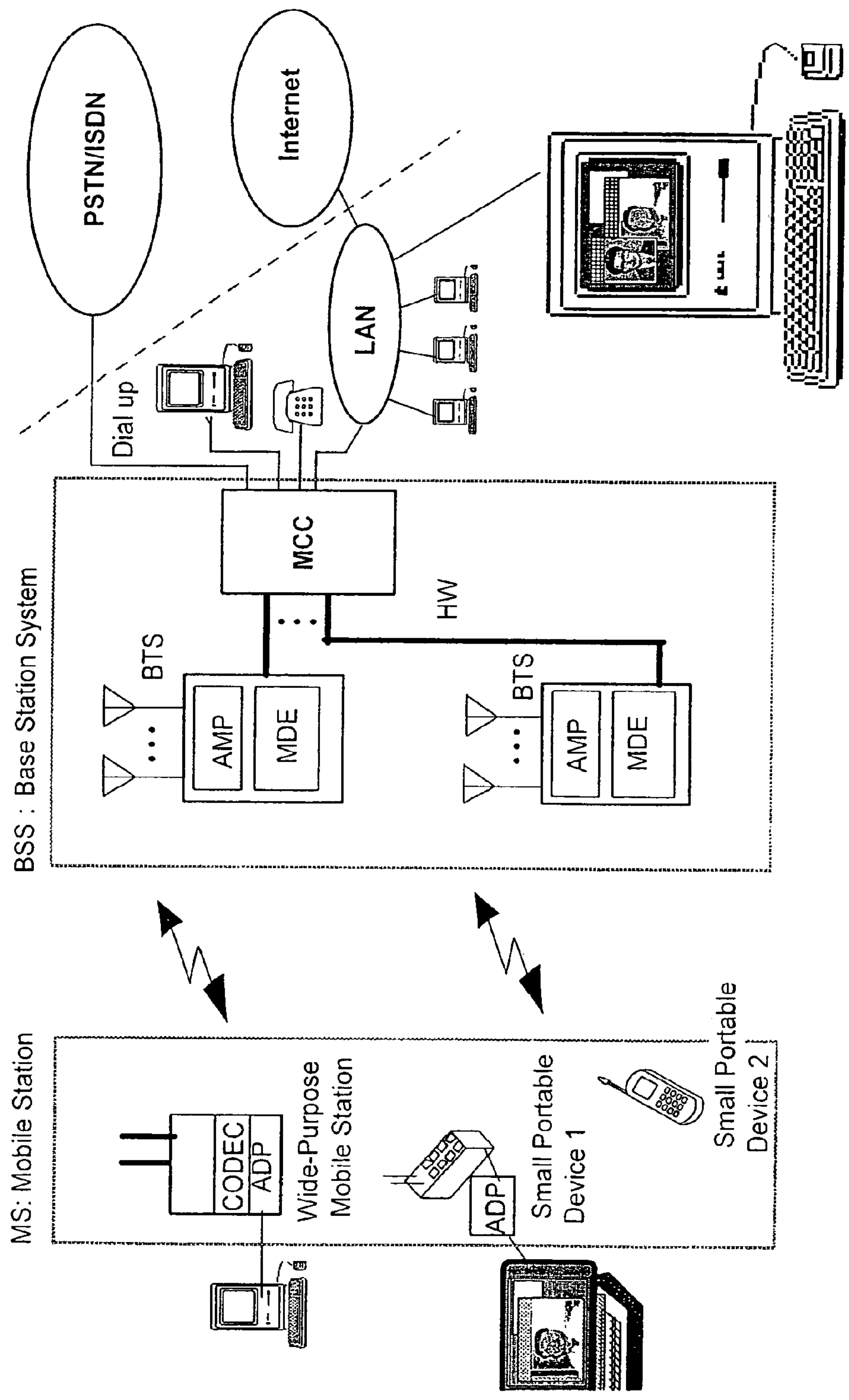
FIG. 1 is a block diagram showing the entire structure of a mobile communications system in accordance with W-CDMA of one embodiment of the present invention.

First, with reference to FIG. 1, the entire structure of a W-CDMA mobile communications system in accordance with an embodiment of the present invention will be described. As shown in FIG. 1, the system comprises mobile stations MS and a radio base station system BSS. The base station system BSS is constituted of base transceiver systems BTS and a mobile communications control center MCC connected to the base transceiver systems via cable transmission lines HW. The mobile stations MS include a wide-purpose mobile station, a small portable mobile station 2 connected to a personal computer, a small portable mobile station 3 that is a traditional portable telephones, and so on. The mobile communications control center MCC is connected with the personal computers via a fixed PSTN or ISDN, telephone network, or LAN. With such a structure, high-quality voice data, N-ISDN, packets or modem signals may be transformed.

1.3 Abbreviations

Glossary of the abbreviations used in the present specification is indicated in FIG. 265. In addition, the technical terms, which are used in the present specification but not defined, comply with ITU-T Recommendation Q.65.

2. Access Interfaces 2.1 General Description of Access Interfaces

Figure 2:
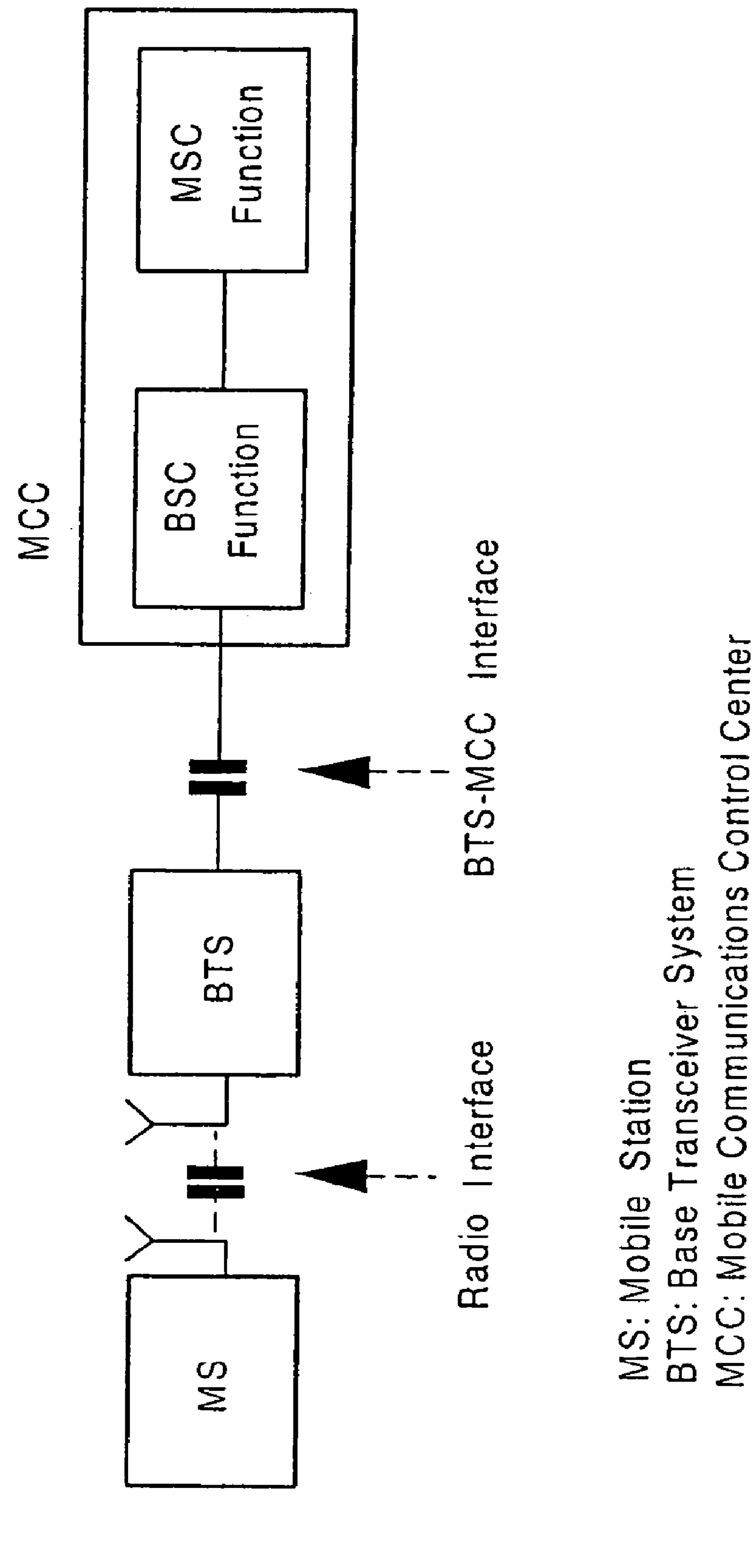
FIG. 2 is a block diagram showing a part of the system, particularly showing access interfaces in the system.

Chapter 2 prescribes access interfaces of W-CDMA mobile communications system. The access interfaces in this system include, as shown in FIG. 2, a radio interface served for communication between the mobile station MS and the base transceiver systems BTS, and a BTS-MCC interface served for communication between the base transceiver systems BTS and the mobile communications control center MCC. Although this specification describes the W-CDMA mobile communications system to enable any person skilled in the art to make or use the present invention, the present invention is not intended to be limited to the described W-CDMA mobile communications system, but is intended to cover any mobile communications system according to any kind of access manner within the attached claims.

To prescribe the interfaces, this chapter includes the following items:

1) Services Provided by the System and the System Capabilities in Compliance with the Protocols 2) System Functional Structure and Control Manners for Realizing the Services and System Capabilities 3) Rules for Reference Model Structure and Interfaces in Compliance with the Protocols 4) Physical Architecture and Physical Condition of the Radio Interface 5) Signal Transfer Protocol for the Radio Interface (Layer-2)

6) Control Protocol for the Radio Interface (Layer-3)

7) Physical Architecture and Electrical Condition of the BS-MCC Interface

8) Information Transmission Protocol for the BS-MCC Interface (ATM Layer and AAL type-2)

9) Signal Transfer Protocol for the BS-MCC Interface (AAL)

10) Control Protocol for the BS-MCC Interface (Layer-3)

The control manners and protocol specifications described in this chapter comply with recommendation drafts Q.FNA, Q.FIF, Q.FSA, and Q.FSR prepared on the basis of the discussions at TTC IMT-2000 Study Committee, Network Aspect ad hoc.

2.2 Features of Access Interfaces

Next, features of access interfaces will be described.

2.2.1 Handover

A plurality of radio zones are arranged in a mobile communications system and each zone is provided with a base station. To start communication between one of the base stations and a mobile station, a kind of wireless channel called a perch channel is employed. More specifically, a plurality of perch channels of which the frequency bands are different from each other are established between the base station and the mobile station for selecting one of traffic channels for actual communication. That is to say, the traffic channel TCH for transporting voice or messages is selected by virtue of the perch channels.

When a mobile station MS travels across the boundary of radio zones, lowered is the level of the electric field of the radio wave received from the base station of the zone from which the mobile station has exited, thereby depreciating the communication quality. Accordingly, it is necessary for the mobile station to alter the currently communicating base station to a new base station from which the reception is more excellent, so that the traffic channel TCH employed by the mobile station MS is replaced. This replacement is called handover.

In order to facilitate handover, it is preferable that the frequency band of the former traffic channel TCH and that of the new traffic channel TCH are the same with each other. In accordance with traditional mobile communications, a mobile station MS measures the respective levels of the electric fields of in relation to circumferential perch channels and selects candidate base stations for handover. The mobile station then informs the network of a handover request designating the candidate base stations for handover.

However, if the traffic channel TCH of the same frequency band as that of the currently communicating channel is not preselected for candidate cells in circumferential zones, it is impossible that the cells serve the mobile station although the mobile station has transmitted the handover request. Therefore, it is necessary for the network to exclude, from the candidate cells, the cell without preselection of traffic channel TCH of the same frequency band as that of the currently communicating traffic channel in accordance with the prior art.

Accordingly, in the present system, the mobile station MS sends the network a handover request wherein previously excluded is the cell that does not preselect the traffic channel TCH at the same frequency band as the current communication. Next, this feature will be described with reference to FIG. 259 in more detail.

FIG. 259 represents an example of handover procedure in the present communications system. In FIG. 259, a mobile station MS is communicating at a frequency band f2 in a zone 1. Assume the mobile station MS travels from zone 1 to zone 2; and strength ranking of the reception level (level of the electric field of the received wave) measured by the mobile station MS at the frequency band f2 is zone 2, zone 3, and zone 4. In this case, the traditional handover request designates that the primary candidate zone is zone 2, the secondary candidate is zone 3, and the third candidate is zone 4.

On the contrary, according to the present communications system, broadcasting information indicating the preselection condition of the traffic channels TCH with reference to the respective circumferential zones is informed to the mobile station MS as will be described at section 2.5.2.4.2.6. Using the broadcasting information, the mobile station recognizes the zone in which the traffic channel TCH at the same frequency band as the current communication is not preselected, so as to exclude the recognized zone from the handover candidates. Therefore, the mobile station MS in the embodiment informs the network of the handover request designating that the primary candidate zone is zone 3 and the secondary candidate is zone 4.

As will be described in section 2.3.2.2.4, the present communications system can carry out a handover branch addition, handover branch deletion, and branch replacement handover. The above-discussed procedure in view of the preselection status of traffic channel may be carried out at the handover branch addition and the branch replacement handover.

Figure 37:
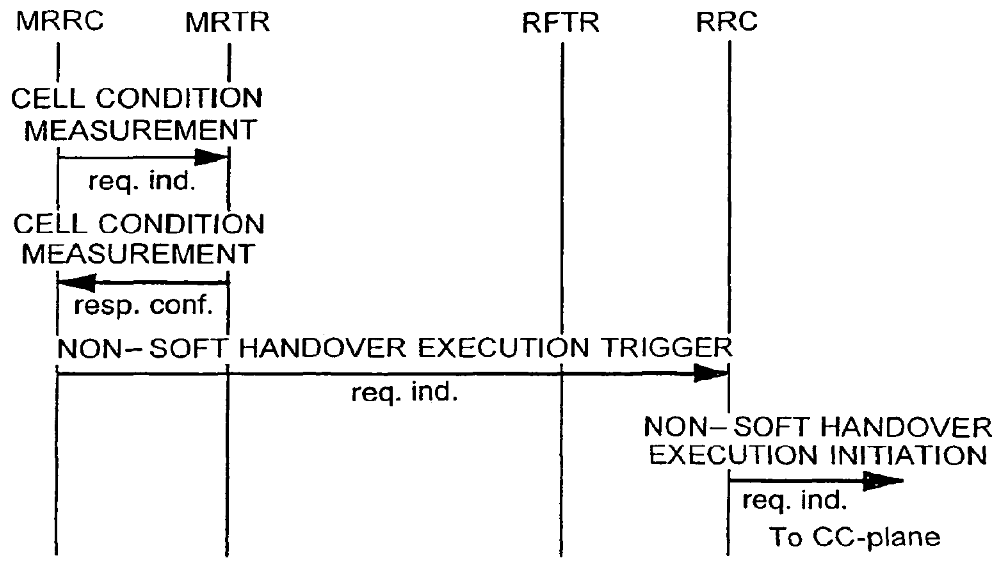
FIG. 37 is an information flow diagram representing a sequence in which information flows are transported for starting non-soft handover execution, the sequence corresponding to process 1 in FIG. 35.

With reference to FIG. 37, description will be given with respect to an example of sequential operation wherein the mobile station MS completes to request handover. In FIG. 37, MRRC, MRTR, RFTR, and RRC designate functional entities arranged in the mobile station MS. MRRC controls the radio resources. MRTR controls an encipherment procedure and outputting procedure and measures the radio environment, that is, the respective reception levels in relation to the circumferential radio zones. RFTR controls an encipherment procedure and outputting procedure. RRC controls the radio resources.

As shown in FIG. 37, MRRC provides a CELL CONDITION MEASUREMENT request indication indicating a request for measurement of the wireless environment to MRTR at periodic intervals. Upon the reception of it, MRTR measures the respective reception levels in relation to the circumferential radio zones and transmits MRRC the measurement result as a CELL CONDITION MEASUREMENT response confirmation. Next, MRRC compares the reception level of the currently communicating wireless channel with the reception levels of the wireless channels from the circumferential zones. If the latter is stronger than the former, MRRC conducts the following process to execute handover.

MRRC excludes the zone to which the traffic channel is not preselected on the basis of the broadcast information, and ranks the zones in strength order with reference to the same frequency band as the current communication. Then, MRRC rearranges the remaining zones in order of strength rank, the remaining zones being the candidates for handover; generates a NON-SOFT HANDOVER EXECUTION TRIGGER request indication designating the strength order of the remaining zones; and sends the NON-SOFT HANDOVER EXECUTION TRIGGER request indication to TACF in the network via RRC.

Figure 49:
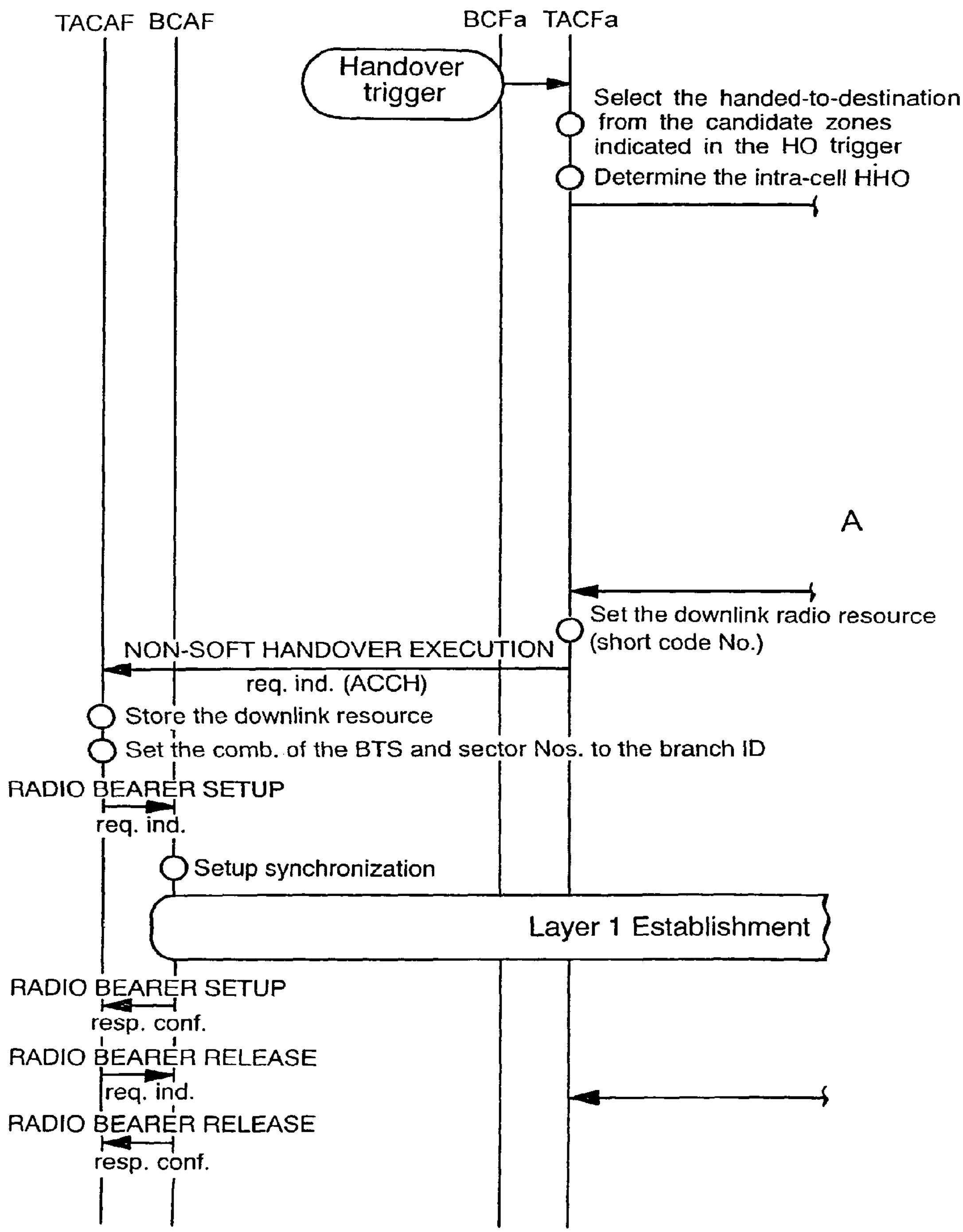
FIG. 49 is an information flow diagram of the intra-cell branch replacement handover executed in the communication control plane.

The notification of non-soft handover execution trigger requirement to TACF triggers the handover. Then, the network selects the base station among the candidate base stations in order to execute the handover and notifies the mobile station MS about the selected base station, thereby activating the traffic channel in relation to the base station. Accordingly, it is possible for the network to exclude complicated control procedures, e.g., detection procedure of the frequency band that the mobile station MS uses for communication and determination procedure as to whether the traffic channel TCH of the same frequency band is preselected by the candidate zone or not. Subsequent operation following the handover trigger is illustrated in FIG. 49.

2.2.2 Replacement of ACCH

Associated control channel (ACCH) is a kind of control channel utilizing the same radio resources as those for the traffic channel TCH that is used for voice or data transportation. By means of ACCH, control signals may be transported between the mobile station MS and base station BS.

There is a kind of communications system wherein one mobile station MS can treat a plurality of calls simultaneously. In addition, there is another kind of communications system wherein one mobile station MS realizes a call using a plurality of radio physical channels. These systems are suitable for radio bearer services. In these kinds of systems, sometimes it is necessary that control signals may be transported between the mobile station MS, which is treating the plurality of calls, and base station BS.

For this purpose, it would be possible to form ACCHs corresponding to all of the plurality of calls for transporting control signals, ACCHs being constituted of wireless communication resources which are also utilized by the traffic channels. However, this technique needs many hardware elements for transporting control signals and complicated control procedures for managing the transportation order of control signals in the plurality of ACCHs.

Accordingly, in the present communications system, when the mobile station treats a plurality of calls using a plurality sets of wireless communication resources which are also being utilized by a plurality of traffic channels, one set of the wireless communication resources is selected and then the control channel, which uses this set, is established between the mobile station and the base station for transporting the control information therebetween.

The method for establishing ACCH in the communications system will be described next in more detail.

FIG. 260 illustrates an example of mobile communications system wherein a mobile station treats a plurality of calls. In FIG. 260, traffic channels respectively corresponding to the plurality of calls are established between a mobile station MS and a base station BS, whereby the calls can be treated simultaneously. For treating the multiple calls, only one ACCH (e.g., ACCH1 in FIG. 260) is selected from the multiple ACCHs corresponding to multiple traffic channels, and shared for transporting all control signals in relation to the mobile station in the system.

Therefore, by virtue of the system, it is possible to reduce the number of hardware elements for transporting control signals in comparison with the case that all of the plurality of calls respectively utilize multiple ACCHs, corresponding to the multiple traffic channels. In addition, it is possible to exclude complicated control procedures, e.g., management of the transportation order of control information in the plurality of ACCHs.

In the system shown in FIG. 260, however, when a set of wireless communication resources involved in the single ACCH is released due to the release of one of the traffic channels by the ending of the call, it is difficult to secure the ACCH to continue the other call. The same problem may occur when the transmission rate in the ACCH is altered.

Accordingly, in addition to sharing the single ACCH by the multiple traffic channels for realizing the multiple calls simultaneously by the single mobile station MS, when the single set of wireless communication resources involved in the single ACCH is released, the ACCH is replaced by another ACCH.

FIG. 261 illustrates functional entities to realize the ACCH replacement of the system. In this illustration, the mobile station MS treats two calls, namely first call and second call, simultaneously, the first and second calls utilizing the traffic channel TCH1 or TCH2 respectively. However, only one associated control channel ACCH1 is served for transporting control information between the network and the mobile station MS in an initial state.

As shown in FIG. 261, the mobile station MS includes functional entities called TACAF, BCAF1, and BCAF2. TACAF controls the access and instructs to release and establish the ACCHs. BCAF1 controls the radio bearer for the first call while BCAF2 controls the radio bearer for the second call. BACF1 and BACF2 execute to release and establish the corresponding ACCHs, respectively.

The base station BS includes functional entities called BCFr1 and BCFr2 while the network includes a functional entity called TACF which functions as a base station controller (BSC). BCFr1 and BCFr2 respectively control the radio bearers for the first and second calls and execute to activate and release the corresponding ACCHs. TACF controls the access and instructs to activate and release the ACCHs.

Assume that the second call utilizing the traffic channel TCH2 should be continued while the first call utilizing the traffic channel TCH1 is ended. The ACCH replacement procedure will be described in the sequential diagram in FIG. 262.

In the procedure, first, once the first call utilizing the traffic channel TCH1 is ended, the traffic channel TCH1 is released. Once TACF detects the release trigger of the traffic channel TCH1, TACF determines whether ACCH1 on the same physical channel as the traffic channel TCH1 is used or not. In addition, TACF determines whether an ACCH is necessary for continuing the traffic channel TCH2 although the traffic channel TCH1 is released.

If those determinations are affirmative, TACF sends BCFr2, which is in charge of the second call, an activation request for ACCH2 that is accompanying with the traffic channel TCH2. In response, BCFr2 activates ACCH2. Then, BCFr2 sends a completion report indicating the completion of the activation of ACCH2 to TACF.

Upon the completion report, TACF informs TACAF of a replacement request for switching to ACCH2. The reception of the replacement request causes TACAF to inform BACF2 of an establishment request for ACCH2, so that BCAF2 establishes ACCH2. Additionally, TACF informs BCAF1 of a release requirement for ACCH1, so that BCAF1 releases ACCH1.

Next, TACAF sends TACF a replacement completion report indicating the completion of the replacement of ACCH. Then, TACF informs BCFr1 of a request for releasing ACCH1, so that BCFr1 releases ACCH. Consequently, the ACCH replacement is completed, so that transportation of control information between the mobile station and the network may be accomplished via ACCH2, which uses the same radio resources as the traffic channel TCH2. The ACCH replacement procedure will be described again in more detail at section 2.4.3.5.7.

2.2.3 Procedures for Encipherment Onset Moment Notification

Since mobile communications are carried out over the air, signals are sometimes ciphered (encoded into cipher) at the source terminal to be preserved from intercept or manipulation by a third party. The destination terminal deciphers the ciphered signals (decodes them to make out the meaning).

However, in communication of the enciphered signals (control signals), if the onset moment of the encipherment is unclear, it is impossible to decipher smoothly. That is, if the onset time of the decipherment may be misestimated, the meaning of signals cannot be made out.

With reference to FIGS. 751 and 752, a trouble occurring in relation to timing error of encipherment onset and decipherment onset will be described.

FIG. 751 represents a mobile communications system in which an encipherment transfer is conducted. Assume that a mobile station MS can receive signals using a diversity handover technique. As illustrated in FIG. 751, a base station controller RNC distributes the same series of transmission signals (non-enciphered signals) to a plurality of radio base stations BS1 to BS3 for diversity handover of the mobile station. Then, the radio base stations BS1 to BS3 enciphers the series of signals and transmits the enciphered signals to the single mobile station MS.

In this system, since the respective base stations execute the encipherment processes, there is likelihood that the onset moment of the encipherment varies among the base stations. It is possible in theory to align the encipherment onset moment among the base stations, but difficult in practice. More specifically, the base station controller RNC should negotiate with the radio base stations BS1 to BS3 in advance for matching the encipherment onset time. However, it is difficult in practice to prevent the timing error completely.

As described above, it is necessary that the same kind of signal (i.e., enciphered transmission signal or non-enciphered transmission signal) should be transmitted from all of the base stations BS1 to BS3 for realizing the diversity combining at the mobile station. However, layer 1 of the OSI reference model supervises between the mobile station and the respective base stations although layer 3 supervises between the mobile station MS and the base station controller RNC or between the mobile station MS and the mobile service switching center MSC.

Accordingly, as shown in FIG. 752, if the encipherment is conducted for Layer 1 of the OSI reference model, a group of base stations (e.g., BS2 and BS3) transmit enciphered signal while another group of the base stations (e.g., BS1) transmit non-enciphered signal at the same time. Therefore, it is impossible for a type of mobile station, which cannot process in parallel the enciphered signal and non-enciphered signal in view of structure simplification and production-cost reduction, to conduct diversity combining.

Therefore, it is an object to provide a communications system wherein even a type of mobile station, which cannot process in parallel an enciphered signal and non-enciphered signal, can carry out diversity reception securely. In the system, the mobile station MS and the mobile communications control center MCC mutually inform of the encipherment moment, so as to appropriately decipher for errorless communication.

Figure 64:
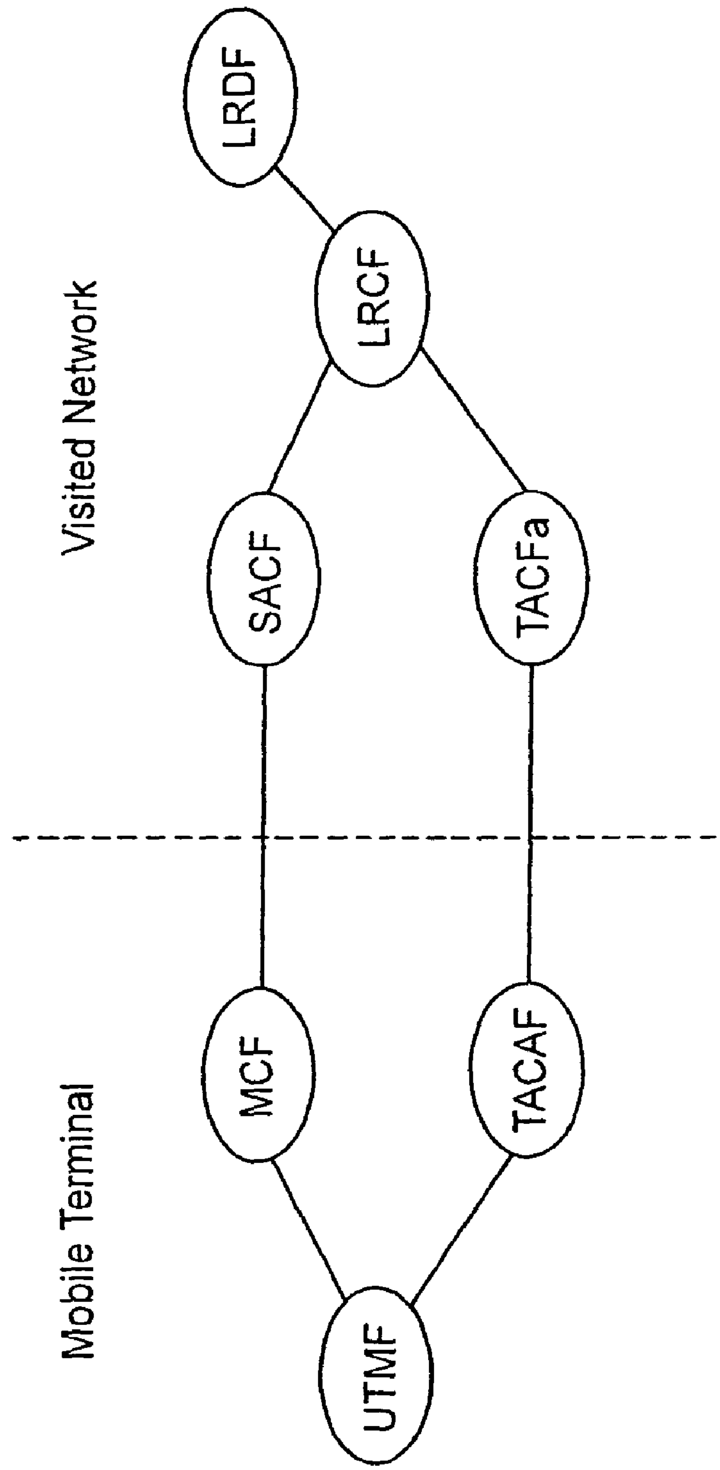
FIG. 64 is a diagram showing functional entities in the invented system for describing an encipherment onset time notification.

With reference to the functional model in FIG. 64, the encipherment onset moment notification procedures will be described. As shown in FIG. 64, the mobile station MS includes functional entities called UIMF, MCF, and TACAF. UIMF stores information on the station user and serves the user authentication and encipherment calculation. MCF functions as an interface with the network for realizing services that are not related to calls. TACAF controls the access processes to the mobile station terminal, e.g., the origination, paging, and so on.

The network on the other hand includes functional entities called SACF, TACF, LRCF, and LRDF. SACF is connected with MCF to function as an interface with the mobile terminal for realizing services that are not related to calls. TACF is connected with TACAF to control the access processes to the mobile station terminal, e.g., the origination, paging, and so on. LRCF is connected with TACF and SACF to control mobility management. LRDF stores various data on mobility management.

Figure 63:
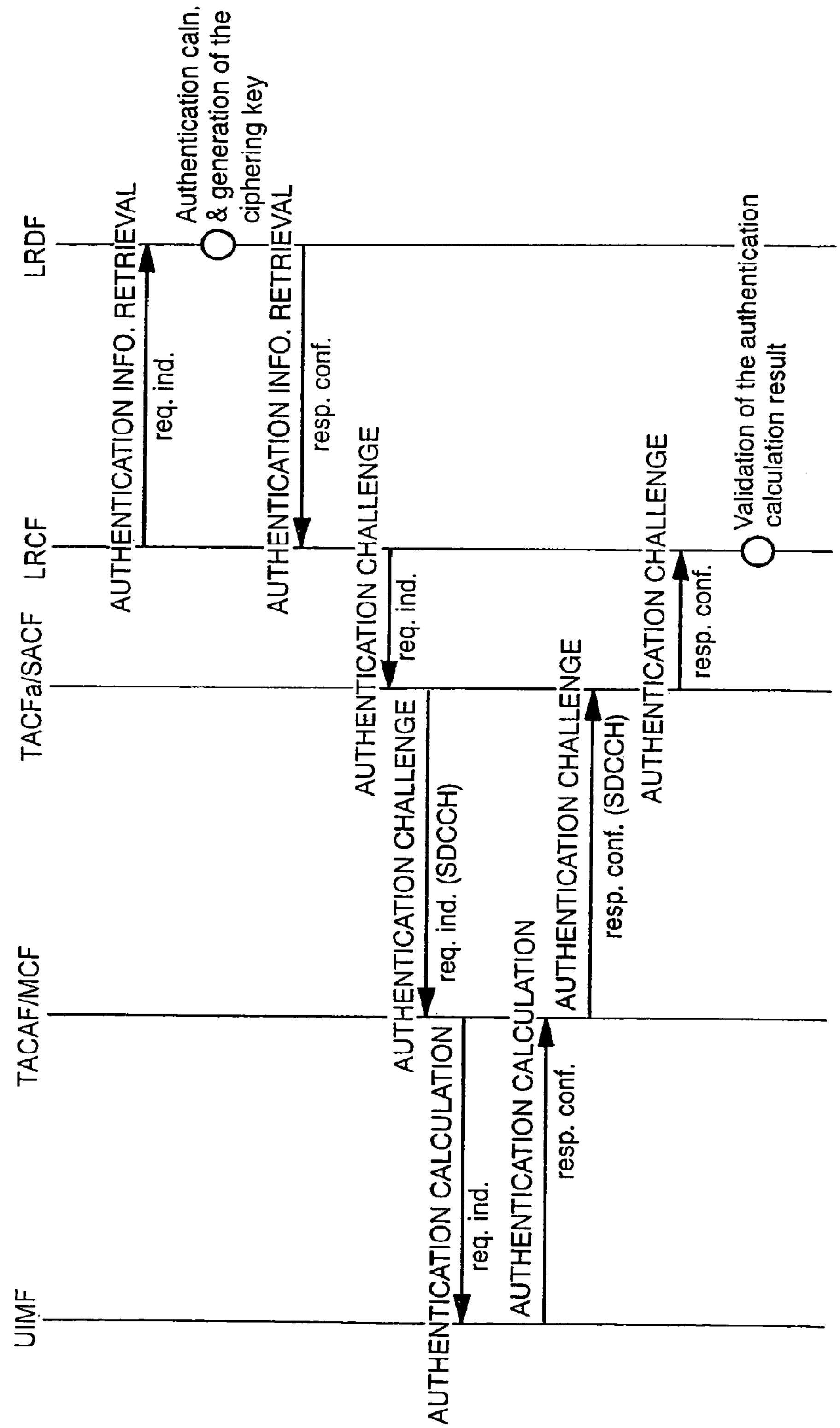
FIG. 63 is an information flow diagram representing the user authentication procedure in the invented system.

With such a structure, prior to the mutual notification of the encipherment onset, a user authentication procedure (refer to section 2.4.5.1) is executed as shown in FIG. 63. In execution of the user authentication procedure, a certificated encipherment key is previously stored at UIMF and LRDF of the network and mobile terminal and delivered to TACAF, MCF, TACF, and SACF.

Figure 65:
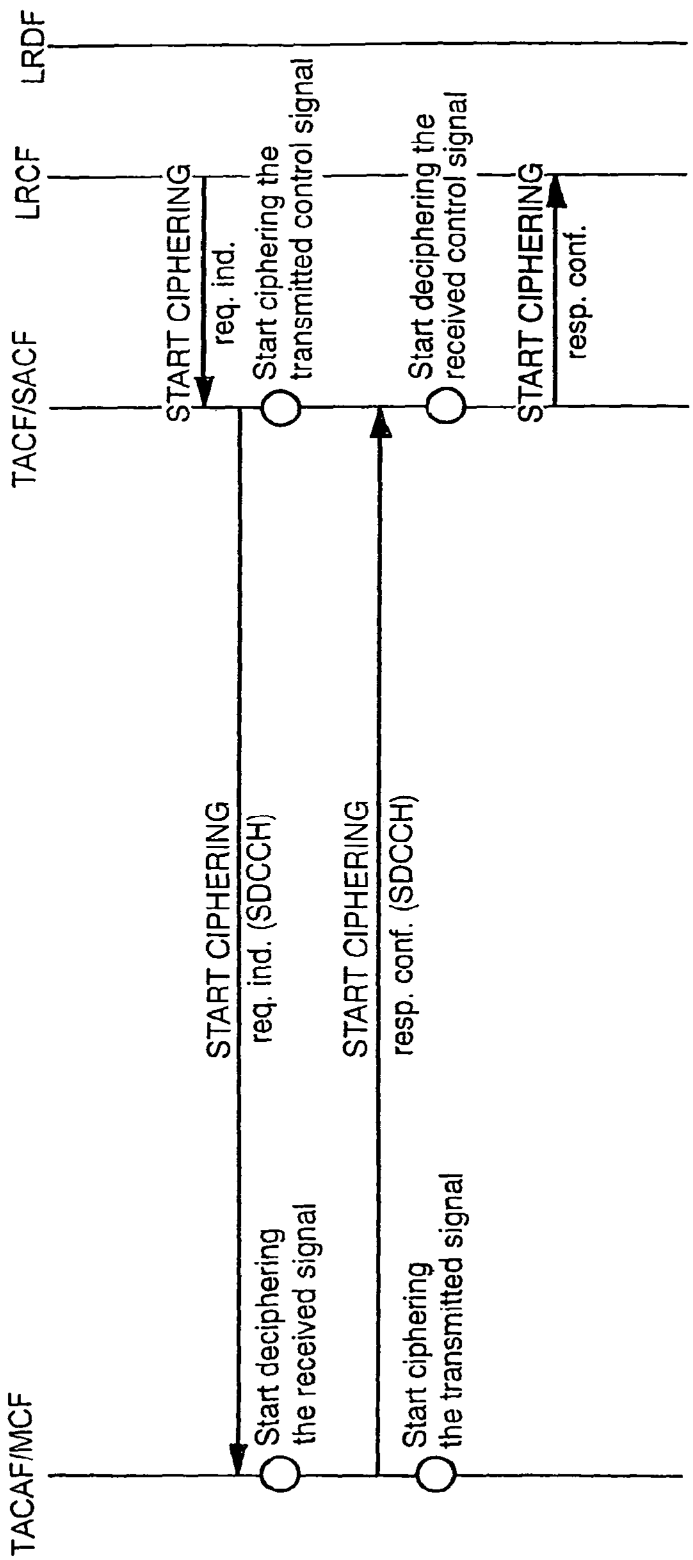
FIG. 65 is an information flow diagram representing the encipherment onset time notification.

Then, mutual notification of the encipherment onset time is carried out in accordance with the sequence shown in FIG. 65. More specifically, first, LRCF of the network sends a START CIPHERING request indication for indicating that the network will start encipherment to TACAF and MCF of the mobile terminal via TACF and SACF of the network. Consequently, the mobile terminal can recognize that the succeeding signals transmitted from the network will be ciphered. After the transmission of the START CIPHERING request indication, TACF and SACF of the network cipher succeeding signals according to a preselected encipherment procedure using a preselected ciphering key. Once the mobile terminal receives the enciphered signal, TACAF and MCF controls the decipherment of the received signals. In advance to the decipherment, TACAF and MCF receive the encipherment key from UIMF to carry out the decipherment. Accordingly, the downlink signal transmitted from the network can be transported in secret and interpreted by only the mobile terminal.

Next, TACAF and MCF of the mobile terminal send a START CIPHERING response confirmation to TACF and SACF of the network, this confirmation indicating that mobile station will next start to transmit enciphered signals. Consequently, the network entities can recognize that the succeeding signals transmitted from the mobile terminal will be ciphered. After the transmission of the START CIPHERING response confirmation, TACAF and MCF of the mobile terminal cipher succeeding signals according to a preselected encipherment procedure using a preselected ciphering key. Once the terminal entities receive the enciphered signal, TACF and SCF decipher the received signals. Accordingly, the uplink signal transmitted from the mobile terminal can be transported in secret and interpreted by only the network.

Next, it will be discussed which kind of information should be ciphered. In the invented system, the source device can freely decide the information to be ciphered as long as the destination device is notified of the ciphered information and communications at layers 1 through 3 are established.

It is known that open system interconnection protocols should be adapted to the open system interconnection reference model illustrated in FIG. 263. The OSI model defines the hierarchy consisting of seven functional layers for managing various functions from physical interconnection to application.

The lowest layer, layer 1 is called the physical layer. The physical layer prescribes mechanical or electrical procedures or means, for example, configurations of connection plugs.

Layer 2, datalink layer operates to establish, maintain, and release an individual data link and to detect and recover the error occurring in the physical layer.

Layer 3, network layer sets up and manages an end-to-end connection between different networks, whereby the upper layers can proceed their respective functions without processing for the network type.

Layer 4, transport layer controls the transparent end-to-end data relaying service between session entities.

Layer 5, session layer establishes or releases the session connection.

The sixth or presentation layer negotiates agreeable technique for data encoding and punctuation.

The seventh or application layer identifies the communicating source and instructs the service quality.

The international telecommunication union (ITU) scribes the line circuit interface at layer 3 that corresponds to layers 3 through 7 in the OSI reference model.

The relationship of the OSI reference model and the present system will be described in more detail with reference to FIG. 753. FIG. 753 is a general view of the present system.

The system illustrated in FIG. 753 includes a mobile station MS, a plurality of radio base stations BS communicable with the mobile station MS over the air, an base station controller RNC for controlling the base stations BS, and a mobile service switching center MSC for connecting the base station controller RNC with a fixed network. In addition, the system meets the following conditions:

i) Both of the mobile station MS and the base station controller RNC can carry out diversity reception and distribution.

ii) Layer 1 of the OSI reference model for the radio channel supervises between the mobile station MS and the respective base stations BS.

iii) Layer 2 of the OSI reference model for the radio channel supervises between the mobile station MS and the base station controller RNC.

iv) Layer 3 of the OSI reference model for the system supervises between the mobile station MS and the base station controller RNC or between the mobile station MS and the mobile service switching center MSC.

In addition, Layer 2 should meet the following functional conditions:

i) At the source, it has a function to retransmit layer-2 frames ii) At the destination, it has a function to reassemble layer-3-frames from received layer-2-frames in the regular order even if a layer-3-frame was divided into a plurality of layer-2-frames at the source.

iii) At the destination, it does not have a function to interpret a ciphered signal and non-ciphered signal both corresponding to the same information when it receives them simultaneously.

Under the above-mentioned conditions, assume that layer 2 conducts the encipherment procedure on layer 2. In this case, as shown in FIG. 754, an application in the mobile service switching center MSC sends an encipherment onset indication at step S1. The encipherment onset indication is transferred from layer 3 to a layer-2-controller at step S2, to a layer-2-cipherer/decipherer at step S3, and to the mobile station MS at step S4.

The network application then sends an encipherment onset request to the layer-2-cipherer/decipherer of the mobile station MS via the layer-2-cipherer/decipherer of the network at step S5. Afterward, the application of the mobile service switching center MSC makes the layer-2-cipherer/decipherer of the base station controller RNC carry out the encipherment process, whereby the signal transmitted from the layer-2-cipherer/decipherer are enciphered.

In the mobile station MS, the encipherment onset indication is transferred from layer-2-cipherer/decipherer to layer-2-controller at step S6, to layer 3 at step S7, and finally to the application at step S8. Upon the reception of the encipherment onset indication, the application of the mobile station instructs or sets the layer-2-cipherer/decipherer to decipher the transmitted signal from the network at step S9.

If the second layer conducts the encipherment process under the above-described conditions, the encipherment is started at the network before the signals are distributed to the radio base stations BS for diversity handover in the network. Therefore, the mobile stations can receives the ciphered signals from the respective base stations, thereby achieving diversity handover surely even if it cannot process in parallel an enciphered signal and non-enciphered signal.

However, in this case, it is possible that the application of the mobile station requests the layer-2-cipherer/decipherer to decipher signals (Step S9) simultaneously with the retransmission request from the layer-2-controller in the mobile station to the network (Steps S10 to S12). If the network begins to retransmit the requested signals (Steps S13 and S14) before the completion of the decipherment set-up in the layer-2-cipherer/decipherer, the layer-2-cipherer/decipherer will not decipher the enciphered signal and transfer it as it is to the layer-2-controller. In this case, the layer-2-frame sequence number of the signals may not be interpreted. This phenomenon is caused from that although layer 2 (datalink layer) detects errors occurring at layer 1 (physical layer) referring to CRCs attached to the signal frames and facilitates the retransmission, layer 2 also provides the encipherment procedures.

This results in problems: the first problem is that the retransmitted layer-2 frames cannot be utilized, and the second problem is that it is impossible to reassemble layer-3-frames from received layer-2-frames in the regular order if a layer-3-frame was divided into a plurality of layer-2-frames at the source.

Accordingly, it is preferable that the mutual notification of the encipherment onset (transmission of START CIPHERING request indication and START CIPHERING response confirmation) is conducted at the layer which is layer 3 or higher rather than layer 2 in the OSI reference model. Therefore, in the system, ciphered is only information that should be processed only in one or more layers which are the same as or higher than layer 3 of the OSI reference model although the mutual notification of the encipherment onset time is conducted at layer 2.

Consequently, although normal reception is not achieved by an error occurring in layer 1 (physical layer), the retransmission can be made out by the error detection and retransmission in layer 2 independently of layer 1. The retransmission causes the reception of the non-received signals in the proper order by the destination. Therefore, the destination can recognize the encipherment onset time at an improved precision. However, if the reliability of layers 1 and 2 can be improved, it is possible to cipher at layer 2.

2.2.4 Reassignment of TMUI

In the system, an IMUI (international mobile user identity) is already assigned to each of the mobile stations. Each mobile station stores the corresponding IMUI while the network stores a plurality of IMUI of the mobile stations. Communication may be carried out using the IMUIs, but they can be intercepted by a third party since mobile communications may be achieved by the air interface. This results in that the third party can communicate using the intercepted IMUI.

Therefore, in the present system, the network assigns another identity, namely, TMUI (temporary mobile user identity) to each of the mobile stations that is communicable with the network and notifies the corresponding mobile station about TMUI. More specifically, the TMUI is enciphered to be preserved from being intercepted, and then transmitted through the air interface to the mobile station.

The assignment of TMUI is conducted at the location registration procedure. If the location registration procedure is failed, the location registration procedure should be repeated again. Therefore, confusion of TMUI at each mobile station will not occur in theory. However, if a machine storing TMUI in a mobile station or the network malfunctions, such confusion of TMUI and IMUI may occur.

In this case, recovery process is needed for correcting the confusion. Therefore, the system adopts the following procedures, which should be carried out by the network and the mobile station MS.

FIG. 264 represents a sequential operation by the network and a mobile station MS. This operation starts after a call attempt comes into the network from a user terminal other than the mobile station MS illustrated in FIG. 264. Once the network (more exactly, the mobile communications control center) receives a call income, the mobile communications control center first carries out a paging in a manner that TMUI of the incoming call destination is specified, as shown in FIG. 264. This paging process is a broadcasting of TMUI to the areas of which the mobile communications control center MCC is in charge.

As mentioned above, TMUI is assigned to each mobile station MS communicable with the mobile communications control center MCC and each mobile station MS stores its TMUI. Therefore, once mobile stations MS receive the broadcast TMUI, each mobile station determines whether the broadcast TMUI is coincident with the TMUI stored therein. If the determination is affirmative, only the corresponding mobile station MS sends a paging response to the mobile communications control center MCC at step S2.

Next, the network checks the authenticity of the user (see section 2.3.2.4.1). More specifically, the network generates a necessary authentication information (random number) for checking the authenticity of the accessing mobile station MS and transmits it to the mobile station MS at step S3. Once the mobile station MS receives the authentication information, the mobile station MS executes an arithmetic operation based on the authentication information (random number) and transmits the authentication calculation result as an authentication response at step S4. The authentication calculation uses an authentication key stored in each mobile station MS previously. The network stores the authentication keys of the respective users at its storage device (e.g., SDF) in a manner that the respective authentication keys are associated with the respective IMUIs and TMUIs for finding the correlation.

Then, the network reads out the authentication key corresponding to the temporary mobile user identity used for the paging at step S1. Next, the network executes the authentication calculation on the basis of the read authentication key and the authentication information (random number) transmitted at step S3, and determines whether or not this calculation result is coincident with the calculation result by the mobile station MS at step S5. If the determination is affirmative (the results are coincident), the mobile station MS is authenticated (the mobile station belongs to a proper subscriber and is the proper call destination). Afterward, a normal incoming call acceptance procedure is executed.

However, if the determination is negative (the results are not coincident), the mobile station MS is not the call destination. Such a discord is caused from that the replying mobile station MS is fraudfull or TMUI managed by the network and TMUI managed by the proper subscriber's mobile station became discord with each other accidentally. Accordingly, the network checks the authenticity of the mobile station using the international mobile user identity.

Specifically, first the network (in fact, the mobile communications control center) transmits an IMUI transmission request to the mobile station MS for instructing it to transmit the IMUI at step S6. In response, the mobile station MS notifies the IMUI stored in itself.

The network then generates the random number again as the authentication information and sends it to the mobile station MS. In response, the mobile station MS uses the authentication information and the authentication key stored in itself to execute an authentication calculation and sends the authentication calculation result as an authentication response to the network at step S9.

The network then accesses to the storage device thereof and reads out the authentication key corresponding to the IMUI obtained at step S7. Next, the network executes the authentication calculation on the basis of the read authentication key and the authentication information (random number) transmitted at step S8, and determines if this calculation result is coincident with the calculation result by the mobile station MS or not at step S10. If the determination at step S10 is negative (the results are not coincident), the mobile station MS is completely fraudfull, so that the radio channel between the network and the mobile station MS is disengaged, thereby finishing the communication at step S12.

On the contrary, if the determination at step S10 is affirmative (the results are coincident), the mobile station MS can be considered to belong to a proper subscriber, but its TMUI was altered accidentally. Thus, the mobile communications control center MCC reassigns TMUI at step S11. In other words, as long as the mobile station MS belongs to a proper subscriber, it can obtain TMUI again and afterward it can communicates with the network by means of the newly assigned TMUI although the former TMUI has been changed to null accidentally. However, since the mobile station is not a call destination in fact (although the mobile station belongs to a proper subscriber), the radio channel between the network and the mobile station is disconnected, so that the communication is ended at step S12.

As described above, according to this reassignment of TMUI, although TMUI stored in the network and TMUI stored in the mobile station MS is different, the network can recognize that mobile station MS belongs to a proper subscriber as long as the IMUI is correct and can reassign the new TMUI to the mobile station MS. Therefore, although the former TMUI has been changed to null accidentally, the mobile station can be returned quickly to the normal condition in which it can communicate normally.

Furthermore, when the location of the mobile station is registered or the mobile station request the call origination as well as the incoming call acceptance described above, the authentication using the TMUI is conducted. In this case, the reassignment of the TMUI is conducted if necessary. In the network, the TMUIs are managed by SDF, which will be described later. SDF can be, for example, arranged in a location register for managing various information on subscribers in the network.

2.3 Brief Description of System

Next, the system will be described briefly.

2.3.1 Provided Services

This system can totally provide various information transfers including voice transfer and data transfer. This system can also provide one mobile station With a plurality of bearer services at the same time. For example, the single mobile station can benefit by two unrestricted digital bearer services at 64 kbps simultaneously. Furthermore, unlike the traditionally PDC mobile communications system, the wire communication meets the requirements of ATM and the radio communication meets the requirements of CDMA, whereby transfer is achieved at improved quality and improved velocity.

FIG. 266 shows the features of services, which can be provided by this system. In addition, the present system can be connected with another system managed in accordance with PSTN, N-ISDN, PLML, B-ISDN, or IMT-2000.

2.3.1.1 Bearer Services

This system can provide the following bearer services.

(1) Circuit Switching Mode a) Voice Bearer Service at 8 kbps

This bearer service is provided for supporting voice services. The digital signals at the Um reference point comply with ITU-T recommendation G.729. However, the bit transparency is not ensured. This bearer service will not be utilized for voice-band data communication. The features of the voice bearer service at 8 kbps are listed in FIG. 267.

b) Unrestricted Bearer Service at 64 kbps

This bearer service provides information transfer at 64 kbps, the information being not changed between the Um reference points. The features of the unrestricted bearer service at 64 kbps are listed in FIG. 268.

c) Multiplex-Rate unrestricted Bearer Service at n×64 kbps (n is a natural number, e.g., 6)

This bearer service provides information transfer at 384 kbps wherein subrate information is multiplexed with one another, the subrate information being not changed between the Um reference points. The features of the multiple-rate unrestricted bearer service are listed in FIG. 269.

(2) Packet Switching Mode (Should be Studied Further)

This system can provide bearer services at the packet switching mode in addition to those at the circuit switching mode.

2.3.1.2 Mobility Service

In order to facilitate the mobility or portability services, international mobile user identity (IMUI) is adopted. IMUI is previously assigned to each of the mobile stations for identifying the respective mobile stations. Each mobile station stores its IMUI while the network mobile communications control center MCC stores a plurality of IMUIs of the mobile stations that are served by the network. When one mobile station moves to a next radio zone, the IMUI of the mobile station is utilized for the location registration and handover, so as to enable the mobile station to communicate irrespectively of its location.

2.3.1.3 Quality Requirements

This system enables error correction coding and retransmission functions. Therefore, the average bit-error rate in the network and the air interface is ensured to be less than $10^{-3}$ in relation to voice transfer. In relation to transfer of information, e.g., data or control information other than voice, the average bit-error rate is ensured to be less than $10^{-6}$.

2.3.2 System Capabilities 2.3.2.1 System Capabilities on Connection Services 2.3.2.1.1 Origination "Origination" is a series of controlling procedures for setting up the intra-network and network-MS access links necessary for communicating with a called terminal and for setting up connection to the called terminal on the basis of an access of a calling mobile station upon a call attempt by the user of the calling mobile station. "Origination" procedures include an SDCCH control, user identity retrieval, user authentication, encipherment-onset time notification, establishment of access link, mutual information transfer to and from the calling user terminal, and analysis.

The system comprises the following capabilities for the origination procedures. First, it is possible to establish an SDCCH (stand-alone dedicated control channel) to inform the network of the call attempt by the mobile station MS. SDCCH will be described later in more detail at the section entitled "SDCCH Control" of this chapter. Furthermore, in order to establish the association (terminal association) between the mobile station and the network, the system comprises the following functions.

a) The network is notified of the call attempt indicating the temporary mobile user identity (TMUI) of a calling mobile station by the mobile station, thereby setting up the terminal association. In addition, the network is informed of feature capabilities of the mobile station by the mobile station and the information on the capabilities is stored in the network, so that the network controls to allow or reject the another call attempt to the mobile station.

b) The network recognizes the calling mobile station, which has requested the call attempt, and transfers unique information about the calling mobile station from a network data base to analyzing functional entities and control functional entities. If the network cannot recognize the temporary mobile user identity (TMUI) the calling mobile station, the network sends an inquiry about the international mobile user identity (IMUI) to the calling mobile station for recognition.

c) The user authentication of the mobile station is executed as described above. The user authentication will be described in more detail at the section entitled "User Authentication" of this chapter.

d) In order to preserve signals transmitted through the control channel and the information channel between the mobile station and the network from being intercepted and manipulated by a third party, signals are ciphered. The encipherment will be described in more detail at the section entitled "Encipherment" of this chapter.

e) The mobile station is informed of successes and failures of the above-mentioned respective procedures.

In addition, the network is informed of the services required by the calling mobile station after the establishment of the terminal association. In addition, the network informs the calling mobile station of the acceptance of the call attempt after the establishment of the terminal association.

Additionally, a call origination control function is informed of an instance of the terminal association control function, whereby they are associating with each other.

The mobile station informs the network of the environmental radio condition around the mobile station when the calling mobile station sends the call attempt, whereby the network recognizes the condition.

Upon the reception of the call attempt from the mobile station, the user profile of the originating terminal is retrieved and analyzed, so that the services that can be provided for the originating terminal are determined.

On the basis of the analysis of on the call attempt from the mobile station, appropriate network resources, for instance, voice coder-decoders, data trunks, and wired channels in the network are captured, set up, and activated.

The access link for the traffic channel and the associated control channel, which are suitable for the services requested by the calling mobile station, can be established (refer to the section entitled "Access Link Establishment" in this chapter). Once the associated control channel is established, the SDCCH transferring previously the control signals is released. The release of the SDCCH will be described in more detail at the section entitled "SDCCH Control" in this chapter.

The called user terminal is requested to communicate with the originating user terminal. While the called terminal is requested to communicate, the originating user terminal is informed of the calling to the called user terminal and the response from the called user terminal.

The calling or called mobile terminal, for which the call has been established, can originate another call (additional call). However, since the mobile terminal has been already authenticated, the authentication process is not carried out for the additional call.

In addition, although a call has been established between terminals, another call requested from a third party may be established.

2.3.2.1.2 Incoming Call Acceptance

"Incoming call acceptance" is a series of controlling procedures wherein the networks calls a destination user mobile station upon a service request from a calling user terminal, and receives the response from the destination user mobile station so that access-links within the network and between the network and the mobile station are established, and connection between those mobile stations are established for the communication between the calling and destination user terminals. "Incoming call acceptance" procedures include paging, SDCCH control, user identity retrieval, user authentication, encipherment-onset time notification, routing in the network, establishment of access link, mutual information transfer to and from the called user terminal, and analysis.

The system comprises the following capabilities for the termination procedures.

First, the network receives a call attempt from a calling user terminal which may be a subscriber terminal of this system or another system connected thereto. Then, the network retrieves the profile of the called user terminal on the basis of the mobile user identity of the called user terminal. Therefore, the network can obtain various information necessary for analyzing the services which can be provided for the called user terminal, for analyzing the condition of the called user terminal, for determining if paging is necessary or not, for determining the areas for the paging, and for establishing the terminal association between the network and the called user terminal. Then, the paging function entity of the network is activated for paging. However, the paging is not carried out for the additional call.

The called mobile station is called by means of the mobile user identity of this mobile station. The network can recognize the responding mobile station. Usually, in this procedure, TUMI may be used for the mobile user identity. If the network detects an abnormality of the TMUI, the IMUI uniquely given to the mobile station is used. The paging procedure may be realized by the following capabilities.

a) The network recognizes the area or areas where the called mobile station is paged, and then determines the paging channels used for the paging. Then, the network distributes a paging signal to intra-network nodes (base terminal systems). In response, each BTS transmits a paging signal in its coverage sector for paging the called mobile station within the necessary area.

b) An SDCCH is established in order that the mobile station sends the network a response to the paging. This feature will be described in more detail at the section entitled "SDCCH" control in this chapter.

c) Once the called mobile station sends the network the response to the paging, the terminal association between the called mobile station and the network is activated. In addition, the response signal can be identified by a paging ID corresponding to the calling signal. Furthermore, the mobile station notifies the network about the capability of the mobile station. The network stores the information on the mobile station capability for future reception management of another new call attempt to the mobile station.

The mobile station informs the network of the environmental radio condition around the mobile station when the mobile station responds to the paging, whereby the network recognizes the condition.

Once the mobile station responds to the paging, the network establishes the terminal association between the network and the mobile station. The establishment of the terminal association is executed as follows:

a) The user authentication of the mobile station is executed as described above. The user authentication will be described in more detail at the section entitled "User Authentication" of this chapter.

b) In order to preserve signals transmitted through the control channel and the information channel between the mobile station and the network from being intercepted and manipulated by a third party, signals are ciphered. The encipherment will be described in more detail at the section entitled "Encipherment" of this chapter.

c) The mobile station is informed of successes and failures of the above-mentioned respective procedures.

After the establishment of the terminal association, a routing process is carried out for specifying the route to the intra-network control node which has controlled the establishment, and then the intra-network control node is informed of the setting up of the channels within the network and the services requested by the originating user terminal, so as to activated the incoming call acceptance control function. Additionally, the incoming call acceptance control function is informed of an instance of the terminal association control function, whereby they are associating with each other.

Upon the call attempt, the user profile of the called terminal is retrieved and analyzed, so that the services that can be provided for the called terminal are determined.

On the basis of the analysis of on the call attempt, appropriate network resources, for instance, voice coder-decoders, data trunks, and wired channels in the network are captured, activated and set up.

The access link for the traffic channel and the associated control channel, which are suitable for the call attempt, can be established as will be described at the section entitled "Access Link Establishment" in this chapter. Once the associated control channel is established, the SDCCH transferring previously the control signals is released. The release of the SDCCH will be described in more detail at the section entitled "SDCCH Control" in this chapter.

The called user terminal is informed of a service request from the originating user terminal. While the called terminal is informed of the service request, the originating user terminal is informed of the calling to the called user terminal and the response from the called user terminal.

Although a call has been established between terminals, another call requested from a third party may be established.

In addition, the calling or called mobile terminal, for which the call has been established, can respond to another call (additional call). However, since the mobile terminal has been already authenticated, the authentication process is not carried out for the additional call.

Furthermore, if a plurality of mobile stations respond to the incoming call acceptance paging, a new TMUI is, during the termination procedures, reassigned to one of the mobile station where the stored TMUI is changed accidentally.

2.3.2.1.3 Call Release

"Call release" is a series of procedures for releasing the link within the network and the access link between the mobile terminal and the network used for a call, and releasing the connection between the mobile terminal and the other user terminal. The call release is carried out upon a call release request from the mobile terminal or the other user terminal, or upon a detection of the deterioration of the radio communication quality. The call release includes a user disconnection procedure (updating the user status data) and a procedure for releasing access links.

When releasing the last call for a mobile station, the association between the mobile station and the network is released. This process accompanies with updating the status data in connection with the mobile station.

For executing the call release, the system comprises the following capabilities.

The network is notified of a call release request from a user terminal, and the user terminal is notified of the acceptance of the release request by the network.

In addition, the network informs the user terminal of a call release request from the other user terminal.

In order to update the user status data when the call release occurs, the user profile is updated.

The access link corresponding to the released call is also released as will be described in more detail at section 3.2.2.3 entitled "Access Link Release."

It is determined as to if the released call is the last call for the mobile station or not. If it is the last call, the status data in connection with the mobile station managed in the network is updated to indicate none call status.

Call can be also released upon an access link release procedure (refer to section 3.2.2.3 entitled "Access Link Release") resulting from the detection of out of synchronization.

Call can be also released upon a call release request from the mobile terminal.

Call can be also released if the originating mobile station abandons the call.

2.3.2.2 System Capabilities on Access Link Control 2.3.2.2.1 SDCCH Control

"SDCCH Control" includes a procedure for establishing an SDCCH (stand-alone dedicated control channel) for transporting control massages between the mobile station and the network and a wired access link for transporting the control messages within the network on the basis of an access of a mobile station; and a procedure for releasing the SDCCH and the wired access link within the network when they become not necessary. These procedures are carried out for every process, which needs the interaction between the mobile station and the network, e.g., the mobile station call origination process, the mobile station call termination process, and the mobile station location registration.

In order to execute the SDCCH control, the system comprises the following functions.

The mobile station executes a random access procedure over the RACH (random access channel) and requests the network to establish the SDCCH. In response, the network assigns radio resources (uplink and downlink codes) for the SDCCH to the mobile station using a FACH (forward access channel). The relationship between the establishment request and the assigned the code resources are determined by a random number (personal identification or PID) contained in the request message transmitted by the mobile station.

In addition, the network can select the radio resources (uplink and downlink short codes) for the SDCCH for each sector from the resources managing for the sector. Unique uplink and downlink long codes are used for each base station. In addition, the phase of long codes used for each sector in a cell is different from that used for the other sectors in the same cell. Thus, the mobile station obtains the current downlink long codes by a cell search process or broadcast information from a broadcasting channel BCCH1 and obtains the current uplink long codes by broadcast information from the broadcasting channel BCCH1.

The network also establishes a wired access link for transferring the control messages within the network upon the establishment request for the SDCCH from the mobile station.

It is possible to recognize information on the location of the mobile station when requesting to establish the wired access link within the network.

It is possible to control the power for transmission through the RACH, FACH, and SDCCH. The control manner will be described at section 2.3.2.2.6 in more detail.

The network and mobile station can recognize that the status in which the SDCCH is unnecessary since, for instance, a process, e.g., the location registration which is not associated with call is ended or transited to the ACCH. Then, the network and mobile can release the SDCCH respectively.

2.3.2.2.2 Access Link Establishment

"Access link establishment" is a series of procedures for setting up a traffic channel for transferring user information and control channels for transferring control information between the network and the mobile station that originates a call or is called. These procedures include establishing wired access link in the network and radio access link between the network and the mobile station.

In order to execute the access link establishment, the system comprises the following capabilities.

The network determines information transfer capabilities and quality levels needed for the respective connection access links on the basis of a call/connection control request, and then allocates appropriate resources to the access links.

The mobile station designates candidate sectors, for which the wired access links or radio access links should be established, on the basis of the measurements of the perch channels and the broadcast information from the network. Then, the mobile station informs the network of the candidate sectors. The call acceptance control procedure will be described in more detail at section 2.3.2.2.7.

The network sets up the wired access link between the network and the respective candidate sectors. Each established wired access link includes the traffic channel for transferring user information and, if necessary, the control channel for transferring control signals.

The network stores the uplink long codes for radio access links in a database within the network according to MS identifiers (TMUI/IMUI). The network retrieves the information from the database to set up an access link.

The network selects radio resources for the radio access link in the specified sector and allocate them to the mobile station. The radio resource selection will be described in more detail at section 2.3.2.2.5.

The mobile station transmits information to the network for determining the initial power for transmission through the downlink radio access link, the information being based on the measurements on the perch channel and including information on the power for transmitting through the perch channel and the signal-to-interference ratio about the signal received from the perch channel.

The network determines the initial power for transmission through the downlink radio access link upon the reception of the information from the mobile station. The control of the transmission power will be described in more detail at section 2.3.2.2.6.

The base station controller receives information on the wired access links and the radio access links and is able to start diversity handover based on the information at the same time when the access links are established for the candidate base stations, and carries out diversity handover on the basis of the information on the candidate sectors. Handover procedures will be described in more detail at section 2.3.2.2.4.

The mobile station informs the network of the respective phase differences upon a broadcast information (periodical broadcasts at the intervals of 20 msec), each phase difference being the difference between the uplink long code phase of the sector to which the SDCCH is established and the uplink long code phase of another candidate sector.

The network synchronizes the uplink radio access links on the basis of the uplink long code phase difference information from the mobile station.

2.3.2.2.3 Access Link Release

"Access link release" is a series of procedures for releasing all traffic channels for transferring user information between the network and the mobile station and all control channels for transferring control information therebetween. "Access link release" procedures include a procedure for releasing wired access links in the network and radio access links between the network and the mobile station.

In order to execute the access link release procedures, the system comprises the following capabilities.

Due to release of an individual connection or release of connections for a released call, the network releases the corresponding access link. The release of access link is requested from the network to the corresponding mobile station.

If the network detects out-of-synchronization status in connection with all handover branches involved in an access link and does not detect the synchronization status again for a certain time period counted by a squelch reservation timer, the network executes to release the access link.

If the mobile station detects out-of-synchronization status in connection with all handover branches involved in an access link, the mobile station stops to transmit over radio channels involved in the access link and causes the network to recognize that the out-of-synchronization status occurs. It is possible that the mobile station informs the network of the occurrence of the out-of-synchronization.

When an access link is released during diversity handover, all the handover branches involved in the access link are also released.

2.3.2.2.4 Handover

"Handover" is a series of procedures for altering the access point through which a mobile station accesses the network while the communication therebetween is continued. The handover is necessary for the reason of travelling of the mobile station and deterioration of the communication quality, or in order to distribute traffic. The handover procedures include alteration of radio access link and if necessary, alteration of wired access link. In order to execute handover, the system comprises the following capabilities.

The system can execute various types of processes for realizing handover as described below.

a) Inter-Sector Handover Branch Addition in Single Cell

Near the boundary between sectors in a single cell, added is a branch for a new sector, which is different from the sector currently used, but in the same cell. This addition does not accompany with an addition of the wired access link in the network.

b) Inter-Cell Handover Branch Addition

Near the boundary between cells, added is a branch for a new cell, which is different from the cell used currently. This addition does accompany with an addition of the wired access link for the newly added cell in the network.

c) Inter-Sector Handover Branch Deletion in Single Cell

Near the boundary between sectors in a single cell, deleted is one of handover branches for the sectors when intra-cell diversity is no longer necessary. This deletion does not accompany with a deletion of the wired access link in the network.

d) Intra-Cell Handover Branch Deletion

Near the boundary between cells, deleted is one of handover branches for the cells when inter-cell diversity is no longer necessary. This deletion does accompany with a deletion of the wired access link for the newly deleted cell in the network.

e) Intra-Cell Branch Replacement Handover

At a boundary between sectors in a single cell, all handover branches are released, and then a new access link is established for the sector, which should be newly served. If the service attributes are not necessary to be changed for this handover, the wired access link in the network is left.

f) Inter-Cell Branch Replacement Handover

At a boundary between cells, all handover branches are released, and then a new access link is established for the cell, which should be newly served. If the service attributions are not necessary to be changed for this handover, the wired access link in the network is left.

g) Intra-Sector Frequency Replacement Handover

For all handover branches being used for communication, the radio frequency is replaced by another frequency. This handover does not accompany with an addition or deletion of the wired access link in the network.

h) Code Replacement Handover

For a handover branch being used for communication, the downlink short code is replaced by another downlink short code belonging to the same code type in the same sector. This handover does not accompany with a replacement of the wired access link in the network.

i) User Data Rate Modification

In order to alter user-to-user connection attributions, e.g., the user data rate or voice/data type, all handover branches for the connection is released, and then access links for the altered connection are established.

j) ACCH Replacement

Although radio resources used by an ACCH are released for the reason that a connection or call is released, it is sometimes necessary to continue another call. In this case, the ACCH is handed over to the wired access link and radio access link that has been used for the remaining call.

When control signals are transported through an ACCH corresponding to a connection, it is sometimes necessary to alter the transmission rate. In this case, the ACCH is handed over to the wired access link and radio access link that has been used for another connection.

k) Code Type Replacement

"Code type replacement" may be carried out. In this case, for all handover branches being used for communication, the downlink short codes are replaced by downlink short codes belonging to a different code type in the same sector. This handover does not accompany with a replacement of the wired access link in the network.

By the above-mentioned handover branch addition, the maximum number of handover branches availed for all simultaneous connections is "N."

The mobile station, on the basis of the perch channel measurements and call acceptance information from the network, requests the network to activate the handover branch addition, handover branch deletion, and branch replacement handover. The request information for the activation includes the information for designating the candidate sectors for handover. The call acceptance control will be described in more detail at section 2.3.2.2.7.

Upon the reception of the activation request, the network selects the sectors for handover from the candidate sectors.

In the handover branch addition, the network assigns the radio frequency band, which is the same as of the currently used branch, to the channel for the additional branch, the radio frequency band being the radio resource. In addition, the network assigns the same uplink code resources to all of the branches for one connection. The selection of the radio resources will be described in more detail at section 2.3.2.2.5.

When it is impossible to carry out the handover because of a deficiency in necessary radio resources or intra-network resources, the network ignores the handover request from the mobile station. If the mobile station does not receive the handover executing instruction, from the network for a certain time, that should be transmitted upon the reception of the handover request from the same mobile station, the mobile station analyzes the necessity of handover again. Then, the mobile station requests the network to execute the handover again if it is determined to be necessary.

The mobile station sends the network the information to be used for determining the initial transmission power over the downlink access link of the additional branch. The information is based on the perch channel measurements.

Upon the reception of the information for determining the initial transmission power, the network determines initial transmission power over the downlink access link of the additional branch. The transmission power control will be described in more detail at section 2.3.2.2.6.

In the handover branch addition, based on a broadcast information (periodical report information) at the intervals of 20 msec, the mobile station informs the network of the phase difference of uplink long codes among the respective candidate sectors, and the group of frame offsets and group of slot offsets used in the mobile station.

Upon the reception of notification of the uplink long code phase difference information and the groups of frame offsets and slot offsets, the network establishes the synchronization of the uplink radio access link of the sector corresponding to the added branch.

At the same time for execution of the branch addition, intra-sector frequency replacement handover, or user data rate modification, it is possible to execute the handover branch addition at boundary between sectors in single cell or at the boundary between cells. By the handover branch addition at boundary between sectors in single cell or at the boundary between cells, the maximum number of newly added handover branches is N−1.

The handover branch addition and handover branch deletion can be executed at the same time. After the execution of the handover branch addition and handover branch deletion in the combined manner, the maximum number of the branches is "N."

At the same time for execution of the access link establishment, the handover branch addition, branch replacement handover for another connection, ACCH replacement, or the code type replacement may be executed for another connection.

The network requests the mobile station to replace the short codes in order to utilize the short code resources efficiently.

At the same time for the releasing access links, the ACCH replacement is also carried out.

However, handover of the SDCCH is not carried out.

2.3.2.2.5 Radio Resource Selection

"Radio resource selection" is a selection of suitable radio resources, for instance, radio frequency channel, short codes, offsets, on the basis of information transmitted from the mobile station to executing the SDCCH establishment, access link establishment, and the procedures for handover. For the radio resource selection, the system comprises the following capabilities.

The mobile station informs the network of the radio capabilities, for example, the available radio frequency channels or available spreading codes of the mobile station.

The network retrieves uplink long codes from a database in the network, the uplink long codes being associated with respective mobile stations, so that each mobile station corresponds to unique uplink long codes.

The network manages the states of respective uplink short codes (if the uplink short codes are used by mobile stations or not) for each sector and selects the uplink short codes for respective connections. The network also determines to execute or refuse the requested radio resource selection on the basis of the respective uplink interference levels of the sectors, requested transmission rate, and requested quality level.

The network manages the states of respective downlink short codes (the downlink short codes are used by the respective mobile station or not) and selects the downlink short codes for respective connections in accordance with a request.

The network selects the group of radio frame offsets and group of slot offsets during the radio resource selection for the SDCCH establishment and access link establishment.

2.3.2.2.6 Transmission Power Control

"Transmission power control" includes an initial transmission power determination process for determining the initial transmission power for transmitting signals through the radio access link at the start of signal transmission through the RACH (random access channel) or the FACH (forward access channel), at the SDCCH (stand alone dedicated control channel) establishment, at access link establishment, or at procedures for handover; and a downlink transmission power control for respective handover branches during diversity handover. However, the transmission power control does not include the transmission power control executed at layer 1.

(1) Initial Uplink Transmission Power Determination

Power for transmission over the uplink radio channel from the mobile station to the base station should be minimized as small as possible to reduce the capacity of the uplink radio channel and to prevent other radio access links from affected. For this purpose, it is preferable to select the radio zone in which the power can be minimized for signal conveyance when selecting the radio zone whose base station should be ready (on standby) for communication with the mobile station immediately or will commence communication with the mobile station after handover. Therefore, means for the selection is necessary.

However, traditional mobile stations simply detect respective reception levels or respective SIRs (signal-to-interference ratios) of channels for the base stations as information used for radio zone selection. Furthermore, the respective transmission power levels vary according to the base stations sometimes. Therefore, in traditional communications systems, it is impossible for each mobile station to optimize the uplink transmission power from the mobile station itself to the network.

In order to resolve these issues and determine the initial uplink transmission power optimally, the system comprises the following capabilities.

Using the periodical report (information broadcast at the intervals of 20 msec) via perch channels, the network broadcasts calibrated perch channel transmission power levels. The calibrated perch channel transmission power levels has been calibrated in view of the respective path losses at cables and so on within the respective base stations.

Using the periodical report (information broadcast at the intervals of 20 msec) via perch channels, the network also broadcasts uplink interference levels.

On the basis of the calibrated perch channel transmission power levels, the respective uplink interference levels, the respective perch channel reception power levels measured at the mobile station, and respective signal-to-interference ratios involved in reception at the respective near base stations, the mobile station can determine the initial uplink transmission power level. The signal-to-interference ratios as reference data are previously stored in the mobile station.

With reference to FIG. 792, the initial uplink transmission power determination will be described below.

In FIG. 792, two base stations "A" and "B" transmits the broadcast information via the corresponding perch channels. The calibrated perch channel transmission power levels are Pa and Pb, respectively. The respective reception levels of the broadcast information at the mobile station via the perch channels from the base stations are Ra and Rb. The mobile station can calculate the respective path losses on the basis of the perch channel transmission power levels Pa and Pb indicated in the broadcast information and the respective perch channel reception levels Ra and Rb. More specifically, the path loss Lpa from the base station "A" to the mobile station is calculated by the next formula.

$$Lpa=Pa-Ra$$

The path loss Lpb may be calculated similarly.

On the basis of the calculated respective path losses in relation to the base stations, the respective uplink interference levels in relation to the base stations, and respective signal-to-interference ratios involved in reception at the respective near base stations, the mobile station calculates respective necessary uplink transmission power levels between the mobile station and respective near base stations. This calculation is conducted for selecting the radio zone to which a mobile station should camp on or should be handed over. More specifically, the mobile station selects the radio zone in which the necessary uplink transmission power level is minimum among the respective necessary uplink transmission power levels, and optimizes (minimizes) the uplink transmission power in accordance with the selected radio zone (selected base station). Accordingly, although the respective transmission power levels of the perch channels vary according to the base stations, each mobile station can optimize the uplink transmission power in the invented system.

(2) Initial Downlink Transmission Power Determination

1) FACH and Downlink SDCCH

The mobile station sends information via RACH to inform the network (more exactly, BTS) of the signal-to-interference ratio in relation to the perch channel reception at the mobile station. The BTS determines the initial downlink transmission power through the FACH (forward access channel) or SDCCH (stand alone dedicated control channel) on the basis of the perch channel signal-to-interference ratio in relation to the reception at the mobile station, the perch channel transmission power level, the required signal-to-interference ratio involved in reception at the mobile station via the FACH or SDCCH, and a rate-calibration parameter. The perch channel transmission power level is stored as a reference data for the BTS.

2) Downlink TCH

Using a broadcast channel (BCCH1) mapped at the perch channel, the network (more exactly, BTS) broadcasts a perch channel transmission power levels, which is not calibrated. Using the SDCCH, the mobile station informs the network (more specifically, the base station controller function) of the perch channel reception SIR at the mobile station. Using the SDCCH, the mobile station informs the network (the base station controller function) of the perch channel transmission power level which is not calibrated.

On the basis of the perch channel signal-to-interference ratio in relation to the reception at the mobile station, the non-calibrated perch channel transmission power level, the required signal-to-interference ratio involved in reception at the mobile station via the TCH (traffic channel), and a rate-calibration parameter, the BSC function in the network calculates the initial downlink transmission power through the TCH. The required SIR involved in reception at the mobile station via the TCH is stored as a reference data for the BSC function. If there are a plurality of candidate zones from which selected is the zone to which the traffic channel is established, the BSC function calculates the respective initial downlink transmission power levels of the respective zones and selects the minimal power level. The branch for the zone corresponding to the minimal power level is the main branch.

The BSC function of the network informs the base station of the initial downlink transmission power level.

The mobile station can execute the low-rate downlink transmission power control according to layer 3 since it is possible that high-rate transmission power control is not executed ordinarily due to the deterioration of transportation via a radio branch during diversity handover.

The mobile station informs the BSC function in the network of the non-calibrated perch channel transmission power level and the perch channel reception SIR periodically.

The mobile station increases or decreases the SIR involved in the reception at mobile station, so that the reception quality at the mobile station maintains a standard quality.

On the basis of the updated values, the network calculates and/or determines the transmission power level again.

2.3.2.2.7 Call Acceptance Control

"Call acceptance control" is a series of control procedures wherein the uplink interference level, downlink transmission power, and activated equipment resources, which can be measured or detected by the base station, are compared with respective allowable limits; a leeway/restriction (idle/busy) information is produced on the basis of the comparison; and a call attempt is allowed or restricted on the basis of the leeway/restriction information at a call origination, incoming call acceptance, bearer alteration, or handover. The call acceptance control can be conducted at the network and the mobile station.

However, the call acceptance control at the mobile station is an option. If the call acceptance control is conducted at the mobile station, it is possible to reduce the number of wastable call attempts, establishment attempts of traffic channels, bearer alteration requests, and handover requests. Therefore, the load involved in control procedures in the network can be lessened.

On the other hand, the call acceptance control at the network is inevitable since the network should recognize the number of call acceptances and the congestion status of traffic.

(1) Call Acceptance Control at Mobile Station

In order that the mobile station carries out the call acceptance control, the system comprises the following capabilities.

Using broadcasting channels (BCCH2), the network broadcasts a call acceptance information.

The mobile station refers to the broadcast information, via broadcasting channels BCCH2 from candidate base stations from which selected is the base station to which the traffic channel should be established, directly before the commencement of the random access for the first call origination, transmission of the setup message for the second call origination, reception of the setup message for call termination, handover trigger transmission, and transmission of the setup message to alter the bearer.

On the basis of the call acceptance information, the mobile station determines to allow or reject the call attempt.

(2) Call Acceptance Control at Network

Upon the reception of a request for activating TCH, the network determines to allow or reject the call attempt on the basis of the call acceptance information.

2.3.2.2.8 Standby Control

"Standby control" is controlling to transit the state, so that the mobile station can transmit and receive after the power of mobile station is turned on or after the mobile station visits from outside to inside of the network. Additionally, a procedure for changing the radio zone to camp on due to the travel of the mobile station is called "standby zone transition control."

(1) Standby Control

In order to execute the standby control, the system comprises the following capabilities.

Using the periodical report (information broadcast at the intervals of 20 msec) via perch channels, the network broadcasts the calibrated perch channel transmission power levels. The calibrated perch channel transmission power levels are calibrated in view of the respective path losses at cables and so on within the respective base stations.

Referring to the calibrated perch channel transmission power levels in relation to the zones in which the downlink long codes may be used and the perch channel reception power levels at the mobile station, the mobile station selects the zone having the minimum path loss. Then, the mobile station refers to the broadcast information via BCCH1 corresponding to the selected zone.

Using a broadcast channel (BCCH1) mapped at the perch channel, the network broadcasts a standby permission level, standby deterioration level, network number, restricted information, and so on.

Referring to the broadcast information via BCCH1, the mobile station determines to allow or reject the standby.

The network, using the broadcast information via BCCH1 at the perch channel, broadcasts the information on the data format in the control channel.

Referring to the broadcast information via BCCH1, the mobile station determines the paging channel to which the mobile station is connected.

Referring to the broadcast information via BCCH1, the mobile station determines the RACH, which the mobile station should use.

The network, using the broadcast information via BCCH1 at the perch channel, broadcasts the information on the uplink long codes for the corresponding zone.

Referring to the broadcast information via BCCH1, the mobile station determines the uplink long codes used for the RACH and SDCCH.

(2) Standby Zone Transition Control

In order to execute the standby zone transition control, the system comprises the following capabilities.

The network, using the broadcast information via BCCH1 at the perch channel, broadcasts information on the downlink long codes for the circumferential zones.

The mobile station retrieves the information on the downlink long codes for the circumferential zones from the broadcast information via BCCH1, and conducts the zone transition.

2.3.2.3 System Capabilities on Mobility Management

Next, system capabilities on mobility management will be described.

2.3.2.3.1 Terminal Location Registration and Update

For permitting the travel of the mobile terminals, the terminal locations are supervised by the network. Therefore, the terminal location data is registered when a user terminal is first detected by the network (when the power of the mobile terminal is turned on or the user terminal roams to the network from another network). The terminal location data is automatically updated when the location of a mobile terminal changes in the same network.

In order to execute the terminal location registration and update, the system comprises the following capabilities.

The network informs a mobile station of the location information, so that the mobile stations recognize the location information.

When the mobile station travels in the network, the network recognizes that the mobile station moves from the location that is managed by the network and requests to update the location information managed in the mobile station.

An SDCCH (stand alone dedicated control channel) is established for transporting the control signals for the location registration between the network and the mobile station (refer to the section entitled "SDCCH Control").

Terminal authentication is carried out to prevent the network from an access by an improper mobile terminal. Insofar as a terminal is authenticated, the location information on the terminal is updated in the network.

The network can assign a new TMUI (temporary mobile user identity) to a mobile station.

The network starts the authentication with the IMUI of a mobile station if the mobile station is not authenticated by the TMUI check.

The network notifies the mobile station of the location registration completion.

If the mobile station does not receive the location registration/update completion report, the mobile station triggers the location registration/update procedure again.

2.3.2.4 System Capabilities on Security Services

Next, system capabilities on security services will be described.

2.3.2.4.1 User Authentication

"User authentication" is to determine if each mobile user terminal sending a call attempt to the network is proper or not. The user authentication is carried out when a mobile station originates a first call, when a first call is directed to a mobile station, or when the location is registered.

In order to execute the user authentication, the system comprises the following capabilities.

When a mobile station accesses the network, the network produces various information (an authentication calculation result and random number) being necessary for the authentication of the mobile station, and requests the mobile station to execute an authentication calculation. The network produces an encipherment key used in an encipherment calculation after the authentication.

The mobile station produces an authentication calculation result based on the random number sent by the network and informs the network of the result.

The authentication calculation results made by the network and the mobile station are compared with each other.

The network sends an inquiry about the international mobile user identity (IMUI) to the mobile station if the mobile station has not been authenticated at the authentication procedure using the temporary mobile user identity (TMUI). The network then produces the authentication information and executes the authentication procedure using the IMUI.

If the mobile station is not authenticated even at the authentication procedure using the information based on the IMUI, the origination procedure, the termination procedure, or location registration procedure is stopped.

2.3.2.4.2 Encipherment

"Encipherment" is a series of procedures to cipher control signals or user signals transported through the SDCCH, ACCH, or TCH for preventing the signals from being intercepted or edited by a third party. The encipherment is carried out at the origination procedure, the termination procedure, or location registration procedure.

In order to execute the encipherment, various information, e.g., encipherment keys and relevant information for producing the encipherment keys, for ciphering or deciphering control signals or user signals that should be transported via wireless interfaces are managed. The information is delivered within the network and to the destination mobile station when the encipherment is conducted.

The delivered information is used for ciphering the signals and the ciphered signals are transported via radio interfaces.

The onset time of ciphering and onset time of deciphering are mutually notified between the network and the mobile station.

2.3.2.4.3 TMUI Management

TMUI is a temporary terminal identifier or user identifier transported via the air interface in order to keep the IMUI a secret and to decrease the total length of the terminal identifier. The network assigns the TMUIs to the mobile stations communicable with the network and informs the respective mobile stations of the individual TMUIs. After the TMUI assignment, the network manages each TMUI all the while the corresponding mobile station exists in the coverage area of the network. The TMUI assignment may be executed at the location registration procedure, origination procedure, and termination procedure. However, in the invented system, the assignments of TMUIs at origination procedure and termination procedure are option.

In order to execute the TMUI management, the system comprises the following capabilities.

When the network accesses a mobile station for the location registration, location update, origination (option), or termination (option), the network prepares a TMUI for the mobile station and stores it.

The network informs the mobile station of the TMUI and confirms that the mobile station stores the TMUI. When the location is registered, the mobile station is informed of information indicating the TMUI and the node where the TMUI is assigned. However, at the origination or termination, the mobile station is informed of only the TMUI.

The TMUI is sent from the network to the mobile station via the air interface after ciphering for preventing the TMUI being intercepted improperly at the air interface.

In order to prevent double assignment of the TMUIs, the association of TMUIs and the mobile stations are managed.

2.3.2.5 System Capabilities on System Management

Next, system capabilities on system management will be described.

2.3.2.5.1 Requirement for System Synchronization

"Requirement for system synchronization" is a requirement for synchronization in the system including the network and a mobile station in order to perform diversity handover with a minimum buffering delay. In this system, the MSC (MCC) and the serving BTSs operate according to the standard clock signal at the regular intervals of 640 msec, so that the time alignment is established among the MSC (MCC) and the serving BTSs. However, the phase difference among the MSC function and the serving BTSs is allowable insofar as it is equal to or less than 5 msec. In other words, the requirement for system synchronization is the phase difference within 5 msec.

2.4 Control Manners

Next, control manners will be described.

2.4.1 Functional Network Architecture

Figure 3:
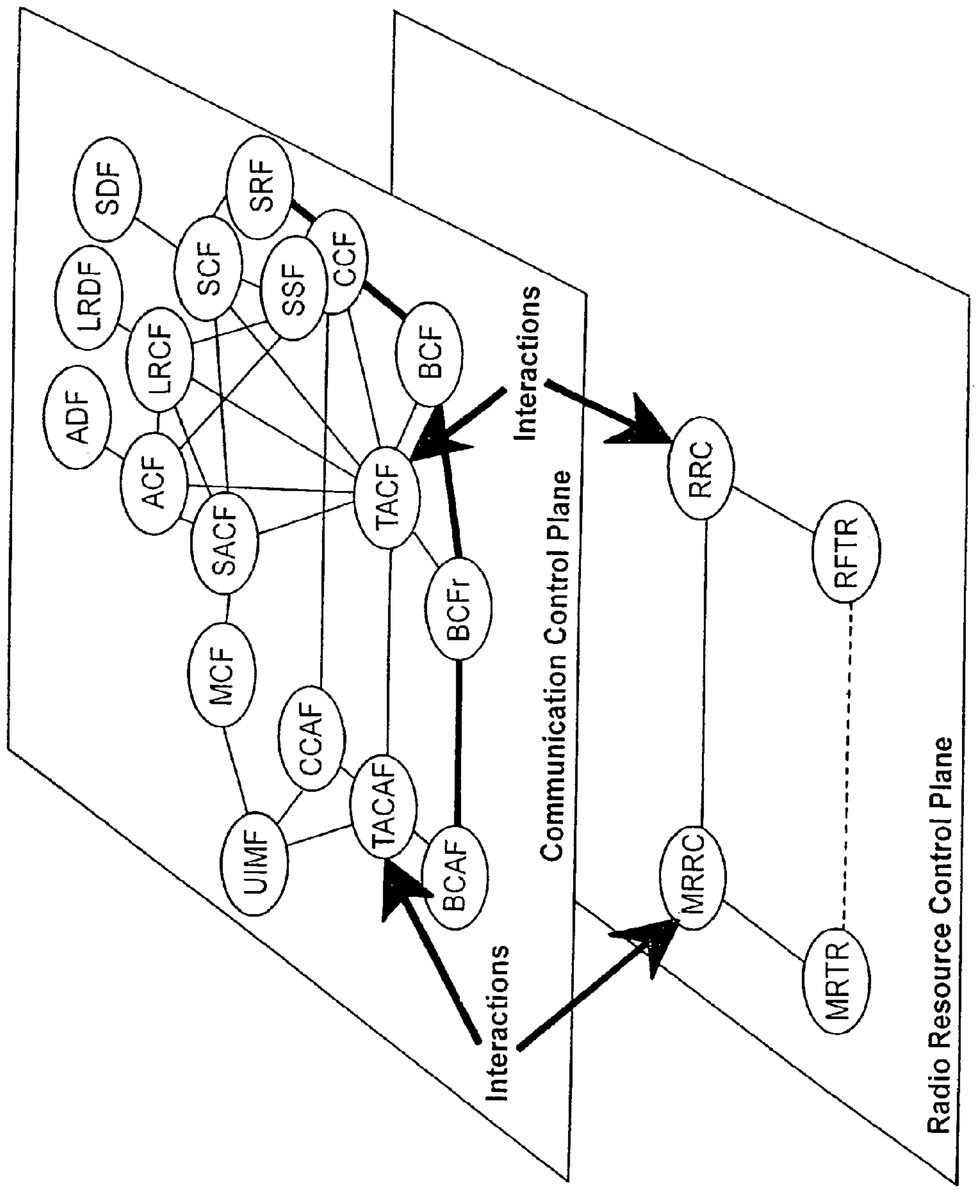
FIG. 3 is a diagram showing the functional network architecture of the system, in which functional entities are arranged in a communication control plane and a radio resource control plane.

FIG. 3 shows the functional network architecture of the system. The functions of the functional entities comply with ITU-T Recommendations.

In FIG. 3, CCAF (call control agent function) in a mobile terminal is an interface between the user mobile terminal and CCF (call control function) of the network for providing access for users. TACAF (terminal access control agent function) in a mobile terminal controls access for the mobile terminal, e.g., terminal paging detection.

BCAF (bearer control agent function) in the mobile terminal controls radio bearers for the mobile terminal. BCF (bearer control function) controls bearers. BCFr (bearer control function (radio bearer associated)) in the network controls radio bearers.

TACF (terminal access control function) in the network controls access for the mobile terminal, e.g., terminal paging execution. CCF (call control function) controls call and connection. SCF (service control function) controls services. SDF (service data function) stores various data for execution of services.

LRCF (location registration control function) controls the mobility management. LRDF (location registration data function) stores various data for mobility management. SSF (service switching function) is an interface between the CCF and SCF and detects the trigger for a service control. SRF (specialized resource function) controls access to a special device, e.g., information storing device.

MCF (mobile control function) in the mobile terminal is an interface to the network for a non-call service. SACF (service access control function) in the network is an interface to the mobile station for a non-call service. MRRC in the mobile station controls radio resources. RRC in the network controls radio resources.

MRTR (mobile radio transmission and reception) in the mobile station controls the encipherment or transmission and so on. RFTR (radio frequency transmission and reception) in the network controls the encipherment or transmission and so on. UIMF (user identification management function) stores the information on the mobile users and provides the user authentication and encipherment. In the following description, the UIMF may be sometimes called UTMF.

Figure 4:
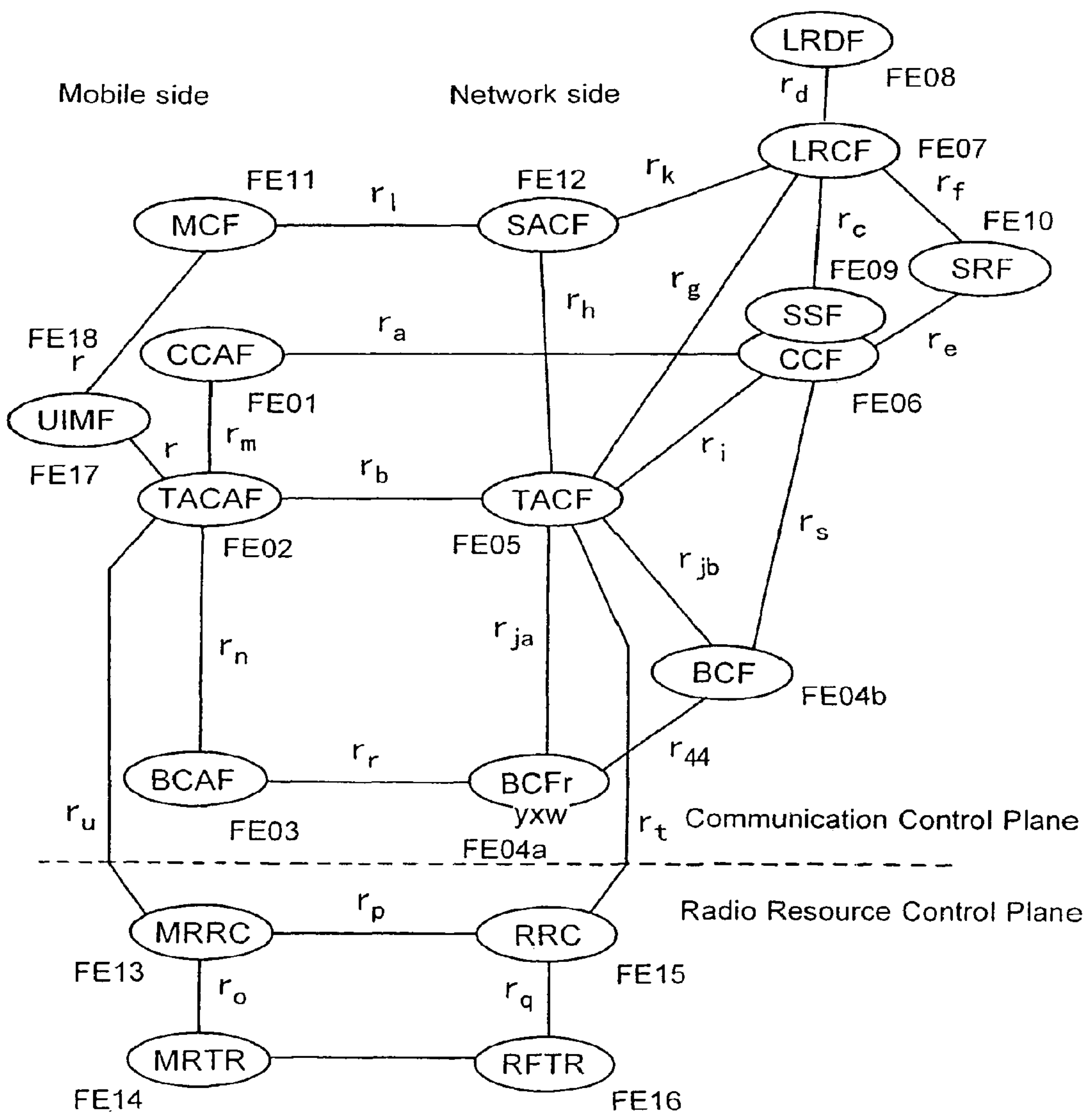
FIG. 4 is a diagram showing the functional network architecture of the system, in which functional entities are arranged in a communication control plane and a radio resource control plane.

FIG. 4 is a diagram showing the functional network architecture of the system, in which functional entities are arranged in a communication control plane and a radio resource control plane. In FIG. 4, functional entity numbers (FE numbers) are attached to respective functional entities. The correlation between the FE numbers and the functional entities are also represented in FIG. 270.

In addition, relationships between functional entities are shown in FIG. 4. The designations of the relationships are also stated in the following.

The relationship between FE01 and FE06 (CCAF'-CCF') is called Relationship ra.

The relationship between FE02 and FE05 (TACAF-TACF) is called Relationship rb.

The relationship between FE07 and FE09 (LRCF-SSF) is called Relationship rc.

The relationship between FE07 and FE08 (LRCF-LRDF) is called Relationship rd.

The relationship between FE09 and FE10 (SSF-SRF) is called Relationship re.

The relationship between FE07 and FE10 (LRCF-SRF) is called Relationship rf.

The relationship between FE05 and FE07 (TACF-LRCF) is called Relationship rg.

The relationship between FE05 and FE12 (TACF-SACF) is called Relationship rh.

The relationship between FE05 and FE06 (TACF-CCF') is called Relationship ri.

The relationship between FE05 and FE04 (TACF-BCF) is called Relationship rj.

The relationship between FE05 and FE04*a* is called relationship rja.

The relationship between FE05 and FE04*b* is called relationship rjb.

The relationship between FE07 and FE12 (LRCF-SACF) is called relationship rk.

The relationship between FE11 and FE12 (MCF-SACF) is called relationship rl.

The relationship between FE01 and FE02 (CCAF'-TACAF) is called relationship rm.

The relationship between FE02 and FE03 (TACAF-BCAF) is called relationship rn.

The relationship between FE13 and FE14 (MRRC-MRTR) is called relationship ro.

The relationship between FE13 and FE15 (MRRC-RRC) is called relationship rp.

The relationship between FE15 and FE16 (RRC-RFTR) is called relationship rq.

The relationship between FE03 and FE04 (BCAF-BCF) is called relationship rr.

The relationship between FE04 and FE06 (BCF-CCF) is called relationship rs.

The relationship between FE05 and FE15 (TACF-RRC) is called relationship rt.

The relationship between FE02 and FE13 (TACAF-MRRC) is called relationship ru.

The relationship between FE02 and FE17 (TACAF-TIMF) is called relationship rv.

The relationship between FE11 and FE17 (MCF-TIMF) is called relationship rw.

The relationship between FE01 and FE18 (CCAF'-UIMF) is called relationship rx.

The relationship between FE11 and FE18 (MCF-UIMF) is called relationship ry.

The relationship between FE04*a* and FE04*b* (BCFr-BCF) is called relationship r44.

The relationship between FE06 and FE06 (CCF'-CCF') is called relationship r66.

The relationship between FE07 and FE07 (LRCF-LRCF) is called relationship r77.

The relationship between FE05 and FE05 (TACF-TACF) is called relationship r55.

The relationship between FE08 and FE08 (LRDF-LRDF) is called relationship r88.

The above-described relationships between the functional entities are also represented in FIG. 271.

Figure 5:
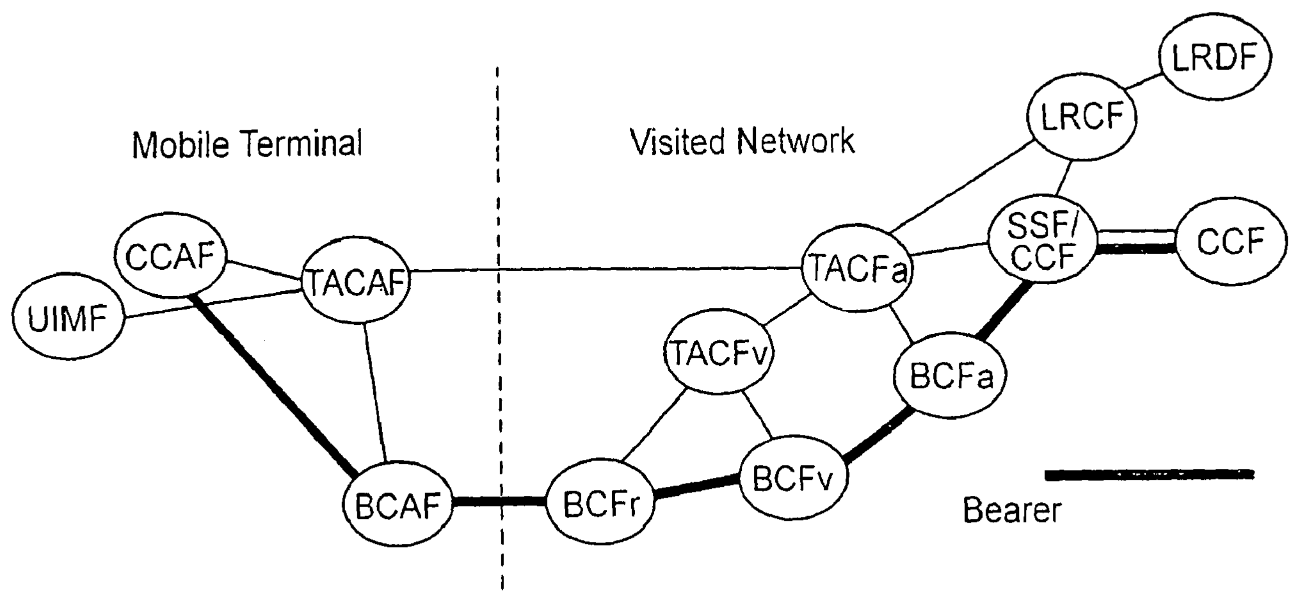
FIG. 5 is a diagram showing the functional model of a part of the invented system for describing an origination for initial call.

2.4.2 Information Flows of Usual Communication Services 2.4.2.1 Origination for Initial Call and Additional Call a) Functional Model a-1) Initial Outgoing Call FIG. 5 shows the functional model of a part of the invented system for describing the origination for initial call. Radio bearers are selected under the BCFr controlled by the same TACF that received a call setup request. According to the radio resource selection scenario, multiple FEs are selected.

a-2) Additional Outgoing Call

Figure 6:
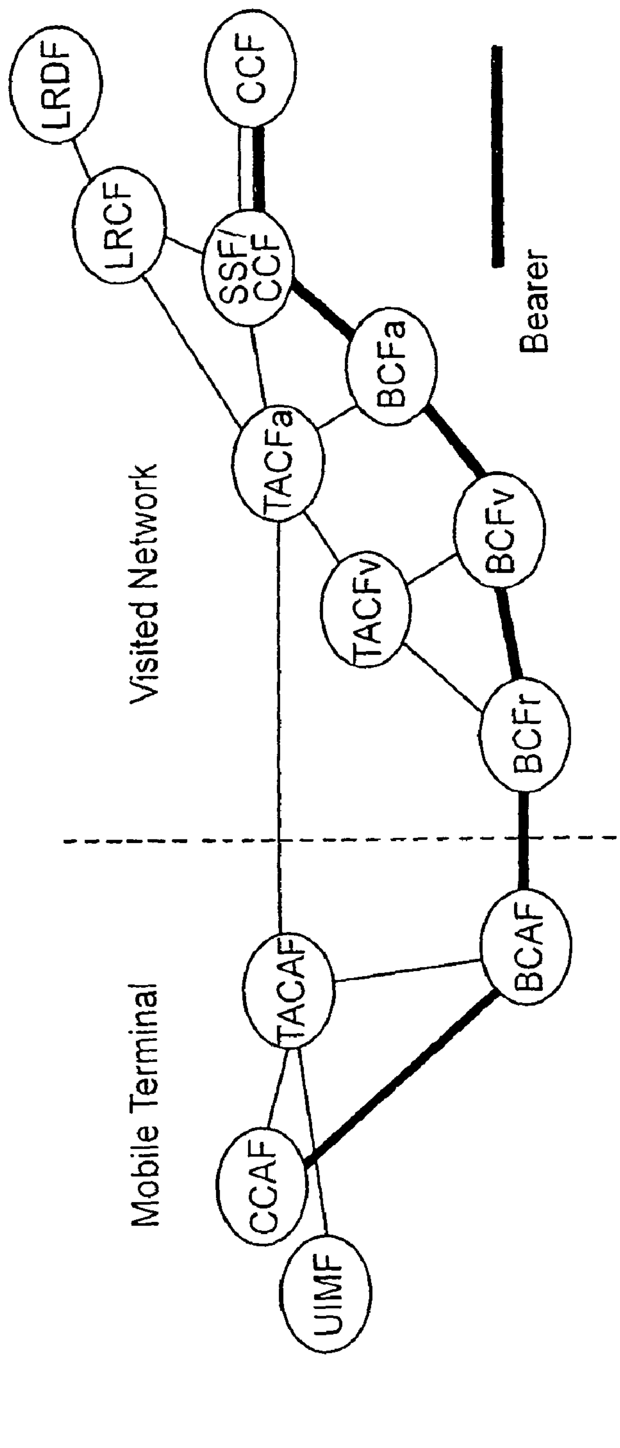
FIG. 6 is a diagram showing the functional model of a part of the invented system for describing an origination for additional call.

FIG. 6 shows the functional model of a part of the invented system for describing the origination for additional call. Radio bearers are selected under the BCFr controlled by the same TACF that received a call setup request. According to the radio resource selection scenario, multiple FEs are selected.

b) Information Flows b-1) Initial Outgoing Call

Figure 7:
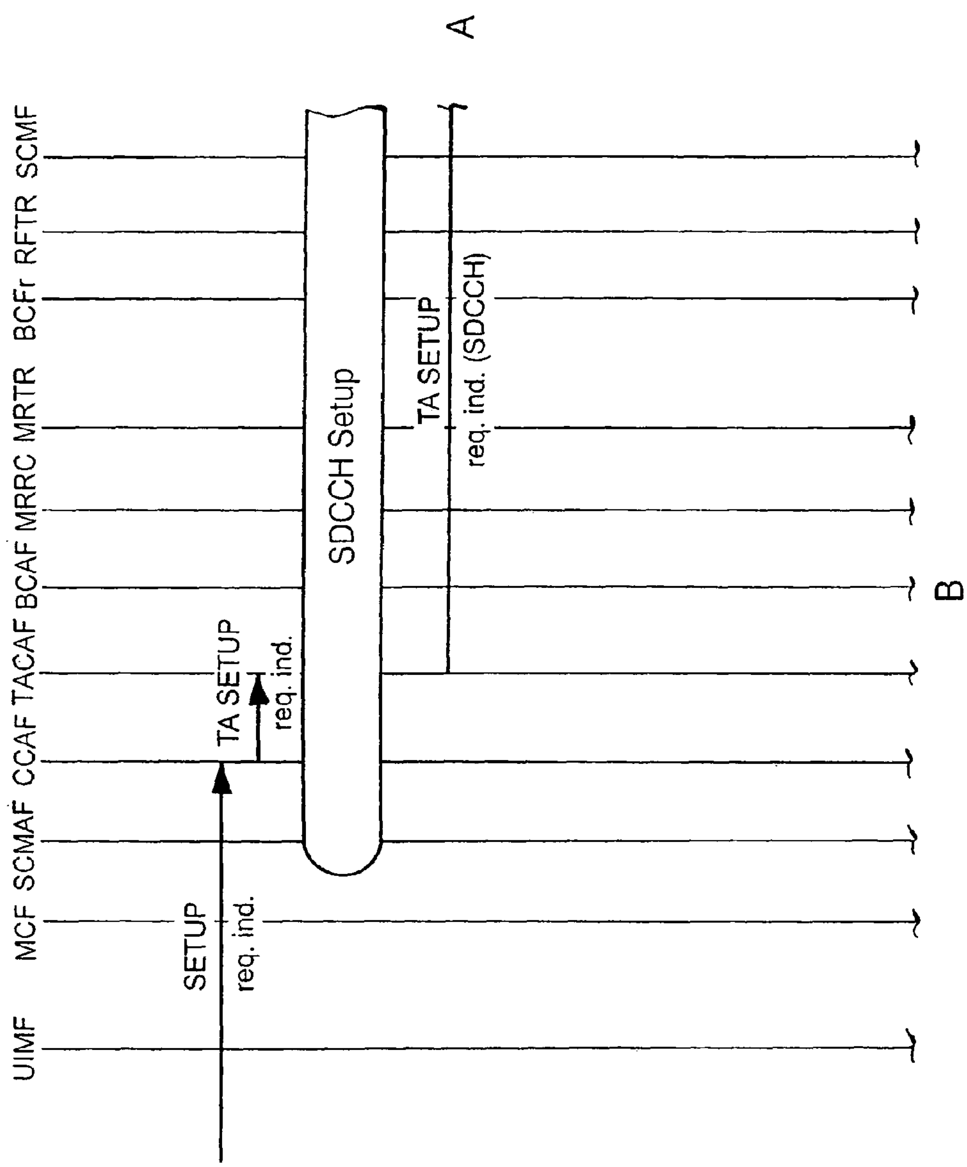
FIGS. 7 and 8 form an information flow diagram showing the origination for initial call.
Figure 8:
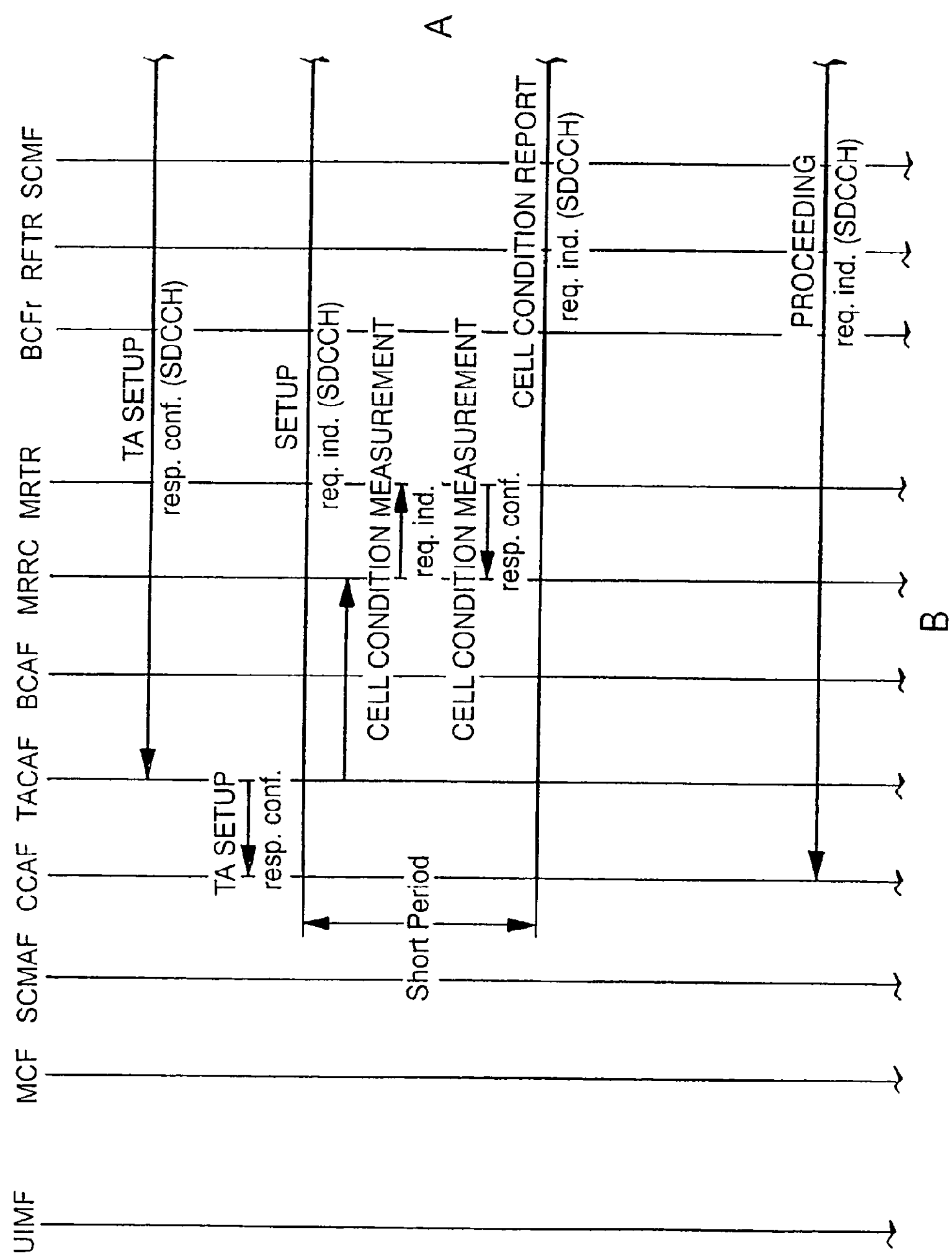

FIGS. 7 and 8 form an information flow diagram showing the origination for initial call.

b-2) Additional Outgoing Call

Figure 9:
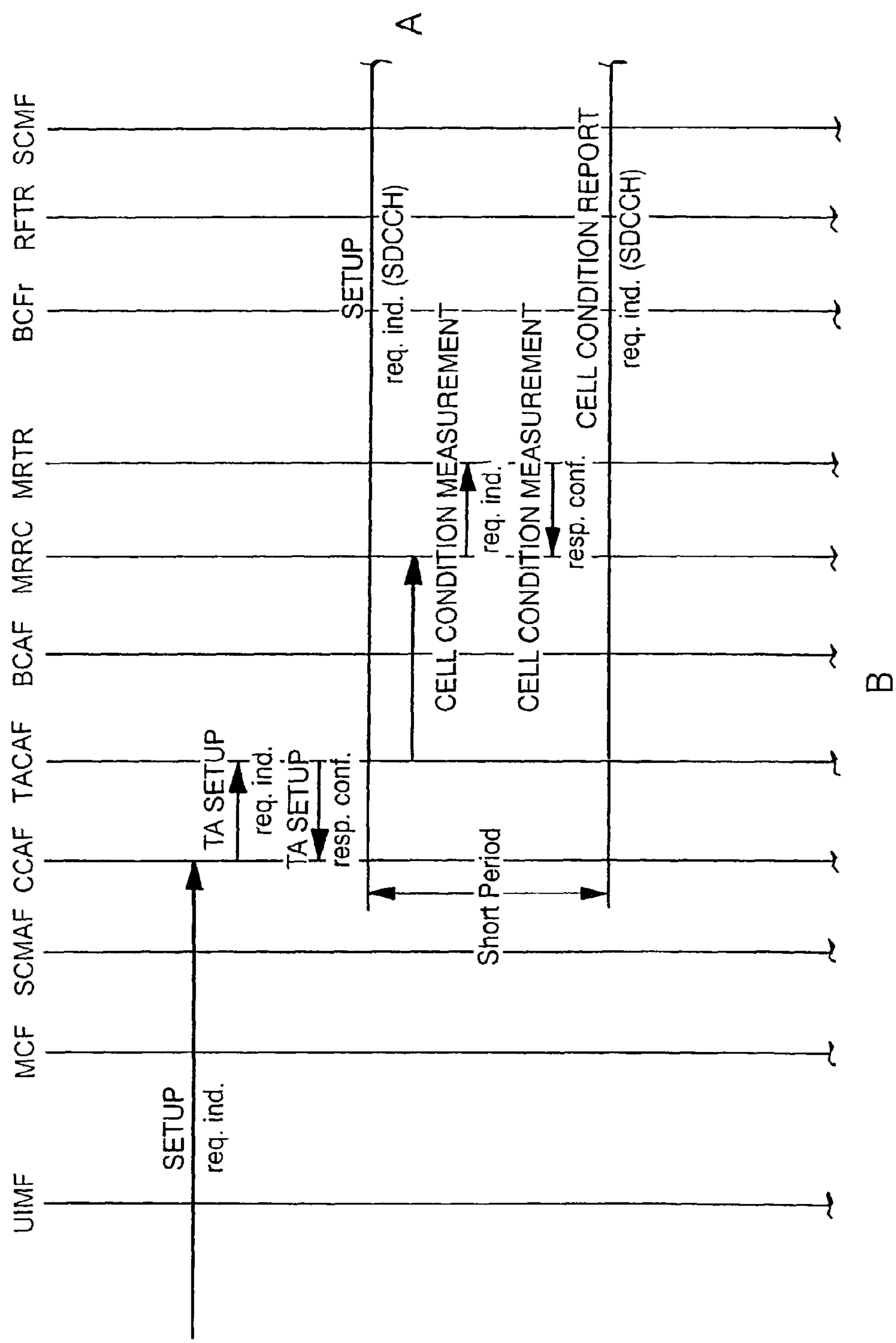
FIG. 9 is an information flow diagram showing the origination for additional call.

FIG. 9 is an information flow diagram showing the origination for additional call.

c) Definitions of Information Flows, Information Elements, and Functional Entity Actions The information flow diagrams will be described supplementally in the following and information elements in the flow diagrams will be discussed and represented in tables.

A TA SETUP request indication is used by CCAF in the case of a mobile terminal call origination to request to set up a mobile terminal access to the network and the connection between the CCAF and TACAF. FIG. 272 represents the detail of the TA SETUP request indication.

Another TA SETUP request indication is sent from TACAF to request the establishment of the terminal access, i.e., signaling connection between TACAF and TACF. FIG. 273 represents the detail of the TA SETUP request indication. For the user ID in FIG. 273, TMUI should be used to maintain confidentiality of IMUI. In this case, TMUI assignment source ID should not be included in order to reduce data length.

A TA SETUP PERMISSION request indication is issued by the TACF to inform to request the authorization of the mobile terminal access to the network. FIG. 274 represents the detail of the TA SETUP PERMISSION request indication.

A REVERSE LONG CODE RETRIEVAL request indication is used to retrieve a reverse (uplink) long code. FIG. 275 represents the detail of the REVERSE LONG CODE RETRIEVAL request indication.

Another REVERSE LONG CODE RETRIEVAL request indication is used to retrieve the reverse long code. FIG. 276 represents the detail of the REVERSE LONG CODE RETRIEVAL request indication.

A REVERSE LONG CODE RETRIEVAL response confirmation is also used to retrieve the reverse long code. FIG. 277 represents the detail of the REVERSE LONG CODE RETRIEVAL response confirmation.

A TERMINAL STATUS UPDATE request indication is used to update the terminal status. FIG. 278 represents the detail of the TERMINAL STATUS UPDATE request indication.

A TERMINAL STATUS UPDATE response confirmation is a response to the request indication. FIG. 279 represents the detail of the TERMINAL STATUS UPDATE response confirmation.

An ADD-ROUTING INFORMATION request indication is sent to the LRDF to add a routing address to the subscriber's profile. This information flow is sent only when the authentic mobile terminal has been found and the above related information has been obtained. FIG. 280 represents the detail of the ADD-ROUTING INFORMATION request indication.

An ADD-ROUTING INFORMATION response confirmation is a response to the request indication. FIG. 281 represents the detail of the ADD-ROUTING INFORMATION response confirmation.

A TA SETUP PERMISSION response confirmation is issued by the LRCF to inform the TACF that the mobile terminal access to the network is authorized. FIG. 282 represents the detail of the TA SETUP PERMISSION response confirmation.

A REVERSE LONG CODE RETRIEVAL response confirmation is used to retrieve the reverse long code. FIG. 283 represents the detail of the REVERSE LONG CODE RETRIEVAL response confirmation.

A TA SETUP response confirmation is used to notify that the mobile terminal access has been established. FIG. 284 represents the detail of the TA SETUP response confirmation.

Another TA SETUP response confirmation is used to confirm that the setup of the terminal access and the connection between the CCAF and TACAF have been completed. FIG. 285 represents the detail of the TA SETUP response confirmation.

A SETUP request indication is used to request the establishment of the connection. FIG. 286 represents the detail of the SETUP request indication.

A TACF INSTANCE ID INDICATIONquest indication is used to retrieve the reverse long code. FIG. 287 represents the detail of the TACF INSTANCE ID INDICATIONquest indication.

A CELL CONDITION MEASUREMENT request indication is used by MRRC to trigger measurement of cell selection information. This is a requesting information flow whose confirmation (CELL CONDITION MEASUREMENT response confirmation) provides the result of the measurement. FIG. 288 represents the detail of the CELL CONDITION MEASUREMENT request indication.

A CELL CONDITION MEASUREMENT response confirmation provides the result of the cell selection information measurement requested by the CELL CONDITION MEASUREMENT request indication. FIG. 289 represents the detail of the CELL CONDITION MEASUREMENT response confirmation.

A CELL CONDITION REPORT request indication is used by the mobile terminal to report the cell selection information. The information is used by the network to select radio channels. This information flow does not require any confirmation. FIG. 290 represents the detail of the CELL CONDITION REPORT request indication.

A CALL SETUP PERMISSION request indication is issued by the SSF to request the authorization of the calling user. FIG. 291 represents the detail of the CALL SETUP PERMISSION request indication.

A USER PROFILE RETRIEVAL request indication is used to request the user profile to be retrieved. FIG. 292 represents the detail of the USER PROFILE RETRIEVAL request indication.

A USER PROFILE RETRIEVAL response confirmation is a response to the request indication. FIG. 293 represents the detail of the USER PROFILE RETRIEVAL response confirmation.

A CALL SETUP PERMISSION response confirmation is issued by the LRCF to inform the calling user is authorized. FIG. 294 represents the detail of the CALL SETUP PERMISSION response confirmation.

A SETUP request indication is used to request the establishment of a connection. FIG. 295 represents the detail of the SETUP request indication.

A PROCEEDING request indication optionally reports that the indicated connection set-up is valid and authorized and that further routing and progressing of the call is proceeding. This information flow does not require any confirmation. FIG. 296 represents the detail of the PROCEEDING request indication.

A MEASUREMENT CONDITION NOTIFICATION request indication is transmitted at relationship rt between the TACF and the RRC and is used by the network to indicate conditions, which the mobile terminal measures, and to report the cell selection information. When the mobile terminal is on an idle mode, the network indicates the MEASUREMENT CONDITION NOTIFICATION request indication periodically. When the mobile terminal is in communication, the network indicates the MEASUREMENT CONDITION NOTIFICATION request indication at the change of conditions. This information flow does not require any confirmation. FIG. 297 represents the detail of the MEASUREMENT CONDITION NOTIFICATION request indication.

Another MEASUREMENT CONDITION NOTIFICATION request indication is transmitted at relationship rp between the MRRC and the RRC and is used by the network to indicate conditions, which the mobile terminal measures, and to report cell selecting information. When the mobile terminal is on an idle mode, the network indicates the MEASUREMENT CONDITION NOTIFICATION request indication periodically. When the mobile terminal is in communication, the network indicates the MEASUREMENT CONDITION NOTIFICATION request indication at the change of conditions. This information flow does not require any confirmation. FIG. 298 represents the detail of the MEASUREMENT CONDITION NOTIFICATION request indication.

A REPORT request indication, at relationship r66 between a CCF' and another CCF', is an information flow that is used to report status and/or other types of information transported within the network. The type of information (e.g. alerting, suspended, hold, and resume) may be indicated. This information flow does not require any confirmation. FIG. 299 represents the detail of the REPORT request indication.

Another REPORT request indication, at relationship ra between the CCAF' and the CCF', is an information flow that is used to report the status information and/or other types of information transported within the network. The type of information (e.g. alerting, suspended, hold, and resume) may be indicated. This information flow does not require any confirmation. FIG. 300 represents the detail of the REPORT request indication.

A SETUP response confirmation at relationship r66 is used to confirm that the connection has been established. FIG. 301 represents the detail of the SETUP response confirmation.

Another SETUP response confirmation at relationship ra is used to confirm that the connection has been established. FIG. 302 represents the detail of the SETUP response confirmation.

Figure 10:
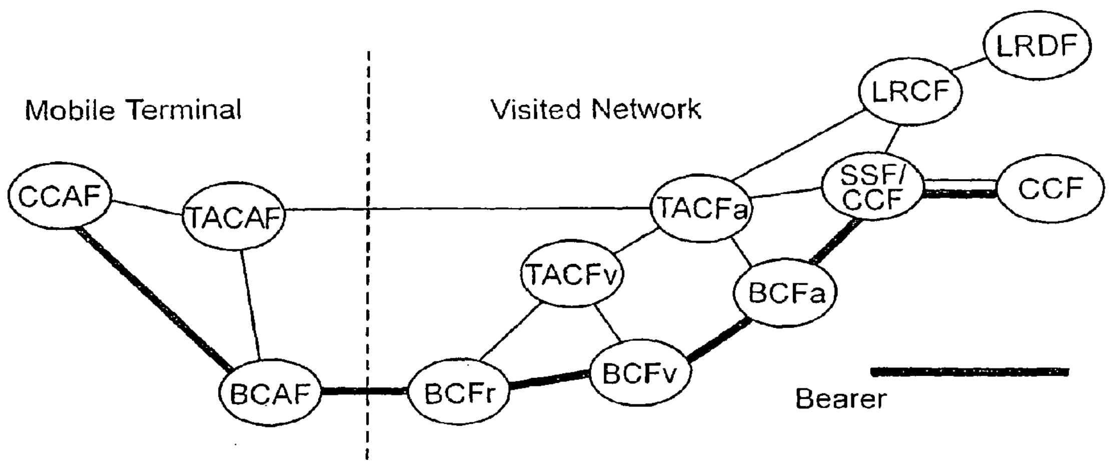
FIG. 10 is a diagram showing the functional model of a part of the invented system for describing acceptance of initial incoming call.

2.4.2.2 Termination for Initial Call and Additional Call a) Functional Model a-1) Initial Incoming Call FIG. 10 shows the functional model of a part of the invented system for describing the termination for initial call.

a-2) Additional Incoming Call

Figure 11:
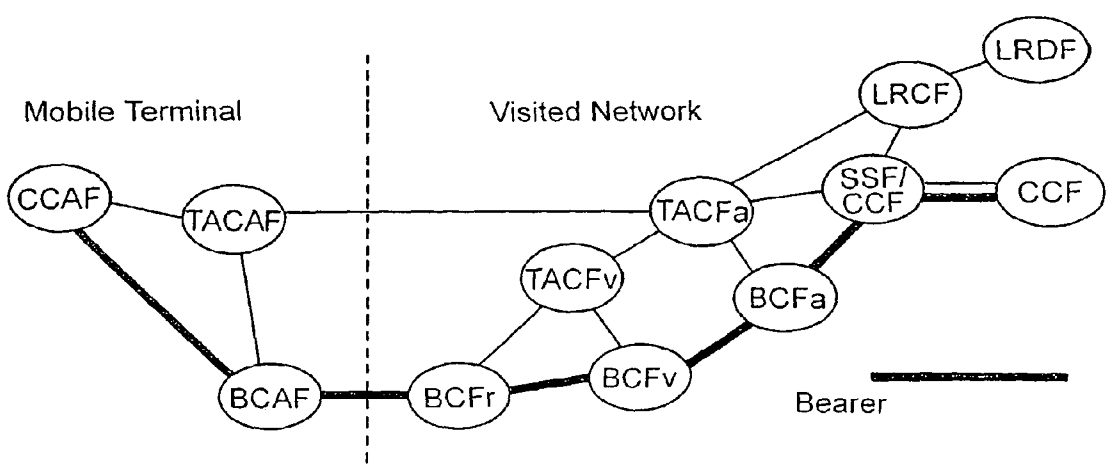
FIG. 11 is a diagram showing the functional model of a part of the invented system for describing acceptance of additional incoming call.

FIG. 11 shows the functional model of a part of the invented system for describing the termination for additional call.

b) Information Flows b-1) Initial Incoming Call

Figure 12:
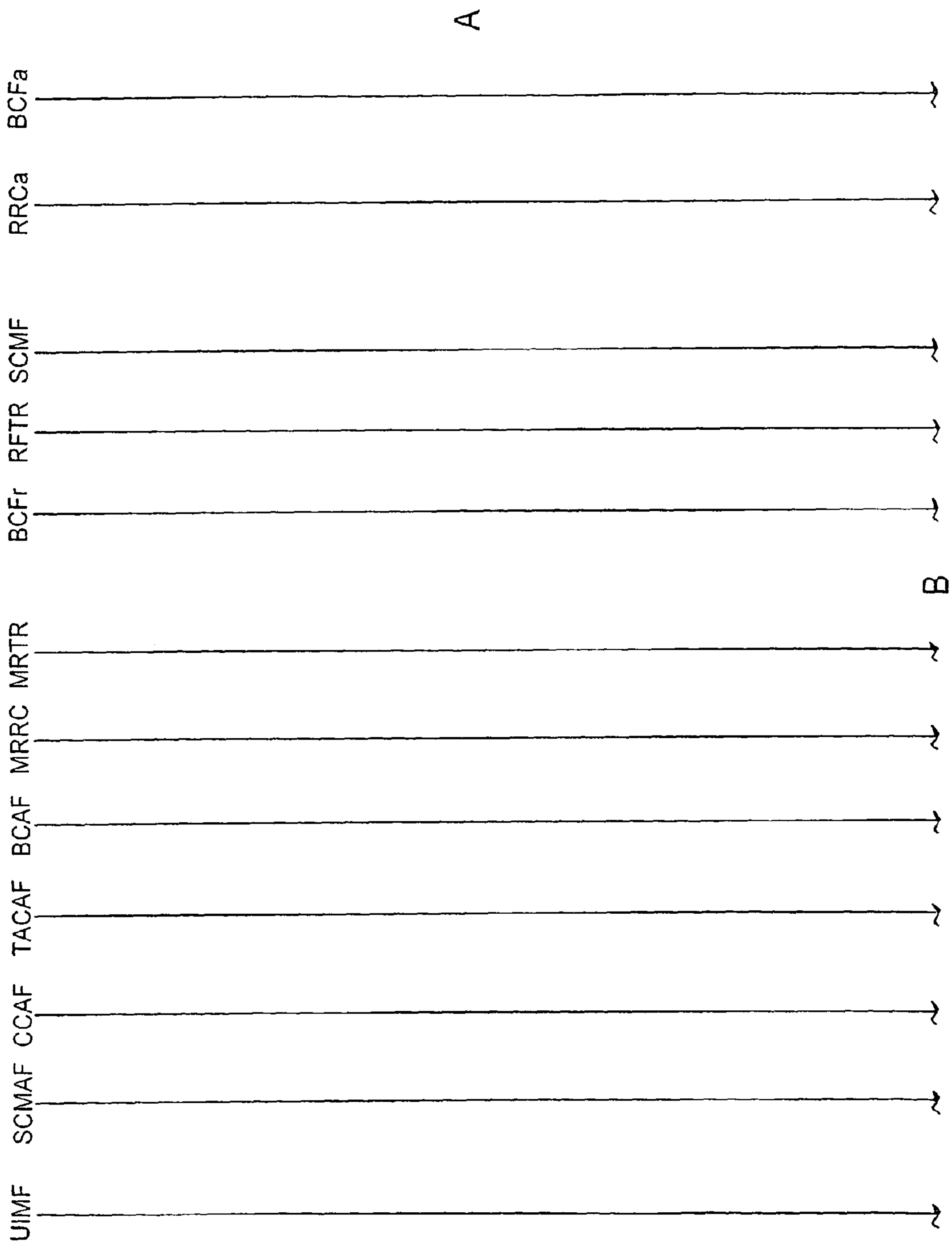
FIGS. 12 through 14 form an information flow diagram showing the acceptance of initial incoming call.
Figure 13:
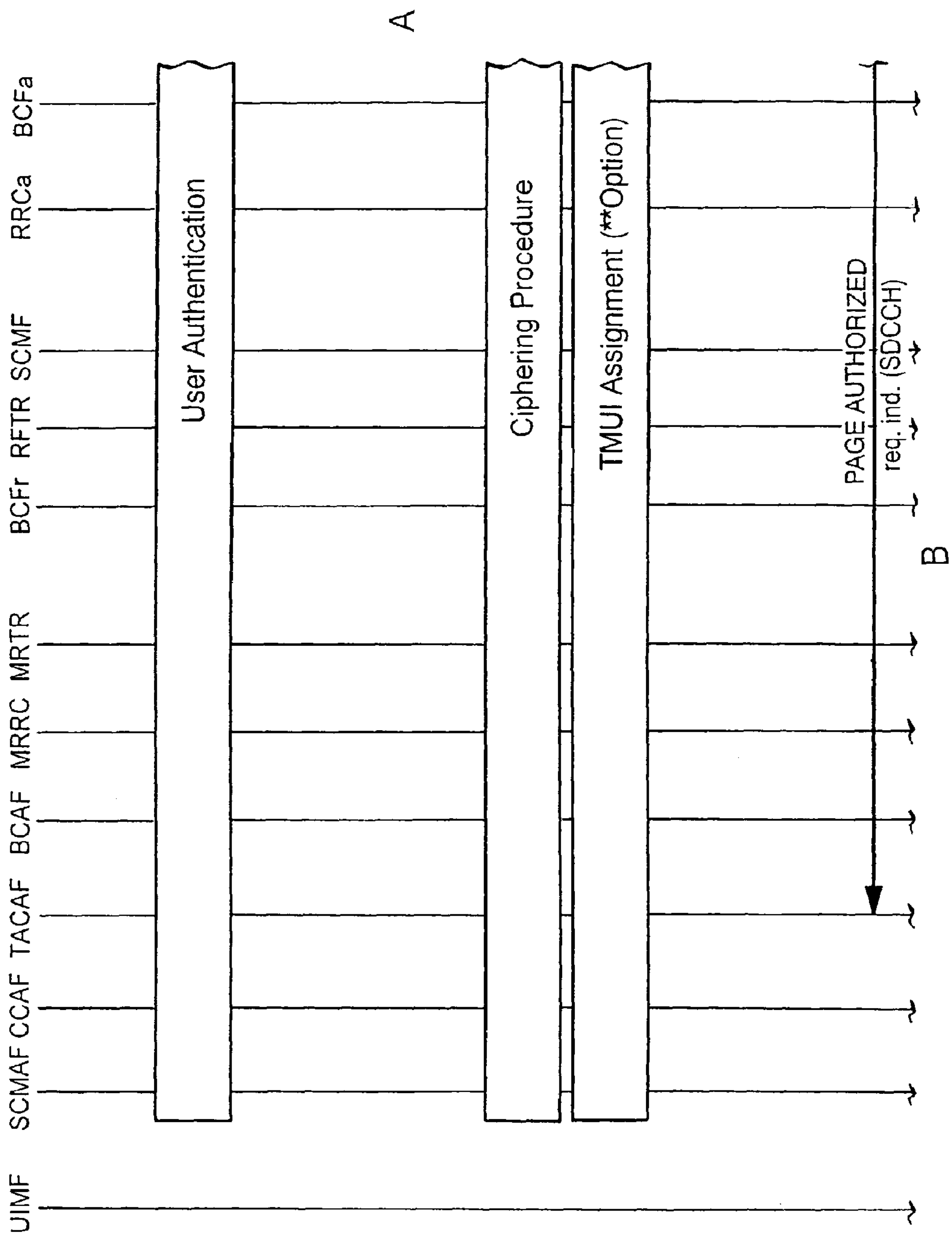
Figure 14:
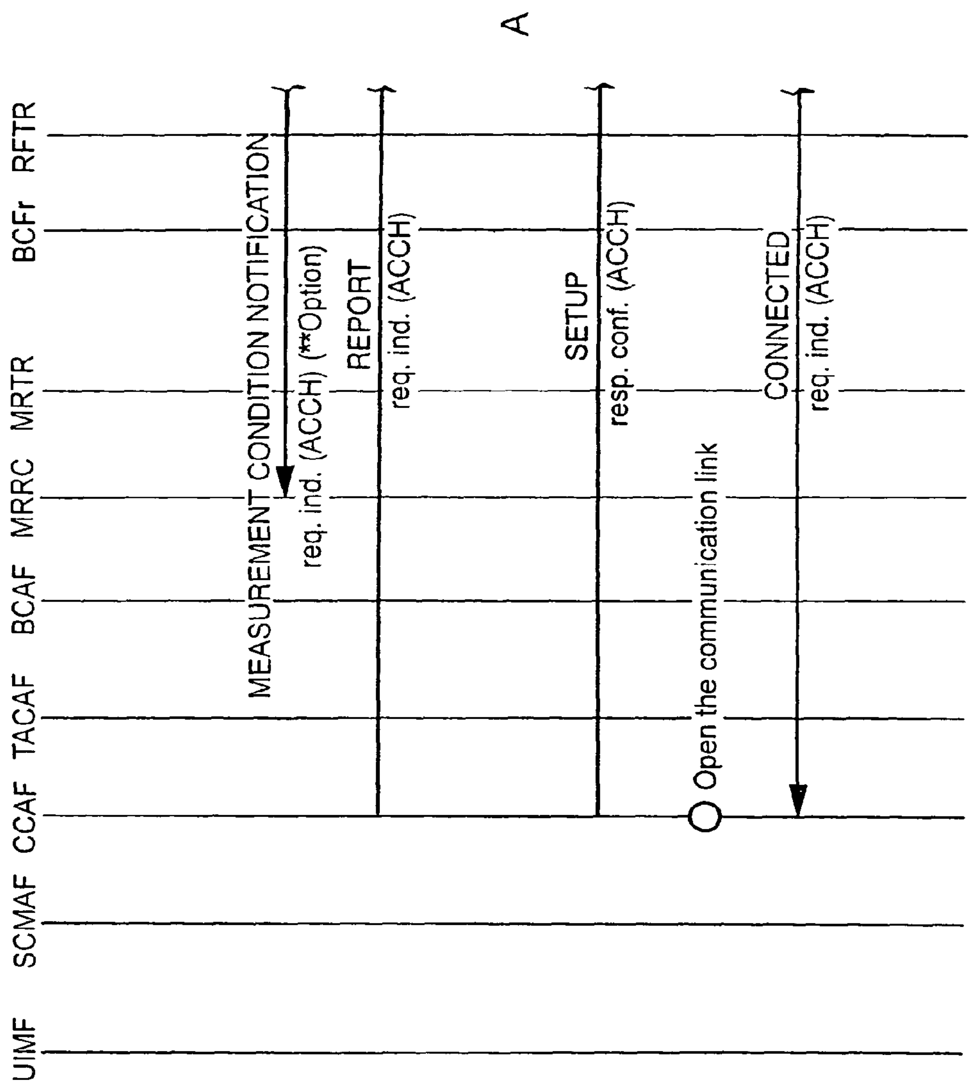

FIGS. 12 through 14 form an information flow diagram showing the termination for initial call.

b-2) Additional Incoming Call

Figure 15:
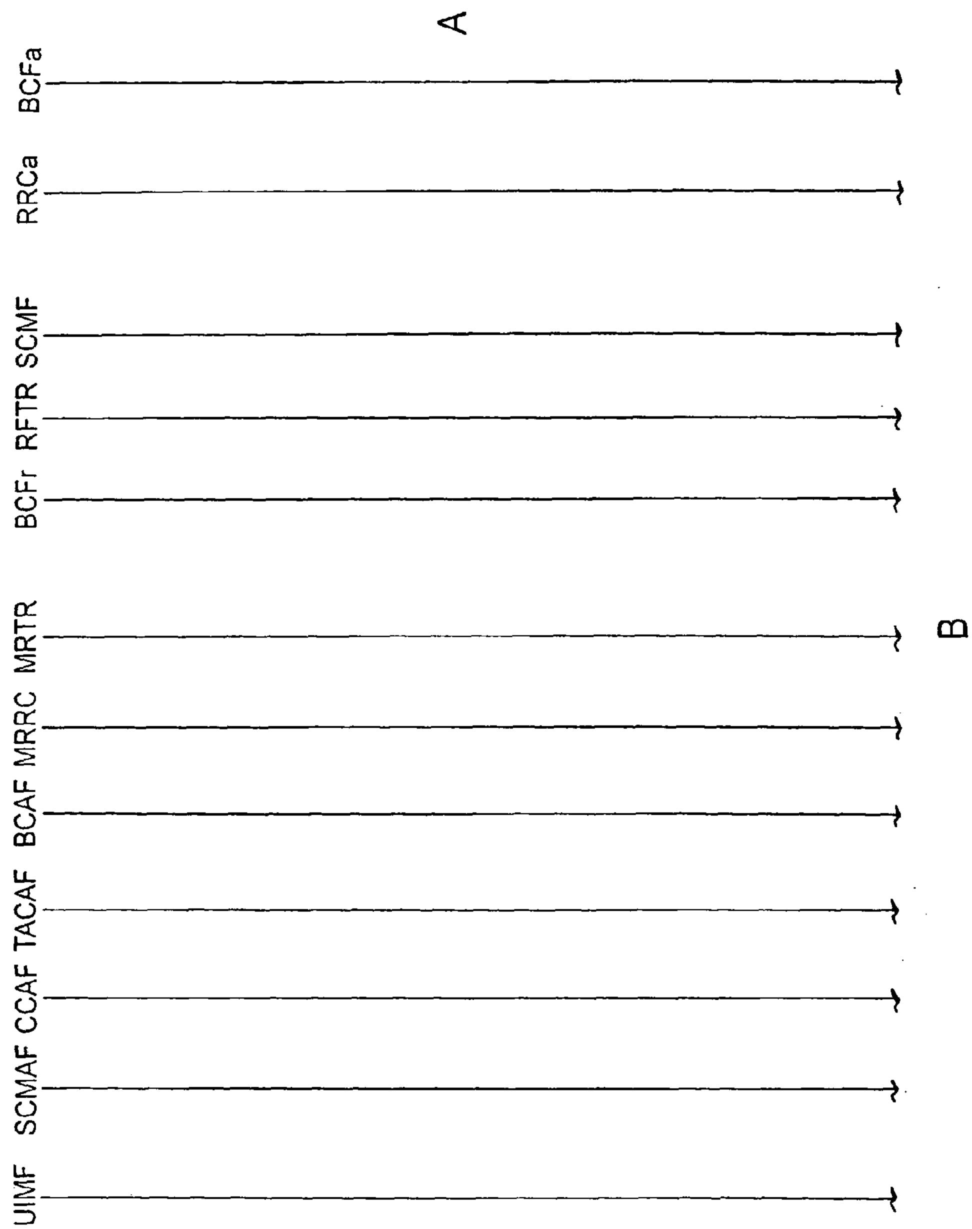
FIGS. 15 and 16 form an information flow diagram showing the acceptance of additional incoming call.
Figure 16:
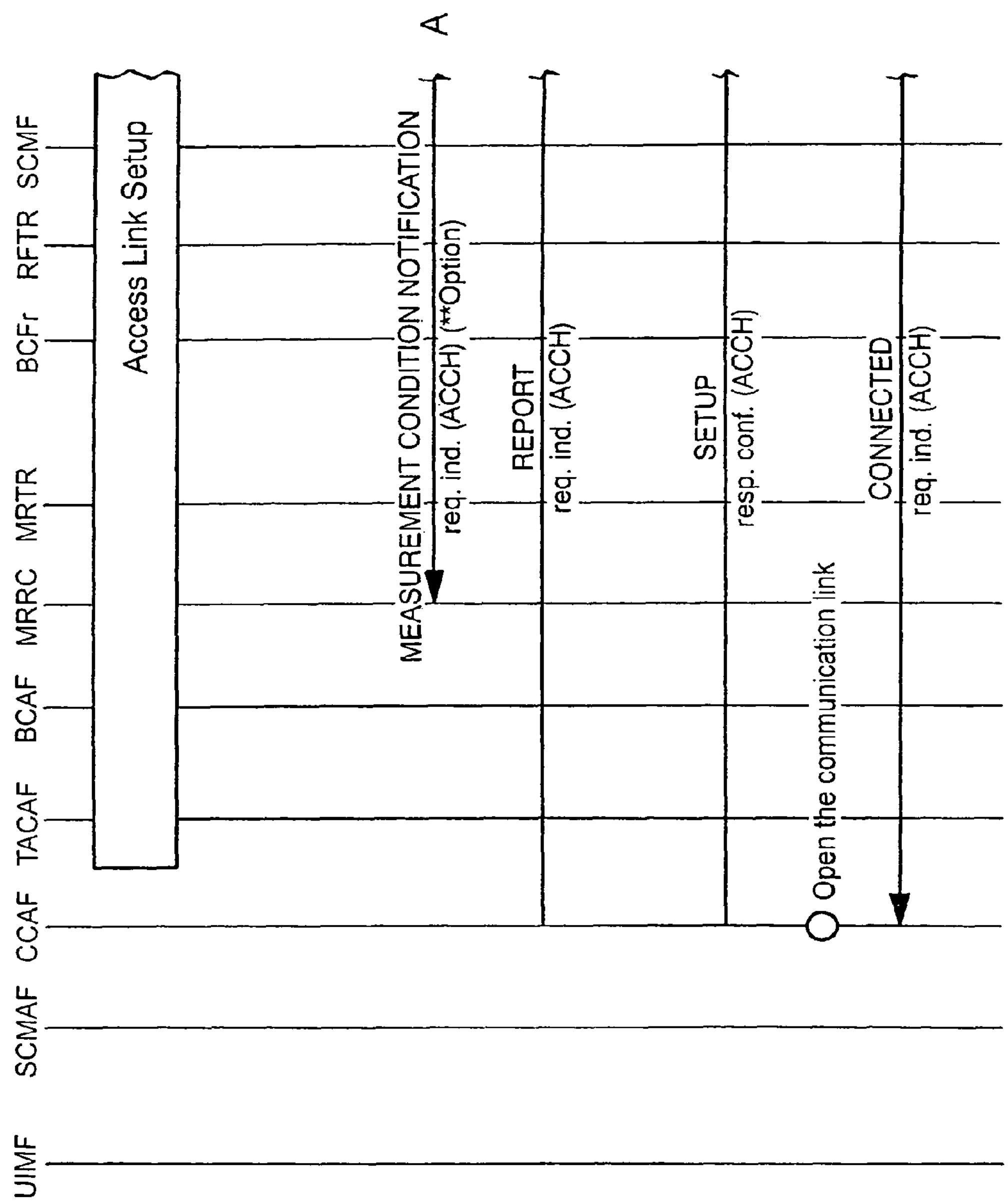

FIGS. 15 and 16 form an information flow diagram showing the termination for additional call.

c) Definitions of Information Flows, Information Elements, and Functional Entity Actions The information flow diagrams will be described supplementally in the following and information elements in the flow diagrams will be discussed and represented in tables.

A SETUP request indication is used to report the establishment of a connection. The detail is represented in FIG. 303.

A ROUTING INFORMATION QUERY request indication is used to inquire the routing information. The detail is represented in FIG. 304. Either called user number or roaming number may be used as an identifier of the called user. Roaming number is used in this example represented in FIG. 304.

A TERMINAL ID RETRIEVAL request indication is used to request the user profile to be retrieved. The detail is represented in FIG. 305. The roaming number item in FIG. 305 is used in this information flow to specify the user whose profile should be retrieved, instead of the called user ID. The selection item in FIG. 305 specifies the data which should be retrieved. This information element in this information flow specifies the user ID.

A TERMINAL ID RETRIEVAL response confirmation is a response to the TERMINAL ID RETRIEVAL request indication. The detail is represented in FIG. 306.

A TERMINAL STATUS QUERY request indication is used to inquire the terminal status (e.g. if terminal access is active or not). The detail is represented in FIG. 307. The selection item in FIG. 307 specifies the data which should be retrieved. This information element in this information flow specifies the user's call status.

A TERMINAL STATUS QUERY response confirmation is a response to the TERMINAL STATUS QUERY request indication. The detail is represented in FIG. 308.

A TERMINAL STATUS UPDATE request indication is used to update the terminal status. The detail is represented in FIG. 309.

A TERMINAL STATUS UPDATE response confirmation is a response to the TERMINAL STATUS UPDATE request indication. The detail is represented in FIG. 310.

A PAGING AREA QUERY request indication is used to inquire the paging area where TACF resides when it is observed that the terminal access is not active. The detail is represented in FIG. 311. The selection item represented in FIG. 311 specifies the data which should be retrieved. This information element in this information flow specifies the paging area.

A PAGING AREA QUERY response confirmation is a response to the PAGING AREA QUERY request indication. The detail is shown in FIG. 312.

A PAGE request indication at relationship rg is used to trigger a TACF of paging. The detail of the PAGE request indication is represented in FIG. 313. Paging relationship ID in FIG. 313 is generated by the LRCF and is used to correlate the request and the response.

A PAGING request indication at relationship rb is used to page a mobile terminal for determining its position in the network and for the routing for a call. This information flow requires a confirmation. The detail of the PAGING request indication is represented in FIG. 314. The paging ID in FIG. 314 is generated by the TACF and used to identify the response.

A PAGING response confirmation is used to respond to the request indication. The detail is represented in FIG. 315.

A PAGE response confirmation is a response to the request indication and notifies the LRCF of the paging result. LRCF initiates SLP for the user authentication of the responding user after receiving this information flow. The detail is represented in FIG. 316. This information flow is also used in case of no response wherein if the optional information elements in FIG. 316 are not read out, it is regarded that the paging request by the network is not responded by any terminals.

A REVERSE LONG CODE RETRIEVAL request indication is used to retrieve a reverse (uplink) long code. The detail of the reverse long code at relationship rg is represented in FIG. 317.

Another REVERSE LONG CODE RETRIEVAL request indication is used to retrieve the reverse long code. The detail of the reverse long code at relationship rd is represented in FIG. 318.

A REVERSE LONG CODE RETRIEVAL response confirmation is used to retrieve the reverse long code. The detail is represented in FIG. 319.

A CELL CONDITION MEASUREMENT request indication is used by the MRRC to trigger the measurement of cell selecting information. This information flow requires a confirmation. The confirmation (CELL CONDITION MEASUREMENT response confirmation) provides the result of the measurement. The detail of the CELL CONDITION MEASUREMENT request indication is represented in FIG. 320.

A CELL CONDITION MEASUREMENT response confirmation provides the result of the cell selection information measurement requested by the CELL CONDITION MEASUREMENT request indication. The detail of the CELL CONDITION MEASUREMENT response confirmation is represented in FIG. 321.

A CELL CONDITION REPORT request indication is used by the mobile terminal to report the cell selection information. The information is used by the network to select radio channels. This information flow does not require any confirmation. The detail is represented in FIG. 322.

An ADD-ROUTING INFORMATION request indication is sent to the LRDFp to add the routing information to the subscriber's profile. This information flow is only sent when the authentic mobile terminal has been found and the above related information has been obtained. The detail is represented in FIG. 323.

An ADD-ROUTING INFORMATION response confirmation is a response to the ADD-ROUTING INFORMATION request indication. The detail of the ADD-ROUTING INFORMATION response confirmation is represented in FIG. 324.

A PAGE AUTHORIZED request indication at relationship rg is used to notify the TACF of the result of the terminal authentication. The detail is represented in FIG. 325.

A REVERSE LONG CODE RETRIEVAL response confirmation is used to retrieve the reverse long code. The detail is represented in FIG. 326.

A PAGE AUTHORIZED request indication is used to notify the TACF of the result of the terminal authentication.

A ROUTING INFORMATION QUERY response confirmation is a response to the request indication. The detail is represented in FIG. 327. The routing address item and TACF instance ID item in FIG. 327 are used in this case to specify the routing information. The routing address item is used for routing in the visited network.

A SETUP request indication is used to request the establishment of a connection. The detail is represented in FIG. 328.

A TERMINATION ATTEMPT request indication is used to request the user's profile which may be needed to proceed the call process. The detail is represented in FIG. 329.

A USER PROFILE RETRIEVAL request indication is used to retrieve the called user's profile from the LRDF. The detail is represented in FIG. 330.

A USER PROFILE RETRIEVAL response confirmation is a response to the request indication from the LRCF. The detail is represented in FIG. 331.

A TERMINATION ATTEMPT response confirmation is a response to the request indication from the SSF. The detail is represented in FIG. 332.

A SETUP request indication is used to request the establishment of a connection. The detail is represented in FIG. 333.

A PROCEEDING request indication optionally reports that the instructed connection setup is valid and authenticated and that further routing and progressing of the call is proceeding. This information flow does not require any confirmation. The detail is represented in FIG. 334.

A MEASUREMENT CONDITION. NOTIFICATION request indication is used by the network to indicate conditions, which the mobile terminal measures, and to report the cell selection information. When the mobile terminal is on an idle mode, the network indicates the MEASUREMENT CONDITION NOTIFICATION request indication periodically. When the mobile terminal is in communication, the network indicates the MEASUREMENT CONDITION NOTIFICATION request indication at the change of conditions. This information flow does not require any confirmation. The detail of the MEASUREMENT CONDITION NOTIFICATION request indication is represented in FIG. 335.

A REPORT request indication is an information element that is used to report status and/or other types of information transported in the network. The type of information may be indicated (e.g. alerting, suspended, hold, resume). This information flow does not require any confirmation. The detail of the REPORT request indication is represented in FIG. 336.

A SETUP response confirmation is used to confirm that the connection has been established. The detail is represented in FIG. 337.

A CONNECTED request indication is used to acknowledge that a previously sent SETUP response confirmation has been received and accepted. This information flow does not require any confirmation. The detail is represented in FIG. 338.

Figure 17:
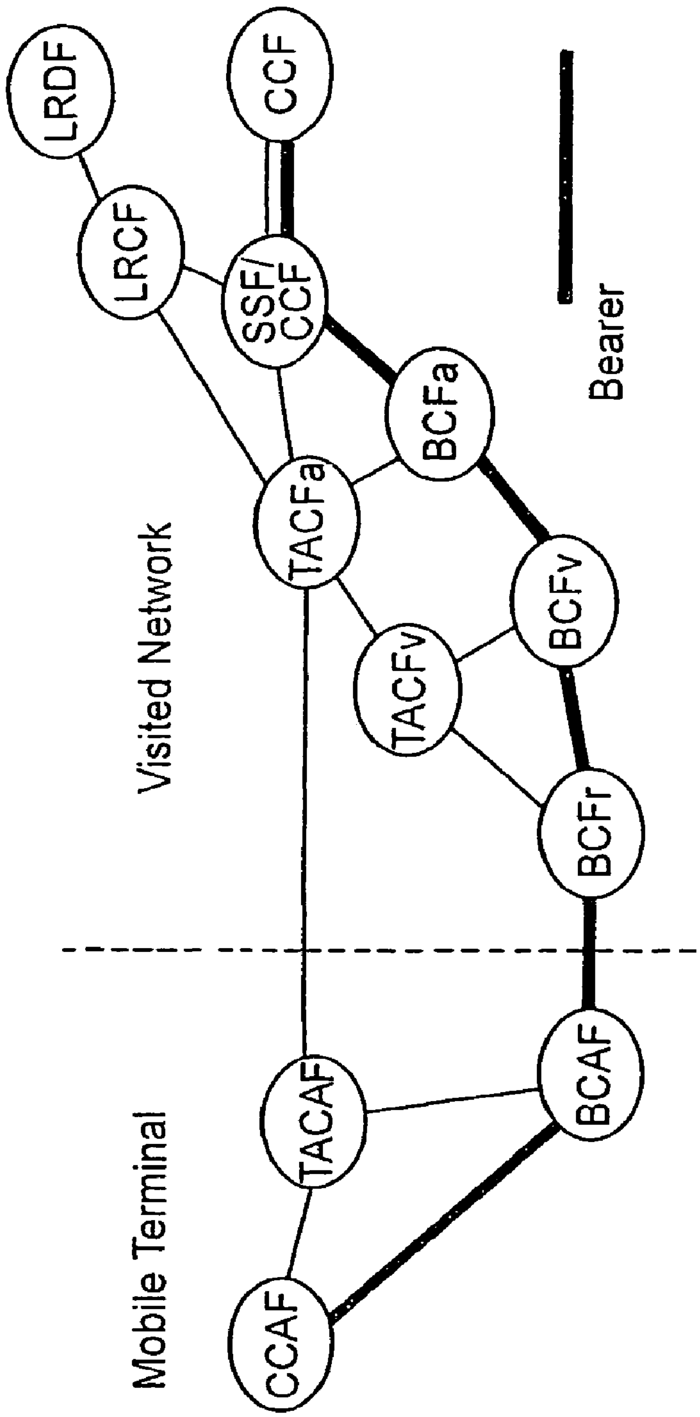
FIG. 17 is a diagram showing the functional model of a part of the invented system for describing a disconnection instructed by a user.

2.4.2.3 Call Release 2.4.2.3.1 Disconnection Instructed by User (a) Functional Model FIG. 17 shows the functional model of a part of the invented system for describing the disconnection instructed by a user.

(b) Information Flows

Figure 18:
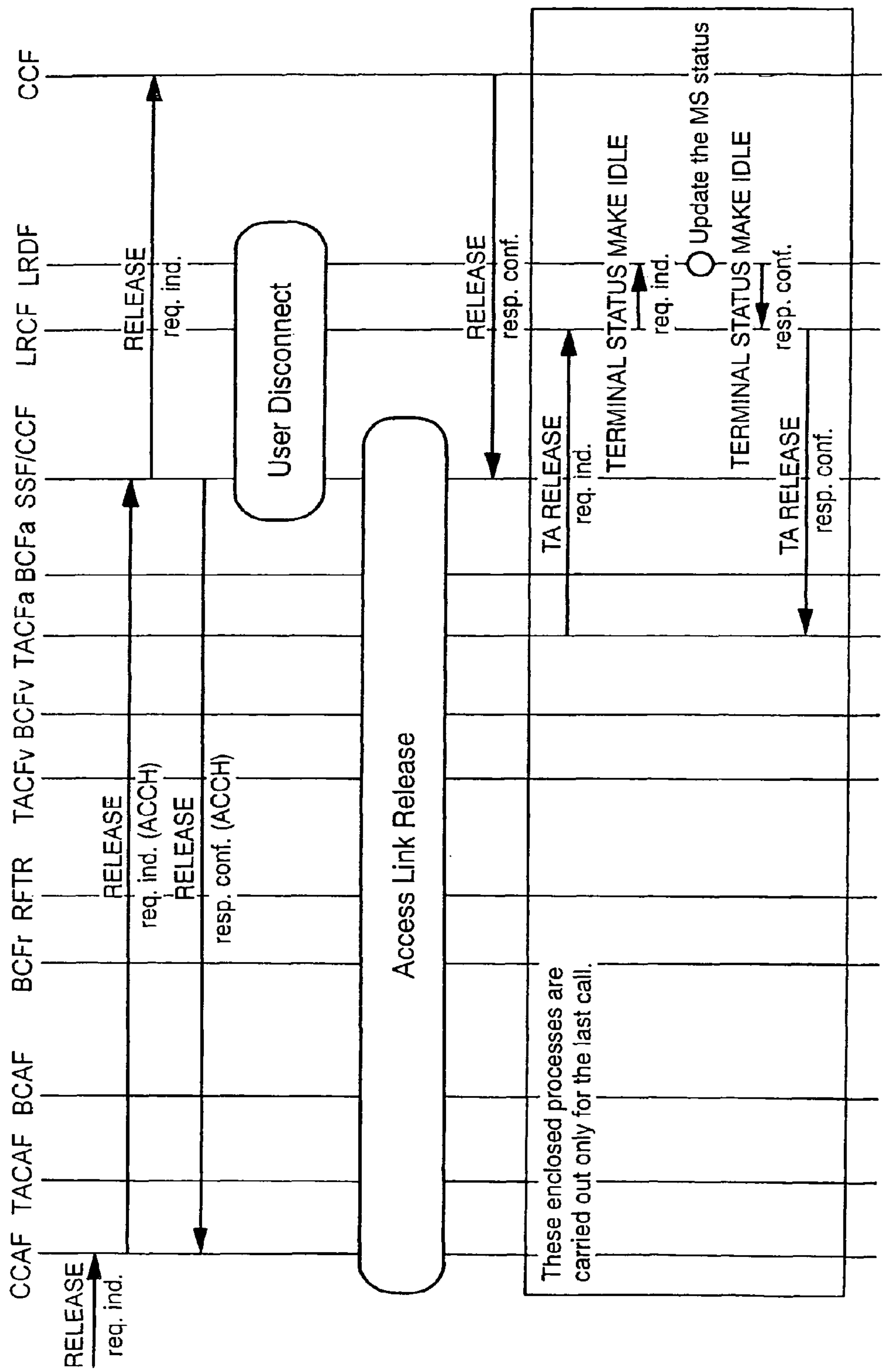
FIG. 18 is an information flow diagram showing the disconnection instructed by a user.

FIG. 18 is an information flow diagram showing the disconnection instructed by a user.

(c) Definitions of Information Flows

A RELEASE request indication is used to release resources associated with a call connection, such as call ID or channels. This information flow requires a confirmation. The detail is represented in FIG. 339.

A RELEASE response confirmation is used to indicate that all resources pervasively associated with the connection have been released. The detail is represented in FIG. 340.

A TA RELEASE request indication is issued by the TACF to inform the SCF that an attempt of call release has been detected. This information flow is issued when the last call is released and the control relationship between the terminal and the network should be released. The detail is represented in FIG. 341.

A TERMINAL-STATUS-MAKE-IDLE request indication is used to idle the terminal call status. The detail is represented in FIG. 342.

A TERMINAL-STATUS-MAKE-IDLE response confirmation is a response to the TERMINAL-STATUS-MAKE-IDLE request indication. The detail of the TERMINAL-STATUS-MAKE-IDLE response confirmation is represented in FIG. 343.

A TA RELEASE response confirmation is used for the confirmation to the TA RELEASE request indication. The detail of the TA RELEASE response confirmation is represented in FIG. 344.

2.4.2.3.2 Disconnection Instructed by Network (a) Functional Model

Figure 19:
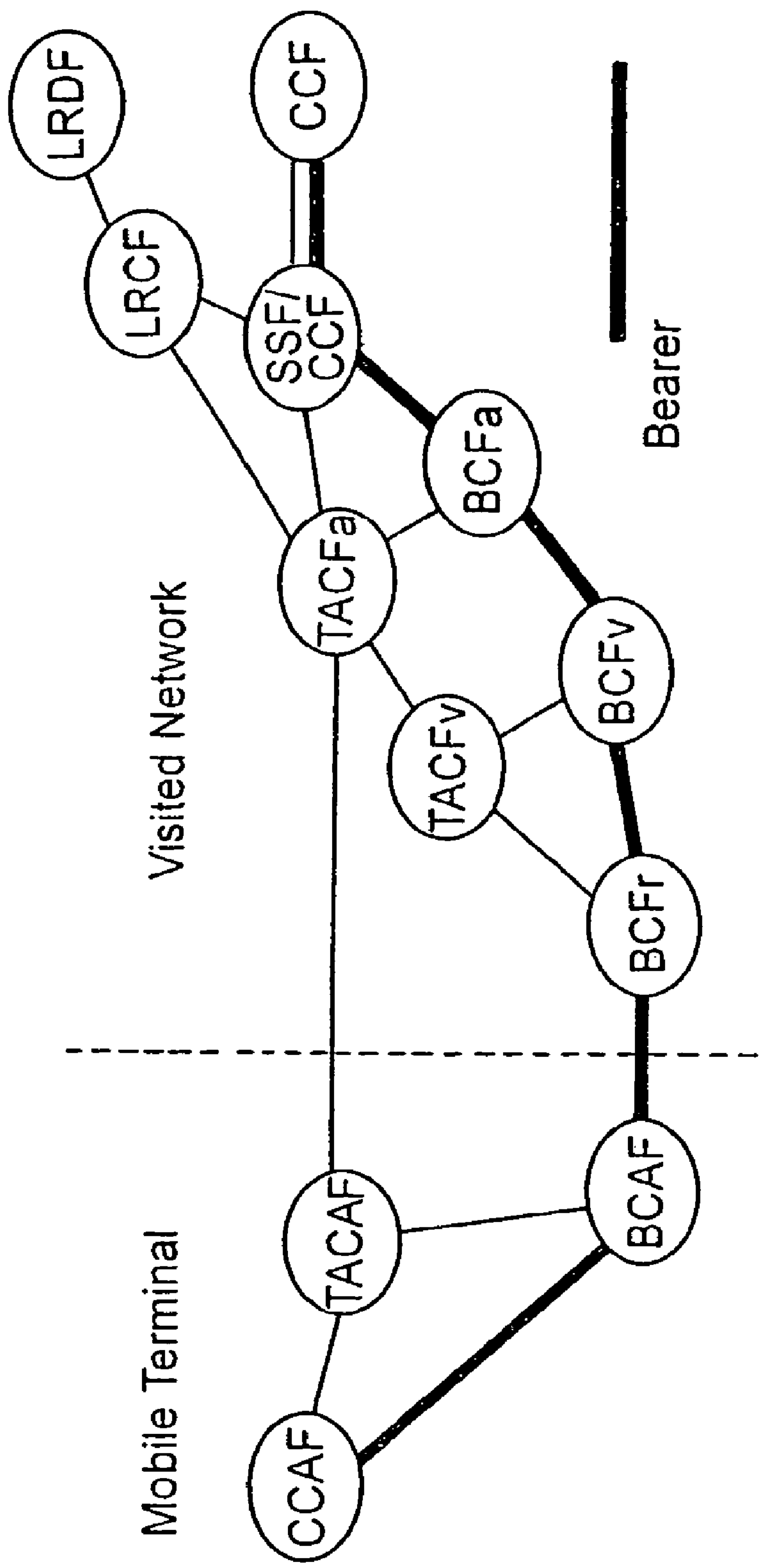
FIG. 19 is a diagram showing the functional model of a part of the invented system for describing a disconnection instructed by the network.

FIG. 19 shows the functional model of a part of the invented system for describing the disconnection instructed by the network.

(b) Information Flows

Figure 20:
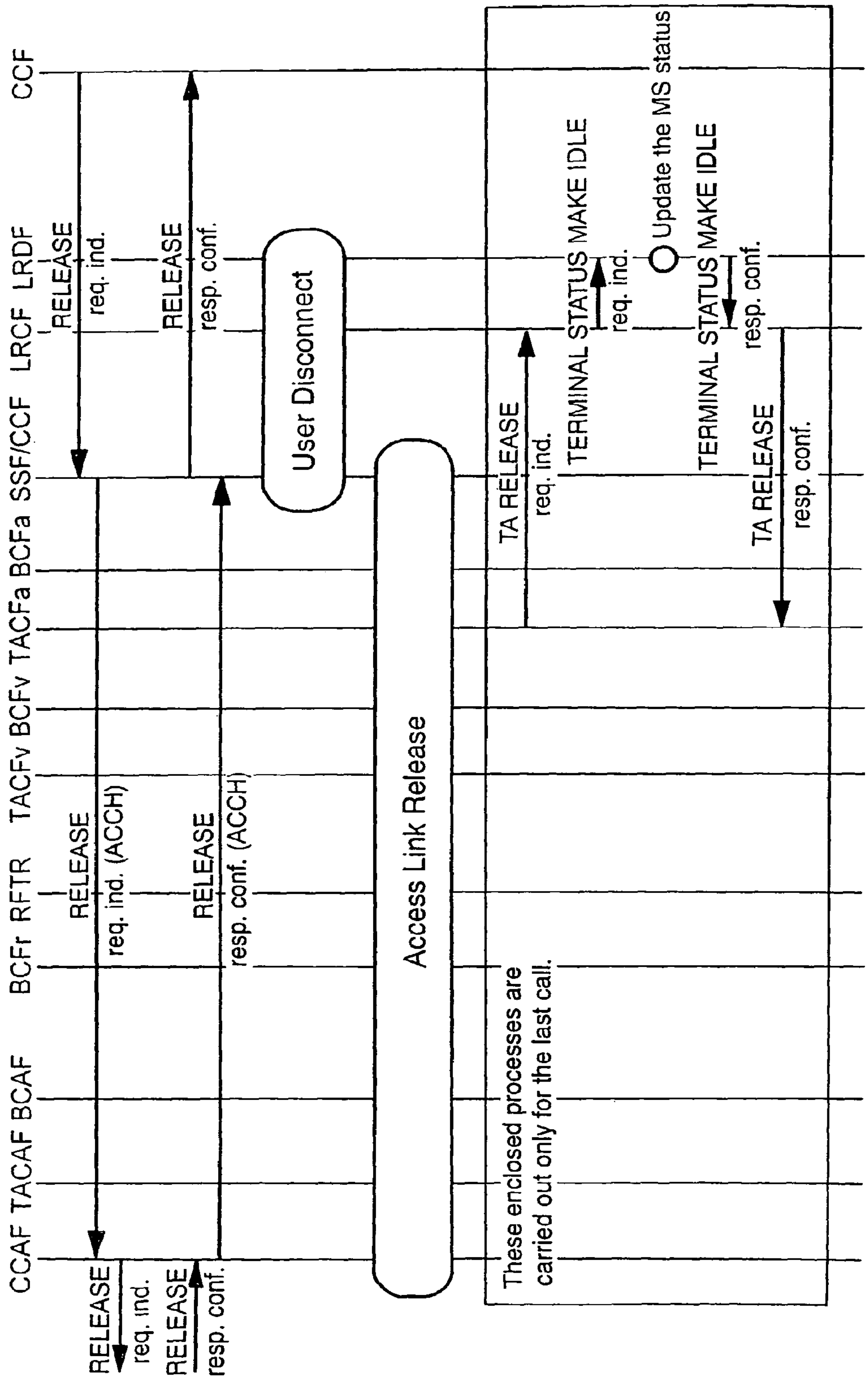
FIG. 20 is an information flow diagram showing the disconnection instructed by the network.

FIG. 20 is an information flow diagram showing the disconnection instructed by the network.

(c) Definitions of Information Flows

The information flow diagram will be described supplementally in the following and information elements in the flow diagram will be discussed and represented in tables.

A RELEASE request indication is used to release resources associated with a call connection such as the call reference or channels. This information flow requires a confirmation. The detail is represented in FIG. 345.

A RELEASE response confirmation is used to indicate that all resources previously associated with the connection have been released. The detail is represented in FIG. 346.

A TA RELEASE request indication is issued by the TACF to inform the LRCF that an attempt of call release has been detected. This information flow is issued when the last call is released and the control relationship between the terminal and the network should be released. The detail is represented in FIG. 347.

A TERMINAL-STATUS-MAKE-IDLE request indication is used to idle the terminal call status. The detail is represented in FIG. 348.

A TERMINAL-STATUS-MAKE-IDLE response confirmation is a response to the TERMINAL-STATUS-MAKE-IDLE request indication. The detail is represented in FIG. 349.

A TA RELEASE response confirmation is used for the response confirmation of the TERMINAL-STATUS-MAKE-IDLE request indication. The detail is represented in FIG. 350.

2.4.2.3.3 Abnormal Release 2.4.2.3.3.1 Abnormal Release Caused from Radio Link Failure Detected by Mobile Terminal 2.4.2.3.3.1.1 Common Procedure Module Used A common procedure module used in this release process is the "user disconnect."

2.4.2.3.3.1.2 Information Flow Diagram a) Functional Model

Figure 21:
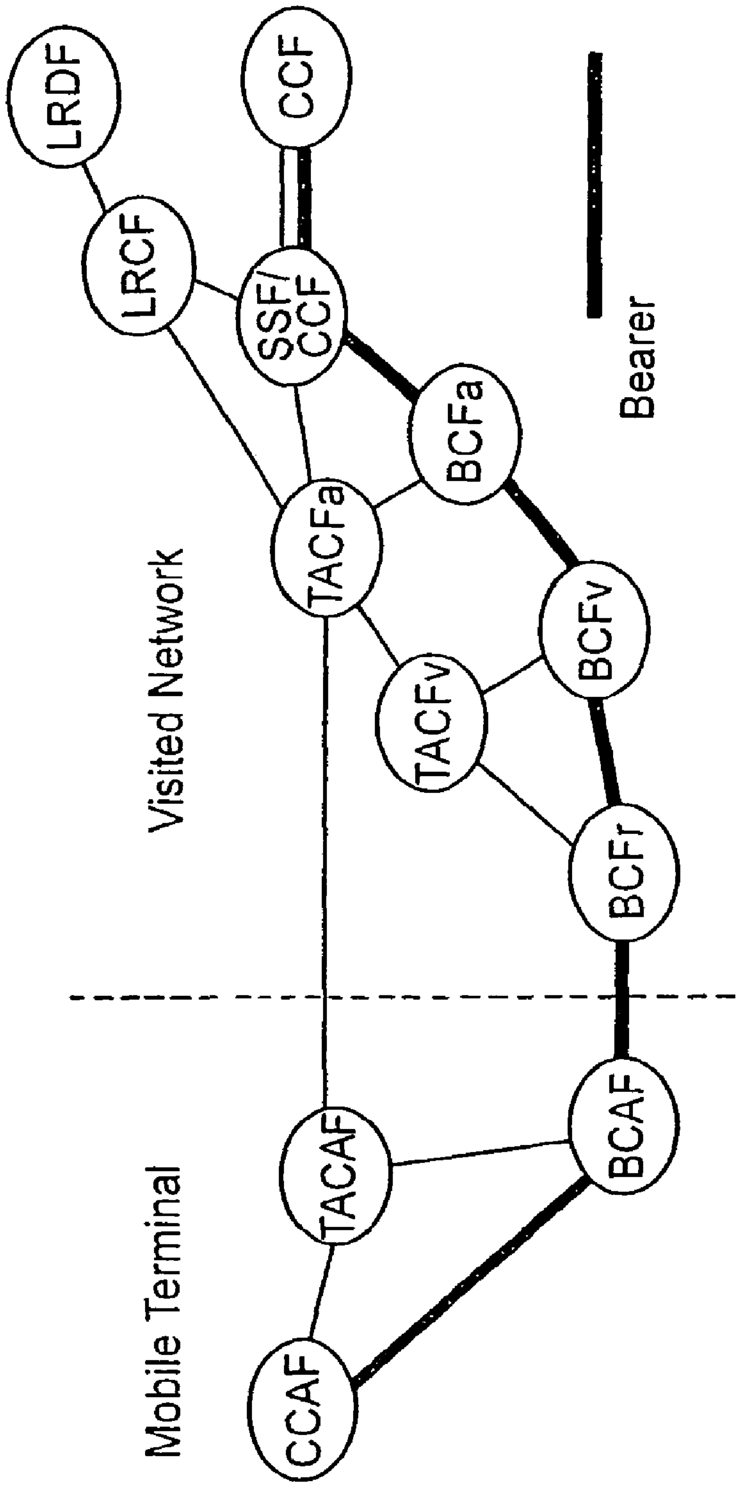
FIG. 21 is a diagram showing the functional model of a part of the invented system for describing an abnormal release caused from a radio link failure detected by a mobile terminal.

FIG. 21 shows the functional model of a part of the invented system for describing the abnormal release caused from a radio link failure (squelch condition) detected by a mobile terminal.

b) Information Flows

Figure 22:
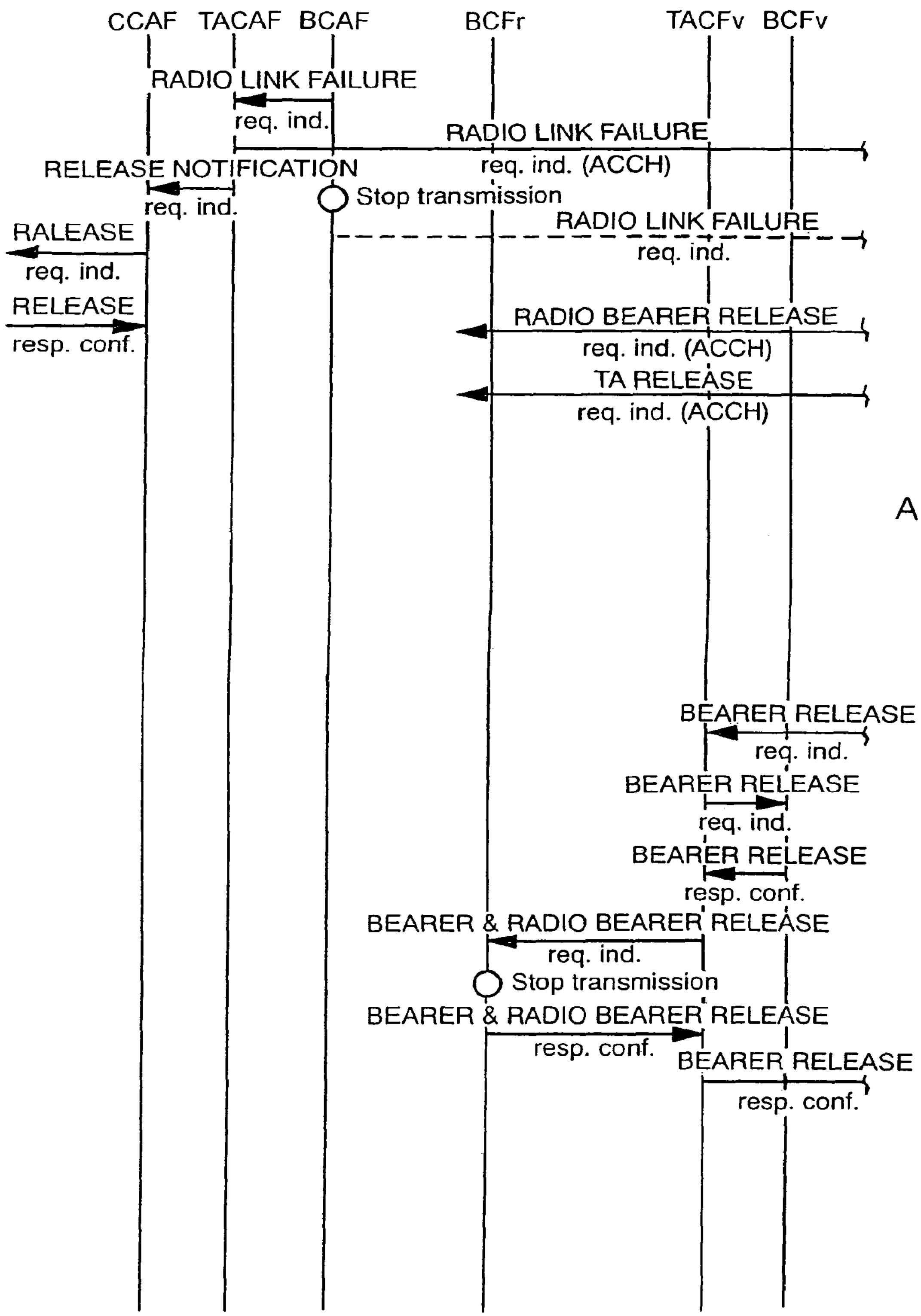
FIG. 22 is an information flow diagram of the abnormal release caused from the radio link failure detected by the mobile terminal.

FIG. 22 shows an information flow diagram of the abnormal release, executed in the communication control plane, caused from the radio link failure detected by the mobile terminal.

c) Definitions of Information Flows and Information Elements

Information flows in FIG. 22 will be described below and information elements of the flows are represented in tables. The order of description is the same as the order of the flows in FIG. 22.

A RADIO LINK FAILURE request indication is used to notify a radio link failure detected by the BCAF or BCFr. In this flow procedure, this information flow is issued by the BCAF. The detail is represented in FIG. 351.

A RELEASE NOTIFICATION request indication is used to indicate that the connection between the network and the terminal has been released. The information flow does not require any confirmation. The detail is represented in FIG. 352.

A RADIO LINK FAILURE request indication is used to notify that the link failure has been detected. The detail is represented in FIG. 353.

Another RADIO LINK FAILURE request indication is used to notify that the link failure has been detected. The detail is represented in FIG. 354.

A RADIO LINK FAILURE response confirmation is a response confirmation of the RADIO LINK FAILURE request indication. The detail is represented in FIG. 355.

A RADIO BEARER RELEASE request indication is used to request to release radio bearers. This is originated by network. The detail is represented in FIG. 356.

A TA RELEASE request indication is issued by the TACF to request the release of terminal access. This information flow is issued for only the last call release.

A BEARER RELEASE request indication is issued by the TACF to the BCF to release the radio bearer. The detail is represented in FIG. 357.

A BEARER RELEASE response confirmation is a response confirmation of the bearer release request indication. The detail is represented in FIG. 358.

Another BEARER RELEASE request indication is sent by the anchor TACF to request the serving TACF to release the bearer involved in the call that should be released. The detail is represented in FIG. 359.

Another BEARER RELEASE request indication is issued by the TACF to BCF to release the radio bearer. The detail is represented in FIG. 360.

Another BEARER RELEASE response confirmation is a response confirmation of the BEARER RELEASE request indication. The detail is represented in FIG. 361.

A BEARER-AND-RADIO-BEARER RELEASE request indication is issued by the TACF to release the bearer-and-radio-bearer. The detail is represented in FIG. 362.

A BEARER-AND-RADIO-BEARER RELEASE response confirmation is used for a confirmation of the release of the bearer-and-radio-bearer requested by the BEARER-AND-RADIO-BEARER RELEASE request indication. The detail is represented in FIG. 363.

Another BEARER RELEASE response confirmation is a confirmation response to inform the TACF that the previous request to release the radio bearer has been completed. The detail is represented in FIG. 364.

A TA RELEASE request indication is issued by the TACF to inform the LRCF that the attempt of releasing call has detected. The detail is represented in FIG. 365.

A TERMINAL-STATUS-MAKE-IDLE request indication is used to request to update the user profile. For call release, this information flow is used to update the user's call status to idle. The detail is represented in FIG. 366.

A TERMINAL-STATUS-MAKE-IDLE response confirmation is a response to the TERMINAL-STATUS-MAKE-IDLE request indication. The detail is represented in FIG. 367.

A TA RELEASE response confirmation is used for a response confirmation of the TA RELEASE request indication. The detail is represented in FIG. 368.

2.4.2.3.3.2 Abnormal Release Caused from Radio Link Failure Detected by Network 2.4.2.3.3.2.1 Common Procedure Module Used A common procedure module used in this release process is the "user disconnect."

2.4.2.3.3.2.2 Information Flow, Diagram a) Functional Model

Figure 23:
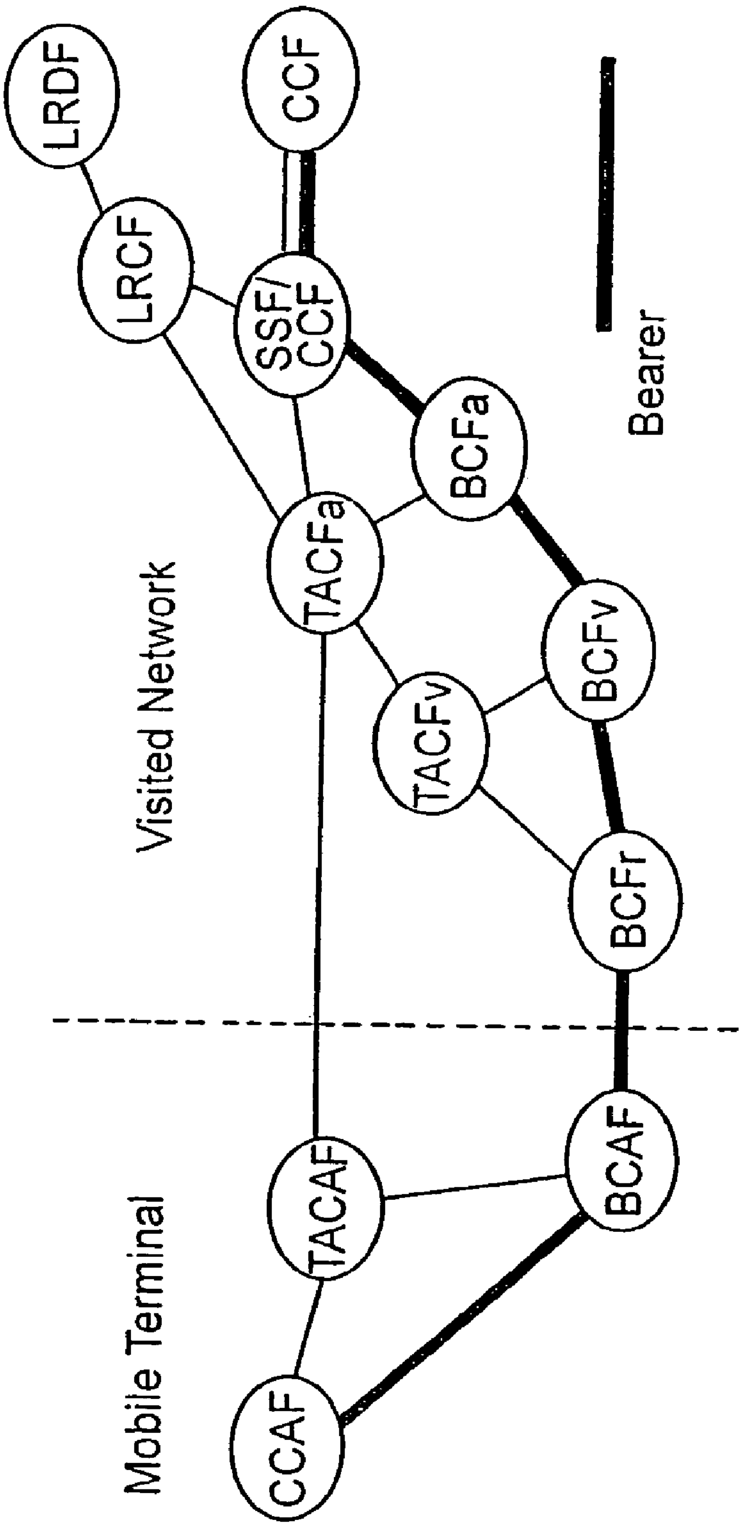
FIG. 23 is a diagram showing the functional model of a part of the invented system for describing an abnormal release caused from a radio link failure detected by the network.

FIG. 23 shows the functional model of a part of the invented system for describing the abnormal release caused from a radio link failure (squelch condition) detected by the network.

b) Information Flows

Figure 24:
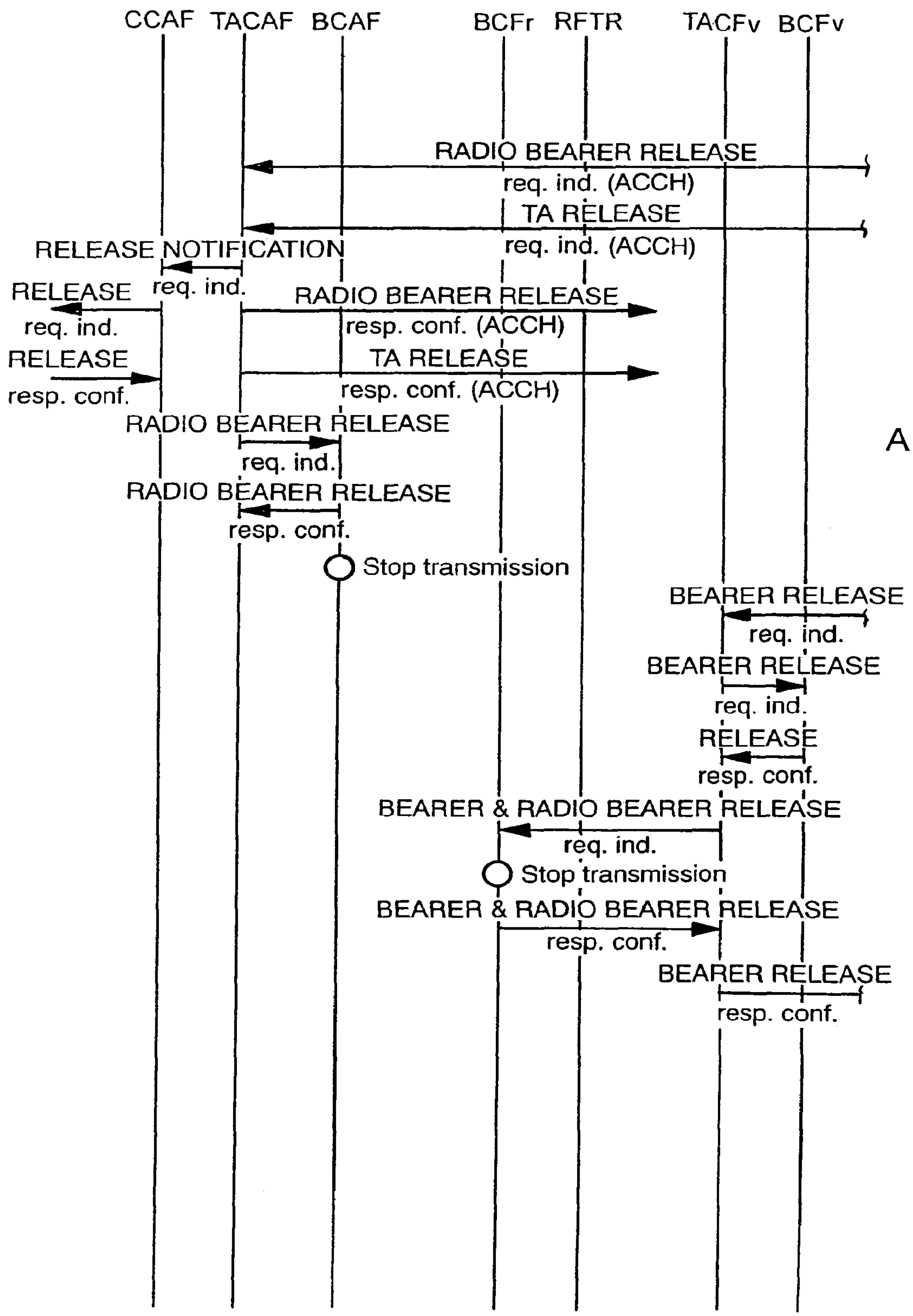
FIG. 24 is an information flow diagram of the abnormal release caused from the radio link failure detected by the network.

FIG. 24 shows an information flow diagram of the abnormal release, executed in the communication control plane, caused from the radio link failure detected by the network.

c) Definitions of Information Flows and Information Elements

Information flows in FIG. 24 will be described below and information elements of the flows are represented in tables. The order of description is the same as the order of the flows in FIG. 24.

A RADIO LINK FAILURE request indication is used to notify that a link failure has been detected and reported by either BCFr or BCFa. The detail is represented in FIG. 369.

Another RADIO LINK FAILURE request indication is used to notify that the link failure has been detected. The detail is represented in FIG. 370.

A RADIO LINK FAILURE response confirmation is a confirmation response to the RADIO LINK FAILURE request indication. The detail is represented in FIG. 371.

A RADIO BEARER RELEASE request indication is used to request to release the radio bearer. This is originated by the network. The detail is represented in FIG. 372.

A RELEASE NOTIFICATION request indication is used to indicate that the connection between the network and the terminal has been released. The information flow does not require any confirmation. The detail is represented in FIG. 373.

A RADIO BEARER RELEASE response confirmation is a response confirmation of the RADIO BEARER RELEASE request indication. The detail is represented in FIG. 374.

A TA RELEASE request indication is issued by the TACF to request the release of terminal access. This information flow is issued for only the last call.

A TA RELEASE response confirmation is a response confirmation of the TA RELEASE request indication.

A BEARER RELEASE request indication is issued by the TACF to BCF to release the radio bearer. The detail is represented in FIG. 375.

A BEARER RELEASE response confirmation is a response confirmation of the BEARER RELEASE request indication. The detail is represented in FIG. 376.

Another BEARER RELEASE request indication is sent by the anchor TACF to request the serving TACF to release the radio bearer involved in the call that should be released. The detail is represented in FIG. 377.

Another BEARER RELEASE request indication is issued by the TACF to BCF to release the radio bearer. The detail is represented in FIG. 378.

A BEARER RELEASE response confirmation is a response confirmation of the BEARER RELEASE request indication. The detail is represented in FIG. 379.

A BEARER-AND-RADIO-BEARER RELEASE request indication is issued by the TACF to release the bearer-and-radio-bearer. The detail is represented in FIG. 380.

A BEARER-AND-RADIO-BEARER RELEASE response confirmation is used for a confirmation of the release of the bearer and radio bearer requested by the BEARER-AND-RADIO-BEARER RELEASE request indication. The detail is represented in FIG. 381.

Another BEARER RELEASE response confirmation is a confirmation response for informing the TACF that the previous request to release the radio bearer has been completed. The detail is represented in FIG. 382.

A RADIO BEARER RELEASE request indication is issued to request to release the radio bearer. The detail is represented in FIG. 383.

Another RADIO BEARER RELEASE response confirmation is used to confirm the release of radio bearer requested by the RADIO BEARER RELEASE request indication. The detail is represented in FIG. 384.

A TA RELEASE request indication is issued by the TACF to inform the LRCF that the attempt of call release has been detected. The detail is represented in FIG. 385.

A TERMINAL-STATUS-MAKE-IDLE request indication is used to request to update the user profile. For call release, this information flow is used to update the user's call status to idle. The detail is represented in FIG. 386.

A TERMINAL-STATUS-MAKE-IDLE response confirmation is a response to the TERMINAL-STATUS-MAKE-IDLE request indication. The detail is represented in FIG. 387.

Another TA RELEASE response confirmation is used for confirmation to the TA RELEASE request indication. The detail is represented in FIG. 388.

Figure 25:
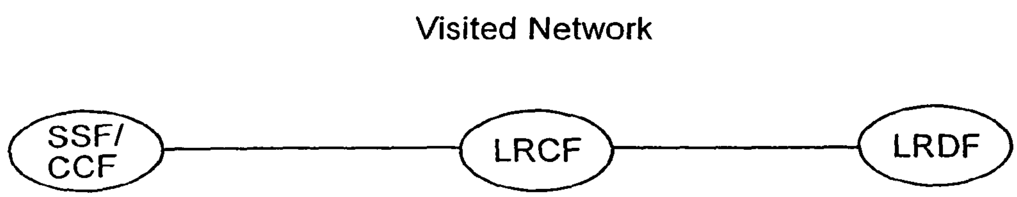
FIG. 25 is a diagram showing the functional model of a part of the invented system for describing a user disconnect.

2.4.2.3.4 User Disconnect 2.4.2.3.4.1 Information Flow Diagram a) Functional Model FIG. 25 shows the functional model of a part of the invented system for describing the "user disconnect."

b) Information Flows

Figure 26:
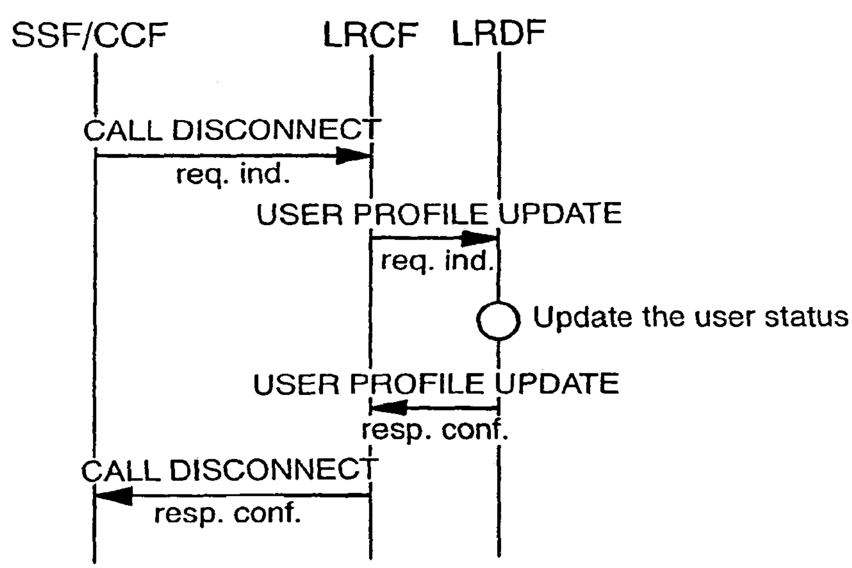
FIG. 26 is an information flow diagram of the user disconnect.

FIG. 26 shows an information flow diagram of the "user disconnect."

c) Definitions of Information Flows and Information Elements

Information flows in FIG. 26 will be described below and information elements in the flows are represented in tables. The order of description is the same as the order of the flows in FIG. 26.

A CALL DISCONNECT request indication is used to notify the LRCF that a "user disconnect" has been detected. The detail is represented in FIG. 389.

A USER-PROFILE-UPDATE request indication is used to request to update the user profile. For call release, this information flow is used to indicate the call has been released. The detail is represented in FIG. 390.

A USER-PROFILE-UPDATE response confirmation is a response to the USER-PROFILE-UPDATE response confirmation. The detail is represented in FIG. 391.

A CALL DISCONNECT response confirmation is a response to the request made by the CALL DISCONNECT request indication. The detail is represented in FIG. 392.

2.4.3 Information Flow Diagrams for Access Link Control 2.4.3.1 SDCCH Setup

First, the SDCCH setup process will be described.

Figure 27:
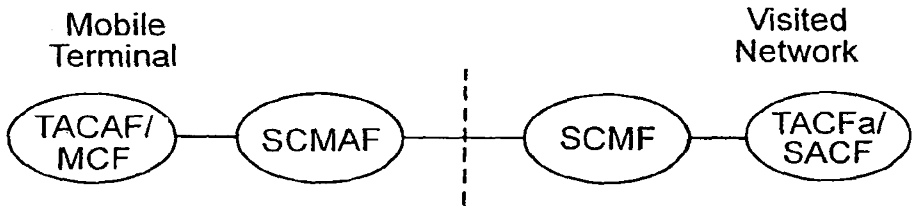
FIG. 27 is a diagram showing the functional model of a part of the invented system for describing an SDCCH setup process.

2.4.3.1.1 Common Procedure Modules Used 2.4.3.1.2 Information Flow Diagram a) Functional Model FIG. 27 shows the functional model of a part of the invented system for describing the SDCCH setup process.

b) Information Flows

Figure 28:
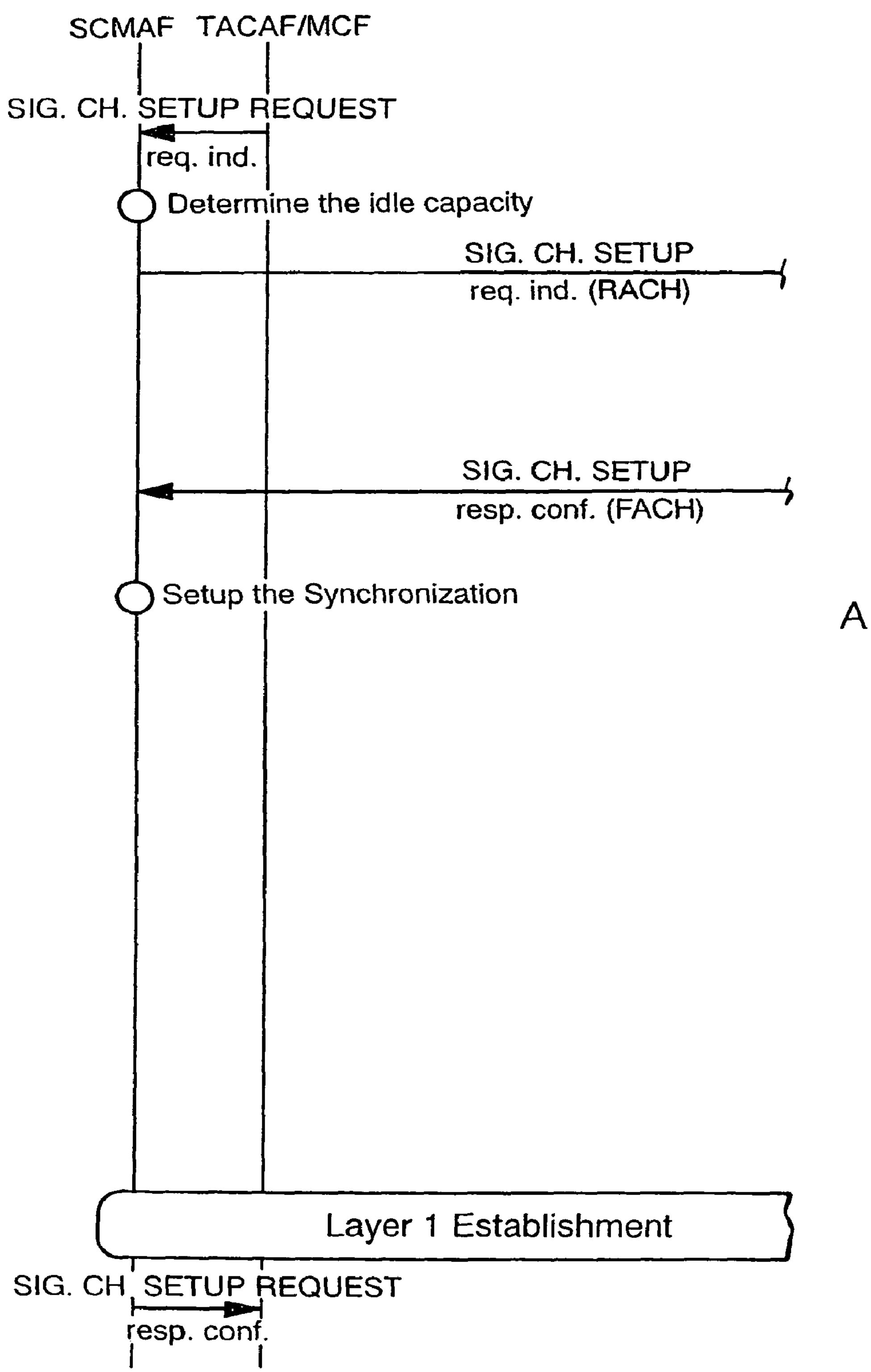
FIG. 28 is an information flow diagram of the SDCCH setup process.

FIG. 28 shows an information flow diagram of the SDCCH setup process.

c) Definitions of Information Flows and Information Elements

Information flows in FIG. 28 will be described below and information elements of the flows are represented in tables. The order of description is the same as the order of the flows in FIG. 28.

A SIGNALING CHANNEL SETUP REQUEST request indication is used by the MCF and TACF to request the network to setup the signaling channels. The detail is represented in FIG. 393.

A SIGNALING CHANNEL SETUP request indication is used by the SCMAF to request to the network to allocate the signaling channels. The detail is represented in FIG. 394.

A SIGNALING CHANNEL SETUP response confirmation is used by the SCMF to allocate the radio resources to the signaling channels. The detail is represented in FIG. 395.

A SIGNALING CHANNEL SETUP REQUESTED request indication is used to indicate the reception of the signaling channel setup request (initial access detection) from the mobile terminal and to request the network to setup the corresponding signaling channels in the network. The detail is represented in FIG. 396.

A SIGNALING CONNECTION SETUP request indication is used by the TACF and SACF to setup the signaling connection among them and the SCMF. The detail is represented in FIG. 397.

A SIGNALING CONNECTION SETUP response confirmation is used to report the establishment of the signaling channels including the physical radio channel and the intra-network channel. The detail is represented in FIG. 398.

A SIGNALING CHANNEL SETUP REQUEST response confirmation is used by the SCMAF to report the setup of the signaling channels to the network. The detail is represented in FIG. 399.

2.4.3.2 Bearer Setup

Next, bearer setup procedures for the radio resource selection will be described, 2.4.3.2.1 Common Procedure Modules Used 2.4.3.2.2 Information Flow Diagram a) Functional Model Radio resources are selected under a base station which is different from the one that received a call setup request from a mobile terminal while the BSs are controlled by different TACFs. The CCF only has the relationship with the TACFa and does not have the relationship with the TACFv. The TACFa controls both bearer selection and bearer setup. There are three BCFs: BCF1, BCF2, and BCFr.

Figure 29:
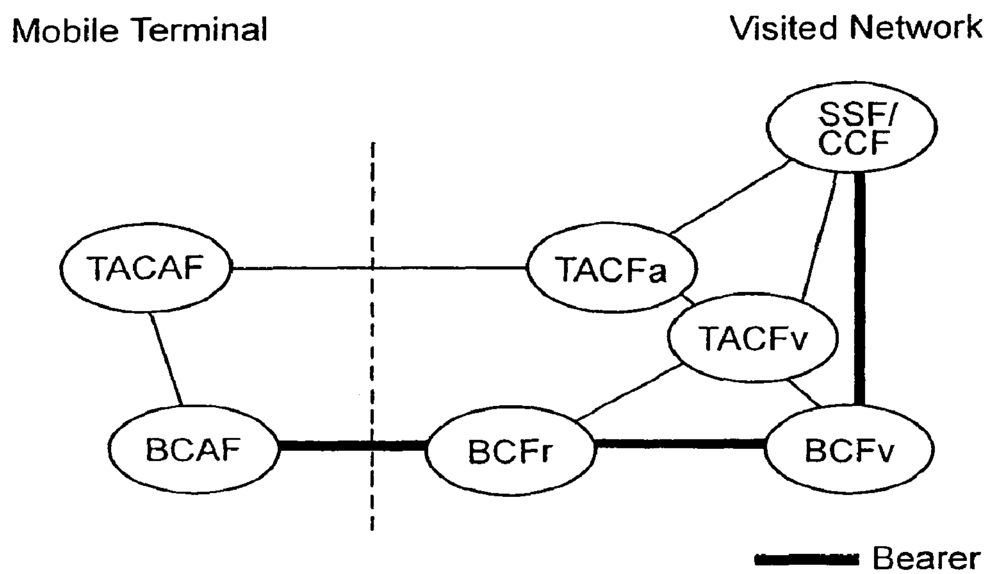
FIG. 29 is a diagram showing the functional model of a part of the invented system for describing a bearer setup for the radio resource selection.

FIG. 29 shows the functional model of a part of the invented system for describing the bearer setup for the radio resource selection.

b) Information Flows

Figure 30:
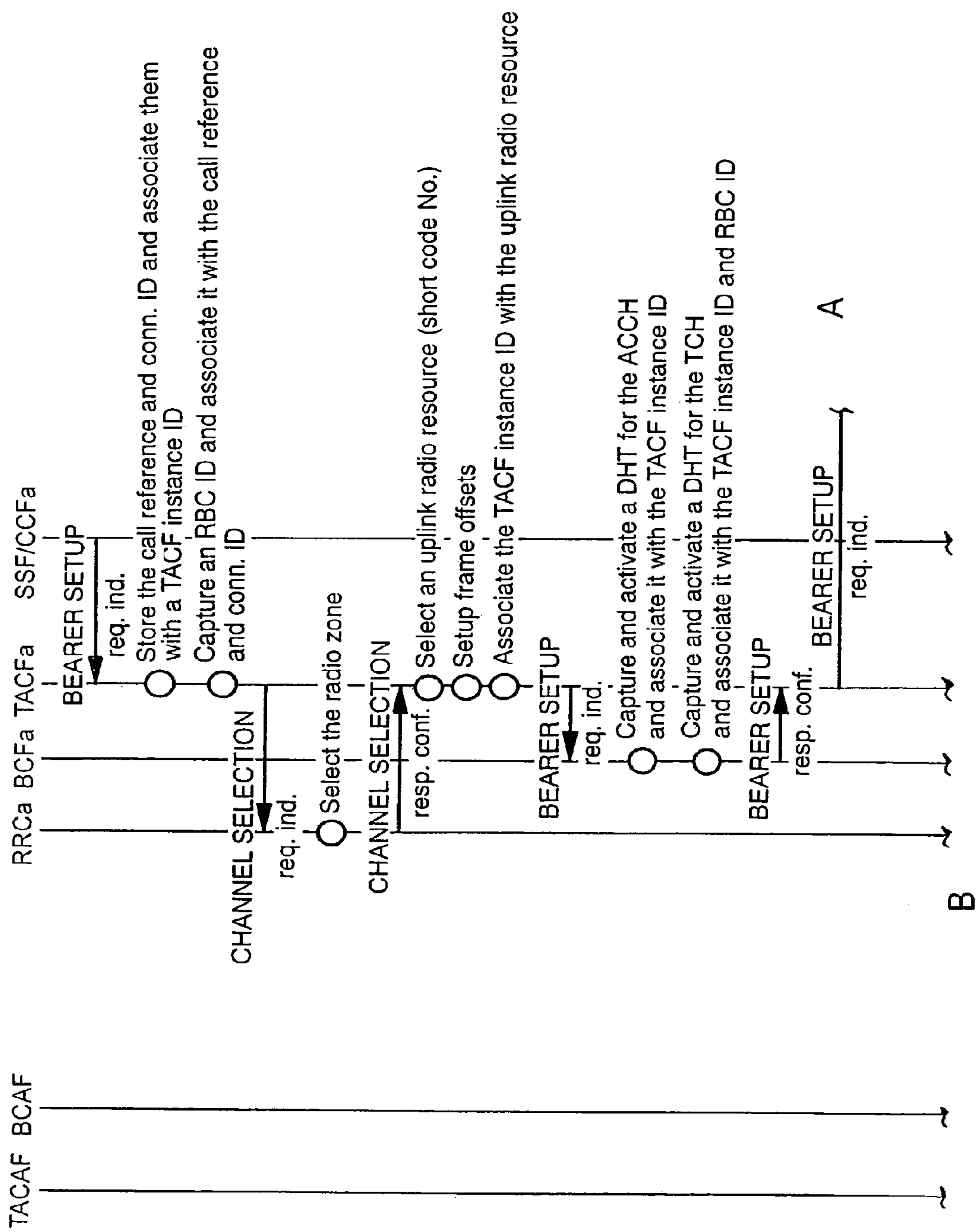
FIG. 30 is an information flow diagram of the bearer setup, executed in the communication control plane, for the radio resource selection.

FIG. 30 shows an information flow diagram of the bearer setup, executed in the communication control plane, for the radio resource selection.

2.4.3.2.2.3 Definitions of Information Flows and Information Elements

Information flows in FIG. 30 will be described below and information elements of the flows are represented in tables. The order of description is the same as the order of the flows in FIG. 30.

A BEARER SETUP request indication is used to request the establishment of the access bearer from the CCF to TACF. The detail is represented in FIG. 400. The information elements asterisked in FIG. 400 are contained in the bearer capability element in FIG. 286 sent from the CCAF.

A CHANNEL SELECTION request indication is used by the TACF to request to select and reserve radio resources which can support the required bearer capability. This interaction occurs when new radio resources are necessary for call setup and handover.

A CHANNEL SELECTION response confirmation is used to report the reserved radio resources to the TACF, which requested the reservation. The detail is represented in FIG. 401.

A BEARER SETUP request indication is sent from the TACF to BCF to request the establishment of the access bearer. The detail is represented in FIG. 402.

A BEARER SETUP response confirmation is sent to confirm the establishment of the access bearer and to indicate the bearer ID of the bearer between the BCF and BCF. The detail is represented in FIG. 403.

Another BEARER SETUP request indication is used to request the establishment of the access bearer from the TACFa to TACFv. The detail is represented in FIG. 404.

Another BEARER SETUP request indication is sent from the TACF to BCF to request the establishment of the access bearer. The detail is represented in FIG. 405.

Another BEARER SETUP response confirmation is sent from the BCF to TACF to request the establishment of the access bearer. The detail is represented in FIG. 406.

A BEARER-AND-RADIO-BEARER SETUP request indication is sent from the TACF to BCFr to request the establishment of the radio bearer and the bearer between the BCF and BCFr. The detail is represented in FIG. 407.

A RADIO BEARER SETUP PROCEEDING request indication is used by the BCFr to report that the instructed radio bearer setup is valid and the establishment of the radio bearer is proceeding. This information flow does not require any confirmation. The detail is represented in FIG. 408.

A RADIO BEARER SETUP REQUEST request indication is issued by the TACF, which controls a new access bearer, to the TACF, which has the signaling connection, to request to newly assign a radio bearer to the mobile terminal. The detail is represented in FIG. 409.

A RADIO BEARER SETUP request indication is sent from the TACF to TACAF to request the establishment of the radio bearer. The detail is represented in FIG. 410.

Another RADIO BEARER SETUP request indication is sent from the TACAF to BCAF to request the establishment of the radio bearer. The detail is represented in FIG. 411.

A RADIO BEARER SETUP response confirmation is sent from the BCAF to TACAF to confirm that the establishment of radio bearer has been completed. The detail is represented in FIG. 412.

A BEARER-AND-RADIO-BEARER SETUP response confirmation is sent to confirm that the establishment of radio bearer and bearer between the BCF and BCFr have been completed. The detail is represented in FIG. 413.

A BEARER SETUP response confirmation is used to confirm that the establishment of access bearer has been completed. The detail is represented in FIG. 414.

Another BEARER SETUP response confirmation is used to confirm that the establishment of access bearer has been completed. The detail is represented in FIG. 415.

Figure 31:
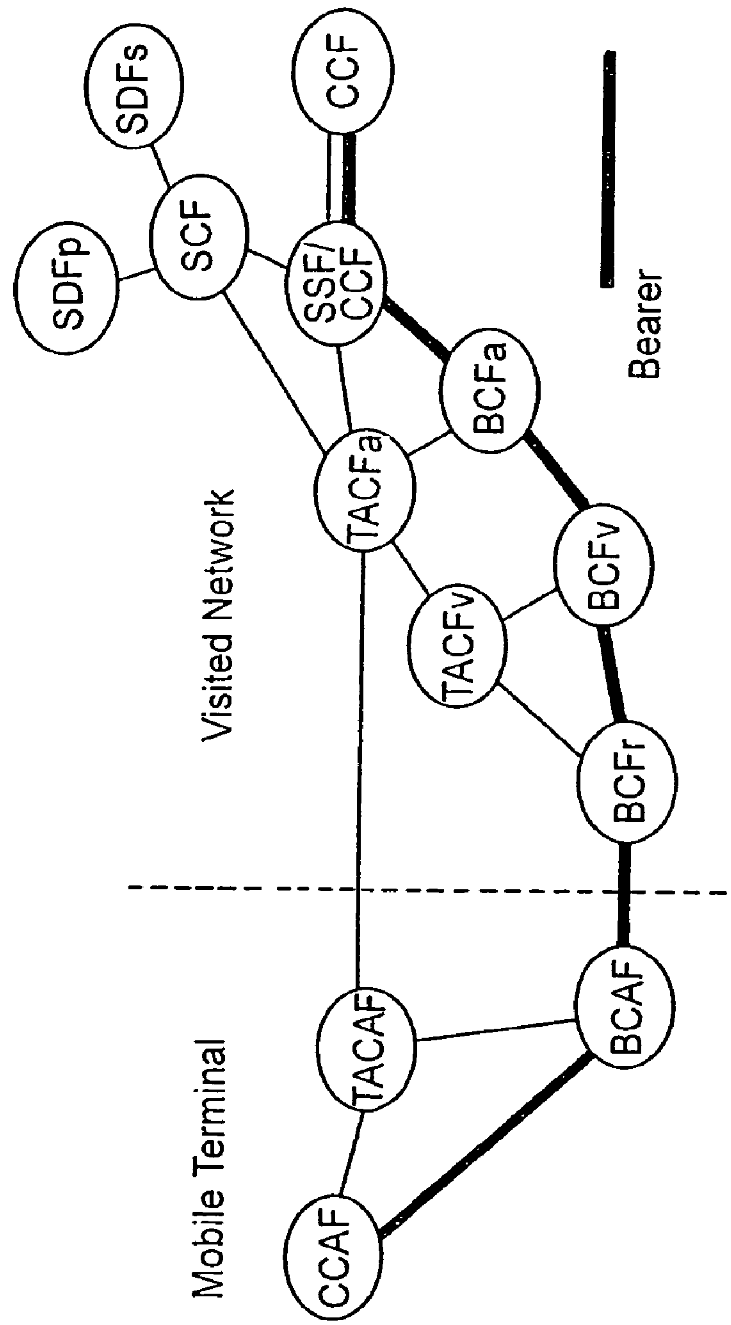
FIG. 31 is a diagram showing the functional model of a part of the invented system for describing a radio bearer release.

2.4.3.3 Radio Bearer Release 2.4.3.3.1 Radio Bearer Release for TACF Anchor Approach 2.4.3.3.1.1 Information Flow Diagram a) Functional Model FIG. 31 shows the functional model of a part of the invented system for describing the radio bearer release.

b) Information Flows

Figure 32:
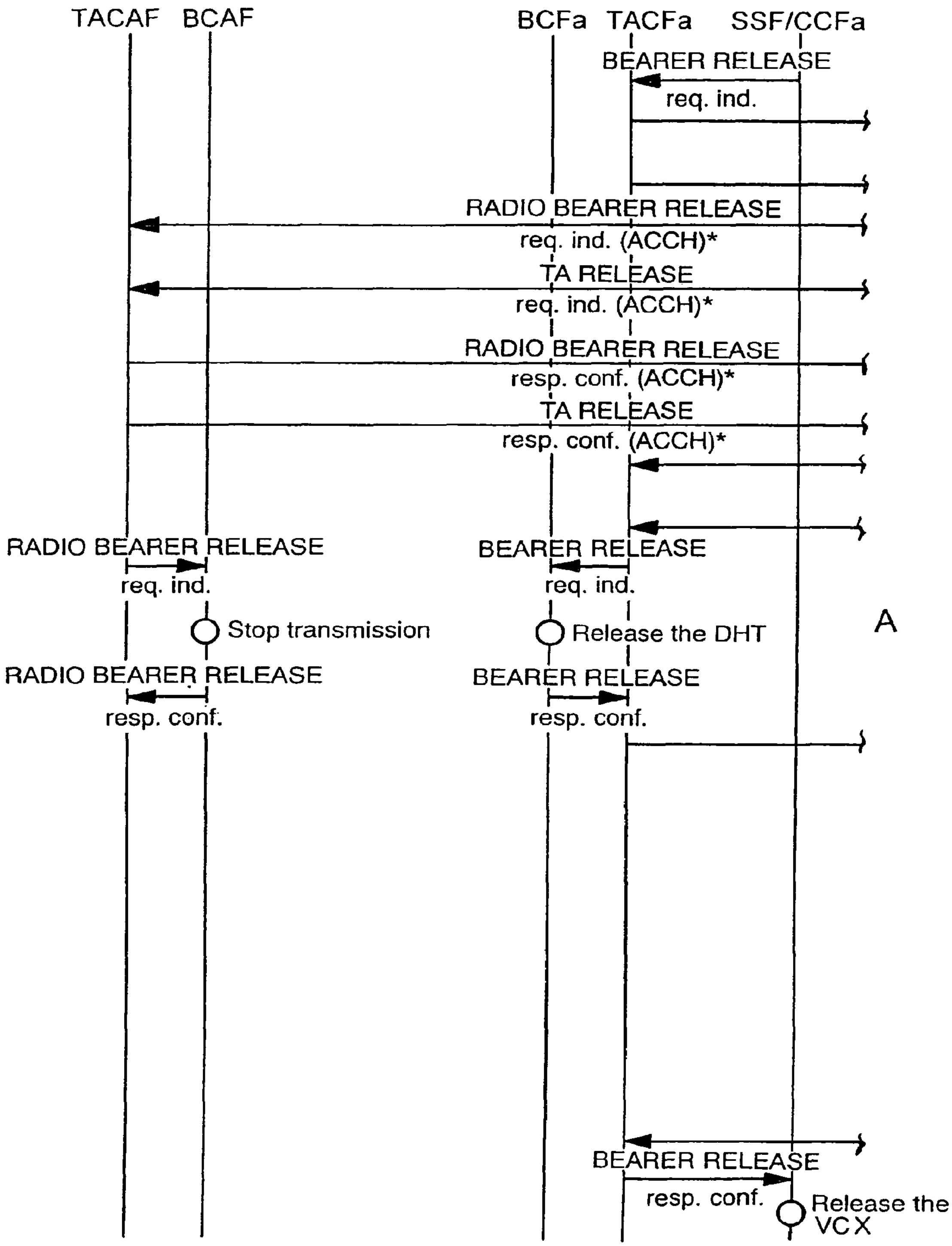
FIG. 32 is an information flow diagram of the radio bearer release.

FIG. 32 shows an information flow diagram of the radio bearer release.

2.4.3.3.1.2 Definitions of Information Flows and Information Elements

Information flows in FIG. 32 will be described below and information elements of the flows are represented in tables. The order of description is the same as the order of the flows in FIG. 32.

A BEARER RELEASE request indication is sent by the anchor CCF to notify the anchor TACF that the attempt or event of call release has been detected and that the bearer involved in the call is being released. The detail is represented in FIG. 416.

A RADIO BEARER RELEASE request indication is used by the TACFa to request to release the radio bearer. This is originated by the network. The detail is represented in FIG. 417.

A RADIO BEARER RELEASE response confirmation is a response confirmation of the RADIO BEARER RELEASE request indication. The detail is represented in FIG. 418.

A TA RELEASE request indication is issued by the TACFa to request the release of the terminal access. This information flow is issued only for the last call release.

A TA RELEASE response confirmation is a response confirmation of the TA RELEASE request indication.

A BEARER RELEASE request indication is issued by the TACF to BCF to release the radio bearer. The detail is represented in FIG. 419.

A BEARER RELEASE response confirmation is a response confirmation of the BEARER RELEASE request indication. The detail is represented in FIG. 420.

Another BEARER RELEASE request indication is sent by the TACFa to request the TACFv to release the bearer involved in the call is being released. The detail is represented in FIG. 421.

Another BEARER RELEASE request indication is issued by the TACF to BCF to release the radio bearer. The detail is represented in FIG. 422.

A BEARER RELEASE response confirmation is a response confirmation of the BEARER RELEASE request indication. The detail is represented in FIG. 423.

A BEARER-AND-RADIO-BEARER RELEASE request indication is issued by the TACF to release the bearer and radio bearer. The detail is represented in FIG. 424.

A BEARER-AND-RADIO-BEARER RELEASE response confirmation is used for a confirmation of the release of the bearer and radio bearer requested by the BEARER-AND-RADIO-BEARER RELEASE request indication. The detail is represented in FIG. 425.

Another BEARER RELEASE response confirmation is a confirmation of the BEARER RELEASE request indication. The detail is represented in FIG. 426.

Another BEARER RELEASE response confirmation is a response confirmation to inform the CCF that the previous request to release the radio bearer has been completed. The detail is represented in FIG. 427.

Another RADIO BEARER RELEASE request indication is issued by the TACAF to request the radio bearer release. The detail is represented in FIG. 428.

Another RADIO BEARER RELEASE request indication is used by the BCAF to confirm the radio bearer release requested by the RADIO BEARER RELEASE request indication. The detail is represented in FIG. 429.

2.4.3.4 SDCCH Release

Next, SDCCH release procedures will be described.

Figure 33:
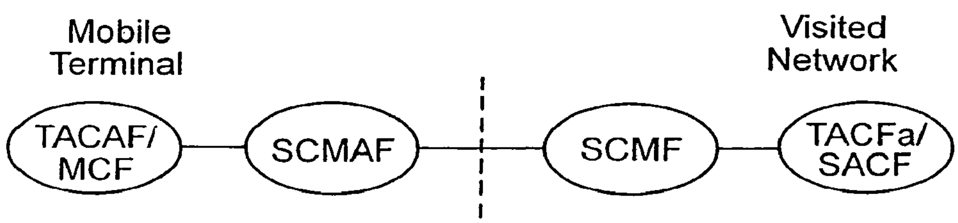
FIG. 33 is a diagram showing the functional model of a part of the invented system for describing an SDCCH release.

2.4.3.4.1 Common Procedure Modules Used 2.4.3.4.2 Information Flow Diagram a) Functional Model FIG. 33 shows the functional model of a part of the invented system for describing the SDCCH release.

b) INFORMATION FLOWS

Figure 34:
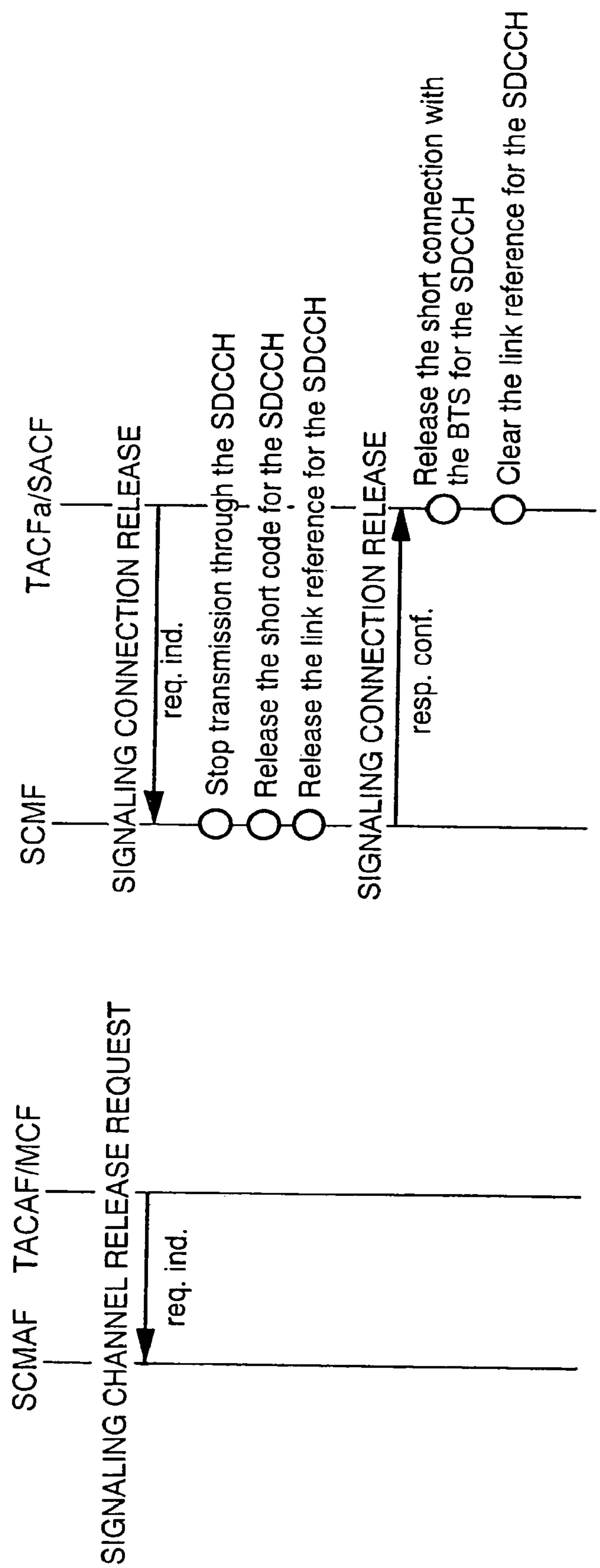
FIG. 34 is an information flow diagram of the SDCCH release.

FIG. 34 shows an information flow diagram of the SDCCH release.

2.4.3.4.3 Definitions of Information Flows and Information Elements

Information flows in FIG. 34 will be described below and information elements of the flows are represented in tables. The order of description is the same as the order of the flows in FIG. 34.

A SIGNALING CHANNEL RELEASE REQUEST request indication is used by the MCF and TACF to request the release of a signaling channel. The detail is represented in FIG. 430.

A SIGNALING CONNECTION RELEASE request indication is used by the TACF and SACF to request the release of the signaling channel (in both of the network and the radio resources). The detail is represented in FIG. 431.

A SIGNALING CONNECTION RELEASE response confirmation is used to report the release of the signaling channel. The detail is represented in FIG. 432.

2.4.3.5 Handover 2.4.3.5.0 Handover Process and Relevant Procedure Modules

Process 1: Handover Trigger

Detection of handover triggering.

Process 2: Handover Resource Reservation

Reservation of radio resources for handover.

Process 3: Handover Execution

Preparing at network side, if any.

Request the mobile terminal as indicated by trigger.

Process 4: Handover Completion

Release of unneeded radio bearer and resources.

Figure 36:
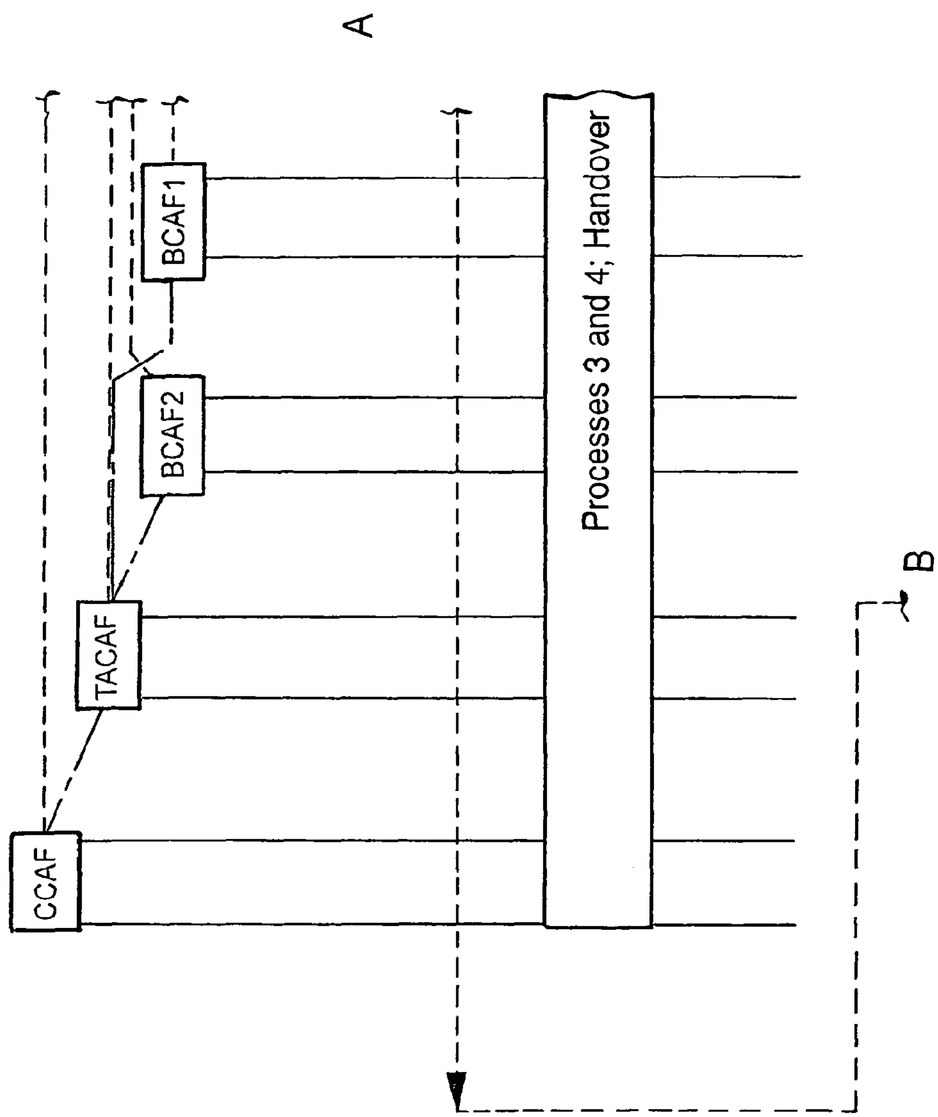
FIG. 36 is an information flow diagram showing processes 1 and 2 described above.

FIG. 35 shows a flow chart showing handover processes in general. FIG. 36 is an information flow diagram showing processes 1 and 2 described above.

Figure 38:
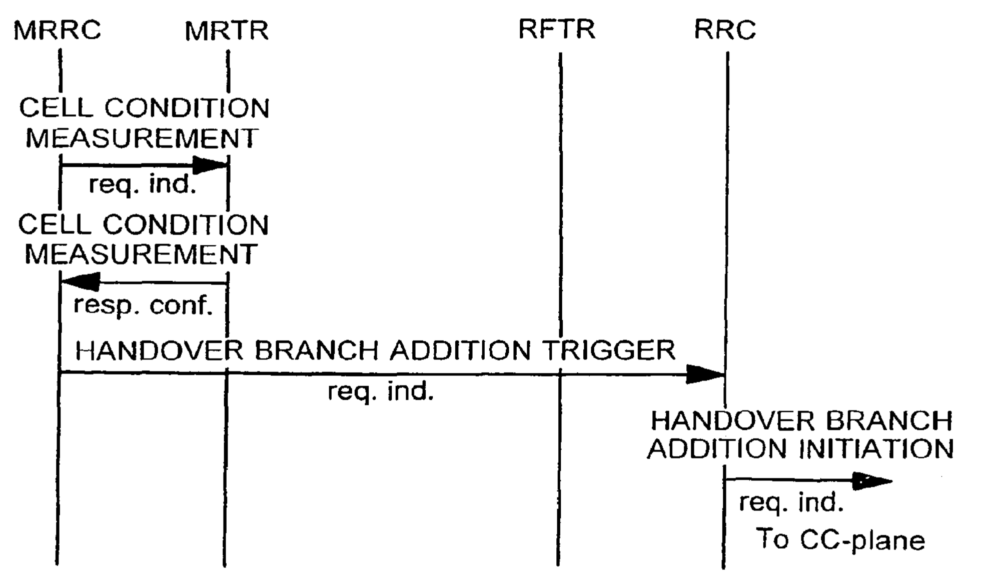
FIG. 38 is an information flow diagram representing a sequence in which information flows are transported for starting handover branch addition, the sequence corresponding to process 1 in FIG. 35.
Figure 39:
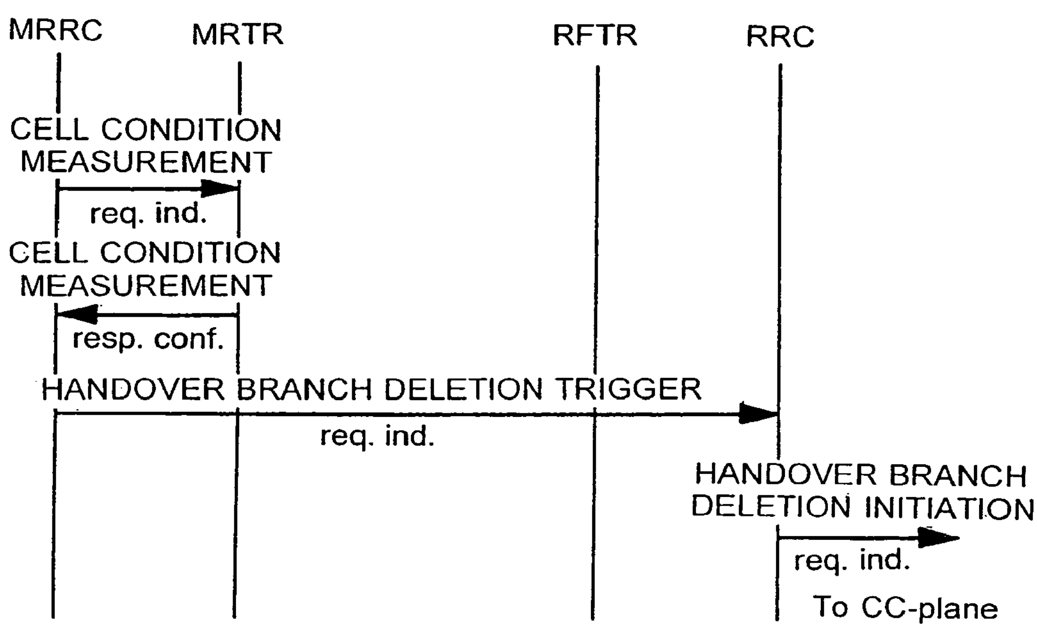
FIG. 39 is an information flow diagram representing a sequence in which information flows are transported for starting handover branch deletion, the sequence corresponding to process 1 in FIG. 35.

FIG. 37 is an information flow diagram representing a sequence in which information flows are transported for starting non-soft handover execution, the sequence corresponding to process 1 in FIG. 35. FIG. 38 is an information flow diagram representing a sequence in which information flows are transported for starting handover branch addition, the sequence corresponding to process 1 in FIG. 35. FIG. 39 is an information flow diagram representing a sequence in which information flows are transported for starting handover branch deletion, the sequence corresponding to process 1 in FIG. 35.

2.4.3.5.1 Inter-Sector Handover Branch Addition in Single Cell (Handover Controlled by Same BCFr)

Figure 40:
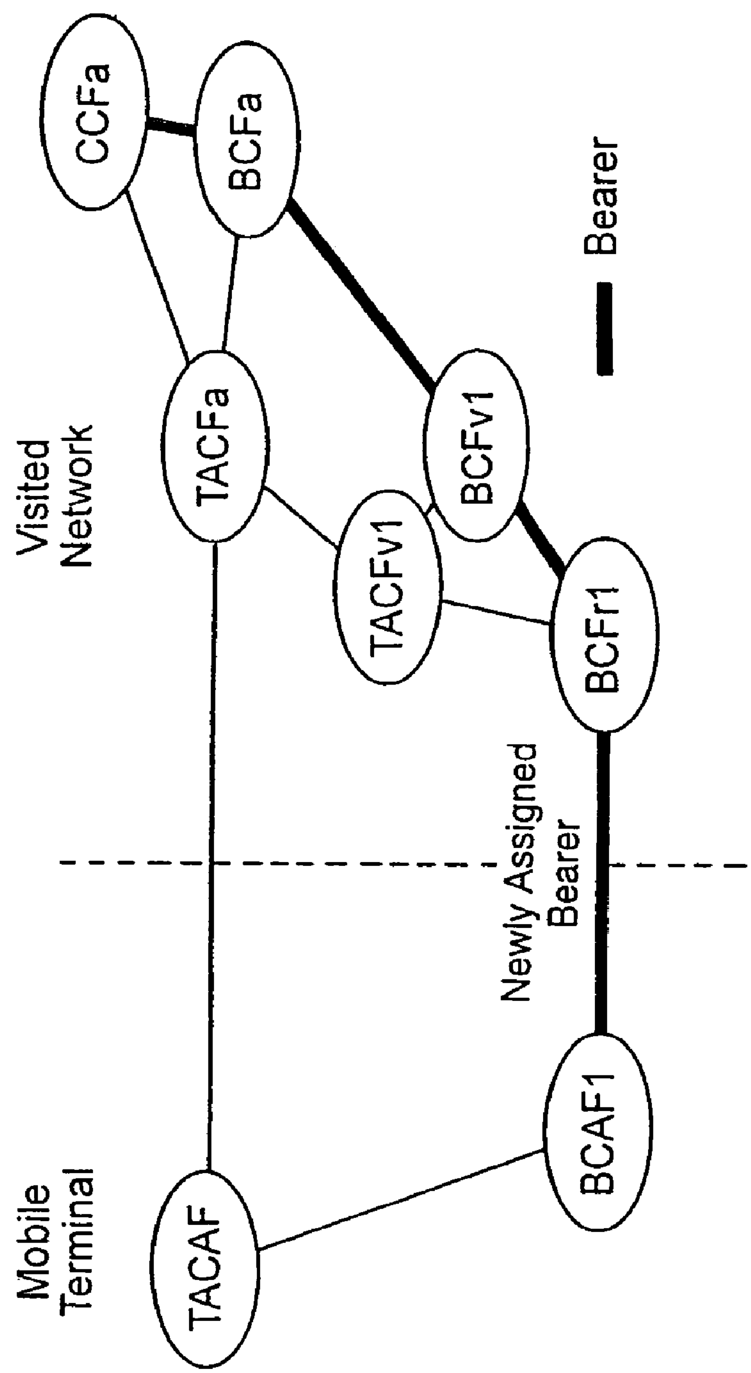
FIG. 40 is a diagram showing the functional model of a part of the invented system for describing an inter-sector handover branch addition in a single cell.

2.4.3.5.1.1 Common Procedure Modules 2.4.3.5.1.2 Information Flow Diagram a) Functional Model FIG. 40 shows the functional model of a part of the invented system for describing the inter-sector handover branch addition in a single cell.

b) Information Flows

Figure 41:
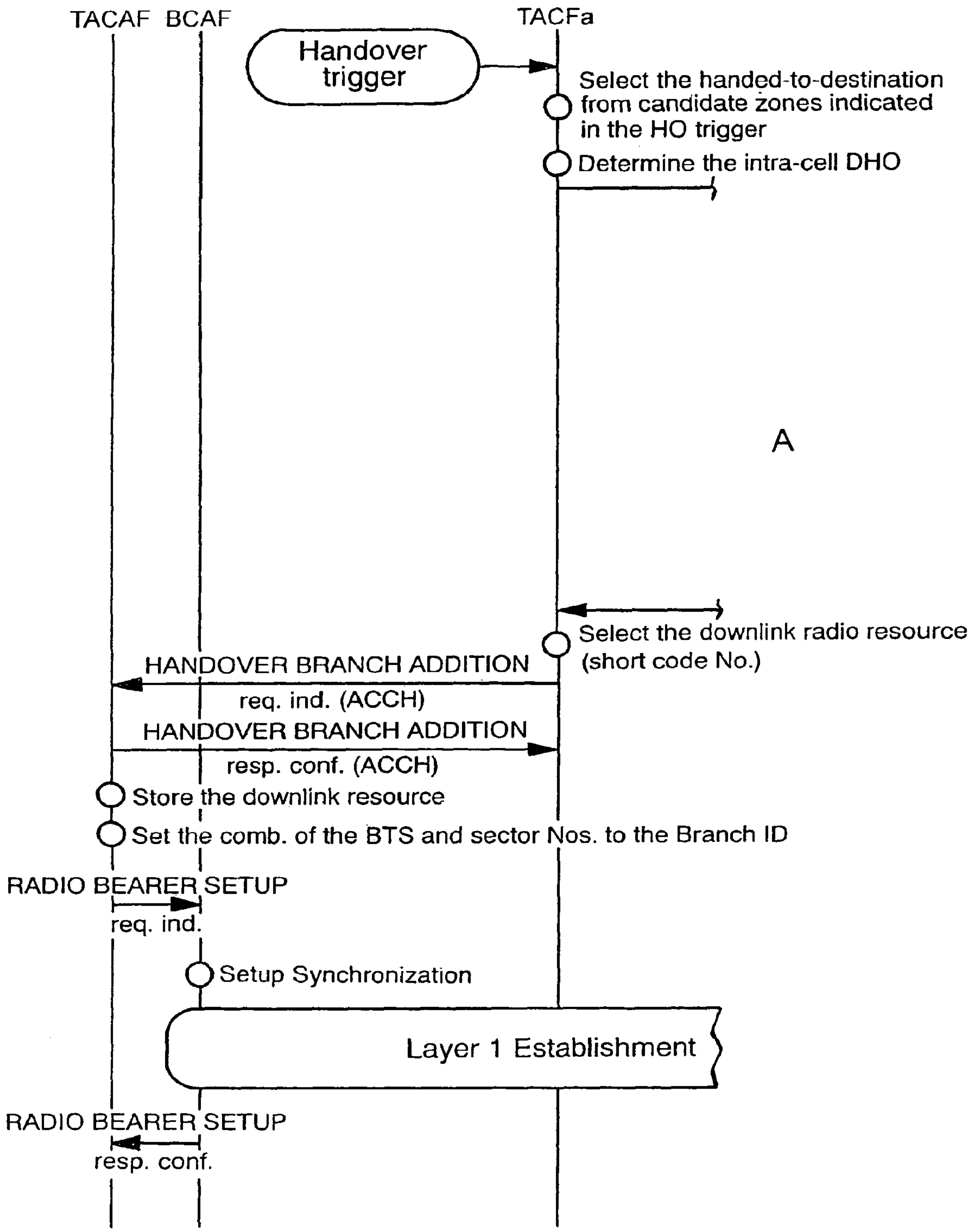
FIG. 41 is an information flow diagram of the inter-sector handover branch addition in a single cell, executed in the communication control plane.

FIG. 41 shows an information flow diagram of the inter-sector handover branch addition in a single cell, executed in the communication control plane.

2.4.3.5.1.3 Definitions of Information Flows and Information Elements

Information flows in FIG. 41 will be described below and information elements of the flows are represented in tables.

A BEARER SETUP request indication is sent from the TACFa to TACFv to request the setup of an access bearer. The detail is represented in FIG. 433. This information flow identities the bearer between the BCFa and BCFv.

An INTRA-BCFr HANDOVER BRANCH ADDITION request indication is sent from the TACF to BCFr to request to setup new physical radio channel(s). The detail is represented in FIG. 434.

An INTRA-BCFr HANDOVER BRANCH ADDITION response confirmation is a response to the INTRA-BCFr HANDOVER BRANCH ADDITION request indication and is sent from the BCFr to TACF to indicate the completion of setup of the physical radio channel(s). The detail is represented in FIG. 435.

A RADIO BEARER SETUP REQUEST request indication is sent from the visited TACF, which controls the newly assigned radio bearer, to TACFa to request to setup the radio bearer between the mobile terminal and BCFr controlled by the visited TACF. The detail is represented in FIG. 436.

A HANDOVER BRANCH ADDITION request indication is sent from the TACF to TACAF to notify of the intra-BCFr handover branch addition, and requests to add a new physical radio channel to an existing physical radio channel. The detail is represented in FIG. 437. The information element marked by *1 in FIG. 437 may be repeated a plurality of times, the number of repetition is the same as the number of the handover branches at the mobile terminal. The information elements marked by *2 in FIG. 437 may be repeated a plurality of times, the number of repetition is the same as the number of the calls related to the TACF.

A HANDOVER BRANCH ADDITION response confirmation is sent from the TACAF to TACF to notify of the reception of the HANDOVER BRANCH ADDITION request indication.

A RADIO BEARER SETUP request indication is sent from the TACAF to BCAF to request to setup a radio bearer. The detail is represented in FIG. 438.

A RADIO BEARER SETUP response confirmation is a response to the RADIO BEARER SETUP request indication sent from the BCAF to TACAF to indicate the completion of the radio bearer setup. The detail is represented in FIG. 439.

Figure 42:
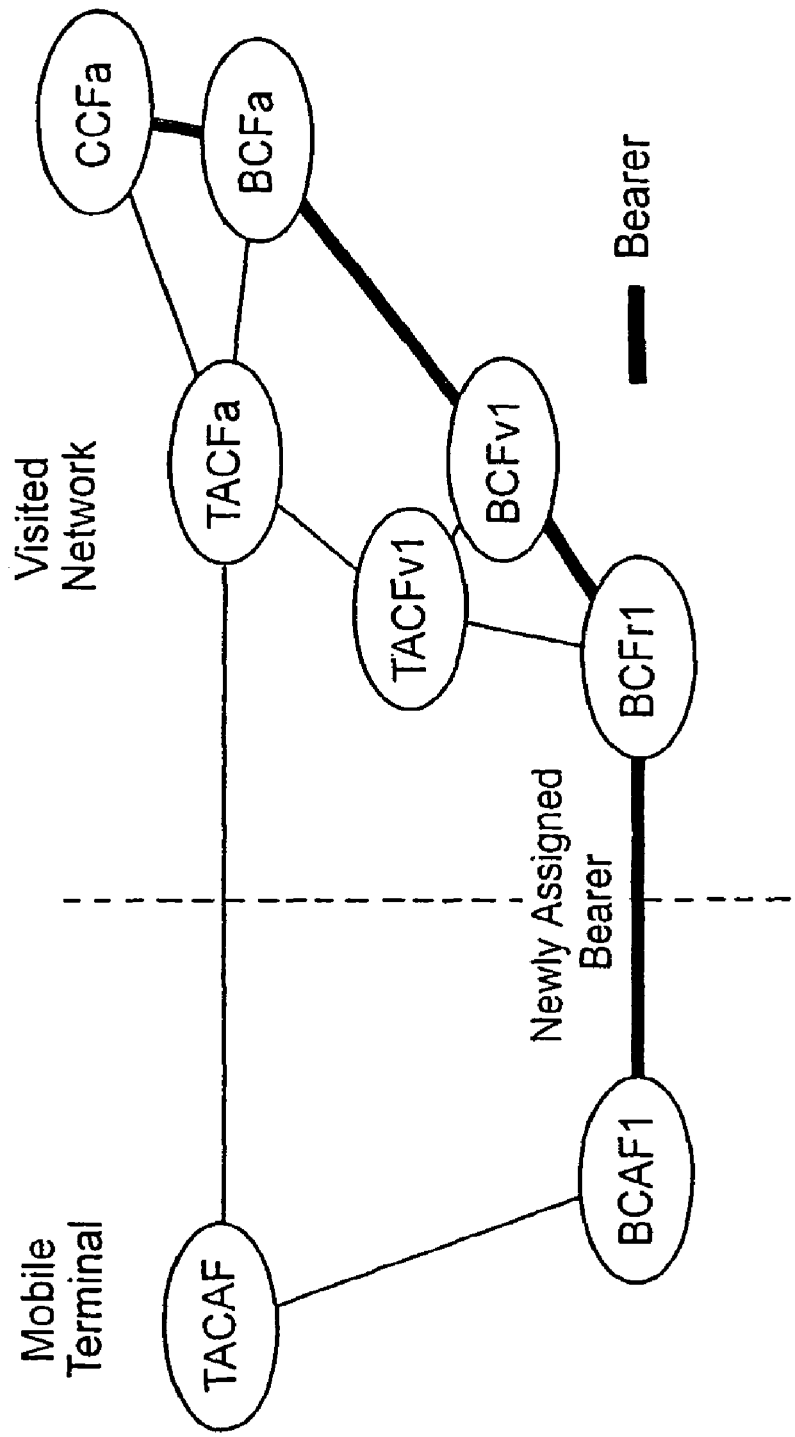
FIG. 42 is a diagram showing the functional model of a part of the invented system for describing an inter-cell handover branch addition.

2.4.3.5.2 Inter-Cell Handover Branch Addition 2.4.3.5.2.1 Common Procedure Modules 2.4.3.5.2.2 Information Flow Diagram a) Functional Model FIG. 42 shows the functional model of a part of the invented system for describing the inter-cell handover branch addition.

b) Information Flows

Figure 43:
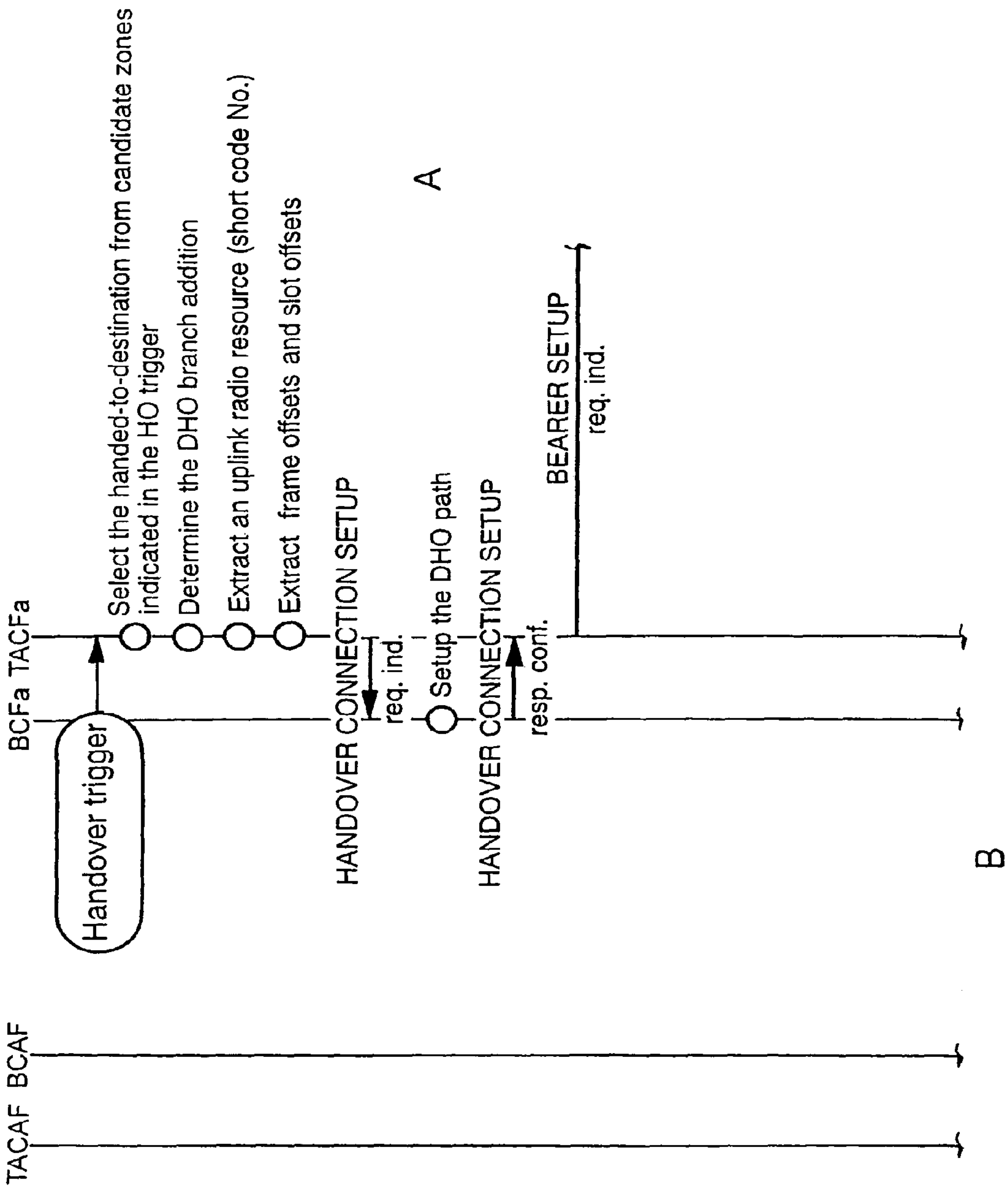
FIG. 43 is an information flow diagram of the inter-cell handover branch addition, executed in the communication control plane.

FIG. 43 shows an information flow diagram of the inter-cell handover branch addition, executed in the communication control plane.

2.4.3.5.2.3 Definitions of Information Flows and Information Elements

A HANDOVER CONNECTION SETUP request indication is sent from the TACFa to BCFa to notify of a handover initiation and to request to setup an access bearer. The detail is represented in FIG. 440. The information element marked by *1 in FIG. 440 identifies the bearer between the CCF and BCF.

A HANDOVER CONNECTION SETUP response confirmation is sent from the BCF to TACF to confirm the HANDOVER CONNECTION SETUP request indication. The detail is represented in FIG. 441. The asterisked information element in FIG. 441 identifies the bearer between the BCFa and BCFv.

A BEARER SETUP request indication is sent from the TACFa to TACFv to setup an access bearer. The detail is represented in FIG. 442. The asterisked information element in FIG. 442 identifies the bearer between the BCFa and BCFv.

Another BEARER SETUP request indication is sent from the TACF to BCF to request the bearer setup. The detail is represented in FIG. 443. The asterisked information element in FIG. 443 identifies the bearer between the BCF and CCF.

A BEARER SETUP response confirmation is sent from the BCF to TACF to confirm the BEARER SETUP request indication. The detail is represented in FIG. 444. The asterisked information element in FIG. 444 identifies the bearer between the BCF and BCFr.

A BEARER-AND-RADIO-BEARER SETUP request indication is sent from the TACF to BCFr to request to setup a bearer between the BCF and BCFr and a radio bearer. The detail is represented in FIG. 445.

A BEARER-AND-RADIO-BEARER SETUP response confirmation is a response to the BEARER-AND-RADIO-BEARER SETUP request indication and is sent from the BCFr to TACF to indicate the completion of setting up of the radio bearer and bearer between the BCFr and BCF. The detail is represented in FIG. 446.

A RADIO BEARER SETUP REQUEST request indication is sent from the visited TACF, which controls the newly assigned radio bearer, to the TACFa to request to setup the radio bearer between the mobile terminal and BCFr. The detail is represented in FIG. 447.

A HANDOVER BRANCH ADDITION request indication is sent from the TACF to TACAF to notify of the HANDOVER BRANCH ADDITION request indication and to request to setup a new physical radio channel(s) without releasing the existing physical radio channel(s). The detail is represented in FIG. 448. The information elements marked by *1 in FIG. 448 may be repeated a plurality of times, the number of repetition is the same as the number of the destination cells. The information elements marked by *2 in FIG. 448 may be repeated a plurality of times, the number of repetition is the same as the number of the calls related to the TACF.

A HANDOVER BRANCH ADDITION response confirmation is sent from the TACAF to TACF to notify of the reception of the HANDOVER BRANCH ADDITION INITIATION request indication.

A RADIO BEARER SETUP request indication is sent from the TACAF to BCAF to request to setup a radio bearer. The detail is represented in FIG. 449.

A RADIO BEARER SETUP response confirmation is a response to the RADIO BEARER SETUP request indication and is sent from the BCAF to TACAF to indicate the completion of the radio bearer setup. The detail is represented in FIG. 450.

A BEARER SETUP response confirmation is sent from the TACFa to TACFv to confirm the establishment of the access bearer. The detail is represented in FIG. 451.

2.4.3.5.3 Inter-Sector Handover Branch Deletion in Single Cell (Handover Controlled by Same BCFr)

Figure 44:
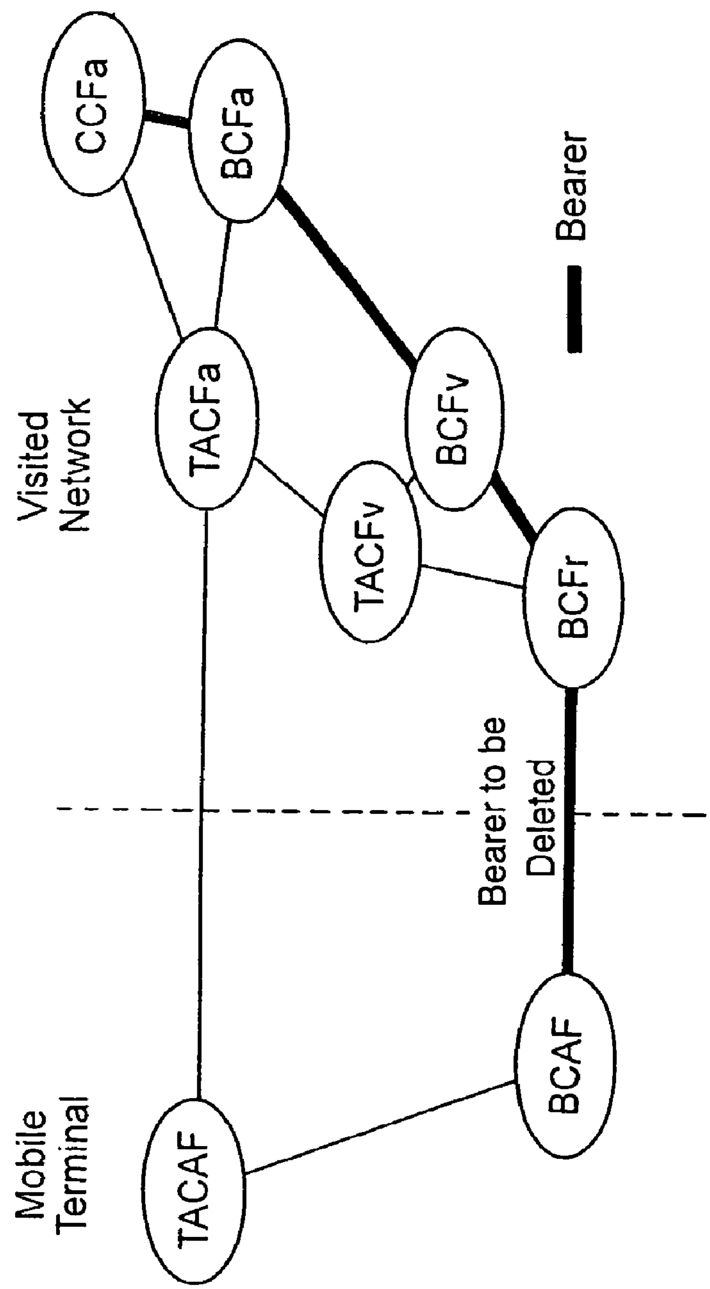
FIG. 44 is a diagram showing the functional model of a part of the invented system for describing an inter-sector handover branch deletion in a single cell.

2.4.3.5.3.1 Common Procedure Modules 2.4.3.5.3.2 Information Flow Diagram a) Functional Model FIG. 44 shows the functional model of a part of the invented system for describing the inter-sector handover branch deletion in a single cell.

b) Information Flows

Figure 45:
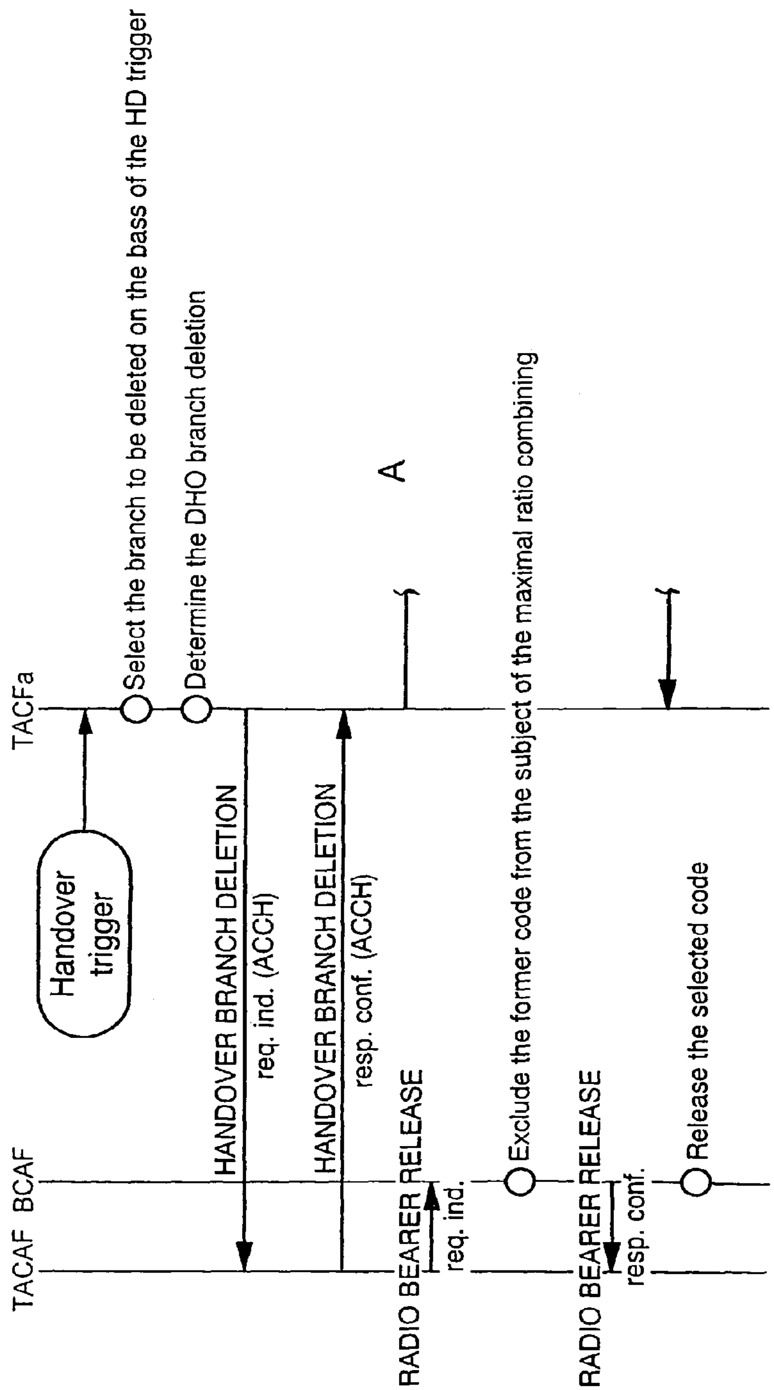
FIG. 45 is an information flow diagram of the inter-sector handover branch deletion in a single cell, executed in the communication control plane.

FIG. 45 shows an information flow diagram of the inter-sector handover branch deletion in a single cell, executed in the communication control plane.

2.4.3.5.3.3 Definitions of Information Flows and Information Elements

A HANDOVER BRANCH DELETION request indication is sent from the TACF to TACAF to request to release the physical radio channel(s). The detail is represented in FIG. 452. The information elements marked by *1 in FIG. 452 may be repeated a plurality of times, the number of repetition is the same as the number of the handover branches related to the terminal. The information elements marked by *2 in FIG. 452 may be repeated a plurality of times, the number of repetition is the same as the number of the calls related to the terminal. The Handover branch ID element in FIG. 452 is used to uniquely identify the route by which an access link is carried.

A HANDOVER BRANCH DELETION response confirmation is sent from the TACAF to TACF to confirm the HANDOVER BRANCH DELETION request indication. The detail is represented in FIG. 453.

A BEARER RELEASE request indication is sent from the TACFa to TACFv to release the access bearer. The detail is represented in FIG. 454.

An INTRA-BCFr HANDOVER BRANCH DELETION request indication is sent from the TACF to BCFr to request the release of the physical radio channel(s). The detail is represented in FIG. 455. The asterisked information element in FIG. 455 is included when this information flow is sent from BCFr to TACF.

An INTRA-BCFr HANDOVER BRANCH DELETION response confirmation is a response to the INTRA-BCFr HANDOVER BRANCH DELETION request indication and is sent from the BCFr to TACF to indicate the release of the physical radio channel(s). The detail is represented in FIG. 456.

A BEARER RELEASE response confirmation is sent from the TACFv to TACFa to confirm the BEARER RELEASE request indication. The detail is represented in FIG. 457.

Figure 46:
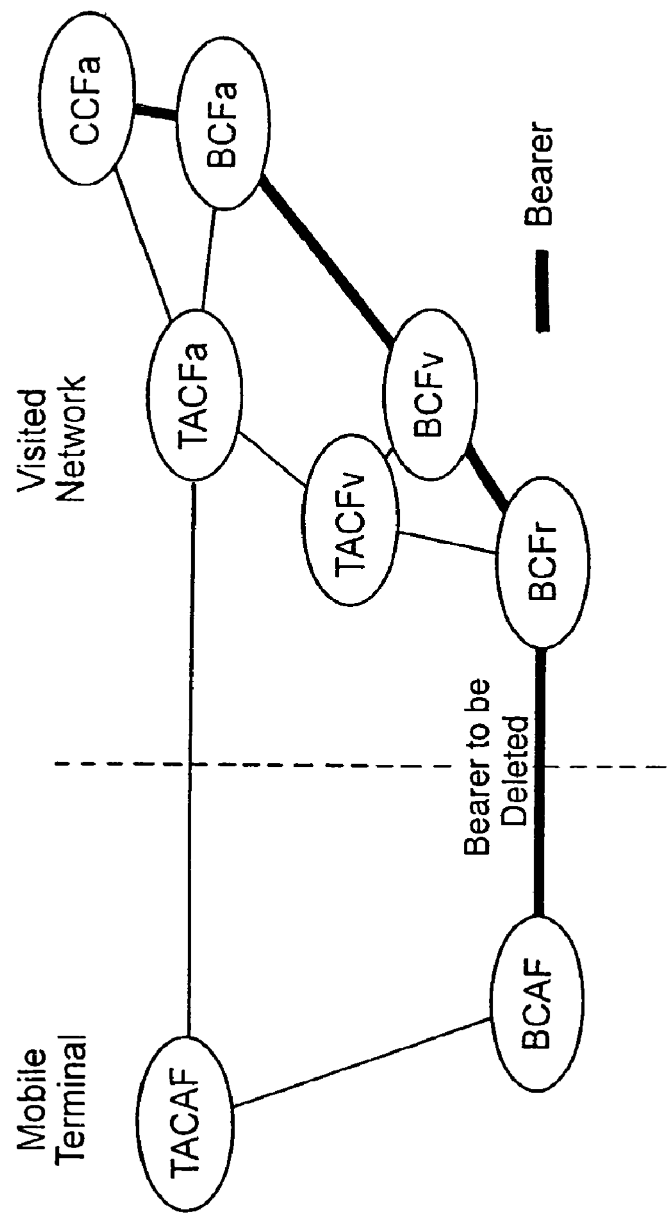
FIG. 46 is a diagram showing the functional model of a part of the invented system for describing an inter-cell handover branch deletion.

2.4.3.5.4 Inter-Cell Handover Branch Deletion at Locations Other than Boundary Between Cells 2.4.3.5.4.1 Common Procedure Modules 2.4.3.5.4.2 Information Flow Diagram a) Functional Model FIG. 46 shows the functional model of a part of the invented system for describing the inter-cell handover branch deletion.

b) Information Flows

Figure 47:
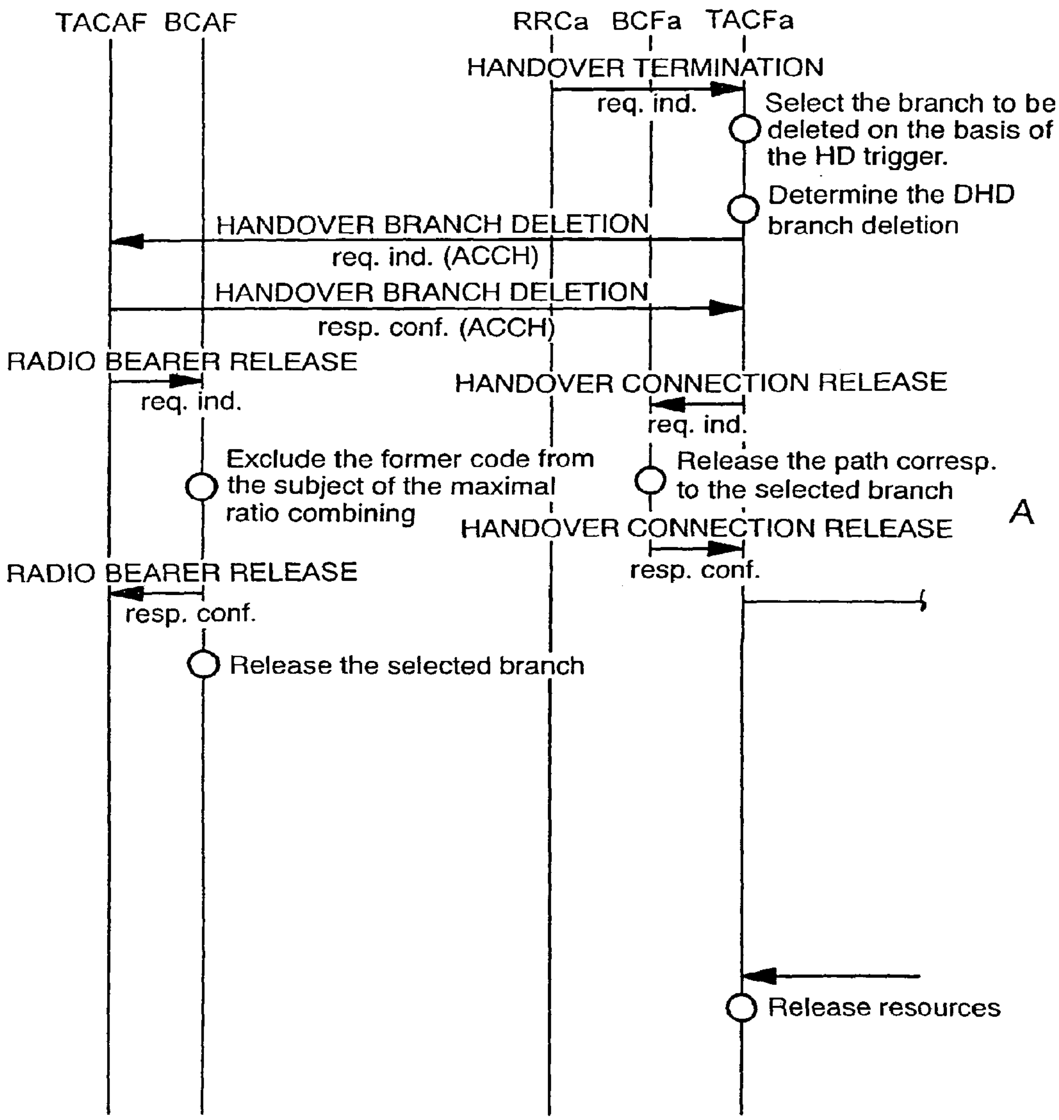
FIG. 47 is an information flow diagram of the inter-cell handover branch deletion, executed in the communication control plane.

FIG. 47 shows an information flow diagram of the inter-cell handover branch deletion, executed in the communication control plane.

2.4.3.5.4.3 Definitions of Information Flows and Information Elements

Information flows in FIG. 47 will be described below and information elements of the flows are represented in tables.

A HANDOVER BRANCH DELETION request indication is sent from the TACF to TACAF to request to release the physical radio channel(s). The detail is represented in FIG. 458. The information elements marked by *1 in FIG. 458 may be repeated a plurality of times, the number of repetition is the same as the number of the handover branches related to the terminal. The information element marked by *2 in FIG. 458 may be repeated a plurality of times, the number of repetition is the same as the number of the calls related to the terminal. The handover branch ID element in FIG. 458 is used to uniquely identify the route by which an access radio link is carried.

A HANDOVER BRANCH DELETION response confirmation is sent from the TACAF to TACF to confirm the HANDOVER BRANCH DELETION request indication. The detail is represented in FIG. 459.

A RADIO BEARER RELEASE request indication is sent from the TACAF to BCAF to request the radio bearer release. The detail is represented in FIG. 460.

A RADIO BEARER RELEASE response confirmation is a response to the RADIO BEARER RELEASE request indication and is sent from the BCFr to TACAF to indicate the completion of the radio bearer release. The detail is represented in FIG. 461.

A HANDOVER CONNECTION RELEASE request indication is sent from the TACF to BCF to release the indicated bearer in the diversity handover state. The detail is represented in FIG. 462.

A HANDOVER CONNECTION RELEASE response confirmation is sent from the BCF to TACF to confirm the HANDOVER CONNECTION RELEASE request indication. The detail is represented in FIG. 463.

A BEARER RELEASE request indication is sent from the TACFa to TACFv to release the access bearer. The detail is represented in FIG. 464.

Another BEARER RELEASE request indication is sent from the TACF to BCF to request the bearer release. The detail is represented in FIG. 465.

A BEARER RELEASE response confirmation is sent from the BCF to TACF to confirm the BEARER RELEASE request indication. The detail is represented in FIG. 466.

A BEARER-AND-RADIO-BEARER RELEASE request indication is sent from the TACF to BCFr to request the bearer between the BCF and BCFr and the radio bearer. The detail is represented in FIG. 467. The asterisked information element in FIG. 467 is included when this information flow is sent from BCFr to TACF.

A BEARER-AND-RADIO-BEARER RELEASE response confirmation is a response to the BEARER-AND-RADIO-BEARER RELEASE request indication and is sent from the BCFr to TACF to indicate the completion of the release of the bearer and the radio bearer. The detail is represented in FIG. 468.

A BEARER RELEASE response confirmation is sent from the TACFv to TACFa to confirm the BEARER RELEASE request indication. The detail is represented in FIG. 469.

Figure 48:
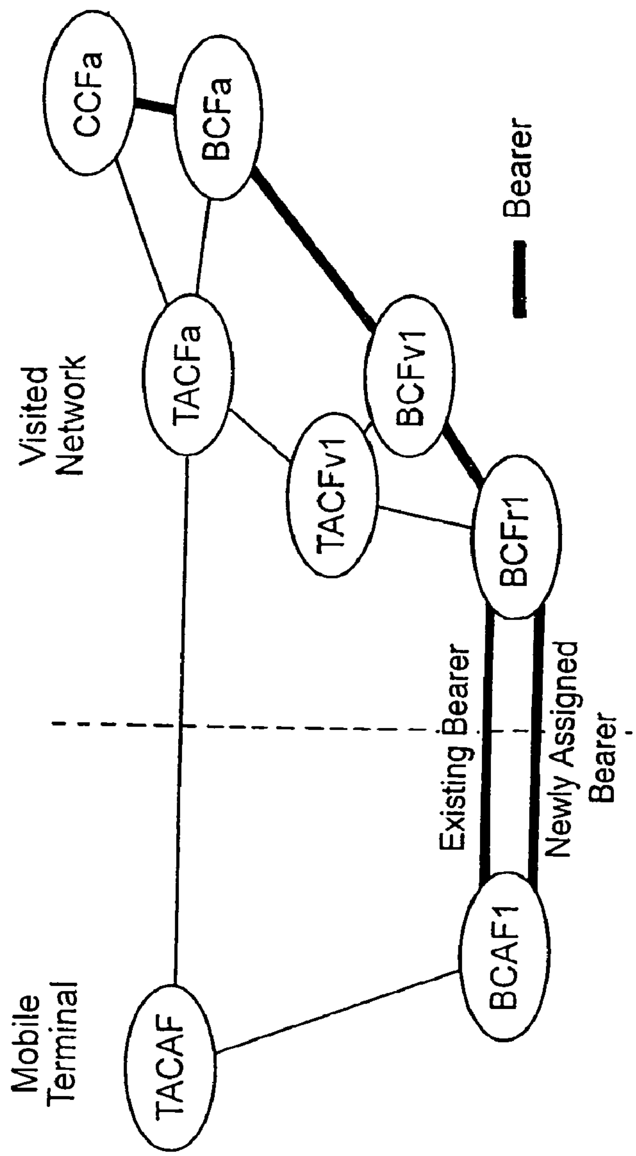
FIG. 48 is a diagram showing the functional model of a part of the invented system for describing an intra-cell branch replacement handover.

2.4.3.5.5 Intra-Cell Branch Replacement Handover 2.4.3.5.5.1 Common Procedure Modules Used 2.4.3.5.5.2 Information Flow Diagram a) Functional Model FIG. 48 shows the functional model of a part of the invented system for describing the intra-cell branch replacement handover.

b) Information Flows

FIG. 49 shows an information flow diagram of the intra-cell branch replacement handover executed in the communication control plane.

2.4.3.5.5.3 Definitions of Information Flows and Information Elements

Information flows in FIG. 49 will be described below and information elements of the flows are represented in tables.

A BEARER SETUP request indication is sent from the TACFa to TACFv to setup an access bearer. The detail is represented in FIG. 470. The asterisked information element in FIG. 470 identifies the bearer between the BCFa and BCFv.

An INTRA-BCFr HANDOVER BRANCH REPLACEMENT request indication is sent from the TACF to BCFr to request to set up new physical radio channel(s).

An INTRA-BCFr HANDOVER BRANCH REPLACEMENT response confirmation is a response to the INTRA-BCFr HANDOVER BRANCH REPLACEMENT request indication and is sent from the BCFr to TACF to indicate the completion of the setup of the physical radio channel(s). The detail is represented in FIG. 471. The information element marked by *1 in FIG. 471 may be repeated a plurality of times, the number of repetition is the same as the number of the radio links to be setup.

An INTRA-BCFr HANDOVER BRANCH REPLACEMENT PROCEEDING request indication is sent from the BCFr to TACF to indicate that the request of the handover branch replacement is accepted. The detail is represented in FIG. 472.

A RADIO BEARER SETUP REQUEST request indication is sent from the visited TACF, which controls the newly assigned radio bearer, to the anchor TACFa to request to setup the radio bearer between the mobile terminal and BCFr controlled by the visited TACF. The detail is represented in FIG. 473.

A NON-SOFT HANDOVER EXECUTION request indication is sent from the TACF to TACAF to notify of a non-soft handover execution request initiation and to request to replace an existing radio channel by the designated physical radio channel. The detail is represented in FIG. 474. The information element marked by *1 in FIG. 474 may be repeated a plurality of times, the number of repetition is the same as the number of the handover branches related to the terminal. The information element marked by *2 in FIG. 474 may be repeated a plurality of times, the number of repetition is the same as the number of the calls related to the TACF.

A RADIO BEARER SETUP request indication is sent from the TACAF to BCAF to request to setup a radio bearer. The detail is represented in FIG. 475.

A RADIO BEARER SETUP response confirmation is a response to the RADIO BEARER SETUP request indication and is sent from the BCAF to TACAF to indicate the completion of the radio bearer setup. The detail is represented in FIG. 476.

A RADIO BEARER RELEASE request indication is sent from the TACAF to BCAF to request the radio bearer release. The detail is represented in FIG. 477.

A RADIO BEARER RELEASE response confirmation is a response to the RADIO BEARER RELEASE request indication and is sent from the BCAF to TACAF to indicate the completion of the radio bearer release. The detail is represented in FIG. 478.

A BEARER SETUP response confirmation is sent from the TACFa to TACFv to confirm the establishment of the access bearer. The detail is represented in FIG. 479.

Figure 50:
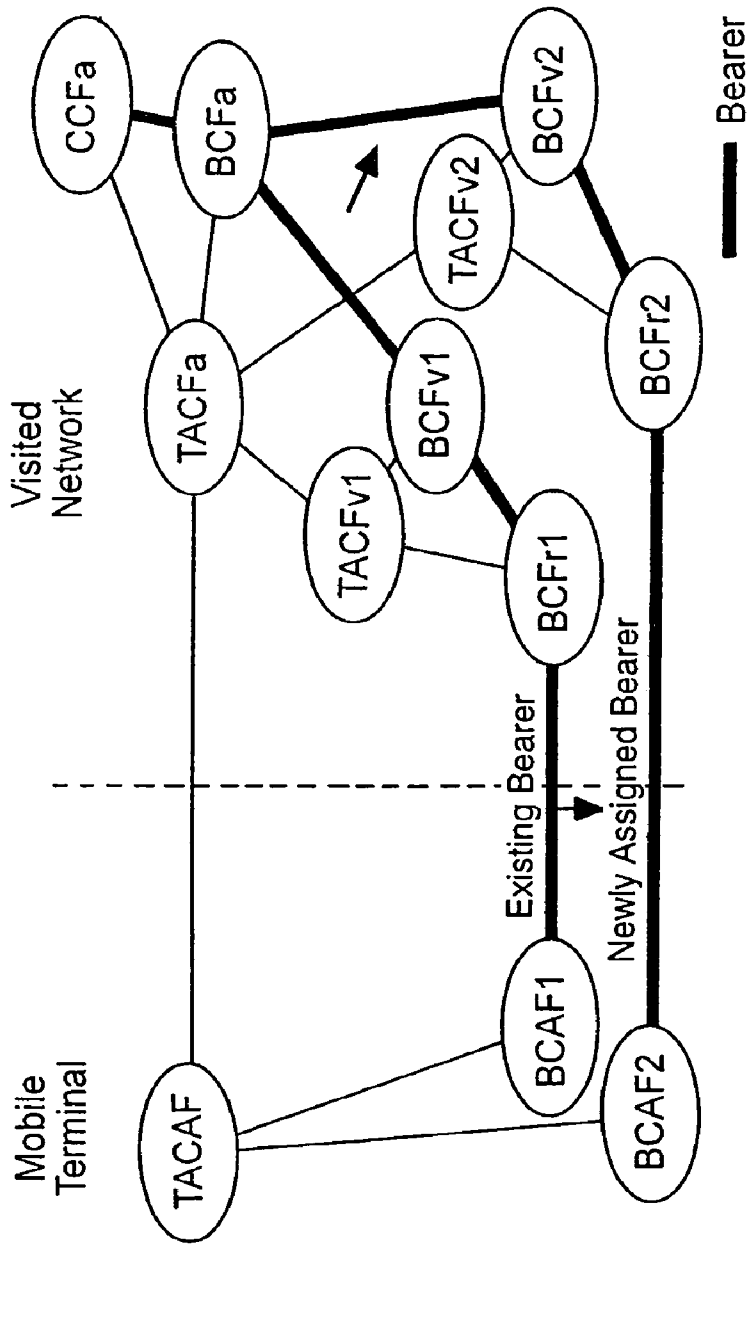
FIG. 50 is a diagram showing the functional model of a part of the invented system for describing an inter-cell branch replacement handover.

2.4.3.5.6 Inter-Cell Branch Replacement Handover 2.4.3.5.6.1 Common Procedure Modules Used 2.4.3.5.6.2 Information Flow Diagram a) Functional Model FIG. 50 shows the functional model of a part of the invented system for describing the inter-cell branch replacement handover.

b) Information Flows

Figure 51:
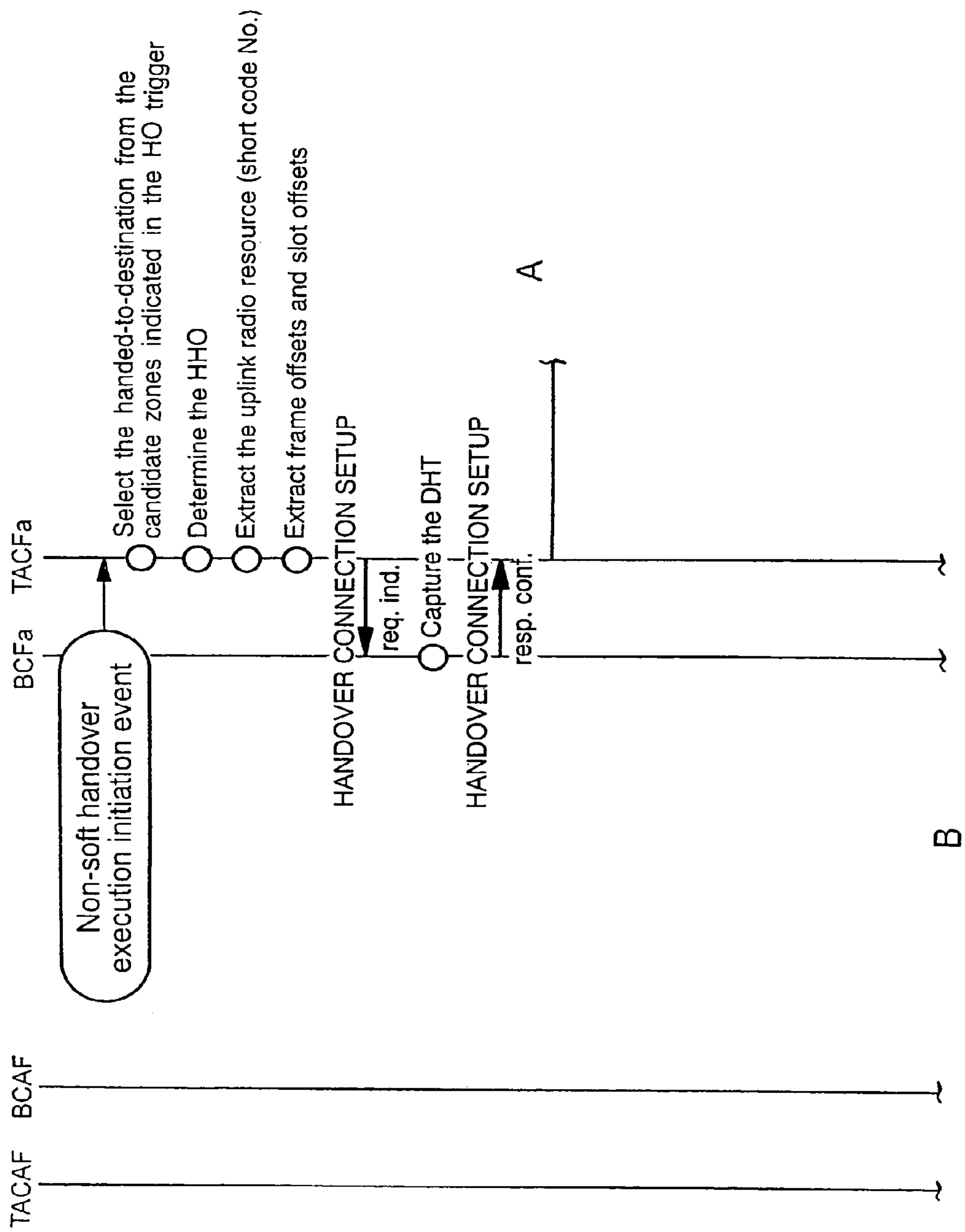
FIG. 51 is an information flow diagram of the inter-cell branch replacement handover executed in the communication control plane.

FIG. 51 shows an information flow diagram of the inter-cell branch replacement handover executed in the communication control plane.

2.4.3.5.6.3 Definitions of Information Flows and Associated Information Elements Information flows in FIG. 51 will be described below and information elements of the flows are represented in tables.

A HANDOVER CONNECTION SETUP request indication is sent from the TACFa to BCFa to notify of a handover initiation and to request to set up a new handover link. The detail is represented in FIG. 480. The information element marked by *1 in FIG. 480 is mandatory in case that the network has more than one handover mode.

A HANDOVER CONNECTION SETUP response confirmation is sent from the BCF to TACF to confirm the HANDOVER CONNECTION SETUP request indication. The detail is represented in FIG. 481. The asterisked information element in FIG. 481 identifies the bearer between the BCFa and BCFv.

A BEARER SETUP request indication is sent from the TACFa to TACFv to set up a new handover link. The detail is represented in FIG. 482. The asterisked information element in FIG. 482 identifies the link between the BCFa and BCFv. There may be another functional entity for transition of link between the BCFa and BCFv. The expression of inter-BCF link should be studied further.

Another BEARER SETUP request indication is sent from the TACF to BCF to request a new handover link in the network. The detail is represented in FIG. 483. The asterisked information element in FIG. 483 identifies the link between the BCFa and BCFv. There may be another functional entity for transition of link between the BCFa and BCFv. The expression of inter-BCF link should be studied further.

A BEARER SETUP response confirmation is sent from the BCF to TACF to confirm a BEARER SETUP request indication. The detail is represented in FIG. 484. The asterisked information element in FIG. 484 identifies the link between the BCF and BCFr. There may be another functional entity for transition of link between the BCFa and BCFv. The expression of inter-BCF link should be studied further.

A BEARER-AND-RADIO-BEARER SETUP request indication is sent from the TACF to BCFr to request to set up a bearer between the BCF and BCFr and a radio bearer. The detail is represented in FIG. 485.

A RADIO BEARER SETUP PROCEEDING request indication is sent from the BCFr to TACF to indicate that the request of the access radio link setup is accepted and that the BCFr starts setting up the access radio link. The detail is represented in FIG. 486.*i*

A RADIO BEARER SETUP REQUEST request indication is sent from the visited TACF, which controls the newly assigned access radio link, to TACFa to request to set up the access radio link between the mobile terminal and the BCFr controlled by the visited TACF. The detail is represented in FIG. 487.

A NON-SOFT HANDOVER EXECUTION request indication is sent from the TACF to TACAF to notify of a NON-SOFT HANDOVER EXECUTION request indication and to request to replace an existing physical radio channel by a designated physical radio channel. The detail is represented in FIG. 488. The information element marked by *1 in FIG. 488 may be repeated a plurality of times, the number of repetition is the same as the number of the handover branches related to the terminal. The information element marked by *2 in FIG. 488 may be repeated a plurality of times, the number of repetition is the same as the number of the access links related to the TACF.

A RADIO BEARER SETUP request indication is sent from the TACAF to BCAF to request to set up an access radio link. The detail is represented in FIG. 489.

A RADIO BEARER SETUP response confirmation is a response to the RADIO BEARER SETUP request indication and is sent from the BCAF to TACAF to indicate the completion of the setup of the access radio link. The detail is represented in FIG. 490.

A RADIO BEARER RELEASE request indication is sent from the TACAF to BCAF to request to release the access radio link. The detail is represented in FIG. 491.

A RADIO BEARER RELEASE response confirmation is a response to the RADIO BEARER RELEASE request indication and is sent from the BCAF to TACAF to request to release the access radio link. The detail is represented in FIG. 492.

A BEARER-AND-RADIO-BEARER SETUP response confirmation is a response to the BEARER-AND-RADIO-BEARER SETUP request indication and is sent from the BCFr to TACF to indicate the completion of the setup of the access radio link and the link between the BCFr and BCF. The detail is represented in FIG. 493.

A BEARER SETUP response confirmation is sent from the TACFa to TACFv to confirm the establishment of the handover link. The detail is represented in FIG. 494.

A HANDOVER CONNECTION RELEASE request indication is sent from the TACF to BCFa to request to remove the indicated handover link. The detail is represented in FIG. 495.

A HANDOVER CONNECTION RELEASE response confirmation is sent from the BCF to TACF to confirm the HANDOVER CONNECTION RELEASE request indication. The detail is represented in FIG. 496.

A BEARER RELEASE request indication is sent from the TACFa to TACFv to request to release the handover link in the network. The detail is represented in FIG. 497.

Another BEARER RELEASE request indication is sent from the TACF to BCF to request to release the handover link in the network. The detail is represented in FIG. 498.

A BEARER RELEASE response confirmation is sent from the BCF to TACF to confirm the BEARER RELEASE request indication. The detail is represented in FIG. 499.

A BEARER-AND-RADIO-BEARER RELEASE request indication is sent from the TACF to BCFr to request to release the access link or handover link between the BCF and BCFr and between BCAF and BCF. The detail is represented in FIG. 500. The asterisked information element in FIG. 500 us included when this information flow is sent from the BCFr and TACF.

A BEARER-AND-RADIO-BEARER RELEASE response confirmation is a response to the BEARER-AND-RADIO-BEARER RELEASE request indication and is sent from the BCFr to TACF to indicate the completion of the release of the access link or hand over link. The detail is represented in FIG. 501.

A BEARER RELEASE response confirmation is sent from the TACFv to TACFa to confirm the BEARER RELEASE request indication. The detail is represented in FIG. 502.

2.4.3.5.7 ACCH Replacement

FIG. 790 shows a part of the invented system for describing the ACCH replacement. In FIG. 790, a service control center 1, connected to a public network (not shown), controls or manages a plurality of (two in the example in FIG. 790) mobile service switching centers 2*a* and 2*b*. Each mobile service switching center 2*a* or 2*b* is connected with a base station controller 3*a* or 3*b* via a plurality of lines. The base station controller 3*a* controls base stations 6*a* to 6*d* while the base station controller 3*b* controls base stations 6*e* to 6*h*. The base stations 6*a* to 6*h* possess radio zones 5*a* to 5*h*, respectively, and one of the base stations is communicable with a mobile station 7 when the mobile station 7 visits the corresponding radio zone.

In relation to FIG. 790, assume that the mobile station 7 exists in the radio zone 5*b* and treats a plurality of calls using a plurality of traffic channels. At least one ACCH (associated control channel), utilizing the same radio resources as those for one of the traffic channels that are used for voice or data transportation, is necessary.

As already described at section 2.2.2, one ACCH (for example, ACCH1 in FIG. 790) is selected in accordance with the invented system, and is used for transporting all of the control signals involved in the mobile station 7. Therefore, it is possible to reduce the number of hardware elements for transporting control signals in comparison with the case that the calls respectively utilize multiple ACCHs. In addition, it is possible to exclude complicated control procedures, e.g., adjustment of the transportation order of control information in the plurality of ACCHs.

In such a communications system, however, when a set of wireless communication resources involved in the single ACCH is released due to the release of one of the traffic channels by the ending of the call, it is difficult to secure the ACCH to continue the other call. The same problem may occur when the transmission rate in the ACCH is altered. Consequently, when the radio resources involved in the employed ACCH are released due to a connection or call release, and when another call should be continued, ACCH replacement is necessary. ACCH replacement is also necessary when altering the transmission rate in the ACCH.

Accordingly, in addition to sharing the single ACCH by the multiple traffic channels for realizing the multiple calls simultaneously by the single mobile station 7, when the single set of wireless communication resources involved in the single ACCH is released, the ACCH is replaced by another ACCH.

2.4.3.5.7.2 Information Flow Diagram a) Functional Model

Figure 52:
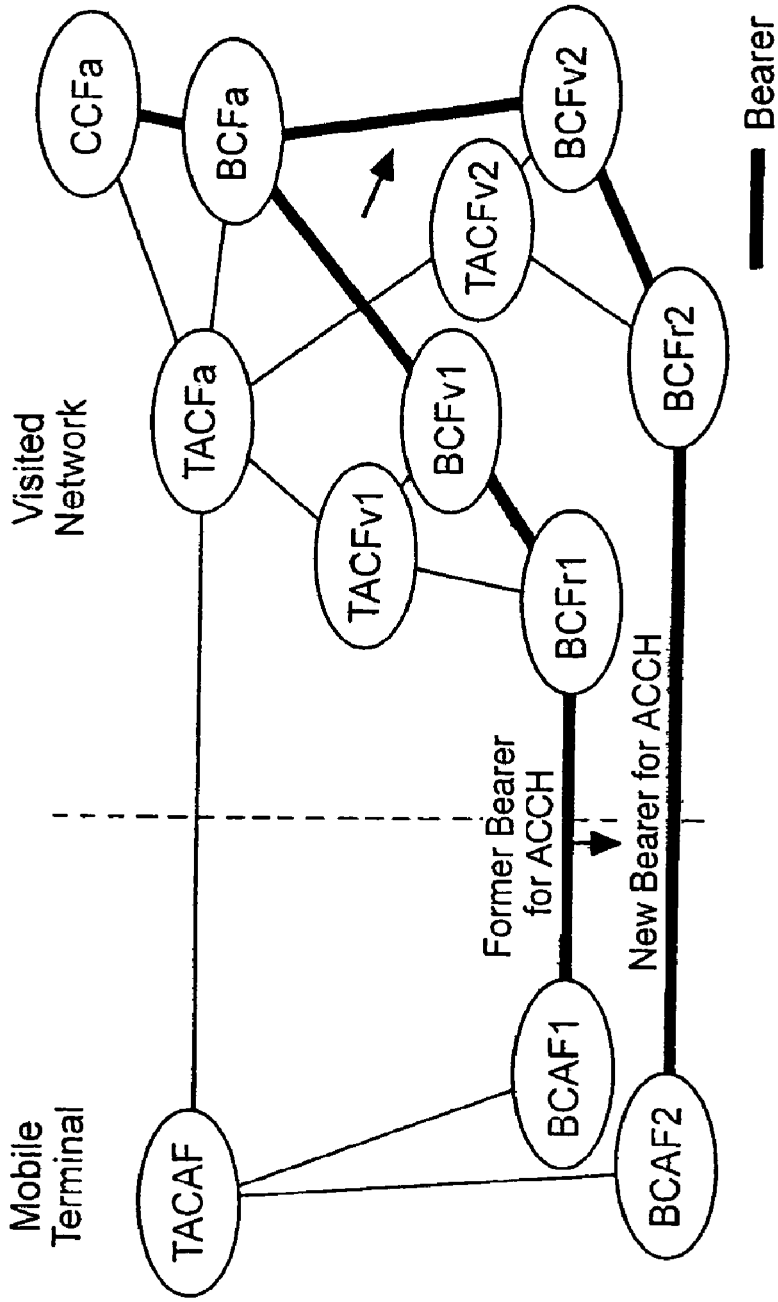
FIG. 52 is a diagram showing the functional model of a part of the invented system for describing an ACCH replacement procedure.

FIG. 52 shows functional entities involved in the ACCH replacement of the invented system. As shown in FIG. 52, these functional entities can be categorized into two types: the first type is functional entities arranged in the mobile terminal and the second type is functional entities arranged in the visited network including base stations. The arrangement and the function of the functional entities will be described next briefly.

The mobile communications control center 2*a* or 2*b* in FIG. 790 is provided with a CCFa (call control function) which is a functional entity for controlling call and connection. The index "a" of CCFa is the abbreviation of "anchor" that means it is fixed at the start of communication and does not move although the mobile terminal 6 moves.

The base station controller 3*a* or 3*b* is provided with a TACFa (terminal access control function) and a BCFa (bearer control function). The TACFa is a functional entity for controlling the access from the network to the mobile station 7 and for instructing the activation and release of the ACCH. The BCFa (bearer control function) is a functional entity for controlling the bearer. As similar to above, the index "a" is the abbreviation of "anchor."

The base station controller 3*a* or 3*b*, which may be the same as or other than that with the TACFa and BCFa, is provided with a TACFv and BCFv. The index "v" is the abbreviation of "visited."

Either of the base stations 4*a* and 4*b* that are controlled by the base station controller with the TACFv and BCFv is provided with a BCFr (bearer control function) associated with radio bearers. The BCFr controls radio bearers and activates and releases the ACCH.

The mobile terminal 6 is provided with a TACAF (terminal access control agent function) and BCAF (bearer control agent function). The TACAF is a functional entity for controlling the access to the mobile terminal and for instructing the release and establishment of the ACCH. The BCAF is a functional entity for controlling the radio bearer of the mobile terminal and for executing the release and establishment of the ACCH.

The index "1" or "2" is attached to the functional entities. The index "1" means that the corresponding entity is served for the first call while the index "2" means that the corresponding entity is served for the second call within a plurality of calls that the mobile terminal 7 is carrying out.

(b) Information Flows

FIGS. 53 and 54 cooperate to form an information flow diagram showing the ACCH replacement procedure executed in the communication control plane.

2.4.3.5.7.3 Definitions of Information Flows and Associated Information Elements Information flows and information elements in FIGS. 53 and 54 will be described below and the information elements are represented in tables. With reference to the sequential chart in FIGS. 53 and 54, the ACCH replacement procedure will be described.

The ACCH replacement procedure in FIGS. 53 and 54 is started under the condition described below.

(a) Previously, a mobile station has treated first and second calls using traffic channels TCH1 and TCH2.

(b) Then, the first call by the traffic channel TCH1 is now being finished.

(c) An associated control channel ACCH1 and the traffic channel TCH1 have used the same radio resources. The associated control channel ACCH1 has been commonly shared by the first and second calls for transporting control signals.

(d) The traffic channel TCH1 and the associated control channel ACCH1 will be released due to the finish of the first call. However, it is necessary to maintain the second call through the traffic channel TCH2, so that another associated control channel is necessary. Therefore, it is necessary to replace the associated control channel ACCH1 by another associated control channel ACCH2 that uses the same resources as of the traffic channel TCH2.

Consequently, the procedure illustrated in FIGS. 53 and 54 starts under the conduction, which is the same as that, under which the procedure illustrated in FIG. 262 starts. In other words, the chart shown in FIGS. 53 and 54 is essentially the same as the chart in FIG. 262, but represents in more detail the replacement procedure for replacing the radio bearer between the BCAF1 and BCFr1 for the first call with the radio bearer between the BCAF2 and BCFr2 for the second call.

When conditions (a) to (d) are satisfied, a trigger for replacing ACCH is generated as represented in FIG. 53. If the TACFa detects this trigger, the TACFa determines a connection to which the ACCH should be newly setup and then sends a HANDOVER CONNECTION SETUP request indication to the BAFa to notify of the handover initiation and to request to setup an ACCH. As represented in FIG. 503, the HANDOVER CONNECTION SETUP request indication contains a BCF-TACF relationship ID element, base station ID element, and handover mode element. In the tables, "M" is the abbreviation of mandatory while "O" is the abbreviation of optional. The handover mode element in FIG. 503 is mandatory when the network has more than one handover mode.

As shown in FIG. 53, the BCFa captures a DHT for the new ACCH, and then sends a HANDOVER CONNECTION SETUP response confirmation to the TACFa to confirm the HANDOVER CONNECTION SETUP request indication. The HANDOVER CONNECTION SETUP response confirmation contains a TACF-BCF relationship ID element and inter-BCF bearer ID element as represented in FIG. 504. The bearer ID element in FIG. 504 identifies the bearer between the BCFa and BCFv.

Then, a BEARER SETUP request indication is sent from the TACFa to TACFv2, which corresponds to the second call, to setup an access bearer for the ACCH. The BEARER SETUP request indication contains a TACF-BCF relationship ID element, inter-BCF bearer ID element, base station ID element, and user information rate element as represented in FIG. 505. The bearer ID element identifies the bearer between the BCFa and BCFv.

The TACFv2 sets up a to-BTS short cell connection for the ACCH and then selects a link reference which is the same as of that the traffic channel TCH2 for realizing the second call. Then, the TACFv2 sends another BEARER SETUP request indication to the BCFv2. The BEARER SETUP request indication requests to setup a bearer for ACCH2 which is associated with the traffic channel TCH2. The BEARER SETUP request indication contains a TACF-BCF relationship ID element, inter-BCF bearer ID element, user information rate element, and base station ID element, as represented in FIG. 506. The bearer ID element identifies the bearer between the BCFa and BCFv.

Once the BCFv2 receives the BEARER SETUP request indication, the BCFv2 setup the requested bearer and sends a BEARER SETUP response confirmation to the TACFv2 to confirm the BEARER SETUP request indication. The BEARER SETUP response confirmation contains a TACF-BCF relationship ID element and BCF-BCFr bearer ID element as represented in FIG. 507. The bearer ID identifies the bearer between the BCF and BCFr.

When the TACFv2 receives the BEARER SETUP response confirmation, TACFv2 sends a BEARER-AND-RADIO-BEARER SETUP request indication to the BCFr2 to request to setup a bearer between the BCF and BCFr and a radio bearer from the ACCH. The BEARER-AND-RADIO-BEARER SETUP request indication contains a TACF-BCFr relationship ID element and bearer ID element as represented in FIG. 508.

Upon the reception of the BEARER-AND-RADIO-BEARER SETUP request indication, the BCFr2 in light of the link reference specifies the traffic channel TCH2 and enables to start the transmission through ACCH2. Then, the BCFr2 sends a RADIO BEARER SETUP PROCEEDING request indication to the TACFv2 to indicate that the request of the radio bearer setup is accepted and that the BCFr starts setting up the radio bearer for ACCH2. The RADIO BEARER SETUP PROCEEDING request indication contains a TACF-BCFr relationship ID as represented in FIG. 509.

Upon the reception of the RADIO BEARER SETUP PROCEEDING request indication, a RADIO BEARER SETUP REQUEST request indication is sent from the visited TACFv2, which controls the newly assigned radio bearer, to the TACFa to request to setup a radio bearer for ACCH2 between the mobile terminal and the BCFr controlled by the visited TACF. The RADIO BEARER SETUP REQUEST request indication contains a TACF-TACF relationship ID as represented in FIG. 510.

Next, another RADIO BEARER SETUP request indication is sent from the TACFa to TACAF to notify of the ACCH replacement handover execution initiation and to request to replace the existing physical radio channel for the first call with the designated physical radio channel for the ACCH. The RADIO BEARER SETUP request indication contains a call ID as represented in FIG. 511.

Upon the reception of the RADIO BEARER SETUP request indication, the TACAF as shown in FIG. 54 sends BCAF2 another RADIO BEARER SETUP request indication. The RADIO BEARER SETUP request indication requests to setup a radio bearer for the ACCH (ACCH2) and contains a TACAF-BCAF relationship ID as represented in FIG. 512.

Upon the reception of the RADIO BEARER SETUP request indication, the BCAF2 establishes the new ACCH and then sends a RADIO BEARER SETUP response confirmation to the TACAF to indicate the completion of the radio bearer setup for the new ACCH. The RADIO BEARER SETUP response confirmation contains a TACAF-BCAF relationship ID as represented in FIG. 513.

Then, the TACAF sends another RADIO BEARER SETUP response confirmation to the TACFa to indicate the completion of setting up of the radio bearer for the ACCH (ACCH2). The RADIO BEARER SETUP response confirmation contains a TACAF-BCAF relationship ID in the same fashion as that represented in FIG. 513.

Next, the TACAF sends the BCAF1 a RADIO BEARER RELEASE request indication to request to release the previous radio bearer. The RADIO BEARER RELEASE request indication contains a TACAF-BCAF relationship ID as represented in FIG. 514.

Upon the reception of the RADIO BEARER RELEASE request indication, the BCAF1 releases the previously employed ACCH (ACCH1 associated with the traffic channel TCH1) and then replies a RADIO BEARER RELEASE response confirmation to the TACAF to indicate the completion of the radio bearer release. The RADIO BEARER RELEASE response confirmation contains a TACAF-BCAF relationship ID as represented in FIG. 515.

On the other hand, when receiving the RADIO BEARER SETUP response confirmation, the TACFa sends the BCFa a HANDOVER CONNECTION RELEASE request indication to request to remove the previous bearer in the soft handover state. The HANDOVER CONNECTION RELEASE request indication contains a TACF-BCF relationship ID element and released bearer ID element as represented in FIG. 516.

Upon the reception of the HANDOVER CONNECTION RELEASE request indication, the BCFa releases the previous DHT and sends a HANDOVER CONNECTION RELEASE response confirmation to the TACFa to confirm the HANDOVER CONNECTION RELEASE request indication. The HANDOVER CONNECTION RELEASE response confirmation contains a TACF-BCF relationship ID as represented in FIG. 517.

Next, the TACFa sends the TACFv1 a BEARER RELEASE request indication to request to release the access bearer. The BEARER RELEASE request indication contains a TACF-TACF relationship ID as represented in FIG. 518.

Upon the reception of the BEARER RELEASE request indication, the TACFv1 sends the BCFv1 another BEARER RELEASE request indication to request to release the bearer. The BEARER RELEASE request indication contains a TACF-BCF relationship ID as represented in FIG. 519.

Upon the reception of the BEARER RELEASE request indication, the BCFv1 sends the TACFv1 another BEARER RELEASE request indication to confirm the BEARER RELEASE request indication, and then release the previous resources. The BEARER RELEASE response confirmation contains a TACF-BCF relationship ID element as represented in FIG. 520.

Upon the reception of the BEARER RELEASE response confirmation, the TACFv1 sends the BCFr1 a BEARER-AND-RADIO-BEARER RELEASE request indication to request to release the bearer between the BCF and BCFr and the radio bearer. The BEARER-AND-RADIO-BEARER RELEASE request indication contains a TACF-BCFr relationship ID element and a cause element as represented in FIG. 521. The cause element is however included when this information element is sent from the BCFr to TACF.

On the other hand, when receiving the BEARER-AND-RADIO-BEARER RELEASE request indication, the BCFr1 stops the transmission. Then, the BCFr1 sends the TACFv1 a BEARER-AND-RADIO-BEARER RELEASE response confirmation and then releases the previous resources. The BEARER-AND-RADIO-BEARER RELEASE response confirmation is a response to the BEARER-AND-RADIO-BEARER request indication and indicates the completion of the release of the bearer and radio bearer. The BEARER-AND-RADIO-BEARER RELEASE response confirmation contains a TACF-BCFr relationship ID as represented in FIG. 522.

Upon the reception of the BEARER-AND-RADIO-BEARER RELEASE response confirmation, the TACFv1 sends the TACFa a BEARER RELEASE response confirmation to confirm the BEARER RELEASE request indication. The BEARER RELEASE response confirmation contains a TACF-TACF relationship ID as represented in FIG. 523.

In the above description of the ACCH replacement procedure, it is omitted to describe the procedure when the mobile station carries out the diversity handover for simplifying the description. If the mobile station 7 (refer to FIG. 790) carries out the diversity handover, the above-mentioned functional entities (TACFv1, BCFv1, TACFv2, BCFv2, BCFr1, BCFr2) are respectively provided with the base station controllers or the base stations, to which branches are established, and are controlled by the TACFa in the same manner as represented in FIGS. 53 and 54. Accordingly, the ACCH replacement may be executed even at the diversity handover status. In this case, information elements are simultaneously transported between the TACFa of all of the base station controllers and the TACAFv of the mobile terminal.

In the ACCH replacement procedure, a wired access link is newly established between a base station controller at which the TACFa is disposed and a base station, and then the radio access link between the mobile terminal and the network is replaced. Accordingly, the ACCH replacement is accomplished.

However, in an alteration, it is possible to replace the ACCH without the new establishment of the wired access link. This alteration will be described with reference to FIG. 791.

As represented in FIG. 791, a trigger for replacing ACCH is generated. If the TACFa detects this trigger, the TACFa determines a connection to which the ACCH should be newly setup; and then sends an ACCH REPLACEMENT SETUP request indication to the TACFv2 where the new ACCH should be setup. Upon the reception of the reception, the TACFv2 further sends an ACCH REPLACEMENT SETUP request indication to the BCFr2. As a result, the BCFr2 sets up the new ACCH and starts transmission through the ACCH. Then, the BCFr2 replies a notification of the completion of the ACCH setup to the TACFv2. Upon the reception of the reception of the notification, the TACFv2 sends another notification of the completion of the ACCH setup to the TACFa. The TACFa sends a RADIO ACCESS LINK SETUP request indication as similar to the foregoing procedure represented in FIGS. 53 and 54. As a result, the BCAF2 sets up the new ACCH while the BCAF1 releases the existent ACCH. In addition, the TACAF sends the TACFa a RADIO ACCESS LINK SET UP response confirmation.

Upon the reception of the RADIO ACCESS LINK SETUP response confirmation, the TACFa sends the TACFv1 an ACCH RELEASE request indication. Then, the TACFv1 further sends the ACCH RELEASE request indication to the BCFr1. As a result, the BCFr1 stops transmission through the existent ACCH, releases the existent ACCH and sends back the TACFv1 an ACCH RELEASE response confirmation. Then, the TACFv1 notifies the TACFa of the completion of the release of the existent ACCH.

In this procedure, since the ACCH replacement is accomplished by the functional entities illustrated in FIG. 791, it is not carried out to newly set up a radio access link in the network.

Figure 55:
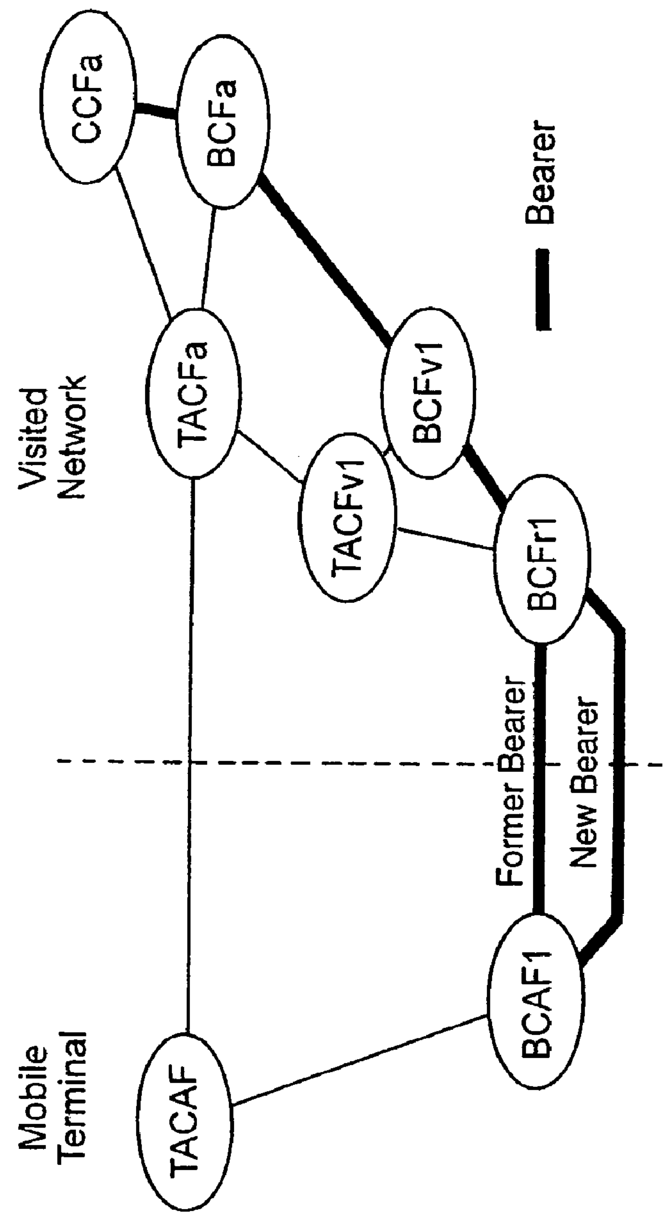
FIG. 55 is a diagram showing the functional model of a part of the invented system for describing a code replacement.

2.4.3.5.8 Code Replacement 2.4.3.5.8.2 Information Flow Diagram a) Functional Model FIG. 55 shows the functional model of a part of the invented system for describing a code replacement.

b) Information Flows

Figure 56:
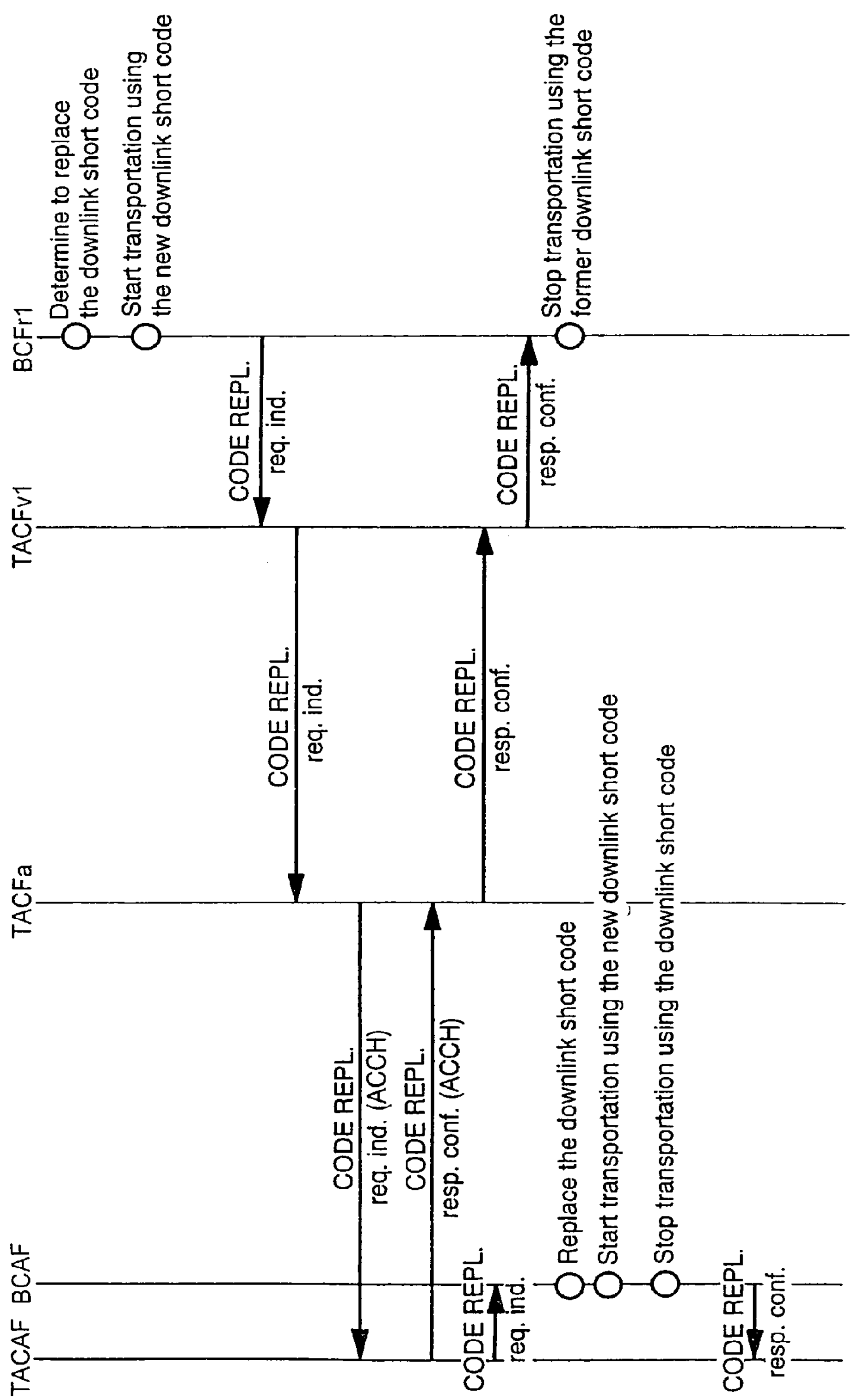
FIG. 56 is an information flow diagram of the code replacement procedure executed in the communication control plane.

FIG. 56 shows an information flow diagram of the code replacement executed in the communication control plane.

2.4.3.5.8.3 Definitions of Information Flows and Associated Information Elements Information flows and information elements in FIG. 56 will be described below and the information elements are represented in tables.

A CODE REPLACEMENT request indication is sent from a BCFr to a TACF to request change of codes. The detail of the CODE REPLACEMENT request indication is represented in FIG. 524.

Another CODE REPLACEMENT request indication is sent from the visited TACF to a TACFa to request change of codes. The detail of the CODE REPLACEMENT request indication is represented in FIG. 525.

Another CODE REPLACEMENT request indication is sent from the TACF to a TACAF to request change of codes. The detail of the CODE REPLACEMENT request indication is represented in FIG. 526. The element marked by *1 in FIG. 526 may be repeated a plurality of times, the number of repetition is the same as the number of the handover branches related to the terminal. The element marked by *2 in FIG. 526 may be repeated a plurality of times, the number of repetition is the same as the number of calls related to the TACF.

Another CODE REPLACEMENT request indication is sent from the TACAF to the BCAF to request to change of codes. The detail of the CODE REPLACEMENT request indication is represented in FIG. 527.

A CODE REPLACEMENT response confirmation is a response to the CODE REPLACEMENT request indication and is sent from the BCAF to the TACAF to indicate the completion of the change of codes. The detail of the CODE REPLACEMENT response confirmation is represented in FIG. 528.

Another CODE REPLACEMENT response confirmation is a response to the CODE REPLACEMENT request indication and is sent from the TACAF to the TACFa to confirm the CODE REPLACEMENT request indication. The detail of the CODE REPLACEMENT response confirmation is represented in FIG. 529.

Another CODE REPLACEMENT response confirmation is sent from the TACFa to the TACFv to confirm the CODE REPLACEMENT request indication. The detail of the CODE REPLACEMENT response confirmation is represented in FIG. 530.

Another CODE REPLACEMENT response confirmation is sent from the TACF to the BCFr to confirm the CODE REPLACEMENT request indication. The detail of the CODE REPLACEMENT response confirmation is represented in FIG. 531.

Figure 57:
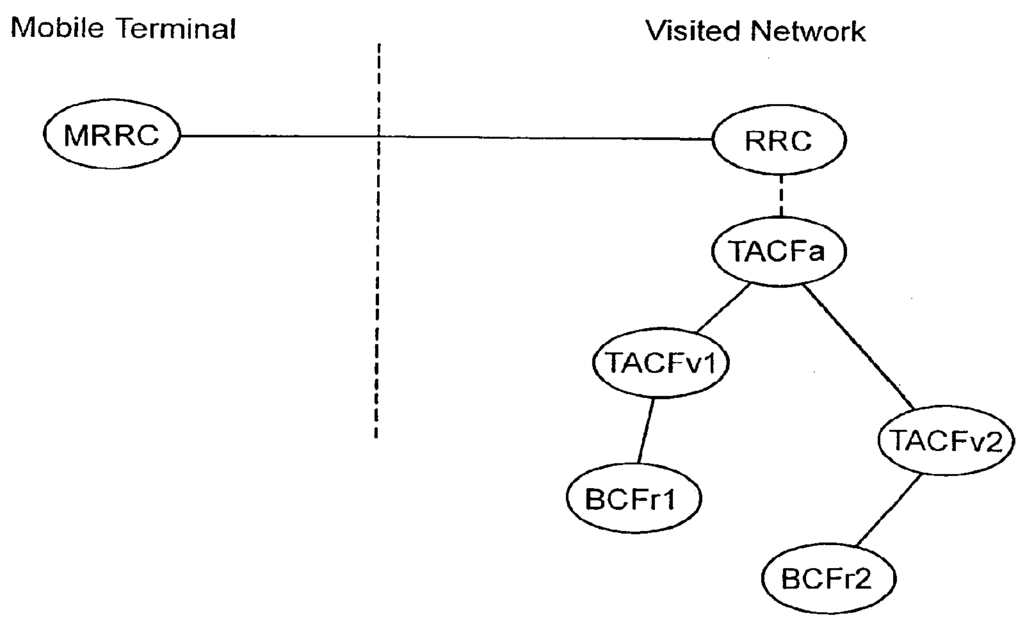
FIG. 57 is a diagram showing the functional model of a part of the invented system for describing a transmission power control.

2.4.3.6 Transmission Power Control 2.4.3.6.2 Information Flow Diagram a) Functional Model FIG. 57 shows the functional model of a part of the invented system for describing a transmission power control.

b) Information Flows

Figure 58:
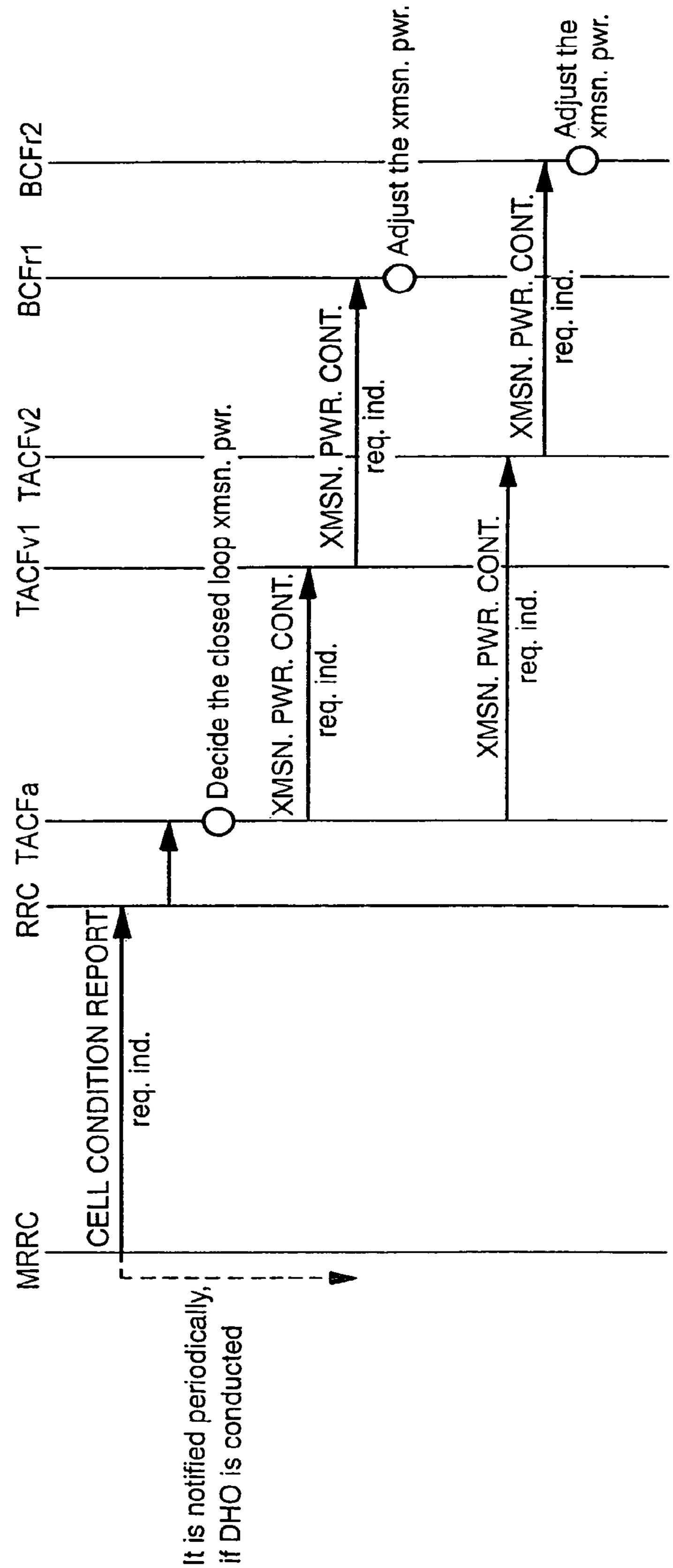
FIG. 58 is an information flow diagram of the transmission power control executed in the communication control plane.

FIG. 58 shows an information flow diagram of the transmission power control executed in the communication control plane.

2.4.3.6.3 Definitions of Information Flows and Associated Information Elements

Information flows and information elements in FIG. 58 will be described below and the information elements are represented in tables.

A CELL CONDITION REPORT request indication is sent from an MRRC to an RRC periodically to notify of the radio conditions of respective handover branches. The detail of the CELL CONDITION REPORT request indication is represented in FIG. 532.

A TRANSMISSION POWER CONTROL request indication is sent from a TACFa to TACFv to notify of the instructed transmission power. The detail of the TRANSMISSION POWER CONTROL request indication is represented in FIG. 533.

Another TRANSMISSION POWER CONTROL request indication is sent from a TACFv to BCFr to notify of the instructed transmission power. The detail of the TRANSMISSION POWER CONTROL request indication is represented in FIG. 534.

2.4.4 Information Flows of Mobility Services 2.4.4.1 Terminal Location Updating 2.4.4.1.1 Common Procedure Modules Used Common procedure modules used within the terminal location updating service are the TMUI inquiry, the FPLMTS user ID retrieval, the user authentication procedure, the ciphering start time notification, and the TMUI assignment.

2.4.4.1.2 Information Flow Diagram a) Functional Model

Figure 59:
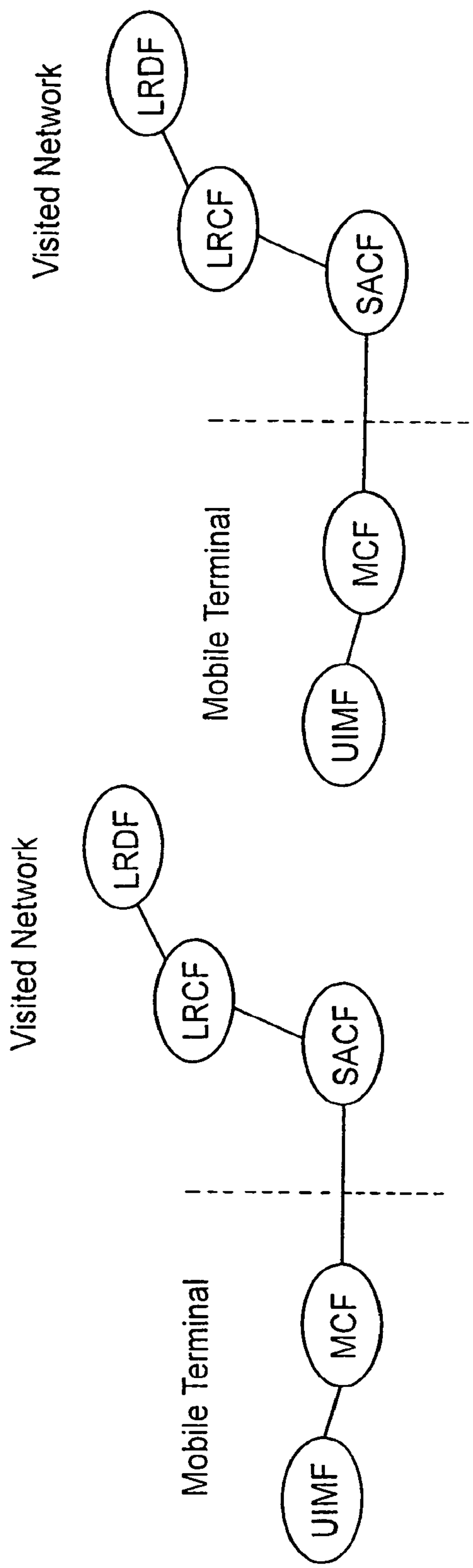
FIG. 59 is a diagram showing the functional model of a part of the invented system for describing a terminal location updating.

FIG. 59 shows the functional model of a part of the invented system for describing a terminal location updating.

b) Information Flows

Figure 60:
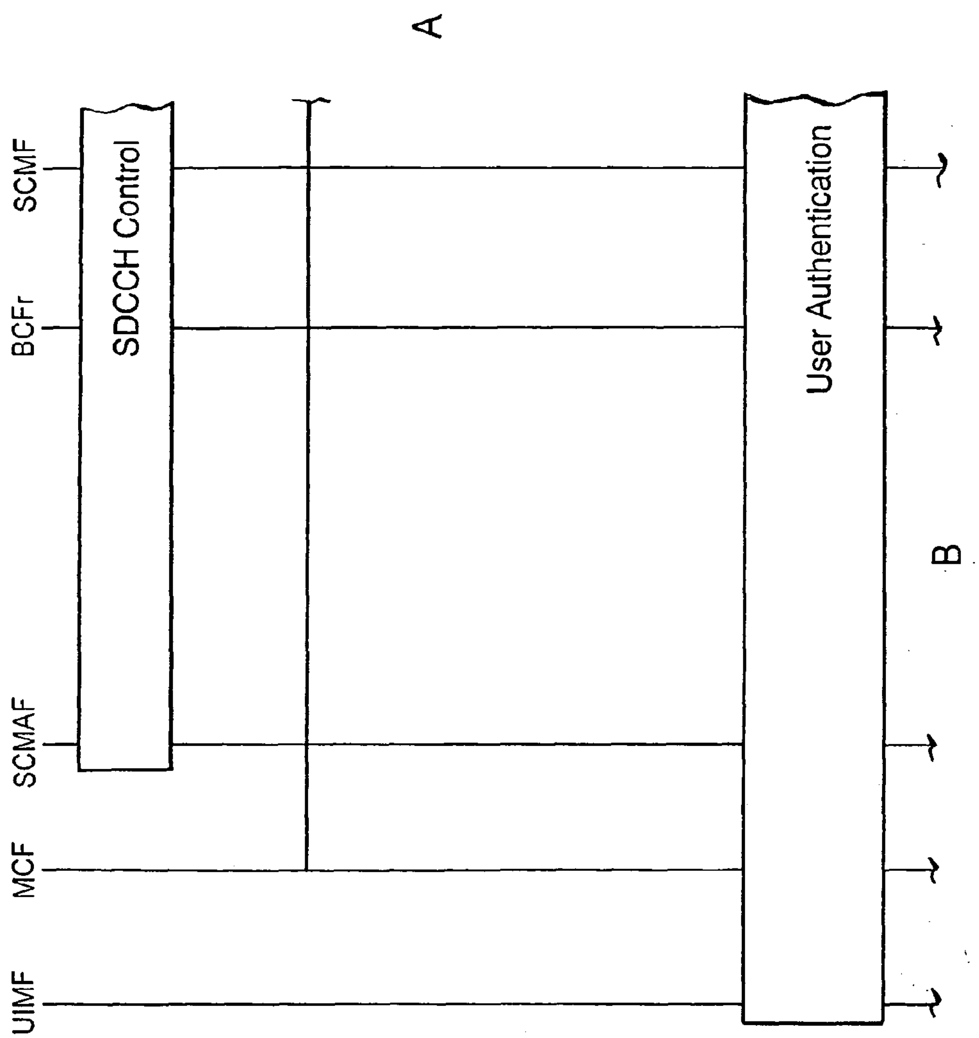
FIGS. 60 and 61 form an information flow diagram of the terminal location updating.
Figure 61:
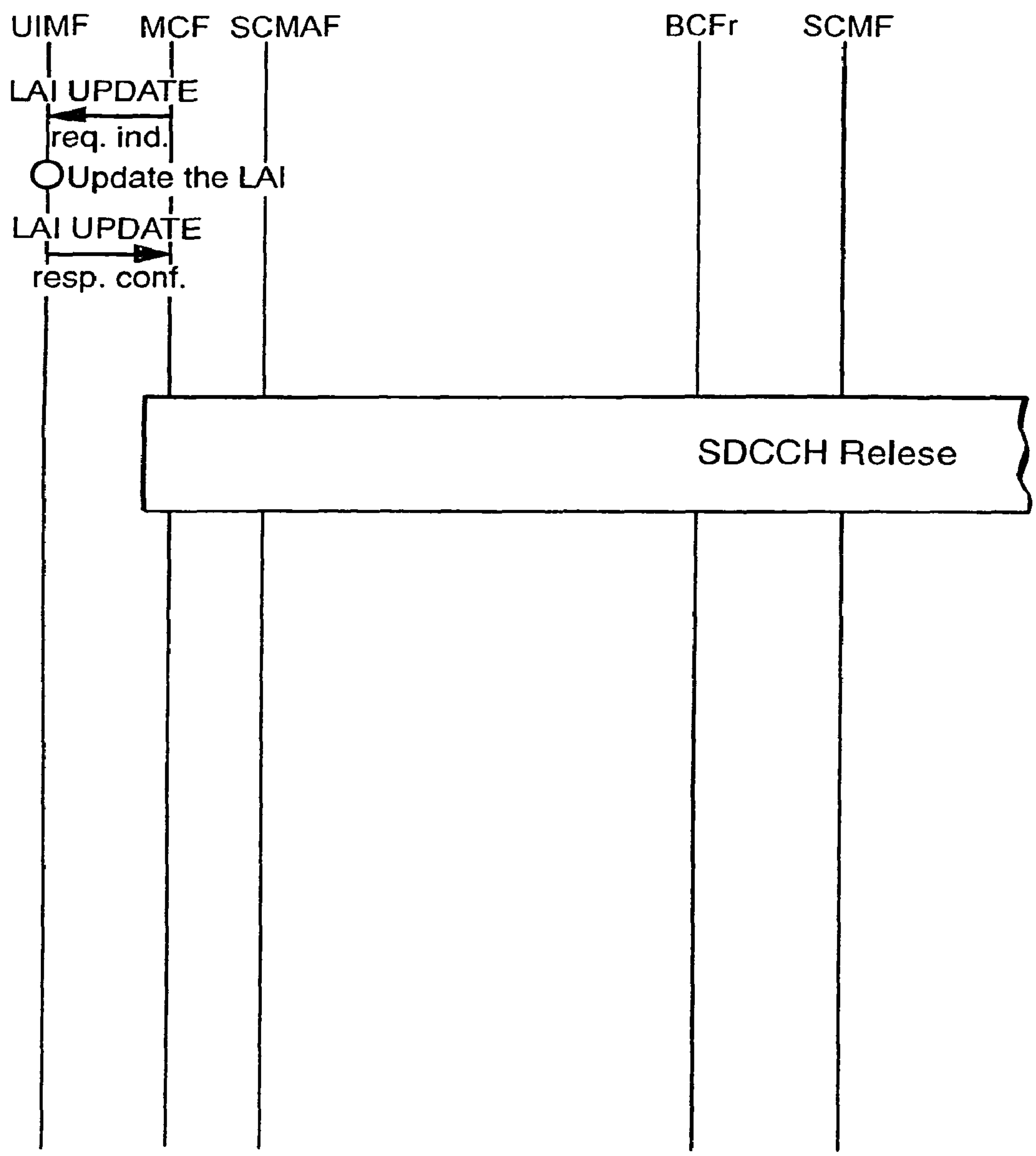

FIGS. 60 and 61 form an information flow diagram of the terminal location updating.

2.4.4.1.3 Definitions of Information Flows and Associated Information Elements

Information flow in FIGS. 60 and 61 will be described below and information elements of the flows are represented in tables.

Relationship rd (LRCF-LRDF)

An LAI UPDATE request indication is sent from the visited SCF to the SDF for requesting to update the location area information. A response confirmation is returned to the visited SCF from the SDF to confirm the completion of updating the location area information. FIG. 535 represents the details of the LAI UPDATE request indication and the LAI UPDATE response confirmation.

Relationship rk (SACF-LRCF)

A TERMINAL LOCATION UPDATE request indication is sent from the SACF to the visited SCF for requesting to update the location information of the mobile terminal. A response confirmation is returned to the SACF from the visited SCF to confirm the completion of updating the terminal location information. FIG. 536 represents the details of the TERMINAL LOCATION UPDATE request indication and the TERMINAL LOCATION UPDATE response confirmation.

Relationship rl (MCF-SACF)

Another TERMINAL LOCATION UPDATE request indication is sent from the MCF to the SACF for requesting to update the location information of the mobile terminal. A response confirmation is returned to the MCF from the SACF to confirm the completion of updating the terminal location information. FIG. 537 represents the details of the TERMINAL LOCATION UPDATE request indication and the TERMINAL LOCATION UPDATE response confirmation.

[Notes}

1) The relationship ID element identifies the relationship between requests and responses.

2) TMUI and TMUI assignment source ID should be used for the FPLMTS user ID element for relationships rl and rk.

3) The terminal status element indicates whether the terminal can accept a call or not.

4) The TC information is a terminal data information which indicates terminal capabilities.

Figure 62:
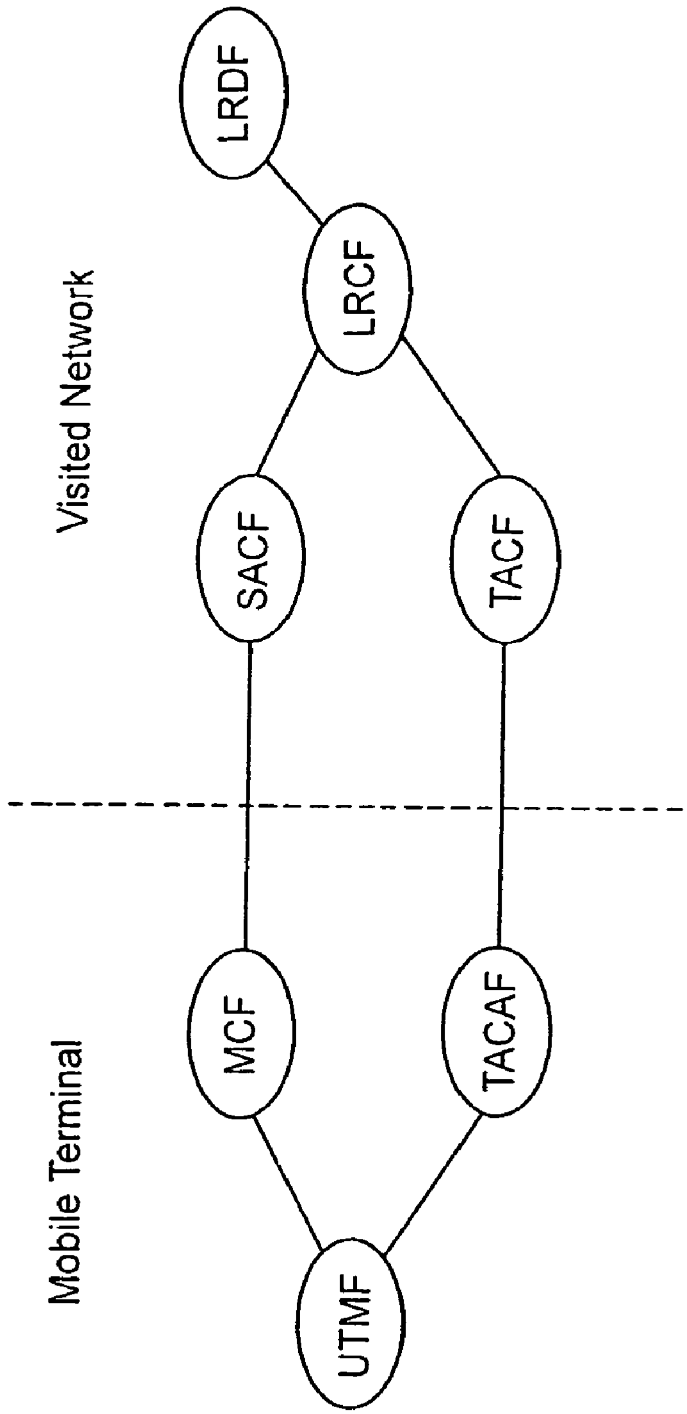
FIG. 62 is a diagram showing the functional model of a part of the invented system for describing a user authentication.

2.4.5 Information Flows of Security Services 2.4.5.1 User Authentication a) Functional Model FIG. 62 shows the functional model of a part of the invented system for describing a user authentication.

b) Information Flows

FIG. 63 shows an information flow diagram of the user authentication.

c) Definitions of Information Flows, Information Elements, and Functional Entity Actions Information flows and functional entity actions in FIG. 63 will be described below and information elements of the flows are represented in tables.

Relationship rd (LRCF-LRDF)

An authentication information retrieval information flow is used to request the security information from the visited LRDF for the user authentication. FIG. 538 represents the detail of the AUTHENTICATION INFORMATION RETRIEVAL request indication and the AUTHENTICATION INFORMATION RETRIEVAL response confirmation.

Relationship rg (LRCF-TACF) and Relationship rk(LRCF-SACF)

An AUTHENTICATION CHALLENGE IF is used to verify the identity of the user. That is, an authentication challenge initiated by a network is sent from LRCF to TACF/SACF for requesting the return of the authentication calculation result. FIG. 539 represents the detail of the AUTHENTICATION CHALLENGE request indication and the AUTHENTICATION CHALLENGE response confirmation.

Relationship rb (TACFF-TACAF) and Relationship rl (SACF-MCF)

Another AUTHENTICATION CHALLENGE IF is used to verify the identity of the user. That is, an authentication challenge initiated by the network is sent from TACFF to TACAF and from SACF to MCF for requesting the return of the authentication calculation result. FIG. 540 represents the detail of the AUTHENTICATION CHALLENGE request indication and the AUTHENTICATION CHALLENGE response confirmation.

Relationship rv(UIMF-TACAF) and Relationship ry (UIMF-MCF)

An AUTHENTICATION request indication is used to send a random number and to request to calculate a response with the random number and authentication key retained in the UIMF. An AUTHENTICATION response confirmation is used to send the authentication calculation result. FIG. 541 represents the detail of the AUTHENTICATION request indication and the AUTHENTICATION response confirmation.

2.4.5.2 Ciphering Start Time Notification 2.4.5.2.1 Information Flow Diagram a) Functional Model FIG. 64 shows the functional model of a part of the invented system for describing a ciphering start time notification.

b) Information Flows

FIG. 65 shows an information flow diagram of the ciphering start time notification.

c) Definitions of Information Flows, Information Elements, and Functional Entity Actions Information flows and functional entity actions in FIG. 65 will be described below and information elements of the flows are represented in tables.

Relationship rb (TACF-TACAF)

A START CIPHERING request indication is used to request that the terminal begins to apply the encryption procedure to information transmitted between itself and the network. This needs a confirming information flow.

Relationship rg (LRCF-TACF)

Another START CIPHERING request indication is used to request that the terminal begins to apply the encryption procedure to information transmitted between itself and the network. This needs a confirming information flow. FIG. 542 represents the details of the START CIPHERING request indication and the START CIPHERING response confirmation.

Relationship rk (LRCF-SACF)

Another START CIPHERING request indication is used to request that the terminal begins to apply the encryption procedure to information transmitted between itself and the network. This needs a confirming information flow. FIG. 543 represents the details of the START CIPHERING request indication and the START CIPHERING response confirmation.

Relationship rl (SACF-MCF)

Another START CIPHERING request indication is used to request that the terminal begins to apply the encryption procedure to information transmitted between itself and the network. This needs a confirming information flow.

Figure 66:
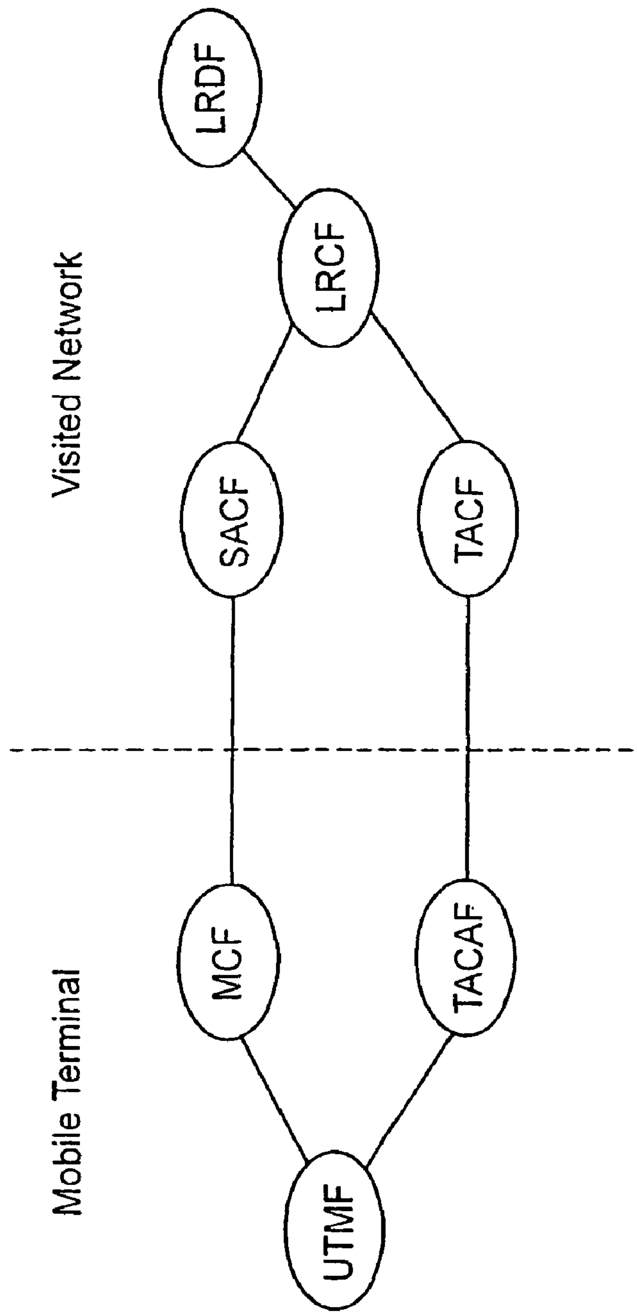
FIG. 66 is a diagram showing functional entities in the invented system for describing a TMUI assignment.

2.4.5.3. TMUI Management and User ID Retrieval 2.4.5.3.1 TMUI Assignment 2.4.5.3.1.1 Information Flow Diagram a) Functional Model FIG. 66 shows the functional model of a part of the invented system for describing a TMUI assignment.

b) Information Flows

Figure 67:
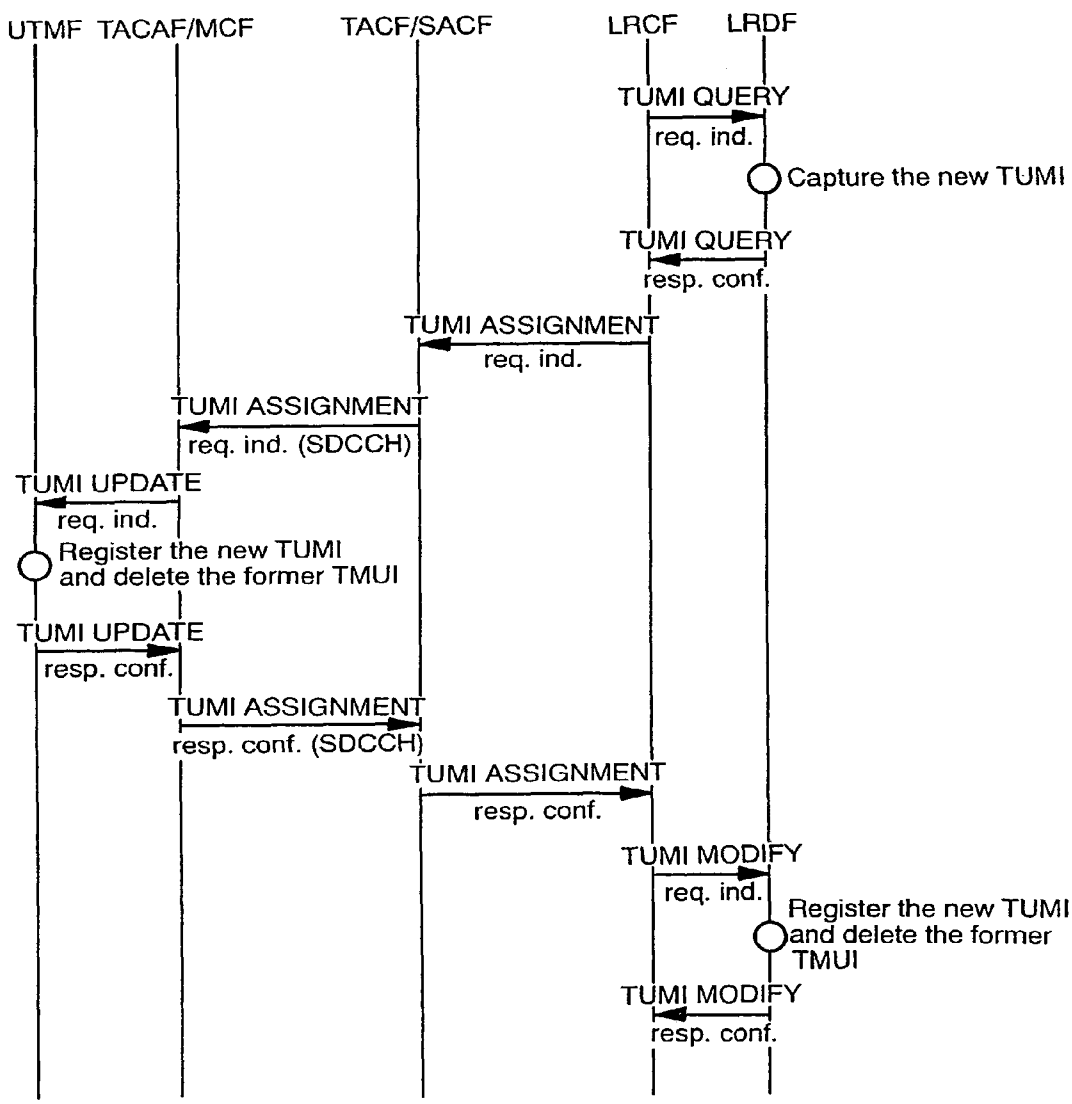
FIG. 67 is an information flow diagram representing the TMUI assignment.

FIG. 67 shows an information flow diagram of the TMUI assignment. In FIG. 67, the relationship between MCF and SACF is used for the user authentication in non-call related case while the relationship between TACAF and TACF is used for the user authentication in call related case. However, this could be accommodated with the relationship between MCF and SACF as well. An AUTHENTICATION INFORMATION RETRIEVAL request indication and an AUTHENTICATION INFORMATION response confirmation are used if no user authentication information is available in the visited network.

c) Definitions of Information Flows, Information Elements, and Functional Entity Actions Information flows and functional entity actions in FIG. 67 will be described below and information elements of the flows are represented in tables.

Relationship rb (TACF-TACAF)

A TMUI ASSIGNMENT request indication is used to assign and convey the TMUI to the user after the network has verified the identity of the user. A response confirmation is returned for acknowledging the successful assignment of the TMUI. FIG. 544 represents the details of the TMUI ASSIGNMENT request indication and the response confirmation.

Relationship rd (LRCF-LRDF)

A TMUI QUERY IF is used to request a new TMUI available from the visited LRDF. FIG. 545 represents the details of the TMUI QUERY request indication and response confirmation.

A TMUI MODIFY request indication is used to request the visited LRDF to modify the TMUI information for the user. Then, a confirmation is sent after it has been modified. FIG. 546 represents the details of the TMUI MODIFY request indication and response confirmation.

Relationship rg (LRCF-TACF)

Another TMUI ASSIGNMENT request indication is used to assign and convey the TMUI to the user after the network has verified the identity of the user. A response confirmation is returned for acknowledging the successful assignment of the TMUI. FIG. 547 represents the details of the TMUI ASSIGNMENT request indication and the response confirmation.

Relationship rk (LRCF-SACF)

Another TMUI ASSIGNMENT request indication is used to assign and convey the TMUI to the user after the network has verified the identity of the user. A response confirmation is returned for acknowledging the successful assignment of the TMUI. FIG. 548 represents the details of the TMUI ASSIGNMENT request indication and the response confirmation.

Relationship rl (SACF-MCF)

Another TMUI ASSIGNMENT request indication is used to assign and convey the TMUI to the user after the network has verified the identity of the user. A response confirmation is returned for acknowledging the successful assignment of the TMUI. FIG. 549 represents the details of the TMUI ASSIGNMENT request indication and the response confirmation.

2.4.5.3.2 User ID Retrieval

This procedure is used to convert the TMUI to the IMUI of an FPLMTS user. This procedure is initiated by the newly visited network when the network receives the TMUI or a set of TMUI and TMUI assignment source ID as the FPLMTS user ID from the mobile terminal. When newly visited LRCF receives the TMUI or a set of TMUI and TMUI assignment source ID from the mobile terminal, the LRCF should analyze which procedure (selected from the following procedures) would be executed.

1) Terminal Location Registration and Update

Case A) TMUI has been assigned by the newly visited LRDF.

Case B) TMUI has been assigned by another LRDF.

In this rule, case B is not described.

2) Mobile Originating Call

3) Unsuccessful Case: If the newly visited network cannot retrieve successfully (e.g., loses TMUI), then the newly visited network attempts to retrieve the FPLMTS user's IMUI from the UIMF.

2.4.5.3.2.1 Information Flow Diagram

Figure 68:
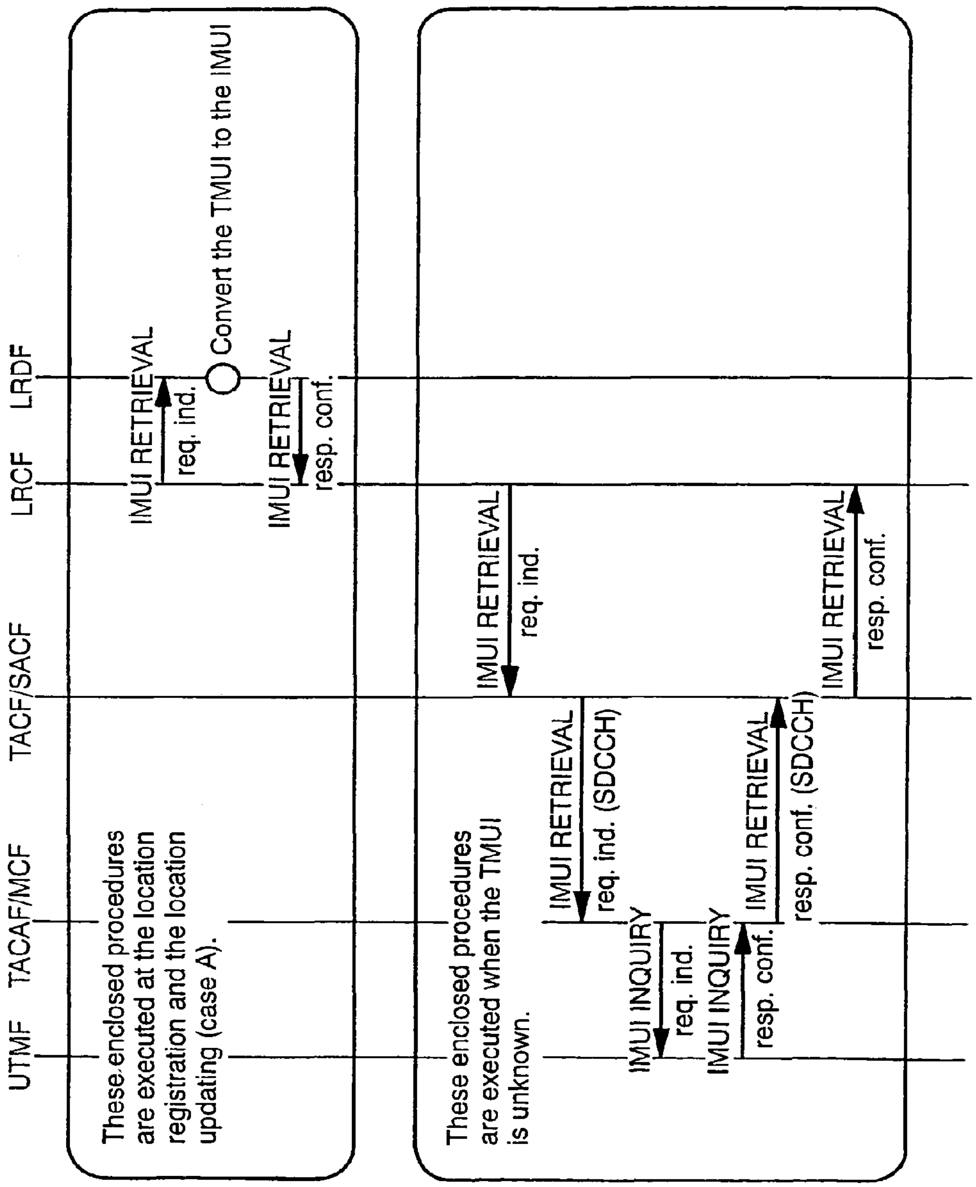
FIG. 68 is an information flow diagram representing a user ID retrieval.

FIG. 68 shows an information flow diagram of the user ID retrieval.

2.4.5.3.2.2 Information Flows and Associated Information Elements

Relationship rd (LRCF-LRDF)

An IMUI RETRIEVAL request indication is used to retrieve an IMUI on the basis of its corresponding TMUI. This information flow is sent from the LRCF to the LRDF in the same network. An IMUI RETRIEVAL response confirmation is a response to the request indication. The details of the IMUI RETRIEVAL request indication and response confirmation are represented in FIG. 550. In case that a call is originated from the mobile terminal, the TMUI assignment source ID element in FIG. 550 is not included.

Relationship rl (SACF-LRCF)

Another IMUI RETRIEVAL request indication is used to retrieve the IMUI from the mobile terminal. This information flow is used only when the network does not convert the TMUI of the FPLMT user into the IMUI. This information flow is sent from the SCF to the SACF in the visited network. An IMUI RETRIEVAL response confirmation is a response to the request. The details of the IMUI RETRIEVAL request indication and response confirmation are represented in FIG. 551.

Relationship rk (MCF-SACF)

Another IMUI RETRIEVAL request indication is used to retrieve the IMUI from the mobile terminal. This information flow is used only when the network does not convert the TMUI of the FPLMT user into the IMUI. This information flow is sent from the SACF to the MCF in the visited network. An IMUI RETRIEVAL response confirmation is a response to the request. The details of the IMUI RETRIEVAL request indication and response confirmation are represented in FIG. 552.

Relationship rg (TACF-LRCF)

Another IMUI RETRIEVAL request indication is used to retrieve the IMUI from the mobile terminal. This information flow is used only when the network does not convert the TMUI of the FPLMT user into the IMUI. This information flow is sent from the LRCF to the TACF in the visited network. An IMUI RETRIEVAL response confirmation is a response to the request. The details of the IMUI RETRIEVAL request indication and response confirmation are represented in FIG. 553.

Relationship rb (TACAF-TACF)

Another IMUI RETRIEVAL request indication is used to retrieve the IMUI from the mobile terminal. This information flow is used only when the network does not convert the TMUI of the FPLMT user into the IMUI. This information flow is sent from the TACF to the TACAF in the visited network. An IMUI RETRIEVAL response confirmation is a response to the request. The details of the IMUI RETRIEVAL request indication and response confirmation are represented in FIG. 554.

2.4.6 SDL Diagrams

SDL diagrams for functional entities (FIGS. 254 to 258) complies with IMT-2000 Recommendation Draft Q.FIF. Scenario 3 in the access link setup procedure, however, shall not be applied in this document. The number attached in the texts on the information flow transmission/reception between FEs in the SDL diagrams indicates the FEA number in the ITU Recommendation Draft Q.FIF.

2.5 Protocol Specifications 2.5.1 Reference Configuration

Figure 69:
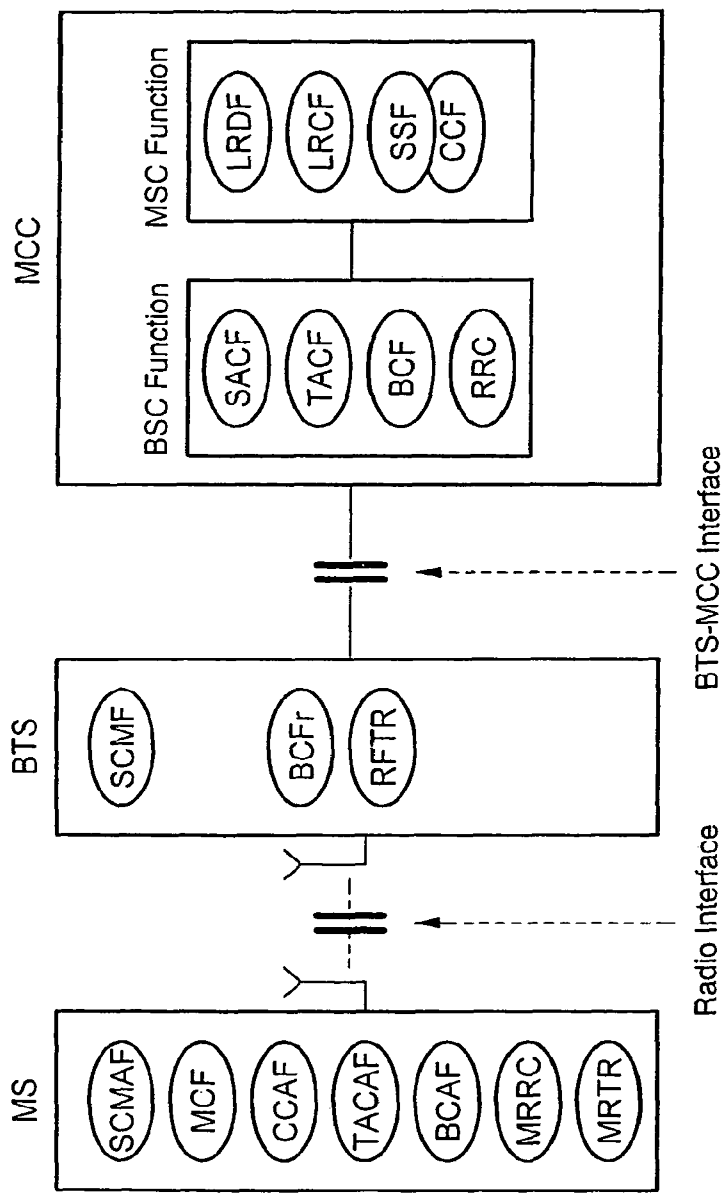
FIG. 69 is a diagram representing the correlation between physical node configuration and functional entities in the invented system.

The correlation between physical node configuration and functional entities in the invented system is represented in FIG. 69. The system is provided with radio interfaces and BTS-MCC interfaces to specify the protocol.

2.5.2 Radio Interface Specification 2.5.2.1 General

Section 2.5.2 describes layer 1-3 protocol specifications for the radio interface.

2.5.2.2 Layer 1

The description in connection with layer 1 protocol is omitted.

2.5.2.3 Layer 2

2.5.2.3.1 General

Figure 70:
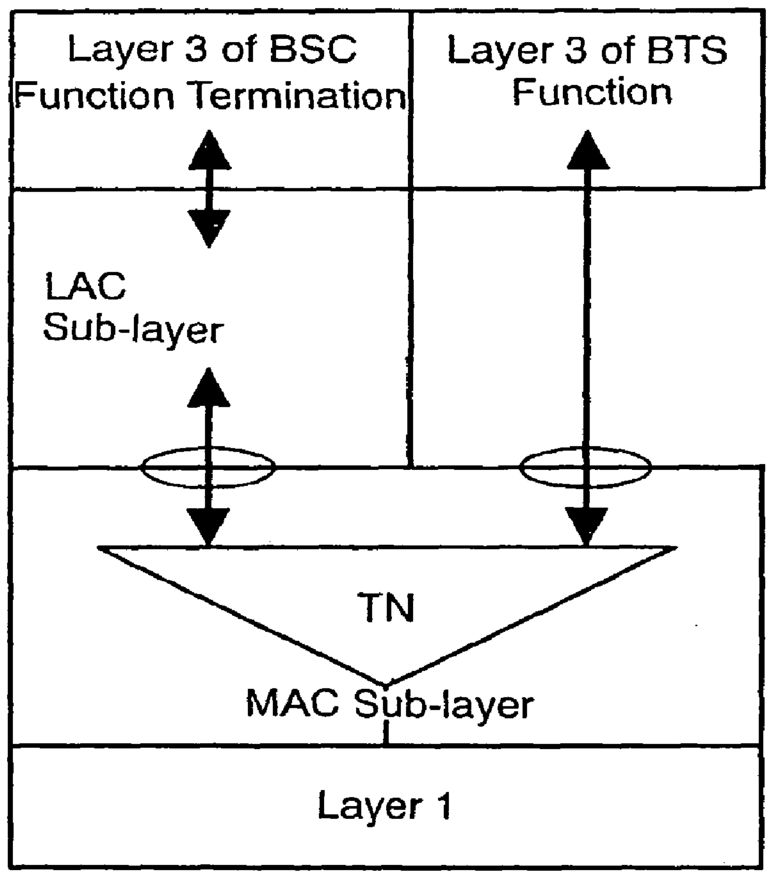
FIG. 70 is a diagram representing the signaling layer 2 protocol architecture over the radio interface.
Figure 71:
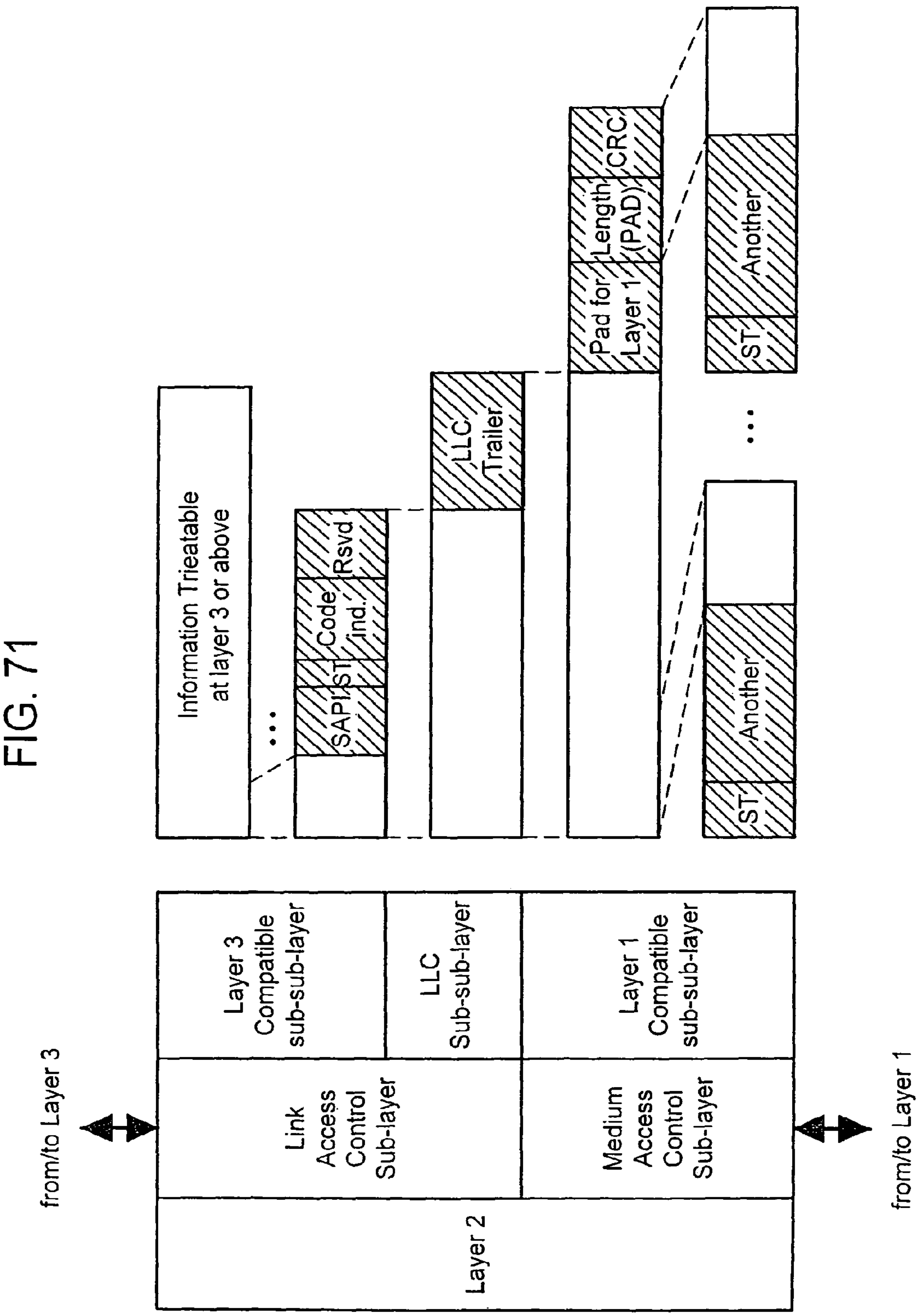
FIG. 71 is a diagram representing a sample frame structure for the BSC function termination.

Layer 2 consists of a LAC (link access control) sub-layer and a MAC (medium access control) sub-layer. The LAC sub-layer consists of a layer-3-coordination sub-sub-layer and an LLC (logical link control) sub-sub-layer. FIG. 70 shows the signaling layer 2 protocol architecture over the radio interface. FIG. 71 shows a sample frame structure for the BSC function termination.

2.5.2.3.1.1 LAC (Link Access Control) Sub-Layer

The LAC transfers variable length service data units (SDUs) between users at layer 2 with high reliability.

2.5.2.3.1.1.1 Layer-3-Coordination Sub-Sub-Layer

The layer-3-coordination sub-sub-layer performs primitive/parameter mapping between LLC and layer 3, and disassembles/assembles a layer data unit to/from LLC SDUs.

2.5.2.3.1.1.2 LLC (Logical Link Control) Sub-Sub-Layer

The LLC sub-sub-layer offers a high-reliability transfer function using error control, flow control, and so on.

2.5.2.3.1.2 MAC (Medium Access Control) Sub-Layer

The MAC sub-layer detects an error of LLC PDUs and disassembles/assembles an LLC PDU to/from layer 1 frames.

2.5.2.3.2 Functions 2.5.2.3.2.1 Functions of LAC (Link Access Control) Sub-Layer 2.5.2.3.2.1.1 Layer-3-Coordination Sub-Sub-Layer a) Signaling Layer 3 PDU Assembly and Disassembly This function provides for assembling a signaling layer 3 data unit from LLC PDUs and for disassembling a signaling layer 3 PDU to LLC PDUs.

b) Link Control

This function specifies the layer 3 entity which should process the LAC SDU with the SAPI. The application should be studied further.

c) Code Type Identification

This function identifies the code type when adopting the hybrid ARQ.

2.5.2.3.2.1.2 LLC (Logical Link Control) Sub-Sub-Layer a) Sequence Integrity

This function preserves the order of LLC SDUs that were submitted for transfer by this layer.

b) Error Correction by Selective Retransmission

Through a sequencing mechanism, the receiving LLC entity can detect missing LLC SDUs. This function corrects the sequence errors by means of retransmission.

c) Flow Control

This function allows an LLC receiver to control the rate at which a peer LLC transmitter entity may send information.

d) Error Reporting to Layer Management

This function indicates to layer management errors which have occurred.

e) Keep Alive

This function verifies that two peer LLC entities participating in a link are remaining in a link connection established state even in the case of a prolonged absence of data transfer.

f) Local Data Retrieval

This function allows the local LLC user to retrieve in-sequence SDUs which have not yet been released by the LLC entity.

g) Connection Control

This function performs the establishment, release, and resynchronization of an LLC link. It also allows the transmission of variable length user-to-user information without a guarantee of delivery.

h) Transfer of User-Data

This function is used for the conveyance of user data between users of the LLC. LLC supports both assured and unassured data transfer.

i) Protocol Error Detection and Recovery

This function detects errors and recovers from errors in the operation of the protocol.

j) Status Reporting

This function allows a transmitter peer entity and a receiver peer entity to exchange status information.

2.5.2.3.2.2 Functions of MAC (Medium Access Control) Sub-Layer a) CRC Error Detection and Handling This function provides for detecting and handling LLC PDU corruption by means of CRC. Corrupted LLC PDUs are discarded.

b) Assembly and Disassembly of LLC PDU or BTS Layer 3 PDU from/to Layer 1 Frames This function provides for assembling an LLC PDU or BTS layer 3 PDU from layer 1 frames and for disassembling an LLC PDU or BTS layer 3 PDU to layer 1 frames.

This function includes the padding function to extend the length of the MAC PDU to an integer multiple of the length of layer 1 frames. Before transferring through the RACH, a sequence number should be attached in order to prevent the MAC PDU from being received twice.

c) Address Control

This function identifies the logical link in the RACH/FACH, e.g., for respective mobile terminals, using a personal identity system.

d) Identity of Signal Content

This function classifies information, transmitted over the RACH, FACH, and UPCH, into user information or control information.

e) Identity of Terminating Node

This function classifies nodes, where signals are terminated, into the BTS function node and the BSC function node.

2.5.2.3.3 Formats and Parameters of Data Units 2.5.2.3.3.1 Format and Parameters of PDUs in LAC Sub-Layer 2.5.2.3.3.1.1 Layer 3 Compatible Sub-Sub-Layer PDU a) SAPI (Service Access Point Identifier)

This indicates to layer 3 the type of service provided by layer 2. This parameter is represented in FIG. 555.

b) ST

This parameter is attached to layer 3 compatible sub-sub-layer PDUs when disassembling a layer 3 PDU to those. This parameter is referred for future assembling a layer 3 PDU estimation from those in the correct order. This parameter is represented in FIG. 556.

c) Code Type Indicator

This parameter indicates the type of code to adopt the hybrid ARQ. The adoption shall depend on the version. This parameter is represented in FIG. 557.

d) Reserved Parameter

This parameter indicates the version of layer-3-coordination sub-sub-layer, and so on. This parameter is represented in FIG. 558.

2.5.2.3.3.1.2 LLC PDUs 2.5.2.3.3.1.2.1 Types of LLC PDUs

Various types of LLC protocol data units (PDUs) are listed in FIGS. 559 and 560. Definitions of the types of LLC PDUs will be described below.

a) BGN PDU (Begin)

The BGN PDU is used to establish an LLC link between two peer entities. The BGN PDU requests to clear peer's transmitter and receiver buffers, and to initialize peer's transmitter and receiver state variables.

b) BGAK PDU (Begin Acknowledge)

The BGAK PDU is used to acknowledge the acceptance of a layer 2 link setup request from a peer.

c) BGREJ PDU (Begin Reject)

The BGREJ PDU is used to reject the layer 2 link setup request of the peer LLC entity.

d) END PDU (End)

The END PDU is used to release an LLC link between two peer entities.

e) ENDAK PDU (End Acknowledge)

The ENDAK PDU is used to acknowledge the release of an LLC link f) RS PDU (Resynchronization)

The RS PDU is used to resynchronize the buffers and data transfer state variables.

g) RSAK PDU (Resynchronization Acknowledge)

The RSAK PDU is used to acknowledge the acceptance of a resynchronization requested by the peer LLC entity.

h) ER PDU (Error Recovery)

The ER PDU is used to recover from protocol error.

i) ERAK PDU (Error Recovery Acknowledge)

The ERAK PDU is used to acknowledge the recovery from protocol error.

j) SD PDU (Sequenced Data)

The SD PDU is used to transfer, through an LLC link, sequentially numbered PDUs containing information fields provided by the LLC user.

k) POLL PDU (Status Request)

The POLL PDU is used to request, across an LLC link, to transmit status information about the peer LLC entity.

l) STAT PDU (Solicited States Response)

The STAT PDU is used to respond to a status request (POLL PDU) received from a peer LLC entity. It contains information regarding the reception status of SD PDUs and SD-with-POLL PDUs in the N(R) field, credit information for the peer transmitter in the N(MR) field, and the sequence number in the N(PS) field corresponding to the POLL PDU or SD-with-POLL PDU to which it is in response.

m) USTAT PDU (Unsolicited States Response)

The USTAT PDU is used to respond to a detection of one or more new missing SD PDUs, based on the examination of the sequence number of the SD PDU. It contains information regarding the reception status of SD PDUs in the N(R) field, and an upper-window-edge information for the peer transmitter in the N(MR) field.

n) SD-with-POLL PDU (Sequenced Data with Status Request)

The SD-with-POLL PDU is used to transfer, through an LLC link, sequentially numbered PDUs containing information fields provided by the LLC user and used to request status information about the peer LLC entity.

o) UD PDU (Unnumbered Data PDU)

The UD PDU is used for unassured data transfer between two LLC users. When an LLC user requests unacknowledged information transfer, the UD PDU is used to send information to the peer without affecting LLC states or variables. The UD PDUs does not carry a sequence number and therefore, the UD PDU may be lost without notification.

p) MD PDU (Management Data PDU)

The MD PDU is used for transferring unassured management data between two management entities. When a management entity requests unacknowledged information transfer, the MD PDU is used to send information to the peer management entity without affecting LLC states or variables. The MD PDU does not carry a sequence number and therefore, the MD PDU may be lost without notification.

An invalid PDU is a PDU which:

a) has an unknown PDU type code, or b) is not of the proper length of the PDU belonging to the stated types.

Invalid PDUs shall be discarded without notification to the sender. No additional action is taken as a result of the invalid PDU. Length violations from items b) and c) above are reported to layer management.

2.5.2.3.3.1.2.2 Formats of LLC PDUs

FIGS. 72 through 88 represents formats of LLC PDUs. As listed at section 2.5.2.3.3.1.2.1, there are 16 types of PDUs.

Figure 72:
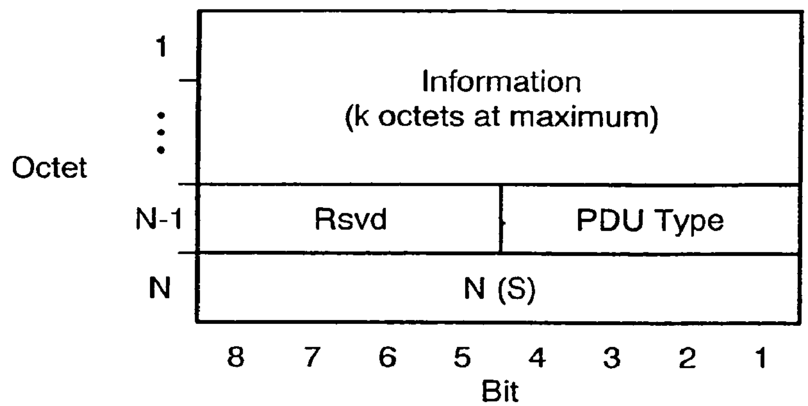
FIG. 72 is a diagram representing the format of a sequenced data PDU (SD PDU).
Figure 73:
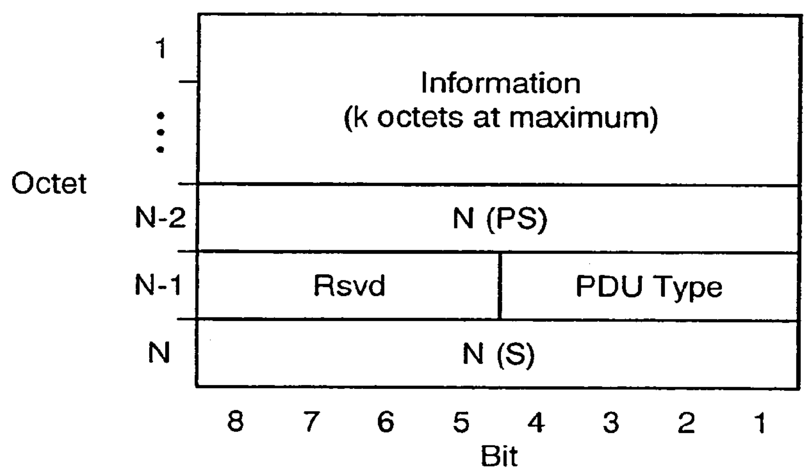
FIG. 73 is a diagram representing the format of a sequenced-data-with-status-request PDU (SD-with-POLL PDU).
Figure 74:
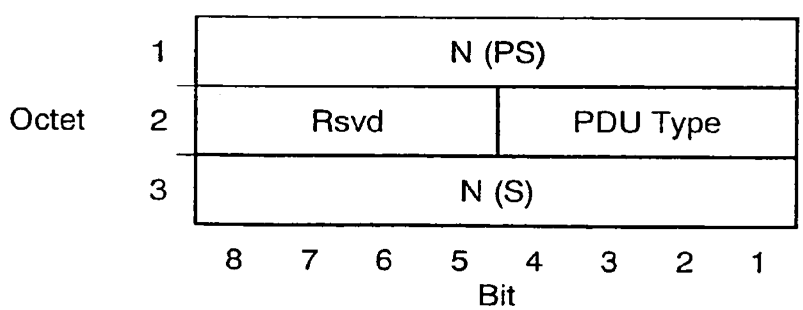
FIG. 74 is a diagram representing the format of a POLL PDU.
Figure 77:
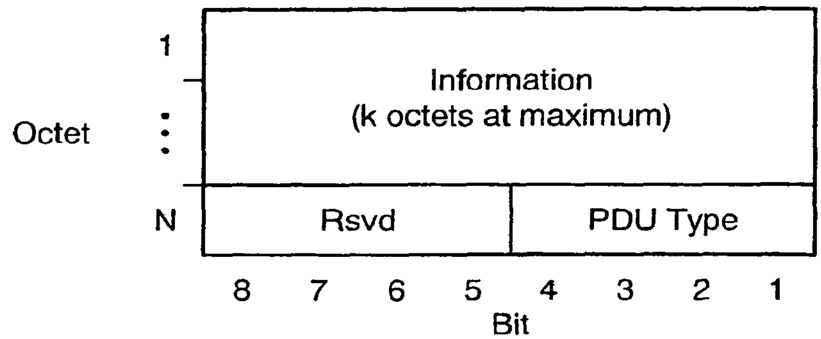
FIG. 77 is a diagram representing the format of a UD PDU and a MD PDU.
Figure 78:
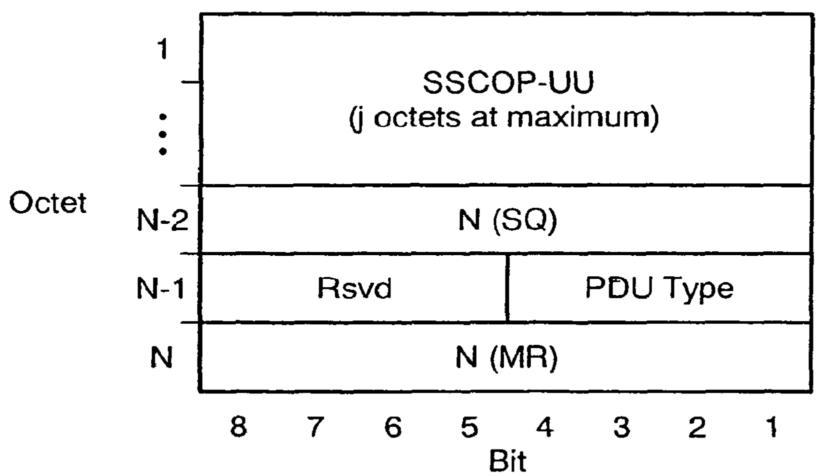
FIG. 78 is a diagram representing the format of a Begin PDU (BGN PDU).
Figure 79:
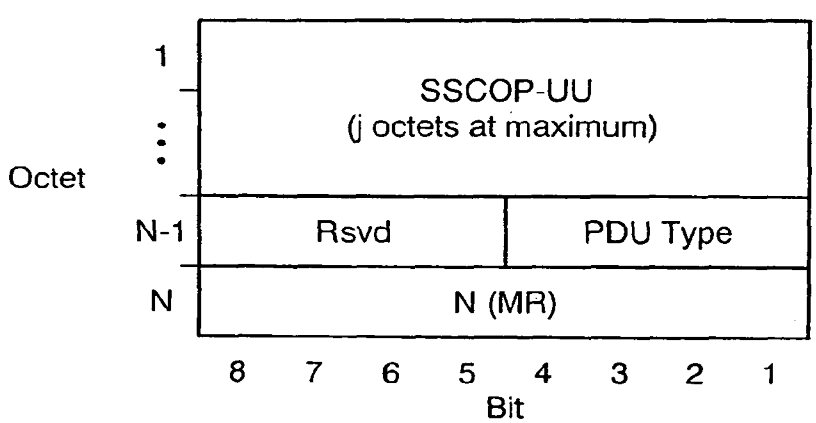
FIG. 79 is a diagram representing the format of a BGAK PDU.
Figure 80:
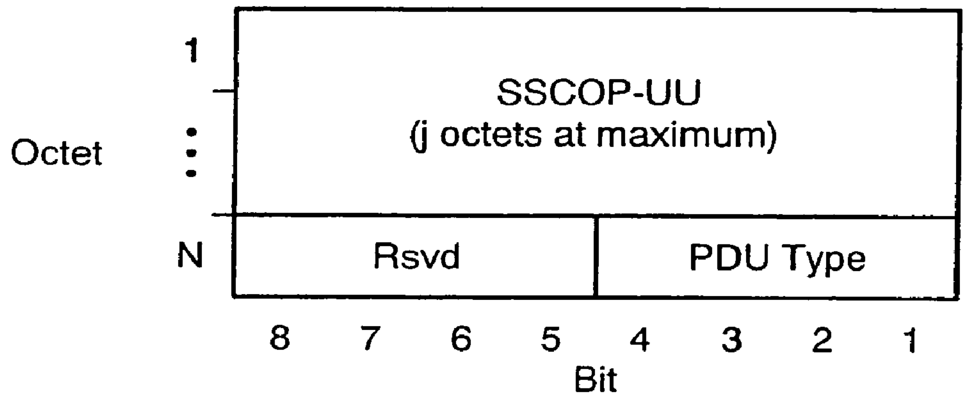
FIG. 80 is a diagram representing the format of a BGREJ PDU.
Figure 81:
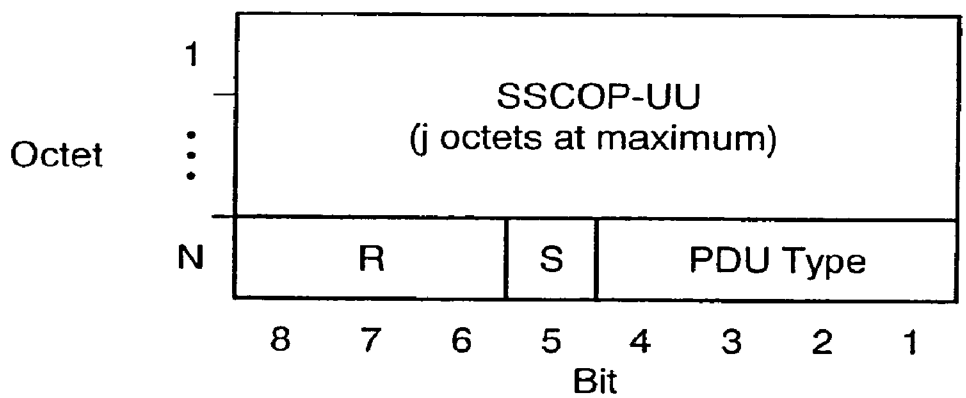
FIG. 81 is a diagram representing the format of an END PDU.
Figure 82:
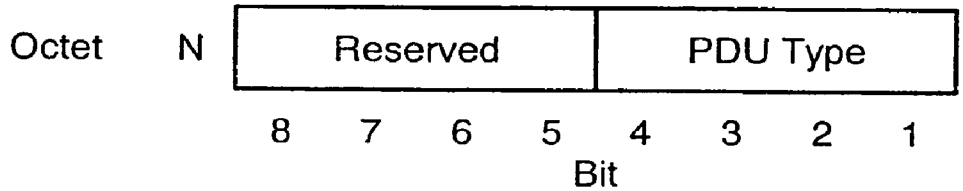
FIG. 82 is a diagram representing the format of an ENDAK PDU.
Figure 83:
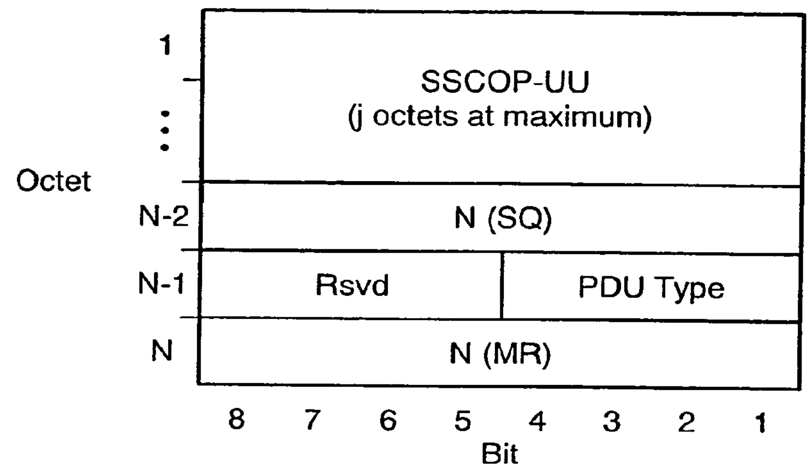
FIG. 83 is a diagram representing the format of an RS PDU.
Figure 84:
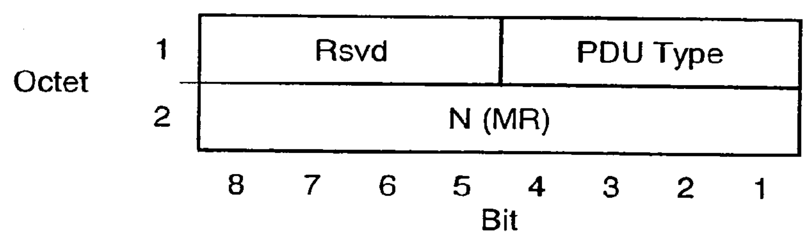
FIG. 84 is a diagram representing the format of an RSAK PDU.
Figure 85:
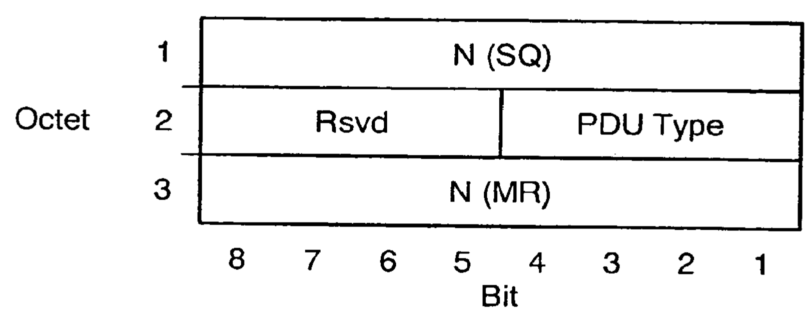
FIG. 85 is a diagram representing the format of an ER PDU.

FIG. 72 represents the sequenced data PDU (SD PDU). FIG. 73 represents the sequenced-data-with-status-re quest PDU (SD-with-POLL PDU). FIG. 74 represents the POLL PDU. FIG. 75 represents the STAT PDU. FIG. 76 represents the USTAT PDU. FIG. 77 represents the UD PDU and MD PDU. FIG. 78 represents the Begin PDU (BGN PDU). FIG. 79 represents the BGAK PDU. FIG. 80 represents the BGREJ PDU. FIG. 81 represents the END PDU. FIG. 82 represents the ENDAK PDU. FIG. 83 represents the RS PDU. FIG. 84 represents the RSAK PDU. FIG. 85 represents the ER PDU. FIG. 86 represents the ERAK PDU. Features of these formats will be described below.

2.5.2.3.3.1.2.2.1 Coding Conventions

The coding of the LLC PDU conforms to the coding conventions specified in 2.1/I.361 [4]. LLC PDU is trailer oriented: i.e., the protocol control information is transmitted last.

2.5.2.3.3.1.2.2.2 Reserved Field

There is a field of reserved bits (that may be refried to as R, Rsvd, Reserved) in each PDU. One function of the reserved field is to achieve the eight-bit alignment of PDU. Other functions should be studied further. When no functions other than the eight-bit-alignment are defined, this field shall be coded as zero. This field shall be ignored by the receiver.

2.5.2.3.3.1.2.2.3 PDU Length

The maximum length of the information fields in SD, UD, and MD PDUs is k octets. The maximum value of k should be studied further. The value of k is determined at part of size negotiation procedures carried out outside LLC, upon bilateral agreement, and may be specified by another Recommendation utilizing LLC, or may be derived from the maximum length PDU size for protocols using LLC. The minimum value of k is 0 octets.

The maximum length of a variable length SSCOP-UU field is j octets. The maximum value of j should be studied further. The value of j is determined upon bilateral agreement, may be specified by another Recommendation utilizing LLC, or may be derived from requirements of protocols utilizing LLC. The minimum value of j is 0 octets.

2.5.2.3.3.1.2.2.4 Codings of STAT and USTAT PDU

Each USTAT PDU contains two list elements. Each STAT PDU contains zero or more list elements. Transmitted STAT messages may be segmented into two or more STAT PDUs.

The processing of a STAT PDU does not rely on information in other STAT PDUs. This is true even for the case when multiple STAT PDUs are generated in response to a single POLL PDU, and one or more of these PDUs are lost.

The span list items in the STAT and USTAT PDUs are odd or even elements of a list used for selective retransmission requests. Every odd element represents the first PDU of a missing gap, and every even element, except possibly the last one, represents the first PDU of a received sequence.

2.5.2.3.3.1.2.2.5 States of LLC Protocol Entity

This sub-clause describes the states of an LLC entity. These states are used in the specification of the peer-to-peer protocol. The states are conceptual and reflect general conditions of the LLC entity in the sequences of signals and PDU exchanges with its user and peer, respectively. In addition, other conditions are used in the description, in order to avoid identification of additional states, as detailed in the SDLs. The basic states will be described below.

State 1 (Idle)

Each LLC entity is conceptually initiated in an Idle state (state 1) and returns to this state upon the release of a connection.

State 2 (Outgoing Connection Pending)

An LLC entity requesting a connection with a peer is in an outgoing connection pending state (state 2) until it receives an acknowledgement from the peer.

State 3 (Incoming Connection Pending)

An LLC entity that has received a connection request from a peer and is waiting for its user's response is in an incoming connection pending (state 3).

State 4 (Outgoing Disconnection Pending)

An LLC entity requesting release of the peer-to-peer connection is in an outgoing disconnection pending state (state 4) until it receives a confirmation that the peer entity has released and transitioned to the Idle state (State 1).

State 5 (Outgoing Resynchronization Pending)

An LLC entity requesting resynchronization of the connection with a peer is in an outgoing resynchronization pending state (state 5).

State 6 (Incoming Resynchronization Pending)

An LLC entity that has received a resynchronization request from a peer and is waiting for its user's response is in an incoming resynchronization pending state (state 5).

State 7 (Outgoing Recovery Pending)

An LLC entity requesting recovery of an existing connection with a peer is in an outgoing recovery pending state (state 7).

State 8 (Recovery Response Pending)

An LLC entity that has completed recovery, notified its user of the recovery completion, and is awaiting for a response from the user is in a recovery response pending state (state 8).

State 9 (Incoming Recovery Pending)

An LLC entity that has received a recovery request from a peer and is waiting for its user's response is in an incoming recovery pending state (state 9).

State 10 (Data Transfer Ready)

Upon successful completion of the connection establishment, resynchronization, or error recovery procedures, both peer LLC entities will be in a data transfer ready state (state 10) and possible to execute data transfer.

2.5.2.3.3.1.2.4 LLC State Variables

This section describes the state variables used in the peer-to-peer protocol. SD and POLL PDUs are sequentially and independently numbered, and may have a value between "0" and n minus 1 (where n is the modulus of the sequence number). The modulus equals to $2^8$, and therefore, the sequence number cycles through the entire range between 0 through $2^8-1$. Therefore, all arithmetic operations on the following state variables or sequence numbers are affected by the modulus: VT(S), VT(PS), VT(A), VT(PA), VT(MS), VR(R), VR(H), and VR(MR). When performing arithmetic comparisons of transmitter variables, VT(A) is assumed as a base. When performing arithmetic comparisons of receiver variables, VR(R) is assumed as a base. In addition, the state variables VT(SQ) and VR(SQ) use the modulo 256 arithmetic. The LLC sub-sub-layer manages the following state variables at the transmitter.

a) VT(S)—Sending State Variable

This is the sequence number of an SD PDU to be transmitted next in the first transmission (i.e. except for that in retransmissions). This is incremented after sending each SD PDU in the first transmission (i.e. except in retransmissions).

b) VT(PS)—Poll Sending State Variable

This is the sequence number of a POLL PDU or SD-with-POLL PDU transmitted currently. This is incremented before transmission of the next POLL or SD-with-POLL PDU.

c) VT(A)—Acknowledgement State Variable

This is the sequence number of an in-sequence SD PDU which is expected to be acknowledged next and forms the lower edge of an acknowledgement window acknowledging SD PDUs. The variable VT(A) is updated in response to the acknowledgement of transmitted SD PDUs.

d) VT(PA)—Poll Acknowledgement State Variable

This is the sequence number of an STAT PDU which is expected to be received next and forms the lower edge of the acknowledgement window constituted of STAT PDUs. If an STAT PDU containing an invalid parameter at the N(PS) field is received, a recovery is initiated or release is performed. Otherwise, if an acceptable STAT PDU is received, the variable VT(PA) is updated on the basis of the parameter at the N(PS) field of the received STAT PDU.

e) VT(MS)—Maximum Sendable Value State Variable

This is the sequence number of an SD PDU which is not allowed by the peer receiver. That is, the peer receiver sequentially receives SD PDUs having sequence numbers up to VT(MS)−1. The variable VT(MS) represents the upper edge of the transmission window. The transmitter should not transmit a new SD PDU if the current VT(S) reaches VT(MS). The variable VT(MS) is updated in response to the reception of a USTAT PDU, STAT PDU, BGN PDU, BGAK PDU, RS PDU, RSAK PDU, ER PDU, or ERAK PDU.

f) VT(PD)—Poll Data State Variable

When acknowledgements are outstanding, this state variable represents the number of SD PDUs transmitted between transmissions of two POLL PDUs, or the number of SD PDUs transmitted before the transmission of the first POLL PDU after a POLL timer became active. The variable VT(PD) is incremented in response to the transmission of an SD PDU, and reset to zero in response to the transmission of a POLL PDU.

g) VT(CC)—Connection Control State Variable

This variable represents the number of unacknowledged BGN, END, ER, or RS PDUs. The variable VT(CC) is incremented in response to the transmission of a BGN, END, ER, or RS PDU. If an END PDU is transmitted in response to a protocol error, LLC sub-sub-layer does not wait for receiving the corresponding ENDAK PDU and enters directly into state 1 (Idle) and the variable VT(CC) is not incremented h) VT(SQ)—Transmitter Connection Sequence State Variable This state variable is used to allow the receiver to identify retransmitted BGN, ER, and RS PDUs. This state variable is initialized to "0" in response to creation of the LLC process and incremented and then mapped into the N(SQ) field of a BGN, RS, or ER PDU before the initial transmission of the BGN, RS, or ER PDU as represented in FIGS. 78, 83 and 85.

Additionally, the LLC sub-sub-layer manages the following state variables at the receiver.

a) VR(R)—Reception State Variable

This state variable is the sequence number of an in-sequence SD PDU expected to be received next. This variable is incremented in response to the reception of the next SD PDU.

b) VR(H)—Highest Expected Reception State Variable

This state variable is the highest number among sequence numbers of in-sequence SD PDUs in a transmission window expected to be received next. The variable VR(H) may be updated in response to the reception of a new SD PDU or in response to the reception of a POLL PDU.

c) VR(MR)—Maximum Receivable Value State Variable

This is the sequence number of an SD PDU which is not allowed by the receiver. That is, the receiver sequentially receives SD PDUs having sequence numbers up to VR(MR)−1. The receiver should discard the SD PDU having the parameter in the N(S) field being equal to or more than VR(MR). It is possible that the reception of such an SD PDU causes the transmission of a USTAT PDU. Updating manner of the variable VR(MR) can be optional with the device, but the variable VR(MR) should not be less than VR(H).

d) VR(SQ)—Receiver Connection Sequence State Variable

This state variable is used to identify retransmitted BGN, ER, and RS PDUs. In reaction to the reception of a BGN, ER, or RS PDU, this state variable is compared with the value in the N(SQ) field of the received BGN, ER, or RS PDU, and then the value in the N(SQ) field is allocated to the variable VR(SQ). In the comparison, if they are different, the PDU is processed and the variable VR(SQ) is set to the parameter in the N(SQ) field. If they are equal to each other, the PDU is identified as a retransmitted one.

2.5.2.3.3.1.2.5 LLC PDU Parameter Fields a) N(S)

The variable VT(S) is mapped to the N(S) field of a new SD, SD-with-POLL, or POLL PDU whenever the new SD, SD-with-POLL, or POLL PDU is generated as represented in FIGS. 72-74.

b) Information Field

The information field of an SD, SD-with-POLL, MD, or UD PDU represented in FIG. 72, 73, or 77 is mapped from the "message unit" parameter of an AA-DATA, MAA-UNIT-DATA, or AA-UNITDATA request. Mterward, the information in this field is mapped again to a "message unit" parameter of an corresponding AA-DATA, MAA-UNITDATA, or AA-UNITDATA indication.

c) N(PS)

After the variable VT(PS) has been incremented, the variable VT(PS) is mapped to the N(PS) field of an SD-with-POLL or POLL PDU whenever the SD-with-POLL or POLL PDU is generated as represented in FIGS. 73 and 74. In addition, the receiver of an SD-with-POLL or POLL PDU maps the contents of the N(PS) field of the received SD-with-POLL or POLL PDU into the N(PS) field of an STAT PDU as represented in FIG. 75. To facilitate error recovery procedures, in addition to the mapping of the variable VT(PS) into the N(PS) field of the SD-with-POLL or POLL PDU, the SD-with-POLL or POLL PDU including the N(PS) field is stored in the transmitter buffer whenever the PDU is sent.

d) N(R)

The variable VR(R) is mapped to the N(R) field of a STAT or USTAT PDU whenever the STAT or USTAT PDU is generated as represented in FIGS. 75 and 76.

e) N(MR)

The variable VR(MR) is mapped to the N(MR) field of an STAT, USTAT, RS, RSAK, ER, ERAK, BGN, or BGAK PDU whenever such a PDU is generated as represented in FIGS. 75, 76, 78, 79, 83, 84, 85, and 86. This variable is the basis for credit granting by the receiver.

f) SSCOP-UU

The SSCOP-UU in a BGN, BGAK, BGREJ, END or RS PDU in FIGS. 78-81, and 83 is mapped to and from the "SSCOP-UU" parameter of the corresponding SSCOP signal.

g) Source Bit (S)

In an END PDU, the source bit (S) field in FIG. 81 conveys information as to whether the originator of the release initiation was the SSCOP user or the SSCOP itself When the transmission of an END PDU is initiated by the user, this bit is set to "0." However, when the transmission of an END PDU is initiated by the SSCOP, this bit is set to "1." This bit is mapped into the "source" field of an AA-RELEASE indication.

h) N(SQ)

This field carries the connection sequence value. The variable VT(SQ) is mapped to the N(SQ) field of a new BGN, RS, or ER PDU whenever the new BGN, RS, or ER PDU is transmitted. The parameter in this field is used by the receiver with the variable VR(SQ) to identify retransmitted BGN, RS, and ER PDUs.

i) PDU Type Field

Codings with respect to the PDU type field is represented in the list formed by FIGS. 559 and 560.

2.5.2.3.3.1.2.6 LLC Timer

Description with respect to the LLC timer will be omitted.

2.5.2.3.3.1.2.7 LLC Protocol Parameters

LLC protocol parameters will be described below.

a) Max-CC

This is the maximum number of the state variable VT(CC) and corresponds to the maximum limit of transmissions of a BGN, END, ER, or RS PDU.

b) Max-PD

This is the maximum number of the state variable VT(PD) before sending a POLL PDU and resetting VT(PD) to zero.

c) Max-STAT

This is the maximum number of list elements which can be contained in an STAT PDU. When the number of list items exceeds the Max-STAT, the STAT message shall be segmented. All of the PDUs carrying the segments made from an STAT message, except possibly the last one, contain Max-STAT list items. This parameter is not used for length check by the receiver of an STAT PDU, but is only used by the sender of the STAT message for segmentation purposes. This parameter should be an odd integer greater than or equal to 3. The default value of the Max-STAT should be studied further. This parameter can be changed dependently on the device.

The default value causes the STAT PDU to fill six ATM cells using AAL type 5 common part. In addition, the total length of a STAT PDU should not exceed the maximum length of an SD PDU.

d) Clear-Buffers

This parameter is set upon connection establishment. It holds one of two values indicating "Yes" or "No," respectively. If this parameter is set to "Yes," the LLC sub-sub-layer can clear its transmission buffer and release transmission queue in response to a connection release. If this parameter is set to "No," the LLC sub-sub-layer can not clear its transmission buffer and release transmission queue even if connection release occurs. Additionally, if this parameter is set to "No," the LLC sub-sub-layer cannot clear selectively acknowledged messages from its transmission buffer if older ones are still outstanding.

e) Credit

This parameter is used to coordinate credit notifications to layer management. When the LLC sub-sub-layer is blocked from transmitting a new SD or SD-with-POLL PDU due to insufficient credit, the credit parameter is assigned the value indicating "No." When the LLC sub-sub-layer is permitted to transmit a new SD or SD-with-POLL PDU, the credit parameter is assigned to the value indicating "Yes." The credit parameter is initially assigned "Yes."

2.5.2.3.3.1.2.8 LLC Credit and Flow Control 2.5.2.3.3.1.2.8.1 Credit and Peer-to-Peer Flow Control Credit is granted by the LLC receiver to allow the peer LLC transmitter to transmit new SD or SD-with-POLL PDUs. The process by which a receiver entity determined credit is optional, but is related to the buffer availability and the bandwidth and delay of the connection.

The variable VR(MR) is contained in the N(MR) field of each of BGN, BGAK, RS, RSAK, ER, ERAK, STAT and USTAT PDUs sent by the receiver, and then conveyed to the transmitter. The content of the N(MR) field is read out and stored as the variable VT(MS) at the transmitter. The variable VR(MR) sent to the transmitter is the sequence number of SD or SD-with-POLL PDU that the receiver will not accept.

The transmitter does not transmit any SD or SD-with-POLL PDU having the sequence number which exceeds the credit allowed. The receiver discards any SD or SD-with-POLL PDUs having the sequence number which exceeds the credit allowed. In one case, reception of such an SD or SD-with-POLL PDU may cause the transmission of a USTAT PDU.

Previously granted credit can be reduced in order for the receiver to perform flow control, but the receiver credit variable VR(MR) cannot be reduced below the variable VR(H). In other words, if a receiver has accepted and acknowledged the receipt of the SD or SD-with-POLL PDU having the sequence number which is VR(H)−1, the credit value VR(MR) must be greater than or equal to VR(H).

The lower bound of the operating window according to the LLC protocol is the variable VT(A) while the upper bound thereof is VT(MS)−1. The modulus of the protocol limits the sequence number range of the operating window to $2^8-1$. Therefore, the acceptable sequence number (granted credit) at the receiver by the modulo arithmetic must be a value between VR(H) and VR(R)−1. If VR(MR)=VR(R)=VR(H), the operating window size is zero. If VR(MR)=VR(R)−1, the operating window size is maximum.

The LLC receiver allocates a buffer to support each connection. In principle, the available receiver buffer should match or exceed the credit granted to the transmitter to avoid the discard of successfully transmitted data. However, if limited buffers are available for a connection, it is possible to grant credit in excess of the available buffer capacity. This method may obtain a higher throughput than can be achieved by limiting the credit to the availed buffer, with the possibility that data may need to be discarded if errors occur. The receiver cannot discard previously received and acknowledged, but not yet delivered, SD or SD-with-POLL PDUs. In addition, the receiver must allocate sufficient buffer capacity to receive and deliver the SD or SD-with-POLL PDU with the sequence number which is equal to VR(R) at all times unless VR(R)=VR(H)=VR(MR). The granting of credit in excess of buffer capacity should only be performed if limited buffers are available to support the connection and if the LLC receiver can still maintain the quality of service (QOS) required for the connection through this method.

2.5.2.3.3.1.2.8.2 Local Flow Control

LLC events, such as receptions of PDUs and external and internal signals, are normally processed in the order in which they occurred. However, events pertaining to the exchange of LLC link status information have priority over other data transfer.

A device may detect congestion (for example, a long queuing delay) in its lower protocol layers. In this case, data transfer should be suspended in order to give priority to connection control messages. The means, by which an LLC entity decides whether or not congestion occurs, depends on the protocol environment, including protocol timer values.

If an LLC entity detects a local congestion ("lower layer busy"), it can elect to suspend the servicing AA-DATA request signals, AA-UNITDATA request signals, and MAA-UNITDATA request signals. It can also suspend the retransmission of requested SD or SD-with-POLL PDUs. The data transfer procedures allow this to occur without causing protocol errors.

Therefore, when transmitting PDUs to the peer receiver, all types of PDUs except for SD PDU, SD-with-POLL PDU, MD PDU, and UD PDU are given highest priority. The SD PDUs, SD-with-POLL PDUs, MD PDUs, and UD PDUs have equal priority. Retransmissions of SD PDUs have priority over new transmissions of SD PDUs if both PDU types are pending. These priorities are only internal to the LLC. The LLC's local flow control at user's interface is dependent on the device.

Figure 87:
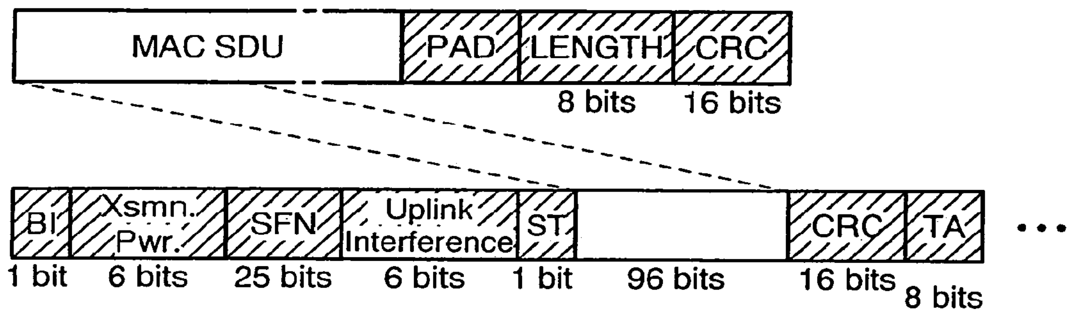
FIG. 87 is a diagram representing the frame format of an MDU and the frame format on the broadcasting channel (BCCH).
Figure 88:
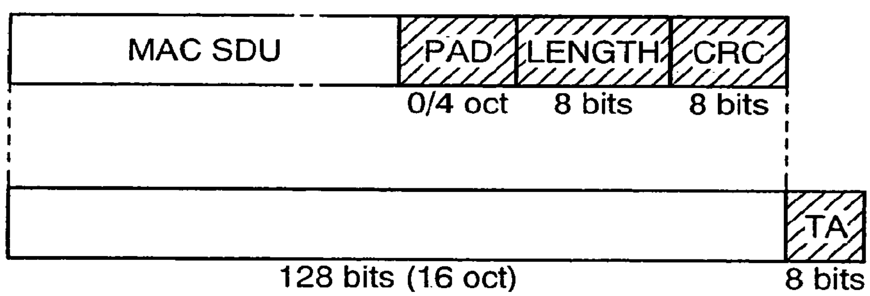
FIG. 88 is a diagram representing the frame format of an MDU and the frame format on the perch channel (PCH).
Figure 89:
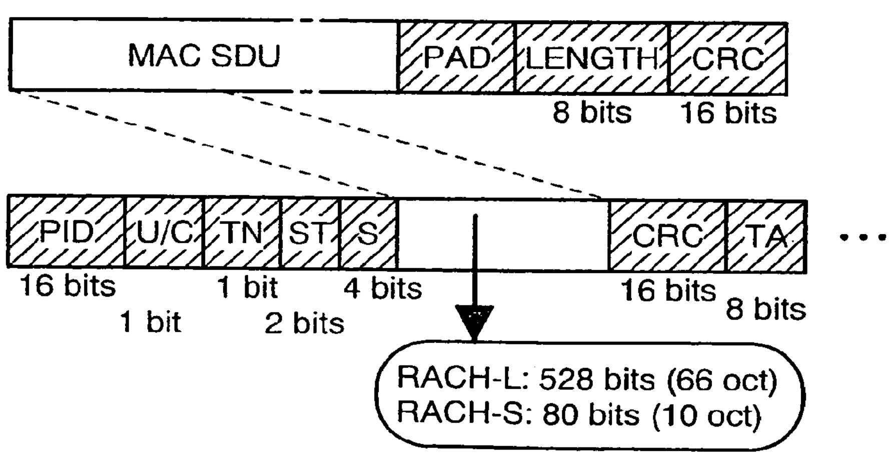
FIG. 89 is a diagram representing the frame format of an MDU and the format of long and short frame on the random access channel (RACH).
Figure 90:
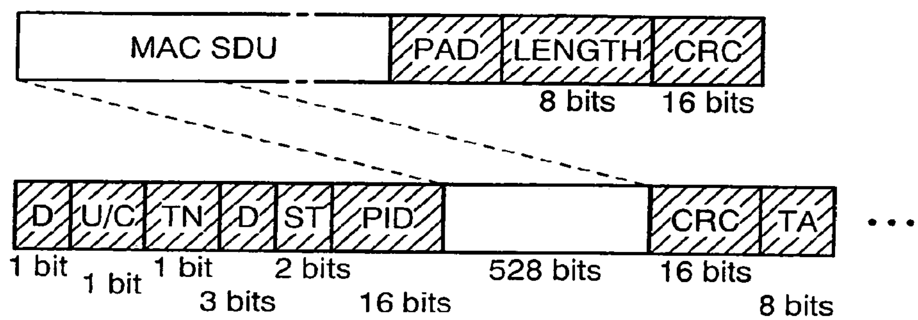
FIG. 90 is a diagram representing the frame format of an MDU and the format of long frame on the forward access channel (FACH).
Figure 91:
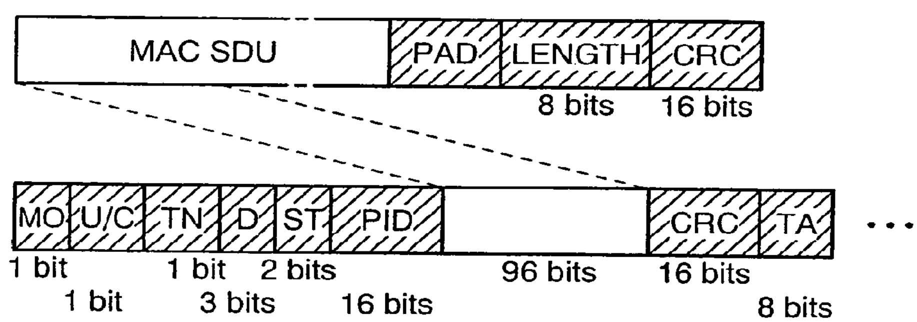
FIG. 91 is a diagram representing the frame format of an MDU and the format of short frame on the forward access channel (FACH).
Figure 92:
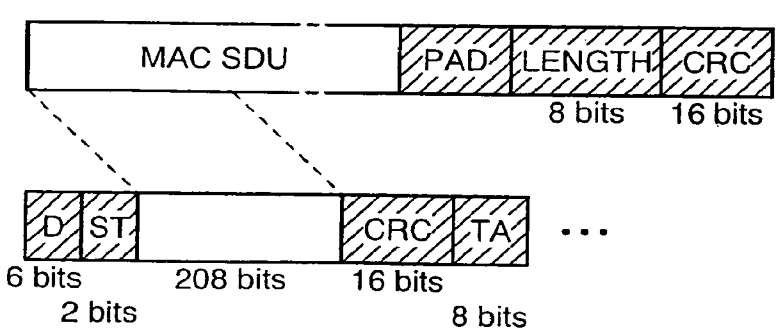
FIG. 92 is a diagram representing the frame format of an MDU and the frame format on the stand alone dedicated control channel (SDCCH)
Figure 93:
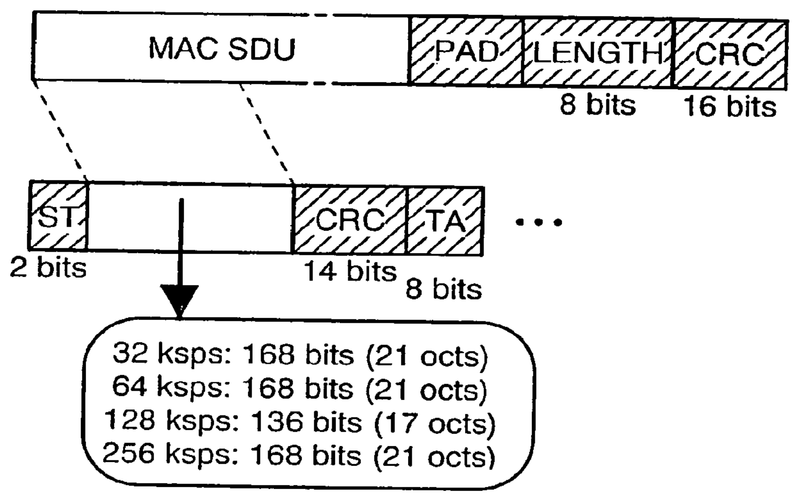
FIG. 93 is a diagram representing the frame format of an MDU and the frame format on the associated control channel (ACCH).
Figure 94:
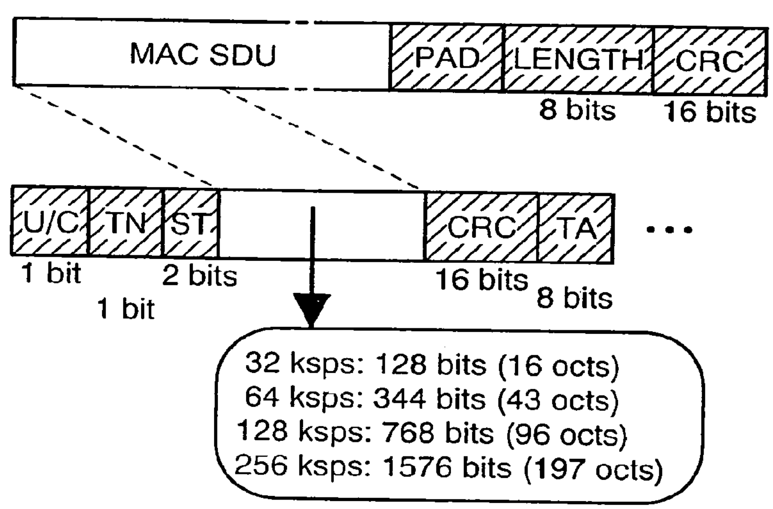
FIG. 94 is a diagram representing the frame format of an MDU and the frame format on the user packet channel (UPCH)

2.5.2.3.3.2. Format and Parameters of MAC PDU in MAC Sub-Layer and Frame Formats and Parameters on Logical Channels In the following, the format and parameters of an MAC PDU in the MAC sub-layer and frame formats and parameters on logical channels will be described with reference to FIGS. 87-94. FIG. 87 represents the frame format of an MDU and the frame format on the broadcasting channel (BCCH). FIG. 88 represents the frame format of an MDU and the frame format on the perch channel (PCH). FIG. 89 represents the frame format of an MDU and the format of long and short frame on the random access channel (RACH). FIG. 90 represents the frame format of an MDU and the format of long frame on the forward access channel (FACH). FIG. 91 represents the frame format of an MDU and the format of short frame on the forward access channel (FACH). FIG. 92 represents the frame format of an MDU and the frame format on the stand alone dedicated control channel (SDCCH). FIG. 93 represents the frame format of an MDU and the frame format on the associated control channel (ACCH). FIG. 94 represents the frame format of an MDU and the frame format on the user packet channel (UPCH).

a) PAD

A PAD field is included in an MAC PDU (MAC sub-layer frame) to extend the length of the MAC PDU to an integer multiple of the length of a layer 1 frame (extend to integer octets). The bit or all bits in the PAD field should be "0."

b) Length

A length field is interposed in the MAC PDU for indicating the amount of the MAC PDU including the PAD field by the octet.

c) CRC

A CRC field including an error detection code is attached to each MAC PDU, so that the receiver can detect any errors. The result should be used for a determination by a higher layer protocol as to whether the frame should be retransmitted. FIG. 561 represents the relationship between the length of CRC fields and channels through which corresponding frame is transmitted.

d) ST

A segment type (ST) field is included in each layer 1 frame for indicating that the corresponding layer 1 frame is the top, middle, or end of the original MAC PDU. The segment type is attached when an MAC PDU is disassembled to layer 1 frames, and referred when an MAC PDU evaluation is assembled from the layer 1 frames. FIG. 562 represents the bit coding of the ST field and the meaning thereof.

e) Others

A BI field in the layer 1 frame in FIG. 89 includes a BCCH identity (BI) information. FIG. 563 represents the bit coding of the BI field and the meaning thereof.

An SFN field in the layer 1 frame in FIG. 89 includes a system frame number (SFN) used for retrieval of the uplink long code phase and for synchronization of the super-frames.

An uplink interference field in the layer 1 frame in FIG. 89 includes uplink interference information indicating the uplink interference level for the corresponding sector measured most recently. FIG. 564 represents the bit coding of the uplink interference field and the meaning thereof. However, when the measurement has not been carried out, all of the bits in the uplink interference field should be one.

A PID field in the layer 1 frame in either of FIGS. 89 and 90 includes a personal identification (PID) of message or mobile station which is identified on the RACH or FACH. The identification shall be of the length of 16 bits. FIG. 565 represents the relationship between the usage of the PID field and the range of PID value.

A U/C field in the layer 1 frame on the RACH, FACH or UPCH represented in either of FIGS. 89-91, and 94 includes an identifier for indicating that either of user information or control information is included in the layer 1 frame. FIG. 566 represents the bit coding of the U/C field and the meaning thereof.

A TN field in the layer 1 frame on the RACH, FACH, or UPCH represented in either of FIGS. 89-91, and 94 includes an identifier of the termination or inception. FIG. 567 represents the bit coding of the TN field and the meanings thereof.

An MO field in the short layer 1 frame on the FACH represented in FIG. 91 includes a bit for identifying the mode of the FACH. FIG. 568 represents the bit coding of the MO field and the meanings thereof.

A CRC field including an error detection code is attached to each layer 1 frame as represented in FIGS. 87 through 94, so that the receiver can detect any errors. FIG. 569 represents the relationship between the length of CRC fields and channels through which corresponding frames are transmitted.

An S field is attached to the short layer 1 frame on the RACH as represented in FIG. 89. When an MAC PDU evaluation is assembled from the short layer 1 frames on the RACH, the bit in the S field contributes to prevent the same layer 1 frame from duplicating in the MAC PDU.

A TA field in the layer 1 frames represented in either of FIGS. 87 through 94 includes tail bits as a convolutional code.

A D field represented in either of FIGS. 90 through 92 contains dummy bits.

2.5.2.4 Layer 3 Messages

Next, messages of layer 3 of the invented system will be described. In the following description, ITU-T Recommendations X, I, and Q series will be sometimes shortened to X, I, and Q.

2.5.2.4.1 Protocol Architecture

Figure 95:
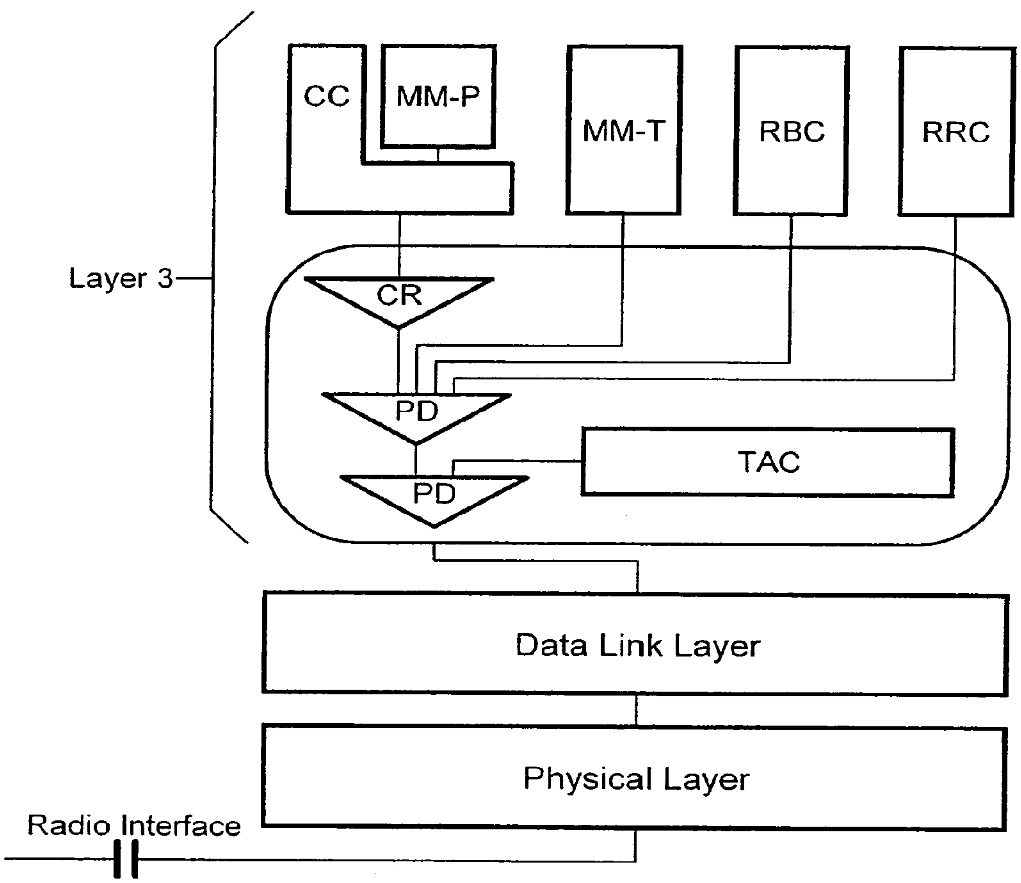
FIG. 95 is a conceptual diagram representing an example of the radio interface protocol architecture of layer 3 of the invented system.

First, the protocol architecture of layer 3 will be described. FIG. 95 is a conceptual diagram representing an example of the radio interface protocol architecture. Among the protocol control entities in FIG. 95, CC (call/connection control) entity complies with Q.2931 and controls call and connection. MM-P entity complies with Q.2932 and manages mobility services for users, e.g., user authentication. MM-T (terminal mobility management) entity manages mobility services for mobile terminals, e.g., terminal location registration and user authentication. RRC (radio resource control) entity treats initiations for allocation and reservation of radio resources and for activation and deactivation of handover. TAC (terminal association control) entity establishes and releases signaling connections between mobile terminals and the network.

2.5.2.4.2 Message Formats

Next, message formats for layer 3 will be described.

2.5.2.4.2.1 Formats Of CC Entity Messages

First, CC (call/connection control) entity messages will be described. FIG. 570 is a list representing various messages belonging to the CC entity message. In the following, the messages represented in FIG. 570 will be described with reference to lists in FIGS. 571 through 628. In the lists, "M" means mandatory information element while "0" means optional information element. "OF" means information element that will be used when ATM (asynchronous transfer mode) will be applied to radio transmission.

2.5.2.4.2.1.1 Alerting Message

First, an alerting message will be described. The alerting message is transferred from a called user to the network and then transferred from the network to a calling user in order to indicate that calling procedure of the called user is started. FIG. 571 through 573 form a list representing information elements constituting the alerting message. As represented in this list, the significance of the alerting message is global, the channel on which the alerting message is carried is the ACCH, and the direction is both.

In the list formed by FIG. 571, the connection identifier, narrow-band bearer capability information element, narrow-band high layer compatibility information element, mobile bearer capability information element, and mobile high layer information element should be studied further. The broadband higher layer information element is included if the higher layer information selection procedure is used. The mobile bearer capability information element will be used when bearer capability is selected.

2.5.2.4.2.1.2 Call Proceeding Message

Next, a call proceeding message will be described. The call proceeding message is transferred from the network to a calling user or from a called user to the network in order to indicate that requested call setup is initiated and no additional call setup will be accepted. FIG. 574 through 576 form a list representing information elements constituting the call proceeding message. As represented in this list, the significance of the call proceeding message is global, the channel on which the call proceeding message is carried is the SDCCH or ACCH, and the direction is both.

2.5.2.4.2.1.3 Connect Message

Next, a connect message will be described. The connect message is transferred from a called user to the network and from the network to a calling user in order to indicate that requested call is accepted by the called user. FIG. 577 through 581 form a list representing information elements constituting the connect message. As represented in this list, the significance of the connect message is global, the channel on which the connect message is carried is the ACCH, and the direction is both.

As represented in this list, if the called user wants to reply the calling user the broadband low layer compatibility information, the broadband low layer compatibility information element is included in the connect message from the called user to the network. If the connect message from the called user to the network includes the broadband low layer compatibility information element, the broadband low layer compatibility information element is also included in the connect message from the network to the calling user. For the broadband low layer information negotiation, this information element is included in the connect message as an option, but some network may not transfer this information element to the calling user.

2.5.2.4.2.1.4 Connect Acknowledge Message

Next, a connect acknowledge message will be described. The connect acknowledge message is transferred from the network to a called user in order to indicate that the call is established for the called user. In addition, the connect acknowledge message is transferred from a calling user to the network in order to enable symmetric call control procedure. FIG. 582 is a list representing information elements constituting the connect acknowledge message. As represented in this list, the significance of the connect acknowledge message is local, the channel on which the connect acknowledge message is carried is the ACCH, and the direction is both.

The notification identifier information element is included if the notification procedure is applied. A plurality of notification identifier information elements can be included in this message. The maximum length and the allowable number of the elements depend on the network.

2.5.2.4.2.1.5 Progress Message

Next, a progress message will be described. The progress message is transferred from the network or either of users in order to indicate the event as a call progress when the interworking is taken place. FIGS. 583 through 585 form a list representing information elements constituting the progress message. As represented in this list, the significance of the progress message is global, the channel on which the connect message is carried is the SDCCH or ACCH, and the direction is both.

2.5.2.4.2.1.6 Setup Message

Next, a setup message will be described. The setup message is transferred from a calling user to the network and from the network to a called user in order to initiate a call setup. FIGS. 586 through 594 form a list representing information elements constituting the setup message. As represented in this list, the significance of the setup message is global, the channel on which the setup message is carried is the SDCCH or ACCH, and the direction is both.

2.5.2.4.2.1.7 Release Message

Next, a release message will be described. The release message is transferred from the network or either of users in order to initiate that the device transmitting the release message has disconnected the FPLMTS connection for releasing connection identifier (if connection identifier is used) and call reference. The device which has received the release message should release the connection identifier, transmit a release complete message, and then release the call reference. The above description about the connection identifier will be valid only when the ATM will be applied on air interface in the future. FIG. 595 is a list representing information elements constituting the release message. As represented in this list, the significance of the release message is global, the channel on which the release message is carried is the SDCCH or ACCH, and the direction is both.

2.5.2.4.2.1.8 Release Complete Message

Next, a release complete message will be described. The release complete message is transferred from the network or either of users in order to initiate that the device transmitting the release complete message has released the connection identifier (if connection identifier is used) and call reference. The connection identifier can be reused by releasing. The device which has received the release complete message should release the call reference. The above description about the connection identifier will be valid only when the ATM will be applied on air interface in the future. FIG. 596 is a list representing information elements constituting the release complete message. As represented in this list, the significance of the release complete message is local, the channel on which the release complete message is carried is the SDCCH or ACCH, and the direction is both.

2.5.2.4.2.1.9 Information Message

Next, an information message will be described. The information message is transferred from the network or either of users in order to provide additional information, more specifically, additional information for call setup (e.g., overlap sending) or various information related to call. FIG. 597 is a list representing information elements constituting the information message. As represented in this list, the significance of the information message is local (however, information with global significance can be transferred by this message), the channel on which the information message is carried is the SDCCH or ACCH, and the direction is both.

2.5.2.4.2.2 Format of MM-T Entity Message

Next, MM-T (terminal mobility management) entity message will be described.

2.5.2.4.2.2.1 Message Belonging to MM-T Entity Message

FIG. 598 is a list representing a message (mobility facility message) belonging to the MM-T entity message.

With respect to various messages including the mobility facility message and others, discrimination can be carried out by the message type information element. That is, if more significant three bits in the message type information element are "011," the corresponding message belongs to messages prescribed in Q.2931. In addition, if the less significant five bits are "00010," the corresponding message belongs to messages prescribed in Q.2932. Otherwise, the corresponding message is the mobility facility message.

2.5.2.4.2.2.2 Mobility Facility Message

FIG. 599 is a list representing the generic formats of the mobility facility message. As represented in this list, the significance of the mobility facility message is local, and the direction is both.

2.5.2.4.2.2.3 Facility

The facility information of the mobility facility message in FIG. 599 is constituted of various information elements in fact. The contents of the facility information vary with the usage of the corresponding mobility facility message. Thus, lists of information elements of mobility facility message for various utilization will be explained.

(a) Mobility Facility Message from MS to Network for Terminal Location Registration FIGS. 600 and 601 form a list representing information elements constituting a mobility facility message transferred from the mobile station to the network for requesting terminal location registration when the terminal location should be updated or when the mobile station roams. As represented in the list, the protocol discriminator in this message indicates MM-T, the channel on which this message is carried is the SDCCH, and the direction is from MCF of the mobile station to SACF of the network.

(b) mobility facility message from Network to MS for Terminal Location Registration When the terminal location should be updated or when the mobile station roams, another type of mobility facility message (as a response message to the request of terminal location registration) is transferred from the network to the mobile station. This response message can be classified into three sorts represented in three lists of FIGS. 602 through 604, respectively. As generically represented in those lists, the protocol discriminator in each of these messages indicates MM-T, the channel on which each message is carried is the SDCCH, and the direction is from SACF of the network to MCF of the mobile station.

(b-1) Response Message Indicating "Return Result"

When the terminal location has been normally registered, the mobility facility message (response message) indicating "return result" represented in FIG. 602 is sent.

(b-2) Response Message Indicating "Return Error"

When an abnormality, for example, an application error has occurred, the mobility facility message (response message) indicating "return error" represented in FIG. 603 is sent.

(b-3) Response Message Indicating "Reject"

When an abnormality, for example, a discrepancy of an information element has occurred, the mobility facility message (response message) indicating "return error" represented in FIG. 604 is sent.

(c) Mobility Facility Message from Network to MS For TMUI Assignment

FIG. 605 is a list representing information elements constituting a mobility facility message transferred from the network to the mobile station for notifying the mobile station of the TMUI allocated to the mobile station. As represented in the list, the protocol discriminator in this message indicates MM-T, the channel on which this message is carried is the SDCCH, and the direction is from SACF and TACF of the network to MCF and TACAF of the mobile station.

(d) Mobility Facility Message from MS to Network for TMUI Assignment

Another type of mobility facility message (as a response message to the TMUI assignment) is transferred from the mobile station to the network. This response message can be classified into three sorts represented in three lists of FIGS. 606 through 608, respectively. As generically represented in those lists, the protocol discriminator in each of these messages indicates MM-T, the channel on which each message is carried is the SDCCH, and the direction is from MCF and TACAF of the mobile station to SACF and TACF of the network.

(d-1) Response Message Indicating "Return Result"

When the TMUI has been normally assigned, the mobility facility message (response message) indicating "return result" represented in FIG. 606 is sent.

(d-2) Response Message Indicating "Return Error"

When an abnormality, for example, an application error has occurred, the mobility facility message (response message) indicating "return error" represented in FIG. 607 is sent.

(d-3) Response Message Indicating "Reject"

When an abnormality, for example, a discrepancy of an information element has occurred, the mobility facility message (response message) indicating "return error" represented in FIG. 608 is sent.

(e) Mobility Facility Message from Network to MS for Authentication Challenge

FIGS. 609 and 610 form a list representing information elements constituting a mobility facility message transferred from the network to the mobile station for authenticating the mobile station by the mobile service switching center. As represented in the list, the protocol discriminator in this message indicates MM-T, the channel on which this message is carried is the SDCCH or ACCH, and the direction is from SACF and TACF of the network to MCF and TACAF of the mobile station.

(f) Mobility Facility Message from MS to Network for Authentication Challenge

Another type of mobility facility message (as a response message to the authentication challenge) is transferred from the mobile station to the network. This response message can be classified into three sorts represented in three lists of FIGS. 611 through 613, respectively. As generically represented in those lists, the protocol discriminator in each of these messages indicates MM-T, the channel on which each message is carried is the SDCCH or ACCH, and the direction is from MCF and TACAF of the mobile station to SACF and TACF of the network.

(f-1) Response Message Indicating "Return Result"

When the authentication has been normally requested, the mobility facility message (response message) indicating "return result" represented in FIG. 611 is sent.

(f-2) RESPONSE MESSAGE INDICATING "RETURN ERROR"

When an abnormality, for example, an application error has occurred, the mobility facility message (response message) indicating "return error" represented in FIG. 612 is sent.

(f-3) Response Message Indicating "Reject"

When an abnormality, for example, a discrepancy of an information element has occurred, the mobility facility message (response message) indicating "return error" represented in FIG. 613 is sent.

(g) Mobility Facility Message from Network to MS For Ciphering Start Notification FIG. 614 is a list representing information elements constituting a mobility facility message transferred from the network to the mobile station for notifying the mobile station of ciphering onset. As represented in the list, the protocol discriminator in this message indicates MM-T, the channel on which this message is carried is the SDCCH or ACCH, and the direction is from SACF and TACF of the network to MCF and TACAF of the mobile station.

(h) Mobility Facility Message from MS to Network for Ciphering Start Notification Another type of mobility facility message (as a response message to the ciphering start notification) is transferred from the mobile station to the network. This response message can be classified into three sorts represented in three lists of FIGS. 615 through 617, respectively. As generically represented in those lists, the protocol discriminator in each of these messages indicates MM-T, the channel on which each message is carried is the SDCCH or ACCH, and the direction is from MCF and TACAF of the mobile station to SACF and TACF of the network.

(h-1) Response Message Indicating "Return Result"

When the ciphering onset has been normally notified, the mobility facility message (response message) indicating "return result" represented in FIG. 615 is sent.

(h-2) Response Message Indicating "Return Error"

When an abnormality, for example, an application error has occurred, the mobility facility message (response message) indicating "return error" represented in FIG. 616 is sent.

(h-3) Response Message Indicating "Reject"

When an abnormality, for example, a discrepancy of an information element has occurred, the mobility facility message (response message) indicating "return error" represented in FIG. 617 is sent.

(i) Mobility Facility Message from Network to MS for IMUI Retrieval

FIG. 618 is a list representing information elements constituting a mobility facility message transferred from the network to the mobile station for inquiring of the mobile station as to the IMUI of the mobile station. As represented in the list, the protocol discriminator in this message indicates MM-T, the channel on which this message is carried is the SDCCH, and the direction is from SACF and TACF of the network to MCF and TACAF of the mobile station.

(j) Mobility Facility Message from MS to Network for IMUI Retrieval

Another type of mobility facility message (as a response message to the IMUI inquiry) is transferred from the mobile station to the mobile service switching center. This response message can be classified into three sorts represented in three lists of FIGS. 619 through 621, respectively. As generically represented in those lists, the protocol discriminator in each of these messages indicates MM-T, the channel on which each message is carried is the SDCCH, and the direction is from MCF and TACAF of the mobile station to SACF and TACF of the network.

(j-1) Response Message Indicating "Return Result"

When the IMUI has been normally inquired, the mobility facility message (response message) indicating "return result" represented in FIG. 619 is sent.

(j-2) Response Message Indicating "Return Error"

When an abnormality, for example, an application error has occurred, the mobility facility message (response message) indicating "return error" represented in FIG. 620 is sent.

(j-3) Response Message Indicating "Reject"

When an abnormality, for example, a discrepancy of an information element has occurred, the mobility facility message (response message) indicating "return error" represented in FIG. 621 is sent.

2.5.2.4.2.3 Format of RBC Entity Message

Next, RBC (radio bearer control) entity message will be described.

2.5.2.4.2.3.1 Messages Belonging to RBC Entity Message

FIG. 622 is a list representing messages belonging to the RBC entity message.

2.5.2.4.2.3.2 Classification of RBC Entity Message

RBC entity message can be classified into two types: one relates to setup and release of bearer so as to cause an RBC ID to change; and the other relates to maintain bearer so as not to cause an RBC ID to change. FIG. 623 is a list representing the classification of RBC entity message.

2.5.2.4.2.3.3.1 Basic Message Format

Next, the basic format of RBC entity message will be described. Each EBC entity message comprises a fundamental part and an optional extensional part. The fundamental part is constituted of one or more message-specific-parameter fields and one or more optional fundamental information fields. FIG. 96 represents the basic format of RBC entity message.

Message-specific-parameter field in FIG. 96 contains at least one unique parameter of the message.

Each fundamental information field includes at least one parameter in conformance with the procedure that the message initiates. In other words, fundamental information elements in RBC entity messages vary with the necessary procedure. Fundamental information field can be used without any design change of the invented system.

On the contrary, extensional information field may be used if the performance of the invented system is extended.

Operation indicator field asterisked in FIG. 96 is not included in the RBC entity message for the invented system. If a new type of message will be used in the system due to performance extension in the future, this field will be used.

2.5.2.4.2.3.3.2 Structures of Frames of RBC Entity Message

Figure 97:
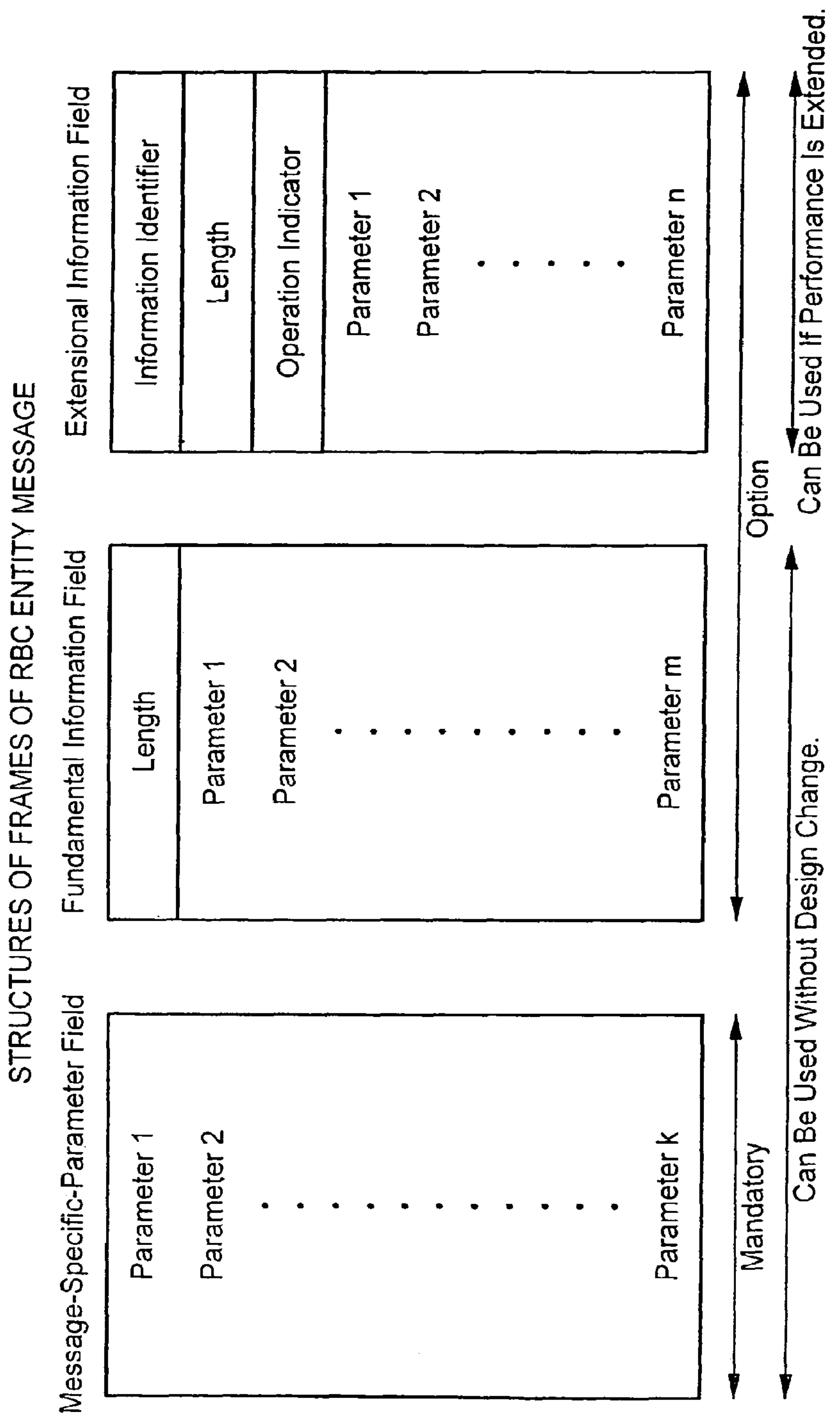
FIG. 97 represents structures of frames of an RBC entity message.

FIG. 97 represents structures of frames of an RBC entity message. As represented in FIG. 97, message-specific-parameter field is mandatory. As to each parameter, if the length is variable, the length field indicates that there is no instruction. As to each parameter, if there is not a parameter that may be used optionally, this fact is indicated by a bit or bits for indicating whether there is a parameter or not.

2.5.2.4.2.3.4 Specific Message Formats

Next, specific formats of various messages belonging to RBC entity message will be described.

2.5.2.4.2.3.4.1 Radio Bearer Setup Message

First, radio bearer setup message will be described. This message is sent from the network to a mobile station in order to setup a radio bearer therebetween. FIG. 624 is a list representing the format of radio bearer setup message. The protocol discriminator of the message indicates RBC, the channel on which the message is carried is the SDCCH or ACCH, and the direction is from the network to the mobile station.

2.5.2.4.2.3.4.2 Radio Bearer Release Message

This message is sent from the network to a mobile station or from a mobile station to the network in order to release a radio bearer therebetween. FIG. 625 is a list representing the format of radio bearer release message. The protocol discriminator of the message indicates RBC, the channel on which the message is carried is the ACCH, and the direction is from the network to the mobile station or from the mobile station to the network.

2.5.2.4.2.3.4.3 Radio Bearer Release Complete Message

This message is sent from the network to a mobile station or from a mobile station to the network in order to notify of the release completion of a radio bearer therebetween. FIG. 626 is a list representing the format of radio bearer release complete message. The protocol discriminator of the message indicates RBC, the channel on which the message is carried is the ACCH, and the direction is from the network to the mobile station or from the mobile station to the network.

2.5.2.4.2.3.4.4 Handover Command Message

This message is sent from the network to a mobile station in order to indicate the radio bearer therebetween that is added, deleted, replaced, or substituted at handover. FIG. 627 is a list representing the format of handover command message. The protocol discriminator of the message indicates RBC, the channel on which the message is carried is the ACCH, and the direction is from the network to the mobile station.

2.5.2.4.2.3.4.4 Handover Response Message

This message is sent to respond to a handover command massage, the handover command message initiating diversity handover (DHO) branch deletion, DHO branch addition, code replacement, and any combination thereof. FIG. 628 is a list representing the format of handover response message. The protocol discriminator of the message indicates RBC, the channel on which the message is carried is the ACCH, and the direction is from the mobile station to the network.

2.5.2.4.2.4 Format of RRC Entity Message

Next, RRC (radio resource control) entity message will be described.

2.5.2.4.2.4.1 Message Belonging to RRC Entity Message

FIG. 629 is a list representing a message (radio resource facility message) belonging to the RRC entity message. Utilization of the ROSE (remote operations service element) protocol as the protocol for the RRC entity should be studied further. Therefore, this description is based on the ROSE protocol.

2.5.2.4.2.4.2 RRC Entity Message Format 2.5.2.4.2.4.2.1 Mobility Facility Message FIG. 630 is a list representing the format of the RRC facility message sent from a mobile station to the network for initiating the RRC procedure. As represented in this list, the protocol discriminator of the message indicates RRC, the channel on which the message is carried is the SDCCH or ACCH, and the direction is from the mobile station to the network.

2.5.2.4.2.5 TAC Entity Messages

Next, TAC (terminal association control) entity messages will be described. FIG. 631 is a list representing TAC entity messages. FIG. 632 is a list representing the relationship between TAC entity message and information flow. The messages will be explained in detail.

2.5.2.4.2.5.1 Terminal Association Setup Message

This message is sent from a mobile station to the network to indicate the start of the terminal association. FIG. 633 is a list representing the format of the terminal association setup message. The protocol discriminator of the message indicates TAC, the channel on which the message is carried is the SDCCH, and the direction is from TACAF of the mobile station to TACF of the network.

2.5.2.4.2.5.2 Terminal Association Connect Message

This message is sent from the network to the mobile station to respond to the terminal association setup message for notifying of the requested terminal association can be achieved normally. FIG. 634 is a list representing the format of the terminal association connect message. The protocol discriminator of the message indicates TAC, the channel on which the message is carried is the SDCCH, and the direction is from TACF of the network to TACAF of the mobile station.

2.5.2.4.2.5.3 Paging Response Message

This message is sent from a mobile station to the network to respond to paging. FIG. 635 is a list representing the format of the paging response message. The protocol discriminator of the message indicates TAC, the channel on which the message is carried is the SDCCH, and the direction is from TACAF of the mobile station to TACF of the network.

2.5.2.4.2.5.4 Terminal Association Release Message

This message is sent from the network to the mobile station or from the mobile station to the network in order to request to release the terminal association therebetween. FIG. 636 is a list representing the format of the terminal association release message. The protocol discriminator of the message indicates TAC, the channel on which the message is carried is the SDCCH or ACCH, and the direction is from TACF of the network to TACAF of the mobile station and from TACAF of the mobile station to TACF of the network.

2.5.2.4.2.5.5 Terminal Association Release Complete Message

This message is sent from the network to the mobile station or from the mobile station to the network in order to respond to the terminal association release message. FIG. 637 is a list representing the format of the terminal association release complete message. The protocol discriminator of the message indicates TAC, the channel on which the message is carried is the SDCCH or ACCH, and the direction is from TACF of the network to TACAF of the mobile station and from TACAF of the mobile station to TACF of the network.

2.5.2.4.2.5.6 Page Authorized Message

This message is sent from the network to the mobile station to notify that the terminals have been associated. FIG. 638 is a list representing the format of the page authorized message. The protocol discriminator of the message indicates TAC, the channel on which the message is carried is the SDCCH or ACCH, and the direction is from TACF of the network to TACAF of the mobile station.

2.5.2.4.2.6 Other Messages

In the following, other layer 3 messages which are carried on RACH, FACH, BCCH, and PCH will be described.

2.5.2.4.2.6.1 Signaling Channel Setup Request Message

This message is sent from a mobile station to a base transceiver system (BTS) in order to request to setup an SDCCH therebetween. FIG. 639 is a list representing the format of the signaling channel setup request message. The channel on which the message is carried is the RACH, and the direction is from SCMAF of the mobile station to SCMF of the BTS.

Signaling channel setup request messages from mobile stations which randomly access the BTS can be identified by PIDs (personal identifications) corresponding to the mobile stations. As described above, a PID is a random number originally determined by the corresponding mobile station and is included in a layer 1 frame.

2.5.2.4.2.6.2 Signaling Channel Setup Response Message

A signaling channel setup response message is sent from a BTS to a mobile station in order to setup an SDCCH therebetween. FIG. 640 is a list representing the format of the signaling channel setup response message. The channel on which the message is carried is the FACH, and the direction is from SCMF of the BTS to SCMAF of the mobile station. Signaling channel setup response messages to mobile stations can be identified by PIDs at the mobile stations.

A signaling channel setup failure message is sent from a BTS to a mobile station in order to notify of rejection of the request to setup an SDCCH therebetween. FIG. 641 is a list representing the format of the signaling channel setup failure message. The channel on which the message is carried is the FACH, and the direction is from SCMF of the BTS to SCMAF of the mobile station. Signaling channel setup failure messages to mobile stations can be identified by PIDs at the mobile stations.

2.5.2.4.2.6.3 Broadcast Information Messages

A first broadcast information message is sent from a BTS to mobile stations in order to notify of various information, e.g., control channel structure information, information regarding mobile station decision of visited zone, and restriction information. FIG. 642 is a list representing the format of the first broadcast information message. The channel on which the message is carried is the BCCH, and the direction is from BCFr of the BTS to each BCAF of mobile station.

A second broadcast information message is sent from a BTS to mobile stations in order to notify of call acceptance information. FIG. 643 is a list representing the format of the second broadcast information message. The channel on which the message is carried is the BCCH, and the direction is from BCFr of the BTS to each BCAF of mobile station.

2.5.2.4.2.6.4 Paging Message

This message is sent from a BTS to mobile stations in order to page to notify of a first calling a specific mobile station. FIG. 644 is a list representing the format of the paging message. The protocol discriminator of the message indicates TAC, the channel on which the message is carried is the PCH, and the direction is from BCFr of the network to each TACAF of mobile station.

The paged MS ID in the list indicates the TMUI or IMUI of the paged mobile station. At the top of the paged MS ID field, an I/T bit is arranged for indicating that either of IMUI and TMUI is used.

The maximum length of the paging message is 112 bits. Coding manner of the paged MS ID asterisked in the list should be studied further. Even when IMUI is used for the paged MS ID, it is unnecessary to indicate all bits of IMUI by the paged MS ID since lower bits of the UMUI can be recognized from the PCHs calculation number.

2.5.2.4.3 Formats of Information Elements in Messages

Next, formats of information elements in the aforementioned messages will be described.

2.5.2.4.3.1 Formats of Information Elements in CC Entity MESSAGES 2.5.2.4.3.1.1 Common Information Elements in CC Entity Messages First, information elements which are common in CC entity messages will be described. Each of CC entity protocol messages may comprise:

(a) protocol discriminator, (b) call reference, (c) message type identifier, including a message compatibility instruction indicator, and (d) variable length information elements if necessary.

Information elements (a), (b), (c), and (d) are included in each of CC entity protocol messages commonly, as represented in FIG. 98. However, variable length information elements differ with message types. Information elements (a), (b), and (c) are arranged in the order represented in FIG. 98.

2.5.2.4.3.1.1.1 Protocol Discriminator

Protocol discriminator will be described next. The protocol discriminator is designed for distinguishing the CC entity message from other messages in the invented system. In addition, the protocol discriminator is used for distinguishing the message in the invented system from other messages prepared from OSI network layer protocol data unit encoded in compliance with other ITU-T recommendations, TTC standard or other standards.

The protocol discriminator is arranged at the top of each CC entity message as represented in FIG. 98. The protocol discriminator is of eight-bit length as represented in FIG. 99 and encoded in a manner represented in FIG. 645.

In the invented system, the CC entity messages does not use the same signaling virtual channel as that of another layer 3 protocol message. Therefore, the encoding manners of the protocol discriminator are different. However, if the other layer 3 protocol message is capsuled according to ITU-T Recommendation Q.2931, this message forms an exception.

The values in FIG. 645 are reserved for distinguishing the protocol discriminator from the first octet of a packet, including a general format discriminator, according to ITU-T Recommendation X.25.

2.5.2.4.3.1.1.2 Call Reference

Call reference is designed for identifying in a local user-network interface a message involved in a single call and is not used at the terminal devices interconnected via B-ISDN (broadband aspects of integrated services digital network). The call reference is arranged at the second part of each CC entity message and encoded in a manner represented in FIG. 100. The entire length of the call reference information element is one octet and the length is indicated by bits 1 through 4.

As represented in FIG. 100, the call reference information element includes a call reference value and a call reference flag. The call reference value of which all bits are "zero" (see FIG. 100) is reserved for a global call reference. The call reference value of which all bits are "one" (see FIG. 101) is reserved for a dummy call reference.

The call reference value is allocated to a call by the calling user side of a user-network interface. As a general rule, the sole call reference value is allocated to a call in a single signaling virtual channel by the calling user side. The call reference value is allocated at call onset and maintained to be used throughout the call. After termination of a call, the call reference value is released and may be allocated to another call.

It is possible that both sides of a signaling virtual channel link allocate the same call reference value to two calls, respectively, and the same call reference value is used for two calls in a single signaling virtual channel. In order to avoid such a coincidence by a wrong scenario, it is not desirable to reuse the released call reference value immediately after the release.

The call reference flag is restricted to have zero or one. The call reference flag identifies which side of the signaling virtual channel allocates the corresponding call reference. That is, with respect to messages from the calling user to the called user, the call reference flag is zero. With respect to messages from the called user to the calling user, the call reference flag is one. Therefore, although the same call reference value is simultaneously used for messages in two directions, they can be distinguished from each other.

The call reference flag is also similarly used for a global call reference, for example, at the initial setup procedure. As mentioned above, all bits of a global call reference value are zero (see FIG. 100). The device, which has received a message including a global call reference, should interpret that this message is valid for all messages on the signaling virtual channel.

On the other hand, all bits of a dummy call reference value are one (see FIG. 101). In the future, a dummy call reference value will be used for a specific additional service. The call reference flag is also similarly used for a global call reference. Dummy call reference is not used in procedures of the invented system, so that devices of the invented system should discard a message including a dummy call reference.

2.5.2.4.3.1.2 Message Type Identifier

Next, message type identifier, including message compatibility instruction indicator, will be described.

The message type identifier is designed for identifying the function of the message transmitted. The message type identifier is arranged at the third part of each CC entity message and encoded in a manner represented in FIGS. 102, 646, and 647. FIG. 102 is a diagram representing the format of the message type identifier. FIGS. 646 and 647 form a table representing the coding of the message type identifier. As mentioned in FIG. 646, octet 1 of the message type identifier encoded as "00000000" is used for an escape code for a nationally specific message type. In addition, as mentioned in FIG. 646, octet 1 of the message type identifier encoded as "11111111" is reserved for extension for the case that all other values have been used.

On the other hand, the message compatibility instruction indicator is used by the message source terminal for explicitly instructing peer entity operation at the message destination terminal. The format and the coding manner of the message compatibility instruction indicator are represented in FIGS. 102 and 647. The message compatibility instruction indicator is valid only in the defined local interval. It is optional for the network to decide which value is set to the message compatibility instruction indicator of a message transmitted from the network to a user terminal insofar as the coding is not prescribed by another manner.

2.5.2.4.3.1.3 Variable Length Information Elements According to FPLMTS

Next, variable length information elements according to FPLMTS will be described.

2.5.2.4.3.1.3.1 Coding

Coding of the variable length information elements of CC entity messages will be described hereinafter. The coding was studied in order that the device which processes messages can detect information elements necessary for the process and can ignore other elements.

FIGS. 103 and 104 represent the formats of the variable length information elements according to FPLMTS. FIGS. 648 and 649 form a list representing the coding of the variable length information elements according to FPLMTS. Bit coding represented in FIGS. 103, 104, 648, and 649 are reserved for the information elements that will be described later.

As mentioned in FIG. 104, information element identifier encoded as "11111111" is reserved for extension. If all other information element identifiers have been used, further 65536 information elements can be identified by virtue of the extension.

In the CC entity message, variable length information elements can be arranged in random order, but the following constitutes exceptions.

(a) If the broadband repeat indicator information element is not included and the same kind of information elements is included, the same kind of information elements should be arranged in succession. However, this rule is not applied for broadband locking shift information elements and broadband non-locking shift information elements.

(b) If the broadband repeat indicator information element is included and the same kind of information elements is included, the following rules will be applied.

The broadband repeat indicator information element should be arranged directly before the first element among the same kind of information elements.

The first element among the same kind of information elements, which is arranged directly after the broadband repeat indicator information element, should be interpreted to have the highest priority. The same kinds of information elements should be interpreted in such a manner that the element of higher priority is arranged ahead.

The information elements arranged after the broadband non-locking shift information element should be processed as an information element in the application of the above-described rules.

Only one repetition of information element in the message with the broadband repetition indicator information element will not be considered an error. That is, the broadband repetition indictor should be ignored.

(c) If the broadband locking shift information element is used, the rule should be applied to all of the information elements after it. The order of the information elements is prescribed by codes indicated in the broadband locking shift information element.

(d) If the broadband non-locking shift information element is used, the broadband non-locking shift information element should be arranged directly before the information element which is subject of that.

If reserved bits are included in the description of the information used in the invented system, all of the reserved bits should be set to zero. Although the reserved bits of a received information element are not set to zero, the process for the reserved bits is not carried out.

FIGS. 648 and 649 represent the coding manner of the information element identifier. The information element identifier includes an information element compatibility instruction indicator at octet 2 thereof as represented in FIG. 649. The information element compatibility instruction indicator is valid only in the defined local interval. It is optional for the network to decide which value is set to the information element compatibility instruction indicator of a massage included in a message transmitted from the network to a user terminal insofar as the coding is not prescribed by another manner.

Octets 3 and 4 of the information element cooperate to indicate the length of the information elements minus the total length of the information element identifier field, information element compatibility instruction indicator field, and information element length indicator field itself. For the information element length indicator, the number of octets in the information element is encoded into a binary code. The information element length indicator is of a fixed length of two octets. The coding manner of the information element length indicator should comply with the coding rule of integer described in this section.

The invented system permits an information element, of which the content is empty, to present. For example, it is possible that a setup message includes a called number information element of which the octet length is zero. In such cases, the receiving device treats in such a manner that the information element is not interpreted to be included. Similarly, the exclusion of an expected information element is interpreted as an "empty information element" at processing. The "empty information element" is the information element which has a (valid) information element identifier and is of a length of zero.

In addition, the following rules are applied to information element coding in the invented system.

(a) The variable length information element constitutes of a single octet or a group of octets. A number is allocated to each single octet or octet group for facilitating reference. The first number of the octet number indicates single octet or octet group.

(b) Each octet group is an independent unit in an information element. The format of octet group can be defined in the following fashion or other fashions.

(c) Octet groups are prepared by using any extension method. An extension method wherein bit eight is used as the extension bit, and an octet (N) will be extended to the next octets (Na, Nb, . . . ) is preferable. For example, a method based on the below rule can be utilized.

Bit value, zero, indicates that the corresponding bit is not end. Bit value, one, indicates that the corresponding bit is end. If an octet (e.g., Nb) exists, preceding octets (N) and (Na) also exist.

Bit eight may be indicated in the descriptions in sections 2.5.2.4.3.1.3.5, and so on.

"0/1 extension" is used when another octet will follow an octet and these octets belong to the same octet group.

"1 extension" is used when another octet will follow an octet and these octets belong to the same octet group.

"0 extension" is used when another octet will absolutely follow an octet and these octets belong to the same octet group.

When a specification is added, an additional octet can be defined after the preceding last octet (In this case, the description of "1 extension" is changed to the description of "0/1 extension." Therefore, devices on the invented system should accept such an additional octet. However, it is unnecessary that each of the devices interprets the additional octet or functions in accordance that.

(d) In addition to the above-described extension method, the indication of bits eight to one of octet (N) can be extended to the next octets (N.1) and (N.2).

(e) The extension methods (c) and (d) can be associated. However, the extension method (c) is of high priority. Accordingly, all of octets (Na, Nb . . . ) must precede octets (N.1, N.2, . . . ). This rule should be applied to the case that octets (N.1, N.2, . . . ) are extended in accordance with the extension method for octets (Na, Nb, . . . ). The same rule should be applied to the case that the extension method (d) is repeated. That is, octets (N.1, N.2 . . . ) should precede octet (N.2).

(f) Optional octets are marked with asterisks.

(g) If an information element is assembled using subfield identifiers, these subfield identifiers are independent of position. In other words, it is unnecessary that they are aligned in a specific order.

However, it is impossible to repeat to use the extension method (c). That is, the extension method for octet 4*a* cannot be applied to the octet which should become octet 4*b*. In addition, a protocol designer should pay attention for guaranteeing that the resulting coding leads a sole interpretation although a plurality of extension methods are used. Furthermore, it is prescribed that the coding standard field is attached to all information elements. The information element of which the coding standard field is prescribed to "national standard" should be formatted in the same manner as the standard format of the invented system.

The following riles are applied to integer coding of ITU-T Recommendation Q.2931. When coding is not designated, the rules are applied.

(a) When an integer is encoded to the length equal to or more than two octets, the octet with a less octet number includes superior bits. Especially, the octet with the least octet number includes the MSB (most significant bit) while the octet with the greatest octet number includes the LSB (least significant bit).

(b) With reference to a field which is within an octet or constitutes a part of an octet, the following rules are applied.

A bit with a greater bit number constitutes a superior bit.

Especially, the bit with the greatest bit number indicates the MSB (most significant bit).

Especially, the bit with the least bit number indicates the LSB (least significant bit).

Bit coding is carried out from the bit with less bit number (from right). That is, preceding parts of zero appear at the side of greater bit number (left) in an octet or field.

(c) When integer values are expressed in fixed length octets, bit coding is carried out from the octet with greater octet number. That is, preceding zero parts appears at the side of less octet number.

(d) When integer values are expressed in variable length octets (e.g., when bit 8 is used as an extension bit), coding shall be performed so that it becomes the smallest number of octets. Octets, of which all the preceding bits are "0," do not exist.

2.5.2.4.3.1.2 Extension of Code Sets

Next, extension of code sets will be described. When the format described at section 2.5.2.4.3.1.3.1 is used, the information element identifier may take a plurality values.

Each of information element identifiers may be extended to eight code sets. To facilitate to shift from a code set to another code set, a common information element identifier is used for these code sets. Based on the contents of the shift information element, the code set used for the next-coming information element group or information element can be identified. The code set used at an arbitrary given time is used as an "busy code set," and code set 0 will be considered the initial busy code set" implicitly. In addition, in the invented system, two code set shift procedures: locking shift and non-locking shift procedures are applied.

Reservation status of code sets will be noted in the following.

Code sets 1 through 3 are reserved for future use of ITU-T or TTC.

Code set 4 is reserved for standard use of ISO or IEC.

Code set 5 is reserved for an information element group utilized domestically.

Code set 6 is reserved for an information element group specialized for the public or private network.

Code set 7 is reserved for an information element group specialized for users.

In addition, the coding rules prescribed in section 2.5.2.4.3.1.3.1 will be applied to information elements belonging to an arbitrary busy code set.

Shift from busy code set to another code set (by locking shift) is possible only when the value of new code set is higher than that of the former code set.

When using non-locking shift procedure, the information elements in code sets 4, 5, 6 and 7 may appear together with one in the busy code set, i.e., code set 0 (see section 2.5.2.4.3.1.3.4).

The user or network device should have the ability to recognize both locking and non-locking shift information elements and determine the length of information elements that follow them. The device, however, does not need to interpret or function according to the content of these information elements. This enables the equipment to decide the start point of following information elements.

Code set 7 shall be processed in the first switching equipment in the local network in accordance with the unrecognized information element processing procedure (see ITU-T Recommendation Q.2931) unless the service definition in the future, agreement by both parties, or readiness for special user support via the local network are provided.

Code set 6 is reserved for an information element group specialized for local networks (public or private networks). It is meaningless when messages are transmitted across the boundary between local networks and the boundary between national or international networks. Therefore, the information element in code set 6 shall be processed in accordance with the procedure for the information element which cannot be recognized by the first switching equipment after the message is transmitted across the boundary of the local network (see Section 5.6.8.1 of ITU-T Recommendation Q.2931) unless an agreement on two networks is concluded.

Code set 5 is reserved for an information element group utilized domestically. It is meaningless when messages are transmitted across the boundary between nations. Therefore, the information element in code set 5 shall be processed in accordance with the procedure for the information element which cannot be recognized by the first switching equipment after the message is transmitted across the boundary between nations (see Section 5.6.8.1 of ITU-T Recommendation Q.2931) unless an agreement on two networks is concluded.

Code set 4 is reserved for standard use of ISO or IEC.

Code sets 1 through 3 are reserved for future use of ITU-T or TTC.

2.5.2.4.3.1.3.3 Broadband Locking Shift Procedure

Next, broadband locking shift procedure will be described. In the broadband locking shift procedure, an information element is used to indicate a new busy code set. The indicated code set is continuously used until another broadband locking shift information element appears to indicate the use of another code set. For example, presume that code set 0 is "busy" at the start of analysis of message contents. When another broadband locking shift information element appears to indicate the use of code set 5, the information element identifier assigned by code set 5 shall be applied to the next and following information elements until another shift information element appears.

This procedure is used only for shifting from to a new code set of which the value is higher than the former code set, and relates to only messages including the broadband locking shift information elements. The initial busy code set at the start of analysis of message contents is code set 0.

FIGS. 105 and 650 represent the coding format of the broadband locking shift information element.

2.5.2.4.3.1.3.4 Broadband Non-Locking Shift Procedure

Next, broadband non-locking shift procedure will be described.

The broadband non-locking shift procedure is used for temporarily shifting to a designated code set with lower or higher priority. In the broadband non-locking shift procedure, a broadband non-locking shift information element is used to indicate a busy code set which contributes for interpretation of the next single information element. After interpreting the next information element, the busy code set used before non-locking shift shall be used again for interpreting arbitrary following information elements. For example, assume that code set 0 is busy at the start of analysis of message contents. When a broadband non-locking shift information element appears to indicate the use of code set 6, the information element identifier assigned by code set 6 shall be applied only to the next information element. After interpreting it, code set 0 shall be applied again to interpret following information elements. The broadband non-locking shift information element shall not be interpreted as an error even if it indicates the current code set.

A broadband locking shift information element cannot be arranged directly after a broadband non-locking shift information element. The reception of the combination thereof should be interpreted as that only the broadband locking shift information element is received.

FIGS. 106 and 651 represent the coding format of the broadband non-locking shift information element.

2.5.2.4.3.1.3.5 AAL Parameters

Next, AAL (ATM adaptation layer) parameters will be described. AAL parameters are not necessary for the invented system, but it is possible that they are necessary when the ATM will be applied on air interface in the future (this should be studied further).

AAL parameter information element is formulated to indicate AAL parameters which are requested for an AAL procedure element used for a call and which are significant from end to end. This includes all parameters for the AAL sub-layer which can be selected by users. The contents of this information element are transparent to the network except during interworking.

The AAL parameter information element should be coded as shown in FIGS. 107 through 111 and 652 through 654. The maximum length of this information element should be 21 octets.

In FIG. 108, the octets marked with "Note" are included only when octet 7.1 indicates n×64 kbps or n×8 kbps. In FIGS. 109 and 110, the indication of octet groups 6 through 8 used in connect message is designated in ITU-T Recommendation Q.2931.

2.5.2.4.3.1.3.6 ATM Traffic Descriptor

Next, ATM traffic descriptor will be described. ATM traffic descriptor is not necessary for the invented system, but it is possible that this is necessary when the ATM will be applied on air interface in the future (this should be studied further). ATM traffic descriptor is formulated to indicate a traffic parameter set contributing to regulating the traffic control capability.

In the invented system, the value of ATM peek cell rate (TTC Standard JT-371), which is indicated by the ATM traffic descriptor, designates the user plane information rate and total amount of the end-to-end OAM (operation, administration, and maintenance) F5 flows generated by users. When the user attempts to use an end-to-end OAM F5 flow message, the peak cell rate in the direction reverse to unidirectional connection should not be indicated by zero. The peak cell rate is the number of cells per second and is represented with an integer in the 3 octets preceded by the sub-field.

The ATM traffic descriptor information element should be coded as shown in FIGS. 112 and 655. The maximum length of this information element should be 20 octets.

The peak cell rate of cells of which the CLP (cell loss priority) equals to one is not represented in FIG. 112. However, if the peak cell rate of cells of which the CLP equals to zero is indicated, the difference between the peak cell rate of cells of which the CLP equals to zero or one and the peak cell rate of cells of which the CLP equals to zero should be used as the peak cell rate of cells of which the CLP equals to one in the network resource allocation. However, if only the peak cell rate of cells of which the CLP equals to one or zero is indicated, a complete peak cell rate should be used by cells with which the CLP is equal to zero.

2.5.2.4.3.1.3.7 Broadband Bearer Capability

Next, broadband bearer capability will be described. Broadband bearer capability is not a necessary parameter for the invented system, but it is possible that this is necessary when the ATM will be applied on air interface in the future (this should be studied further).

The broadband bearer capability information element is formulated to indicate needed broadband connection-oriented-bearer service (see ITU-T Recommendation F.811), which are provided by the network. Therefore, the broadband bearer capability information element is included in messages used by the network. With reference to the use of the broadband bearer capability information element concerning confirming the communication possibility, refer to ITU-T Recommendation Q.2931.

The default for broadband bearer capability does not exist. Therefore, the broadband bearer capability information element can be processed by devices of the network and user. The broadband bearer capability information element should be coded as shown in FIGS. 113 and 656. The maximum length of this information element should be 7 octets.

The octet marked with "Note" in FIG. 113 can be included when octet 5 indicates bearer class X.

2.5.2.4.3.1.3.8 Broadband High Layer Information (B-HLI)

Next, broadband high layer information will be described. Broadband high layer information element is formulated to provide means for checking communication capability of addressed entity (e.g., remote user and interworking unit addressed by a calling user, and a higher layer function node of network). The broadband high layer information element is carried transparently between a calling entity (e.g., calling user) and an addressed destination entity in B-ISDN.

The broadband high layer information element should be coded as shown in FIGS. 114 and 657. The maximum length of this information element should be 13 octets.

2.5.2.4.3.1.3.9 Broadband Low Layer Information (B-LLI)

Broadband low layer information will be described next. Broadband low layer information element is formulated to provide means for checking communication capability of addressed entity (e.g., remote user and interworking unit addressed by a calling user, and a higher layer function node of network).

The broadband low layer information element is carried transparently between a calling entity (e.g., calling user) and an addressed destination entity in B-ISDN. The broadband low layer information element is also carried transparently from the addressed destination entity to the calling entity for negotiation of broadband low layer information (refer to ITU-T Recommendation Q.2931).

The broadband low layer information element should be coded as shown in FIGS. 115, 116, 658 through 660. The maximum length of this information element should be 17 octets.

The octet marked with "Note 1" in FIG. 115 is included only when octet 6 indicates the procedure of acknowledge type HDLC. The octet marked with "Note 2" exists only if octet 6 indicates the user-specific layer 2 protocol. The octet marked with "Note 3" exists only if octet 7 indicates the layer 3 protocol in accordance with the ITU-T Recommendation X.25, ISO/IEC 8208, ITU-T Recommendation X.223, or ISO/IEC 8878 in FIGS. 658 through 660. The octet marked with "Note 4" exists only if octet 7 indicates the user-specific layer 3 protocol. The octets marked with "Note 5" exist only if octet 7 indicates ISO/IEC TR9577.

2.5.2.4.3.1.3.11 Called Party Number

Called party number will be described next. Called party number information element is formulated to indicate the called party. The called party number information element should be coded as shown in FIGS. 117 and 661. The maximum length of this information element should depend on the network.

In FIG. 117, the number digits appear in the same order as input, beginning from inferior four bits in octet 6. The digits are coded with BCD. When the use of NASP address is indicated in the address/numbering plan identification, the address shall be coded with the expression of ITU-T Recommendation X.213 or ISO/IEC8348. Filler shall be "1111."

2.5.2.4.3.1.3.12 Called Party Sub-Address

Called party sub-address will be described. Called party sub-address element is formulated to indicate the sub-address of the called party. With reference to the definition of sub-address, refer to ITU-T Recommendation I.330. The called party sub-address information element should be coded as shown in FIGS. 118 and 662. The maximum length of this information element should be 25 octets.

2.5.2.4.3.1.3.13 Calling Party Number

Calling party number will be described next. Calling party number information element is formulated to indicate the calling party. The calling party number information element should be coded as shown in FIGS. 119, 663, and 664. The maximum length of this information element should depend on the network.

As marked with "Note 1" in FIG. 119, the number digits appear in the same order as input, beginning from inferior four bits in octet 6. The digits are coded with BCD. When the use of NASP address is indicated in the address/numbering plan identification, the address shall be coded with the expression of ITU-T Recommendation X.213 or ISO/IEC8348 as marked with "Note 2." Filler shall be "1111."

2.5.2.4.3.1.3.14 Calling Party Sub-Address

Calling party sub-address will be described. Calling party sub-address element is formulated to indicate the sub-address of the calling party. With reference to the definition of sub-address, refer to ITU-T Recommendation I.330. The calling party sub-address information element should be coded as shown in FIGS. 120 and 665. The maximum length of this information element should be 25 octets.

2.5.2.4.3.1.3.15 Cause

The definition and use of cause information element are defined in ITU-T Recommendation Q.2610.

2.5.2.4.3.1.3.16 Connection Identifier

Connection identifier will be described next. Connection identifier is not necessary for the invented system, but it is possible that this is necessary when the ATM will be applied on air interface in the future (this should be studied further). Connection identifier information element is formulated to indicate a local ATM connection resource on the interface. This information element is included as an option in the setup message and is included as an option in the first response message to the setup message.

The connection identifier information element should be coded as shown in FIGS. 121 and 666. The maximum length of this information element should be 9 octets.

If the change addition indicator field designates an "arbitrary VCI," the VCI field in FIG. 121 must be ignored. If the restart class is "001" (see ITU-T Recommendation Q.2931), the VCI field should be ignored. If VP-associated signaling is designated in octet 5, the VPCI field must be ignored.

2.5.2.4.3.1.3.17 End-to-End Transit Delay

End-to-end transit delay will be described. End-to-end transit delay information element is formulated to indicate the substantial maximum end-to-end transit delay permitted in each call and to indicate the cumulative transit delay expected in the virtual connection. This transit delay is the unidirectional end-to-end transit delay of user data transferred during data transfer phase on the user plane between the calling user and the called user. It includes the total process time in the end user system and the cumulative transfer delay. The total process time in the end user system includes, e.g., process time, AAL handling delay, ATM cell assembly delay, and delay of all other processes. The network transfer delay includes, e.g., propagation delay, ATM layer transfer delay, and all other process delay in the network.

The cumulative transit delay value indicated in the SETUP message by the calling user (if any) indicates the transit delay from the calling user to the network boundary. The cumulative transit delay value, indicated by the network, in the setup message sent to the called user is the sum of the value indicated by the UNI connected with the calling party and transfer delay cumulated in the network. It does not include the transfer delay in the route between the network boundary to the called user. Each of the cumulative transit delay in connection messages on both UNIs is the total end-to-end transit delay expected for the user data transfer on the virtual channel connection offered to the corresponding call.

The maximum end-to-end transit delay can be used by the calling user to indicate the end-to-end delay request for the call. This field is contained in the setup message by the network and used for indicating that the calling user instructs the end-to-end delay request to the call. With reference to the applicable procedure, refer to ITU-T Recommendation Q.2931. The maximum end-to-end transit delay is not included in the connect message.

The end-to-end transit delay information element should be coded as shown in FIGS. 122 and 667. The maximum length of this information element should be 10 octets.

2.5.2.4.3.1.3.18 QOS Parameter

Quality of service (QOS) parameter will be described next. In the invented system, QOS parameter information element is formulated in addition to the end-to-end transit delay information element. The QOS parameter information element is designed to indicate a QOS class.

QOS parameter information element is not supported in B-ISUP Release 1. Consequently, a network cannot transmit the QOS parameter information element, and therefore, generates a default value of the QOS parameter information element, which does not indicate QOS class, at the termination interface.

The QOS parameter information element should be coded as shown in FIGS. 123 and 668. The maximum length of this information element should be 6 octets.

2.5.2.4.3.1.3.19 Broadband Repeat Indicator

Broadband repeat indicator will be described next. Broadband repeat indicator information element is formulated to indicate how to interpret a plurality of the same kind of information elements which are included in the same message. This is arranged before the first one of the same kind of information elements. However, even if the broadband repeat indicator is arranged before the information element solely included in a single message, this should not be interpreted as an error.

The broadband repeat indicator information element should be coded as shown in FIGS. 124 and 669. The maximum length of this information element should be 5 octets.

2.5.2.4.3.1.3.20 Restart Indicator

Restart indicator will be described next. Restart indicator should be defined in detail in the future (this should be studied further). Restart indicator information element is formulated to identify a facility class which is initially designated.

2.5.2.4.3.1.3.21 Broadband Sending Complete

Broadband sending complete will be described next. Broadband sending complete information element is formulated to indicate the completion of the called party number as an option (see ITU-T Recommendation Q.2931). This information element is mandatory for the batch mode procedure. If this information element does not exist, however, the normal error process for "mandatory information element missing" does not need to be performed.

The broadband sending complete information element should be coded as shown in FIG. 125. The maximum length of this information element should be 5 octets.

2.5.2.4.3.1.3.22 Transit Network Selection

Transit network selection will be described next. Transit network selection information element is formulated to indicate a transit network being requested. A plurality of transit network selection information elements may be included in the same message for indicating the order of transit networks through which the call is transferred (see ITU-T Recommendation Q.2931).

The transit network selection information element should be coded as shown in FIGS. 126 and 670. The maximum length of this information element should depend on the network.

2.5.2.4.3.1.3.23 Notification Indicator

Notification indicator information element will be described next. Notification indicator information element is formulated to notify of information related to the call. The notification indicator information element should be coded as shown in FIG. 127. The maximum length of this information element is flexible as long as it does not contradict with the maximum length of the message.

2.5.2.4.3.1.3.24 OAM Traffic Descriptor

OAM traffic descriptor will be described next. OAM traffic descriptor is not necessary for the invented system, but it is possible that this is necessary when the ATM will be applied on air interface in the future (this should be studied further). OAM traffic descriptor information element is formulated to provide information in relation to end-to-end OAM F5 information flow used to manage the performance on the user connection included in the call, and failure caused by the user.

The OAM traffic descriptor information element should be coded as shown in FIGS. 128 and 671. The maximum length of this information element should be 6 octets.

2.5.2.4.3.1.4 Information Elements for Supporting 64 KBPS Circuit Switched Mode ISDN Service Next, information elements for supporting 64 kbps circuit switched mode ISDN service will be described.

2.5.2.4.3.1.4.1 Coding Rules

First, coding rules of the information elements will be described. The information elements which will be described in section 2.5.2.4.3.1.4 are coded pursuant to the usual information element format represented in FIG. 103. The coding of these information elements should comply with the coding rules in ITU-T Recommendation Q.931 and ITU-T Recommendation Q.2931.

2.5.2.4.3.1.4.2 Narrow-Band Bearer Capability

Narrow-band bearer capability will be described next. Narrow-band bearer capability is not necessary for the invented system, but it is possible that this is necessary when the ATM will be applied on air interface in the future (this should be studied further). Narrow-band bearer capability information element is formulated to indicate a request for narrow-band ISDN circuit switched mode bearer service provided by the network. This information element includes only the information which may be used by the network (see. ITU-T Recommendation Q.931). The use method of narrow-band bearer capability information element related to the confirmation of communication feasibility is described in ITU-T Recommendation Q.931. The narrow-band bearer capability information element is transparently transferred in the broadband ISDN. The narrow-band bearer capability information element should be coded as shown in FIG. 129.

2.5.2.4.3.1.4.3 Narrow-Band High Layer Compatibility

Narrow-band high layer compatibility information element is formulated to offer the procedure for the destination user to confirm the communication feasibility (see ITU-T Recommendation Q.931). The narrow-band high layer compatibility information element should be coded as shown in FIG. 130. The maximum length of this information element should be 7 octets.

However, the narrow-band high layer compatibility information element is transparently carried between the calling entity (e.g., calling user) and called entity (peer entity or higher later function node in the network) addressed by the calling entity in the broadband ISDN. When it was explicitly requested by the user upon subscription contract, the network with the tele-service feature may analyze this information to offer certain tele-service.

2.5.2.4.3.1.4.4 Narrow-Band Low Layer Compatibility

Narrow-band low layer compatibility will be described next. Narrow-band low layer compatibility information element is formulated to provide means for confirming the feasibility with the entity whose address was designated (e.g., remote user addressed by the calling user, interworking unit or higher layer function node of network).

The narrow-band low layer compatibility information element is carried transparently between the calling entity (e.g., calling user) and called entity addressed by the calling entity in the broadband ISDN. In addition, the narrow-band low layer compatibility information element is carried transparently from the called entity to the calling entity for the narrow-band low layer compatibility negotiation (ITU-T Recommendation Q.931).

The narrow-band low layer compatibility information element should be coded as shown in FIG. 131. The maximum length of this information element should be 20 octets.

2.5.2.4.3.1.4.5 Progress Indicator

Progress indicator will be described next. Progress indicator information element is formulated to indicate an event occurring during call generation. At most, two progress indicator elements are included in the same message.

The progress indicator information element should be coded as shown in FIG. 132. The maximum length of this information element should be 6 octets.

2.5.2.4.3.2 Formats of Information Elements in MM-T Entity Messages

Next, formats of information elements in MM-T entity messages will be described. With reference to the list of MM-T specific information elements in FIG. 672, the information elements will be described below.

(1) TMUI

TMUI is a temporary number for identifying a mobile station and is updated at terminal location registration or updating. At call origination and termination, the TMUI is not updated unless the network recognizes the TMUI disaccord.

FIG. 133 represents the format of TMUI information element. As represented in FIG. 133, the TMUI information element consists of an M-SCP identification number (10 bits) and a unique identification number (20 bits plus 2 bits) and is encoded with the normal binary coding. In the unique identification number, two bits are allocated to double assignment evasion bits.

M-SCP identification number is used to identify the M-SCP which has assigned the TMUI and takes a value between zero and 999. Unique identification number is used to identify the mobile station in the node which has assigned the TMUI and takes a value between zero and 999999. The double assignment evasion bits are used for evading double assignment of the same TMUI and takes a value between zero and three.

(2) TMUI Assignment Source ID

Figure 134:
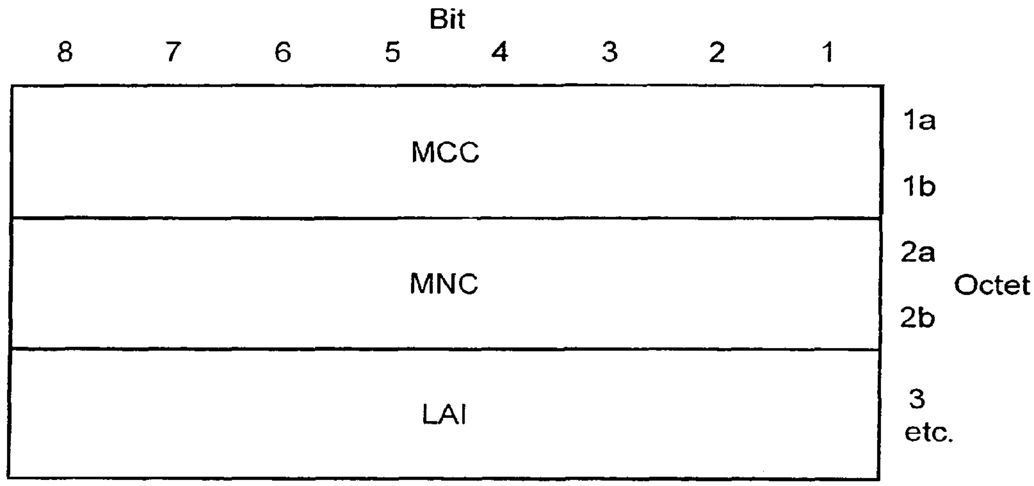

TMUI Assignment Source ID will be described next. As represented in FIG. 134, TMUI assignment source ID consists of an MCC (mobile country code), MNC (mobile network code), and LAI and is encoded with the BCD in the system.

(3) IMUI

Figure 135:
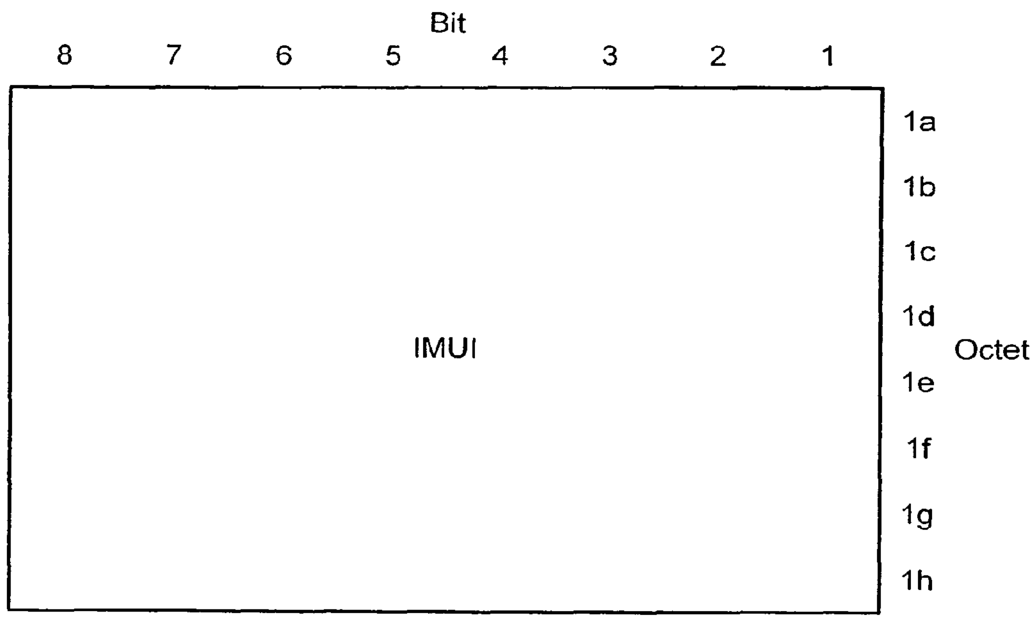

IMUI will be described next with reference to FIG. 135. IMUI is a number for recognition of a mobile station used in the network. IMUI includes an MCC and MNC, is of a variable length equal to or less than 15 places, and is encoded with BCD.

(4) Execution Authentication Type

Figure 136:
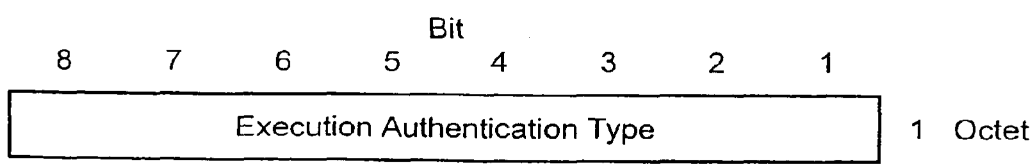

Next, with reference to FIG. 136, execution authentication type will be described. Execution authentication type is information for indicating the authentication procedure to be executed when a plurality of authentication procedures can be applicable for a mobile station.

(5) Authentication Random Pattern

Next, with reference to FIG. 137, authentication random pattern will be described. Authentication random pattern indicates a random pattern for authentication at a mobile station.

(6) Authentication Ciphering Pattern

Next, with reference to FIG. 138, authentication ciphering pattern will be described. Authentication ciphering pattern indicates a ciphering pattern obtained by the mobile station on the basis of the authentication random pattern.

(7) Execution Ciphering Type

Next, with reference to FIG. 139, execution ciphering type will be described. Execution ciphering type is information to indicate the ciphering procedure to be executed when a plurality of ciphering procedures can be applicable for a mobile station.

(8) TC Information

Next, with reference to FIG. 140, TC information will be described. TC information is information used for identifying the type of mobile station.

2.5.2.4.3.3 Information Elements of RBC Entity Messages

Information elements of RBC entity messages will be described next.

2.5.2.4.3.3.1 Message Type Identifier

As represented in FIG. 141, message type identifier is formulated to identify the function of the corresponding transmitted message. This does not include an operation instruction indicator. The various types of messages in FIG. 141 will be described later.

2.5.2.4.3.3.2 Information Element Identifier

Figure 142:
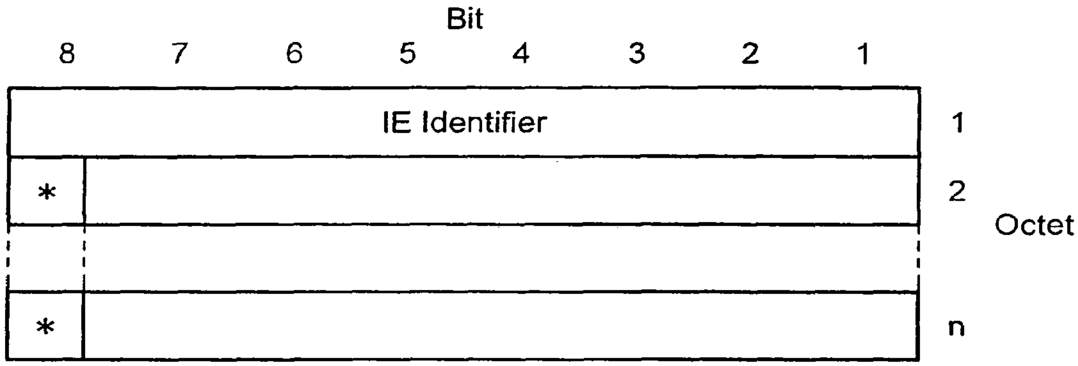

Next, information element identifier will be described with reference to FIG. 142. Information element identifier identifies optional information included in the corresponding message. When octet 1 of the identifier is "11111111," octet 2 and following octets can be valid. Bit 8 of octet 2 and following octets is used as an extension flag by which the next octet can be valid. No identifiers in relation to specific parameters are decided. The various types of messages in FIG. 142 will be described later.

2.5.2.4.3.3.3 Radio Bearer Setup Message Specific Parameter

FIG. 143 represents the format of radio bearer setup message specific parameter. In FIG. 143, RBC ID (RBC identifier) is a number for identifying the RBC connection. The RBC connection uniquely corresponds to a connection which can be identified by a CR (call reference) and CONN ID (connection identifier) in the CC protocol. The CR is a call identifier for the CC protocol (see section 2.5.2.4.3.1). The CONN ID is a connection identifier for the CC protocol (see section 2.5.2.4.3.1).

2.5.2.4.3.3.4 Radio Bearer Release Message Specific Parameter

FIG. 144 represents the format of radio bearer release message specific parameter. As represented in FIG. 144, radio bearer release message specific parameter consists of an RBC ID and cause indicator.

2.5.2.4.3.3.5 Radio Bearer Release Complete Message Specific Parameter

FIG. 145 represents the format of radio bearer release complete message specific parameter. As represented in FIG. 145, radio bearer release complete message specific parameter consists of only an RBC ID.

2.5.2.4.3.3.6 Handover Command Message Specific Parameter

FIG. 146 represents the format of handover command message specific parameter. As represented in FIG. 146, handover command message specific parameter consists of only an invoke ID. The invoke ID is an identifying number for associating a response signal with a handover command when the handover command has been initiated.

2.5.2.4.3.3.7 Handover Response Message Specific Parameter

FIG. 147 represents the format of handover response message specific parameter. As represented in FIG. 147, handover response message specific parameter consists of only an invoke ID.

2.5.2.4.3.3.8 Radio Bearer Setup Information Element

FIGS. 148 through 151 represent the format of radio bearer setup information. In FIG. 148, "information element identifier" indicates the radio bearer setup fundamental information element and has a length of 8 bits. "Length" indicates the length of the information element. "Frequency band" field indicates the frequency band which should be indicated at the first call. 256 frequency bands can be indicated, i.e., frequency band f1 is indicated by "00000000" in the "frequency band", and frequency band f256 is indicated by "11111111." "BTS number" field indicates the BTS identifying number in the network which is one or more. "Sector number" field indicates the sector identifying number in the same BTS, i.e., sector 1 is indicated by "00000001" while sector 12 is indicated by "00001100."

"Uplink short code type" field indicates the information transfer rate for an uplink code (see FIG. 150). "Number of uplink codes" field indicates the number of uplink short codes between one and N when a plurality of uplink short codes are availed for a single connection. "Uplink short code number" field indicates the identifying number of uplink short code between zero and 2047.

"Downlink short code type" field indicates the information transfer rate for a downlink code (see FIG. 150). "Number of downlink codes" field indicates the number of downlink short codes between one and M when a plurality of downlink short codes are availed for a single connection. "Downlink short code number" field indicates the identifying number of downlink short code between zero and 2047.

"Frame offset group" field indicates which time slot in a single radio frame should be the front end of the logical frame when the mobile station communicates. This is formulated to uniformize traffic in a single frame time unit within the wired path. "Frame offset group" takes a value of 0-15 (see FIG. 151).

"Slot offset group" field indicates an offset value of downlink transmission timing for a short code. The downlink transmission timing may be offset by, at most, three subslots in order to reduce redundancy of pilot symbols. The indication by the "slot offset group" field at the first call should be contained until the release of all calls of the mobile station (see FIG. 151).

2.5.2.4.3.3.9 DHO Branch Addition Information Element

FIGS. 152 through 154 represent the format of DHO (diversity handover) branch addition information element. In FIG. 152, "information element identifier" field is a length of eight bits and represents DHO branch addition information element. "Number of RBC IDs" field indicates the number (from 1 to H) of the simultaneous connections. Other fields have been already described.

2.5.2.4.3.3.10 DHO Branch Deletion Information Element

FIG. 155 represents the format of DHO (diversity handover) branch deletion information element. In FIG. 155, "information element identifier" field is a length of eight bits and represents DHO branch deletion information element. Other fields have been already described.

2.5.2.4.3.3.11 ACCH Replacement Information Element

FIG. 156 represents the format of ACCH replacement information element. In FIG. 156, "information element identifier" field is a length of eight bits and represents ACCH replacement information element. Other fields have been already described.

2.5.2.4.3.3.12 Branch Replacement Information Element

FIGS. 157 through 159 represent the format of branch replacement information element. In FIG. 157, "information element identifier" field is a length of eight bits and represents branch replacement information element. Other fields have been already described.

2.5.2.4.3.3.13 User Rate Replacement Information Element

FIGS. 160 through 163 represent the format of user rate replacement information element. In FIG. 160, "information element identifier" field is a length of eight bits and represents user rate replacement information element. Other fields have been already described.

2.5.2.4.3.3.14 Code Replacement Information Element

FIGS. 164 and 165 represent the format of code replacement information element. In FIG. 164, "information element identifier" field is a length of eight bits and represents code replacement information element. "Number of former short codes" field indicates the number (from 1 to N) of former short codes used before the short code replacement or rearrangement procedure. "Former short code number" field indicates the identifying number (from 0 to 2047) of former short code used before the short code replacement or rearrangement procedure. "Number of new short codes" field indicates the number (from 1 to M) of new short codes after the short code replacement or rearrangement procedure. "New short code number" field indicates the identifying number (from 0 to 2047) of new short code after the short code replacement or rearrangement procedure. Other fields have been already described.

2.5.2.4.3.4 Information Elements of RRC Entity Messages

Next, information elements of RRC entity messages will be described.

2.5.2.4.3.4.1 Message Type Identifier

Message type identifier will be described with reference to FIG. 166. Message type identifier is formulated for identifying the function of the message transmitted.

2.5.2.4.3.4.2 Facility Information Element

The format of facility information element is represented in FIG. 167. In FIG. 167, "profile" field indicates the type of PDU (protocol data unit) which is contained in octet 4 and later octets, i.e., ROSE protocol data unit, CMIP protocol data unit, or ACSE protocol data unit. "PDU" field includes one or more PDUs which are ASEs (application service elements) identified by the "profile" field. In the invented system, ROSE protocol is used.

2.5.2.4.3.4.3 Rose PDU

FIGS. 168 and 169 represent the format of ROSE PDU. In FIG. 168, "component type tag" is mandatory for each component and indicates the type of component (invoke, result return (termination), error return, rejection, result return (proceeding), and so on). "Component length" indicates the length of component excluding the lengths of component type tag field and component length field. "Invoke identifier tag" is used as a reference number for identifying the operation invoke, thereby associating a request with a response. "Invoke identifier length" indicates the length of the "invoke identifier" field. "Invoke identifier" indicates the invoke identifier. "Operation value tag" is included in the invoke component, and so on for indicating the type of operation (local operation or global operation) which should be invoked. "Operation value" indicates the type of information for defining the operation, i.e., information on the candidate zones for call attempt or acceptance, on the in-use zone, on the added zone for DHO, on the deleted zone for DHO, on the zone for HHO, on the outer loop, or on the quality deterioration notification.

2.5.2.4.3.4.4 Specific Parameters for Operations

Next, specific parameters for defining operations will be described.

(a) Candidate Zone Information for Call Attempt or Acceptance

First, specific parameters of the candidate zone information for call attempt or acceptance will be described. This information is sent from the mobile station to the network to notify the network of the radio wave reception conditions, measured by the mobile station at the call attempt or acceptance, with respect to the visited sector and circumferential sectors. FIG. 673 represents parameters of the candidate zone information. Perch channel reception SIR and perch channel transmission power in FIG. 673 are used for controlling downlink transmission power.

(b) In-Use Zone Information

Next, specific parameters of the in-use zone information will be described. This information is sent from the mobile station to the network to initiate the downlink radio transmission power control based on the radio wave reception condition, measured by the mobile station, with respect to the in-use sector. FIG. 674 represents parameters of the in-use zone information.

(c) Added Zone Information for DHO

Next, specific parameters of the added zone information for DHO will be described. This information is invoked by the mobile station to cause the network to add one or more diversity links during communication, and includes parameters on the candidate sector(s) to be added and radio reception conditions about the candidate sector and the in-use sector. FIG. 675 represents parameters of the added zone information for DHO.

Only the candidate sector about which the radio reception condition is in excess of a threshold for DHO branch addition is added. However, if the condition about the candidate sector is worse than conditions of all in-use sectors when the number of the in-use sectors is the maximum, the DHO trigger indicating the added zone information for DHO is not sent.

(d) Deleted Zone Information for DHO

Next, specific parameters of the deleted zone information for DHO will be described. This information is invoked by the mobile station to cause the network to execute the diversity link deletion based on the radio reception condition about in-use sectors measured by the network. FIG. 676 represents parameters of the deleted zone information for DHO.

The radio reception conditions about the in-use sectors are compared with a threshold for DHO branch deletion. Then, only the sector about which the radio reception condition is lower than the threshold for DHO branch deletion is deleted. On the contrary, this information is not sent for the sector which will be deleted instead of the sector added by the DHO branch addition although the radio reception condition is not lower than the threshold.

(e) HHO (Hard Handover) Zone Information

Next, specific parameters of the HHO zone information will be described. This information is invoked by the mobile station to cause the network to execute the branch replacement handover based on the radio reception conditions about the in-use sector and circumferential sectors measured by the network. FIG. 677 represents parameters of the HHO zone information.

(f) Outer Loop Information

Next, specific parameters of the outer loop information will be described. This information is invoked by the mobile station to cause the network to execute outer loop transmission power control for the downlink radio channel. FIG. 678 represents parameters of the outer loop information.

(g) Quality Deterioration Notification Information

Next, specific parameters of the quality deterioration notification information will be described. This information is invoked by the mobile station to cause the network to execute the branch replacement wherein channel is replaced to another channel with a different frequency when the mobile station detects quality deterioration with respect to the downlink radio channel. FIG. 679 represents parameters of the quality deterioration notification information.

2.5.2.4.3.4.5 Definitions of Specific Parameters for Operations

Next, the definitions of the specific parameters for defining operations will be described.

2.5.2.4.3.4.5.1 Number of Visited Candidate Sectors, Number of In-Use Visited Sectors, Number of Candidate Sectors to be Added at DHO, Number of Sectors to be Deleted at DHO, and Candidate Sectors for HHO FIG. 170 represents the common format of parameters of number of visited candidate sectors, number of in-use visited sectors, number of candidate sectors to be added at DHO, number of sectors to be deleted at DHO, and candidate sectors for HHO. In FIG. 170, “number of sectors” field contains a binary code representing a value between 1 and N.

2.5.2.4.3.4.5.2 BTS Number

FIG. 171 represents the format of a parameter of BTS number. “BTS identifier” in FIG. 171 is a number more than one for identifying the corresponding BTS in the network.

2.5.2.4.3.4.5.3 Sector Number

FIG. 172 represents the format of a parameter of sector number. “Sector identifier” in FIG. 172 is a value of 1-12 for identifying the corresponding sector in the BTS.

2.5.2.4.3.4.5.4 Perch Channel Reception SIR

FIG. 173 represents the format of a parameter of perch channel reception SIR. “Perch channel reception SIR” in FIG. 173 indicates the perch channel reception SIR of the visited sector, circumferential sector, or in-use sector measured at the mobile station.

2.5.2.4.3.4.5.5 Perch Channel Transmission Power

FIG. 174 represents the format of a parameter of perch channel transmission power.

2.5.2.4.3.4.5.6 Long Code Phase Difference

FIG. 175 represents the format of a parameter of long code phase difference. “Long code phase difference” in FIG. 175 indicates the difference between the long code phase of the visited or in-use sector and that of a circumferential sector (to which the connection may be handed over). This is used when the execution of DHO and the zone selection at call attempt or acceptance. If the difference is in excess of 128 chips, the field of long code phase difference should be extended by setting the extension bit to 1.

2.5.2.4.3.4.5.7 Number of RBC IDs

FIG. 176 represents the format of a parameter of the number of RBC IDs. The “number of RBC IDs” field in FIG. 176 contains a binary code representing a value between 1 and N.

2.5.2.4.3.4.5.8 RBC ID

FIG. 177 represents the format of a parameter of RBC ID. “RBC ID” in FIG. 177 is a number for identifying the RBC connection which uniquely corresponds to a connection which can be identified by a CR (call reference) and CONN ID (connection identifier) in the CC protocol. It takes a value between 1 and H.

2.5.2.4.3.4.5.9 Necessary SIR

FIG. 178 represents the format of a parameter of necessary SIR.

2.5.2.4.3.4.5.10 FER Measurement

FIG. 179 represents the format of a parameter of FER measurement.

2.5.2.4.3.5 Formats of Information Elements of TAC (Terminal Association Control) Entity Messages Next, formats of information elements of TAC entity messages will be described.

2.5.2.4.3.5.1 General Description of TAC (Terminal Association Control) Entity Messages Each TAC entity message may comprise:

(a) protocol discriminator, (b) message type identifier, (c) message specific parameter (if necessary), (d) fundamental information element (if necessary), and (e) extensional information element (if necessary).

Although elements (a) and (b) are included in all of the TAC entity messages commonly, elements (c) through (d) may be included in specific messages on demand.

FIG. 180 represents an example of TAC entity message. The first two information elements (protocol discriminator and message type identifier) should appear in the order designated in FIG. 180.

2.5.2.4.3.5.2 Protocol Discriminator

First, the protocol discriminator will be described. The protocol discriminator is formulated to distinguish the TAC entity message from other messages used in the invented system and from other OSI network layer protocol unit messages encoded in accordance with another ITU-T recommendation, TTC recommendation, and another recommendation. The protocol discriminator is located at the first part of each TAC entity message and encoded in the manner shown in FIG. 181.

2.5.2.4.3.5.3 Message Type Identifier (Including Message Compatibility Instruction Indicator)

Next, the message type identifier will be described.

The message type identifier is formulated to identify the function of the TAC entity message. The message type identifier is located at the second part of each TAC entity message and encoded in the manner shown in FIGS. 182 and 680.

The message compatibility instruction indicator is valid only in the defined local interval. It is optional for the network to decide which value is set to the message compatibility instruction indicator of a message transmitted from the network to a user terminal insofar as the coding is not prescribed by another manner. In the invented system, it is encoded as “000.”

2.5.2.4.3.5.4 Message Specific Parameter

The message specific parameter is used for indicating specific information necessary for the message. This will be described in detail in the following.

2.5.2.4.3.5.4.1 TAC Entity Message Specific Parameters

FIG. 681 is a list representing the TAC entity message specific parameters.

(1) Terminal Association Setup Message Specific Parameter

The terminal association setup message specific parameter is encoded in the manner represented in FIGS. 183 and 682.

(2) Paging Response Message Specific Parameter

The paging response message specific parameter is encoded in the manner represented in FIGS. 184 and 683.

(3) Terminal Association Release Message Specific Parameter

The terminal association release message specific parameter is encoded in the manner represented in FIGS. 185 and 684.

2.5.2.4.3.5.4.2 Subfields of TAC Entity Message Specific Parameters

Next, subfields of TAC entity message specific parameters will be described.

(1) Coding Rules

First, coding rules of subfields of TAC entity message specific parameters will be described. The coding of the subfields should comply with the coding rule which will be described below. These rules are formulated in order that devices which treats the TAC entity messages can identify information elements that are necessary for procedures. FIG. 685 is a list representing information elements which may be contained in subfields of TAC entity message specific parameters. For coding integer values in subfields of TAC entity message specific parameters, the following rules should be applied.

(a) When an integer is encoded to the length equal to or more than two octets, the octet with a less octet number includes superior bits. Especially, the octet with the least octet number includes the MSB (most significant bit) while the octet with the greatest octet number includes the LSB (least significant bit).

(b) With reference to a field which is within an octet or constitutes a part of an octet, the following rules are applied.

A bit with a greater bit number constitutes a superior bit.

Especially, the bit with the greatest bit number indicates the MSB (most significant bit).

Especially, the bit with the least bit number indicates the LSB (least significant bit).

Bit coding is carried out from the bit with less bit number (from right). That is, preceding parts of zero appear at the side of greater bit number (left) in an octet or field.

(c) When integer values are expressed in fixed length octets, bit coding is carried out from the octet with greater octet number. That is, preceding zero parts appears at the side of less octet number.

(d) When integer values are expressed in variable length octets, coding shall be performed so that it becomes the smallest number of octets. Octets, of which all the preceding bits are “0,” do not exist.

(2) Cause Information Element

The cause information element is used for indicating the cause of release of terminal association and is encoded in the manner represented in FIGS. 186 and 686.

(3) Mobile Station Type Information Element

The mobile station type information element is used for identifying the type of mobile station and is encoded in the manner represented in FIGS. 187 and 687.

(4) Paged MS ID Information Element

The paged MS ID information element is used for identifying the paged mobile station and is encoded in the manner represented in FIGS. 188 and 688.

(5) Paging ID Information Element

The paging ID information element is allocated to a call for managing the call when a mobile station is paged. It is encoded in the manner represented in FIG. 189.

(6) TMUI Information Element

The TMUI information element is used for identifying respective mobile stations and is updated when the location is registered and when the location registration is updated. It is encoded in the manner represented in FIGS. 190 and 689.

2.5.2.4.3.5.5 Extensional Information Element

Any extensional information elements for TAC entity messages are not used in the invented system and may be used for extension in the future. The extensional information elements for TAC entity messages may be encoded in the manner represented in FIG. 191.

2.5.2.4.3.6 Others

In the following, other layer 3 messages which are carried on RACH, FACH, BCCH, and PCH will be described.

2.5.2.4.3.6.1 Message Type

FIG. 192 represents the format of the message type information element.

2.5.2.4.3.6.2 Length

FIG. 193 represents the format of the length information element which indicates the length of the message.

2.5.2.4.3.6.3 Perch Channel Reception SIR

FIG. 194 represents the format of the perch channel reception SIR information element which indicates the signal-to-interference ratio about a signal received from the perch channel.

2.5.2.4.3.6.4 Short Code Number

FIG. 195 represents the format of the short code number information element which indicates the short code number for the uplink or downlink SDCCH and which takes a value between zero and 2047.

2.5.2.4.3.6.5 Frame Offset Group

FIG. 196 represents the format of the frame offset group information element which indicates the frame offset group for the SDCCH.

2.5.2.4.3.6.6 Slot Offset Group

FIG. 197 represents the format of the slot offset group information element which indicates the slot offset group for the SDCCH.

2.5.2.4.3.6.7 Network Number

FIG. 198 represents the format of the network number information element.

2.5.2.4.3.6.8 Network Version

FIG. 199 represents the format of the network version information element which indicates the network version.

2.5.2.4.3.6.9 Mobile Station Common Parameter Version

FIG. 200 represents the format of the mobile station common parameter version information element which indicates the version of a parameter common to mobile stations.

2.5.2.4.3.6.10 BTS Number

FIG. 201 represents the format of the BTS number information element which indicates the identification number of a BTS.

2.5.2.4.3.6.11 Sector Number

FIG. 202 represents the format of the sector number information element which indicates a sector number in a BTS. It may take a value between one and six or between one and 12.

2.5.2.4.3.6.12 Number of Overlapped Registration Areas

FIG. 203 represents the format of the information element indicating the number (N) of registration areas overlapped in one radio zone.

2.5.2.4.3.6.13 Area Number

FIG. 204 represents the format of the area number information element which indicates the registration area where the mobile station exists. It takes a value between zero and 255.

2.5.2.4.3.6.14 Area Registration Timer

FIG. 205 represents the format of the area registration timer information element.

2.5.2.4.3.6.15 Calibrated Power Level Necessary for Reception at Base Station

FIG. 206 represents the format of the information element indicating the calibrated power level necessary for reception at the base station.

2.5.2.4.3.6.16 Uplink Long Code Number

This should be studied further. The uplink long code number information element will indicate the uplink long code number on the RACH and SDCCH in the future.

2.5.2.4.3.6.17 Number of Perch Channel LCs for Determination of Visited Zone

FIG. 207 represents the format of the information element indicating the number (M) of perch channel LCs for determination of visited zone.

2.5.2.4.3.6.18 Perch Channel LC Number

The perch channel LC number will be used in the future. This should be studied further.

2.5.2.4.3.6.19 Number of Frequency Bands used by Base Station

FIG. 208 represents the format of the information element indicating the number (K) of frequency bands used by the base station.

2.5.2.4.3.6.20 Frequency Band

FIG. 209 represents the format of the frequency band information element indicating the frequency band used on the TCH.

2.5.2.4.3.6.21 Restricted Information

This information element will be used in the future for indicating information on access restriction because of construction, of malfunction or of other reasons. This should be studied further.

2.5.2.4.3.6.22 Call Acceptance Information

The call acceptance information element will be used in the future for indicating to the mobile station whether a new call can be accepted or not. This should be studied further.

2.5.2.4.3.6.23 Control Channel Format Information

The control channel format information element will be used in the future for indicating the number of PCHs, the number of RACHs for the long code, the number of RACHs for the short code, the number of FACHs for the long code, the number of FACHs for the short code, the code numbers used, and the slot positions. The control channel format information element may include information for packets. This should be studied further.

2.5.2.4.3.6.24 BCCH Reception Duration

FIG. 210 represents the format of the BCCH reception duration information element indicating the duration through which the mobile station is capable of receiving broadcasting information from the BCCH after the reception of a message including this information element.

2.5.2.4.3.6.25 Number of Paged Mobile Stations

FIG. 211 represents the format of the information element indicating the number of paged mobile stations paged by one paging message. The number takes a value of 1-2.

2.5.2.4.3.6.26 Paged MS ID

FIG. 212 represents the format of the paged MS ID information element, of which the length is 112 bits, indicating the IMUI or TMUI of the paged mobile station. Detailed coding manner will be decided in the future.

2.5.2.4.3.6.27 Paging ID

FIG. 213 represents the format of the paging ID information element.

2.5.2.4.3.6.28 extensional information element

Other extensional information elements will be decided in the future.

2.5.3 Specifications of BTS-MCC Interface

Next, the specifications of the BTS-MCC interface will be described.

2.5.3.1 Outline

First, an outline will be described. In section 2.5.3, protocols of layers 1 through 3 at the BTS-MCC interface will be described.

2.5.3.2 Layer 1

Layer 1 is formulated for BS transmission line interfaces and for BSC transmission line interfaces. Therefore, description thereof is omitted.

2.5.3.3 ATM Layer

Similarly, ATM layer is formulated for BS transmission line interfaces and for BSC transmission line interfaces. Therefore, description thereof is omitted.

2.5.3.4 AAL Common Part Sublayer

Similarly, AAL common part sublayer is formulated for BS transmission line interfaces and for BSC transmission line interfaces. Therefore, description thereof is omitted.

2.5.3.5 AAL Service Specific Sublayer

Similarly, AAL service specific sublayer is formulated for BS transmission line interfaces and for BSC transmission line interfaces. Therefore, description thereof is omitted.

2.5.3.6 Layer 3

In the following, layer 3 will be described.

2.5.3.6.1 Protocol Architecture

Layer 3 protocol architecture in the BTS-MCC interface will be described. In addition, layer 3 protocol control entities will be described. Procedures executed in the BTS-MCC interface are as follows:

(1) BTS-MCC Link Control Procedures

Link establishment and release procedures for the SDCCH between SCMF and TACF and between SCMF and SACF.

Access link establishment between TACF and BCFr.

(2) Paging Procedure

Paging instruction from TACF to BTS.

(3) Radio Wave Status Management Procedure

Status measurement of radio channels between RFTR and RRC (However, this procedure is not used in the invented system).

(4) Other Procedures Such as Transferring Information to BTS

In accordance with the aforementioned procedures, the following layer 3 protocol control entities are used in the invented system.

(a) BC (Bearer Control)

This entity prepares and transfers messages for controlling the link between TACF and BCFr. That is, it carries out one of procedures (1) mentioned above.

(b) BSM (Base Station Management)

This entity prepares and transfers a message for instructing to page the BTS and any other messages for managing the BTS. That is, it carries out procedures (2) and (4).

(c) RCM (Radio Condition Management)

This entity prepares and transfers a message for measuring conditions of radio resources, but is not used in the invented system.

Next, the protocol architecture in the interface will be described. Messages from the data link layer are identified by the protocol discriminators, link references, and transaction IDs, on the link for control signals at the BTS-MCC interface, and then distributed to destination protocol control entities. FIG. 214 is a conceptual diagram representing the protocol architecture on the BTS-MCC interface.

2.5.3.6.2 Message Formats

Next, formats of messages transferred on the BTS-MCC interface will be described.

2.5.3.6.2.1 BC Entity Messages

First, BC entity messages will be described.

2.5.3.6.2.1.1 Types of BC Entity Messages

FIG. 690 is a list representing types of BC entity messages. As listed, bearer setup messages, bearer release messages, and other messages belong to BC entity messages.

2.5.3.6.2.1.2 Classification of Types of BC Entity Messages

BC entity messages in the invented system can be classified into two groups:

one group includes messages for establishing and releasing links according to AAL type 2 for the TCHs or SDCCHs. An request for establishing and releasing links according to AAL type 2 for the ACCH and a request for controlling radio channels within the BTS may be included as information elements in one of these messages.

the other includes messages not relevant to state transition of BC protocol entity. If the above request for the ACCH or for controlling radio channels within the BTS do not accompany with control of links according to AAL type 2 for TCHs or SDCCHs, a message not relevant to state transition of BC protocol entity is prepared including the request as an information element and is transported. FIG. 691 represents the BC entity messages according to the classification.

2.5.3.6.2.1.3 Message Format

Each message comprises common parts and one or more optional fundamental information elements as represented in FIG. 215. The fundamental information element includes a parameter according to the necessary procedure, so that the parameter depends on the procedure.

2.5.3.6.2.1.3.1 Link Setup Requested Message

The link setup requested message will be described. This message is sent from the BTS to the MSCNW (more specifically, BSC function) to select a short cell connection corresponding to resources, such as a short code and a radio facility after the selection of such resources by the BTS while the SDCCH is started to be established. FIG. 692 represents the structural information elements of the link setup requested message. As represented in the list, the protocol discriminator in this message indicates BC, the connection identification is control signal between the BTS and the MSCNW (BSC function), and the direction is from SCMF of the BTS to SACF and TACF of the MSCNW (BSC function).

2.5.3.6.2.1.3.2 Link Setup Message

The link setup message will be described. This message is sent from the MSCNW (BSC function) to the BTS when the MSCNW (BSC function) has completed to select a short cell connection only at the establishment of a TCH. This message is also sent from the MSCNW (BSC function) to the BTS to activate a radio bearer. FIG. 693 represents the structural information elements of the link setup message. As represented in the list, the protocol discriminator in this message indicates BC, the connection identification is control signal between the BTS and the MSCNW (BSC function), and the direction is from SACF and TACF of the MSCNW (BSC function) to SCMF of the BTS, and from TACF of the MSCNW (BSC function) to BCFr of the BTS.

2.5.3.6.2.1.3.3 Link Setup Proceeding Message

The link setup proceeding message will be described. This message is sent from the BTS to the MS CNW (BSC function) to notify of the selection results of radio resources and activation results of radio facilities at the first call, the second call, and the hard handover. FIG. 694 represents the structural information elements of the link setup proceeding message. As represented in the list, the protocol discriminator in this message indicates BC, the connection identification is control signal between the BTS and the MSCNW (BSC function), and the direction is from BCFr of the BTS to TACF of the MSCNW (BSC function).

2.5.3.6.2.1.3.4 Link Setup Response Message

The link setup response message will be described. This message is sent from the BTS to the MSCNW (BSC function) to notify of the completion of the establishment of radio bearer for the first radio branch at the first call, the second call, and the hard handover. This message is also sent from the BTS to the MSCNW (BSC function) to notify of the selection results of radio resources and activation results of radio facilities at the second call and the hard handover. This message is also sent from the BTS to the MSCNW (BSC function) to notify of the synchronization instruction results at the base station when the SDCCH is established. FIG. 695 represents the structural information elements of the link setup response message. As represented in the list, the protocol discriminator in this message indicates BC, the connection identification is control signal between the BTS and the MSCNW (BSC function), and the direction is from BCFr of the BTS to TACF of the MSCNW (BSC function), and from SCMF of the BTS to SACF and TACF of the MSCNW (BSC function).

2.5.3.6.2.1.3.5 Link Facility Message

The link facility message will be described. This message is sent from the MSCNW (BSC function) to the BTS in order to initiate to add and delete radio resources and radio facilities when intra-cell HOSHO is carried out, and in order to initiate the ACCH replacement. FIG. 696 represents the structural information elements of the link facility message. As represented in the list, the protocol discriminator in this message indicates BC, the connection identification is control signal between the BTS and the MSCNW (BSC function), and the direction is from TACF of the MSCNW (BSC function) to BCFr of the BTS.

2.5.3.6.2.1.3.6 Link Facility Message

The link facility message will be described. This link facility message is different from that described at section 2.5.3.6.2.1.3.5. This message is sent from the BTS to the MSCNW (BSC function) in order to notify of the result of the initiation to add and delete radio resources and radio facilities when intra-cell HOSHO is carried out, and in order to notify of the result of the initiation of the ACCH replacement and the squelch. FIG. 697 represents the structural information elements of the link facility message. As represented in the list, the protocol discriminator in this message indicates BC, the connection identification is control signal between the BTS and the MSCNW (BSC function), and the direction is from BCFr of the BTS to TACF of the MSCNW (BSC function).

2.5.3.6.2.1.3.7 Link Release Message

The link release message will be described. This message is sent from the MSCNW (BSC function) to the BTS to release a radio bearer. FIG. 698 represents the structural information elements of the link release message. As represented in the list, the protocol discriminator in this message indicates BC, the connection identification is control signal between the BTS and the MSCNW (BSC function), and the direction is from TACF of the MSCNW (BSC function) to BCFr of the BTS, and from SACF and TACF of the MSCNW (BSC function) to SCMF of the BTS.

2.5.3.6.2.1.3.8 Link Release Complete Message

The link release complete message will be described. This message is sent from the BTS or the MSCNW (BSC function) in order to indicate that the message transmitting device has released the link reference and the connection identifier. The device which receives the message should release the link reference. FIG. 699 represents the structural information elements of the link release complete message. As represented in the list, the protocol discriminator in this message indicates BC, the connection identification is control signal between the BTS and the MSCNW (BSC function), and the direction is from BCFr of the BTS to the TACF of the MSCNW (BSC function), and from SACF and TACF of the MSCNW (BSC function) to SCMF of the BTS.

If this message is the first link reference release message, the cause indication information element is mandatory. This information element is also included in the message if this message is sent as a result of the error process condition.

To supplement the above description, FIG. 700 represents a list of the combinations of the fundamental information elements in the link setup message in various uses. FIG. 701 represents a list of the combinations of the fundamental information elements in the link setup proceeding message in various uses. FIG. 702 represents a list of the combinations of the fundamental information elements in the link setup response message in various uses. FIGS. 703 and 704 form a list of the combinations of the fundamental information elements in the link facility message in various uses. FIGS. 705 and 706 form a list of the combinations of the fundamental information elements in the other link facility message in various uses.

2.5.3.6.2.2 Format of BSM Entity Message

Next, formats of BSM entity messages will be described. Each BSM entity message may comprise a protocol discriminator, message type identifier, and one or more fundamental information elements as represented in FIG. 216.

FIG. 217 represents the pattern of fundamental information elements. As will be apparently understood by FIG. 217, in the fundamental information element, an information element identifier and a length identifier are provided before each parameter.

FIG. 707 is a list representing a message belonging to the BSM entity message. As will be clearly understood by FIG. 707, only a paging message belongs to the BSM entity message.

2.5.3.6.2.2.1 Paging Message

The paging message will be described. This message is sent from the MSCNW (BSC function) to the BTS in order to page a mobile station for notifying that it is called. FIG. 708 represents the structural information elements of the paging message. As represented in the list, the protocol discriminator in this message indicates BSM, the connection identification is control signal between the BTS and the network (BSC function), and the direction is from TACF of the network (BSC function) to BCFr of the BTS.

The area number information element of the paging message is mandatory when the BTS manages a plurality of area numbers for paging in a plurality of paging areas for multiple area registration. The IMUI or TMUI is used as the paged MS ID.

2.5.3.6.2.3 Detailed Description of Information Elements

Next, the information elements will be described in detail.

2.5.3.6.2.3.1 Information Elements of BC Entity Messages

Information elements of BC entity messages will be described.

2.5.3.6.2.3.1.1 Pattern of Each Fundamental Information Element

FIG. 218 represents the pattern of each fundamental information element.

2.5.3.6.2.3.1.1.1 Link ID Information Element

FIG. 709 represents the format of the link ID information element (one of fundamental information elements). This information element may be included in the link setup or link release messages from SACF and TACF of the network (BSC function) to SCMF and BCFr of the BTS.

2.5.3.6.2.3.1.1.2 TCH Setup Request Information Element without Frequency Indication (Call Initiated)

FIG. 710 represents the format of the TCH setup request information element without frequency indication. This information element may be included in the link setup message from TACF of the network (BSC function) to BCFr of the BTS.

2.5.3.6.2.3.1.1.3 TCH Setup Request Information Element without Frequency Indication (Active)

FIG. 711 represents the format of the TCH setup request information element without frequency indication. This information element may be included in the link setup message from TACF of the network (BSC function) to BCFr of the BTS.

2.5.3.6.2.3.1.1.4 TCH Setup Request Information Element with Frequency Indication FIG. 712 represents the format of the TCH setup request information element with frequency indication. This information element may be included in the link setup message from TACF of the network (BSC function) to BCFr of the BTS.

2.5.3.6.2.3.1.1.5 DHO Branch Addition Request Information Element

FIG. 713 represents the format of the DHO branch addition request information element. This information element may be included in the link setup message from TACF of the network (BSC function) to BCFr of the BTS.

2.5.3.6.2.3.1.1.6 Intra-BS DHO Branch Addition Request Information Element

FIG. 714 represents the format of the intra-BS DHO branch addition request information element. This information element may be included in the link setup or link facility messages from TACF of the network (BSC function) to BCFr of the BTS.

2.5.3.6.2.3.1.1.7 ACCH Setup Request Information Element

FIG. 715 represents the format of the ACCH setup request information element. This information element may be included in the link setup or link facility messages from TACF of the network (BSC function) to BCFr of the BTS.

2.5.3.6.2.3.1.1.8 TCH Setup Acceptance Information Element without Frequency Indication (Call Initiated)

FIG. 716 represents the format of the TCH setup acceptance information element without frequency indication. This information element may be included in the link setup proceeding message from BCFr of the BTS to TACF of the network (BSC function).

2.5.3.6.2.3.1.1.9 TCH Setup Acceptance Information Element without Frequency Indication (Active)

FIG. 717 represents the format of the TCH setup acceptance information element without frequency indication. This information element may be included in the link setup proceeding message from BCFr of the BTS to TACF of the network (BSC function).

2.5.3.6.2.3.1.1.10 TCH Setup Acceptance Information Element with Frequency Indication FIG. 718 represents the format of the TCH setup acceptance information element with frequency indication. This information element may be included in the link setup proceeding message from BCFr of the BTS to TACF of the network (BSC function).

2.5.3.6.2.3.1.1.11 TCH Setup Response Information Element without Frequency Indication (Call Initiated)

FIG. 719 represents the format of the TCH setup response information element without frequency indication. This information element may be included in the link setup response message from BCFr of the BTS to TACF of the network (BSC function).

2.5.3.6.2.3.1.1.12 TCH Setup Response Information Element without Frequency Indication (Active)

FIG. 720 represents the format of the TCH setup response information element without frequency indication. This information element may be included in the link setup response message from BCFr of the BTS to TACF of the network (BSC function).

2.5.3.6.2.3.1.1.13 TCH Setup Response Information Element with Frequency Indication FIG. 721 represents the format of the TCH setup response information element with frequency indication. This information element may be included in the link setup response message from BCFr of the BTS to TACF of the network (BSC function).

2.5.3.6.2.3.1.1.14 DHO Branch Addition Response Information Element

FIG. 722 represents the format of the DHO branch addition response information element. This information element may be included in the link setup response message from BCFr of the BTS to TACF of the network (BSC function).

2.5.3.6.2.3.1.1.15 Intra-BS DHO Branch Addition Response Information Element

FIG. 723 represents the format of the intra-BS DHO branch addition response information element. This information element may be included in the link setup response or link facility messages from BCFr of the BTS to TACF of the network (BSC function).

2.5.3.6.2.3.1.1.16 ACCH Setup Response Information Element

FIG. 724 represents the format of the ACCH setup response information element. This information element may be included in the link setup response or link facility messages from BCFr of the BTS to TACF of the network (BSC function).

2.5.3.6.2.3.1.1.17 Intra-BS DHO Branch Addition Request Information Element

FIG. 725 represents the format of the intra-BS DHO branch addition request information element. This information element may be included in the link facility message from TACF of the network (BSC function) to BCFr of the BTS.

2.5.3.6.2.3.1.1.18 Intra-BS DHO Branch Deletion Request Information Element

FIG. 726 represents the format of the intra-BS DHO branch deletion request information element. This information element may be included in the link facility message from TACF of the network (BSC function) to BCFr of the BTS.

2.5.3.6.2.3.1.1.19 Intra-BS HHO Initiation Request Information Element

FIG. 727 represents the format of the intra-BS HHO initiation request information element. This information element may be included in the link facility message from TACF of the network (BSC function) to BCFr of the BTS.

2.5.3.6.2.3.1.1.20 ACCH Release Request Information Element

FIG. 728 represents the format of the ACCH release request information element. This information element may be included in the link facility message from TACF of the network (BSC function) to BCFr of the BTS.

2.5.3.6.2.3.1.1.21 Frequency Replacement Request Information Element without Frequency Indication FIG. 729 represents the format of the frequency replacement request information element without frequency indication. This information element may be included in the link facility message from TACF of the network (BSC function) to BCFr of the BTS.

2.5.3.6.2.3.1.1.22 Frequency Replacement Request Information Element with Frequency INDICATION FIG. 730 represents the format of the frequency replacement request information element with frequency indication. This information element may be included in the link facility message from TACF of the network (BSC function) to BCFr of the BTS.

2.5.3.6.2.3.1.1.23 Setup Completion Notification Information Element

FIG. 731 represents the format of the setup completion information element. This information element may be included in the link facility message from TACF of the network (BSC function) to BCFr of the BTS.

2.5.3.6.2.3.1.1.24 Intra-BS HHO Branch Deletion Response Information Element

FIG. 732 represents the format of the intra-BS HHO branch deletion response information element. This information element may be included in the link facility message from BCFr of the BTS to TACF of the network (BSC function).

2.5.3.6.2.3.1.1.25 Intra-BS HHO Branch Addition Response Information Element

FIG. 733 represents the format of the intra-BS HHO branch addition response information element. This information element may be included in the link facility message from BCFr of the BTS to TACF of the network (BSC function).

2.5.3.6.2.3.1.1.26 ACCH Release Response Information Element

FIG. 734 represents the format of the ACCH release response information element. This information element may be included in the link facility message from BCFr of the BTS to TACF of the network (BSC function).

2.5.3.6.2.3.1.1.27 Frequency Replacement Setup Response Information Element with Frequency Indication FIG. 735 represents the format of the frequency replacement response information element with frequency indication. This information element may be included in the link facility message from BCFr of the BTS to TACF of the network (BSC function).

2.5.3.6.2.3.1.1.28 Frequency Replacement Setup Request Information Element with Frequency Indication FIG. 736 represents the format of the frequency replacement request information element with frequency indication. This information element may be included in the link facility message from BCFr of the BTS to TACF of the network (BSC function).

2.5.3.6.2.3.1.1.29 Frequency Replacement Acceptance Information Element without Frequency Indication FIG. 737 represents the format of the frequency replacement acceptance information element without frequency indication. This information element may be included in the link facility message from BCFr of the BTS to TACF of the network (BSC function).

2.5.3.6.2.3.1.1.30 Frequency Replacement Response Information Element without Frequency Indication FIG. 738 represents the format of the frequency replacement response information element without frequency indication. This information element may be included in the link facility message from BCFr of the BTS to TACF of the network (BSC function).

2.5.3.6.2.3.1.1.31 Code Replacement Request Information Element

FIG. 739 represents the format of the code replacement request information element. This information element may be included in the link facility message from BCFr of the BTS to TACF of the network (BSC function).

2.5.3.6.2.3.1.1.32 TCH Release Request Information Element

FIG. 740 represents the format of the TCH release request information element. This information element may be included in the link release message from TACF of the network (BSC function) to BCFr of the BTS.

2.5.3.6.2.3.1.1.33 SDCCH Release Request Information Element

FIG. 741 represents the format of the SDCCH release request information element. This information element may be included in the link release message from SACF and TACF of the network (BSC function) to SCMF of the BTS.

2.5.3.6.2.3.1.1.34 Cause Information Element

FIG. 742 represents the format of the cause information element. This information element may be included in the link release complete message from BCFr of the BTS to TACF of the network (BSC function), and from SCMF of the BTS to SACF and TACF of the network (BSC function).

2.5.3.6.2.3.1.1.35 SDCCH Setup Request Information Element

FIG. 743 represents the format of the SDCCH setup request information element. This information element may be included in the link setup requested message from SCMF of the BTS to SACF and TACF of the network (BSC function).

2.5.3.6.2.3.1.1.36 LAI Setup Request Information Element

FIG. 744 represents the format of the LAI setup request information element. This information element may be included in the link setup requested message from SCMF of the BTS to SACF and TACF of the network (BSC function).

2.5.3.6.2.3.1.2 Definitions of Information Elements of BC Entity Messages

Next, definitions of information elements of BC entity messages will be described.

2.5.3.6.2.3.1.2.1 Protocol Discriminator

First, the protocol discriminator will be described. The protocol discriminator is formulated to distinguish the BC entity message from other messages used in the invented system and from other OSI network layer protocol unit messages encoded in accordance with another ITU-T recommendation, TTC recommendation, and another recommendation. The protocol discriminator is located at the first part of each BC entity message and encoded in the manner shown in FIGS. 219 and 745.

2.5.3.6.2.3.1.2.2 Message Type Identifier

Next, the message type identifier will be described. The message type identifier is formulated to identify the function of the BC entity message. The message type identifier is located at the second part of each BC entity message and encoded in the manner shown in FIGS. 220 and 746.

2.5.3.6.2.3.1.2.3 Link Reference

Next, the link reference will be described. The link reference is formulated to identify each instance of the BC protocol entity generated for AAL type 2/type 5 link for the TCH or SDCCH. The link reference is encoded in the manner shown in FIG. 221.

In FIG. 221, "flag" denotes an E/O flag. This flag indicates zero when the message is sent from the device which has generated the link reference. This flag indicates one when the message is sent to the device which has generated the link reference. Octet 2 and later octets are extended according to the value of the used link reference.

2.5.3.6.2.3.1.2.4 Information Element Identifier

Next, the information element identifier will be described. The information element identifier is formulated to identify an optional information element included in the BC entity message. The information element identifier is encoded in the manner shown in FIG. 222.

2.5.3.6.2.3.1.2.5 Length of Information Element

Next, the "length of information element" will be described. The length of information element is formulated to indicate the whole length of all of parameters in the fundamental information element. The length of information element is encoded in the manner shown in FIG. 223.

2.5.3.6.2.3.1.2.6 AAL Type and Link Identifier

The "AAL type" indicates the AAL type and is encoded in the manner shown in FIG. 224. It indicates AAL type 2 when it is encoded as "0010." It indicates AAL type 5 when it is encoded as "0101."

An example of encoded link identifier is represented in FIG. 225. In FIG. 225, the size of VPCI and the size of VCI (virtual channel identifier) comply with the standard cell of the ATM specification in connection with the UNI (user-network interface). One type of VPCI indicating zero is used in the invented system, but 16 or more types of VPCI of which the length is 4 or more bits may be used in commercial application. VCI is 256/VPCI and UCI is 256/VCI.

2.5.3.6.2.3.1.2.7 Transmission Quality

Next, the "transmission quality" will be described. The transmission quality indicates the quality of ATM link and is encoded in the manner shown in FIG. 226. In the field of the transmission quality of one octet, the length of the acceptable delay may be three bits, the length of the cell loss rate may be three bits, and the reserved bits may be two bits according to the invented system.

2.5.3.6.2.3.1.2.8 Forward (Downlink) Transmission Rate

Next, the "forward or downlink transmission rate" will be described. The forward transmission rate indicates the forward information transmission rate. In the invented system, the forward transmission rate is selected from the group consisting of 8 kbps, 12.8 kbps, 32 kbps, 34.4 kbps, 64 kbps, 76.8 kbps, 128 kbps, 162.4 kbps, and 384 kbps.

2.5.3.6.2.3.1.2.9 Reverse (Uplink) Transmission Rate

Next, the "reverse or uplink transmission rate" will be described. The reverse transmission rate indicates the reverse information transmission rate. In the invented system, the reverse transmission rate is selected from the group consisting of 8 kbps, 12.8 kbps, 32 kbps, 34.4 kbps, 64 kbps, 76.8 kbps, 128 kbps, 162.4 kbps, and 384 kbps.

2.5.3.6.2.3.1.2.10 Sector Number

Next, the "sector number" will be described. The sector number is a value of 1-12 for identifying the corresponding sector in the BTS and is encoded in the manner shown in FIG. 227.

2.5.3.6.2.3.1.2.11 Bearer Capability

Next, the "bearer capability" will be described. The bearer capability is encoded in the manner represented in FIG. 228 and may indicate voice service, packet service, or unrestricted digital service.

2.5.3.6.2.3.1.2.12 Frequency Selection Info.

Next, the "frequency selection information" will be described. The frequency selection information is an information element of 0-255 indicating frequency bands which may be employed by the mobile station and is sent from the mobile communications switching center to the base station when the base station should select the communication frequency. Upon reception of the frequency selection information, the base station selects the most appropriate frequency band which may be employed by the base station and mobile station. The frequency selection information is encoded in the manner represented in FIG. 229.

2.5.3.6.2.3.1.2.13 Frequency

Next, the "frequency" will be described. The frequency information element indicates the frequency band selected by the base station. Simultaneous link connections for the same mobile station may use the same frequency band. The frequency information element which indicates one of f1 to f256 is encoded in the manner represented in FIG. 230.

2.5.3.6.2.3.1.2.14 Frame Offset Group

Next, the "frame offset group" will be described. The frame offset group indicates which time slot in a single radio frame should be the front end of the logical frame when the mobile station communicates. This is formulated to uniformize traffic in a single frame time unit within the wired path. "Frame offset group" takes a value of 0-15 and is encoded in the manner represented in FIG. 231.

2.5.3.6.2.3.1.2.15 Slot Offset Group

Next, the "slot offset group" will be described. The slot offset group indicates an offset value of downlink transmission timing for a short code. The downlink transmission timing may be offset by, at most, 15 subslots in order to reduce redundancy of pilot symbols. The offset value is acquired at the BTS when the first call occurs, is stored by the BSC function of the network, and is included in the slot offset group information element. The indication by the slot offset group at the first call should be contained until the release of all calls of the mobile station. The slot offset group is encoded in the manner shown in FIG. 232.

2.5.3.6.2.3.1.2.16 Long Code Phase Difference

Next, the "long code phase difference" will be described. The long code phase difference indicates the difference between the long code phase calculated by a long code counter (SFN) for the visited perch channel or the uplink long code phase of the in-use sector and the long code phase calculated by a long code counter (SFN) for the perch of the surrounding sector (handover destination sector) represented in chip time. This is used when the execution of DHO and the zone selection at call attempt or acceptance. The long code phase is measured by the mobile station, and reported to the BSC of the network. The long code difference should be within the range between zero and 2-1 chip time and be encoded in the manner represented in FIG. 233. When the long code phase difference is in excess of 128 chip time, the field should be extended with extension bits.

2.5.3.6.2.3.1.2.17 Reverse Long Code Number

Next, the "reverse or uplink long code number" will be described. The in-use reverse long code number is a specific information to the mobile station. The information can be utilized continuously although the frequency band has been updated. The reverse long code number is encoded in the manner represented in FIG. 234.

2.5.3.6.2.3.1.2.18 Reverse Short Code Type

Next, the "reverse or uplink short code type" will be described. The reverse short code type is encoded in the manner represented in FIG. 235.

2.5.3.6.2.3.1.2.19 Number of Reverse Short Codes

Next, the "number of reverse or uplink short codes" will be described. The number of reverse short codes indicates the number of reverse short codes when a plurality of reverse short codes are used for a reverse channel of one connection. The number of reverse short codes is encoded in the manner represented in FIG. 236.

2.5.3.6.2.3.1.2.20 Reverse Short Code Number

Next, the "reverse or uplink short code number" will be described. The reverse short code number is a value of 0-1023 for identifying the employed reverse short code. This is a unique number for distinguishing the corresponding short code from others which are used for the same mobile station although a single long code is used for the mobile station. At the first reverse short code number field, the short code number for the ACCH is contained. When VPCI, VCI, and UCI for ACCH has been designated simultaneously, the BTS recognizes that the ACCH is necessary to be established. The reverse short code number is encoded in the manner represented in FIG. 237.

2.5.3.6.2.3.1.2.21 Forward Short Code Type

Next, the "forward or downlink short code type" will be described. The forward short code type is encoded in the manner represented in FIG. 238.

2.5.3.6.2.3.1.2.22 Number of Forward Short Codes

Next, the "number of forward or downlink short codes" will be described. The number of forward short codes indicates the number of forward short codes when a plurality of forward short codes are used for a forward channel of one connection. The number of forward short codes is encoded in the manner represented in FIG. 239.

2.5.3.6.2.3.1.2.23 AAL Type and Link Identifier for ACCH

The "AAL type" for the ACCH indicates the AAL type. It is always encoded as "0010" for indicating AAL type 2 and is encoded in the manner shown in FIG. 240.

An example of encoded link identifier for the ACCH is represented in FIG. 241. The link identifier and TCH may be different.

2.5.3.6.2.3.1.2.24 Transmission Quality for ACCH

Next, the "transmission quality" for the ACCH will be described. The transmission quality indicates the quality of ATM link and is encoded in the manner shown in FIG. 242. In the field of the transmission quality of one octet, the length of the acceptable delay may be three bits, the length of the cell loss rate may be three bits, and the reserved bits may be two bits according to the invented system.

2.5.3.6.2.3.1.2.25 Forward Transmission Rate for ACCH

Next, the "forward or downlink transmission rate" for the ACCH will be described. The forward transmission rate indicates the forward information transmission rate which is restricted by the code used for the TCH. In the invented system, the forward transmission rate is selected from the group consisting of 8 kbps, 12.8 kbps, 32 kbps, 34.4 kbps, 64 kbps, 76.8 kbps, 128 kbps, 162.4 kbps, and 384 kbps.

2.5.3.6.2.3.1.2.26 Reverse Transmission Rate for ACCH

Next, the "reverse or uplink transmission rate" for the ACCH will be described. The reverse transmission rate indicates the reverse information transmission rate. In the invented system, the reverse transmission rate is selected from the group consisting of 8 kbps, 12.8 kbps, 32 kbps, 34.4 kbps, 64 kbps, 76.8 kbps, 128 kbps, 162.4 kbps, and 384 kbps.

2.5.3.6.2.3.1.2.27 Forward Short Code Number

Next, the "forward or downlink short code number" will be described. The forward short code number is a value of 0-1023 for identifying the employed forward short code. This is a unique number for distinguishing the corresponding short code from others which are used for the same mobile station although a single long code is used for the mobile station. The forward short code number is encoded in the manner represented in FIG. 243.

2.5.3.6.2.3.1.2.28 Result

The "result" is formulated for indicating the result, i.e., OK or NG and is encoded in the manner represented in FIG. 244.

2.5.3.6.2.3.1.2.29 Cause

Next, the "cause" will be described. When the link release complete message is the first link reference release message, this information element is mandatory. If the link release complete message is transmitted as a result of an error treatment condition, this information element is included. The cause is encoded in the manner represented in FIG. 245.

2.5.3.6.2.3.1.2.30 Initial Transmission Power

Next, the "initial transmission power" will be described. The initial transmission power indicates the downlink transmission power and is encoded in the manner represented in FIG. 246.

2.5.3.6.2.3.1.2.32 Location Identity

Next, the "location identity" will be described. The location identity is utilized for identifying the location registration area where the mobile station visits. This takes a value between zero and 255 and is encoded in the manner represented in FIG. 247.

2.5.3.6.3.2 Formats of Information Elements of BSM Entity Messages

Next, the formats of information elements of BSM entity messages will be described.

2.5.3.6.3.2.1 Protocol Discriminator

First, the protocol discriminator will be described. The protocol discriminator is formulated to distinguish the BSM entity message from other messages used in the invented system and from other OS network layer protocol unit messages encoded in accordance with another ITU-T recommendation, TTC recommendation, and another recommendation. The protocol discriminator is located at the first part of each BSM entity message and encoded in the manner shown in FIGS. 248 and 747.

2.5.3.6.3.2.2 Message Type Identifier

Next, the message type identifier will be described. The message type identifier is formulated to identify the function of the BC entity message. The message type identifier is located at the second part of each BC entity message and encoded in the manner shown in FIGS. 249 and 748.

2.5.3.6.3.2.3 PCHs Calculation Information

Next, the "PCHs calculation information" will be described. The "PCHs Calculation Information" is an information element for the BTS to select the perch channel. This information element is, for example, represented at inferior 16 bits of the binary encoded IMUI. That is, the PCHs calculation information can be recognized by a part of the IMUI of each mobile station. This is encoded in the manner represented in FIG. 250.

2.5.3.6.3.2.4 Area Number

Next, the "area number" will be described. The area number is utilized for identifying the location registration area where the mobile station visits. This takes a value between zero and 255 and is encoded in the manner represented in FIG. 251.

2.5.3.6.3.2.5 Paged MS ID

Next, the "paged MS ID" will be described. The paged MS ID is the TMUI or IMUI for paging the subject mobile station. If the IMUI is used as the paged MS ID, the integer IMUI transformed from the IMUI coded with BCD. The paged MS ID is encoded in the manner represented in FIG. 252.

2.5.3.6.3.2.5.1 Number Type

The "number type" indicates the type of number which is included at octet 4 and later octets in the paged MS ID. The number type is encoded in the manner represented in FIG. 749.

2.5.3.6.3.2.5.2 Number Length

The "number length" indicates the length, represented in octets, of number which is included at octet 4 and later octets in the paged MS ID. The number length is encoded in the manner represented in FIG. 750. The number length does not include the total length of octets 1-3 of the paged MS ID.

2.5.3.6.3.2.5.3 TMUI

Next, the "TMUI information element" will be described. The TMUI is used for identifying the mobile station. The TMUI is updated whenever the area registration or updating thereof is carried out. This is dynamically allotted to the mobile station. The length of the TMUI information element is fixed to four octets.

2.5.3.6.3.2.5.4 Integer IMUI

Next, the "integer IMUI" will be described. The integer IMUI is used for identifying the mobile station. The IMUI is used in the second paging when the network has recognized that the TMUI stored in the mobile station replying to the first paging with TMUI is wrong. The integer IMUI is transformed from the IMUI coded with BCD, and has a variable length, at most, seven octets.

2.5.3.6.3.2.5.4 Paging ID

Next, the "paging ID" will be described. The paging ID is used for managing the paging call when paging the mobile station. The paging ID is temporally allotted when paging. The paging ID information element is encoded in the manner represented in FIG. 253.

2.5.3.6.4.1 SDL Diagrams for BC

To supplement the above description, various SDL diagrams for bearer control are represented in FIGS. 255 through 258. FIG. 255 represents an SDL diagram for bearer control in the SDCCH executed in the BSC function of the network. FIG. 256 represents an SDL diagram for bearer control in the TCH/ACCH executed in the BSC function of the network. FIG. 257 represents an SDL diagram for bearer control in the SDCCH executed in the BTS. FIG. 258 represents an SDL diagram for bearer control in the TCH/ACCH executed in the BTS.

2.5.3.6.4.2 SDL Diagram for BSM

In addition, FIG. 254 represents an SDL diagram for base station management.

3 Control Procedures Uniquely Carried out by the Invented System

The invented system can carry out unique control procedures which cannot be achieved by prior arts since it uses the above-described structures and protocol specifications. Such unique control procedures will be described hereinafter.

3.1 Ciphering Onset Moment Notification 3.1.1 Background of Invention of the Procedure As described above, if the ciphering onset moment is not recognized, the destination device cannot decipher the ciphered signal (control signal) although it has received the ciphered signal. That is, if the onset time of the decipherment may be misestimated, the meaning of signals cannot be made out.

In a solution of the above-described problem, it is possible that after the transmission of an enciphering onset request from the network to the mobile station, the network and the mobile station commence to encipher transmitted signals and to decipher received signals.

This solution method will be described in more detail with reference to FIGS. 755 and 756. FIG. 755 represents a ciphering procedure sequence diagram in normal operation where the network and the mobile station commence to encipher transmitted signals and to decipher received signals after the transmission of an enciphering onset request from the network to the mobile station. In the initial stage, assume that the transported signals between the mobile station and network are not ciphered.

As represented in FIG. 755, the network (NW) notifies the mobile station (MS) of the enciphering onset request at step S21. After the notification of the enciphering onset request, the network commences to encipher transmitted signals and to decipher received signals at step S22.

Upon reception of the enciphering onset request, the mobile station also commences to encipher transmitted signals and to decipher received signals at step S23. Thereafter, the network and the mobile station encipher transmitted signals and decipher received signals.

However, in the above-described prior art ciphering procedure sequence, there is likelihood of failure of decipher because of the difference between the time when the source device commences to encipher the transmitted signal and the time when the destination device commences to decipher the received signal.

For example, as represented in FIG. 756, although the network has transmitted the enciphering onset request at step S24, assume that the mobile station has transmitted at step S25 a call release request for disconnect the call to the network before the reception of the enciphering onset request at the mobile station. In this case, when the network receives the non-ciphered call release request at the reception time Tx, the network has already been prepared to decipher the received signal at step S26. If the network does not have the function to recognize both of enciphered and non-ciphered signals at the same mode—this kind of network is usual for system simplification—, it cannot read the non-ciphered call release request, so that the procedure is blocked.

It is therefore an object of the present invention to provide a control method for a mobile station, network, and mobile communication system to read received signals with the least amount of failure by means of the ciphering onset at the source simultaneously with the deciphering onset at the destination.

3.1.2 Outline of the Ciphering Onset Moment Notification of Embodiment

The outline of ciphering onset moment notification according to an embodiment of the present invention will be described. FIG. 757 represents a ciphering procedure sequence diagram in normal operation according to the embodiment. In the initial stage, assume that the transported signals between the mobile station and network are not ciphered.

As represented in FIG. 757, the network (NW) notifies the mobile station (MS) of the enciphering onset request at step S31. After the notification of the enciphering onset request, the network commences to encipher transmitted signals (downlink or forward signals) at step S32.

Upon reception of the enciphering onset request, the mobile station commences to decipher received signals at step S33. Thereafter, the network enciphers transmitted signals while the mobile station deciphers received signals.

Furthermore, the mobile station sends the network the enciphering onset response for acknowledging the enciphering onset request at step S34. After the notification of the enciphering onset response, the mobile station commences to encipher transmitted signals (uplink or reverse signals) at step S35.

Upon reception of the enciphering onset response, the network commences to decipher received signals at step S36.

Accordingly, the mobile station does not commence deciphering the received signal until it receives the ciphering onset request. Similarly, the network does not commence deciphering the received signal until it receives the ciphering onset response. Therefore, the destination device can read received signals with the least amount of failure by means of the ciphering onset at the source simultaneously with the deciphering onset at the destination.

For example, as represented in FIG. 758, assume that the network has transmitted the enciphering onset request at step S37, and that the mobile station has transmitted at step S38 a call release request for disconnect the call to the network before the reception of the enciphering onset request at the mobile station. In this case, when the network receives the non-ciphered call release request at the reception time Tx1, the network has not yet been prepared to decipher the received signal at step S39 although it has been prepared to encipher the transmitted signal. Therefore, although the network does not have the function to recognize both of enciphered and non-ciphered signals at the same mode—this kind of network is usual for system simplification—, it can read the non-ciphered call release request smoothly.

3.1.3 Detailed Description of the Ciphering Onset Moment Notification of Embodiment The ciphering onset moment notification of embodiment will be further described in more detail. With reference to the functional model in FIG. 64, the encipherment onset moment notification procedures will be described. As shown in FIG. 64, the mobile station MS includes functional entities called UIMF, MCF, and TACAF. UIMF stores information on the station user and serves the user authentication and encipherment calculation. MCF functions as an interface with the network for realizing services that are not related to calls. TACAF controls the access processes to the mobile station terminal, e.g., the origination, paging, and so on.

The network on the other hand includes functional entities called SACF, TACF, LRCF, and LRDF. SACF is connected with MCF to function as an interface with the mobile terminal for realizing services that are not related to calls. TACF is connected with TACAF to control the access processes to the mobile station terminal, e.g., the origination, paging, and so on. LRCF is connected with TACF and SACF to control mobility management. LRDF stores various data on mobility management.

With such a structure, prior to the mutual notification of the encipherment onset, a user authentication procedure (refer to section 2.4.5.1) is executed as shown in FIG. 63. In execution of the user authentication procedure, a certified encipherment key is previously stored at UIMF and LRDF of the network and mobile terminal and delivered to TACAF, MCF, TACF, and SACF.

Then, mutual notification of the encipherment onset time is carried out in accordance with the sequence shown in FIG. 65. More specifically, first, LRCF of the network sends a START CIPHERING request indication for indicating that the network will start encipherment to TACAF and MCF of the mobile terminal via TACF and SACF of the network. Consequently, the mobile terminal can recognize that the succeeding signals transmitted from the network will be ciphered. After the transmission of the START CIPHERING request indication, TACF and SACF of the network cipher succeeding signals according to a preselected encipherment procedure using a preselected ciphering key. Once the mobile terminal receives the enciphered signal, TACAF and MCF controls the decipherment of the received signals. In advance to the decipherment, TACAF and MCF receive the encipherment key from UIMF to carry out the decipherment. Accordingly, the downlink signal transmitted from the network can be transported in secret and interpreted by only the mobile terminal.

Next, TACAF and MCF of the mobile terminal send a START CIPHERING response confirmation to TACF and SACF of the network, this confirmation indicating that mobile station will next start to transmit enciphered signals. Consequently, the network entities can recognize that the succeeding signals transmitted from the mobile terminal will be ciphered. After the transmission of the START CIPHERING response confirmation, TACAF and MCF of the mobile terminal cipher succeeding signals according to a preselected encipherment procedure using a preselected ciphering key. Once the terminal entities receive the enciphered signal, TACF and SCF decipher the received signals. Accordingly, the uplink signal transmitted from the mobile terminal can be transported in secret and interpreted by only the network.

Therefore, although the network does not have the function to recognize both of enciphered and non-ciphered signals at the same mode for system simplification, communications can be achieved between the mobile station and the network smoothly with the least amount of failure by means of the ciphering onset at the source simultaneously with the deciphering onset at the destination.

3.2 Selection of Encipherment Manner by Negotiation Between Mobile Station and Network 3.2.1 Background of Invention of the Procedure FIG. 759 is a schematic sequence diagram representing an encipherment method in a mobile communications system, in which only one specific encipherment manner is adopted. In this mobile communications system, once a mobile station (MS) requests to communicate with the network (NW) at step S41, it is necessary to carry out during the communications (at step S42) the specific encipherment manner including only one specific encipherment procedure or the combination of only one specific encipherment procedure and an encipherment key preparation procedure.

In this system, if the user of the mobile station would like to select a level of security, it is impossible to select a suitable encipherment procedure or a suitable encipherment key preparation procedure.

In addition, it is impossible for the mobile station or the network to select a suitable encipherment procedure or a suitable encipherment key preparation procedure for multimedia service, such as transmission of voice or motion pictures although the communications system permits to transmit them.

Furthermore, if it is necessary to improve encipherment in view of function extension, such as a new service, of the mobile communications system in the future, it will be difficult to adopt a new suitable encipherment procedure or a new suitable encipherment key preparation procedure.

Furthermore, it is necessary that various mobile communications networks utilize all of the encipherment procedures in common in order that mobile stations roam across service areas of mobile communications networks.

It is therefore an object of the present invention to provide a control method for a mobile station, network, and mobile communication system to deal flexibly various encipherment procedures and encipherment key preparation procedures. A preferable embodiment will be described next with reference to FIGS. 760 through 762.

3.2.2 Outline of Selection of the Encipherment Manner by Negotiation Between Mobile Station and Network in Accordance with Embodiment FIG. 760 represents a schematic sequence diagram representing the selection of encipherment manner by negotiation between mobile station and network in accordance with an embodiment. First, the mobile station (MS) requests to communicate with the network (NW) at step S51. Simultaneously, the mobile station notifies the network of types of encipherment manners which can be executed by the mobile station. The encipherment manners may include only encipherment procedures or encipherment procedures and encipherment key preparation procedures although FIG. 760 illustrates types of encipherment procedures A, B, and C.

In view of the notification from the mobile station, the network selects a type of encipherment manner at step S52. For example, a type of encipherment procedure A is selected in FIG. 760. Prior to encipherment communication, the network sends the mobile station an encipherment onset request indicating the selected type of encipherment manner at step S53.

The mobile station then adapts the inside functions according to the type of encipherment manner (encipherment procedure A in FIG. 760) selected by the network at step S54. The network also adapts the inside device functions according to the type of encipherment manner (encipherment procedure A in FIG. 760) selected by the network at step S55.

Accordingly, the mobile station and network are allowed to communicate with each other at step S56 in such a fashion that they use the selected encipherment manner (e.g., encipherment procedure A in FIG. 760). Therefore, if the user of the mobile station would like to select a level of security, it is possible to select a suitable encipherment procedure or a suitable encipherment procedure and a suitable encipherment key preparation procedure.

In addition, it is possible for the mobile station or the network to select a suitable encipherment procedure or a suitable encipherment key preparation procedure for multimedia service, such as transmission of voice or motion pictures if the communications system permits to transmit them.

Furthermore, if it is necessary to improve encipherment in view of function extension, such as a new service, of the mobile communications system in the future, it will be easy to adopt a new suitable encipherment procedure or a new suitable encipherment key preparation procedure.

Furthermore, if a plurality of mobile communications networks utilize minimal encipherment manners in common, it is possible to communicate under a suitable encipherment manner when mobile stations roam across service areas of mobile communications networks. It is unnecessary that various mobile communications networks utilize all of the encipherment procedures in common: each communications network can execute other unique encipherment procedures.

3.2.3 Detailed Description of the Selection of Encipherment Manner by Negotiation Between Mobile Station and Network in Embodiment The selection of encipherment manner by negotiation between mobile station and network in accordance with an embodiment will be further described in more detail with reference to the sequential diagram constituted of FIGS. 761 and 762. In the following description, an encipherment procedure and an encipherment key preparation procedure are selected at the selection of the encipherment manner. In FIGS. 761 and 762, only parameters involved in the encipherment are illustrated and parameters only involved in the authentication are not illustrated for simplifying the description of the encipherment.

A security control unit of the mobile station decides an order of priorities of the types of the encipherment procedures which can be executed by the mobile station and an order of priorities of the types of the encipherment key procedures which can be executed by the mobile station at step S61 before encipherment communication. The security control unit of the mobile station sends a security control unit of the network a call setup request at step S62. The call setup request includes information on the types of encipherment procedures A, B, and C which can be executed by the mobile station; the types of encipherment key preparation procedures X, Y, and Z which can be executed by the mobile station; and the priority order. Upon the reception, the security control unit of the network stores the information on the types of encipherment procedures A, B, and C at step S63.

Next, the security control unit of the network notifies a user information control unit of the network of the information on the types of encipherment key preparation procedures X, Y, and Z at step S64. Upon the reception, the user information control unit prepares a random number at step S65. Furthermore, the user information control unit selects an encipherment key preparation procedure from the key preparation procedures X, Y, and Z at step S66.

Then, the user information control unit prepares an encipherment key at step S67 in accordance with the random number prepared at step S65 and the type of encipherment key preparation procedure (e.g., X as in FIG. 761) selected at step S66. Subsequently, the user information control unit transfers the prepared random number, the prepared encipherment key, and the selected type of encipherment key preparation procedure (e.g., X as in FIG. 761) as authentication information to the security control unit at step S68.

Then, the security control unit of the network stores the prepared encipherment key at step S69, and transmits an authentication request indicating the prepared random number and the selected type of encipherment key preparation procedure (e.g., X as in FIG. 761) to the security control unit of the mobile station at step S70. In the transmission at step S70, other parameters for authentication calculation are included in the authentication request.

Upon the reception of the authentication request, the security control unit of the mobile station sends an authentication calculation request indicating the random number and the type of encipherment key preparation procedure (e.g., X as in FIG. 761) to a user information control unit of the mobile station at step S71.

Upon the reception of the authentication calculation request, the user information control unit of the mobile station prepares another encipherment key at step S72 in accordance with the random number and the type of encipherment key preparation procedure (e.g., X as in FIG. 761). As represented in FIG. 762, the user information control unit sends the security control unit of the mobile station an authentication calculation result indicating the prepared encipherment key at step S74.

Then, the security control unit of the mobile station stores the encipherment key prepared at the user information control unit of the mobile station at step S75. In addition, the security control unit notifies at step S76 the security control unit in the network of an authentication response including the authentication calculation result obtained by a calculation at the user information control unit.

Upon the reception of the authentication response, the security control unit of the network sends the user information control unit of the network at step S77 an authentication calculation comparison request indicating the authentication calculation result sent from the mobile station. The user information control unit, then, compares the authentication calculation result with another authentication calculation result prepared at the network in accordance with the encipherment key prepared at step S67 and other parameters for authentication (not illustrated).

After the completion of the authentication, the user information control unit of the network can send an encipherment request to the security control unit of the network at step S78.

Upon the reception of the encipherment request, the security control unit of the network transmits at step S79 another encipherment request indicating the encipherment key stored at step S69 and the types of encipherment procedures A, B, and C stored at step S63 to a radio access control unit of the network.

Then, the radio access control unit of the network selects an encipherment procedure from the procedures A, B, and C at step S80. For example, the type of procedure B is selected in FIG. 762. The radio access control unit in the network sends another encipherment request indicating the selected type of encipherment procedure (B) to a radio access control unit of the mobile station at step S81.

Upon the reception of the encipherment request, the radio access control unit of the mobile station stores the indicated type of encipherment procedure (B) at step S82. In addition, the radio access control unit of the mobile station requests at step S83 the security control unit of the mobile station to read the encipherment key which was stored at step S75. In response, the security control unit of the mobile station notifies the radio access control unit of the stored encipherment key at step S84.

Then, the radio access control unit of the mobile station sends an encipherment response to the radio access control unit of the network at step S85. The encipherment response indicates that the mobile station will encipher messages to be sent in accordance with the type of encipherment procedure (B) selected at the network and the encipherment key prepared at the mobile station. Afterward, at step S86, the radio access control unit starts communication in such a manner that the encipherment is carried out. Upon the reception of the encipherment response, at step S87, the radio access control unit of the network starts communication in such a manner that the encipherment is carried out according to the type of encipherment procedure (B) and the encipherment key prepared at the network.

According to the above-described method, if the user of the mobile station would like to select a level of security, it is possible to select a suitable encipherment procedure or a suitable encipherment procedure and a suitable encipherment key preparation procedure.

In addition, it is possible for the mobile station or the network to select a suitable encipherment procedure or a suitable encipherment key preparation procedure for multimedia service, such as transmission of voice or motion pictures if the communications system permits to transmit them.

Furthermore, if it is necessary to improve encipherment in view of function extension, such as a new service, of the mobile communications system in the future, it will be easy to adopt a new suitable encipherment procedure or a new suitable encipherment key preparation procedure.

Furthermore, if a plurality of mobile communications networks utilize minimal encipherment manners in common, it is possible to communicate under a suitable encipherment manner when mobile stations roam across service areas of mobile communications networks. It is unnecessary that various mobile communications networks utilize all of the encipherment procedures in common: each communications network can execute other unique encipherment procedures.

3.3 Start of Diversity Handover Simultaneously with Access Link Setup

3.3.1 Background of Invention of the Procedure

Start of diversity handover and a setup of an access link are originally different procedures from each other. Therefore, in a conventional usual method, when a mobile station starts communicating, an access link for the mobile station is setup first. Then, when diversity handover is necessary by travelling of the mobile station or another reason, diversity handover is carried out.

However, the mobile station often locates at the position where diversity handover can be carried out when the access link is setup. Even in such a case, diversity handover transition and the access link setup are carried out at different times in the conventional method.

For example, as represented in part (a) of FIG. 763, a base station 21 has radio zones 11 and 12 and a mobile station 10 locates at a diversity handover zone 13 where the radio zones 11 and 12 overlap each other. In this state, when a call attempt is originated to or from the mobile station 10, an access link with minimal components for facilitating communication of the mobile station 10 are setup. For example, a radio access link 41 is established between the mobile station 10 and the base station 21 while a wired access link 51 is established between the base station 21 and a base station controller 30. After finish of the access link setup, a step for transiting intra-cell diversity handover is carried out: a radio access link 42 corresponding to the radio zone 12 is added as represented in part (b) of FIG. 763.

Additionally, the mobile station often locates at the position where inter-cell diversity handover can be carried out when the access link is setup. For example, as represented in part (a) of FIG. 764, the mobile station 10 locates at a diversity handover zone 15 where radio zones 11 and 14 corresponding to base stations 21 and 22 overlap each other. In this state, when a call attempt is originated to or from the mobile station 10, an access link with minimal components for facilitating communication of the mobile station 10 are setup. For example, a radio access link 41 corresponding to the radio zone 11 is established between the mobile station 10 and the base station 21 while a wired access link 51 is established between the base station 21 and a base station controller 30. After finish of the access link setup, a step for transiting inter-cell diversity handover is carried out: a radio access link 44 corresponding to the radio zone 14 is added and a wired access link 52 is additionally established between the base station 22 and the base station controller 30.

As discussed above, although it is possible to carry out diversity handover at the access link setup, these procedures are carried out at different times: the access link setup should be carried out first, and then diversity handover should be carried out in accordance with prior art.

The access link setup needs a series of information flows transported between the mobile station and the network as illustrated in FIG. 765. In addition, in order to transit to intra-cell diversity handover, needed is a series of information flows transported between the mobile station and the network as illustrated in FIG. 766. In addition, in order to transit to inter-cell diversity handover, needed is a series of information flows transported between the mobile station and the network as illustrated in FIG. 767. The information flows shown in FIGS. 765 to 767 have been already described and will be described for explanation of the invented control method. Thus, the description is omitted here.

According to the above circumstances, a large number of control signals are transported between the mobile station and the network and within the network after the call attempt before diversity handover. Consequently, the system should endure its enormous control burden.

In addition, since the mobile station can use only a single radio access link directly after the access link setup, the transmission power for this access link is strong so as to enlarge interference levels at other radio access links. Therefore, the capacity or the number of channels at the cell may be decreased. The control method described below will resolve the above-mentioned problems.

3.3.2 Outline of the Control Method of Embodiment

In the invented system, the network facilitates diversity handover of a mobile station simultaneously with the access link setup for the mobile station upon a call attempt to or from the mobile station when the mobile station is in a status where it can carry out diversity handover. In addition, the mobile station starts diversity handover simultaneously with the access link setup. More specifically, upon the call attempt, at least one auxiliary branch are established for facilitating diversity handover in addition to the establishment of the main branch, thereby enabling the mobile station to commence the diversity handover using the plurality of branches.

Part (a) of FIG. 768 represents one feature of the invented system which for starting inta-cell diversity handover simultaneously with the access link setup. Part (b) of FIG. 768 represents one feature of the invented system for starting inter-cell diversity handover simultaneously with the access link setup.

3.3.2.1 Start of Intra-Cell Diversity Handover Simultaneously with the Access Link Setup FIG. 769 is a sequential flow diagram representing the start of intra-cell diversity handover simultaneously with the access link setup. The procedure starts upon a call attempt to or from the mobile station 10 when it locates at the position illustrated at part (a) of FIG. 768.

In FIG. 769, TACAFa designates a functional entity in the mobile station 10 shown in part (a) of FIG. 768. TACFa designates an anchor functional entity in the base station controller generated first after the mobile station 10 has started communication. TACFv1 designates a functional entity in the base station controller in order that the base station controller controls the base station 21 where the mobile station 10 visits. BCFr1 designates a functional entity in the base station 21 for controlling radio resources. The subject method will be described with reference to part (a) of FIG. 768 and FIG. 769.

As described above, each mobile station in the system always monitors the reception levels on perch channels corresponding to circumferential zones. Thus, although the mobile station 10 visits the radio zone 11 in part (a) of FIG. 768, it monitors the reception level on the perch channel corresponding to the radio zone 12 neighboring the zone 11.

Assume that the reception level on the perch channel corresponding to the radio zone 12 is in excess of a threshold. In this case, the mobile station 10 notifies the network that the perch channel corresponding to the radio zone 12 is a candidate branch for realizing diversity handover.

In addition, assume that the mobile station locates at the diversity handover zone 13, that the network is informed about a new candidate zone for diversity handover, and that the mobile station 10 originates a call attempt. In this case, when the base station controller 30 decides to establish diversity handover branches for the mobile station 10, the base station controller 30 generates an access link setup request and a diversity handover transition request for the mobile station 10 at the same time. According to the requests, the following steps are advanced in the system.

(1) First, in order to establish an access link for the mobile station 10, the functional entity TACFa in the base station controller 30 sends a BEARER SETUP REQUEST INDICATION (ACCESS LINK SETUP request indication) to the functional entity TACFv in the base station controller 30 that controls the base station 21 where the mobile station 10 visits. The BEARER SETUP request indication includes information elements represented in FIGS. 404 and 433.

(2) Upon the reception of the BEARER SETUP request indication, the functional entity TACFv1 sends a message that includes contents of a BEARER-AND-RADIO-BEARER SETUP request indication and contents of an INTRA-BCFr HANDOVER BRANCH ADDITION request indication to the functional entity BCFr in base station 21. Contents of the BEARER-AND-RADIO-BEARER SETUP request indication are the same as those represented in FIG. 407. The BEARER-AND-RADIO-BEARER SETUP request indication requests to setup the main branch constituted of the radio access link 41 between the base station 21 and the mobile station 10 and the wired access link 51 between the base station 21 and the base station controller 30. The INTRA-BCFr HANDOVER BRANCH ADDITION request indication requests to setup the auxiliary branch for intra-cell diversity handover. That is, it requests to setup the radio access link 42 represented in part (a) of FIG. 768. Contents of the INTRA-BCFr HANDOVER BRANCH ADDITION request indication are the same as those represented in FIG. 434.

The message including the contents of the BEARER-AND-RADIO-BEARER SETUP request indication and the INTRA-BCFr HANDOVER BRANCH ADDITION request indication is the link setup message, which has been described at section 2.5.3.6.2.1.3.2. Contents of the link setup message are represented in FIG. 693, which has been referred for the description at section 2.5.3.6.2.1.3.2. As represented in FIG. 693, the message includes an ACCH setup request information element for requesting the access link and an intra-BS DHO branch addition request information element indicating information on the auxiliary branch to be added for diversity handover.

(3) Next, BCFr sends a message including contents of a RADIO BEARER SETUP PROCEEDING request indication and contents of an INTRA-BCFr HANDOVER BRANCH ADDITION response confirmation to TACFv1. The RADIO BEARER SETUP PROCEEDING request indication is a report indicating that the radio access link (41 in part (a) of FIG. 768) is being established. Contents of the RADIO BEARER SETUP PROCEEDING request indication are the same as those represented in FIG. 408. The INTRA-BCFr HANDOVER BRANCH ADDITION response confirmation is a report indicating that the setup of the radio access link 42 has been completed. Contents of the INTRA-BCFr HANDOVER BRANCH ADDITION response confirmation are the same as those represented in FIG. 435.

(4) Upon the reception of the RADIO BEARER SETUP PROCEEDING request indication and the INTRA-BCFr HANDOVER BRANCH ADDITION response confirmation from BCFr1, TACFv1 sends a RADIO BEARER SETUP REQUEST request indication to TACFa to request the mobile station 10 to establish the radio access links 41 and 42. The RADIO BEARER SETUP REQUEST request indication includes information elements represented in FIGS. 409 and 436.

(5) Then, TACFa in the base station controller 30 sends a message including contents of a HANDOVER BRANCH ADDITION request indication and contents of a RADIO BEARER SETUP request indication to TACAF of the mobile station 10. The message requests to establish the radio access link 41, which belongs to the main branch which will be the subject of synchronization later, and the radio access link 42, which is the auxiliary link for diversity handover. The message is the radio bearer setup message, which has been described at section 2.5.2.4.2.3.4.1. Contents of the radio bearer setup message are represented in FIG. 624, which has been referred for the description at section 2.5.2.4.2.3.4.1. As represented in FIG. 624, the message includes information on the main branch and a DHO branch addition information indicating information on the auxiliary branch to be added for diversity handover.

(6) Subsequently, TACAFa in the mobile station 10 starts to synchronize process of the TACAFa with process of BCFr1 in the base station with respect to the radio access link of the main branch.

(7) After completion of the synchronization, BCFr1 in the base station 21 sends a BEARER-AND-RADIO-BEARER SETUP response confirmation to TACFv1 in the base station controller 30 to report the completion of the synchronization on the radio access link. FIG. 413 represents the contents of the BEARER-AND-RADIO-BEARER SETUP response confirmation.

(8) Upon the reception of the BEARER-AND-RADIO-BEARER SETUP response confirmation, TACFv1 sends a BEARER SETUP response confirmation to TACFa in order to report the completion of the access link setup. FIG. 414 represents the contents of the BEARER SETUP response confirmation.

Consequently, the access link setup is established and the system state is transited to diversity handover.

3.3.2.2 Start of Inter-Cell Diversity Handover Simultaneously with the Access Link Setup FIG. 770 is a sequential flow diagram representing the start of inter-cell diversity handover simultaneously with the access link setup. The procedure starts upon a call attempt to or from the mobile station 10 when it locates at the position illustrated at part (b) of FIG. 768.

In FIG. 770, TACAFa designates a functional entity in the mobile station 10 shown in part (b) of FIG. 768. TACFa designates a functional entity in the base station controller generated first after the mobile station 10 has started communication. TACFv1 and TACFv2 designate functional entities in the base station controller in order that the base station controller controls the base stations 21 and 22 where the mobile station 10 visits. BCFr1 and BCFr2 designate functional entities in the base stations 21 and 22 for controlling radio resources. The subject method will be described with reference to part (b) of FIG. 768 and FIG. 769.

As represented in part (b) of FIG. 768, assume that when the mobile station 10 moves into the diversity handover zone 13, the mobile station 10 originates a call attempt. In this case, the base station controller 30 generates an access link setup request and a diversity handover transition request for the mobile station 10 at the same time. According to the requests, the following steps are advanced in the system.

(1) First, in order to establish an access link for the mobile station 10, TACFa in the base station controller 30 sends a BEARER SETUP request indication (ACCESS LINK SETUP request indication) to TACFv1 in the base station controller 30. The contents of the BEARER SETUP request indication are represented in FIG. 404.

(2) Upon the reception of the BEARER SETUP request indication, TACFv1 sends a BEARER-AND-RADIO-BEARER SETUP request indication to request to establish the radio access link 41 between the base station 21 and the mobile station 10 and to establish the wired access link between the base station 21 and the base station controller 30. Contents of the BEARER-AND-RADIO-BEARER SETUP request indication are represented in FIG. 407.

(3) Upon the reception of the BEARER-AND-RADIO-BEARER SETUP request indication, BCFr1 starts to establish the radio access link and the wired access link and sends a RADIO BEARER SETUP PROCEEDING request indication to TACFv1 to report that the radio access link. Contents of the RADIO BEARER SETUP PROCEEDING request indication are represented in FIG. 404.

(4) Upon the reception of the RADIO BEARER SETUP PROCEEDING request indication, TACFv1 in the base station controller 30 sends a RADIO BEARER SETUP REQUEST request indication to TACFa to request the mobile station 10 to establish the radio access link 41 while the base station 21 establishes the radio access link 41. The RADIO BEARER SETUP REQUEST request indication includes information elements represented in FIG. 409.

(5) Next, TACFa in the base station controller 30 sends a BEARER SETUP request indication (ACCESS LINK SETUP request indication) to the functional entity TACFv2 in the base station controller 30 that controls the base station 22 where the mobile station 10 visits. The BEARER SETUP request indication includes information elements represented in FIG. 442.

(6) Upon the reception of the BEARER SETUP request indication, TACFv2 sends a BEARER-AND-RADIO-BEARER SETUP request indication to request to establish the radio access link 44 between the base station 22 and the mobile station 10 and to establish the wired access link between the base station 22 and the base station controller 30. Contents of the BEARER-AND-RADIO-BEARER SETUP request indication are represented in FIG. 445.

(7) After completion of the setup of the radio access link and the wired access link, BCFr2 in the base station 22 sends a BEARER-AND-RADIO-BEARER SETUP response confirmation represented in FIG. 446 to TACFv2 in the base station controller 30 to notify of the completion.

(8) Upon the reception of the BEARER-AND-RADIO-BEARER SETUP response confirmation, TACFv2 sends a RADIO BEARER SETUP REQUEST request indication represented in FIG. 447 to TACFa in order to request the mobile station 10 to establish the radio access link 44.

(9) Upon the reception of the RADIO BEARER SETUP REQUEST request indication, TACFa sends a message including contents of a HANDOVER BRANCH ADDITION request indication and contents of a RADIO BEARER SETUP request indication to TACAF of the mobile station 10. The message requests to establish the radio access link 41, which belongs to the main branch which will be the subject of synchronization later, and the radio access link 44, which is the auxiliary link for diversity handover.

(10) Subsequently, the mobile station 10 starts to synchronize process of the mobile station with process of the base station 21 with respect to the radio access link 41 of the main branch.

(11) After completion of the synchronization, BCFr1 in the base station 21 sends a BEARER-AND-RADIO-BEARER SETUP response confirmation to TACFv1 in the base station controller 30 to report the completion of the synchronization on the radio access link. FIG. 413 represents the contents of the BEARER-AND-RADIO-BEARER SETUP response confirmation.

(12) Then, TACFv1 sends a BEARER SETUP response confirmation (ACCESS LINK SETUP response confirmation) to TACFa in order to report the completion of the access link setup. FIG. 414 represents the contents of the BEARER SETUP response confirmation.

Consequently, the access link setup is established and the system state is transited to diversity handover.

3.3.3 Operations of Mobile Station and Base Station for the Control Method 3.3.3.1 Operation of Mobile Station FIG. 786 represents in detail the operation in FIG. 770. More specifically, it particularly represents the operation after the transmission of the message including the contents of the HANDOVER BRANCH ADDITION request indication and of the RADIO BEARER SETUP request indication from TACFa of the base station controller to TACAF of the mobile station.

As represented in FIG. 786, upon the reception of the HANDOVER BRANCH ADDITION request indication and the RADIO BEARER SETUP request indication, TACAFa establishes the main branch. More specifically, the mobile station allots physical resources (frequency and codes) for radio communication to a radio transceiver device of the mobile station, and then, synchronize process of the mobile station with process of BCFr1 of the base station with respect to upward (reverse) communication and downward (forward) communication. After completion of the synchronization, voice or data communication is started.

Immediately after the completion of setup of the main branch in the above-described fashion, the mobile station sets up the auxiliary branch. In this case, the mobile station allots physical resources for the auxiliary branch. Immediately afterward, the mobile station starts to receive signals through the auxiliary branch, thereby commencing diversity combining by virtue of the main and auxiliary branches without synchronization unlike the main branch setup.

FIG. 787 is a flowchart of an operation of the mobile station, which is appropriate to realizing the above-mentioned operation. More specifically, this flowchart represents an operation for processing in the mobile station after receiving a message including both of the setup request of the main branch and the additional setup request of the auxiliary branch from the base station controller when any access link is not established.

As represented in the flowchart, upon the reception of a signal at step S1, the mobile station transits from the signal reception standby state to step S2. At step S2, the mobile station determines whether or not the received signal contains information on the main branch. If the determination is affirmative, the mobile station establishes the main branch at step S3 in accordance with the main branch information.

Next, the mobile station determines whether or not the received signal contains information on the auxiliary branch at step S4. If the determination is affirmative, the mobile station establishes the auxiliary branch at step S5 in accordance with the auxiliary branch information. As represented by the circulation through steps S4 and S5, if a plurality of auxiliary branches are indicated by the received signal, the mobile station establishes all of the auxiliary branches in accordance with the information.

If there is not a next indication of auxiliary branch in the received signal, the determination at step S4 should be negative, so that the mobile station returns to the signal reception standby state.

As will be understood from the above description, if the mobile station receives a message including both of the setup request of the main branch and the additional setup request(s) of the auxiliary branch(es), it establishes all of the branches informed by the message. This operation contributes the operation represented in FIG. 786 for starting diversity handover simultaneously with the access link setup. Although the above-description with reference to FIGS. 786 and 787 relates to inter-cell diversity handover with the access link setup, similar operations can be applied to intra-cell diversity handover with the access link setup.

For easy comparison, FIG. 788 represents a conventional operation of a mobile station after the access link setup while FIG. 789 represents a conventional flowchart of an operation for realizing the access link setup. As represented in FIG. 788, according to the prior art, a RADIO BEARER SETUP request indication is sent from the base station controller to the mobile station in order to establish the first access link, and then, a HANDOVER BRANCH ADDITION request indication is sent from the base station controller to the mobile station in order to start diversity handover. In other words, an extra message transmission from the base station controller to the mobile station is necessary in comparison with the invented system.

Furthermore, since the RADIO BEARER SETUP request indication and the HANDOVER BRANCH ADDITION request indication are sent to the mobile station at different times according to the prior art, the mobile station treats received signals according to the flowchart represented in FIG. 789. As represented in the flowchart, upon the reception of a signal at step S11, the mobile station transits from the signal reception standby state to step S12. As depicted by steps S12 and S13, if the signal contains information on the main branch, the mobile station establishes the main branch in accordance with the main branch information. On the other hand, if the signal contains information on the auxiliary branch, the mobile station establishes the auxiliary branch in accordance with the auxiliary branch information as depicted by steps S12 and S14.

Unlikely, according to the invented system, one message including information on all of the main branch and auxiliary branch(es) is sent to the mobile station, so that the mobile station establishes all branches. Therefore, the number of signal transmission between the network and the mobile station can be reduced, so that the transition to diversity handover can be achieved efficiently.

3.3.3.2. Operation of Base Station

As already described with reference to FIG. 769, in order to transit intra-cell diversity handover simultaneously with the access link setup, the message including the contents of the BEARER-AND-RADIO BEARER SETUP request indication and INTRA-BCFr HANDOVER BRANCH ADDITION request indication is sent to the base station in the system. The base station in the system reads the information on all of the branches contained in the message and establishes all branches in accordance with the branch information. If this operation is represented as in a flowchart, it is the same as FIG. 787. Therefore, the illustration of flowchart and the description thereof are omitted.

3.4 Diversity Handover Branch Addition Simultaneously with Branch Replacement 3.4.1 Background of Invention of the Procedure When a mobile station moves from a radio zone to a neighboring radio zone where the available frequency band is different from that of the former zone, branch replacement is carried out. Branch replacement is also carried out to replace the frequency band used by the mobile station with another frequency band if communication quality is deteriorated although the mobile station does not move.

In accordance with prior art, transition to diversity handover is often necessary immediately after the completion of branch replacement. FIG. 771 represents one of the situations where it is necessary. As represented in FIG. 771, while frequency band f1 is used in cell 1, frequency band f2 is used in cell 2. Assume that a mobile station moves along the direction indicated by the arrow into the zone where cells 1, 2, and 3 overlap one another. In this case, when the mobile station quits cell 1, branch replacement is carried out at the diversity handover zone where cells 2 and 3 overlap each other.

In accordance with prior art, first, the branch corresponding to cell 1 used by the mobile station is replaced with the branch corresponding to cells 2 and 3, and then, another branch corresponding to cell 3 is added for enabling diversity handover.

However, the branch replacement needs a series of information flows transported between the mobile station and the network as illustrated in FIG. 772. In addition, in order to transit to diversity handover, needed is a series of information flows transported between the mobile station and the network as illustrated in FIG. 767. The information flows shown in FIGS. 772 and 767 have been already described and will be described for explanation of the invented control method. Thus, the description is omitted here.

According to the above circumstances, a large number of control signals are transported between the mobile station and the network and within the network for the branch replacement and the diversity handover in progression. Consequently, the system should endure its enormous control burden.

In addition, since the mobile station can use only a single radio access link directly after the branch replacement, the transmission power for this access link is strong so as to enlarge interference levels at other radio access links. Therefore, the capacity or the number of channels at the cell may be decreased.

The above-mentioned problems occur at the situation where the transition to inter-cell diversity handover is possible after the branch replacement as represented in FIG. 771. The same problems occur at the situation where the transition to intra-cell diversity handover is possible after the branch replacement. The control method described below will resolve the above-mentioned problems.

3.4.2 Diversity Handover Branch Addition Simultaneously with Branch Replacement of Embodiment According to the embodiment of the system, when it is possible transit to diversity handover at the occurrence of the initiation to branch replacement, the branch structure before the initiation is immediately replaced with the branch structure necessary for diversity handover. FIG. 773 is a sequential flow diagram representing an operation in the invented system which is carried out when the mobile station moves from cell 1 to the diversity handover zone where cells 2 and 3 overlap each other (see FIG. 771).

In FIG. 773, TACAFa designates a functional entity in the mobile station shown in FIG. 771. TACFa designates a functional entity in the base station controller generated first after the mobile station has started communication. TACFv1, TACFv2, and TACFv3 designate functional entities in the base station controller in order that the base station controller controls base stations where the mobile station 10 visits. In the example in FIG. 771, TACFv1, TACFv2, and TACFv3 correspond to cells 1, 2, and 3, respectively. BCFr1, BCFr2, and BCFr3 designate functional entities in the base stations for controlling radio resources. In the example in FIG. 771, BCFr1, BCFr2, and BCFr3 correspond to cells 1, 2, and 3, respectively. The subject method will be described with reference to FIGS. 771 and 773.

In FIG. 771, assume that when the mobile station enters the diversity handover zone where cells 1, 2, and 3 overlap one another, the mobile station notifies the network that the cells 2 and 3 are candidate cells for realizing diversity handover and the network recognizes that cells 2 and 3 are candidate cells. In addition, assume that the mobile station exits cell 1 and moves into the diversity handover zone where cells 2 and 3 overlap each other. In this case, the base station controller generates a branch replacement request and a diversity handover transition request for the mobile station at the same time. According to the requests, the following steps are advanced in the system.

(1) TACAFa in the base station controller sends a BEARER SETUP request indication to TACFv2 in the base station controller in order to establish a branch between the base station controller and the mobile station through the base station in charge of cell 2.

(2) Upon the reception of the BEARER SETUP request indication, TACFv2 sends a BEARER-AND-RADIO-BEARER SETUP request indication to BCFr2 in the base station in charge of cell 2. The BEARER-AND-RADIO-BEARER SETUP request indication requests to establish a radio access link between the base station in charge of cell 2 and the mobile station and a wired access link between the base station and the base station controller.

(3) After starting the establishment of the radio and wired access links upon the reception of the BEARER-AND-RADIO-BEARER SETUP request indication, BCFr2 of the base station for cell 2 sends a RADIO BEARER SETUP PROCEEDING request indication to TACFv2 in the base station controller to report that the access link setup is proceeding.

(4) Upon the reception of the RADIO BEARER SETUP PROCEEDING request indication, TACFv2 sends a RADIO BEARER SETUP REQUEST request indication to TACFa to request the mobile station to establish the radio access link between the mobile station and the base station for cell 2.

(5) Upon the reception of the RADIO BEARER SETUP REQUEST request indication, TACFa sends another BEARER SETUP request indication to TACFv3 to request to establish another branch between the base station controller and the mobile station through the base station in charge of cell 3.

(6) Upon the reception of the BEARER SETUP request indication, TACFv3 sends another BEARER-AND-RADIO-BEARER SETUP request indication to BCFr3 in the base station in charge of cell 3. The BEARER-AND-RADIO-BEARER SETUP request indication requests to establish a radio access link between the base station in charge of cell 3 and the mobile station and a wired access link between the base station and the base station controller.

(7) Upon the reception of the BEARER-AND-RADIO-BEARER SETUP request indication, BCFr3 of the base station for cell 3 starts the establishment of the radio and wired access links, and then, sends another RADIO BEARER SETUP PROCEEDING request indication to TACFv3 in the base station controller to report that the access link setup is proceeding.

(8) Upon the reception of the BEARER-AND-RADIO-BEARER SETUP response confirmation, TACFv3 sends a RADIO BEARER SETUP REQUEST request indication to TACFa to request the mobile station to establish the radio access link between the mobile station and the base stations for cells 2 and 3.

(9) Upon the reception of the RADIO BEARER SETUP REQUEST request indication, TACFa sends a message including contents of a NON-SOFT HANDOVER EXECUTION request indication and of a HANDOVER BRANCH ADDITION request indication to TACAfa in the mobile station. The NON-SOFT HANDOVER EXECUTION request indication requests the replacement of main branch while the HANDOVER BRANCH ADDITION request indication requests to add an auxiliary branch. With such constituents, the message requests the mobile station to replace a former branch corresponding to cell 1 where frequency f1 is used with a new branch corresponding to cell 2 where frequency f2 is used, and requests the mobile station to add an auxiliary branch corresponding to cell 3 where frequency f2 is used. The message is the handover command message, which has been described at section 2.5.2.4.2.3.4.4. Contents of the message are represented in FIG. 627, which has been referred for the description at section 2.5.2.4.2.3.4.4. As represented in FIG. 627, the message includes a branch replacement information element indicating information on the new main branch and a DHO branch addition information element indicating information on the auxiliary branch to be added for diversity handover.

(10) Subsequently, the mobile station starts to synchronize process of the mobile station with process of the base station for cell 2 with respect to the main branch.

(11) After completion of the synchronization, BCFr2 in the base station for cell 2 sends a BEARER-AND-RADIO-BEARER SETUP response confirmation to TACFv2 in the base station controller to report the completion of the synchronization on the radio access link.

(12) Upon the reception of the BEARER-AND-RADIO-BEARER SETUP response confirmation, TACFv2 sends a BEARER SETUP response confirmation to TACFa in order to report the completion of the access link setup.

(13) Upon the reception of the BEARER SETUP response confirmation, TACFa in the base station controller sends a BEARER RELEASE request indication to TACFv1 to request to release the access link formerly used by the base station for cell 1 for communicating with the mobile station.

(14) Upon the reception of the BEARER RELEASE request indication, TACFv1 sends a BEARER-AND-RADIO-BEARER RELEASE request indication to BCFr1 in the base station for cell 1 to request to release the radio access link and wired access link formerly used by the base station for cell 1 for communicating with the mobile station.

(15) Upon the reception of the BEARER-AND-RADIO-BEARER RELEASE request indication, BCFr1 in the base station for cell 1 releases the radio access link and wired access link formerly used by the base station for cell 1 for communicating with the mobile station, and sends a BEARER-AND-RADIO-BEARER RELEASE response confirmation to TACFv1 to report the completion of access link release.

(16) Upon the reception of the BEARER-AND-RADIO-BEARER RELEASE response confirmation, TACFv1 in the base station sends a BEARER RELEASE response confirmation to TACFa to report the completion of access link release.

Therefore, the mobile station can transit to diversity handover using branches corresponding to cells 2 and 3.

An operation of the system when the mobile station can carries out inter-cell diversity handover directly after the branch replacement has been described with reference to FIGS. 771 and 773. A similar operation is executed for the case when the mobile station can carries out intra-cell diversity handover directly after the branch replacement. In this case, the base station controller sends a single message including information instructing the branch replacement and information instructing the diversity handover branch addition to the single base station in charge of intra-cell diversity handover.

3.4.3 Operations of Mobile Station and Base Station for the Control Method 3.4.3.1 Operation of Mobile Station As described above, a message including an instruction on the branch replacement and an instruction on the addition of auxiliary branch for diversity handover is sent to the mobile station in the system. Therefore, when the mobile station receives this kind of message from the network, the mobile station carries out the branch replacement and the addition of auxiliary branch for diversity handover. In this case, the same operation as described in section 3.3.3.1 is carried out.

3.4.3.2 Operation of Base Station

As described above, a message including an instruction on the branch replacement and an instruction on the addition of auxiliary branch for intra-cell diversity handover is sent to the base station in the system. Therefore, when the base station receives this kind of message from the network, the base station carries out the branch replacement and the addition of auxiliary branch for diversity handover.

3.5 first method for Controlling Branch Structure and Frequency Band when a New Call Occurs while Mobile Station Capable of Treating a Plurality of Calls Simultaneously Treats an Existent Call 3.5.1 Background of Invention of the Method There is provided a mobile station capable of treating a plurality of calls simultaneously. In accordance with prior art, this kind of mobile station is not provided with means for equalizing branch structure and frequency band as to all calls. Different branch structures and different frequency bands are sometimes allocated to calls while the mobile station treats them. Thus, it is necessary for the network to control respective calls with regard to handover of mobile station and transmission power, so that the network should endure an enormous burden with respect to preparation of overheads of messages. The control method described below will resolve the above-mentioned problems.

3.5.2 Embodying Method

As represented in part (a) of FIG. 774, BTS1 and BTS2 have radio zones, respectively, where frequency f1 is used. The MS treating call 1 communicates with BTS1 and BTS2 such that diversity reception from BTS1 and BTS2 is carried out at the diversity handover transition state. In this state, assume that a new call attempt occurs to or from the MS.

In this case, the branch structure and the frequency band used for the new call (call 2 in FIG. 774) are controlled to be equalized with those used for the existent call (call 1 in FIG. 774) in the system. More specifically, a frequency band f1 has been used for existent call 1 and branches corresponding to BTS1 and BTS2 have been used for call 1 as represented in part (a) of FIG. 774. Therefore, upon the occurrence of new call 2, the frequency band f1 is also used and branches corresponding to BTS1 and BTS2 are also used for call 2 in part (b) of FIG. 774.

FIG. 775 is a sequential flow diagram representing the operation exemplified in FIG. 774 of the system. In FIG. 775, TACAFa designates a functional entity in the MS shown in FIG. 774. TACFa designates a functional entity in the base station controller generated first after the MS has started communication. TACFv1 and TACFv2 designate functional entities in the base station controller in order that the base station controller controls BTS1 and BTS2 where the MS visits. BCFr1 and BCFr2 designate functional entities in BTS1 and BTS2, respectively, for controlling radio resources. The subject method will be described with reference to FIGS. 774 and 775.

If new call 2 occurs to or from the MS while the MS treats existent call 1 such that diversity reception from BTS1 and BTS2 is carried out at the diversity handover transition state as represented in part (a) of FIG. 774, TACFa in the base station controller receives a request for establishing a new access link corresponding to new call 2 and a request for equalizing the branch structure for call 2 with that for call 1. According to the requests, the following steps are advanced in the system.

(1) In order to request to establish an access link for new call 2 via BTS1 where the MS visits, TACFa sends a BEARER SETUP request indication to TACFv1 in the base station controller, which controls BTS1.

(2) Upon the reception of the BEARER SETUP request indication, TACFv1 sends a BEARER-AND-RADIO-BEARER SETUP request indication to BCFr1 in BTS1 to request to establish a radio access link between BTS1 and the MS and a wired access link between BTS1 and the base station controller for new call 2.

(3) Upon the reception of the BEARER-AND-RADIO-BEARER SETUP request indication, BCFr1 in BTS1 starts establishing the requested radio and wired access links, and then, sends a RADIO BEARER SETUP PROCEEDING request indication to TACFv1 in the base station controller to report that the access link setup is proceeding.

(4) Upon the reception of the RADIO BEARER SETUP PROCEEDING request indication, TACFv1 sends a RADIO BEARER SETUP REQUEST request indication to TACFa to request to establish the radio access link between the MS and BTS1.

(5) On the other hand, in order to request to establish an access link for new call 2 via BTS2, TACFa sends another BEARER SETUP request indication to TACFv2 in the base station controller, which controls BTS2.

(6) Upon the reception of the BEARER SETUP request indication, TACFv2 sends a BEARER-AND-RADIO-BEARER SETUP request indication to BCFr2 in BTS2 to request to establish another radio access link between BTS2 and the MS and another wired access link between BTS2 and the base station controller.

(7) Upon the reception of the BEARER-AND-RADIO-BEARER SETUP request indication, BCFr2 in BTS2 establishes the requested radio and wired access links, and then, sends a BEARER-AND-RADIO-BEARER SETUP response confirmation to TACFv2 in the base station controller to report that the access link setup is completed.

(8) Upon the reception of the BEARER-AND-RADIO-BEARER SETUP response confirmation, TACFv2 sends a RADIO BEARER SETUP REQUEST request indication to TACFa to request to establish the radio access link between the MS and BTS2.

(9) By this stage, TACFa has received two RADIO BEARER SETUP REQUEST request indications: the first is sent from TACFv1 to request the establishment of the radio access link between the MS and BTS1, and the second is sent from TACFv2 to request the establishment of the radio access link between the MS and BTS2. Upon the reception of the second RADIO BEARER SETUP REQUEST request indication from TACFv2, TACFa sends a single message including contents of a HANDOVER BRANCH ADDITION request indication and of a RADIO BEARER SETUP request indication to TACAFa in the MS. The RADIO BEARER SETUP request indication is used for requesting to establish the main branch, which will be the subject of synchronization later, via BTS1. The HANDOVER BRANCH ADDITION request indication is used for establishing the auxiliary branch via BTS2 for diversity handover. Thus, the message requests the MS to establish the radio access link of the main branch via BTS1 and the radio access link of the auxiliary branch via BTS2 for new call 2.

(10) Subsequently, the MS starts to synchronize process of the MS with process of the BTS1 with respect to the radio access link of the main branch.

(11) After completion of the synchronization, BCFr1 in BTS1 sends a BEARER-AND-RADIO-BEARER SETUP response confirmation to TACFv1 in the base station controller to report the completion of the synchronization on the radio access link.

(12) Upon the reception of the BEARER-AND-RADIO-BEARER SETUP response confirmation, TACFv1 sends a BEARER SETUP response confirmation to TACFa in order to report the completion of the access link setup. Consequently, the MS can use the same diversity handover branches via BTS1 and BTS2 and can use the same frequency f1 for both calls 1 and 2.

3.6 Second Method for Controlling Branch Structure and Frequency Band when Anew Call Occurs while Mobile Station Capable of Treating a Plurality of Calls Simultaneously Treats an Existent Call 3.6.1 Background of Invention of the Method In the above control method described at section 3.5, the branch structure and the frequency band for the new call are equalized with those for the existent call when the new call attempt occurs during communication by the mobile station.

However, if traffic at least one of the branches or at the frequency used for the existent call is congested or another inconvenient situation happen at the occurrence of the new call attempt, it is impossible to allocate the same branch structure or the frequency band to the new call. In this case, the call attempt cannot be accepted. The control methods described below will resolve the above-mentioned problems.

3.6.2 Embodying Methods

The control methods according to embodiments of the invention is carried out when a new call occurs while the mobile station capable of treating a plurality of calls simultaneously treats an existent call and when it is impossible to assign the same branch structure or the same frequency band as for the existent call to the new call by insufficient capacity or another reason. In accordance with the embodiments, at the establishment of the new call, another branch structure or another communication frequency band which can continue both of the existent and new calls is selected, and the selected branch structure or communication frequency band is assigned to both of the existent and new calls.

FIG. 776 represents one of the methods according to the embodiments. In part (a) of FIG. 776, an MS uses a branch at frequency f1 between BTS1 and the MS, thereby treating call 1. Then, an attempt of new call 2 occurs from the MS. However, assume that the capacity of BTS1 is insufficient for the needs of new call 2.

However, the capacity of BTS2 adjacent to BTS1 is sufficient for the needs of calls 1 and 2. In addition, BTS2 uses the same frequency band f1 as of BTS1. If a diversity branch structure including branches via BTS1 and BTS2 is used for call 1, the transmission power for each branch may be reduced and the capacity of BTS1 can be enhanced to afford call 2 newly.

Accordingly, in the embodying method, the former branch structure for call 1 is replaced with the diversity branch structure including branches via BTS1 and BTS2 at the establishment of call 2 as represented in part (b) of FIG. 776. The same branch structure and the same frequency band are allocated to new call 2.

FIG. 777 represents another method according to another embodiment. In part (a) of FIG. 777, an MS uses a branch at frequency f1 between BTS1 and the MS, thereby treating call 1. Then, an attempt of new call 2 occurs from the MS. However, assume that the capacity of BTS1 is insufficient for the needs of new call 2.

However, the capacity of BTS2 adjacent to BTS1 is sufficient for the needs of calls 1 and 2. However, BTS2 uses a frequency band f2, which is different from that of BTS1, so that the MS cannot conduct diversity reception by BTS1 and BTS2.

Accordingly, in the embodying method, the former branch structure for call 1 is replaced with another branch structure constituted of only the single branch via BTS2 at the establishment of call 2 as represented in part (b) of FIG. 777. The same branch structure and the same frequency band are allocated to new call 2.

FIG. 778 is a sequential flow diagram representing the operation exemplified in FIG. 776 of the system. In FIG. 778, TACAFa designates a functional entity in the MS shown in FIG. 776. TACFa designates a functional entity in the base station controller generated first after the MS has started communication. TACFv1-2 designates an instance of a functional entity in the base station controller in order that the base station controller controls BTS1 where the MS visits. TACFv1-2 corresponds to call 1. TACFv2-1 and TACFv2-2 designate instances of functional entities in the base station controller in order that the base station controller controls BTS2 where the MS visits. TACFv2-1 and TACFv2-2 correspond to calls 1 and 2, respectively. BCFr1-2 designates an instance of a functional entity in BTS1 for controlling radio resources. BCFr1-2 corresponds to call 1. BCFr2-1 and BCFr2-2 designate instances of functional entities in BTS2 for controlling radio resources. BCFr2-1 and BCFr2-2 correspond to calls 1 and 2, respectively. The subject method will be described with reference to FIGS. 776 and 778.

If new call 2 occurs to or from the MS while the MS treats existent call 1 using BTS1 as represented in part (a) of FIG. 776, TACFa in the base station controller ascertains radio resources occupied by existent call 1 and all available radio resources in all of the base stations (BTS1 and BTS2 in FIG. 776) where the MS visits.

Then, TACFa determines how to treat all calls, including the new call, for the MS on the basis of the ascertainment. In other words, TACFa in the base station controller determines to allocate the branch structure constituted of the branch between the MS and BTS1 and the branch between the MS and BTS2 to calls 1 and 2 as described above with reference to part (b) of FIG. 776. According to the determination, the following steps are advanced in the system.

(1) In order to request to establish an access link for new call 2 via BTS1 where the MS visits, TACFa sends a BEARER SETUP request indication to TACFv1-2 in the base station controller, which controls BTS1.

(2) Upon the reception of the BEARER SETUP request indication, TACFv1-2 sends a BEARER-AND-RADIO-BEARER SETUP request indication to BCFr1-2 in BTS1 to request to establish a radio access link between BTS1 and the MS and a wired access link between BTS1 and the base station controller for call 2.

(3) Additionally, TACFa in the base station controller sends another BEARER SETUP request indication to TACFv2-1 in the base station controller, which controls BTS2 in order to request to establish an access link for existent call 1 via BTS2 where the MS visits.

(4) Upon the reception of the BEARER SETUP request indication, TACFv2-1 sends another BEARER-AND-RADIO-BEARER SETUP request indication to BCFr2-1 in BTS2 to request to establish another radio access link between BTS2 and the MS and another wired access link between BTS2 and the base station controller for call 1.

(5) Upon the reception of the BEARER-AND-RADIO-BEARER SETUP request indication from TACFv1-2, BCFr1-2 in BTS1 starts establishing the requested radio and wired access links, and then, sends a RADIO BEARER SETUP PROCEEDING request indication to TACFv1-2 in the base station controller to report that the access link setup is proceeding.

(6) Upon the reception of the RADIO BEARER SETUP PROCEEDING request indication, TACFv1-2 sends a RADIO BEARER SETUP REQUEST request indication to TACFa to request to establish the radio access link for new call 2 between the MS and BTS1.

(7) On the other hand, upon the reception of the BEARER-AND-RADIO-BEARER SETUP request indication from TACFv2-1, BCFr2-1 in BTS2 starts establishing the requested radio and wired access links, and then, sends a BEARER-AND-RADIO-BEARER SETUP PROCEEDING request indication to TACFv2-1 in the base station controller to report that the access link setup is proceeding.

(8) Upon the reception of the BEARER-AND-RADIO-BEARER SETUP PROCEEDING request indication, TACFv2-1 sends a RADIO BEARER SETUP REQUEST request indication to TACFa to request to establish the radio access link for existent call 1 between the MS and BTS2.

(9) In addition, TACFa in the base station controller sends another BEARER SETUP request indication to TACFv2-2 in the base station controller, which controls BTS2 in order to request to establish an access link for new call 2 via BTS2 where the MS visits.

(10) Upon the reception of the BEARER SETUP request indication, TACFv2-2 sends another BEARER-AND-RADIO-BEARER SETUP request indication to BCFr2-2 in BTS2 to request to establish another radio access link between BTS2 and the MS and another wired access link between BTS2 and the base station controller for new call 2.

(11) Upon the reception of the BEARER-AND-RADIO-BEARER SETUP request indication, BCFr2-2 in BTS2 starts establishing the requested radio and wired access links, and then, sends another BEARER-AND-RADIO BEARER SETUP PROCEEDING request indication to TACFv2-2 in the base station controller to report that the access link setup is proceeding.

(12) Upon the reception of the BEARER-AND-RADIO-BEARER SETUP response confirmation, TACFv2-2 sends a RADIO BEARER SETUP REQUEST request indication to TACFa to request to establish the radio access link for call 2 between the MS and BTS2.

(13) By this stage, TACFa has received three RADIO BEARER SETUP REQUEST request indications: the first is sent from TACFv1-2 to request the establishment of the radio access link between the MS and BTS1 for new call 2, the second is sent from TACFv2-1 to request the radio access link between the MS and BTS2 for existent call 1, and the third is from TACFv2-2 for the radio access link between the MS and BTS2 for new call 2. Upon the reception of the third RADIO BEARER SETUP REQUEST request indication from TACFv2-2, TACFa sends a single message including contents of a HANDOVER BRANCH ADDITION request indication and of a RADIO BEARER SETUP request indication to TACAFa in the MS. The RADIO BEARER SETUP request indication is used for requesting to establish the main branch for call 2, which will be the subject of synchronization later, via BTS1. The HANDOVER BRANCH ADDITION request indication is used for establishing the auxiliary branches via BTS2 for diversity handover of both calls 1 and 2.

(14) Subsequently, the MS starts to synchronize process of the MS with process of the BTS1 with respect to the radio access link of the main branch for new call 2.

(15) After completion of the synchronization, BCFr1-2 in BTS1 sends a BEARER-AND-RADIO-BEARER SETUP response confirmation to TACFv1-2 in the base station controller to report the completion of the synchronization on the radio access link.

(16) Upon the reception of the BEARER-AND-RADIO-BEARER SETUP response confirmation, TACFv1-2 in BTS1 sends a BEARER SETUP response confirmation to TACFa in order to report the completion of the access link setup. Consequently, the MS can use the same diversity handover branches via BTS1 and BTS2 and can use the same frequency f1 for both calls 1 and 2.

FIG. 779 is a sequential flow diagram representing the operation exemplified in FIG. 777 of the system. In FIG. 779, meanings of TACAFa, TACFv1-1, and so on are the same as those in FIG. 778. Another method will be described with reference to FIGS. 777 and 779.

If new call 2 occurs to or from the MS while the MS treats existent call 1 using BTS1 as represented in part (a) of FIG. 777, TACFa in the base station controller ascertains radio resources occupied by existent call 1 and all available radio resources in all of the base stations (BTS1 and BTS2 in FIG. 777) where the MS visits.

Then, TACFa determines how to treat all calls, including the new call, for the MS on the basis of the ascertainment. In other words, TACFa in the base station controller determines to allocate the radio branch between the MS and BTS2 to calls 1 and 2 as described above with reference to part (b) of FIG. 777. According to the determination, the following steps are advanced in the system.

(1) In order to request to establish an access link for existent call 1 via BTS2 where the MS visits, TACFa sends a BEARER SETUP request indication to TACFv2-1 in the base station controller, which controls BTS2.

(2) Upon the reception of the BEARER SETUP request indication, TACFv2-1 sends a BEARER-AND-RADIO-BEARER SETUP request indication to BCFr2-1 in BTS2 to request to establish a radio access link between BTS2 and the MS and a wired access link between BTS2 and the base station controller for call 1.

(3) Additionally, TACFa in the base station controller sends another BEARER SETUP request indication to TACFv2-2 in the base station controller, which controls BTS2 in order to request to establish an access link for new call 2 via BTS2 where the MS visits.

(4) Upon the reception of the BEARER SETUP request indication, TACFv2-2 sends another BEARER-AND-RADIO-BEARER SETUP request indication to BCFr2-2 in BTS2 to request to establish another radio access link between BTS2 and the MS and another wired access link between BTS2 and the base station controller for call 2.

(5) Upon the reception of the BEARER-AND-RADIO-BEARER SETUP request indication from TACFv2-1, BCFr2-1 in BTS2 starts establishing the requested radio and wired access links, and then, sends a RADIO BEARER SETUP PROCEEDING request indication to TACFv2-1 in the base station controller to report that the access link setup is proceeding.

(6) Upon the reception of the RADIO BEARER SETUP PROCEEDING request indication, TACFv2-1 sends a RADIO BEARER SETUP REQUEST request indication to TACFa to request to establish the radio access link for existent call 1 between the MS and BTS2.

(7) Upon the reception of the BEARER-AND-RADIO-BEARER SETUP request indication from TACFv2-2, BCFr2-2 in BTS2 starts establishing the requested radio and wired access links, and then, sends a RADIO BEARER SETUP PROCEEDING request indication to TACFv2-2 in the base station controller to report that the access link setup is proceeding.

(8) Upon the reception of the RADIO BEARER SETUP PROCEEDING request indication, TACFv2-2 sends another RADIO BEARER SETUP REQUEST request indication to TACFa to request to establish the radio access link for new call 2 between the MS and BTS2.

(9) TACFa sends a single message including contents of a NON-SOFT HANDOVER EXECUTION request indication and of a RADIO BEARER SETUP request indication to TACAFa in the MS. The NON-SOFT HANDOVER BRANCH EXECUTION request indication is used for requesting to replace the existent radio access link via BTS1 with the new branch via BTS2 for existent call 1. The HANDOVER BRANCH ADDITION request indication is used for establishing the radio access link via BTS1 for call 2.

(10) Subsequently, the MS starts to synchronize process of the MS with process of the BTS2 with respect to the new radio access link for existent call 1.

(11) Furthermore, the MS starts to synchronize process of the BTS2 with process of the MS with respect to the new radio access link for new call 2.

(12) After completion of the synchronization for call 1, BCFr2-1 in BTS2 sends a BEARER-AND-RADIO-BEARER SETUP response confirmation to TACFv2-1 in the base station controller to report the completion of the synchronization on the radio access link.

(13) After completion of the synchronization for call 2, BCFr2-2 in BTS2 sends another BEARER-AND-RADIO-BEARER SETUP response confirmation to TACFv2-2 in the base station controller to report the completion of the synchronization on the radio access link.

(14) Upon the reception of the BEARER-AND-RADIO-BEARER SETUP response confirmation from BCFr2-1, TACFv2-1 sends a BEARER SETUP response confirmation to TACFa in the base station controller in order to report that the establishment of the radio access link via BTS2 for existent call 1 is completed.

(15) Upon the reception of the BEARER-AND-RADIO-BEARER SETUP response confirmation from BCFr2-2, TACFv2-2 sends another BEARER SETUP response confirmation to TACFa in the base station controller in order to report that the establishment of the other radio access link via BTS2 for new call 2 is completed.

(16) TACFa thus receives two BEARER SETUP response confirmations from TACFv2-1 and TACFv2-2. Then, it sends a BEARER RELEASE request indication to TACFv1-1 for requesting the former or existent access link for call 1.

(17) Upon the reception of the BEARER RELEASE request indication, TACFv1-1 sends a BEARER-AND-RADIO-BEARER RELEASE request indication to BCFr1-1 for requesting to release the former access link via BTS1 for call 1.

(18) Upon the reception of the BEARER-AND-RADIO-BEARER RELEASE request indication, BCFr1-1 releases the former access link via BTS1 for call 1, and then, sends a BEARER-AND-RADIO-BEARER RELEASE response confirmation to report the completion of the access link release.

(19) Next, TACFv1-1 in BTS1 sends a BEARER RELEASE response confirmation to TACFa in the base station controller to report the completion of the access link release. Accordingly, the MS treats calls 1 and 2 using the new branch via BTS2 and frequency f2.

3.7 First Method for Controlling branch structure and Frequency Band when a Handover Initiation Occurs while Mobile Station Treats a Plurality of Calls 3.7.1 Background of Invention of the Method The method described below is intended to resolve a problem involved in a mobile station which can treats a plurality of calls simultaneously. It is possible that a handover initiation occurs for this kind of mobile station while it treats a plurality of calls. In this case, it is possible that different branch structures and different frequency bands are allocated to the calls, respectively, if handover control for each call is independently carried out. Thus, it is necessary for the network to control respective calls with regard to handover of mobile station and transmission power, so that the network should endure an enormous burden with respect to preparation of overheads of messages. The control method described below will resolve the above-mentioned problems.

3.7.2 Embodying Method

In accordance with an method according to an embodiment of the present invention, when a trigger of handover occurs to the mobile station which is treating a plurality of calls for the reason of the travelling of the mobile station or other situations, a branch structure or a communication frequency band which can continue all of the calls is selected, and the selected branch structure or communication frequency band are assigned to all of the calls commonly.

FIG. 780 is a diagram representing an embodying method. As represented in part (a) of FIG. 780, an MS treats calls 1 and 2 at frequency f1 using diversity handover branch structure including a branch between the MS and BTS1 and a branch between the MS and BTS2. Assume that the MS moves toward BTS3, so as to be capable of communicating with BTS3 at frequency f1. In addition, assume that the capacity of BTS3 is sufficient, so that it is possible to establish radio accesses between the MS and BTS3 for both calls 1 and 2.

Accordingly, in the embodying method, handover is carried out such that the branch between the MS and BTS3 is added to the current branch structure and such that calls 1 and 2 are treated by the branch structure including the branch between the MS and BTS1; the branch between the MS and BTS2; and the branch between the MS and BTS3 as represented in part (b) of FIG. 780.

FIG. 781 is a diagram representing another embodying method. As represented in part (a) of FIG. 781, an MS treats calls 1 and 2 at frequency f1 using a branch between the MS and BTS1. Assume that the MS is departing from the radio zone of BTS1 and comes near BTS3, so that it is necessary to add a branch between the MS and BTS3 for the MS. In addition, assume that the capacity of BTS3 is sufficient, so that it is possible to establish radio accesses between the MS and BTS3 for both calls 1 and 2.

However, BTS3 uses a frequency band f2, which is different from that of BTS1, so that the MS cannot conduct diversity reception by BTS1 and BTS2. Therefore, in the embodying method, the branch structure is replaced with BTS3 for both calls 1 and 2 as represented in part (b) of FIG. 781.

FIG. 782 is a sequential flow diagram representing the operation exemplified in FIG. 780 of the system. In FIG. 782, TACAFa designates a functional entity in the MS shown in FIG. 780. TACFa designates a functional entity in the base station controller generated first after the MS has started communication. TACFv3-1 and TACFv3-2 designate instances of functional entities in the base station controller in order that the base station controller controls BTS3 where the MS visits. TACFv3-1 and TACFv3-2 correspond to calls 1 and 2, respectively. BCFr3-1 and BCFr3-2 designate instances of functional entities in BTS3 for controlling radio resources. BCFr3-1 and BCFr3-2 correspond to calls 1 and 2, respectively. The subject method for transiting from the state of part (a) to the state of part (b) in FIG. 780 will be described with reference to FIG. 782.

(1) TACFa in the base station controller sends a BEARER SETUP request indication to TACFv3-1 in the base station controller corresponding to BTS3 in order to establish an access link between BTS3 and the MS for call 1.

(2) Upon the reception of the BEARER SETUP request indication, TACFv3-1 sends a BEARER-AND-RADIO-BEARER SETUP request indication to BCFr3-1 in BTS3 to request to establish a radio access link between BTS3 and the MS and a wired access link between BTS3 and the base station controller for call 1.

(3) In addition, TACFa in the base station controller sends another BEARER SETUP request indication to TACFv3-2 in the base station controller corresponding to BTS3 in order to establish another access link between BTS3 and the MS for call 2.

(4) Upon the reception of the BEARER SETUP request indication, TACFv3-2 sends a BEARER-AND-RADIO-BEARER SETUP request indication to BCFr3-2 in BTS3 to request to establish another radio access link between BTS3 and the MS and another wired access link between BTS3 and the base station controller for call 2.

(5) In accordance with the BEARER-AND-RADIO-BEARER SETUP request indication from TACFv3-1, BCFr3-1 in BTS3 establishes the requested radio and wired access links for call 1, and then, sends a BEARER-AND-RADIO-BEARER SETUP response confirmation to TACFv3-1 in the base station controller to report that the access link setup is completed.

(6) Upon the reception of the BEARER-AND-RADIO-BEARER SETUP response confirmation, TACFv3-1 sends a RADIO BEARER SETUP REQUEST request indication to TACFa to request to establish the radio access link for call 1 between the MS and BTS3.

(7) In accordance with the BEARER-AND-RADIO-BEARER SETUP request indication from TACFv3-2, BCFr3-2 in BTS3 establishes the requested radio and wired access links for call 2, and then, sends another BEARER-AND-RADIO-BEARER SETUP response confirmation to TACFv3-2 in the base station controller to report that the access link setup is completed.

(8) Upon the reception of the BEARER-AND-RADIO-BEARER SETUP response confirmation, TACFv3-2 sends another RADIO BEARER SETUP REQUEST request indication to TACFa to request to establish the radio access link for call 2 between the MS and BTS3.

(9) Then, TACFa sends a HANDOVER BRANCH ADDITION request indication to TACAFa in the MS to additionally establish a new radio access link between BTS3 and the MS for calls 1 and 2 without releasing the formerly used radio access links via BTS1 and BTS2 for calls 1 and 2.

(10) In accordance with the HANDOVER BRANCH ADDITION request indication, TACAFa completes to establish the additional radio access link between BTS3 and the MS for calls 1 and 2. TACAFa in the MS then sends a HANDOVER BRANCH ADDITION response confirmation to TACFa in the base station controller for notifying of the completion. Consequently, the MS uses the diversity handover branch structure including the branches via BTS1, BTS2, and BTS3 for treating both calls 1 and 2.

FIG. 783 is a sequential flow diagram representing the operation exemplified in FIG. 781 of the system. In FIG. 783, TACAFa designates a functional entity in the MS shown in FIG. 781. TACFa designates a functional entity in the base station controller generated first after the MS has started communication. TACFv1-1 and TACFv1-2 designate instances of functional entities in the base station controller in order that the base station controller controls BTS1. TACFv1-1 and TACFv1-2 correspond to calls 1 and 2, respectively. TACFv3-1 and TACFv3-2 designate instances of functional entities in the base station controller in order that the base station controller controls BTS3. TACFv3-1 and TACFv3-2 correspond to calls 1 and 2, respectively. BCFr1-1 and BCFr1-2 designate instances of functional entities in BTS1 for controlling radio resources. BCFr1-1 and BCFr1-2 correspond to calls 1 and 2. BCFr3-1 and BCFr3-2 designate instances of functional entities in BTS3 for controlling radio resources. BCFr3-1 and BCFr3-2 correspond to calls 1 and 2, respectively. The subject method for transiting from the state of part (a) to the state of part (b) in FIG. 781 will be described with reference to FIG. 783.

(1) TACFa in the base station controller sends a BEARER SETUP request indication to TACFv3-1 in the base station controller corresponding to BTS3 in order to establish an access link between BTS3 and the MS for call 1.

(2) Upon the reception of the BEARER SETUP request indication, TACFv3-1 sends a BEARER-AND-RADIO-BEARER SETUP request indication to BCFr3-1 in BTS3 to request to establish a radio access link between BTS3 and the MS and a wired access link between BTS3 and the base station controller for call 1.

(3) In addition, TACFa in the base station controller sends another BEARER SETUP request indication to TACFv3-2 in the base station controller corresponding to BTS3 in order to establish another access link between BTS3 and the MS for call 2.

(4) Upon the reception of the BEARER SETUP request indication, TACFv3-2 sends a BEARER-AND-RADIO-BEARER SETUP request indication to BCFr3-2 in BTS3 to request to establish another radio access link between BTS3 and the MS and another wired access link between BTS3 and the base station controller for call 2.

(5) In accordance with the BEARER-AND-RADIO-BEARER SETUP request indication from TACFv3-1, BCFr3-1 in BTS3 starts to establish the requested radio and wired access links for call 1, and then, sends a BEARER-AND-RADIO-BEARER SETUP PROCEEDING request indication to TACFv3-1 in the base station controller to report that the access link setup is proceeding.

(6) Upon the reception of the BEARER-AND-RADIO-BEARER SETUP PROCEEDING request indication, TACFv3-1 sends a RADIO BEARER SETUP REQUEST request indication to TACFa in the base station controller to request to establish the radio access link for call 1 between the MS and BTS3.

(7) In accordance with the BEARER-AND-RADIO-BEARER SETUP request indication from TACFv3-2, BCFr3-2 in BTS3 starts to establish the requested radio and wired access links for call 2, and then, sends another BEARER-AND-RADIO-BEARER SETUP PROCEEDING request indication to TACFv3-2 in the base station controller to report that the access link setup is proceeding.

(8) Upon the reception of the BEARER-AND-RADIO-BEARER SETUP PROCEEDING request indication from BCFr3-2, TACFv3-2 sends another RADIO BEARER SETUP REQUEST request indication to TACFa to request to establish the radio access link for call 2 between the MS and BTS3.

(9) Upon the reception of the second RADIO BEARER SETUP REQUEST request indication, TACFa sends a NON-SOFT HANDOVER EXECUTION request indication to TACAFa in the MS to request to replace the radio access link via BTS1 with the radio access link via BTS3 for both calls 1 and 2.

(10) In accordance with the NON-SOFT HANDOVER EXECUTION request indication, TACAFa in the MS replaces the radio access link, and starts to synchronize process of the mobile station with process of BTS3 for call 1 with respect to the new radio access link.

(11) Furthermore, the MS starts to synchronize process of the mobile station with process of BTS3 for call 2 with respect to the new radio access link.

(12) After completion of the synchronization for call 1, BCFr3-1 in BTS3 sends a BEARER-AND-RADIO-BEARER SETUP response confirmation to TACFv3-1 in the base station controller to report the completion of the synchronization on the radio access link.

(13) Upon the reception of the BEARER-AND-RADIO-BEARER SETUP response confirmation from BCFr3-1, TACFv3-1 sends a BEARER SETUP response confirmation to TACFa in order to report the completion of the access link setup.

(14) On the other hand, after completion of the synchronization for call 2, BCFr3-2 in BTS3 sends another BEARER-AND-RADIO-BEARER SETUP response confirmation to TACFv3-2 in the base station controller to report the completion of the synchronization on the radio access link.

(15) Upon the reception of the BEARER-AND-RADIO-BEARER SETUP response confirmation from BCFr3-2, TACFv3-2 sends another BEARER SETUP response confirmation to TACFa in order to report the completion of the access link setup.

(16) TACFa thus receives two BEARER SETUP response confirmations from TACFv3-1 and TACFv3-2. Then, it sends a BEARER RELEASE request indication to TACFv1-1 for requesting the former or existent access link for call 1.

(17) Upon the reception of the BEARER RELEASE request indication, TACFv1-1 sends a BEARER-AND-RADIO-BEARER RELEASE request indication to BCFr1-1 for requesting to release the former access link via BTS1 for call 1.

(18) Upon the reception of the BEARER-AND-RADIO-BEARER RELEASE request indication, BCFr1-1 releases the former access link via BTS1 for call 1, and then, sends a BEARER-AND-RADIO-BEARER RELEASE response confirmation to TACFv1-1 to report the completion of the access link release.

(19) Next, TACFv1-1 in BTS1 sends a BEARER RELEASE response confirmation to TACFa in the base station controller to report the completion of the access link release.

Furthermore, as represented in FIG. 783, the processes similar to steps (16) through (19) are executed for call 2 from step (20) to (23). Consequently, the MS uses the single branch between the MS and BTS3 for treating both calls 1 and 2.

3.8 Second Method for Controlling Branch Structure and Frequency Band when a Handover Initiation Occurs while Mobile Station Treats a Plurality of Calls 3.8.1 Background of Invention of the Method In accordance with the method described at section 3.7, when a trigger of handover occurs to the mobile station which is treating a plurality of calls, a branch structure or a communication frequency band which can continue all of the calls is selected, and the selected branch structure or communication frequency band are assigned to all of the calls commonly.

However, it may be impossible to allocate radio resources of the newly visited base station to all calls for the mobile station because of insufficiency of capacity of the base station. In this case, if no countermeasure is taken, all calls should be released.

However, priorities of calls are not necessarily the same as each other: it is possible that a call is an emergency call. Although all calls cannot be maintained, one or more calls being high in priority can be sometimes maintained such that radio resources can be allocated to them. In this case, release of all calls is not reasonable.

The control method described below will resolve the above-mentioned problems.

3.8.2 Embodying Method

In accordance with a method of an embodiment of the present invention, when a trigger of handover occurs to the mobile station which is treating a plurality of calls for the reason of the travelling of the mobile station or other situations, the handover is carried out as follows:

a. A mobile station or a device (e.g., base station controller) in the network determines whether or not there is a branch structure or a frequency band for continuing all calls.

b. When there is not a branch structure which can continue all of the calls or there is not a frequency band which can continue all of the calls, the mobile station or the device recognizes the idle capacity of the newly visited base station available for the mobile station.

c. One or more calls among the treated calls are selected in accordance with priority so that the calls being high in priority can be maintained by the idle capacity. The other calls are released. When a plurality of calls have the same priority, all calls are released or one or more are selected in accordance with another fashion (e.g., by random selection or in accordance with the length of the connecting time) and the others are released.

d. The selected call or calls are handed over to the new branch or the frequency in relation to the idle capacity.

According to the control method, the call(s) of low priority is released to continue the call(s) of high priority, and the handover is carried out for the priority call(s) such that priority calls utilize a common branch structure and a common frequency band if a plurality of priority calls are selected to be continued.

FIG. 784 is a diagram representing an embodying method. In part (a) of FIG. 784, an MS uses a branch at frequency f1 between BTS1 and the MS, thereby treating calls 1 and 2. The MS is travelling from the radio zone corresponding to BTS1 to the radio zone corresponding to BTS3 and the MS should be handed over from BTS1 to BTS3 at this time.

However, the capacity of the BTS3 is too insufficient to continue both calls 1 and 2. More specifically, it will be possible to continue only call 1 of high priority. In addition, the frequency f2 is used by BTS3, so that it is impossible to carry out diversity handover from BTS1 to BTS3.

Accordingly, call 2 being low in priority for the MS is released and call 1 of high priority is controlled to remain and is handed over from the branch via BTS1 to the branch via BTS3 as represented in part (b) of FIG. 784 in the embodiment.

FIG. 785 is a sequential flow diagram representing the operation exemplified in FIG. 784 of the system. In FIG. 785, meanings of TACAFa, TACFv1-1, and so on are the same as those in FIG. 783. The subject method for transiting from the state illustrated in part (b) to the state illustrated in part (a) of FIG. 784 will be described with reference to FIG. 785.

(1) TACFa in the base station controller sends a BEARER SETUP request indication to TACFv3-1 in the base station controller corresponding to BTS3 in order to establish an access link between BTS3 and the MS for call 1.

(2) Upon the reception of the BEARER SETUP request indication, TACFv3-1 sends a BEARER-AND-RADIO-BEARER SETUP request indication to BCFr3-1 in BTS3 to request to establish a radio access link between BTS3 and the MS and a wired access link between BTS3 and the base station controller for call 1.

(3) In addition, TACFa in the base station controller sends a BEARER RELEASE request indication to TACFv1-2 in the base station controller corresponding to BTS1 for requesting the access link for lower priority call 2.

(4) Upon the reception of the BEARER RELEASE request indication, TACFv1-2 sends a BEARER-AND-RADIO-BEARER RELEASE request indication to BCFr1-2 in BTS1 for requesting to release the radio access link between BTS1 and the MS and the wired access link between BTS1 and the base station controller for call 2.

(5) On the other hand, in accordance with the BEARER-AND-RADIO-BEARER SETUP request indication from TACFv3-1, BCFr3-1 in BTS3 starts to establish the requested radio and wired access links for call 1, and then, sends a BEARER-AND-RADIO-BEARER SETUP PROCEEDING request indication to TACFv3-1 in the base station controller to report that the access link setup is proceeding.

(6) Upon the reception of the BEARER-AND-RADIO-BEARER SETUP PROCEEDING request indication, TACFv3-1 sends a RADIO BEARER SETUP REQUEST request indication to TACFa in the base station controller to request to establish the radio access link for call 1 between the MS and BTS3.

(7) Upon the reception of the BEARER-AND-RADIO-BEARER RELEASE request indication, BCFr1-2 releases the access link for call 2 via BTS1 for call 1, and then, sends a BEARER-AND-RADIO-BEARER RELEASE response confirmation to TACFv1-2 to report the completion of the access link release for call 2.

(8) Upon the reception of the BEARER-AND-RADIO-BEARER RELEASE response confirmation, TACFv1-2 in BTS1 sends a BEARER RELEASE response confirmation to TACFa in the base station controller to report the completion of the access link release for call 2.

(9) Upon the reception of the BEARER-AND-RADIO-BEARER RELEASE response confirmation, TACFa sends a NON-SOFT HANDOVER EXECUTION request indication to TACAFa in the MS to request to replace the radio access link via BTS1 with the radio access link via BTS3 for the MS.

(10) In accordance with the NON-SOFT HANDOVER EXECUTION request indication, TACAFa in the MS replaces the radio access link, and starts to synchronize process of the mobile station with process of BTS3 for call 1 with respect to the new radio access link.

(11) After completion of the synchronization for call 1, BCFr3-1 in BTS3 sends a BEARER-AND-RADIO-BEARER SETUP response confirmation to TACFv3-1 in the base station controller to report the completion of the synchronization on the radio access link.

(12) Upon the reception of the BEARER-AND-RADIO-BEARER SETUP response confirmation from BCFr3-1, TACFv3-1 sends a BEARER SETUP response confirmation to TACFa in order to report the completion of the access link setup.

(13) Upon the reception of the BEARER SETUP response confirmation from TACFv3-1, TACFa sends another BEARER RELEASE request indication to TACFv1-1 for requesting the former and unnecessary access link for call 1.

(14) Upon the reception of the BEARER RELEASE request indication, TACFv1-1 sends a BEARER-AND-RADIO-BEARER RELEASE request indication to BCFr1-1 for requesting to release the former access link via BTS1 for call 1.

(15) Upon the reception of the BEARER-AND-RADIO-BEARER RELEASE request indication, BCFr1-1 releases the former access link for call 1 via BTS1 for call 1, and then, sends a BEARER-AND-RADIO-BEARER RELEASE response confirmation to report the completion of the access link release.

(16) Next, TACFv1-1 in BTS1 sends a BEARER RELEASE response confirmation to TACFa in the base station controller to report the completion of the access link release for call 1. Consequently, only call 1 of high priority is continued by the use of the branch via BTS3.

3.9 Method for Handover wherein the Branch Addition Procedure is Completed without Confirmation of Synchronization of Branches 3.9.1 Background of Invention of the Method In conventional mobile communications system, a handover branch addition procedure is carried out as follows:

(1) A new branch is additionally established between the mobile station and a new base station.

(2) The new base station confirms that the receiving process in the base station is synchronized with the radio signals from the mobile station.

(3) The new base station reports to the base station controller about the completion of the synchronization.

(4) The branch addition procedure is completed.

However, as described above, a necessary communication quality is sometimes obtained by a plurality of branches including one or more auxiliary branches added on demand in the present system although minimal transmission power is consumed. In this structure, it is not limited that each branch satisfies the necessary level of the quality. Therefore, sometimes it is impossible to execute synchronization with respect to an auxiliary branch for which the transmission power is low.

Accordingly, if the conventional handover branch addition procedure including above-described steps (1) through (4) is applied to the present system, there is likelihood that it is impossible to confirm the synchronization with respect to a new branch and the branch addition procedure is continued for an unnecessarily long time. The method described below resolves the problems.

3.9.2 Embodying Method

In accordance with the present system, the handover branch addition procedure is completed upon the onset of communicating a layer 3 message without waiting for the confirmation of synchronization for a newly added branch.

Consequently, the base station controller finishes the handover branch addition procedure without waiting for the confirmation of synchronization for the newly added branch although it sends SETUP request indications for the new branch to the base station and mobile station.

Upon the reception of the setup request for the new branch, the mobile station adapts the interior functions and the communication frequency to the new branch, so as to enter the state for receiving signals from the new branch. Then, once the mobile station receives a meaningful signal from the branch, the mobile station starts the diversity combining using with signals received from the new branch and another branch since the new branch can be considered to be established.

Similarly, upon the reception of the setup request for the new branch, the base station adapts the interior functions and the communication frequency to the new branch, so as to enter the state for receiving signals from the new branch.

Then, once the base station receives a meaningful signal from the branch, the base station starts to transmit signals via the new branch since it can be considered to be established. At the same time, the base station starts the diversity combining using with signals received from the new branch and another branch if the base station conducts intra-cell diversity handover. Alternatively, the base station starts to transfer signals received from the new branch to the base station controller so that the base station controller can start the diversity combining using with signals from the base station and another base station if the base station controller conducts inter-cell diversity handover.

The above-described method is applied into various control methods which have been already described before this section. For example, FIG. 41 is an information flow diagram of the inter-sector handover branch addition in a single cell while FIG. 43 is an information flow diagram of the inter-cell handover branch addition. In the branch addition procedures in the diagrams, once layer 1 connection is established, the mobile station can communicate. Accordingly, the network finishes the branch addition procedure without waiting for the confirmation of synchronization for the newly added auxiliary branch.

FIG. 770 is a sequential flow diagram representing the start of inter-cell diversity handover simultaneously with the access link setup. In this procedure, the mobile station can start communicating layer 3 messages once the synchronization on layer 1 about the main branch between TACAFa and BCFr1 is completed. Therefore, the handover procedure is ended without waiting for the confirmation of synchronization for the auxiliary branch between TACAFa and BCFr2.

FIG. 773 is a sequential flow diagram representing an operation in the invented system which is carried out when the mobile station moves to a diversity handover zone. In this procedure, the mobile station can start communicating layer 3 messages once the synchronization on layer 1 about the new main branch between TACAFa and BCFr2 is completed after the branch replacement. Therefore, the handover procedure is ended without waiting for the confirmation of synchronization for the auxiliary branch between TACAFa and BCFr3.

The same is applied to other diversity handover procedures illustrated in FIGS. 775, 778, and so on.

3.10 Method for Controlling Management of Code Resources 3.10.1 Background of Invention of the Method In a usual method for controlling management of code resources, code resources are reassigned (calls are rearranged) when a call is originated or ended. However, if code resources are reassigned upon a call occurrence, a long delay of the link establishment occurs. If code resources are reassigned at the end of a call, the control for the reassignment is redundant and causes the increase of a control burden.

There is a mobile communications system wherein an assignable code resource can be divided into a plurality of code resources, and any of the original code resource and the divided code resources can be selected in accordance with the length corresponding to a necessary bandwidth and be assigned to a call. In this system, when the divided code resources are repeated to be assigned and released blithely, the fragmented assignable code resources are dispersed in the code resource space. In order to broaden the bandwidth, an unused code resource having the length corresponding to the necessary bandwidth should be reserved.

Therefore, reassignment of code resources to calls is necessary for rearranging the fragments to reserve unused code resources corresponding to wide bandwidth.

However, if code resources are reassigned upon a call occurrence, a long delay of the link establishment occurs. If code resources are reassigned at the end of a call, the control for the reassignment is redundant and causes the increase of a control burden since the next call is not necessarily a wide band call.

The selection of trigger timing for reassigning code resources (for rearranging calls) is an important consideration for improving operability and reducing the system burden.

It is an object of the mobile communications system, base station, base station controller, and method for controlling thereof to optimize the trigger timing for reassigning code resources, to reduce the number of reassignments, and to minimize the delay of the link setup.

3.10.2 Embodying Method

FIG. 793 represents a state where code resources have been assigned to channels. In the state illustrated in FIG. 793, only code resources CR5-2, CR5-7, CR5-8, CR5-9, CR5-11, CR5-15, and CR5-16 are not used nor assigned, but available with respect to level 5 since nodes upper than the available code resources are not used.

In addition, with respect to upper levels, a code resource at a node is available if all of the lower leaves and the upper node are not used. More specifically, with respect to a node N1, the lower leaves CR5-15 and CR5-16 and the upper node N2 are not used, so that the code resource CR4-8 at the node N1 is available.

The reason for the above-mentioned characteristics is because any upper code resource is divided into lower code resources. Therefore, the bandwidth relationship can be expressed by the following equation.

$$WCR1=2\times(WCR2)=4\times(WCR3)=8\times(WCR4)=16\times(WCR5)$$

where WCR1 is the bandwidth corresponding to the code resource CR1 at level 1, WCR2 is the bandwidth corresponding to code a resource CR2 at level 2, WCR3 is the bandwidth corresponding to code a resource CR3 at level 3, WCR4 is the bandwidth corresponding to code a resource CR4 at level 4, and WCR5 is the bandwidth corresponding to code a resource CR5 at level 5. Therefore, for example, the bandwidth WCR4 corresponding to a code resource CR4 at level 4 can be utilized by two code resources CR5 at level 5.

In the state shown in FIG. 793, it is impossible to reserve a code resource CR3 at level 3 which may be divided into four code resources CR5 at level 5 although there are seven unused code resources CR5-2, CR5-7, CR5-8, CR5-9, CR5-11, CR5-15, and CR5-16 at level 5. The reasons are because all code resources CR3-1 through CR3-4 are independent of one another and any successive code resource cannot be assembled from parts of respective code resources CR3-1 through CR3-4, and at least a part of each of code resources CR3-1 through CR3-4 have been already used at the lower levels.

In order to use a code resource CR3 at level 3, it is necessary to use other code resources instead of the used code resources at levels 4 or 5 below the subject code resource CR3 as represented in FIG. 794.

For this purpose, the radio base station determines whether a code resource corresponding to a necessary bandwidth can be availed or not. The base station controller reassigns the code resources on the bases of the determination.

More specifically, when the radio base station determines that code resource CR3-4 cannot be reserved, the base station controller assigns the unused code resource CR5-9 instead of the used code resource CR5-11 being of the same length at step S1. In addition, the base station controller assigns the unused code resource CR4-7 instead of the used code resource CR4-6 being of the same length at step S2. Thus, the code resource CR3-4 call be reserved.

As described above, the selection of trigger timing for reassigning code resources (for rearranging calls) is an important consideration for reducing the system burden. In the embodying method, once all available code resources corresponding to a preselected bandwidth are assigned, the reassignment is started.

More specifically, assume that the code resource CR3 at level 3 is selected as a standard code resource that is the longest assignable code resource corresponding to the usable widest bandwidth. Simultaneously, the bandwidth corresponding to the code resource CR3 at level 3 is selected as a standard bandwidth. Once all standard code resources CR3 cannot be assigned as represented in FIG. 793, the reassignment of code resources is triggered as represented in FIG. 794. Since the reassignment procedure is not carried out at the call occurrence, the delay of the link setup can be minimized. In addition, it is possible to reduce the control burden for the system in comparison with the case that the reassignment is always conducted at call release.

As described above, it is possible to reduce the number of reassignments and to minimize the delay of the link setup, whereby service quality and operability given to the user can be improved.

The invention claimed is:

1. A mobile communication system comprising:

a mobile station configured to conduct diversity reception;

a plurality of radio base stations; and a base station controller communicating with the mobile station via the plurality of radio base stations under control of a switching center, wherein the system comprises a layer-2-cipherer configured to encipher and decipher layer -2 or higher layer information in an OSI reference model or an equivalent model, the base station controller is configured to transmit the enciphered information to and receive deciphered information from the mobile station via the plurality of radio base stations during a diversity handover, the base station controller transmits a start encipherment indication to the mobile station to notify the mobile station of a start of encipherment and receives a start encipherment response returned from the mobile station in reply to the start encipherment indication, and the layer-2-cipherer, responsive to transmitting the start encipherment indication to the mobile station and before receiving the start encipherment response from the mobile station, becomes set to encipher information to be sent to the mobile station but becomes set to decipher information from the mobile station only after receiving the start encipherment response from the mobile station.

2. A mobile communication system comprising:

a mobile station configured to conduct diversity reception;

a plurality of radio base stations; and a base station controller communicating with the mobile station via the plurality of radio base stations under control of a switching center, the base station controller configured to transmit information to the mobile station via the plurality of radio base stations during a diversity handover, wherein the system comprises:

a layer-3-cipherer configured to encipher and decipher layer 3 or higher layer information in an OSI reference model or an equivalent model; and a layer-2-mutual-notifier residing on layer 2 of an OSI reference model or an equivalent model to communicate between different devices about an onset of transmission of enciphered information, and further wherein the base station controller transmits a start encipherment indication to the mobile station to notify the mobile station of a start of encipherment and receives a start encipherment response returned from the mobile station in reply to the start encipherment indication, and the layer-3-cipherer, responsive to transmitting the start encipherment indication to the mobile station and before receiving the start encipherment response from the mobile station, becomes set to encipher information to be sent to the mobile station but becomes set to decipher information from the mobile station only after receiving the start encipherment response from the mobile station.

3. A mobile communication system comprising:

a mobile station configured to conduct diversity reception;

a plurality of radio base stations; and a base station controller communicating with the mobile station via the plurality of radio base stations under control of a switching center, the base station controller configured to transmit information to the mobile station via the plurality of radio base stations during a diversity handover, the system further comprising:

a layer-3-cipherer configured to encipher and decipher layer 3 or higher layer information in an OSI reference model or an equivalent model;

a retransmission control information adder residing on layer 2 of the OSI reference model or the equivalent model to add retransmission control information to information which has been enciphered by the layer-3-enciphering-means; and a transmitter configured to transmit the enciphered information with the retransmission control information to the mobile station via the plurality of radio base stations, wherein the base station controller transmits a start encipherment indication to the mobile station to notify the mobile station of a start of encipherment and receives a start encipherment indication returned from the mobile station in reply to the start encipherment indication, and the layer-3-cipherer, responsive to transmitting the start encipherment indication to the mobile station and before receiving the start encipherment response from the mobile station, becomes set to encipher information to be sent to the mobile station but becomes set to decipher information from the mobile station only after receiving the start encipherment response from the mobile station.

4. A method for a mobile communication system, which comprises a mobile station configured to conduct diversity reception, a plurality of radio base stations, and a base station controller communicating with the mobile station via the plurality of radio base stations under control of a switching center, the method comprising:

receiving at the base station controller information from the switching center;

transmitting at the base station controller a start encipherment indication to the mobile station to notify the mobile station of a start of encipherment;

receiving, at the base station controller, a start encipherment response returned from the mobile station in reply to the start encipherment indication;

responsive to transmitting the start encipherment indication to the mobile station and before receiving the start encipherment response, becoming set to encipher, at the base station controller, the information from the switching center;

transmitting, at the base station controller, the enciphered information to the mobile station via the plurality of radio base stations during a diversity handover; and only after receiving the start encipherment response from the mobile station, becoming set to decipher, at the base station controller, information received from the mobile station via the plurality of radio base stations during the diversity handover.

5. A method for a mobile communication system, which comprises a mobile station configured to conduct diversity reception, a plurality of radio base stations, and a base station controller communicating via the plurality of radio base stations under control of a switching center, the method comprising:

enciphering and deciphering layer 2 or higher layer information in an OSI reference model or an equivalent model;

transmitting at the base station controller a start encipherment indication to the mobile station to notify the mobile station of a start of encipherment;

receiving, at the base station controller, a start encipherment response returned from the mobile station in reply to the start encipherment indication;

responsive to transmitting the start encipherment indication to the mobile station and before receiving the start encipherment response, becoming set to encipher, at the base station controller, information from the switching center;

transmitting at the base station controller the enciphered information to the mobile station via the plurality of radio base stations during a diversity handover; and only after receiving the start encipherment response from the mobile station, becoming set to decipher, at the base station controller, information received from the mobile station via the plurality of radio base stations during the diversity handover.

6. A method for a mobile communication system, which comprises a mobile station configured to conduct diversity reception, a plurality of radio base stations, and a base station controller communicating via the plurality of radio base stations under control of a switching center, the method comprising:

enciphering and deciphering layer 3 or higher layer information in an OSI reference model or equivalent model;

using a layer 2 notifier residing on layer 2 of an OSI reference model or an equivalent model to communicate between different devices about an onset of transmission of enciphered information;

transmitting, at the base station controller, a start encipherment indication to the mobile station to notify the mobile station of a start of encipherment;

receiving, at the base station controller, a start encipherment response returned from the mobile station in reply to the start encipherment indication;

responsive to transmitting the start encipherment indication to the mobile station and before receiving the start encipherment response, becoming set to encipher, at the base station controller, information from the switching center;

transmitting, at the base station controller, the enciphered information to the mobile station via the plurality of radio base stations during a diversity handover; and only after receiving the start encipherment response from the mobile station, becoming set to decipher, at the base station controller, information received from the mobile station via the plurality of radio base stations during the diversity handover.

7. A method for a mobile communication system, which comprises a mobile station configured to conduct diversity reception, a plurality of radio base stations, and a base station controller communicating via the plurality of radio base stations under control of a switching center, the method comprising:

enciphering and deciphering layer 3 or higher layer information in an OSI reference model or an equivalent model;

adding retransmission control information to the enciphered information at layer 2 of an OSI reference model or an equivalent model;

transmitting at the base station controller a start encipherment indication to the mobile station to notify the mobile station of a start of encipherment;

receiving, at the base station controller, a start encipherment response returned from the mobile station in reply to the start encipherment indication;

responsive to transmitting the start encipherment indication to the mobile station and before receiving the start encipherment response, becoming set to encipher, at the base station controller, information from the switching center;

transmitting, at the base station controller, the enciphered information with the retransmission control information to the mobile station via the plurality of radio base stations during a diversity handover; and only after receiving the start encipherment response from the mobile station, becoming set to decipher, at the base station controller, information received from the mobile station via the plurality of radio base stations during the diversity handover.

8. A mobile communication system comprising:

a mobile station;

a plurality of radio base stations connectible to the mobile station for communication;

a base station controller configured to send information to the plurality of radio base stations; and a switching center configured to send information to the base station controller, wherein the switching center comprises a mutual notifier configured to communicate an onset timing of transmission of enciphered information to both the mobile station and the plurality of radio base stations, wherein the base station controller comprises a controller-receiver configured to receive unciphered information from the switching center, an encipherer configured to encipher the unciphered information received by the controller-receiver, and a controller-transmitter configured to transmit to the plurality of radio base stations the enciphered information generated by the encipherer, wherein the plurality of radio base stations each comprise a base-station-receiver configured to receive the enciphered information from the base station controller, and a base-station-transmitter configured to transmit a start encipherment indication to the mobile station to notify the mobile station of a start of encipherment and, after transmitting the start encipherment indication to the mobile station, transmit to the mobile station the enciphered information received by the base-station-receiver, and wherein the mobile station comprises a mobile-station-receiver configured to receive multiple sets of the enciphered information transmitted from the plurality of radio base stations, a diversity combiner configured to diversity-combine the multiple sets of the enciphered information received by the mobile-station-receiver, a mobile-station-transmitter configured to return a start encipherment response in reply to the start encipherment indication;

a decipherer configured to become set, after receiving the start encipherment indication and before returning the start encipherment response, to decipher the enciphered information diversity-combined by the diversity combiner, and an encipherer configured to become set, only after returning the start encipherment response, to encipher information transmitted to the plurality of radio base stations.

9. The mobile communication system according to claim 8, wherein the base station controller further comprises a retransmission control information adder configured to add retransmission control information to the unciphered information, and the encipherer of the base station controller enciphers the unciphered information added with the retransmission control information.

10. A mobile communication method implemented in a mobile communication system comprising a mobile station, a plurality of radio base stations connectible to the mobile station for communication, a base station controller configured to send information to the plurality of radio base stations, and a switching center configured to send information to the base station controller, the method comprising:

communicating, by the switching center, an onset timing of transmission of enciphered information to both the mobile station and the plurality of radio base stations;

receiving, by the base station controller, unciphered information from the switching center;

enciphering the unciphered information by the base station controller;

transmitting at the base station controller a start encipherment indication to the mobile station to notify the mobile station of a start of encipherment before transmitting the start encipherment indication to the mobile station;

transmitting, by the base station controller, the enciphered information to the plurality of radio base stations;

receiving, by the plurality of radio base stations, the enciphered information from the base station controller;

transmitting, by the plurality of radio base stations, the enciphered information to the mobile station;

receiving, by the mobile station, multiple sets of the enciphered information transmitted from the plurality of radio base stations;

diversity-combining the multiple sets of the enciphered information by the mobile station;

returning, at the mobile station, a start encipherment response in reply to the start encipherment indication;

becoming set to decipher, at the mobile station, the diversity-combined, enciphered information after receiving the start encipherment indication and before returning the start encipherment response; and only after returning the start encipherment response, becoming set to encipher information transmitted to the plurality of radio base stations.

* * * * *